United States Patent [19]

Borta

[11] Patent Number: 4,536,840

[45] Date of Patent: Aug. 20, 1985

[54] AUTOGRAMMER

[76] Inventor: Ronald Borta, 252 Henry La., Barrington, Ill. 60010

[21] Appl. No.: 432,135

[22] Filed: Sep. 30, 1982

[51] Int. Cl.3 .............................................. G06F 9/00

[52] U.S. Cl. .................................................... 364/300

[58] Field of Search ................. 364/200 MS File, 300

[56] References Cited

PUBLICATIONS

Busnello et al., "Structure Of A Source Program Generator", *IBM T.D.B.*, vol. 14, No. 1, Jun. 1971, pp. 306–311.

*Primary Examiner*—Raulfe B. Zache

*Attorney, Agent, or Firm*—Jenner & Block

[57] ABSTRACT

An automatic application program generator capable of being used with microcomputers having relatively small memory storage capacities. The novel features of the automatic program generator of the present invention relate to its ability to (1) create application programs quickly and efficiently; (2) operate directly from information formatted onto the display screen of the computer; (3) build its own internal machine language or syntax from the information formatted onto the screen; and (4) operate without program language or syntax input from the operator.

17 Claims, 185 Drawing Figures

FIG. 40
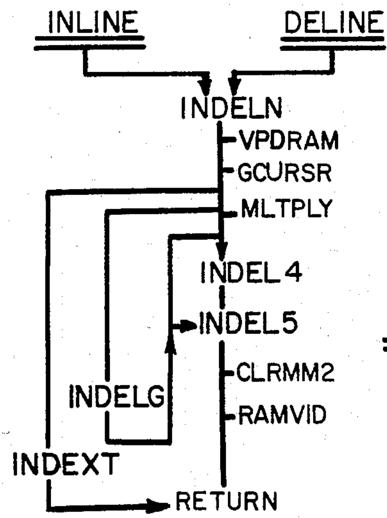
FIG. 36
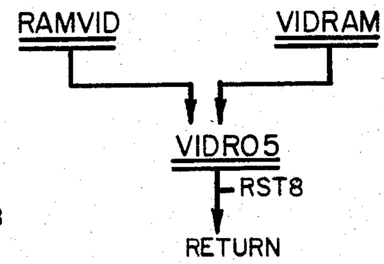
FIG. 49
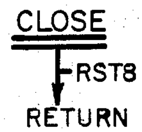
FIG. 47
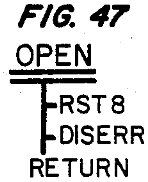
FIG. 68
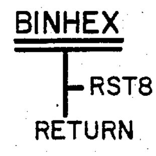
FIG. 69
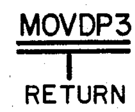
FIG. 41
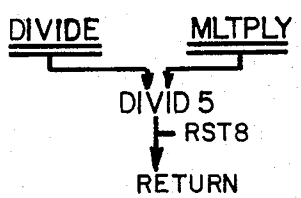
FIG. 59
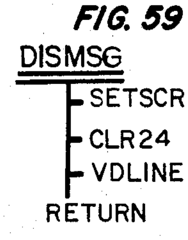
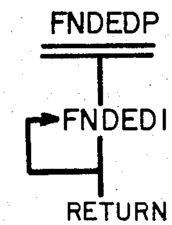
FIG. 71
FIG. 61
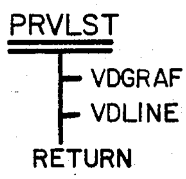
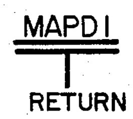
FIG. 138
FIG. 104
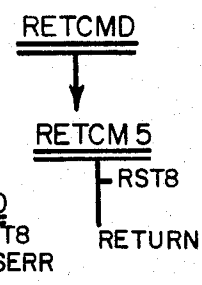
FIG. 70
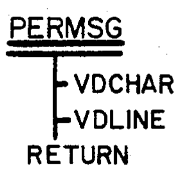
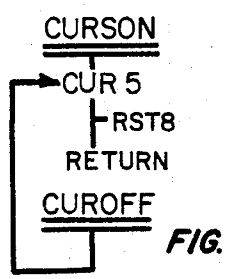
FIG. 60
FIG. 29
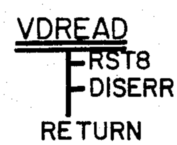
FIG 105
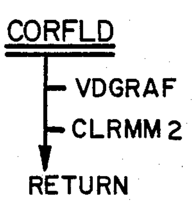
FIG. 52
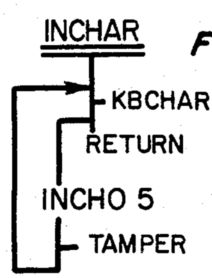
FIG. 72
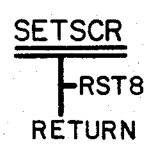
FIG. 8
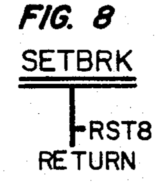

FIG 139
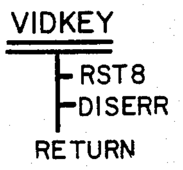
FIG. 18
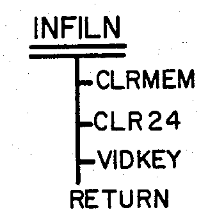
FIG. 19
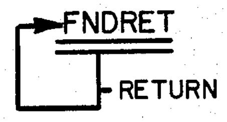
FIG. 20
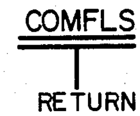
FIG. 73
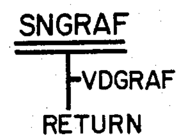
FIG. 44
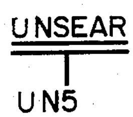
FIG. 22
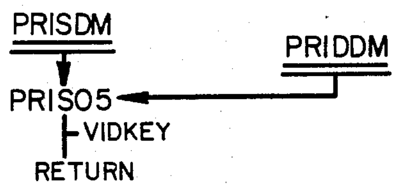
FIG. 21
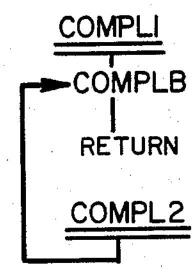
FIG. 140
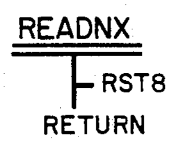
FIG. 48
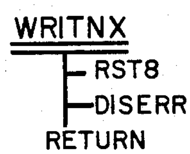
FIG. 141
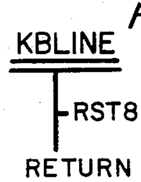
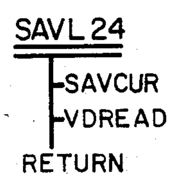
FIG. 53
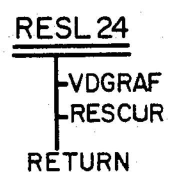
FIG. 38
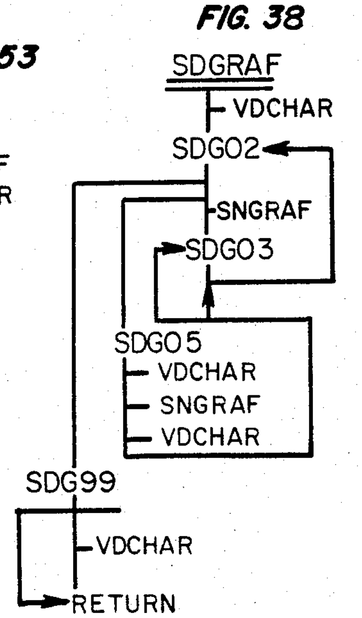
FIG. 10
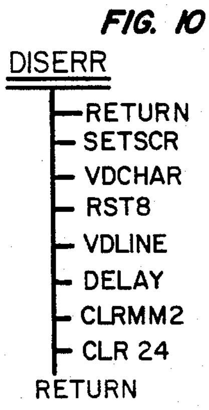
FIG. 51
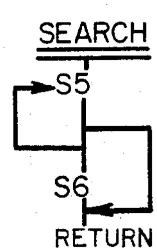
FIG. 43

FIG. 23
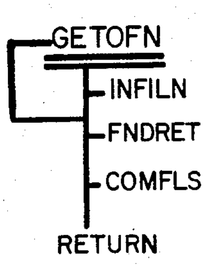
FIG. 24
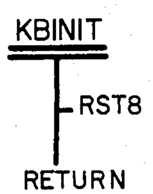
FIG. 25
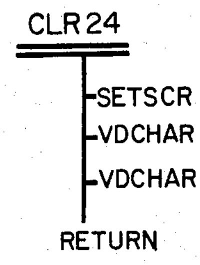
FIG. 26
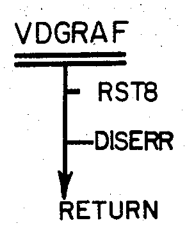
FIG. 27
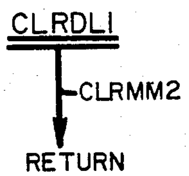
FIG. 28
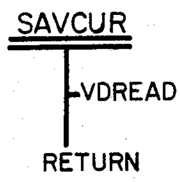
FIG. 30
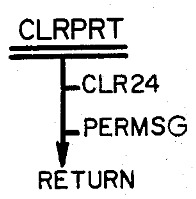
FIG. 31
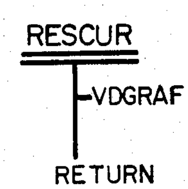
FIG. 32
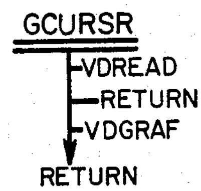
FIG. 33
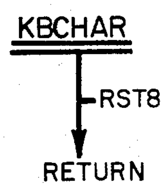
FIG. 34
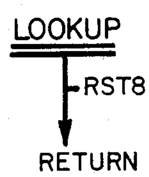
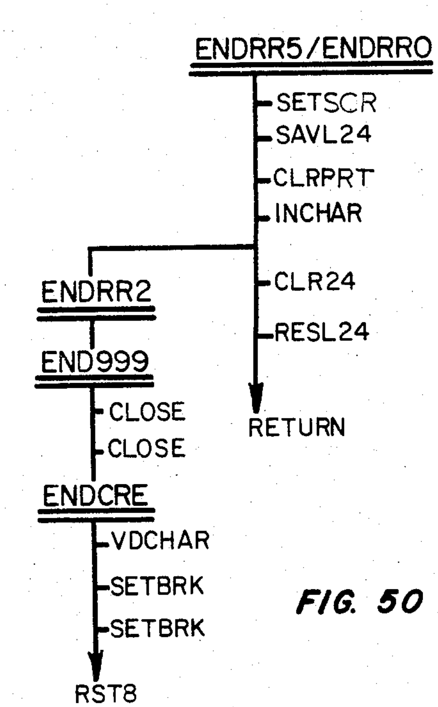
FIG. 50
FIG. 46
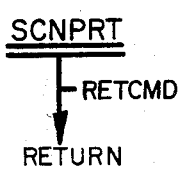

FIG. 92
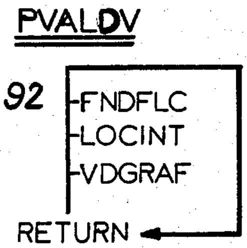
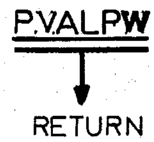
FIG. 181
FIG. 90
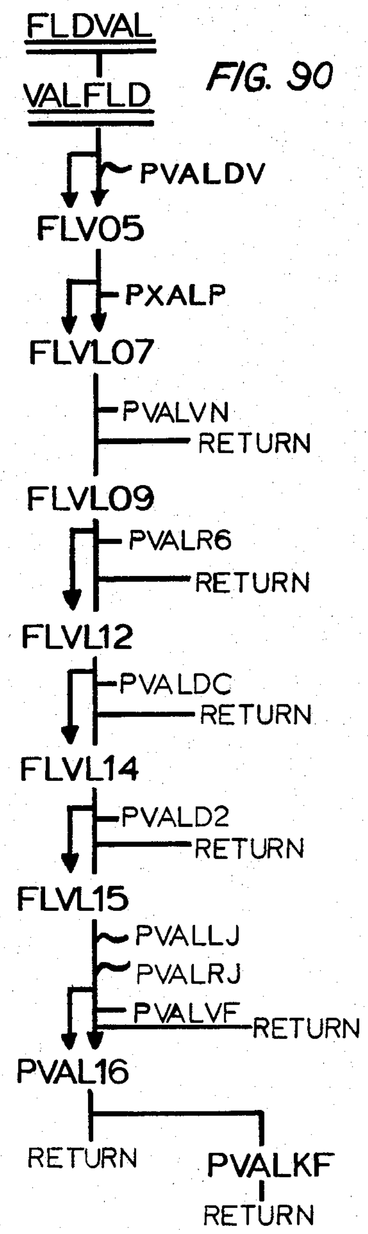
FIG. 102
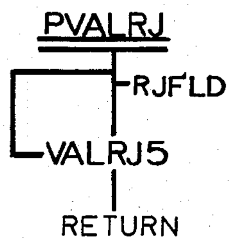
FIG. 98
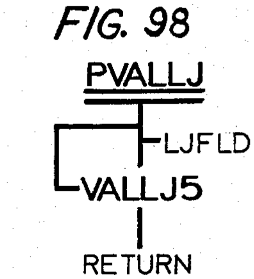
FIG. 182
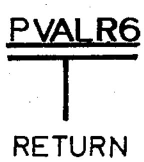
FIG. 183
FIG. 93
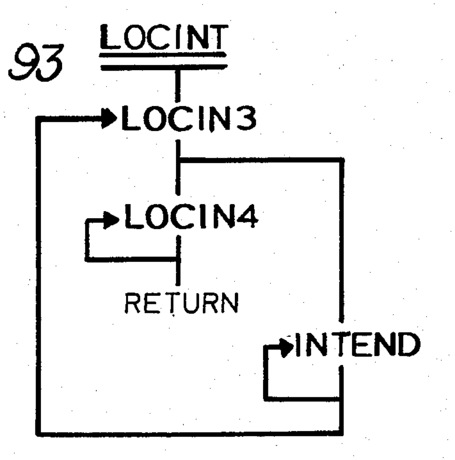

FIG. 161
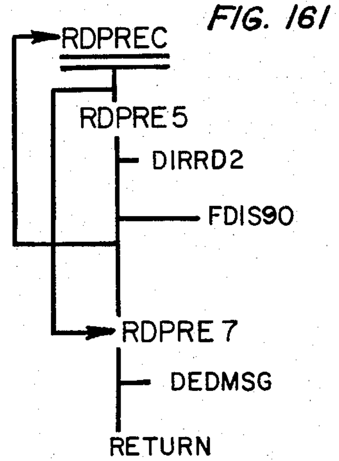
FIG. 91
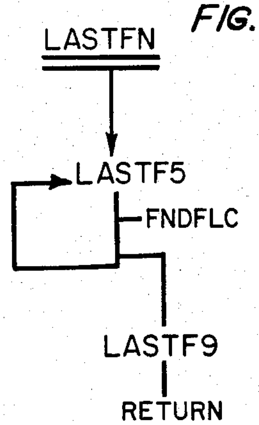
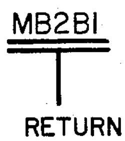
FIG. 151
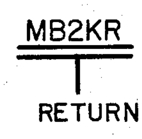
FIG. 152
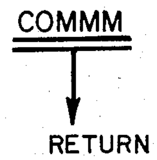
FIG. 149
FIG. 144
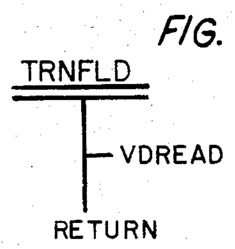
FIG. 143
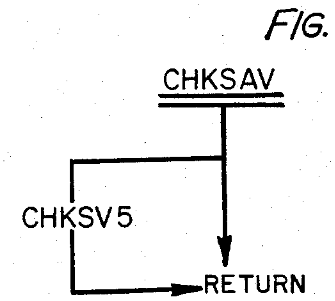

FIG. 104
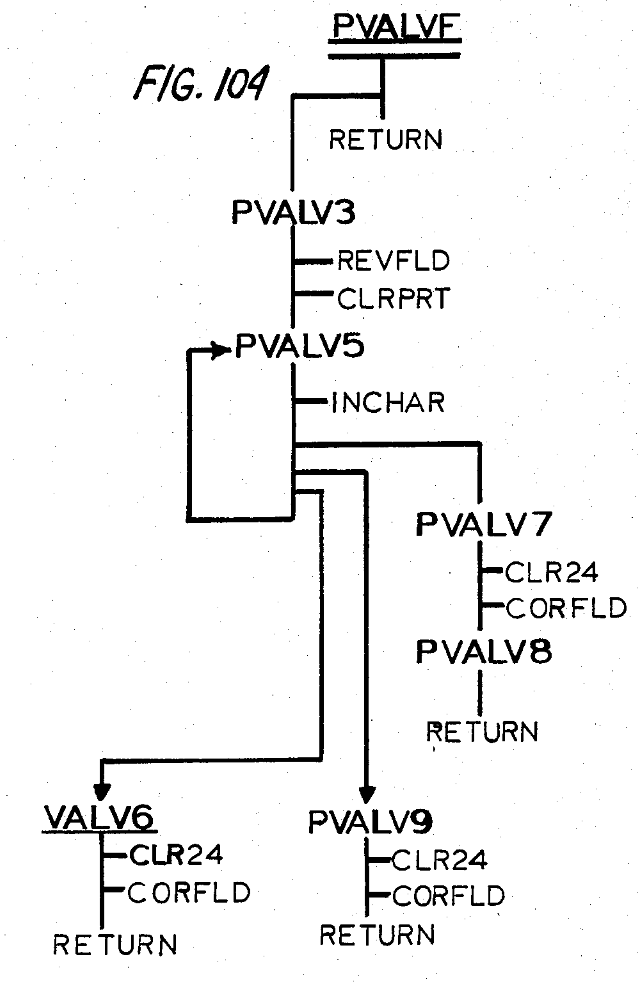
FIG. 112
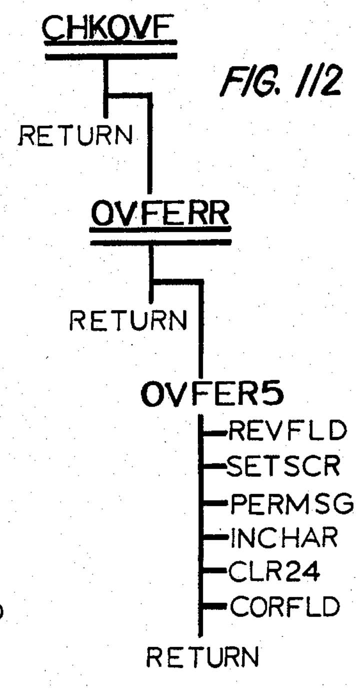
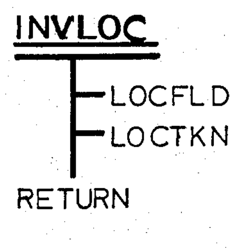
FIG. 95
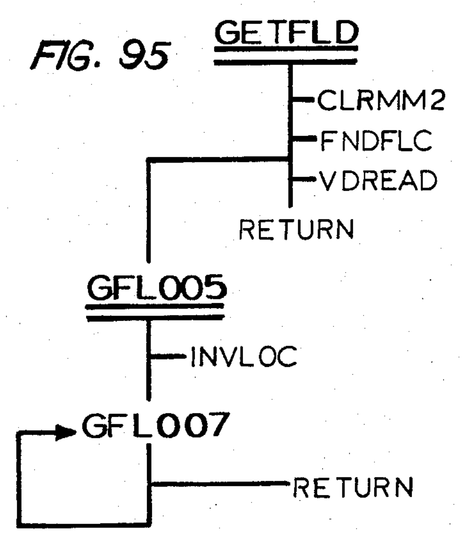
FIG. 101
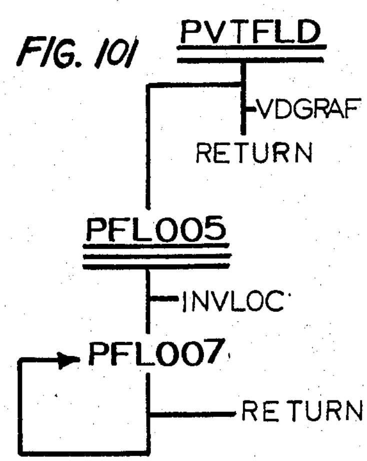

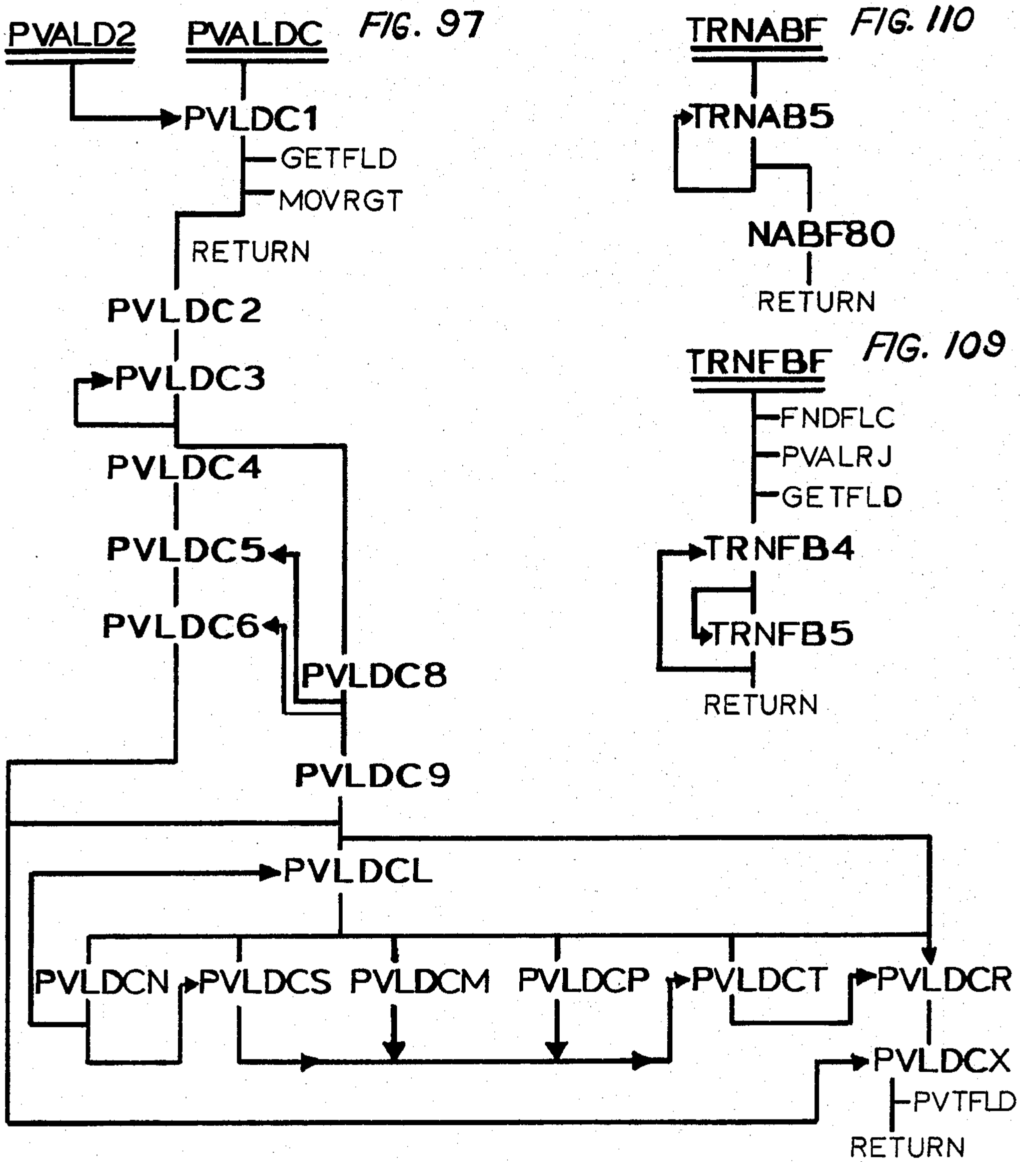
FIG. 97
FIG. 110
FIG. 109
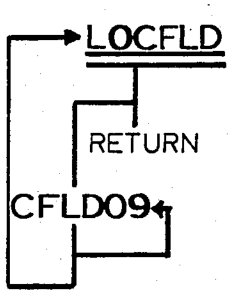
FIG. 107
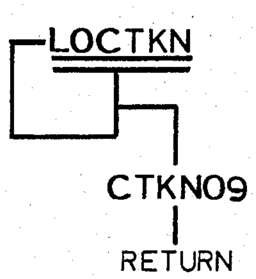
FIG. 108
FIG. 111

FIG. 113
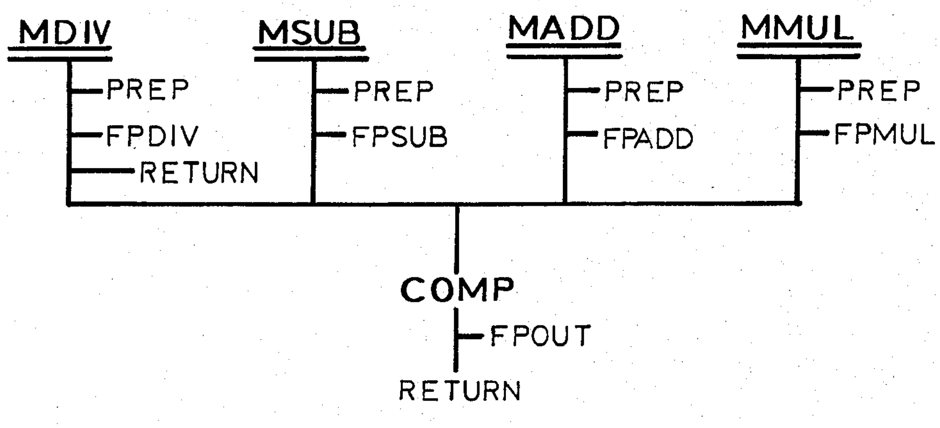
FIG. 114
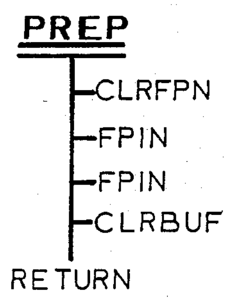
FIG. 115
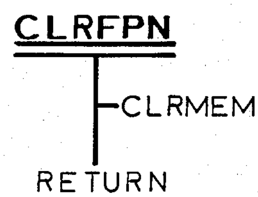
FIG. 122
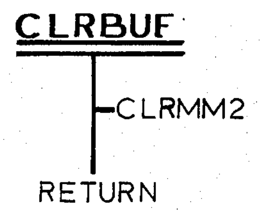
FIG. 121
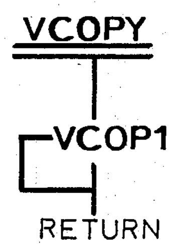
FIG. 117
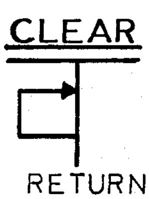
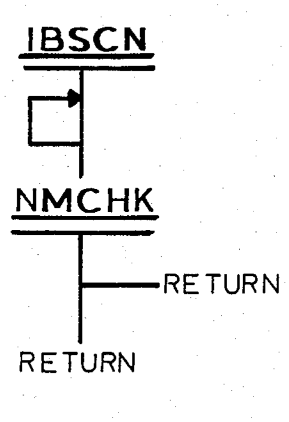
FIG. 119
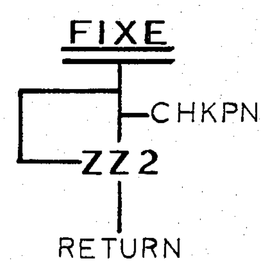

FIG. 184A
FIG. 176
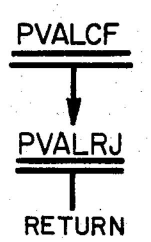
FIG. 179
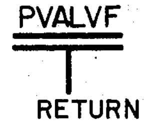
FIG. 184B
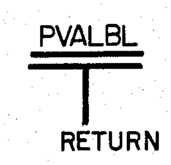
FIG. 184C
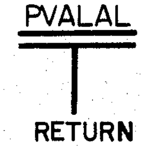
FIG. 178
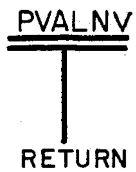
FIG. 184D
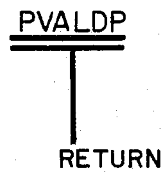
FIG. 184E
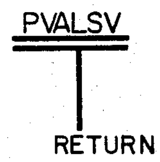
FIG. 184F
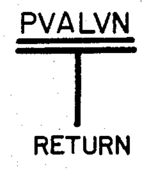
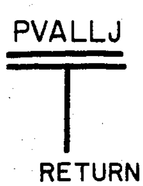
FIG 184G
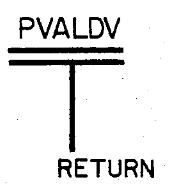
FIG 184H
FIG. 177
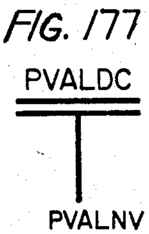
FIG. 180
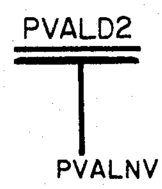
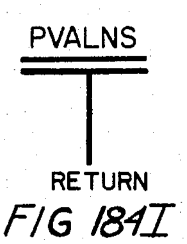
FIG 184I

AUTOGRAMMER

FIELD OF THE INVENTION

This invention relates generally to computer programs for the storage and retrieval of information and more particularly "user-friendly" computer programs capable of automatically generating data storage and retrieval application programs.

BACKGROUND OF THE INVENTION

Recently, micro-computers (defined herein as computers having word length capabilities of 16 bits or less) have flooded the home and small business market. Accompanying this surge in micro-computer sales is a corresponding demand for "user friendly" software. The ultimate goal of programmers creating the software for this personal computer market is the design of programs for the unskilled operator which that operator will be able to modify to fulfill his special needs.

Previously, the art of creating computer programs through which information could be stored and retrieved required the skill of at least one experienced programmer capable of employing a high-level machine language such as COBOL or FORTRAN. The programmer, relying on all of his skill and expertise and with the expenditure of great amounts of time was able to create a computer program tailored to satisfy one specific need. Any deviation from the initial program necessitated a complete redraft of the program.

More particularly, heretofore the person defining the program parameters first disseminated those parameters to the actual programmer who, in turn, conveyed those parameters and all accompanying documents to a systems analyst who was responsible for the design of the program. Designing a program, is a complicated process involving the use of flowcharts, parameter lists, CRT design forms, print-out design forms and the formatting of actual data base records. Also, the systems analyst was responsible for the type of data base used in the system and designed the support programs required to maintain that data base.

Having decided upon the parameters and having selected the support programs for the data base, the systems analyst then turned the design documents over to the programmer who converted these documents into the program statements which allow the computer to do the desired work. The conversion to program statements not only involve one or more complicated computer languages, but also requires exhaustive and time consuming testing and "debugging." The more complex the program becomes, the more difficult it is to eliminate inherent flaws. In fact, today's programmer spends 70% of his time reworking old programs to enable them to handle new requirements or make them work with new equipment. Thus, a big backlog of "to-be-developed" programs results.

While it is possible that the program design process could be handled by the programmer alone, it is almost always requires the cooperation of two people: the person with the need and the programmer. Often the design process involves more people. Of course, the more people involved: (1) the greater the possibility of deviating from the original request becomes; and (2) the longer the time period between the initial request and the actual creation of the program.

The need to streamline and simplify the programming process is apparent. One solution is called an "application generator." This is a standard program module, or program unit, that can be used when putting together the software, or instructions, for a complex business computer systems. In order to minimize creation time and reduce errors, the computer is allowed to create a portion of the menial and more complicated program. In fact, on the very large and sophisticated main frame computer systems using application generators, such as MARK V, exceptionally gifted programmers have created working programs in a few days. However, these programming techniques are limited to the large computers, are available only to programmers, and cost large sums of money (in the vicinity of $100,000).

As a result, the person needing the programming must be able to justify the cost involved. And in small businesses, the cost can seldom be economically justified. Most programming requests, even for a small business and on small computer systems, require large sums of money, time and manpower.

In contrast to the foregoing, the invention described herein allows a person to relate his needs directly to the computer. With information supplied by the person orginating the request, the computer creates the final computer program directly. The program creation time involves only moments, and the computer creates a more complete and sophisticated program than the heretofore conventionally created programs. Possibly most important, the person can obtain programs that, although very helpful, would have been too expensive to justify creating if it was necessary to follow the conventional creation process routine. The entire interaction between the operator and computer is handled visually and in free form mode (a mode that places few limitations on the programmer, i.e., is very unstructured), permitting the unskilled operator, a person with very little, if any, previous computer related experience to satisfy his needs within minutes.

SUMMARY OF THE INVENTION

It is therefore a principal object of the present invention to create a computer program which can be used by operators unskilled in complex computer languages to develop specific application programs.

Another object of the present invention is to develop a computer program for generating application programs for unskilled operators through the use of a technique whereby the computer develops its own internal language.

A further object of the present invention to develop a computer program for generating application programs through a visual creation process which requires no textural preparation on the operator's part, i.e., the computer allows the operator free form ability.

Yet another object of the present invention to provide an application generation program through which the computer interprets the operator's input by creating its own mini-interpretive language based upon the inputted information.

A still further object of the present invention is to create a generation program employing a validation-interpretation cross reference table by which the information specified by the operator and the textual information prepared by the operator are compared to develop a program best suited to a particular need.

Still another object of the present invention to provide an advanced automatic program generator which excels in the ease and speed of application program development.

A further object of the present invention to create a computer program for each special application rather than attempting to force special information into general purpose programs.

Another object of the present invention is to create a computer program which develops other application programs in a fraction of the time needed to create application programs by means of convention programming.

A still further object of the present invention is to provide a computer program for generating application programs which can be used by non-programmers whereby the application programs are generated from a visual display formatted directly onto the display screen.

Still another object of the present invention is to provide a generation program which develops an application program in machine language without requiring a user's input program.

A further object of the present invention is to provide an application generation program which creates application programs that run independently of other programs.

Another object of the present invention is to provide an application generation program which alleviates the need to restart the program due to operator or machine error by automatically returning to the last routine in the program if an error results.

A still further object of the present invention is to provide an application generation program which preempts sections of program code if the code was inadvertently accessed by another section of the program.

Yet another object of the present invention is to provide a computer program which develops other application programs capable of performing algebraic operations using floating point notation with twenty six significant digits and ten decimal places.

A further object of the present invention is to provide a computer program which develops other application programs capable of searching for and sequencing data records in a data base file more efficiently than prior art computer programs.

The present invention comprises a method of generating an application program for manipulating data on a computer including the steps of using field delimiters inputted by a user through an input-output unit connected to a computer to delineate a field. The computer uses program code to create a data base descriptor file, the descriptor file is adapted to receive and store the delimiter; and to create a data base file in a separate location, the data base file is adapted to receive and store inputted data. The computer also uses program code to create a data base key file in a separate location, the data base key file is adapted to identify the stored data; and to manipulate and transfer data between the field, the data base descriptor file, the data base file and the data base key file to generate an application program.

The present invention also comprises a method of transforming a general purpose electronic computer into a special purpose electronic computer. The computer includes a screen monitor for communicating with the computer. The screen monitor and the computer are operatively connected to a control unit for presenting data and commands to the computer. The computer also includes a storage unit for placing data in memory for subsequent retrieval and use. The method includes the steps of communicating with the control unit through a responsive sequence of operations wherein visual information is displayed to the user on the screen monitor and the user enters corresponding instructions. Spaces allocated in the stored unit for storing subsequently inputted data and the control unit is used to generate program code through which the fields may be manipulated when the user inputs instructions onto the screen monitor.

The present invention also includes an application program generator adapted for use with computers having relatively small memory storage capacities. The application program generator includes means operatively connected to the computer for inputting data to and receiving output from the computer and means adapted to store data and programming code. The application program generator also includes control means operatively connected to the input-output means and the storage means, such that the control means, the input-output means and the storage means are adapted to transfer information to and from each other individually and collectively in response to a command signal from the control means, the transfer of information pursuant to directive stored in the control means, the directives include, but are not limited to the following procedural steps: using field delimiters inputted by a user through the input-output means to delineate a field; creating a data base descriptor file in the storage means, the data base descriptor file is adapted to receive and store the delimiters; creating a data base file in a separate location, the data base file is adapted to receive and store inputted data; creating a data base key file in a separate location, the data base key file is adapted to identify the stored data; and generating an application program to manipulate and transfer data between the field, the data base descriptor file, the data base file and the data base key file.

The present invention also contemplates a method of searching a data base file structure for use with storing a new data base record on a computer having a data base file and a key file for containing data records, the method includes the step of creating a file number to attach to the end of a key file record so that the data base record corresponds to the key file record number and key value. The method also includes comparing the key record number and the data base record number and then performing a binary search to find the key value and the key record number if the difference between the numbers is greater than a predetermined value. Otherwise, the method performs a sequential search to find the key value and the key record number if the difference between the numbers is equal or less than the predetermined value. If there is no difference between the numbers being compared, the method includes identifying the closest record number in the key file.

To the accomplishment of the foregoing and still other objects and advantages, the invention, is best utilized in, a system whereby a computer is provided with the capability of internally generating program code from data inputted by a user; the program code employed by the computer to structure, store, and manipulate inputted data. The system includes an input-output unit, a storage unit, a control unit operatively connected to the input-output unit and the storage unit such that each unit is capable is communicating, individually and collectively, with all other units upon receipt of a command signal from the control unit. The system also includes means for delineating a field using field delimiters inputted by a user and means for creating a data base descriptor file in the storage unit, the descriptor file is adapted to receive and store the delimiters. Also, the system includes means for creating a data base file in the storage unit, the data base file adapted to receive and store inputted data and means for creating a data base key file in the storage unit, the key file adapted to identify the stored data. Finally, the system includes means for automatically generating program code from the control unit, whereby the fields may be manipulated through use of the screen monitor.

DETAILED DESCRIPTION OF THE DRAWINGS

The invention, together with further objects and advantages thereof, can best be understood by reference to the following specification, taken in connection with the accompanying drawings, in which:

FIG. 8 is a flow chart illustrating the subroutines which combine to define the SETBRK subroutine;

FIG. 10 is a flow chart illustrating the subroutines which combine to define the DISERR subroutine;

FIG. 18 is a flow chart illustrating the subroutines which combine to define the INFILN subroutine;

FIG. 19 is a flow chart illustrating the subroutines which combine to define the FNDRET subroutine;

FIG. 20 is a flow chart illustrating the subroutines which combine to define the COMFLS subroutine;

FIG. 21 is a flow chart illustrating the subroutines which combine to define the COMPL1 and COMPL2 subroutines FIG. 22 is a flow chart illustrating the subroutines which combine to define the PRISDM and PRIDDM subroutines;

FIG. 23 is a flow chart illustrating the subroutines which combine to define the GETOFN subroutine;

FIG. 24 is a flow chart illustrating the subroutines which combine to define the KBINIT subroutine;

FIG. 25 is a flow chart illustrating the subroutines which combine to define the CLR24 subroutine;

FIG. 26 is a flow chart illustrating the subroutines which combine to define the VDGRAF subroutine;

FIG. 27 is a flow chart illustrating the subroutines which combine to define the CLRDL1 subroutine;

FIG. 28 is a flow chart illustrating the subroutines which combine to define the SAVCUR subroutine;

FIG. 29 is a flow chart illustrating the subroutines which combine to define the VDREAD subroutine;

FIG. 30 is a flow chart illustrating the subroutines which combine to define the CLRPRT subroutine;

FIG. 31 is a flow chart illustrating the subroutines which combine to define the RESCUR subroutine;

FIG. 32 is a flow chart illustrating the subroutines which combine to define the GCURSR subroutine;

FIG. 33 is a flow chart illustrating the subroutines which combine to define the KBCHAR subroutine;

FIG. 34 is a flow chart illustrating the subroutines which combine to define the LOOKUP subroutine;

FIG. 36 is a flow chart illustrating the subroutines which combine to define the RAMVID and VIDRAM subroutines;

FIG. 38 is a flow chart illustrating the subroutines which combine to define the SDGRAF subroutine;

FIG. 40 is a flow chart illustrating the subroutines which combine to define the INLINE DELINE subroutines;

FIG. 41 is a flow chart illustrating the subroutines which combine to define the DIVIDE and MLTPLY subroutines;

FIG. 43 is a flow chart illustrating the subroutines which combine to define the SEARCH subroutine;

FIG. 44 is a flow chart illustrating the subroutines which combine to define the UNSEAR subroutine;

FIG. 46 is a flow chart illustrating the subroutines which combine to define the SCNPRT subroutine;

FIG. 47 is a flow chart illustrating the subroutines which combine to define the OPEN subroutine;

FIG. 48 is a flow chart illustrating the subroutines which combine to define the WRITNX subroutine;

FIG. 49 is a flow chart illustrating the subroutines which combine to define the CLOSE subroutine;

FIG. 50 is a flow chart illustrating the subroutines which combine to define the ENDRR5/ENDROO subroutines;

FIG. 51 is a flow chart illustrating the subroutines which combine to define the SAVL24 subroutine;

FIG. 52 is a flow chart illustrating the subroutines which combine to define the INCHAR subroutine;

FIG. 53 is a flow chart illustrating the subroutines which combine to define the RESL24 subroutine;

FIG. 59 is a flow chart illustrating the subroutines which combine to define the DISMSG subroutine;

FIG. 60 is a flow chart illustrating the subroutines which combine to define the CURSON subroutine;

FIG. 61 is a flow chart illustrating the subroutines which combine to define the PRVLST subroutine;

FIG. 68 is a flow chart illustrating the subroutines which combine to define the BINHEX subroutine;

FIG. 69 is a flow chart illustrating the subroutines which combine to define the MOVDP3 subroutine;

FIG. 70 is a flow chart illustrating the subroutines which combine to define the PERMSG subroutine;

FIG. 71 is a flow chart illustrating the subroutines which combine to define the FNDEDP subroutine;

FIG. 72 is a flow chart illustrating the subroutines which combine to define the SETSCR subroutine;

FIG. 73 is a flow chart illustrating the subroutines which combine to define the SNGRAF subroutine;

FIG. 90 is a flow chart illustrating the subroutines which combine to define the VALFLD subroutine;

FIG. 91 is a flow chart illustrating the subroutines which combine to define the LASTFN subroutine;

FIG. 92 is a flow chart illustrating the subroutines which combine to define the PVALDV subroutine;

FIG.93 is a flow chart illustrating the subroutines which combine to define the LOCINT subroutine;

FIG. 95 is a flow chart illustrating the subroutines which combine to define the GETFLD subroutine;

FIG. 97 is a flow chart illustrating the subroutines which combine to define the PVALD2 subroutine;

FIG. 98 is a flow chart illustrating the subroutines which combine to define the PVALLJ subroutine;

FIG. 101 is a flow chart illustrating the subroutines which combine to define the PVTFLD subroutine;

FIG. 102 is a flow chart illustrating the subroutines which combine to define the PVALRJ subroutine;

FIG. 104 is a flow chart illustrating the subroutines which combine to define the RETCMD subroutine;

FIG. 105 is a flow chart illustrating the subroutines which combine to define the CORFLD subroutine;

FIG. 106 is a flow chart illustrating the subroutines which combine to define the PVALKF subroutine;

FIG. 107 is a flow chart illustrating the subroutines which combine to define the LOCFLD subroutine;

FIG. 108 is a flow chart illustrating the subroutines which combine to define the LOCTKN subroutine;

FIG. 109 is a flow chart illustrating the subroutines which combine to define the TRNFBF subroutine;

FIG. 110 is a flow chart illustrating the subroutines which combine to define the TRNABF subroutine;

FIG. 111 is a flow chart illustrating the subroutines which combine to define the SAVEOP subroutine;

FIG. 113 is a flow chart illustrating the subroutines which combine to define the MSUB, MADD, MDIV, and MMUL subroutines;

FIG. 114 is a flow chart illustrating the subroutines which combine to define the PREP subroutine;

FIG. 115 is a flow chart illustrating the subroutines which combine to define the CLRFPN subroutine;

FIG. 117 is a flow chart illustrating the subroutines which combine to define the CLEAR subroutine;

FIG. 119 is a flow chart illustrating the subroutines which combine to define the FIXE subroutine;

FIG. 121 is a flow chart illustrating the subroutines which combine to define the VCOPY subroutine;

FIG. 122 is a flow chart illustrating the subroutines which combine to define the CLRBUF subroutine;

FIG. 137 is a flow chart illustrating the subroutines which combine to define the CONV subroutine;

FIG. 138 is a flow chart illustrating the subroutines which combine to define the MAPDI subroutine;

FIG. 139 is a flow chart illustrating the subroutines which combine to define the VIDKEY subroutine;

FIG. 140 is a flow chart illustrating the subroutines which combine to define the READNX subroutine;

FIG. 141 is a flow chart illustrating the subroutines which combine to define the KBLINE subroutine;

FIG. 143 is a flow chart illustrating the subroutines which combine to define the CHKSAV subroutine;

FIG. 144 is a flow chart illustrating the subroutines which combine to define the TRNFLD subroutine;

FIG. 149 is a flow chart illustrating the subroutines which combine to define the MKRBI subroutine;

FIG. 151 is a flow chart illustrating the subroutines which combine to define the MB2KR subroutine;

FIG. 152 is a flow chart illustrating the subroutines which combine to define the COMM subroutine;

FIG. 161 is a flow chart illustrating the subroutines which combine to define the RDPREC subroutine;

FIG. 172 is a flow chart illustrating the subroutines which combine to define the INTPOP subroutine;

FIG. 175 is a flow chart illustrating the subroutines which combine to define the IBSCN subroutine;

FIG. 176 is a flow chart illustrating the subroutines which combine to define the PVALCF subroutine;

FIG. 177 is a flow chart illustrating the subroutines which combine to define the PVALDC subroutine;

FIG. 178 is a flow chart illustrating the subroutines which combine to define the PVALNV subroutine;

FIG. 179 is a flow chart illustrating the subroutines which combine to define the PVALVF subroutine;

FIG. 180 is a flow chart illustrating the subroutines which combine to define the PVALD2 subroutine;

FIG. 181 is a flow chart illustrating the subroutines which combine to define the PVALPW subroutine;

FIG. 182 is a flow chart illustrating the subroutines which combine to define the PVALR6 subroutine;

FIG. 183 is a flow chart illustrating the subroutines which combine to define the PVALKF subroutine;

FIG. 184 is a flow chart illustrating the subroutines which combine to define the PVAL subroutines;

DETAILED DESCRIPTION OF THE INVENTION

The disclosure which follows will initially describe the application program generator and then describe the automatically generated application program. This program generator is essentially a dispatch which relies upon a lengthy set of initiate specific action. The editor mode, see FIG. 2, contains a loop whereby one of a plurality of functions can be performed after which there is a return for performing additional editing type functions. The graphics mode, see FIG. 3, contains a double loop. Each loop is programmed to return to the editor mode regardless of the routine instituted. The first loop involves control functions for performing tasks such as inserting and deleting characters. The second loop involves translation and processing functions for the information inputted. The question of which loop is to be used to perform a certain function is controlled in the graphics or character mode by an internal table is scanned to identify the character and hence the proper loop routine. Once the loop is selected, the program acts in accordance with instructions received from sub-function of the editor mode. When the EDCTLG is inputted, GRINT appears and the routine continues at H and L which accesses the table to one of the graphic subroutines. If EDCTLG is again inputted, the computer returns to the editor mode. So there is a double loop interacting which only displays information on the screen.

Figure 4:
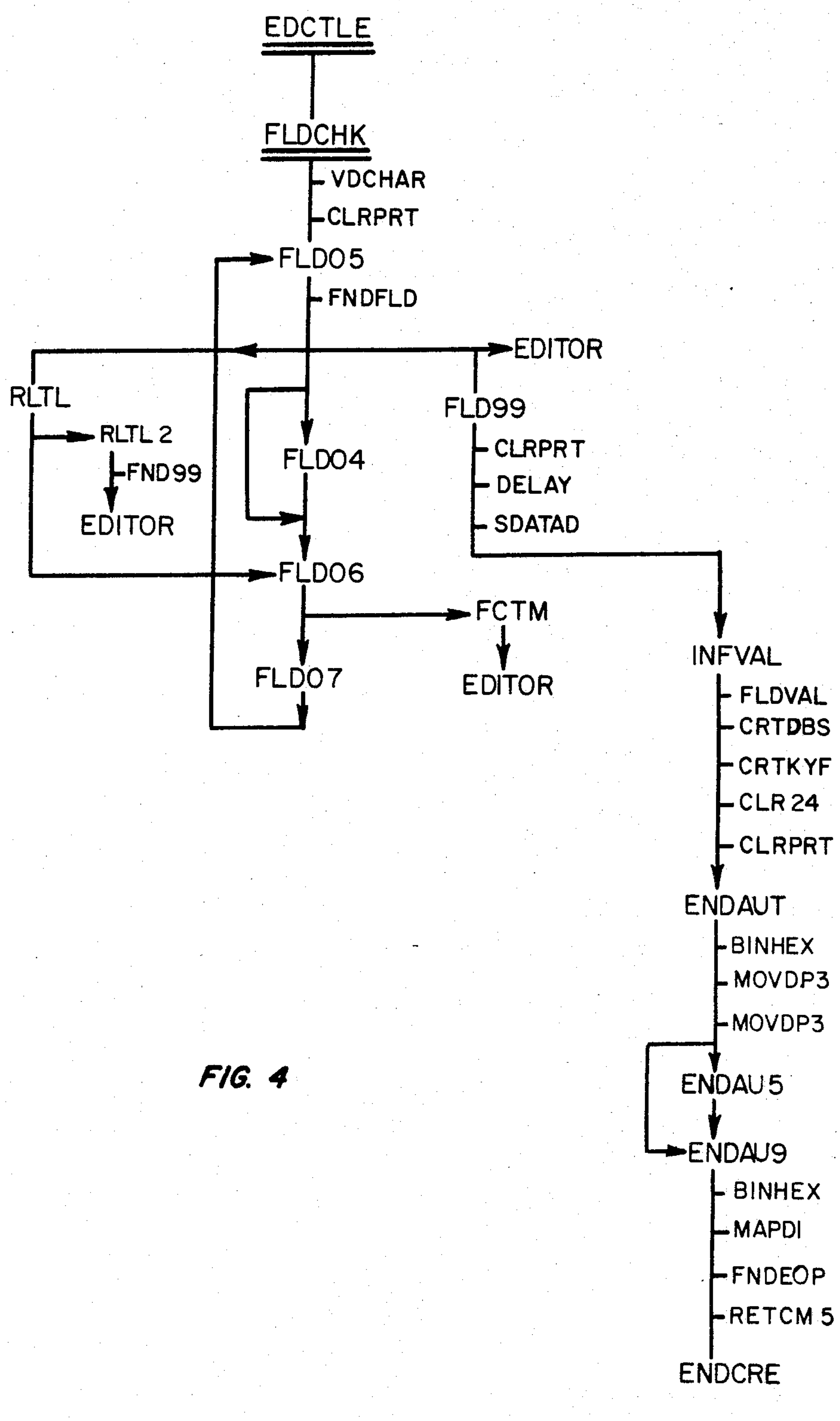
FIG. 4 is a flow chart illustrating the subroutines which combine to define the EDCTLE subroutine.

No complex actions relative to program generation occur until the editor control, DCTLE, see FIG. 4, is inputted. Upon inputting EDCTLE, the actual program generation process is instituted. FIG. 4 presents the actual creation process from start to finish. In this creation process, the program enters the field check mode, FLDCHK, which basically validates the inputted information now displayed on the screen. In fact, a key advantage of the automatic programming generator, described herein, is to insure that all inputted information is validated prior to processing.

Once the foregoing has been completed, the program branches to EDITOR and FLD99, from which point it flows through the second and third stages of program generation. The second stage is the information validation branch, INFVAL, through which field validations are inputted in correct locations. The program next specifies the type of data which can be placed into those valid fields. The third stage of program generation is called ENDAUT, and it terminates the loop and determines the size of the program. The last stage amounts to simple housekeeping maneuvers prior to dumping the generated application program off on a disk.

As field mode is entered, the computer first performs some housekeeping functions and then flows into one of the most commonly used subroutines, FNDFLC. This is the subroutine employed to (1) retrieve information previously on the screen; and (2) begin the creation of parameters (the length of the fields, the location of the fields, the starting position of the fields on the screen). All of these parameters are completed by AUTOGRAMMER without further operator input. The progress of the program may be monitored on the screen because the field which the program is completing is highlighted in reverse video. The program, however, operates so quickly and efficiently that, while the operator perceives the gist of the computation, he is unable to appreciate the individual steps through which the program builds the parameters.

The INPVAL subroutine includes a loop adapted to display a message on the screen informing the operator of the total number of possible input validations. By depressing the F1 key, the message is displayed. The program determines the number of validations previously inputted, the nature of those validations, whether the operator committed an error by inputting contradictory validations, whether the validations are indeed valid, and finally, informs the operator of the existence and nature of any operator committed errors. Once a given field is completed, the program acknowledges the validity thereof and proceeds through another subroutine TRNVAL adapted to reverify all the information that was inputted and then transfer it into a table contained within the application program. This second validation is necessary to eliminate the possibility of inputting contradictory validations. Each validation might be individually proper, but two of the parameters taken in combination might contradict one another.

When the program flows to the point marked GETVAL, it may proceed to MAXVAL which is a routine indicating the maximum number of validations have been exceeded and the computer is therefore terminating the validation table and informing the operator that a particular field is completed. However, if the maximum number of validations has not been completed, the screen displays a message that it is adding the input to the validation list and reprinting the list to include all inputted validations. The program then reaches PRVLST which is a subroutine adapted to display the updated list of validations, locate the position of the cursor and reset the cursor. Finally, the GVAL subroutine may be employed to retrieve another validation.

At this point, it is possible that the maximum number of validations has again been reached, so the program moves to TRNVAL. If the maximum has not been exceeded, the program proceeds to GETVA3 which checks the quality of the validation and displays an error message if the validation is improper, delays the message for a sufficent period of time for the operator to read it, clears the screen, and restarts the loop. If the validation was proper, the computer proceeds to SETVAL which fixes that validation as part of the validation table and returns to retrieve the next validation, etc. The computer will remain in this loop until it acts on all the inputted information which has been arbitrarily set at a maximum of twenty validations, some of which are contradictory, if taken in combination. AUTOGRAMMER eliminates possible errors prior to creating the application program by not permitting the entry of contradictory or invalid validations. When the operator desires to correct the field, it is placed into memory, the cursor is returned, the validation display screen is cleared, the next field is retrieved and highlighted in reverse video, another set of input validations are retrieved, the display is again reverse highlighted to return it to the normal condition, and the program loops thereabout until all input validations have been completed. The object of using a highlighted field to inform the operator which field is being processed, rather than the numbering of fields as is commonly done in other programs, is to allow the operator possessing little computer programming knowledge to operate the program. When all fields have been validated, the program moves to the TRNVAL subroutine.

It should be noted that most of the names applied to the routines are meant to connote their function. TRNVAL, meaning transfer validations, includes a subroutine TRNVA5. The suffix "5" indicates an early location in the program. Another subroutine of TRNVAL is TRNV99 wherein the suffix "99" signifies the last location in the routine. After the 99 subroutine is completed, another routine will be called. Intermediate numbers are used when the mid-point of the routine is entered. The higher the number, the closer to the end; the lower the number, the closer to the beginning.

Note further, when the program enters a field validation routine, it encounters different classes of validations; interpretive validations and absolute validations. Absolute validations, such as left justify, are accepted by the program without further operator input. However, interpretive validations, such as computed field values, requires further information. The program uses the INLOOP subroutine to obtain that information i.e. field specifications or the location of field validations. In summary, the program first obtains all validations. Absolute validations are processed immediately. The program returns for more information with interpretive validations.

All validations are checked in the most expeditious and efficient manner. For instance, interpretive validations are first tested on a byte-by-byte basis. If the whole byte is found to be valid, then it is possible to proceed to test the next byte. Only if the byte test returns with an invalid response is it necessary to check the information on a bit-by-bit basis.

As the program completes a field validation, all of the information inputted by the operator is displayed on the screen. Validating a field means (1) the parameters have been determined to be proper; and (2) the operator has supplied the necessary information about the scope of the field. The program then flows into a data base creation routine, CRTDBS, which simply clears the bottom line of the screen, locates the name given to that data base at the beginning of the program, completes the parameter list, and opens and closes the file. Essentially then, the program obtains all the information that was previously inputted relative to the number of fields and the total length of the fields then adds that information to the parameter list. Note that this does not imply that the program is actually placing anything in the data base, it is merely allocating space for records which will be inputted into the data base later.

The program is now able to create a key file which involves basically the same process as was used to create the data base. The only difference is that the length of the first field in the key file determines the length of that key file (actually the length of the first field plus two bytes is the length of the key file because two bytes are used for a pointer). At this point, the message "creating application" is printed. The computer proceeds into a BINHEX subroutine which converts numbers from binary to hexidecimal. The subroutine ENDAUT computes the size of the program based upon the validations and upon the known length of the subroutines. The result is a binary number for the beginning and the end of the field. The difference between the beginning and ending values is converted from a binary to a hexidecimal value which the operating system can understand.

ENDAU9 essentially determines where AUTOGRAM started, where it is to go at the end of the screen, changes old memory to zeros and issues a return command. Finally, the computer moves to ENDCRE which returns to the operating system so that, for security, no trace of the program remains.

SInce the application program opens a data base and a key file, it is important that the break key operates exactly as desired. Whereas, the generation program uses the break key to halt a routine; depressing the break key with the application program running will cause trouble. While two files are opened, two control blocks are simultaneously instituted to prepare the key file and the data base file. A security analysis is also completed prior to reaching the screen menu.

The screen menu displays a choice of five functions for operator selection: (1) end the current search; (2) display a record; (3) modify a record; (4) delete a record; or (5) add a record. Each of these menu functions has its own loop of subroutines. For instance, the program for adding a record contains the following subroutines: VDCHAR sets the cursor location; SETSCR saves the bottom line of the screen for system error messages; PRTMES prints a message stating the serial number, the operator generating the program, and the copyright notice; CLRDC1 clears a section of memory for transferring the data base and the key file to and from the disk; FLDCD1 is a block for storing data that is not as yet ready to go into the previous memory. Whereas, the previous section of memory is controlled by this program and can be transferred from place to place. Continuing with the "adding" program, FNDRET locates the end of the names that are employed in the next routine and the parameter list is completed with the names for the key and data base files. The subroutine for transferring titles will take a previously created title and put it onto the screen descriptor and into memory. At this point, prompted fields and non-prompted fields have been created. Prompted fields are displayed, while non-prompted fields are not displayed until the application program is finalized.

By doing a read routine without paying attention to errors in the data base file, it is possible to determine the number of records contained therein. The routine is used to read the last record in the file; a locate subroutine determines the actual numerical value of the last record; CLRMM2 clears out space in the buffer memory; a delay subroutine provides sufficient time for the operator to read the sign-on message; and finally, the cursor is replaced. The menu items are then redisplayed and the input of a number, selects one of the five possible menu items.

In summary, ADDREC may be called to take the previously created RAM image, print the title, obtain information based upon the parameter list, clear the sreen after the display has been filled with information, return, replace that screen with a blank screen, and loop to the start of the subroutine for additional information. It is important to note that this relates to non-data base programs.

If a data base or key file has been created, a loop with essentially the same routine as previously described for the non-data base type programs is followed. The only difference arises if there is difficulty with the inputted data. The program will return and request that the operator retype the data. Otherwise, all the data on the screen is transferred to the field memory buffers and the subroutine SAVREC transfers the data on the screen to the buffer memory.

By depressing the escape key, the operator may perform one of the other menu functions. When the program accesses the INLOOP subroutine, it remains in that subroutine until the operator enters the escape command. Therefore, another function cannot be selected until the escape is initiated.

After ADDREC, the operator may decide to delete a record by moving to the second function on the menu, DELREC. The DELREC subroutine first sets the title, transfers the title to the screen, and obtains input for the key record of the first field on the screen. If the operator decides to escape because he actually did not want to delete a record, the program returns to the menu display. Otherwise, the program proceeds to DELRE3. In DELRE3 the scroll is set, a message is printed on the bottom part of the screen which asks whether the operator actually desires to delete that particular record. The response to this question must be yes or no. If a no answer is received, the computer moves out of the DELRE3 loop.

Even if a yes answer is received, the program requires a second affirmative response in order to actually delete the record. Obviously, this is a fail safe measure to insure no records are accidentally removed. If the second response answer is no, it returns and routes through the loop once again with another record. If the second answer is yes, the record is erased and the program returns to the start of the loop to determine whether it is desired to delete further records.

When the DELREC subroutine requests a response, the operator has three choices: (1) yes, the record identified on the screen is the one to be deleted; or (2) no, that is not the record that should be deleted; (3) no, the record is not the correct one, however, the one next to it may be the one that should be deleted. Therefore, the option exists of continuing the DELREC routine with the next record or the previous record.

The next menu function, MODREC, provides the operator with the ability to modify a record. Once again, the title and data is transferred to the screen. Then several options exist. The operator may abort the function, modify the previous record, or modify the next record. If the present record is the one to be modified, FNDREC locates the record. The program then accesses MODRE7 and INLOP5. Note that the INLOP5 branch does not allow the first field to be modified because that is the key field and the key field can only be modified by deleting the record. The exit point from MODREC is the abort sequence DSMENU. FNDREC is a self-contained subroutine which attempts to locate a specific record. If the record cannot be located, a message is displayed or a flag is set. When the program returns, at the end of the routine, it views the flags. If the flag is an error flag, the program will return to the beginning. If something is wrong, the program will select the correct error message.

Another menu function is the subroutine DISREC which displays a record. Again, the title is set and transferred to the screen. The subroutine obtains a key value from the INKEY subroutine. Depending on the input when the cursor is in its initial position, several possibilities exist: (1) a previous record may be displayed; (2) the next record may be displayed; (3) the display may be printed; (4) the menu may be returned; and (5) the data may be entered. If the data is to be entered, FNDREC requires the key file to be keyed in. The program proceeds through the subroutine where it finds the value in the key file, displays the value, locates the record and returns to DISRE5. The last file number is checked to determine if the maximum allowed number of files has been exceeded. If so, the appropriate message is displayed. If the first field was inputted and the operator desires to proceed, the arrow key is depressed and the program proceeds with the remainder of the data excepting the first field.

For a non-key field search it is necessary to clear more memory, transfer the record, read the next record, locate and display the record, possibly display an error (not located) message, compare the data to determine the similarity thereof, and finally, return to DISRE9 wherein the actual record is transferred to the screen. The program flows to branch to DISRE4 where additional information may be inputted and other records may be searched. However, if the search has been completed, there is a return to DISRE4. This means that all the information inputted in INLOP5 will be applied to the program to the next logical record that meets the requirements. If the operator desires to continue with the next record, the program will compare the records to the requirements, determine whether they are identical and print error messages if necessary. If the comparison is positive, the program proceeds to DISRE9 and transfers the record to the screen. If the comparison is negative, the program returns after displaying a message that the next record is incorrect. The option also exists of proceeding with adjacent records. If the present record, the previous record and the next record do not compare, the operator may search for a new key value by depressing the escape key.

At this point, the option exists of depressing a return or arrow key. If the return key is depressed, a key search is initiated; if carriage return is hit, the program proceeds to DISRE7 which locates the absolute record that was inputted at INKEY1 and returns. If the arrow key was depressed, the last field number is checked to be sure that the maximum number of fields has not been exceeded. Then END99 closes the data base and the key file. ENDCRE clears the screen, retrieves the current break factors and executes the supervisory command RST8 which returns to the system.

The foregoing is basically a description of the manner in which the application program is generated. These subroutines enable the generated application programs to stand alone. In other words, the AUTOGRAMMER allows even unskilled operator to write a program which accomplishes the operator's desires based upon (1) the data entered by the operator; and (2) the design graphics displayed by the operator on the screen. It differs from the commonly available generation routines which use thousands of BASIC subroutines, ask the operator a multitude of questions, and based upon the answers thereto, takes certain routines and patches them together. No new code is created. A simple recombination occurs. The final result of that type of generation technique is an aggregation of subroutines which must be used under the contol of a BASIC program. Furthermore, the aggregation of subroutines rarely fullfills the operator's wishes and never accomplishes the operator's desired goal in an efficient manner.

Moreover, these generation programs actually fail to generate a program. They merely recombine the internal subroutines of the basic program in combination with some data tables. These types of program generation schemes are more aptly denominated "program reorganizers." In contrast thereto, the operator does not talk to the computer in the present invention. The operator merely supplies the computer the name of the program to be created and the same information he otherwise would provide a programmer writing a program. The operator uses no syntax. AUTOGRAMMER commands the computer to scan the information displayed on the screen and analyze it. For instance, once the beginning of the field has been marked, AUTOGRAMMER views the field and locates the end. Then AUTOGRAMMER calculates the distance between the characters, creates the necessary field length internally, moves the cursor to that location, inputs data on a character-by-character basis until the end of the field is reached, takes the field, and transfers that field without any operator input. It's completely syntax free from the operator's standpoint. The only questions that must be answered by the operator are the validations.

As an example, suppose the operator is working in a bank. A customer enters to borrow some money and a re-payment schedule must be calculated. With previous program generators, in order to perform this calculation, the banker would have to command the computer: "Go to field number 22 which is equal to field number 16 times field 12." The banker would therefore be required to know what the field values are, the location of the field as well as the field number. In contrast thereto, with the program described in the instant application, the operator merely uses the cursor control to graphically display a field and the program then locates that field. The operator indicates the computed field and the field is highlighted in reverse video. The program requests: "Do you want an absolute number of field?" the operator might reply: "Field." The program returns to the beginning and displays a message as to the field number. The operator informs AUTOGRAMMER of the particular field without reference to a numerical value and the program then requests the type of function to be carried out with that field. The operator may say: "Add." AUTOGRAMMER performs the addition. The syntax free operation of AUTOGRAMMER places it generations ahead of even the most expensive and sophisticated generation programs available for main frames.

Perhaps the most advanced of those generation programs is the MARK V. It is not designed for the business user, but for programmers possessing knowledge of high level syntax. The generation programs function more as a compiler using a basic predesigned program and changing the language into machine language. Rather than writing a program, the generation programs merely convert the basic program to machine language to form an independent program. The programmer actually writes the program.

Another disadvantage is that these program generators are language driven. The operator must learn the language and its syntax. On the other hand, AUTOGRAMMER uses a visual creation process with no textual preparation. Rather than guiding the operator down a narrow path with a question and answer format, AUTOGRAMMER allows the operator the ability to freely form a program design through visual orientation. With AUTOGRAMMER, the computer interprets the operator's visual rather than textual input.

Additionally, there are some programs that generate interpreting code. These computers generate a basic program, but that program is only a subroutine based upon the high-level syntax of an operator. Instead of compiling the subroutines into machine language, another program called BASIC reads and executes the lines of code sequentially, thereby interpreting the subroutines as it progresses through the program. In contrast thereto, a compiler reads all of the code and converts it to machine language. Then an interpreter reads and executes on a line-by-line basis. These techniques are a stark contrast to AUTOGRAMMER which actually creates a stand alone program to efficiently manage the inputted data.

Another problem with program generation is that most micro-computers have a memory limited to about 64K. The so-called program generators use a module that may take up 30K. Thus, the biggest program it can generate is 34K. When a program generator must use a BASIC program and a BASIC interpreter, the computer quickly runs out of memory to handle the generated program. In contrast thereto, AUTOGRAMMER generates a machine language program that is very small, totally self-contained, with operator control only needed to input information. AUTOGRAMMER requires about 42K of memory. The application program generated by AUTOGRAMMER, although it may vary in length, usually only requires about 20K to 24K. The part of the program that needs the most memory is the math package. Using the add, subtract, multiply and divide functions for numerous fields contained in a data base and key file will result in a relatively large application program (up to 24K or 26K). If no data base is used, however, a math package is not needed and the generated application program may be as small as 10K.

Perhaps the most unique portion of AUTOGRAMMER is its ability to construct a language internally. Since AUTOGRAMMER does not require the language or syntax of the operator, it must have the internal ability to generate routines to meet the operator's needs. Therefore, it constructs a language internally which is primarily table driven using its own parameters. Initially, the table is totally blank. It stores bits and pieces of information and then internally interprets and executes the inputted information depending on the requirements of the operator. There are several large sections of memory which are cleared and then the information keyed in will vary depending upon the application of the program.

Based on the foregoing, there can be no doubt that the concept of a machine generated application program requiring no operator syntax is very desirable. The present invention therefore describes the first truly computer generated application program capable of use even with micro-computers.

Now that the major subroutines and general objects of the instant program have been highlighted, the following detailed description of the flow charts and individual subroutines will allow the reader to appreciate the truly innovative nature of the present invention.

I. The Automatic Application Generating Program

Figure 1:
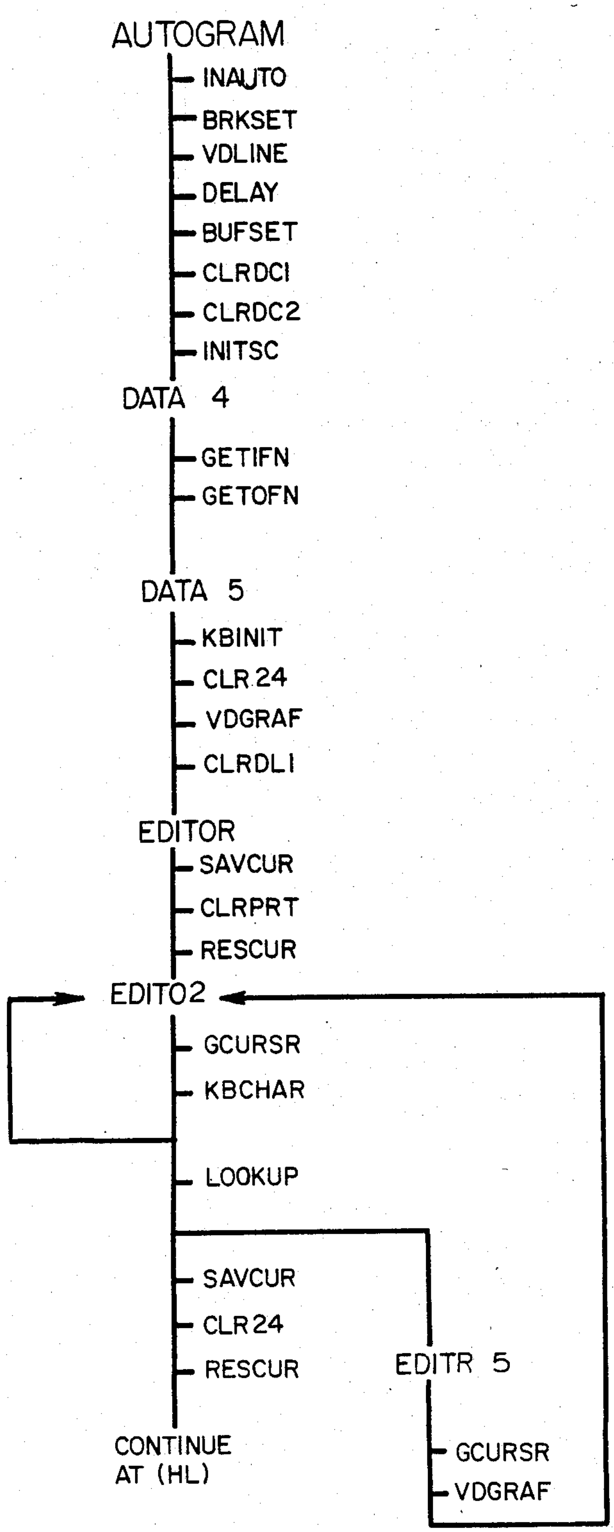
FIG. 1 is a flow chart illustrating the subroutines which combine to define the AUTOGRAM subroutine.

Referring now to FIG. 1, the automatic application generating routine, also referred to herein as AUTOGRAM, will be described in detail. It should be noted that the specific program language is appended hereto as Appendix A. This particular embodiment of the present invention is ready for use on commercially available Radio Shack TRS series micro-computers. It should be understood that the present invention contemplates being used on computers of all sizes and brands. A person of ordinary skill in the art can modify the present invention to take into account the differences in firmware between computers. The object of the following discussion is not to repeat every step of the program found in Appendix A, a lengthy task considering the number of program commands. Instead, an understanding of the present invention is more readily promoted by a general description of the routines and subroutines necessary to appreciate (1) the logical progression of those program commands; and (2) the intricacies and scope of the present invention.

Figure 5:
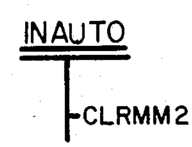
FIG. 5 is a flow chart illustrating the subroutines which combine to define the INAUTO subroutine.
Figure 6:
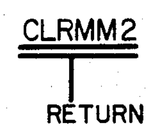
FIG. 6 is a flow chart illustrating the subroutines which combine to define the CLRMM2 subroutine.
Figure 7:
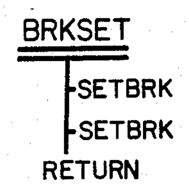
FIG. 7 is a flow chart illustrating the subroutines which combine to define the BRKSET subroutine.

With the foregoing in mind, the automatic application generating routine begins with the relatively short subroutine INAUTO, see FIG. 5, in which the computer is told to clear memory, CLRMM2, see FIG. 6, and then return to AUTOGRAM through RETURN. The next subroutine of AUTOGRAM is BRKSET, see FIG. 7, which performs two successive functions, each termed SETBRK. The first SETBRK routine retrieves the computer-stored break routine and the second SETBRK institutes a new break routine. In other words, the old break routine is found, saved and changed so as to form compatible with the internal language used by the generating program. SETBRK, see FIG. 8, consists of a RST8 command and a RETURN command.

The RST8 command is a basic computer-related supervisory call. By way of explanation, every computer contains software which controls its particular hardware. In order for a program to control the hardware of a computer, it is necessary to establish communication with the supervisory call, referred to herein as RST8, which will then translate the programmed computer commands to a hardware level for accessing the disk drive, etc. For example, in the BRKSET subroutine, the supervisor is first asked how it normally processes the break key. Then it is commanded to process the break key in a different and preferred manner. As a result, the computer no longer responds as originally programmed when the break key is pressed, but rather, control of the supervisory function for the break key has been appropriated by the instant program.

Figure 9:
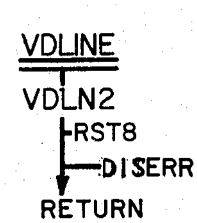
FIG. 9 is a flow chart illustrating the subroutines which combine to define the VDLINE subroutine.

The next subroutine of AUTOGRAM is VDLINE, see FIG. 9, which is another supervisory function commanding the computer to retrieve a line of keyboard input from its buffer memory so that the operator is unable to interfere with the manner in which the program is operating the hardware. Pursuant to a subroutine of VDLINE called DISERR, see FIG. 10, the retrieved keyboard characters are returned, the screen is set, the retrieved characters are validated, the computer supervisor is told to put the retrieved characters into its buffer memory, a delay period is instituted to enable the operator to read the retrieved characters now displayed on the screen, memory iscleared, and finally, the cursor is returned.

Figure 11:
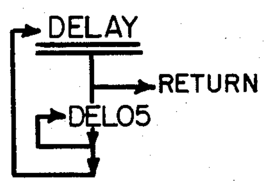
FIG. 11 is a flow chart illustrating the subroutines which combine to define the DELAY subroutine.

Following VDLINE is the subroutine DELAY, see FIG. 11, which simply interjects time delay in the program's program. DELAY is a short subroutine commanding the computer to loop about branch DELO5 until all of the keyboard characters which were retreived by the VDLINE subroutine are exhausted. The program then returns.

Figure 12:
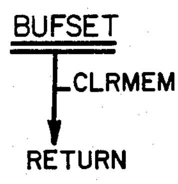
FIG. 12 is a flow chart illustrating the subroutines which combine to define the BUFSET subroutine.
Figure 13:
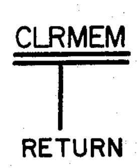
FIG. 13 is a flow chart illustrating the subroutines which combine to define the CLRMEM subroutine.

The next subroutine of AUTOGRAM is BUFSET, see FIG. 12, BUFSET is a program for clearing a specific portion of buffer memory. A subroutine of BUFSET is CLRMEM, see FIG. 13. CLRMEM is another short routine which clears a portion of buffer memory and returns.

Figure 14:
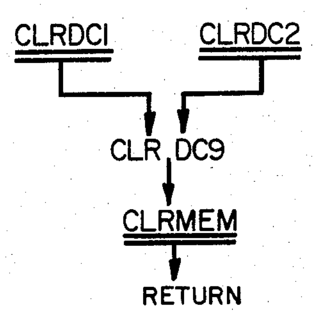
FIG. 14 is a flow chart illustrating the subroutines which combine to define the CLRDC1 and CLRDC2 subroutines.

The next two subroutines of AUTOGRAM are CLRDC1 and CLRDC2, see FIG. 14. CLRDC1 and CLRDC2 are identical routines which assist BUFSET in clearing buffer memory. The program proceeds through branch CLRDC9 to clear a specific portion of memory. Each subroutine sets parameters regarding the portion of memory to be cleared and then proceeds to the CLRMEM subroutine to actually perform the clearing functions prior to returning.

Figure 15:
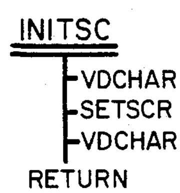
FIG. 15 is a flow chart illustrating the subroutines which combine to define the INITSC subroutine.
Figure 16:
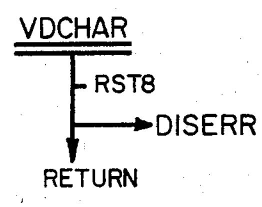
FIG. 16 is a flow chart illustrating the subroutines which combine to define the VDCHAR subroutine.

Initiate screen, INITSC, see FIG. 15, is the next subroutine of AUTOGRAM and is used to clear the display screen. VDCHAR, see FIG. 16, is the first subroutine of INITSC. VDCHAR includes the supervisory command, RST8; the subroutine DISERR, previously described with reference to FIG. 10; and a RETURN. Following VDCHAR, is the subroutine SETSCR, see FIG. 72, which saves the bottom line of the screen, for error message display. The final subroutine of INITSC is another VDCHAR, previously described with respect to FIG. 16, which sets the cursor to a prescribed location, usually in the 24th line.

Figure 17:
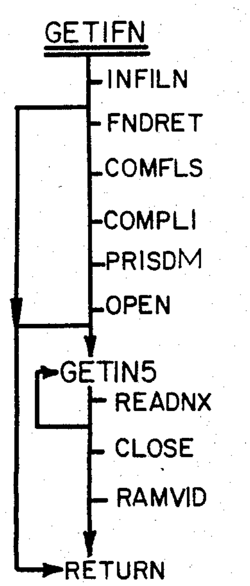
FIG. 17 is a flow chart illustrating the subroutines which combine to define the GETIFN subroutine.

Now that the "housekeeping functions" have been set, branch DATA4 is accessed. The first subroutine of DATA4 is GETIFN, see FIG. 17. The first subroutine of GETIFN is INFILN, see FIG. 18. INFILN is a command in which a file name is inputted. The next subroutine of GETIFN is FNDRET, see FIG. 19, which locates the end of the file name and returns. COMFLS follows, see FIG. 20, and it is a subroutine which takes thhe name of the file just located, places it into the control block and adds on necessary extension. COMPL1, see FIG. 21, is a subroutine which takes the length of the file and the remainder of the input and completes the parameter list. The COMPL1 subroutine adds additional parameters to the list until it is completed and then returns. The subroutine following COMPL1 is PRISDM, see FIG. 22, which prints a display message concerning the creation of a data base by using subroutine VIDKEY, see FIG. 139. The program then actually opens the data base with OPEN, see FIG. 47. If a file is opened for the first time, the program returns to AUTOGRAM. If the file name already exists, the program branches to GETIN5 which reads the next record with READNX, see FIG. 140. The program loops through READNX to obtain the input file name and to read the next name character-by-character, and continues reading until all the individual characters for a particular display have been read. After all the individual characters in a particular file have been read, the program passes from the loop to a close command CLOSE, and finally, transfers the file to the screen with RAMVID before returning to AUTOGRAM.

The next subroutine of AUTOGRAM, still referring to FIG. 1, is GETOFN, see FIG. 23, which is a subroutine similar to GETIFN in that a file name is retrieved and checked for validity. Should the name be invalid, the computer requests that it be restated. The name could be invalid if it exceeds a predetermined number of characters, if it uses reserved characters, or if it starts with a number. Once the name has been validated, the FNDRET subroutine, See FIG. 18, is accessed for locating the end of the line. Finally, COMFLS, see FIG. 20, is used to complete the file specifications.

This subroutine basically allows the computer to type in certain characters for the operator.

The next major branch of AUTOGRAM is called DATA5 which begins with subroutine KBINIT, see FIG. 24. KBINIT is a function of the supervisory hardware which resets the buffer memory to zero so the operator is free is start from scratch. Following KBI- NIT is the subroutine CLR24, see FIG. 25, which is similar to other clearing subroutines because it sets the scroll is protect the bottom line and calls on the VDCHAR subroutine, previously described with reference to FIG. 16, to place the cursor in the correct location. Because it is undesirable to remove newly displayed input from the screen, the entire screen is cleared only if the cursor is located in the topline, otherwise if the cursor is in the bottom portion of the screen, only the bottom line is cleared. VDGRAF, see FIG. 26, is a subroutine which outputs special characters through a supervisory call. For example, the cursor is returned to its home position at the upper left-hand corner of the screen. The final subroutine of branch DATA5 is CLRDL1, see FIG. 27, which clears a block of memory.

The program then moves to the EDITOR branch of AUTOGRAM which begins with the SAVCUR subroutine, see FIG. 28, wherein the program identifies the location of the cursor by checking the hardware registers and presenting the numbers which identify that location. The subroutine under SAVCUR is VDREAD, see FIG. 29, which is another supervisory call for reading a section of input. The next subroutine of EDITOR is CLRPRT, see FIG. 30, which first calls CLR24, previously described with reference to FIG. 25, to clear the 24th line, and second prints out a message through the PERMSG subroutine, described later with reference to FIG. 70 (usually an error message, although it could be instructional). Now the location of the cursor is known and the cursor has printed a message. The final subroutine of EDITOR is RESCUR, see FIG. 31, which returns the cursor to its original position by issuing a supervisory call through VDGRAF, previously described with reference to FIG. 26, and returning the cursor to the next location.

The next AUTOGRAM branch is labeled EDIT02. The first subroutine thereunder is GCURSR, see FIG. 32. GCURSR simply tells the supervisor hardware to cite the location of the cursor. If for some reason the supervisor is unable to locate the cursor, it returns with an error message; VDREAD, previously described with reference to FIG. 29, is employed to command the supervisory hardware to move on to the next location and then return. Since it is possible for the cursor to move into the system line and off the edge of the screen, VDGRAF is used to move the cursor to a desired location or to keep it within a particular area on the screen. Then the cursor position is read and if its within acceptable boundaries, it is returned. If however the cursor is not located within acceptable boundaries, it is repositioned and then returned.

The next subroutine under EDIT02 is KBCHAR, see FIG. 33, which is a request to the supervisory hardware to retrieve a previously inputted character by going to the character memory buffer and returning with that character. The loop following KBCHAR is employed for purpose of determining whether a character was retrieved from buffer memory. It is possible that no character was in the buffer memory and therefore nothing was returned. If KBCHAR has retrieved a character, it is placed into the subroutine called LOOKUP, see FIG. 34, which is another supervisory subroutine in which a high speed search through adjacent bytes of memory is conducted to determine whether another character of the same description can be located. The subroutine returns from the search, with or without the character, and provides specific information about where the character was or was not located. Whether or not the character is located; AUTOGRAM branches to EDITR5. The GCURSR subroutine, previously described with respect to FIG. 32, moves the cursor to the desired position, takes the character that was not located in the LOOKUP table and displays that character on the screen before returning to branch EDIT02 to locate the next character. VDGRAF, previously described with respect to FIG. 26, is the output subroutine for displaying the character.

If the character is located, the EDIT02 routine shifts to the SAVCUR subroutine, previously described with respect to FIG. 28, which locates the cursor, places that location in buffer memory, clears out line 24 through the CLR24 subroutine, previously described with respect to FIG. 25, and restores the cursor through the RESCUR subroutine, previously described with respect to FIG. 31. The program then continues with H and L.

Figure 2:
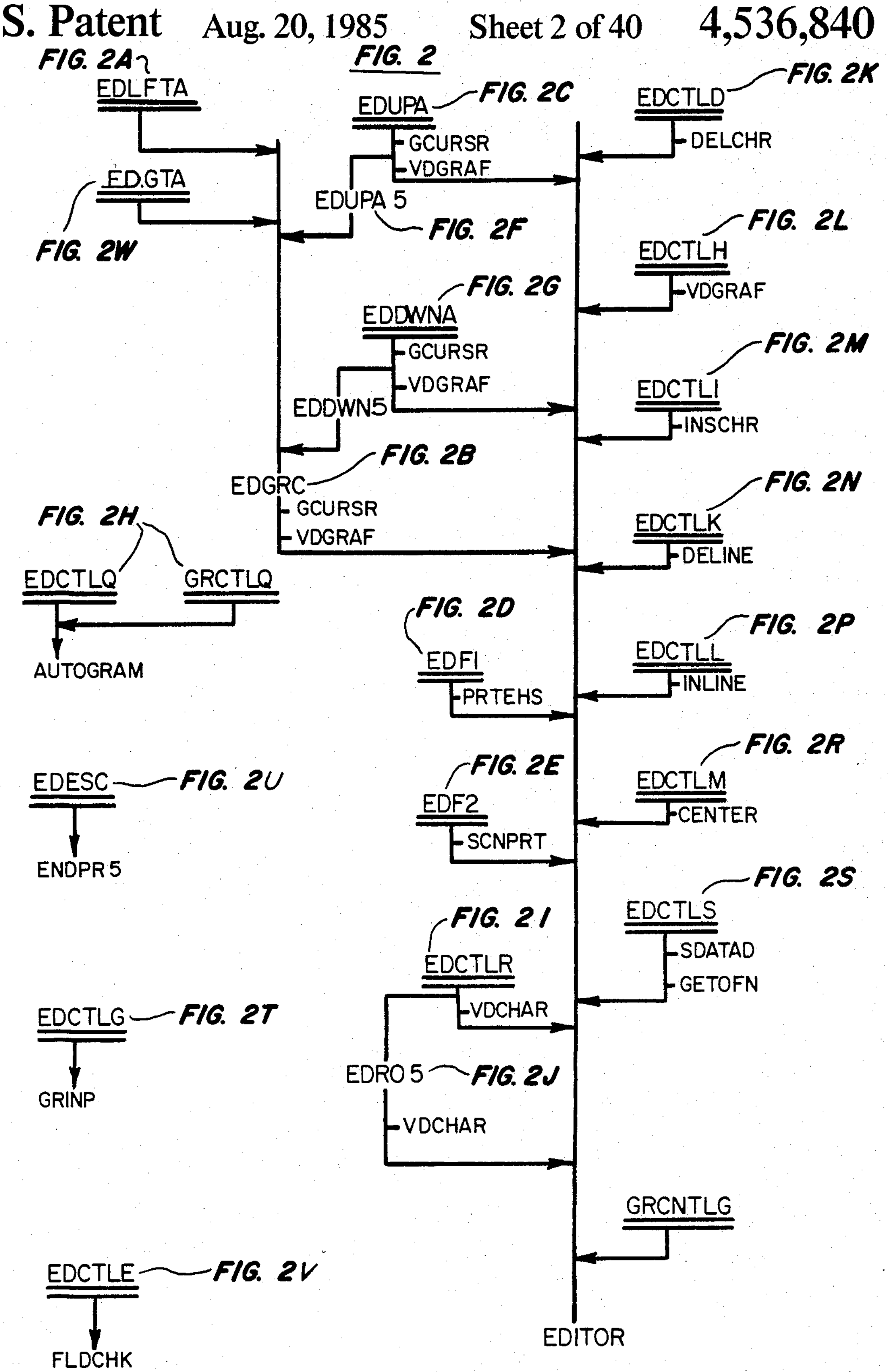
FIG. 2 is a flow chart illustrating the subroutines which combine to define the EDITOR subroutine.

FIG. 2 indicates the possible points at which the program can continue in the editing mode. If, for instance, the program continued at EDLFTA, see FIG. 2A, the input would be placed in a register and then shifted down to EDGRC, see FIG. 2B, which is an editor graphics control branch. That branch basically outputs the character by retrieving the cursor through GCURSR, previously described with respect to FIG. 32, and restores the cursor to its original value at the beginning of the EDITOR branch through VDGRAF, previously described with respect to FIG. 26, so that it is in position to retrieve the next character.

The EDUPA subroutine, see FIG. 2C, provides several alternatives. Before proceeding with an explanation note that the EDLFTA and EDGTA subroutines, see FIGS. 2A and 2W respectively, are designed to display a character on the screen and return to the EDITOR branch. The EDF1 subroutine, see FIG. 2D, accesses the PRTEHS subroutine and then returns to the EDITOR branch. The EDF2 subroutine, see FIG. 2E, does a SCNPRT, described below with respect to FIG. 46, and returns to the EDITOR branch. From the foregoing, it is obvious that there are many ways of returning to the EDITOR branch.

Depending on the cursor's position, the "up arrow," EDUPA subroutine of FIG. 2C outputs the character in either of the following manners: (1) to the screen through the subroutines GCURSR, previously described with reference to FIG. 32, and VDGRAF, previously described with reference to FIG. 26, and returns to the EDITOR; or (2) outputs through VDGRAF to the EDITOR branch. Again, the choice depends on the positioning of the cursor. If the cursor is at the bottom line of the screen, for example, the subroutine moves to EDUPA5, see FIG. 2F, at which point the cursor is transferred to the first line. If the cursor was at the 23rd line and it was necessary to relocate the position up on line, VDGRAF would allow the cursor to move up one line. However, if the cursor was positioned in the first line and it was desired to move the cursor up one line, a check of the cursor's position would result in the computer stating that further upward motion can only be accomplished by rolling around the bottom line to the line one above it (line 23), because the bottom line is reserved for message space. In other words, the determination of cursor movement is made for the operator. That is the function of the EDUPA5 subroutine. It wraps around the bottom line so that the line is reserved for message space.

The special processing of nearly every character by the editor mode of FIG. 2 results in a return to the EDITOR branch. The "down arrow" EDDWNA subroutine, see FIG. 2G, does essentially the same thing as EDUPA, including a check of limitations. The down arrow employs subroutines GCURSR, previously described with respect to FIG. 32, and VDGRAF, previously described with respect to FIG. 26, to backspace and move the cursor to a special location depending upon the line at which it is presently located.

Figure 35:
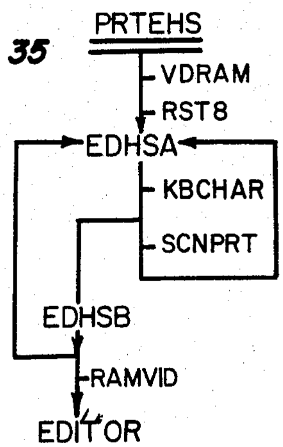
FIG. 35 is a flow chart illustrating the subroutines which combine to define the PRTEHS subroutine.

EDCTLQ, and GRCTLQ, see FIG. 2H, both return to the EDITOR branch of FIG. 1. EDF1, see FIG. 2D, is a program which prints and displays the editor help screen through subroutine PRTEHS, see FIG. 35, which is a message informing the operator exactly what can and cannot be done. PRTEHS includes the VIDRAM subroutine, see FIG. 36, which first transfers the video display to a special memory buffer in the RAM through a supervisory call; and second, returns to the EDHSA branch of the subroutine to select a keyboard key. If the F1 key is inputted, the PRTEHS subroutine follows branch EDHSB which re-displays the RAM just removed from the video screen and returns to the EDITOR branch. RAMVID, see FIG. 36, is a subroutine identical to the previously described VIDRAM subroutine. RAMVID uses a very large RAM which initiates a supervisory call to transfer the screen display to accessible memory because there is no access to the memory from the screen display itself. The subroutines RAMVID and VIDRAM of FIG. 36 are actually not subroutines because they actually determine the transfer to memory and accomplish the transfer when the F2 key is depressed. If the F2 key is inputted, the SCNPRT subroutine, see FIG. 46, of EDHSA is accessed to display the editor help screen. SCNPRT is a subroutine comprising of a single supervisory call, namely, a return command, RETCMD. The RETCMD, see FIG. 104, command tells the supervisor to dump everything that is on the screen to the printer.

The EDCTLR subroutine, see FIG. 21, of the EDITOR branch is a loop which is essentially a self-contained module. It scans the descision point through VDCHAR, previously described with respect to FIG. 16, to see if it's already in reverse video. If it is not, it outputs a character and returns to the EDITOR branch. If it is in reverse video, it outputs a character so that the next time EDCTLR is accessed, it is moved out of reverse video. This is a continuing process so that the first time the control is typed in, it is placed in reverse video and the next time, it is taken out of reverse video. If it is in reverse video, it proceeds to branch EDRO5, see FIG. 2J, through VDCHAR, previously described with reference to FIG. 16, and then returns to the EDITOR branch.

Figure 37:
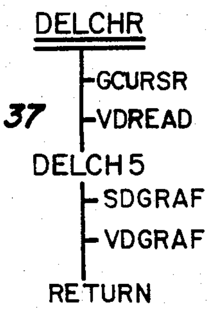
FIG. 37 is a flow chart illustrating the subroutines which combine to define the DELCHR subroutine.

The subroutine EDCTLD, see FIG. 2K, and a subroutine contained therein, DELCHR, see FIG. 37, are basically word processing functions which permit the insertion of characters while maintaining the remainder of the display on the screen. When a character is to be inserted, its position is noted, all the characters after that position are moved over one position and a new character is inserted in the open position. Likewise, when a character is deleted, the remaining characters move into the vacated position. More particularly, and viewing FIG. 37, the deletion of a character is accomplished by the following operations: (1) obtaining the current cursor position through subroutine GCURSR, previously described with respect to FIG. 32; (2) performing a VDREAD subroutine, previously described with respect to FIG. 29, which reads the line rather than just the character; (3) moving through a rather small branch called DELCH5 to determine the position of the character on that line; (4) deleting the character; (5) moving over the remaining characters; (6) returning the cursor to the beginning of the line; and (7) reprinting everything onto the screen in such a quick manner that it is impossible to determine the individual performance of the operations.

The foregoing deletion of a character is accomplished through a subroutine of branch DELCH5 called SDGRAF, see FIG. 38. The SDGRAF subroutine is initiated by VDCHAR, previously described with respect to FIG. 16, which determines the position of the cursor at the beginning or the end of a line. If the cursor is occupying a valid position, the subroutine SNGRAF, see FIG. 73, uses the subroutine VDGRAF previously described with respect to FIG. 26, to return with the cursor position. The program then flows to the SDG03 branch to determine the correct cursor location and loop through this branch several times depending upon the number of characters inputted. When all the characters have been validated and located on a particular line, those characters are printed and displayed through the previously described subroutines VDCHAR, SNGRAF and VDCHAR. The subroutine ends by returning the cursor to its correct position. In other words, the subroutine first loops through branch SDG03 to move the characters over. After completing the character relocation, the subroutine goes to branch SDG05 and replaces characters in the vacated positions. Finally, it determines that it has completed the process and replaces the cursor.

Another editor control subroutine is EDCTLH, see FIG. 2L, which takes single characters and commands VDGRAF, previously described with respect to FIG. 26, to display those characters on the screen. Again, it is a hardware function causing the cursor to move to the upper left-hand corner of the display screen.

Figure 39:
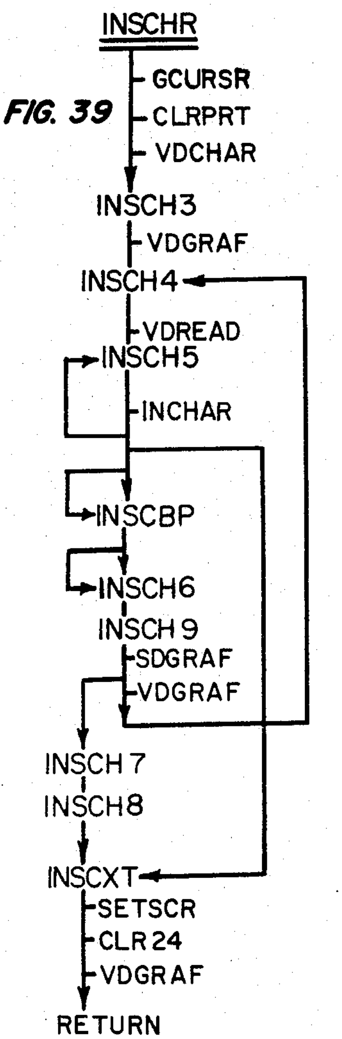
FIG. 39 is a flow chart illustrating the subroutines which combine to define the INSCHR subroutine.

Another FIG. 2 (editor mode) subroutine is EDCTLI, see FIG. 2M, which includes the single subroutine INSCHR, see FIG. 39. EDCTLI is a subroutine similar to DELCHR, see FIG. 37, in that a character is first referenced, the bottom line of the screen is cleared, and a message is printed on that bottom line informing the operator that the program is now in the character mode. Unlike DELCHR, however, a character is not deleted every time the subroutine is called. With the INSCHR subroutine, any number of characters can be inserted while the cursor remains stationary. Referring to FIG. 39, the cursor is first placed in the desired location through subroutine GCURSR, previously described with respect to FIG. 32, and a message is displayed on the screen. So that the operator is fully informed prior to beginning this routine, the lines are read onto the screen through the CLRPRT subroutine, previously described with respect to FIG. 30, and the program moves to branch INSCH5, through subroutine VDCHAR, previously described with respect to FIG. 16. Branch INSCH5 obtains the character to be inputted and depending upon the length of the line, different branches may be followed. More than likely it will continue to branch INSCHBP wherein the character is inserted before the position. The program then moves to branch INSCH6 which is a simple logic routine flowing into branch INSCH9. The INSCH9 branch includes subroutine SDGRAF, previously described with reference to FIG. 39, wherein the characters are moved over a position. The next subroutine, VDGRAF, previously described with reference to FIG. 26, displays the characters on the screen. At this point, the program may return to branch INSCH4 in which a line is read in its new position. Branch INSCH5 then obtains the next character, and so on. Alternatively, if another control is inputted, the INSCHR subroutine branches to INSCH7 which clears the bottom line of the screen through CLR24, previously described with respect to FIG. 25; moves to the SETSCR subroutine, previously described with reference to FIG. 8, wherein the position of the scroll is set; and, returns the cursor through the VDGRAF subroutine, previously described with respect to FIG. 26. However, if an invalid character is inputted, there is a return to branch INSCH5 which requires the operator to input another character. Should a line be inserted in a blank space, the subroutine branches off to SDGRAF, previously described with respect to FIG. 38. In this instance, it is possible to exit in a quicker way than the reprinting of the entire line. In other words, wherever possible, the program loops arounds unnecessary code to find a quicker route.

The next two subroutines in the editor mode, EDCTLK, see FIG. 2N, and EDCTLL, see FIG. 2P, employ the DELINE and the INLINE subroutines, respectively. INLINE and DELINE subroutine are found in FIG. 40. These subroutines use what is called "a self-modifying code." After entering the subroutine, a common branch INDELN is reached. In INDELN, subroutine VIDRAM, previously described with respect to FIG. 36, inputs the current line on the screen. As previously described, the video display is stored in RAM. The cursor is positioned and saved through the previously described GCURSR subroutine see FIG. 32. It then proceeds into a MLTPLY subroutine, see FIG. 41, which basically goes to memory where the fact that there are 80 characters per line is known and then the particular line being inserted or deleted is inputted. For instance, if line 6 is being deleted, the routine multiplies the 80 characters by 6 lines and this sum is added to the current position of the cursor. Once this position is determined, branch INDEL4 will move the lines up or down, irrespective of whether an insertion or deletion of a line is occurring. It then proceeds to the subroutines under branch INDEL5, namely, CLRMM2 and RAMVID, previously described with reference to FIGS. 6 and 36, respectively. In these subroutines, the last line is cleared and the line is transferred back from RAM to the video. Finally the cursor is returned. If the cursor is on the first line of the screen, a line cannot be inserted. Whereas, if the cursor is on the bottom line of the screen, a line cannot be deleted.

Figure 42:
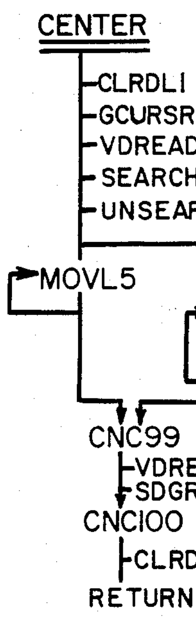
FIG. 42 is a flow chart illustrating the subroutines which combine to define the CENTER subroutine.

The next editing mode entry is EDCTLM, see FIG. 2R, which uses the subroutine, CENTER, see FIG. 42, to center characters on a line. The first subroutine of CENTER is CLRDL1, previously with respect to FIG. 27, which clears a buffer area DL1 for use as a line buffer. Next, subroutine GCURSR, previously described with reference to FIG. 32, locates the cursor position relative to the line that is being inputted. Subroutine VDREAD, previously described with reference to FIG. 29, reads the entire line into the DL1 buffer and th SEARCH subroutine follows, see FIG. 43. The SEARCH subroutine is performed by beginning at the start of the line, searching for and saving the first non-blank character. The cursor is returned and an UNSEAR subroutine, see FIG. 44, is enacted. To unsearch, the line is searched from the end until the first non-blank character is reached and the cursor is moved laterally by taking the difference between the search character location and the unsearch character location. The VDREAD and SDRGAF subroutines, previously described with reference to FIGS. 29 and 30 respectively, are then used, to set the position of the cursor before moving to branch CNC100. SDGRAF takes the memory buffer and displays the entire line on the screen in its adjusted condition. However, rather than moving the characters, the pointer is centered and the printing is initiated from that position. The line buffer is cleared so that it is ready for the next time it is needed and the SEARCH and UNSEAR subroutines are referenced relative to the direction they are to move. Since SEARCH and UNSEAR are limited to 80 characters apiece, if they do not find the character in a particular line, they display the line as a blank.

Figure 45:
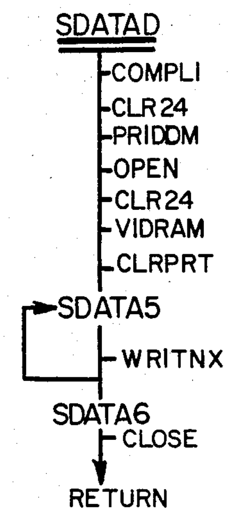
FIG. 45 is a flow chart illustrating the subroutines which combine to define the SDATAD subroutine.

The next editor control function is EDCTLS, see FIG. 2S, which is used to save data displayed on the screen, give it a new file name, and finally return to the EDITOR branch. The first subroutine of EDCTLS is SDATAD, see FIG. 45. The first subroutine of SDATAD is COMPL1, previously described with reference to FIG. 21, which completes a parameter list. The next subroutine is CLR24, previously described with reference to FIG. 25, for clearing the bottom line of the screen. The subroutine PRIDSM, previously described with reference to FIG. 22, is used to print a message stating that a data base descriptor has been created. The subroutine OPEN, see FIG. 47, is a supervisory call for opening a new file. Line 24 is then cleared through the subroutine CLR24. VIDRAM, previously described with referenece to FIG. 30, is used to clear line 24 and redisplay the original message. SDATAD then flows to branch SDATA5 to loop through subroutine WRITNX, see FIG. 48, which employs the previously described RST8 and DISERR subroutines to transfer the characters removed from the screen into a disk file. When the last character is transferred to the file, the program moves to branch SDATA6 and the CLOSE subroutine, see FIG. 49, which is another supervisory command to close the file and return for purposes of obtaining a new file name. Finally, the program returns to the EDITOR branch.

The next set of routines discussed are editor control subroutines which, like EDCTLQ previously described with respect to FIG. 2H, branch to portions of the program other than the EDITOR branch. For instance EDCTLG, see FIG. 2T, moves to subroutine GRINP which is located at the bottom of FIG. 3. These are essentially translation factors. For instance, when the character "A" is inputted, it is really desired to have that character "A" displayed on the screen. It is accordingly possible to have output characters of a graphics nature and of a character nature.

Editor escape, EDESC, see FIG. 24, includes only the subroutine ENDPR5, which is illustrated in FIG. 50. The first subroutine of ENDPR5 is SETSCR, previously described with reference to FIG. 8. Line 24 is then protected through subroutine SAVL24, see FIG. 51, save the characters on line 24. The line is cleared and printed using CLRPRT, previously described with reference to FIG. 30. The subroutine INCHAR, see FIG. 52, then prints out a message for which a yes or no response is necessary. If the response is yes, the ENDPR5 subroutine continues of branches ENDPR2 and END999 so as to close all files through subroutine CLOSE, previously described with reference to FIG. 49. The break key is then reset through VDCHAR, previously described with reference to FIG. 16, and SETBRK, previously described with reference to FIG. 8. However, if the response is no, the CLR24 subroutine, previously described with reference to FIG. 25, is initiated to clear line 24 and a RESL24 subroutine, see FIG. 53, is used to restore line 24 to its pre-existing condition.

The final non-EDITOR-returning subroutine of the editor mode is EDCTLE, see FIGS. 2 and 4. EDCTLE proceeds to subroutine FLDCHK, which instructs the computer to end the editing mode and begin the automatic program generating mode.

Figure 3:
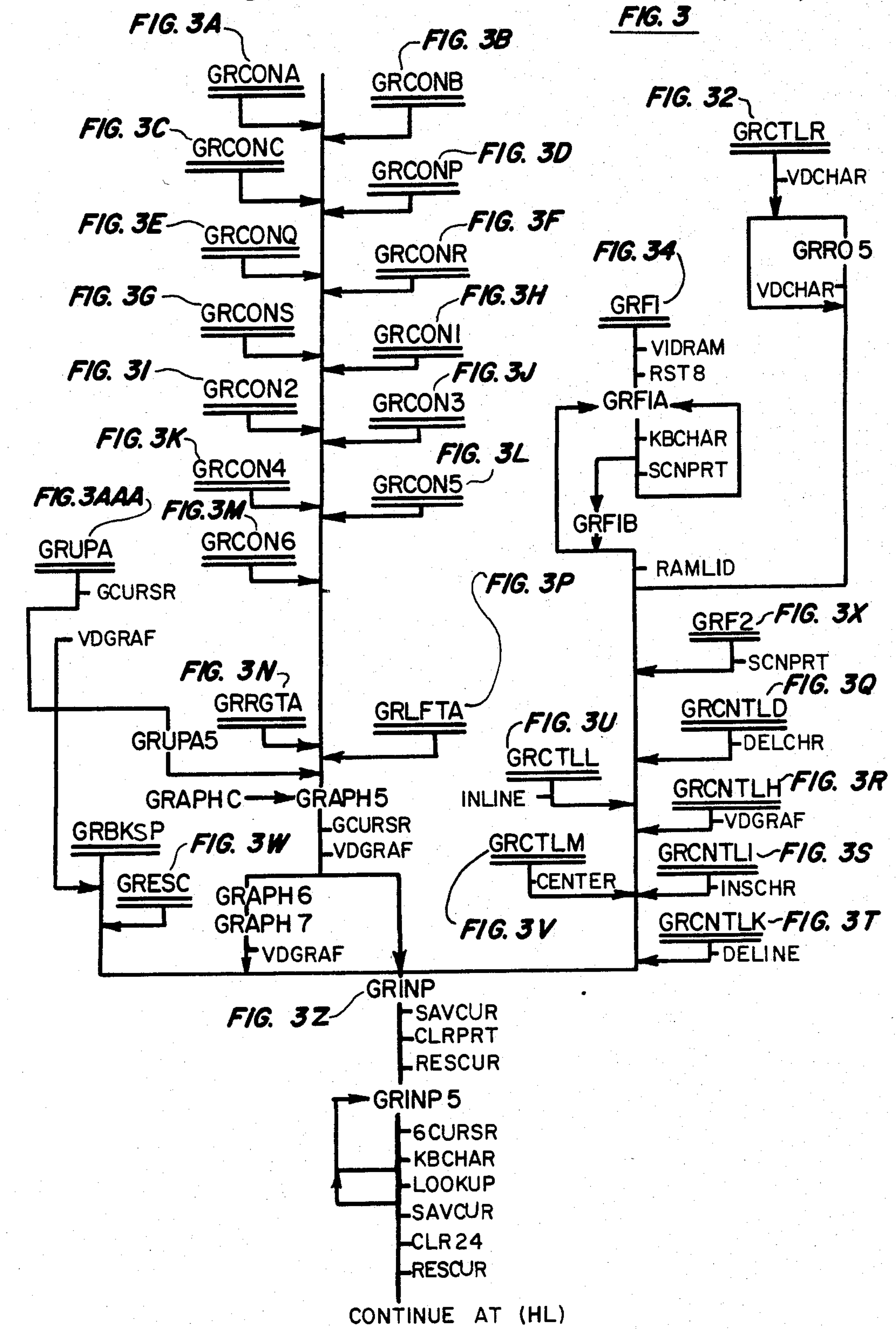
FIG. 3 is a flow chart illustrating the subroutines which combine to define the GRAPHIC subroutine.

Now that the subroutines of the editing mode of FIG. 2 has been described in detail, the parallel subroutines of the graphics mode of FIG. 3 may be expeditiously described in the following manner. Access to the graphics when in the editing mode of FIG. 2, inputting EDCTLG, see FIG. 2T, puts the editor into the graphics mode of FIG. 3. Pressing the F1 key then displays the graphics help screen in which the upper case letters (A to Z) and numbers (1 to 6) print various graphical characters, Pressing the F1 key a second time returns to the working screen on which the graphical characters may be entered to create the appearance of a printed form.

More particularily, each of the followinng routines represent a graphical character which can be printed onto the screen: GRCONA, see FIG. 3A; GRCONB, see FIG. 3B; GRCONC, see FIG. 3C; GRCONP, see FIG. 3D; GRCONQ, see FIG. 3E; GRCONR, see FIG. 3F; GRCONS, see FIG. 3G; GRCON1, see FIG. 3H; GRCON2, see FIG. 3I; GRCON3; see FIG. 3J; GRCON4, see FIG. 3K; GRCON5, see FIG. 3L; and GRCON6, see FIG. 3M.

The following chart relates the parallel graphics mode and editing mode subroutines. Since these subroutines are identical to the editing mode subroutines previously described, except for the different mode, further description is believed t be unnecessary relative to the graphics mode.

ing the next field position, it reads a character from the screen through the VDREAD subroutine, previously described with reference to FIG. 29, and attempts to determine if that character is: (1) the beginning of a field; or (2) an error. If the whole field is a single character, it is quickly processed and the program returns through branch FND07. At this point the program is being created, but the validations have as yet to be reached, so the field characters are unimportant. If the beginning or start of a field is found, flags are reset to indicate and save that fact for later reference. The computer then moves to branch FNB02. Note that the words, "start" and "finish" are used to indicate prompted fields, while the words "beginning" and "end" are used to indicate non-prompted fields. Since beginnings and endings can be mixed, branch FNB04 is entered where a whole character or an alpha-numeric character may be found to be in error. At this point, the invalid character follows an erro subroutine, FNDERR, in which the appropriate error message is displayed on the screen and then returns to the EDITOR branch. If no error is found, successive characters are continuously processed until the finish or end of a field is located. When the finish or end of a field is located, the computer either goes to return or into branch FNDEN9 and then RETURN. The decision point depends on whether it is the end of a field or the finish of a field; i.e., the computer will add one to the length of a non-prompted field or remain stationary if the field is a prompted field. In either case, the return is to the flag set from which it flows either by specification or defalut into branch FNB02 and returns. If, on the other hand, it is desired to end the computed field, the correct value is set and a return occurs. If the end has not yet been reached, an error message is displayed. After the error message is printed, see ERR5 through ERR12, the individual error causing the initiation of the FNDERR subroutine is displayed on the screen. This is accomplished by feeding the response of the tripped error indicator into branches FND99, FND100 and FND101. The VDGRAF subroutine, previously described with reference to FIG. 26, sets the cursor posi-

| EDITING MODE | | GRAPHICS MODE | | |
|---|---|---|---|---|
| SUBROUTINE | FIGURE | SUBROUTINE | FIGURE | FUNCTION |
| EDUPA | 2C | GRUPA | 3AA | Up Arrow |
| EDLFTA | 2A | GRLFTA | 3P | Left Arrow |
| EDRGTA | 2W | GRRGTA | 3N | Right Arrow |
| EDCTLD | 2K | GRCNTLD | 3Q | Insert & Delete Character |
| EDCTLH | 2L | GRCNTLH | 3R | Character Display |
| EDCTLI | 2M | GRCNTLI | 3S | Insert Plural Of Characters |
| EDCTLK | 2N | GRCNTLK | 3T | Delete Line |
| EDCTLL | 2P | GRCNTLL | 3U | Insert Line |
| EDCTLM | 2R | GRCTLM | 3V | Center Characters |
| EDCTLQ | 2H | GRCTLQ | 2H | Return to Editor |
| EDCTLR | 2I | GRCTLR | 3Z | Highlight In Reverse Video |
| EDESC | 2U | GRESC | 3W | End Creation |
| EDF2 | 2E | GRF2 | 3X | Return To Editor |
| EDFI | 2D | GRF1 | 3Y | Editor Help Screen |

Figure 54:
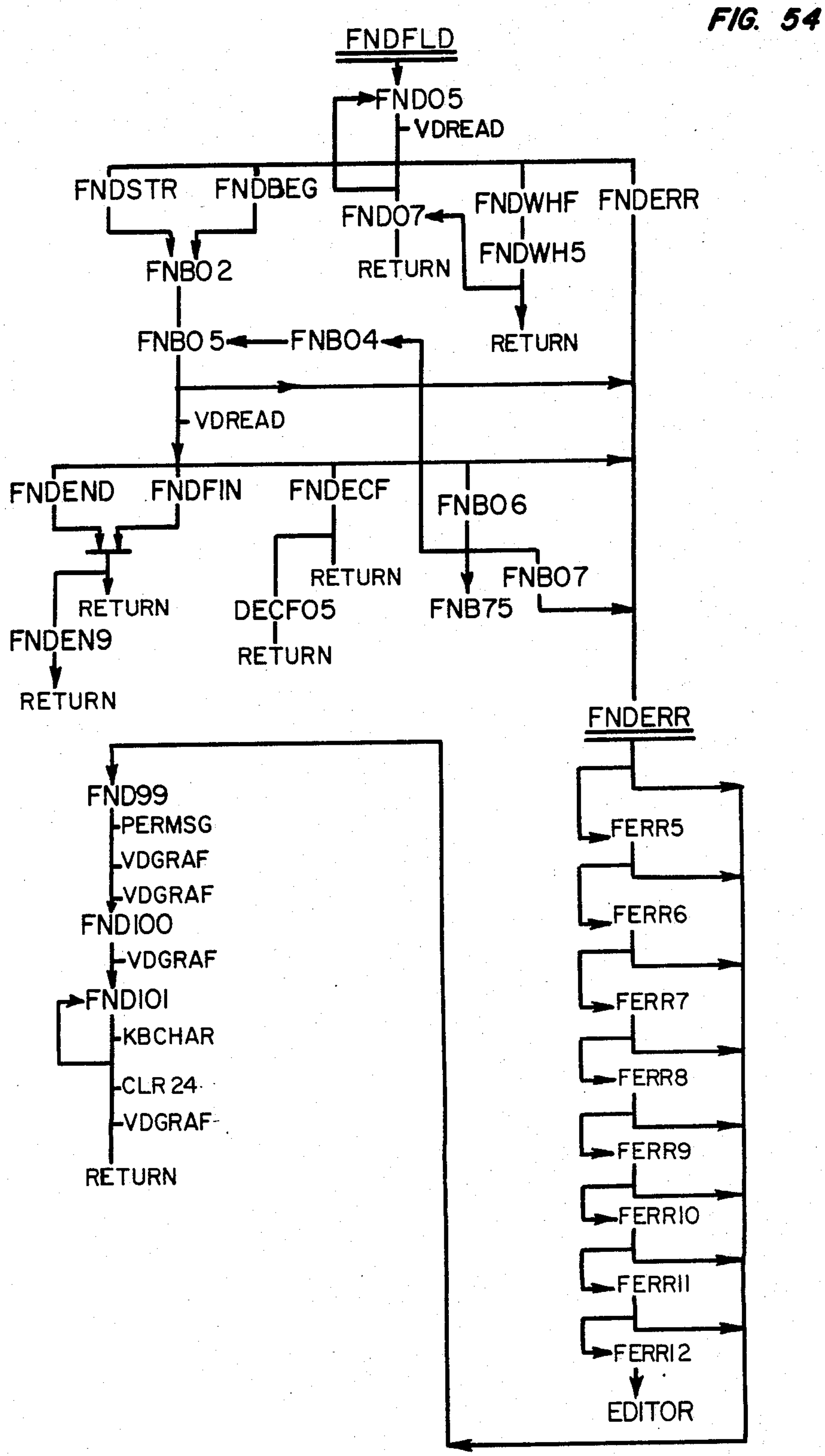
FIG. 54 is a flow chart illustrating the subroutines which combine to define the FNDFLD subroutine.

Referring now to FIG. 4, the FLDCHK subroutine flow chart is illustrated. The FLDCHK subroutine includes the VDCHAR subroutine, previously described with reference to FIG. 16, and the CLRPRT subroutine, previously described with reference to FIG. 30, which sets the cursor at the 24th line and prints out a message indicating that a check of the fields is occurring. As FLDCHK checks the fields, a subroutine FNDFLD, see FIG. 54, is called. FNDFLD scans the screen to determine the existence of fields. Upon entertion at line 24 and prints the error message. After receiving a keyboard stroke input, the cursor is automatically positioned at the point of error. The computer is essentially indicating the operator not only made an error, but informing the operator of where the error is located, and then awaiting the entrance of a keyboard character, see subroutine KBCHAR, previously described with respect to FIG. 33. The message also instructs the operator to press the spacebar in order to continue. When the spacebar is depressed, the cursor is placed at the point of the character which caused the problem and a return to the editor mode enables the problem to be corrected.

At this time, EDCTLE can again be inputted to reinitiate the process. If the keyboard character has not been inputted at this point, the computer will remain in the type loop. The FND101 subroutine is therefore simply a loop to insure that a character is inputted.

Note that while FNDFLD is the main subroutine of FIG. 54, the program may also enter FNDFLD under the FNDERR subroutine. Therefore, the FNDFLD subroutine is essentially a mini-interpreter to which a single character is forwarded and converted into a meaningful message which requires operator response. Also, encoded in the response from the FNDFLD subroutine is a description of the form of error message after which the program returns to the EDITOR branch or flows to branch FLD99, indicating that everything is proper. Alternatively, the EDCTLE subroutine of FIG. 4 may continue at branch RLTL. The RLTL branch indicates the record is too long, a function not available in the FNDFLD subroutine. The computer will therefore return, display the message that the record is too long and proceed to branch FND99, see FIG. 54. The program either returns to the EDITOR branch or flows to branches FLD06, FLD07, and FCTM prior to returning to the EDITOR branch. The FCTM branch indicates that the field count is too great.

It should be apparent that the errors handled by the FCTM branch are ones which the FNDERR subroutine is unable to handle. These represent errors which infrequently occur because the number of fields and the length of the records is almost unlimited. It was therefore deemed to be more efficient to handle each separately. Accordingly, FCTM is the general purpose error handling branch, while FNDERR is a very specific error handling subroutine. Therefore, after determining the number of fields and the length of records to be proper, the computer proceeds to branch FLD99 where subroutine CLRPRT, previously described with respect FIG. 30, clears the bottom line and prints the message. Then a data base descriptor file is created through subroutine SDATAD, previously described with respect to FIG. 45. The message remains for the period of time that a delay is set as previously described with respect to FIG. 11. Finally, the data on the display screen is saved by typing EDCTRS.

Figure 55:
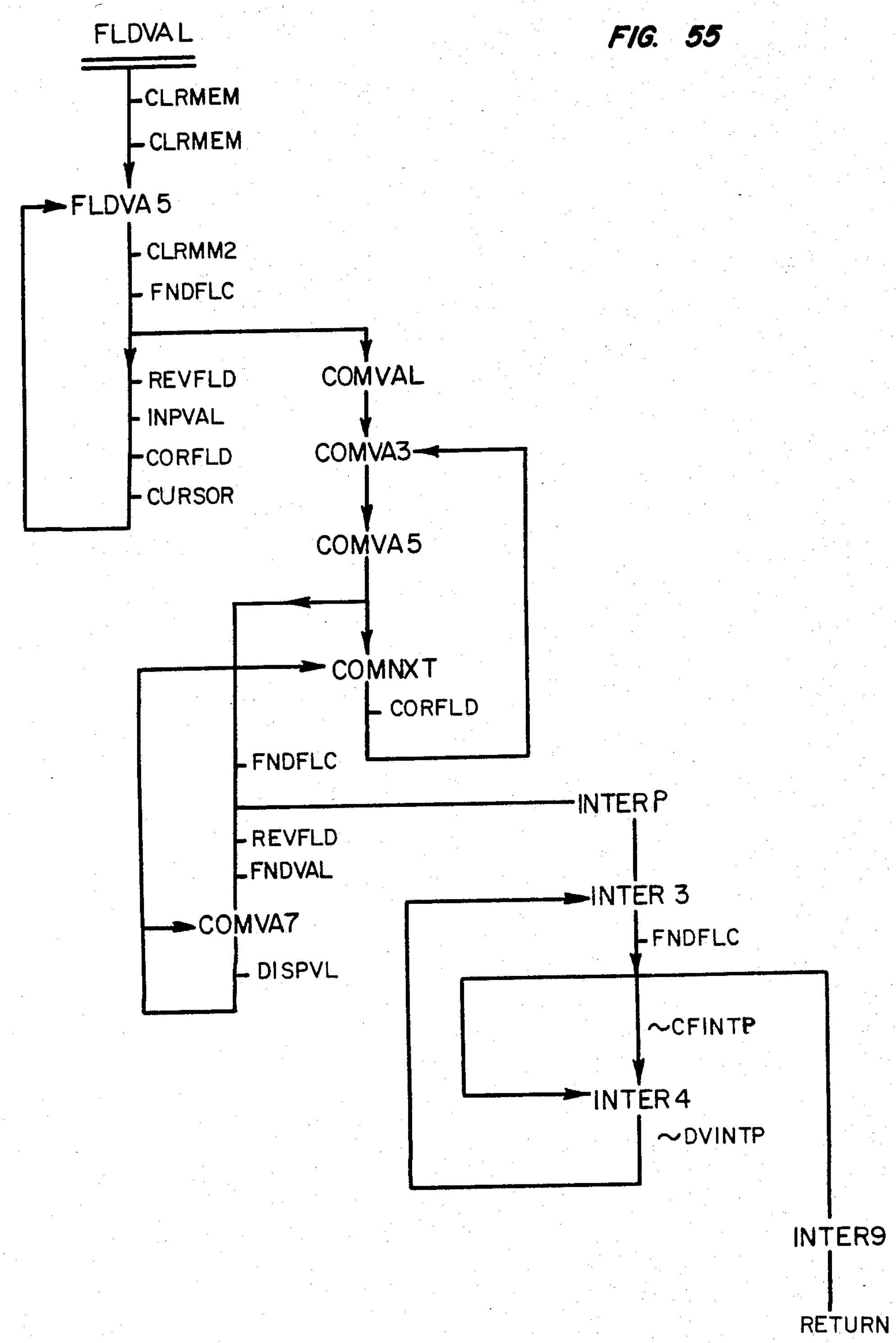
FIG. 55 is a flow chart illustrating the subroutines which combine to define the FLDVAL subroutine.
Figure 56:
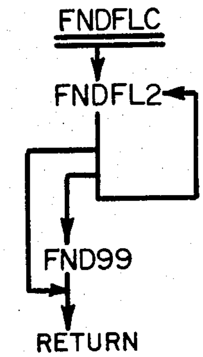
FIG. 56 is a flow chart illustrating the subroutines which combine to define the FNDFLC subroutine.
Figure 57:
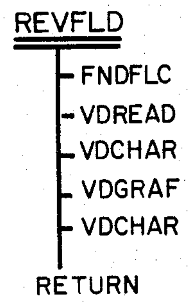
FIG. 57 is a flow chart illustrating the subroutines which combine to define the REVFLD subroutine.
Figure 58:
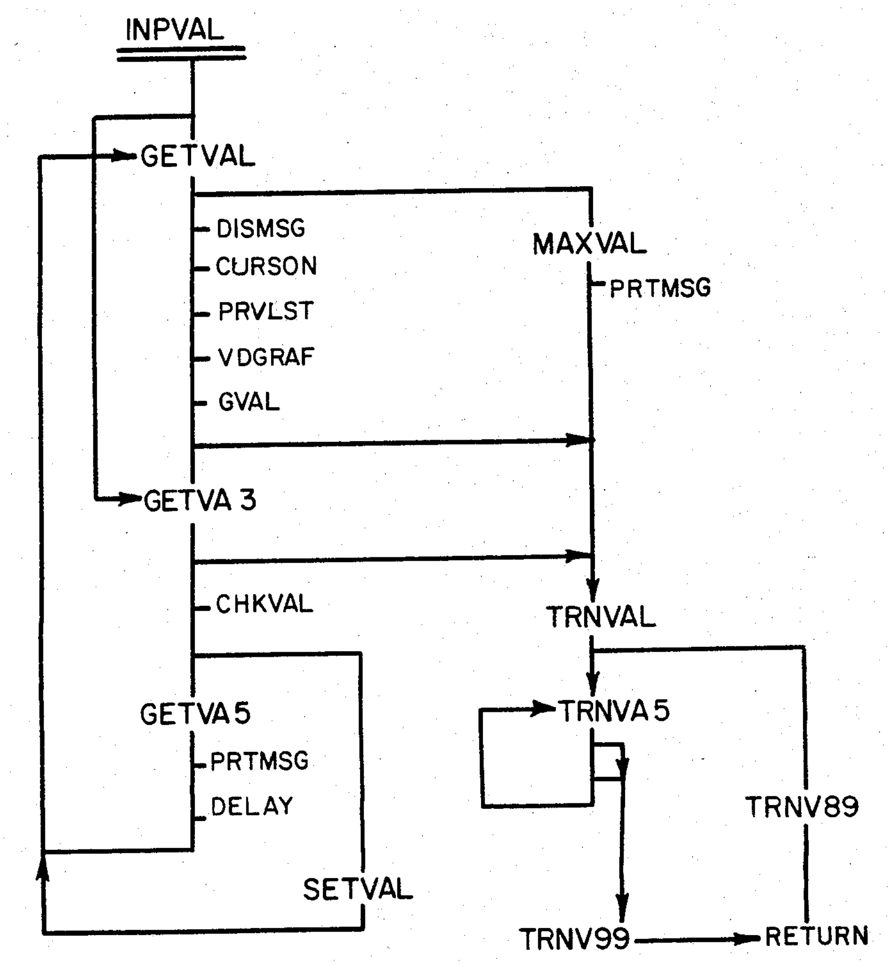
FIG. 58 is a flow chart illustrating the subroutines which combine to define the INPVAL subroutine.

The display screen that has been saved is forwarded to INFVAL, which is a field validation branch found in FIG. 4. The first subroutine under INFVAL is FLDVAL, see FIG. 55, FLDVAL is that part of the routine in which the computer is informed of the meaning of the field values and exactly what can be or cannot be typed into those fields. More particularly, FLDVAL permits the inputting of validations by first clearing memory pursuant to the CLRMEM subroutine, previously described with reference to FIG. 13. There are a couple of specific locations in memory to be cleared out, herein referred to as FLD5 and the location memory. Then the FNDFLC subroutine, see FIG. 56, is called for obtaining those field specifications created when the screen was examined. When the specifications are returned, the computer asks the questions: (1) whether that was the last field; and (2) whether a field was returned. If a field was returned, it continues straight down and reverses the video display of the field on the screen to highlight it. The FNDFLC subroutine searches through the field table to locate the field number, a number which is maintained internally. The FLDVA5 branch of FIG. 55, is continuously looped until all the fields in the field table have been completed. For instance, if a search is being conducted for FLD3, FLD1 through 99 are searched until an error message appears either: (1) indicating FLD3 was located; or (2) the program returns with no error message set. When the search returns with the field, all the specifications about the field are displayed, i.e., its location, its length, the field validations, etc. If the field has been located, the field is reversed pursuant to subroutine REVFLD, see FIG. 57. The subroutines under REVFLD are: FNDFLC, previously described with reference to FIG. 56; VDREAD, previously described with reference to FIG. 29; VDCHAR, previously described with reference to FIG. 16; VDGRAF, previously described with reference to FIG. 26; VDCHAR, previously described with reference to FIG. 16; and RETURN. It then returns to branch FLDVA5 and moves to the INPVAL subroutine, see FIG. 58.

Figure 62:
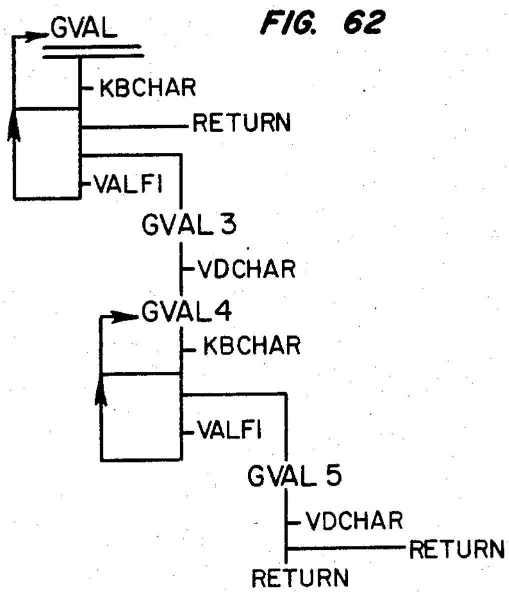
FIG. 62 is a flow chart illustrating the subroutines which combine to define the GVAL subroutine.

The INPVAL subroutine sets input validations. INPVAL first passes to branch GETVAL which essentially decides whether a maximum number of validations have already been set. If a maximum has not been set, a message is displayed which states "input validation," the cursor is moved into the correct position and the current validation list is displayed. The foregoing is accomplished through the subroutines: DISMSG, see FIG. 59, to display the message; CURSON, see FIG. 60, to move the cursor; PRVLST, see FIG. 61, to print the validation list; VDGRAF, previously described with reference to FIG. 26, to attain the current cursor position; and finally, GVAL, see FIG. 62, to perform a validation check.

Figure 166:
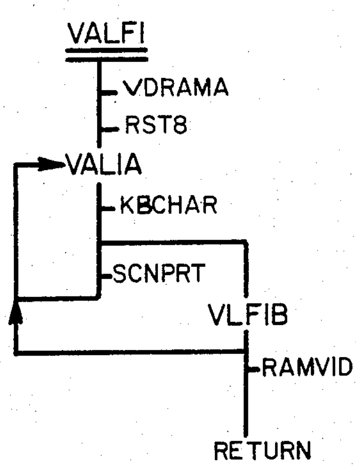
FIG. 166 is a flow chart illustrating the subroutines which combine to define the VALFI subroutine.

The first subroutine under GVAL is KBCHAR, previously described with reference to FIG. 33, which looks for keyboard input and continues searching until a keyboard character is inserted. KBCHAR is programmed to check for two input characters per validation. Therefore, the first keyboard character places the computer into a loop in which it checks to see if an F1 key was inputted at subroutine VALF1, see FIG. 166. If an F1 character was typed, the validations are displayed on the help screen until another character is inputted. If an F1 character is not typed, but rather, a valid character or an alpha character is typed, the program moves branch GVAL3 and through VDCHAR, previously described with respect to FIG. 16, prints the inputted character onto the screen and moves to branch GVAL4. In the GVAL4 branch, the second of the two keyboard characters is located. The program then loops thereabout until a character is inputted and displayed on the screen. At this point, the loop between the F1 key and the help screen becomes activated. For instance, to preclude the possibility of typing in the first character and the forgetting that that character was inputted, the F1 key will display the help screen. If another valid character is typed, the program goes to branch GVAL5, where that valid character is printed through a VDCHAR subroutine, previously described with reference to FIG. 16, prior to returning to INPVAL.

Figure 64:
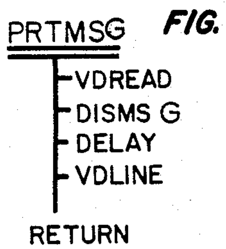
FIG. 64 is a flow chart illustrating the subroutines which combine to define the PRTMSG subroutine.
Figure 63:
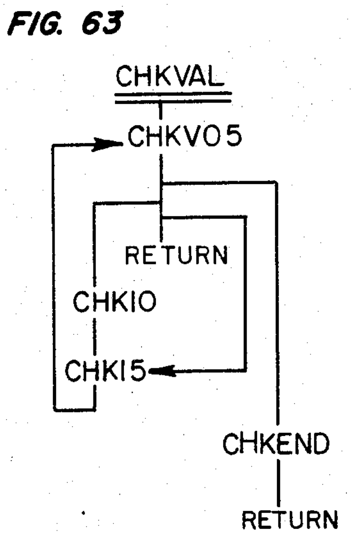
FIG. 63 is a flow chart illustrating the subroutines which combine to define the CHKVAL subroutine.

If the return was by a carriage return, branch GETVA3 of INPVAL is accessed. The GETVA3 branch first goes to subroutine CHKVAL, see FIG. 63, the purpose of which is, in general terms, to obtain validation of the two characters which were inputted. If the validation is proper, the validation is displayed on the screen and the program proceeds to process another validation. If on the other hand, the validation is improper, an error message is printed through the subroutine PRTMSG, see FIG. 64, the error message is displayed through the DELAY subroutine, previously described with reference to FIG. 11, and finally, the error message is erased and the computer returns for the next validation check of that character. The subroutine has two exits; (1) the MAXVAL branch which includes the PRTMSG subroutine, previously described with reference to FIG. 64; or (2) or the input of return.

Figure 185:
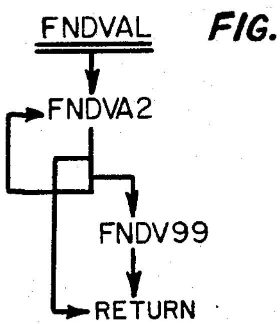
FIG. 185 is a flow chart illustrating the subroutines which combine to define the FNDVAL subroutines.
Figure 65:
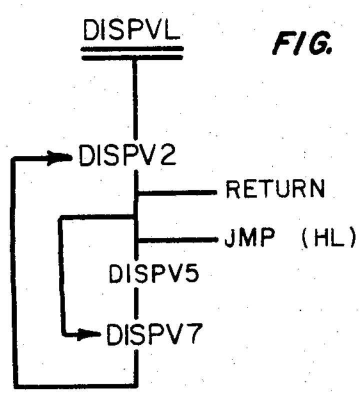
FIG. 65 is a flow chart illustrating the subroutines which combine to define the DISPVL subroutine.
Figure 167:
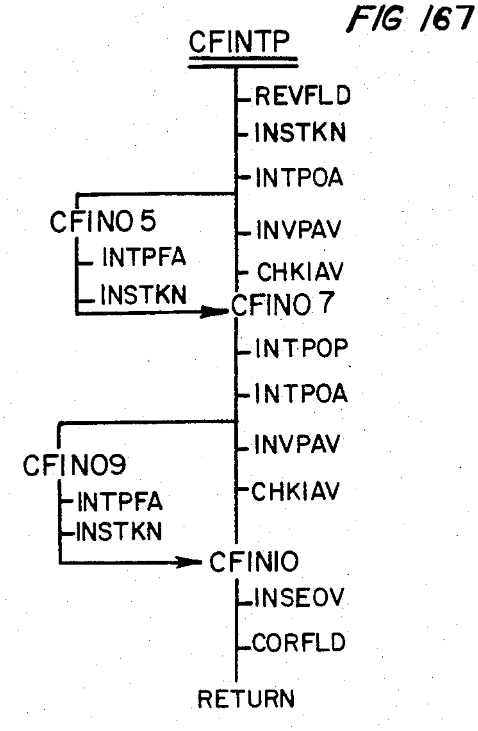
FIG. 167 is a flow chart illustrating the subroutines which combine to define the CFINTP subroutine.
Figure 168:
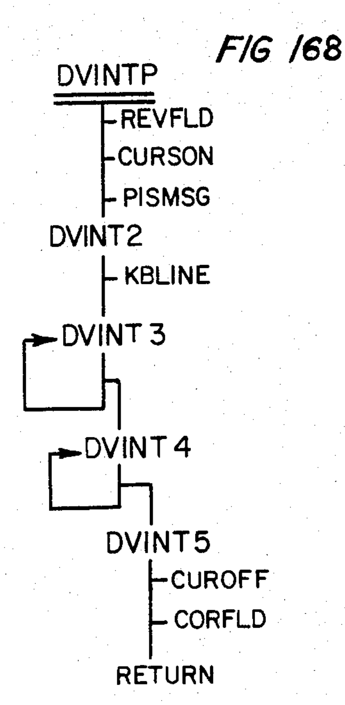
FIG. 168 is a flow chart illustrating the subroutines which combine to define the DVINTP subroutine.

From either the MAXVAL or the GETVA3 branches of INPVAL, the program enters TRNVAL. The TRNVAL subroutine transfers two input characters to the memory buffer that was previously cleared for the purpose of creating a string of characters for the program to decipher at a later time. The field which was reversed is now corrected and the cursor is replaced on the loop to locate another field. If another field is located, the loop is followed around once again. Finally, when all of the fields are complete, the computer moves to the COMVAL branch which stands for complete validation, see the subroutines FNDVAL and FLDVAL in FIGS. 185 and 65 respectively. The COMVAL branch performs various logic functions to determine whether the particular validation requires completion. If completion is necessary, the program performs the following operations: (1) follows the side loop to locate the field and obtain its specifications; (2) reverses the field; (3) locates the field validations previously entered; and (4) displays the field validations pursuant to the subroutine DISPVL, see FIG. 65. Subroutine DISPVL prints a message onto the screen and returns to branch COMVAL. This process is repeated until a field requiring an interpretive validation is located. It essentially looks at the type of validations inputted for all the fields and when one which requires additional information is located (such as a default value) it branches off into the INTERP branch, see subroutine FLDVAL in FIG. 55. The program moves from branch INTERP into the FNDFLC subroutine, previously described with respect to FIG. 56, to locate the proper field specifications, and if necessary, calls the computed field interpretive subroutine CFINTP, see FIG. 167, or the default value interpretive subroutine, DVINTP, see FIG. 168. Generally, the CFINTP subroutine will interpret the program's next function by calling subroutines INSTKN, INTPOA, INTPFA, INTPOP, CHKIAV, and INSEOV, respectively set forth in FIGS. 169, 170, 171, 172, 173, and 174. Subroutine DVINTP additionally calls subroutine KBLINE, see FIG. 141, to perform similar interpretive functions for a default value. This process is sequentially repeated for all of the fields; first for the normal validations, and then for the interpretive validations. In other words, it completes all of the normal validations prior to proceeding with the interpretive ones.

Figure 66:
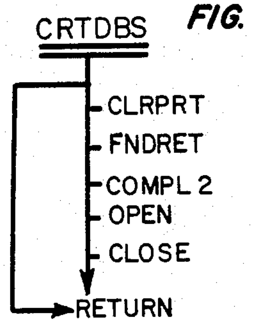
FIG. 66 is a flow chart illustrating the subroutines which combine to define the CRTDBS subroutine.

After returning from FLDVAL, the next subroutine is CRTDBS, see FIG. 66, which creates a data base. This is accomplished by calling the subroutines of CLRPRT, FNDRET, COMPL2, OPEN, and CLOSE, previously described with reference to FIGS. 30, 21, 47 and 49, respectively. CRTDBS will clear the bottom line through the subroutine CLR24, previously described with reference to FIG. 24, locate the end of the name that was originally inputted, complete the parameter lists, open the data base file and close the data base file.

Figure 67:
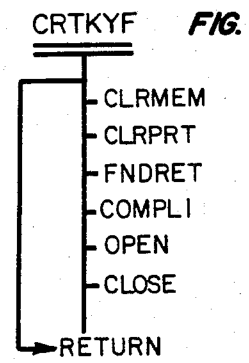
FIG. 67 is a flow chart illustrating the subroutines which combine to define the CRTKYF subroutine.

The next subroutine CRTKYF, see FIG. 67, follows essentially the same subroutine for the key file, as was followed by the data base creation subroutine, CRTDBS, described in the precedinng paragraph. The lone exception is that it must additionally clear some memory. There is actually not much difference between the CRTDBS and CRTKYF subroutines except for the names which are employed.

The computer then proceeds to the ENDAUT branch which first accesses the BINHEX subroutine, see FIG. 68. BINHEX is a program for converting numbers from binary to hexidecimal. During ENDAUT, the size of the application program is calculated based upon the validations and upon the known length of the subroutines. The result is a binary number for the beginning and a binary number for the end of the fields. The difference between the two values is converted from a binary to a hexadecimal value which the operating system can understand. MOVDP3, see FIG. 69, is the next subroutine in ENDAUT. MOVDP3 is a subroutine for placing those binary and hexidecimal numbers into a preset string which tells the operating system to save the program. Subroutine MOVDP3 is necessary to store the beginning and to store the end of the field.

The computer then moves to the ENDAU9 branch which essentially determines the point at which AUTOGRAM begins and ends through the BINHEX program, previously described with respect to FIG. 68, and a MAPD1 subroutine, see FIG. 138. It then takes the old memory, changes the old memory to zero through a FNDEDP subroutine, see FIG. 71, and issues a return command.

Finally, the computer jumpst to ENDCRE, which is the end of the creation phase. It sinply states the program is complete and returns the operator system so that, for security, no trace of the program remains.

II. The Generated Application Program

Figure 74:
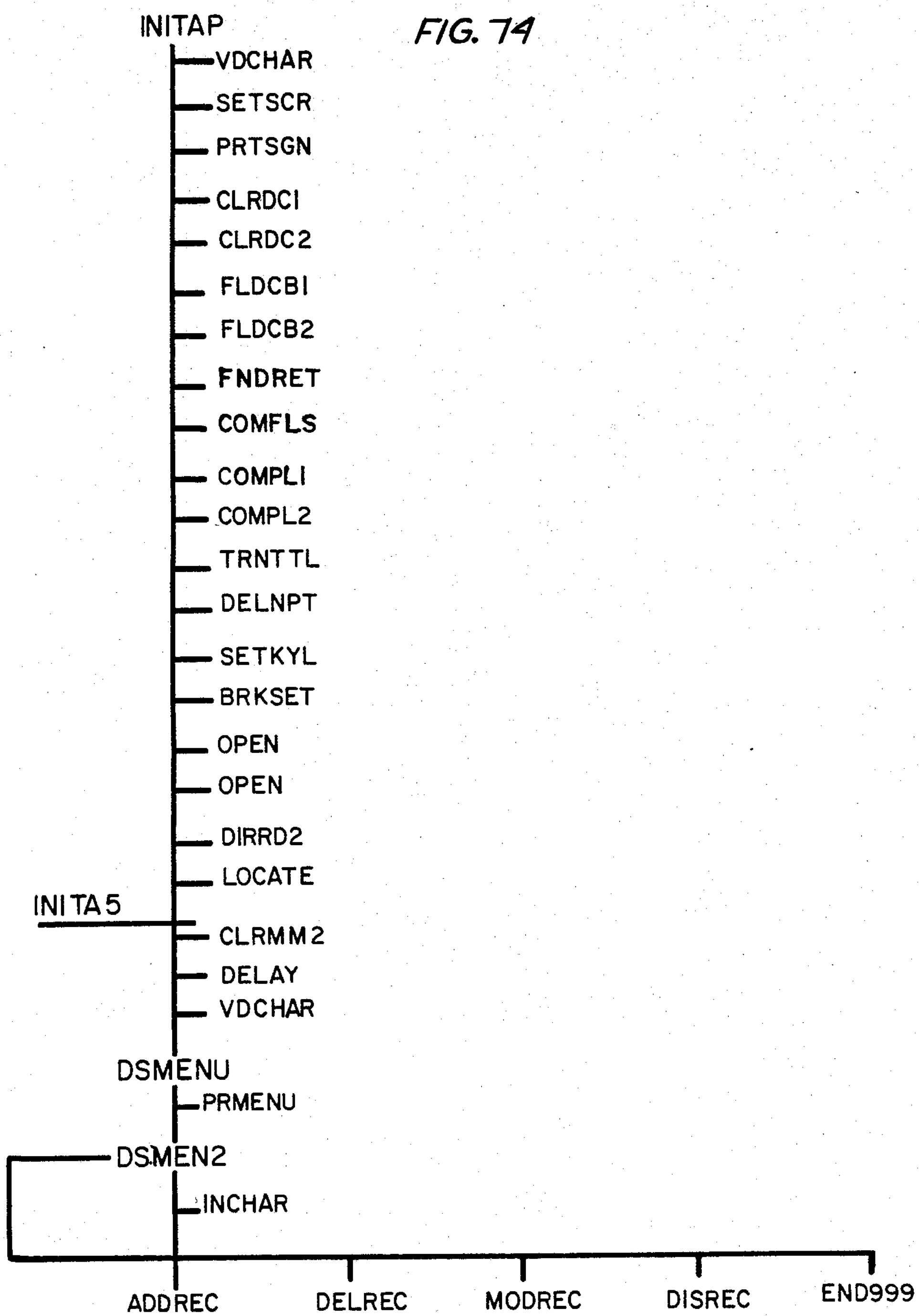
FIG. 74 is a flow chart illustrating the subroutines which combine to define the INITAP subroutine.

Referring now to FIG. 74, the generated or automatic application routine, labelled INITAP, will be described in detail. INITAP begins with subroutine VDCHAR, previously described with reference to FIG. 16, which clears the display screen. The next subroutine of INITAP is set scroll SETSCR, previously described with reference to FIG. 72, which protects the bottom line so that a sign-on message can be printed on the display screen. With this program, a typical message includes a copyright notice and a security check of the program's serial number.

Figure 75:
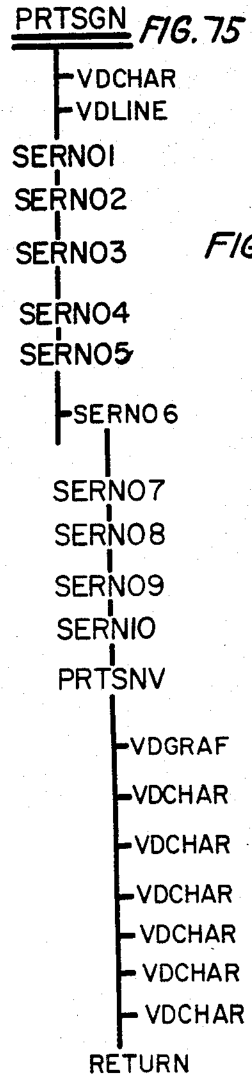
FIG. 75 is a flow chart illustrating the subroutines which combine to define the PRTSGN subroutine.

The next subroutine is PRTSGN, see FIG. 75, places the screen cursor into position and prints out the serial number of the program by calling the VDCHAR subroutine, previously described with reference to FIG. 16. The PRTSGN subroutine recalls the serial number through a series of subroutines scattered throughout the program. VDCHAR retrieves the characters of the serial number from their various positions inside the program and then returns to the initial position. Displaying the serial number acts as a security device to alert the user to whether the program has been tampered with. If the serial number cannot be properly recalled by PRTSGN, the program stops. Foiling this security device requires tracing each subroutine containing a character of the serial number. Scattering the subroutines makes tracing through the code difficult. Indirect branches between the serial number subroutines makes it even more difficult to trace the subroutine's path through the code.

Figure 76:
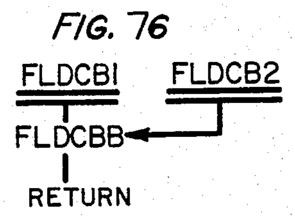
FIG. 76 is a flow chart illustrating the subroutines which combine to define the FLDCB1 and FLDCB2 subroutines.
Figure 77:
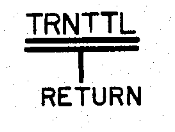
FIG. 77 is a flow chart illustrating the subroutines which combine to define the TRNTTL subroutine.

Referring back to FIG. 74, the next two subroutines in INITAP are CLRDC1 and CLRDC2, both described previously with reference to FIG. 14, which clear areas of memory that act as device control blocks. Subroutines FLDCB1 and FLDCB2, see FIG. 76, clear areas of memory that act as file control blocks. Following FLDCB2, subroutine FNDRET, described earlier with reference to FIG. 19, finds the name of the program. Then subroutine COMFLS and both subroutines COMPL1 and COMPL2, described earlier in FIGS. 20 and 21 respectively, recall the name of the program and take the length of files 1 and 2, the remainder of the input, and complete the parameter lists. The title is transferred to the top of the display screen by the next subroutine, TRNTTL, see FIG. 77. TRNTTL consists of a supervisor command to perform this function and then returns to INITAP.

Figure 78:
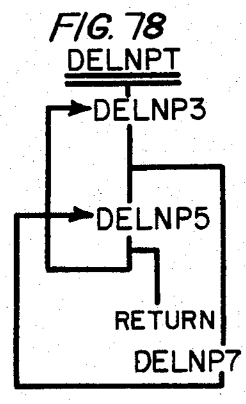
FIG. 78 is a flow chart illustrating the subroutines which combine to define the DELNPT subroutine.

The next subroutine of INITAP is deletes non-prompts DELNPT, see FIG. 78. DELNPT searches through the screen memory to identify prompt amd non-prompt characters. When the program is initiated, both prompt and non-prompt characters contained within the program are displayed. This subroutine eliminates the non-prompt characters so that they do not appear on the screen when the program is entered. DELNP3 accomplishes the search through the fields which appear on the screen, identifying the non-prompt characters. The program is presently adapted to indicate non-prompt characters by braces. DELNP7 removes the non-prompt characters from the screen and references the locations the non-prompt characters appeared. When the end of the screen is identified, the program returns to INITAP.

Figure 79:
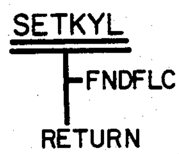
FIG. 79 is a flow chart illustrating the subroutines which combine to define the SETKYL subroutine.

Set key length, SETKYL, see FIG. 79, is the next subroutine of INITAP. The key length is set by calling subroutine FNDFLC, previously described with reference to FIG. 56, which identifies the field specifications for the first field and sets the key length equal to the length of the first field.

The next two subroutines following SETKYL have been described earlier with reference to FIG. 7 as BRKSET and to FIG. 47 as OPEN. These subroutines open a data base and a key file.

Figure 80:
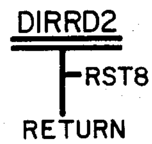
FIG. 80 is a flow chart illustrating the subroutines which combine to define the DIRRD2 subroutine.
Figure 81:
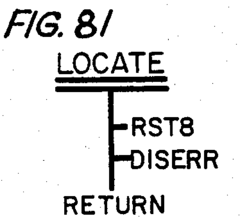
FIG. 81 is a flow chart illustrating the subroutines which combine to define the LOCATE subroutine.

The program keeps track of the total number of records in the data base by the next subroutine, DIRRD2, set forth in FIG. 80. This subroutine contains a supevisor command which reads the record and then returns to INITAP. The next subroutine of INITAP is LOCATE, set forth in FIG. 81, which contains a supervisor command and may access subroutine DISERR, previously described with reference to FIG. 10. Subroutine LOCATE locates the number of the record in the data base read by the previous subroutines and uses that number to keep track of the number of records in the data base. Following LOCATE are three subroutines which prepare the display screen for the printing of a menu. CLRMM2 is a subroutine, previously described with reference to FIG. 6, which clears memory to spaces. DELAY and VDCHAR are subroutines, described earlier with reference to FIGS. 11 and 16 respectively, which clear the screen for the eventual printing of the menu.

Figure 82:
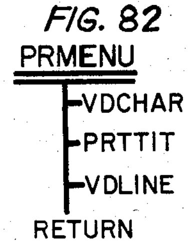
FIG. 82 is a flow chart illustrating the subroutines which combine to define the PRMENU subroutine.
Figure 83:
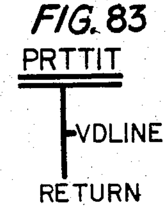
FIG. 83 is a flow chart illustrating the subroutines which combine to define the PRTTIT subroutine.

The program continues through branch DSMENU of the INITAP routine to call subroutine PRMENU. The subroutines accessed by PRMENU are set forth in FIG. 82. After the screen is cleared, the title which is recalled from memory and put on the screen by VDCHAR, described earlier with reference to FIG. 16. A second VDLINE prints out the whole menu. The title is printed out on the first line of the display screen by PRTTIT, see FIG. 83, which calls on a first VDLINE subroutine to accomplish the printing.

The next branch of INITAP is DSMEN2 which recalls a character from the keyboard and will continue to loop until the character is inputted. Depending on the menu selection, five major subroutines can then be selected. The subroutine INCHAR, previously described in FIG. 52, performs the looping function.

Figure 85:
FIG. 85 is a flow chart illustrating the subroutines which combine to define the SETTIT subroutine.
Figure 84:
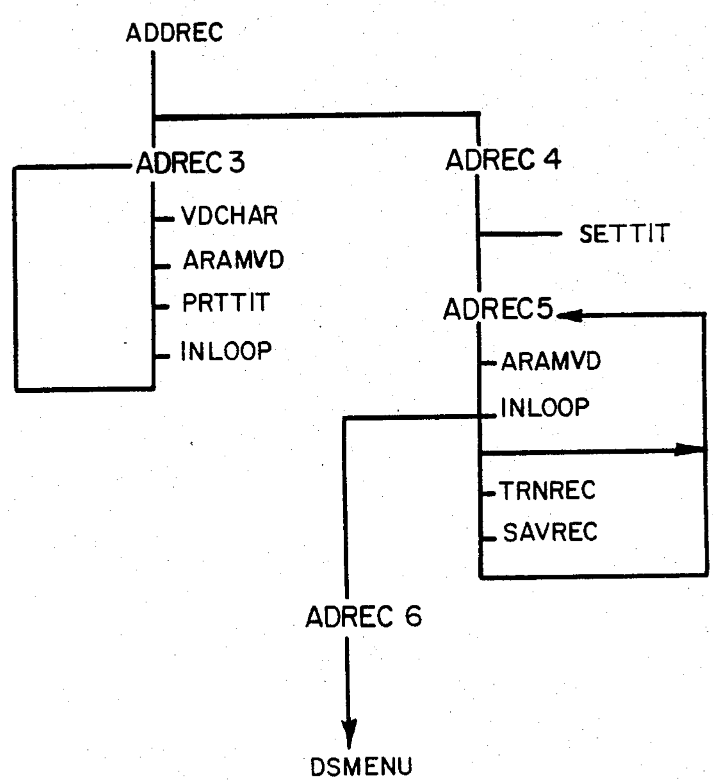
FIG. 84 is a flow chart illustrating the subroutines which combine to define the ADDREC subroutine.

The first major subroutine on the menu, ADDREC, is set forth in FIG. 84 and is used to add a record to a data base. The program flow through ADDREC will either branch to ADREC3 or ADREC4 depending on whether the generated program contains a data base. Subroutine SETTIT, see to FIG. 85, transfers the title to the top of the display screen.

Figure 86:
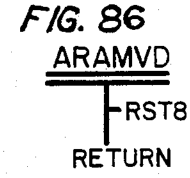
FIG. 86 is a flow chart illustrating the subroutines which combine to define the ARAMVD subroutine.

The program continues into branch ADREC5 and subroutine ARAMVD, see FIG. 86, which takes a particular location in memory and transfers it to the screen through a supervisor command. In this case, the particular location is where the program stored the screen.

Figure 87:
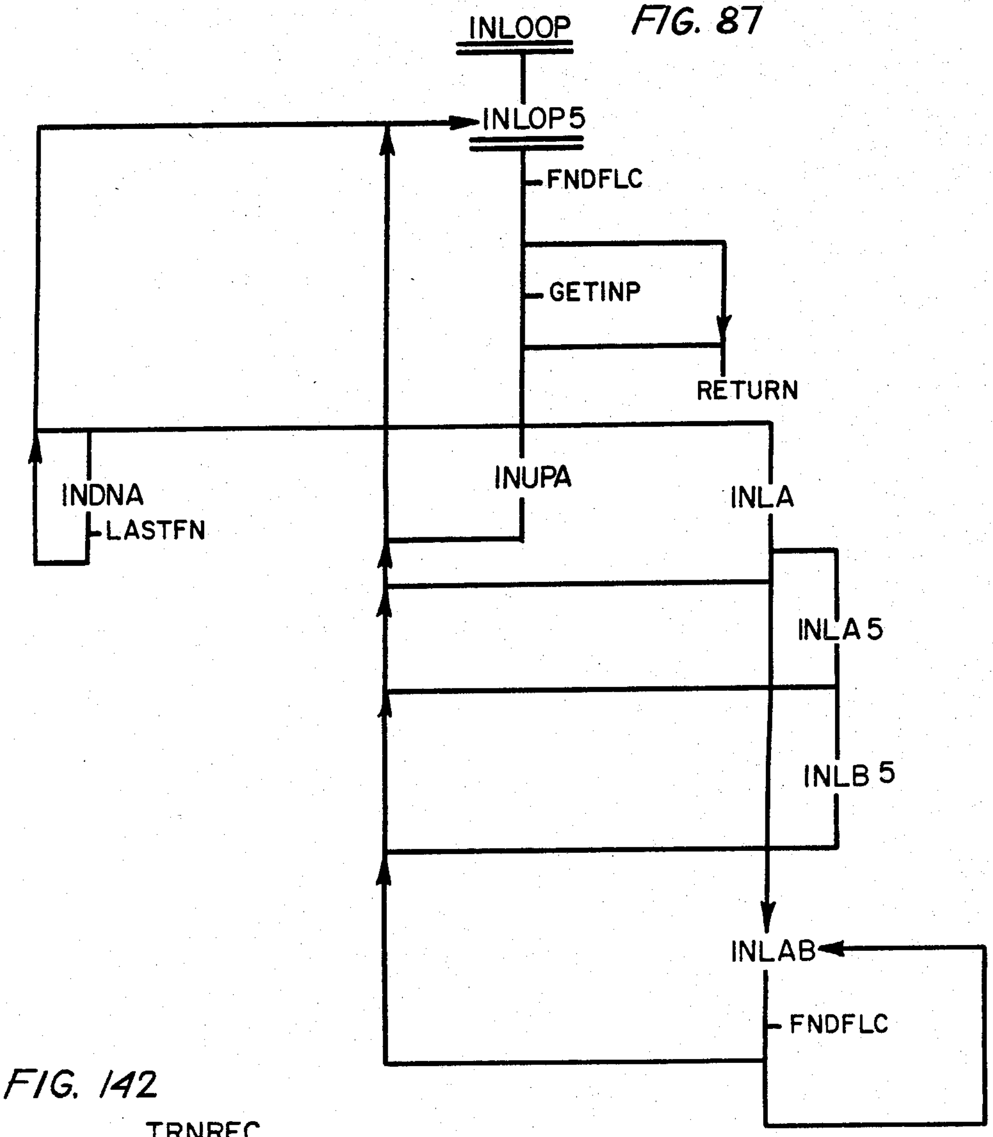
FIG. 87 is a flow chart illustrating the subroutines which combine to define the INLOOP subroutine.

The next subroutine in branch ADREC5 is INLOOP which is set forth in FIG. 87. The program flows through branch INLOP5 of the INLOOP subroutine and recalls the field specifications by using subroutine FNDFLC, described earlier with respect to FIG. 56. Should FNDFLC recall an error message, the program will return to ADDREC and by means of branch ADREC6, and the program will eventually branch to DSMENU of the INITAP routine, see again FIGS. 84 and 74. Generally, the INLOOP subroutine retrieves all of the fields present on the screen. This is accomplished by looping through the subroutine GETINP as many times as there are fields. After all of the fields have been retrieved, the program returns to ADDREC in FIG. 84.

Figure 88:
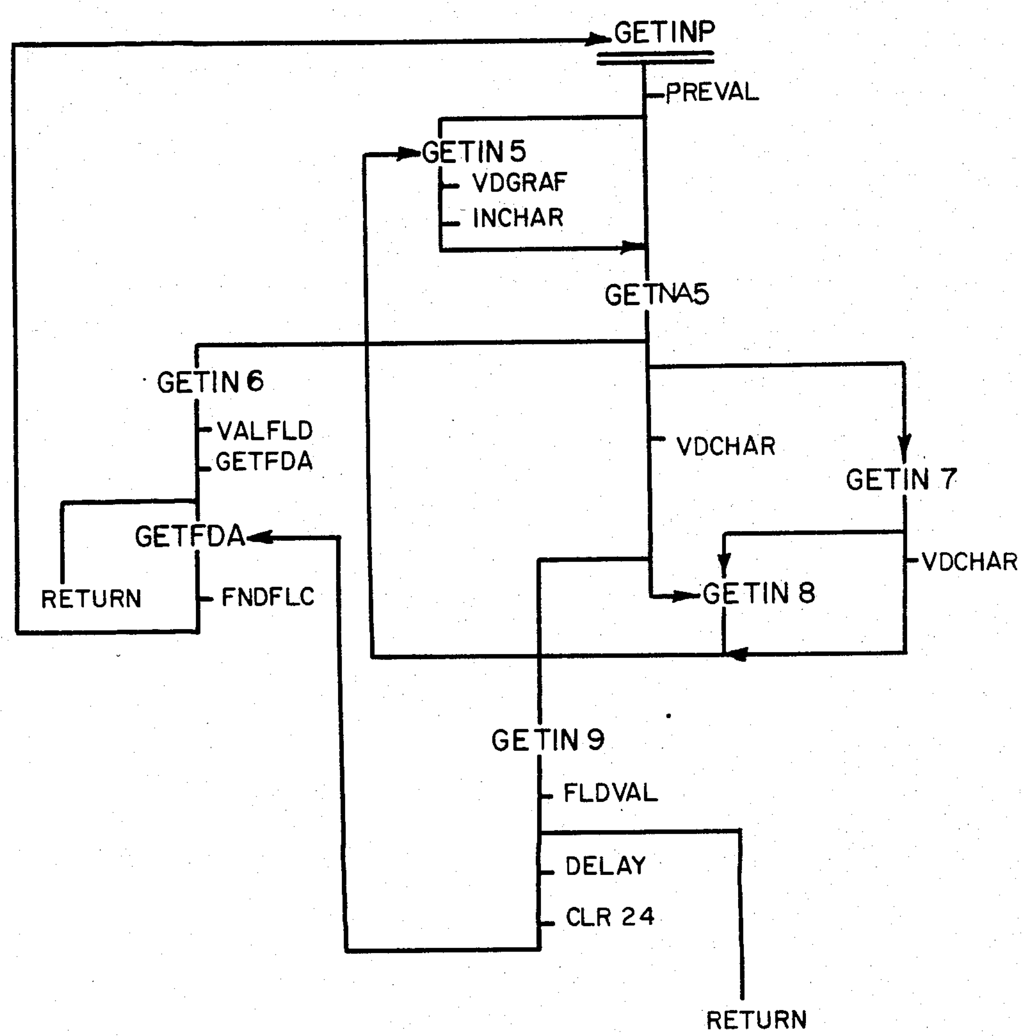
FIG. 88 is a flow chart illustrating the subroutines which combine to define the GETINP subroutine.

The validation of any inputted field in the INLOOP subroutine is checked by the subroutine GETINP, see FIG. 88. GETINP consists of a pre-validation check of the input performed by subroutine PREVAL, see FIG. 89, which sets a flag accordingly. The subroutine PREVAL and the attendant mathematic subroutines are described in more detail in subsequent paragraphs. If the input is a preemptive validation such as a verified field or a computed field, the program branches to GETIN5. Moving through the GETIN5 branch, the program sets the cursor position using the VDGRAF subroutine, as previously described with reference to FIG. 26. Then subroutine INCHAR, previously described with reference to FIG. 52, retrieves a character.

The value of the retrieved character is tested by branching to GETNA5 where a decision point is reached. If the character value is not that of a special character, the program continues through the branch and calls subroutine VDCHAR, see the description with reference to FIG. 16. If the field input is finished, such as with a verified field, the program will branch to GETIN9 and the next decision point described below. If the character value is part of a computed field, additional input will be needed, so the program branches back to GETIN5 where the cursor is advanced to the next position in order to retrieve another character. The exception to this standard loop occurs when a special character is retrieved from the keyboard. If the special character is a return command, the program branches from GETNA5 to GETIN6 where subroutine VALFLD, see FIG. 90, validates the field. The field is then tested at branch GETFDA in more detail below to check whether the field is valid or invalid. The program then returns to INLOOP if the field is valid, meaning that valid data has been inputted. Otherwise the program branches through subroutine FNDFLC, described earlier with reference to FIG. 56, back to the beginning of GETINP to start at the beginning of the field in order to access the field specifications. The program again proceeds through the loop along this described route. Returning to the decision point in branch GETNA5, should the character value be a special character like the backspace, the program will branch to GETIN7. If the program is at the beginning of a field, the program prevents backing out of the field by flowing through subroutine VDCHAR, which has been previously described with reference to FIG. 16, to prevent the backspace. Then the program continues through the same loop branching to GETIN5. On the other hand, if we are not at the beginning of a field, the program simply backspaces and branches through GETIN8 to access branch GETIN5. Referring back to the decision point in branch GETNA5, processing the VDCHAR subroutine may reach the maximum point of the field. In other words, the last possible character position is accessed. The program will then branch through GETIN9 to perform a field validation as described with reference to FIG. 55. If the field is valid, the program returns directly to INLOOP. If the field is not valid, an error message is printed after a short delay called by subroutine DELAY, as previously described with reference to FIG. 11, and an error message is printed on line 24 of the display screen. Subroutine CLR24 then clears the line as described with reference to FIG. 25. After the line is cleared, the program returns to branch GETFDA and starts the loop at the beginning of GETINP.

Returning to the start of the GETINP subroutine in FIG. 88, the program will continue to check if there are additional fields. If there are more fields, the program branches back to INLOP5. On the other hand, if a special character is responsible for returning the program from the GETINP subroutine, the program reaches a decision point after returning from GETINP. If the special character was an up arrow, the program continues through branch INUPA and backs up one field by subtracting one from the current field number. Then the program returns to branch INLOP5 to start the INLOOP subroutine again. If the special character is a down arrow, branch INDNA is used and the program flows through subroutine LASTFN, set forth in FIG. 91. LASTFN iterates through subroutine FNDFLC, see again the description of FIG. 56, until the last character is found in the field. At that point, an error message indicates that there is no additional field to access and the program branches back to INLOP5. If the special character is a left arrow, the program moves to branch INLA. The left arrow special character poses a problem. If the command were executed and the key field bypassed, any values in the key field would be reduced to blanks. As a result, the records could not be located. Therefore, one must keep track of whether there is another left field. As the program proceeds through branch INLA, branch INLA5 tests whether or not the current field is the first field. If the special character left arrow is inputted and the program is in the first field, the program will loop back to branch INLOP5 in order to receive that field over again. If the current field is not the first field, the program continues through branch INLB5 to test whether it is the last field. Again, the program will loop back to branch INLOP5 to receive that field. If the current field is neither the first nor last field, the program proceeds through branch INLAB and subroutine FNDFLC, previously described with reference to FIG. 56, which allows the program to retrieve the next field number before branching back to INLOP5.

Figure 94:
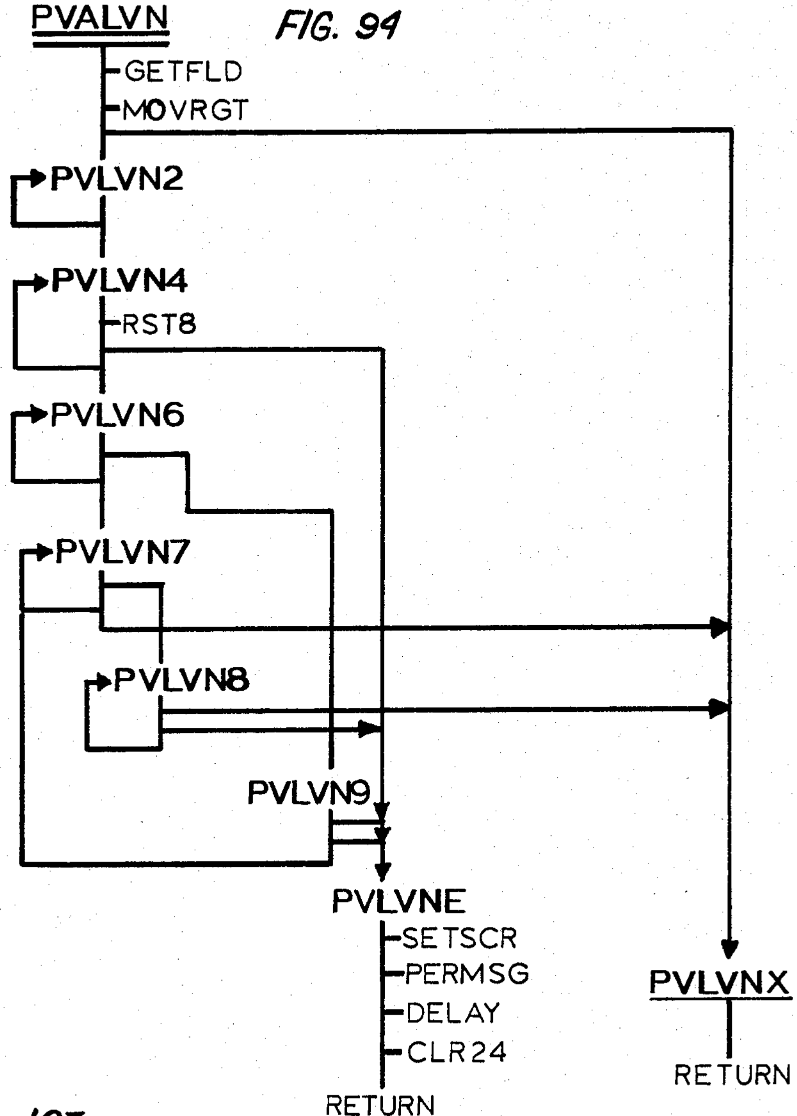
FIG. 94 is a flow chart illustrating the subroutines which combine to define the PVALVN subroutine.
Figure 103:
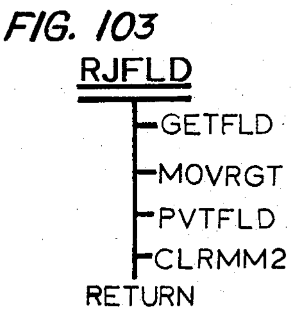
FIG. 103 is a flow chart illustrating the subroutines which combine to define the RJFLD subroutine.
Figure 99:
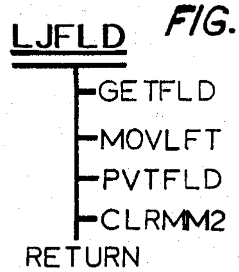
FIG. 99 is a flow chart illustrating the subroutines which combine to define the LJFLD subroutine.
Figure 96:
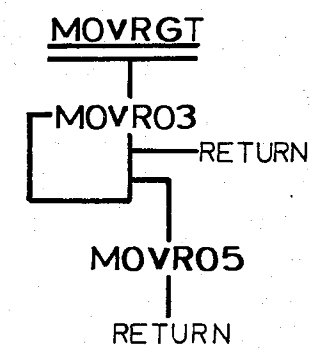
FIG. 96 is a flow chart illustrating the subroutines which combine to define the MOVRGT subroutine.
Figure 100:
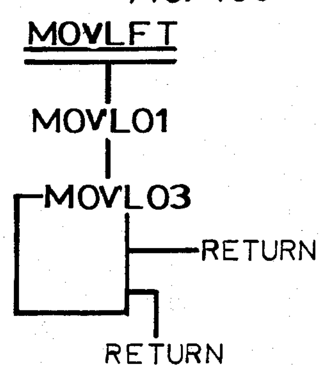
FIG. 100 is a flow chart illustrating the subroutines which combine to define the MOVLFT subroutine.

Referring now to FIG. 90 for a detailed description of subroutine VALFLD, note that this subroutine is also called FLDVAL. First, VALFLD conditionally calls subroutine PVALDV, see FIG. 92, which processes the validation of a default value. Whether the PVALDV subroutine is called depends on whether the operator originally selected a default value at the beginning of the program and the particular field now being processed actually has the default value designation. Upon entering the PVALDV subroutine, a test first determines if the subroutine was inadvertently called so that the program can immediately return to the VALFLD subroutine. Otherwise, subroutine FNDFLC, previously described with respect to FIG. 54, finds the field specifications. Then subroutine LOCINT, see FIG. 93, locates the interpretive validation by first proceeding to branch LOCIN3 to determine whether an interpretive validation is present. If the operator did not supply parameters for the default value at the beginning of the program, or if an error resulted within the computer itself, an interpretive validation may not be found and the program loops back to branch LOCIN3 to proceed to the next field. The program will proceed through a table of interpretive values and if it fails to find the requested default value, no information will be displayed on the screen. Essentially you have a blank default value. On the other hand, if the data is located and the program returns with the parameters, branch LOCIN4 is accessed and the program returns to subroutine PVALDV. Returning to FIG. 92, subroutine VDGRAF is next accessed to place the default value on the screen. The program returns to subroutine VALFLD and proceeds to branch FLVLO5. In this branch, there is another provisionally executed subroutine, PVALPW, see FIG. 181. In the present version of AUTOGRAMMER this subroutine is unimplemented and now exists as a simple return. The program proceeds to branch FLVLO7 where the particular field being processed is checked to see if a valid numeric has been indicated. The program always accesses subroutine PVALVN, see FIG. 94. The particular field is retrieved from the display screen through subroutine GETFLD, see FIG. 95. The next subroutine MOVRGT, see FIG. 96, moves the retrieved field to the right by executing branch MOVRO3 a sufficient number of times so all of the characters of the field are moved to the right or the program runs into the limits of the buffer that it has been assigned to. In either case, all characters are moved to the right. When the program returns to subroutine PVALVN, in FIG. 94, branch PVLVN2 tests whether a valid numeric is present by scanning for the left most byte. Branch PVLVN2 reiterates until the left most byte is identified. Then the program continues to branch PVLVN4 where the field presently being processed is compared to a numeric character table by using a supervisor call. If an error is found in this comparison, the program branches to PVLVNE the error routine described in more detail below. At branch PVLVN6, the program identifies plus or minus signs. If more than one sign is identified, the program continues through branch PVLVN7 to identify decimal points. In a valid numeric there is only one decimal point. If other than one decimal point is identified, the program branches to the error routine PVLVNE. The error routine begins by setting the scroll with subroutine SETSCR, previously described with respect to FIG. 72. Then an error message stating that there is an invalid numeric is displayed through the courtesy of subroutine PERMSG, previously described with respect to FIG. 70. After the message has remained on the display screen for a short time through the courtesy of subroutine DELAY, line 24 is cleared with subroutine CLR24. An error flag is set to indicate that the field has not been properly entered. Branch PVLVNE places the cursor at the beginning of the field and requests the operator to re-enter data until a valid numeric is inputted. Branch PVLVN8 checks is there is a second decimal point. If only one decimal point is present, the program branches to PVLVNX. The program returns to VALFLD through branch PVLVNX, after clearing the stacks. Returning to FIG. 90, the program then proceeds to branch FLVLO9 to perform subroutine PVALA6, see FIG. 182. First the program checks to find out whether the subroutine has been accessed before and if it has not, then the program proceeds around to branch FLVL12. Subroutine PVALR6 is unimplemented in this version of AUTOGRAMMER. So, the program simply returns and proceeds to branch FLV12. The dollar and cents validations are processed in this branch. If the validation has never been used, the program branches immediately to FLVL14. Otherwise, the program calls upon subroutine PVALD2, see FIG. 97. Subroutine PVALDC, see FIG. 177, enters at nearly the same point in the program and both access subroutine PLALNV, see FIG. 178. The only difference between the two subroutines is one byte of code. If you enter the subroutine through PVALD2, the program changes one byte of code in the routine to allow processing of more than one decimal place. If you enter the program through PVALDC, the subroutine allows processing of only two decimal places. The same code is basically used to do two separate processes. Referring to FIG. 97, the subroutine begins with branch PVLDC1 which uses subroutine GETVLD, previously described with reference to FIG. 95, to retrieve the field on the screen that is being validated. Because the validation is for dollars and cents, the program right justifies the validation by calling subroutine MOVRGT, previously identified with respect to FIG. 96. The program also checks the error flag to make sure that the load value is proper. Otherwise, the program returns. If the load value is proper, the program proceeds to branch PVLDC2 to locate the right most blank, plus one, which identifies where to end the number because digits after the second decimal place are truncated. Branch PVLDC3 scans for the left most non-blank character to identify the length of the number of the most significant digit. If a decimal point is identified during the scan, the program proceeds to branch PVLDC8. If no decimal point is found, the program continues to branch PVLDC4 to insert a decimal point and two zeros by proceeding through branches PVLDC5 and PVLDC6. Each of these branches inserts one decimal point and one zero. Once there are two decimal points, the program continues through branch PVLDC6 and PVLDCX. The PVLDC8 branch determines whether a decimal point exists and the number of zeros after it. The program proceeds back to branch PVLDC6 if the number has one zero and proceeds to branch PVLDC5 is two zeros need to be inserted. If no decimal points are present, branch PVLDC8 will insert one. The program then proceeds to branch PVLDC9 and determines whether to perform the rounding routine. If the number is not to be rounded, the program immediately proceeds to branch PVLDCX. The program proceeds to PVLDCR if the program is to perform the rounding routine or to PVLDCL if the program is not to round off at the last digit. This is determined by testing the last digit. If the last digit is five or greater, the program proceeds to branch PVLDCR where the last digit is increased by one before continuing to PVLDCX. The program falls through to branch PVLDCL if the last digit is less than five. Branch PVLDCL tests for special characters: PLVDCS tests for decimal points; PVLDCM tests for minus signs; PVLDCT tests for positive signs; PVLDCN tests for valid digits less than nine. These branches provide a means for making corrections where the number may be rounding too high, too low, or out of length of the field. Branch PVLDCX corrects and restores the field length counter to its original position with the new and corrected value. Referring back to FIG. 90, the program then proceeds to branch FLVL14 which will immediately branch down to FLVL15 is subroutine PVALD2 has not been previously called. Otherwise, subroutine PVALD2 operates in the same manner just described for subroutine PVALDC except two digits instead of one are processed. The PVALD2 or PVALDC subroutine in FIG. 97 can actually be modified to process infinite number of digits. Branch FLVL15 conditionally calls subroutine PVALLJ, see FIG. 98. This subroutine first tests whether or not the field is full. If it is, and the program proceeds to branch VALLJF and returns to subroutine VALFLD. Otherwise, subroutine LJFLD, see FIG. 99, is called to left justify the field by using subroutine GETFLD to retrieve the field from the display screen and move it to the left with subroutine MOVLFT, see FIG. 100. In a fashion similar to that described for subroutine MOVRGT, subroutine MOVLFT moves the field to the left. Subroutine PVTFLD, see FIG. 101, puts the field back on the display screen and the buffer is cleared by using subroutine CLRMM2, as previously described with reference to FIG. 6. After the program returns to VALFLD, the validation is tested to find out if it is right justified through subroutine PVALRJ, see FIG. 102. At first, PVALRJ checks to see that it is needed. If it was not necessary that it be called, the program continues through branch VALRJ5 and returns to subroutine VALFLD. Otherwise, subroutine RJFLD, see FIG. 103, is accessed. This subroutine proceeds in a manner similar to the description for subroutine LJFLD, previously described with respect to FIG. 99. Returning to subroutine VALFLD, the program conditionally branches to subroutine PVALVF to verify the field if this subroutine has not been used before. Otherwise, the program branches to PVAL16. The first decision point in subroutine PVALVF, see FIG. 179, determines whether PVALVF was inadvertently called and should return to VALFLD. If the subroutine is needed, the program continues to branch PVALV3 to perform a reverse video on the current field in a manner previously defined with respect to REVFLD in FIG. 57. The field on the screen is highlighted in reverse video to make it easily visible to the operator. Then subroutine CLRPRT prints a message on the bottom line which requests that the operator verify the field with an affirmative or negative response. The program then proceeds to branch PVALV5 for subroutine INCHAR, previously described with reference to FIG. 52. If no character is retrieved, meaning that nothing was typed, the program stays in the loop around branch PVALV5. If the operator affirmatively responds the field is verified, the program branches to PVALV7 where line 24 is cleared by subroutine CLR24. The message is removed by subroutine CORFLD, see FIG. 105, which corrects the field by placing the reverse video back to what it was. Branch PVALV8 next sets the error flag to indicate that an error is no longer present and the program returns to subroutine VALFLD. If there was a negative response concerning the verified field, the program then proceeds to branch PVALV9 which calls subroutines CLR24 and CORFLD to perform the functions just described and set the error flag stating that the present validation is a non-verified field before returning to VALFLD. If in response to the computer's inquiry, the operator presses the escape key, the program branches to VALV6 and calls subroutines CLR24 and CORFLD before returning to subroutine PVAFLD. Referring back to FIG. 90, branch PVAL16 is next accessed by the program to verify the correctness of the error flags that were set in the previous subroutine before returning directly to GETINP or through subroutine PVALKF, see FIG. 183, see FIG. 183, which is an inactive subroutine in this version of AUTOGRAMMER. Other PVAL subroutines which are unimplemented are illustrated in FIG. 184.

We now return from VALFLD to the original calling subroutine GETINP to act upon one of three conditions which have been set. If the field has been verified, the program continues proceeding through GETINP. If the field was not verified, the program back up one field. If the escape key has been entered, the program returns back to INITAP to display the menu.

As demonstrated above, one of the advantages of AUTOGRAMMER is its ability to take into account any contingency. It can be termed a "closed end program." By taking into account any error which may result due to incorrect operator input or machine malfunction, AUTOGRAMMER will not hang up in any subroutine, failing to complete its assignment. If an error is identified, the subroutine will return to the previous subroutine to re-evaluate the input. This makes AUTOGRAMMER self-correcting. If a subroutine is inadvertently called, the subroutine will return back to the calling subroutine to continue through the program.

Figure 89:
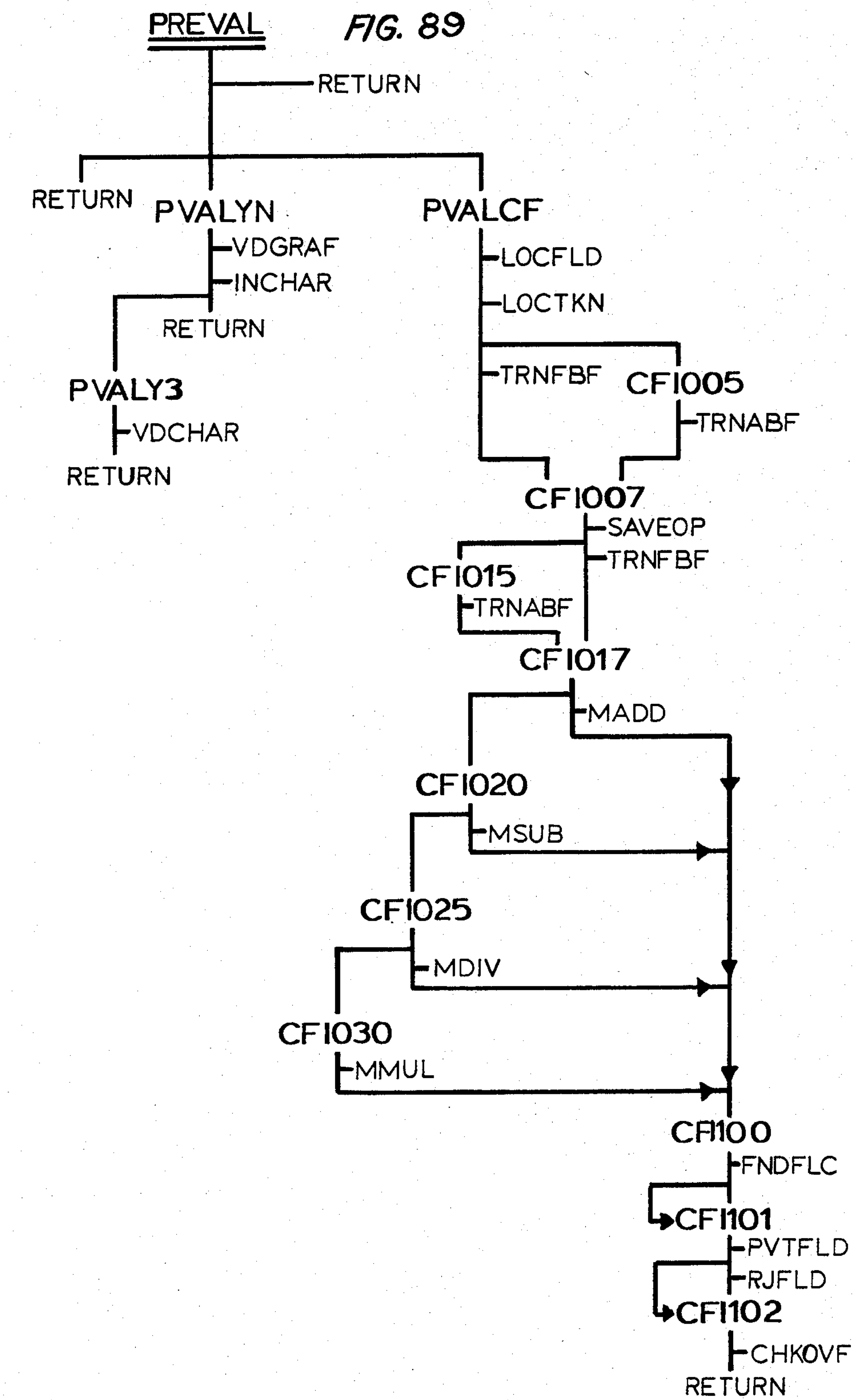
FIG. 89 is a flow chart illustrating the subroutines which combine to define the PREVAL subroutine.

The PREVAL subroutine, see FIG. 89, will now be discussed in detail. The first decision point in this subroutine determines whether or not the program has been properly called. Then it peforms a general check for pre-empted validations. Once a validation has been identified, the program determines whether it is a yes-no or computed field validation. There are other pre-empted validations which are unimplemented in this version of AUTOGRAMMER and in these instances the program immediately returns to the calling subroutine. For a yes-no validation, the program proceeds to the PVALYN branch and first calls subroutine VDGRAF to print out a message on the bottom line of the screen requesting verification from the operator. The program will accept only a yes-no response. Any other character generates an error message and the program immediately returns to the calling subroutine. The character is retrieved by subroutine INCHAR. With a valid character, the program proceeds to branch PVALY3 and calls subroutine VDCHAR to display that character on the screen before returning. The other pre-empted validations are handled by branch PVALCF, see FIG. 176. The first subroutine called in this branch is LOCFLD, see FIG. 107, which locates the field in the field table. This subroutine retrieves whatever value has been placed in the first register and finds that field number in the field table. In the field table, the starting point of the validation table is located. The subroutine processes each character to determine if it is the correct field number. The subroutine immediately returns if it is at the end of the field table. Once the correct field number is identified, the program loops branch CFLOO9 until the whole field is located. Otherwise, the subroutine is again used for the next entry and table. The next subroutine is LOCTKN, see FIG. 108, which locates a tokenized value that is in the computed field in a manner similar to that described for the above subroutine LOCFLD. The difference between the two subroutines lies in locating a token which is in a different table and in a different memory register. The table is made up of interpretive validations indicated by a token, i.e. B1 indicates an absolute character; B2, an invisible field, B3, a computed field, etc. Some of the tokens listed in the table are not implemented in this version of AUTOGRAMMER. This subroutine indicates the calculation to be performed on the computed field. It is an algebraic equation present when the original program was generated which uses variables instead of absolute numbers. The variables are identified through an interpretive mode and a reference table. Substituting variables allows the program to work on any data imaginable, including data which hasn't yet been added. Thus, the program locates the token and determines whether or not the program is working with an absolute field or value, or with a number entered by the operator in a previous field.

For the latter, subroutine TRNFBF, see FIG. 109, is called to find the field table through subroutine FNDFLD, previously described with respect to FIG. 56. Then subroutine PVALRJ, previously described with respect to FIG. 102, makes sure the field is right justified so that the subsequently described math package can operate on it. Subroutine GETFLD retrieves the right justified value. Branch TRNFB4 determines if the field is blank and will insert zeros if it is. Otherwise, branch TRNFB5 will transfer the value to a field buffer. The program loops through TRNFB5 until all the characters have been transferred.

If the program is processing an absolute value, subroutine TRNABF, see FIG. 110, is called. Branch TRNAB5 transfers each of the characters in a manner described above with respect to subroutine TRNFBF. Branch NABF80 is then used for a transfer to the next available buffer, so there are two sets of characters and buffers.

Figure 112:
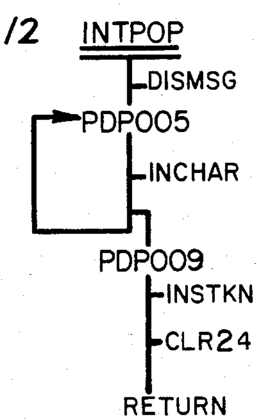
FIG. 112 is a flow chart illustrating the subroutines which combine to define the CHKOVF subroutine.

Both branches of the program unite at branch CF1007 which determines the algebraic operator, i.e. add, subtract, etc. by retrieving the next character and stores the information in memory by calling on subroutine SAVEOP, see FIG. 111. After accessing SAVEOP, the program branches to CF1015 if a field or absolute value is identified, and calls subroutine TRNABF, previously described with respect to FIG. 110. Otherwise, the program will again access subroutine TRNFBF, described above. Upon reaching branch CFI017, the program will call the mathematical subroutine identified by the algebraic operator discussed above. The math subroutine will be discussed in more detail below. After completing one of the math subroutines, the program continues to branch CFI100 and calls subroutine FNDFLC to retrieve the field which will hold the calculated answer. The field is tested for sufficient space. If the answer is larger than the available space, the program continues to branch CFI101 and calls upon subroutine PVTFLD, previously described with respect to FIG. 101, to put the field on the screen and set a flag. This flag will branch the program immediately to CFI102. There is no need to right justify the number if an overflow condition exists, so subroutine RJFLD is bypassed. The overflow condition is checked in subroutine CHKOVF, see FIG. 112. This subroutine is a general routine that can be entered from other places in the program. If no overflow condition exists, the program immediately returns to a calling subroutine. If needed, branch OVFER5 sets the field upon the screen in reverse video and prints an appropriate error message by calling subroutine REVFLD, SETSCR, and PERMSG, previously described with respect to FIGS. 57, 72, and 70. Pressing any key will complete the INCHAR subroutine and allows the program to continue by clearing the message and correcting the field with subroutines CLR24 and CORFLD before returning to the subroutine calling PREVAL.

Figure 123:
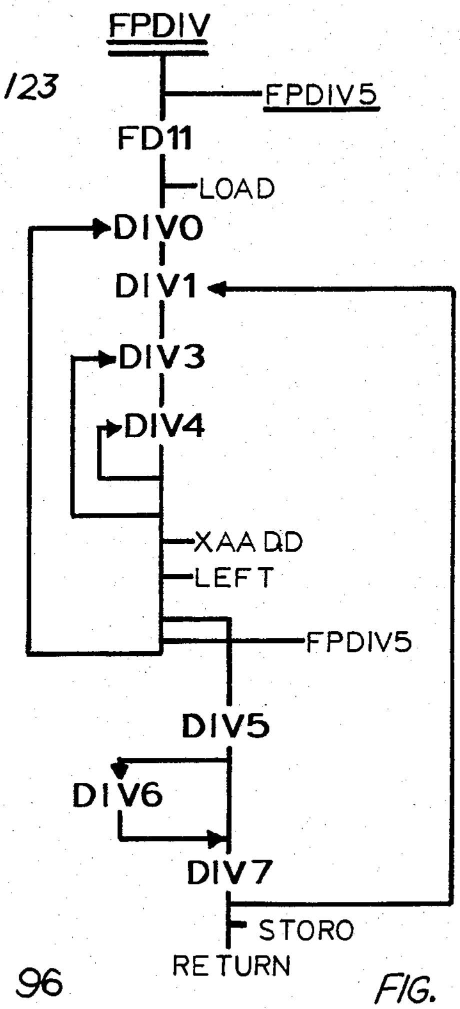
FIG. 123 is a flow chart illustrating the subroutines which combine to define the FPDIV subroutine.
Figure 131:
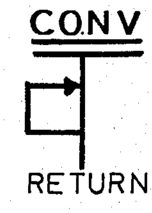
FIG. 131 is a flow chart illustrating the subroutines which combine to define the FPMUL subroutine.
Figure 120:
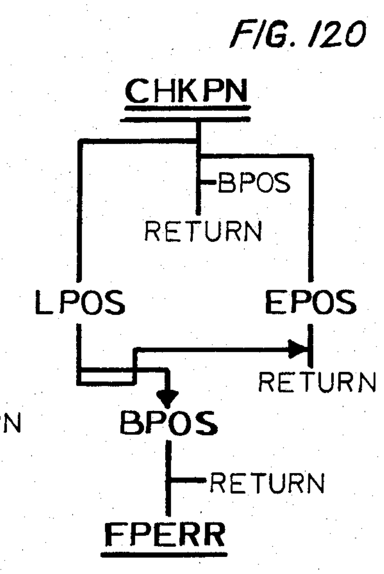
FIG. 120 is a flow chart illustrating the subroutines which combine to define the CHKPN subroutine.
Figure 169:
FIG. 169 is a flow chart illustrating the subroutines which combine to define the INSTKN subroutine.
Figure 171:
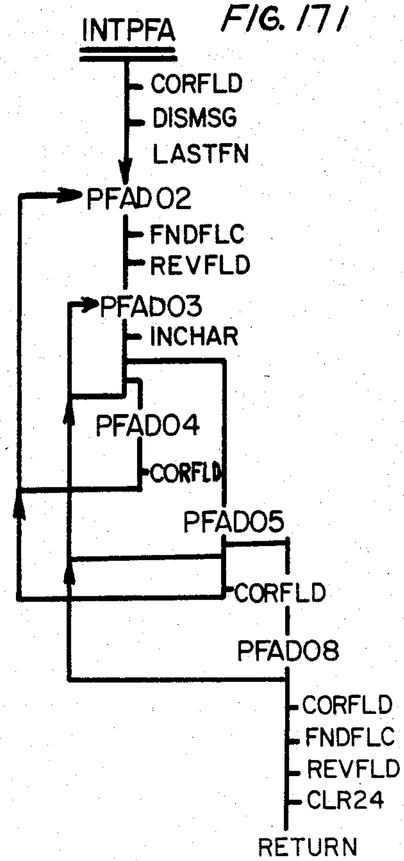
FIG. 171 is a flow chart illustrating the subroutines which combine to define the INTPFA subroutine.
Figure 170:
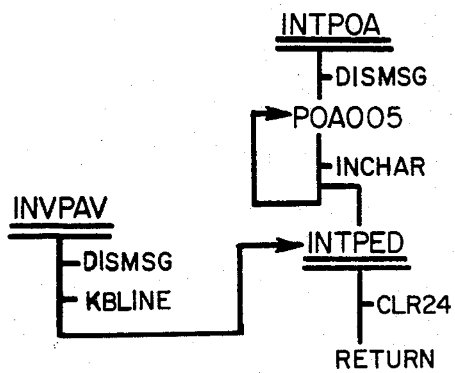
FIG. 170 is a flow chart illustrating the subroutines which combine to define the INTPOA subroutine.
Figure 173:
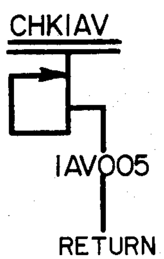
FIG. 173 is a flow chart illustrating the subroutines which combine to define the CHKIAV subroutine.
Figure 174:
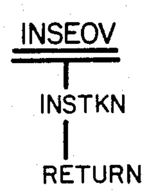
FIG. 174 is a flow chart illustrating the subroutines which combine to define the INSEOV subroutine.
Figure 116:
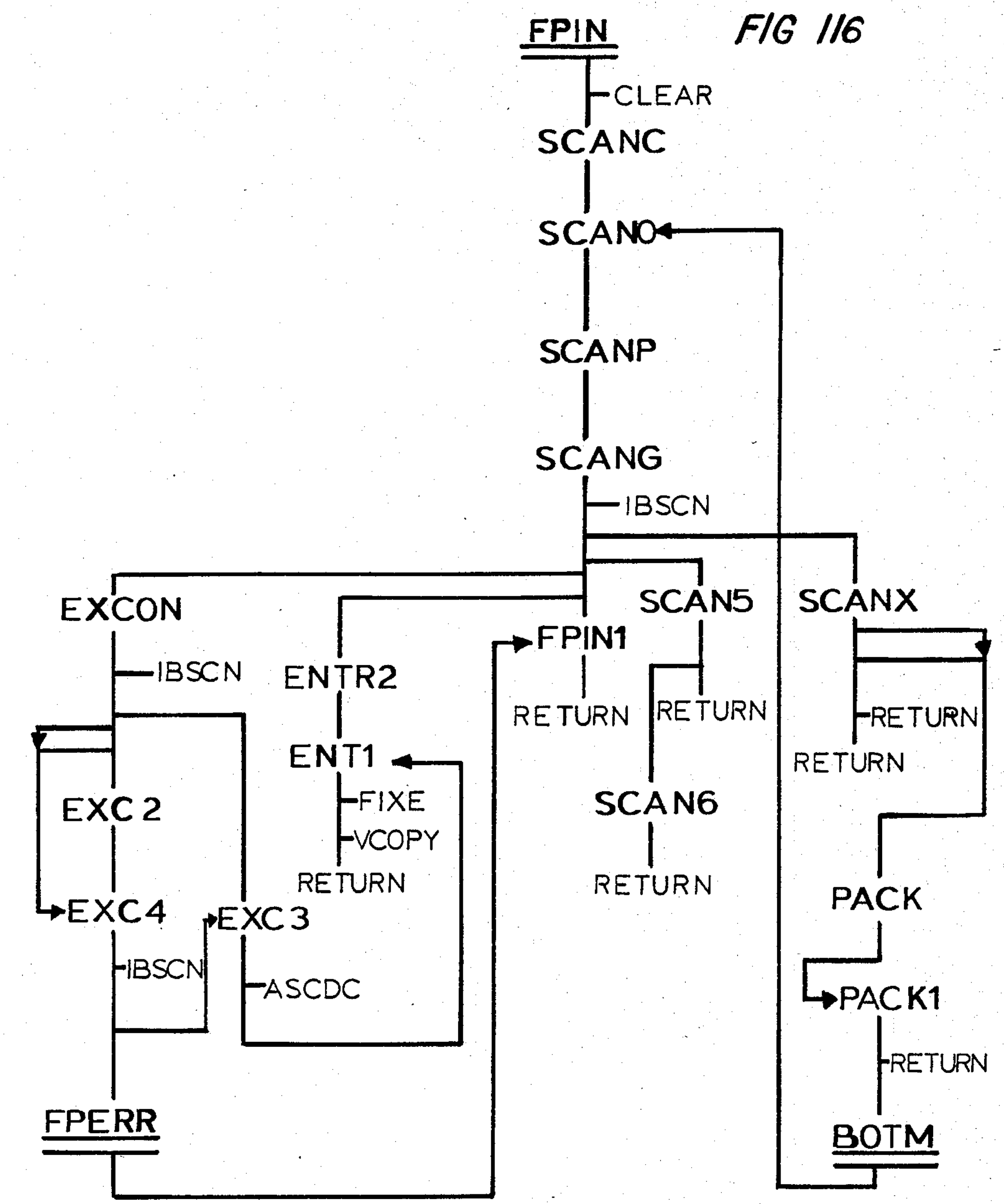
FIG. 116 is a flow chart illustrating the subroutines which combine to define the FPIN subroutine.
Figure 118:
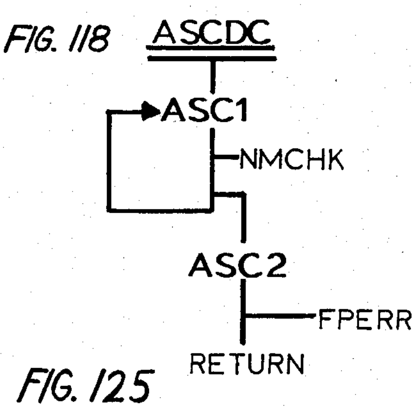
FIG. 118 is a flow chart illustrating the subroutines which combine to define the ASCDC subroutine.
Figure 129:
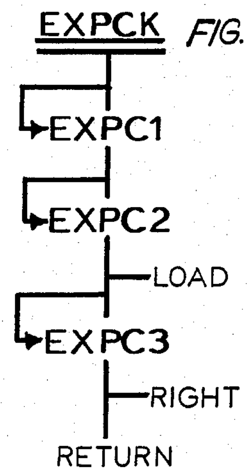
FIG. 129 is a flow chart illustrating the subroutines which combine to define the EXPCK subroutine.
Figure 125:
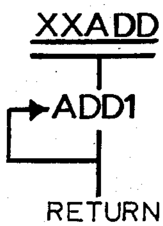
FIG. 125 is a flow chart illustrating the subroutines which combine to define the XXADD subroutine.
Figure 130:
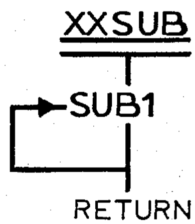
FIG. 130 is a flow chart illustrating the subroutines which combine to define the XXSUB subroutine.
Figure 132:
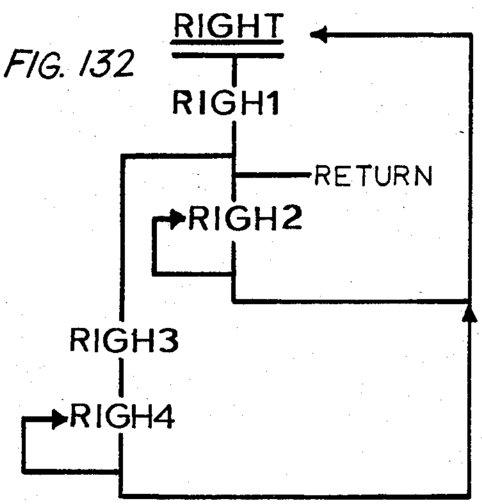
FIG. 132 is a flow chart illustrating the subroutines which combine to define the RIGHT subroutine.
Figure 126:
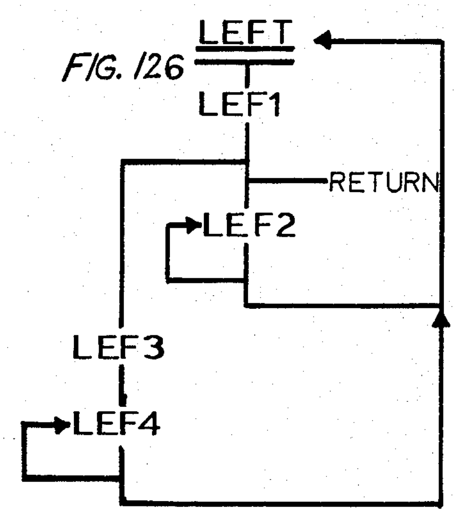
FIG. 126 is a flow chart illustrating the subroutines which combine to define the LEFT subroutine.
Figure 124:
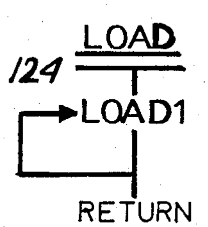
FIG. 124 is a flow chart illustrating the subroutines which combine to define the LOAD subroutine.
Figure 127:
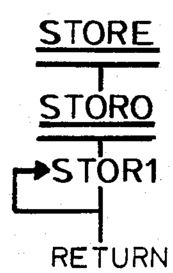
FIG. 127 is a flow chart illustrating the subroutines which combine to define the STORE subroutine.
Figure 128:
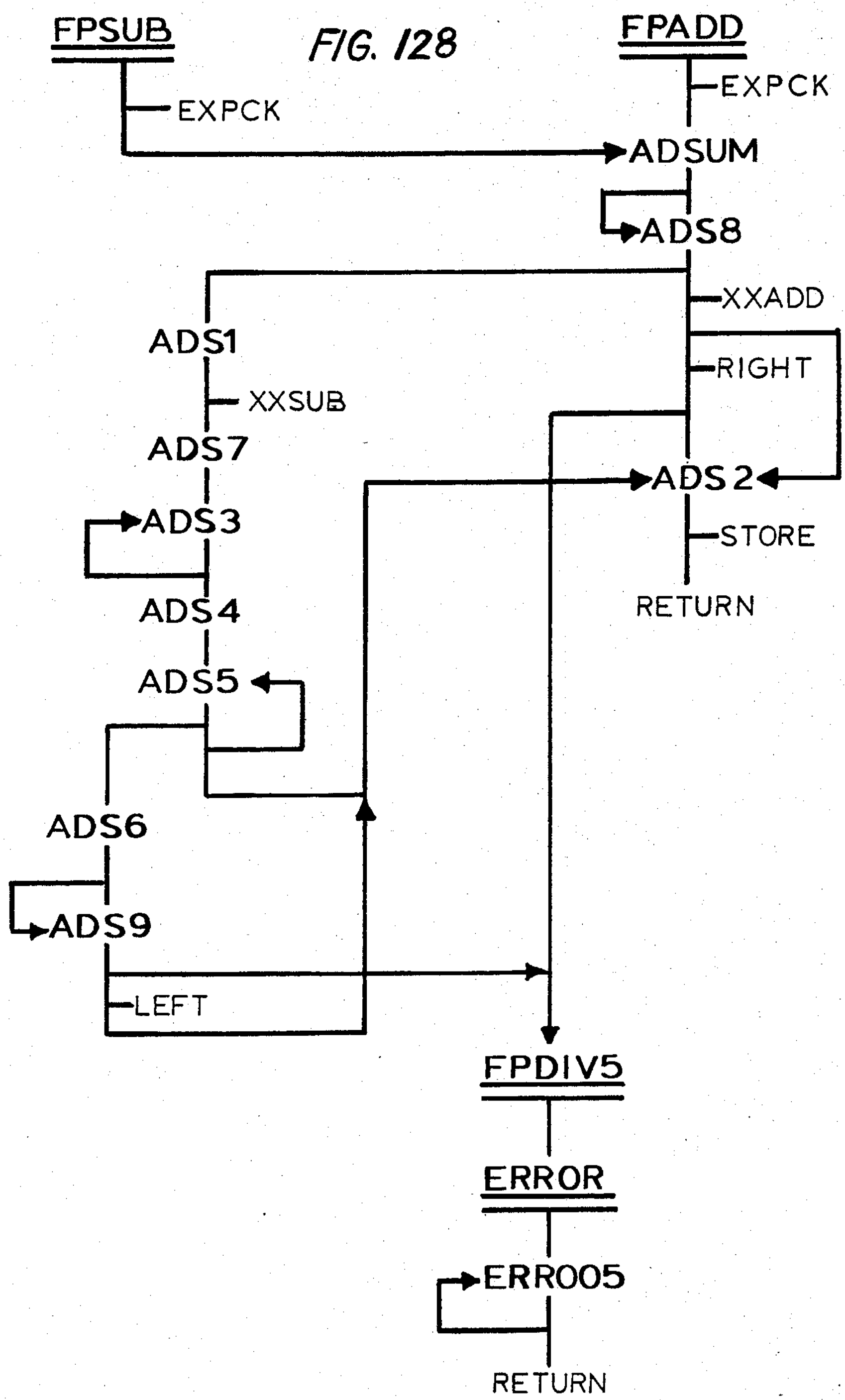
FIG. 128 is a flow chart illustrating the subroutines which combine to define the FPSUB, Sm and FPADD subroutines.
Figure 131:
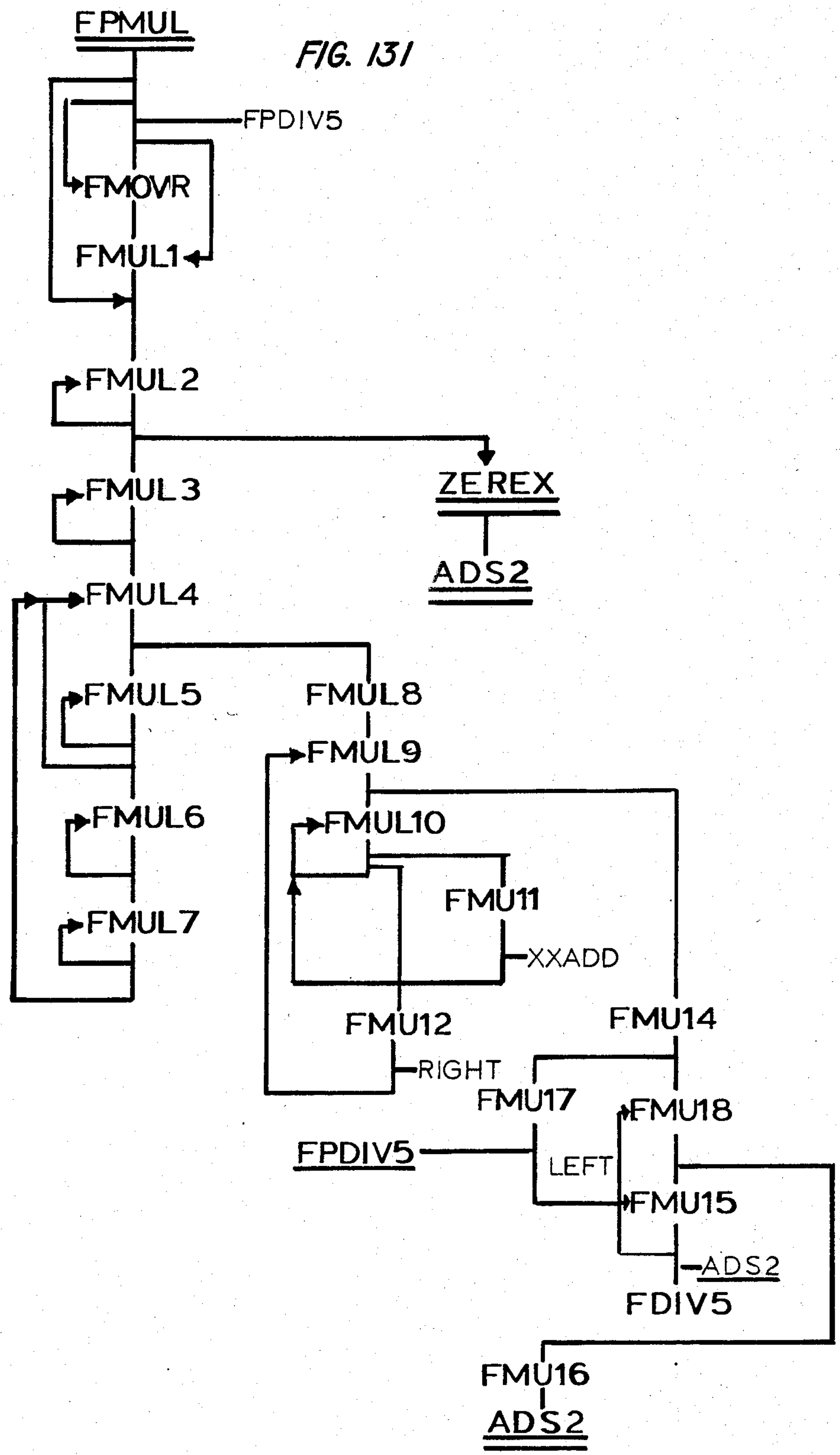

Starting with FIG. 113, the mathematic subroutines MADD, MSUB, MDIV and MMUL are described in more detail. All of the math subroutines call upon subroutine PREP, see FIG. 114, in preparation for performing the math functions. The first subroutine under PREP is CLRFPN, see FIG. 115, which clears memory for a floating point number. Subroutine FPIN, see FIG. 116, next verifies the validity of the number and converts it from a coded decimal character to floating point notation. The floating point notation is expressed as a mantissa and an exponent. The floating point notation of AUTOGRAMMER allows the operator use of 26 significant digits with an exponent power in the range of 128 to −127. Generally, the FPIN subroutine first clears the buffers and flags with subroutine CLEAR, see FIG. 117 and subroutine IBSCN is accessed, see FIG. 175. Decimal conversion is performed by subroutine ASCDC, see FIG. 118. The exponent is fixed and normalized by subroutines FIXE, CHKPN, and VCOPY, see FIGS. 119, 120, and 121 respectively, because of errors inherent with binary mathematics. Upon returning to the FPIN subroutine, the answer is placed in memory which has been cleared by subroutine CLRBUF, see FIG. 122. Generally, the subroutine of the floating point mathematic package are conventional, except that AUTOGRAMMER can process 26 significant digits and ten decimals places. Due to the number of permutations within each of the math subroutines a detailed description is impractical and only an overview will be provided. Increasing the execution time other than what is provided in App A and the flow charts. The division subroutine FPDIV, see FIG. 123, contains an error tracking routine FPDIV5 which sets up an error flag and prevents the program from stopping. The program continues to branch FD11 and calls subroutine LOAD, see FIG. 124, which sets up the parameters. Branches DIV0, DIVI, DIV2, and DIV3 convert the number into two binary numbers, one being the complement of the other. Subroutines XXADD and LEFT, see FIGS. 125 and 126, respectively, are called to add the binary numbers together and accomplish the division. Before returning, branch DIV7 calls subroutine STORO, see FIG. 127, which stores the calculated answer and any error flags in a register for later retrieval. The addition and subtraction subroutines, FPSUB and FFADD, respectively are illustrated in FIG. 128. These subroutines are the same, only the sign of the exponent is changed. The first subroutine is EXPCK, see FIG. 129, which checks the validity of the exponent. The ADSUM branch performs a binary addition and an exponent addition with the XXADD subroutine, previously described with respect to FIG. 125, and subroutine RIGHT, see FIG. 132. If an overflow results, the program branches to ADS1, and subroutine XXSUB, see FIG. 130, which does subtraction and normalization to bring the number back within range through a method of adjusting decimal points. Branch FPDIV5 is accessed to report the overflow error. Otherwise, the sign is stored through subroutine STORE, previously described with respect to FIG. 127, and the program returns. The multiplication subroutine, see FIG. 131, first equalizes the two numbers uses the branches FMOUR through FMUL7 to be multiplied by equating their exponents so the multiplication can be carried out. Then the program branches to FMUL8 for the actual digit-by-digit multiplication. Subroutine XXADD, previously described with respect to FIG. 125, performs the exponent addition. Once all the digits have been exhausted, the program branches to FMU15 and ADS2 which resolves the correct sign of the number after the multiplication. Branch ADS2 is also used by the addition-subtraction subroutines in FIG. 128. The program then stores the number and necessary flags before returning. This is a common ending to the subroutine which sets up the number for reconversion to ASCII added decimals.

Figure 135:
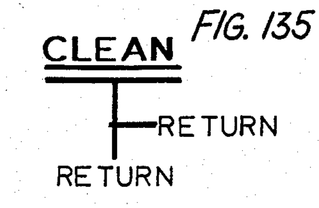
FIG. 135 is a flow chart illustrating the subroutines which combine to define the CLEAN subroutine.
Figure 136:
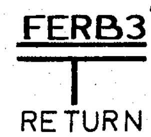
FIG. 136 is a flow chart illustrating the subroutines which combine to define the XFERB3 subroutine.
Figure 133:
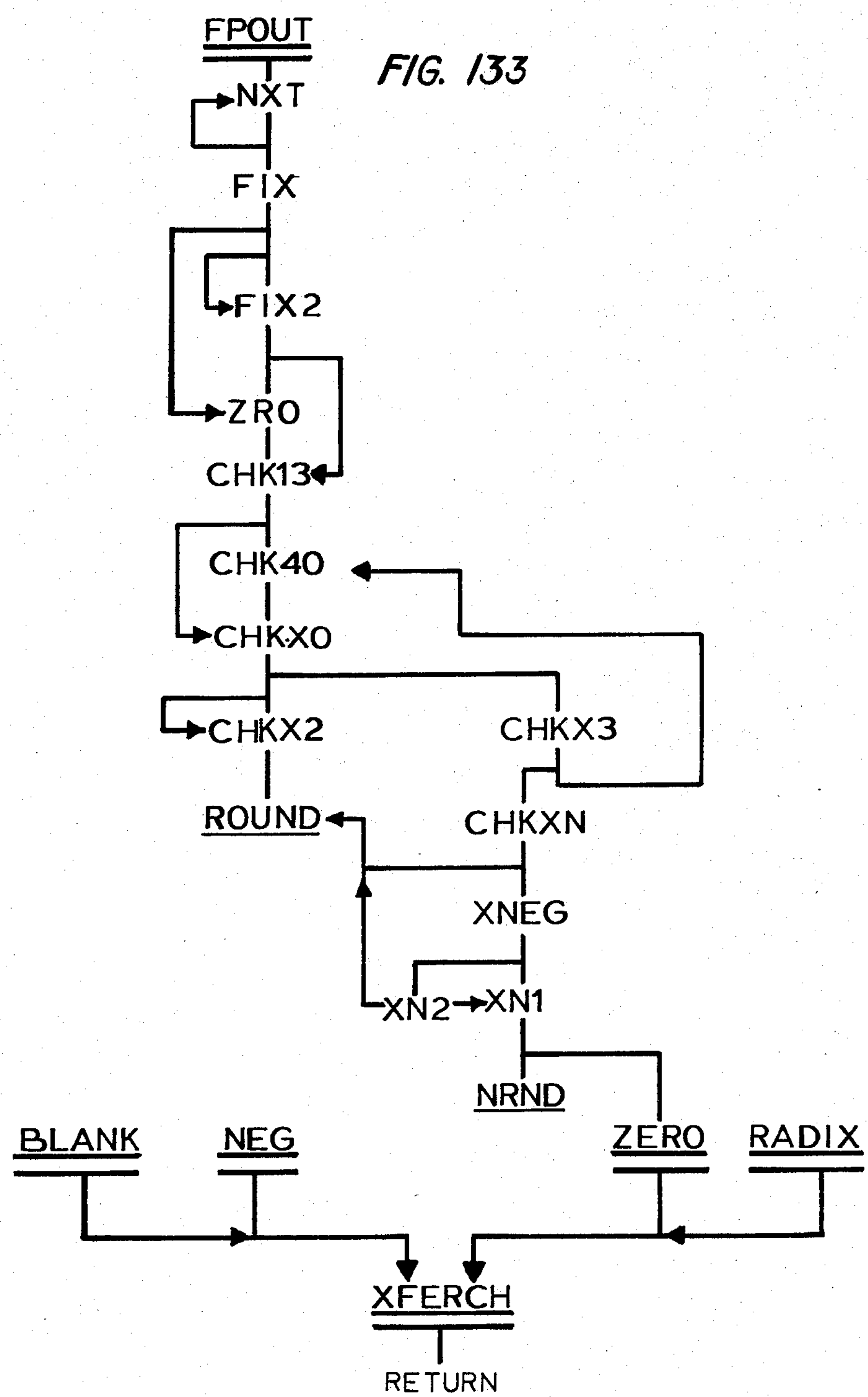
FIG. 133 is a flow chart illustrating the subroutines which combine to define the FPOUT subroutine.
Figure 134:
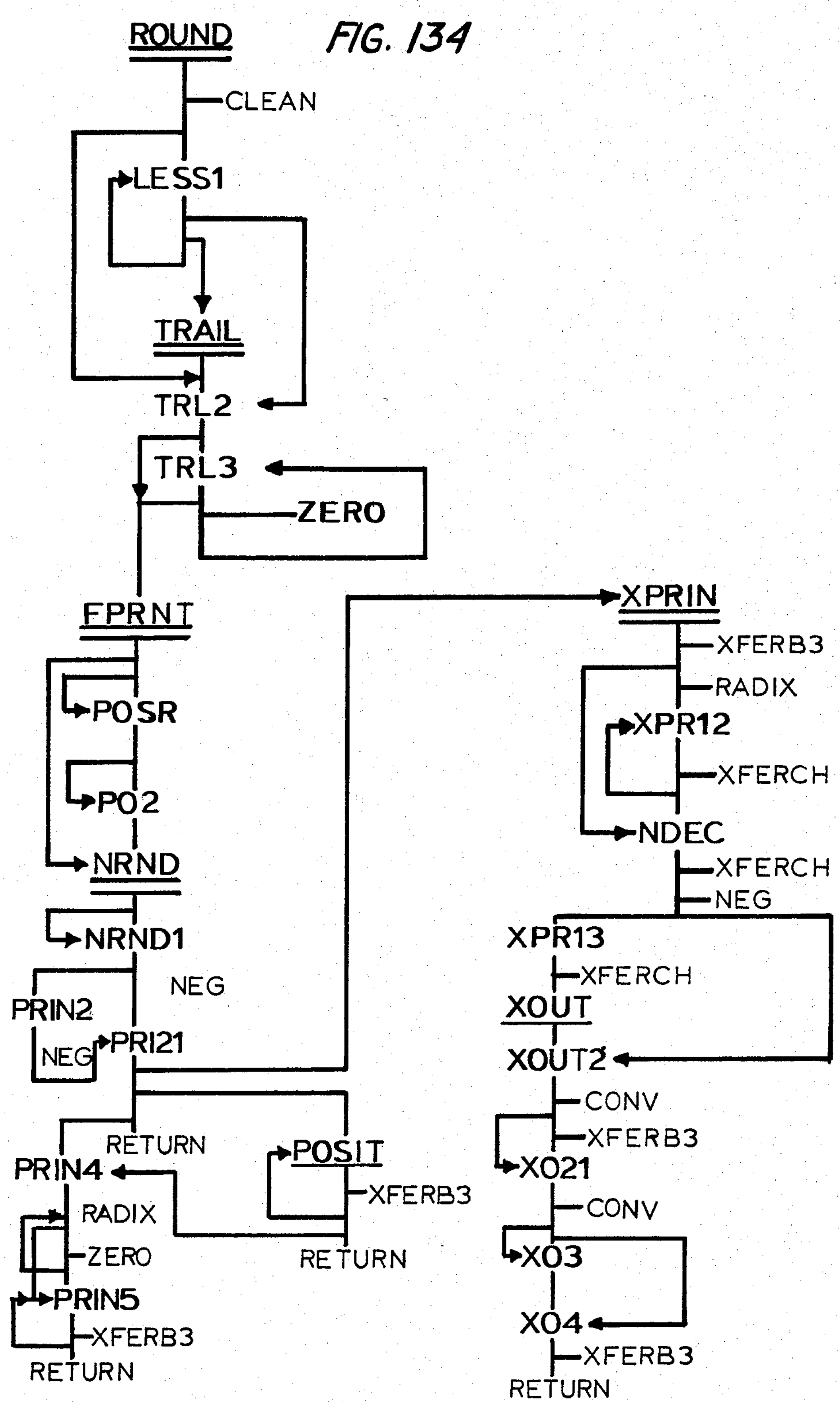
FIG. 134 is a flow chart illustrating the subroutines which combine to define the ROUND subroutine.

Referring to FIG. 113, all of the algebraic operation subroutines continue to branch COMP which completes the math package with subroutine is FPOUT, see FIG. 133. Generally, this subroutine determines what kind of floating point number exists and converts that number to hexidecimal. During this process, subroutine ROUND, see FIG. 134, is called to round the number within the parameters of the math package and prepares it for conversion into human readable form. Trailing zeros are cleared off using subroutine CLEAN, see FIG. 135, and proceeding through the TRAIL branch. The program continues to branch FPRNT to check that the number is a positive, base ten number. Then the number is rounded off. Again, the value of the rounded number is checked to make sure a negative number has not been generated. If no errors have resulted, the number is transferred to a buffer by using subroutine XFERB3, see FIG. 136, and the program returns to subroutine FPOUT. Should a negative number result, the ROUND subroutine branches to XPRIN to convert the number to a positive value and then to a decimal using subroutine CONV, see FIG. 137, among others. The output is transferred to a buffer before returning to subroutine FPOUT. Once the number has been rounded off, the COMP branch shown in FIG. 113, is completed and the program exits from the main package. As previously stated, the INLOOP subroutine retrieves all of the fields present on the display screen including those characters which require special handling. After accomplishing this task, the program returns to the major subroutine ADDREC.

Referring to the ADDREC5 branch of the major subroutine described in FIG. 84, the program continues through subroutine TRNREC. Using the escape key at this point will return the program to INITAP through branch ADDREC6. The escape key retrieves the same record again and displays the menu. If the control key is used instead, the program branches to ADDREC5 to erase the display screen and start this part of the program over again in the manner just described.

Figure 142:
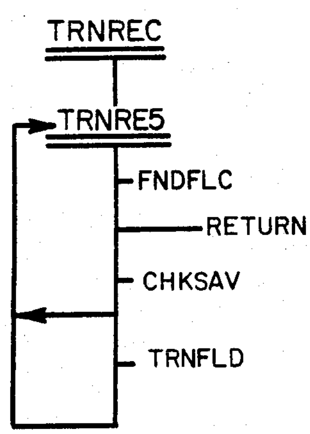
FIG. 142 is a flow chart illustrating the subroutines which combine to define the TRNREC subroutine.

The TRNREC subroutine, see FIG. 142, proceeds along the TRNREC5 branch through subroutine FNDFLC, see again the description of FIG. 56. FNDFLC finds the field specifications and checks whether the last field has been retrieved and whether there is some data in the field to be saved. The subroutine following FNDFLC is CHKSAV, described in FIG. 143, which checks the validations to identify whether the field is stored or non-stored and sets a flag accordingly. The next subroutine, TRNFLD, see FIG. 144, simply reads the contents of the field from the screen directly into the field buffer using subroutine VDREAD, see again the description of FIG. 29. The TRNREC subroutine then returns to ADDREC.

Figure 145:
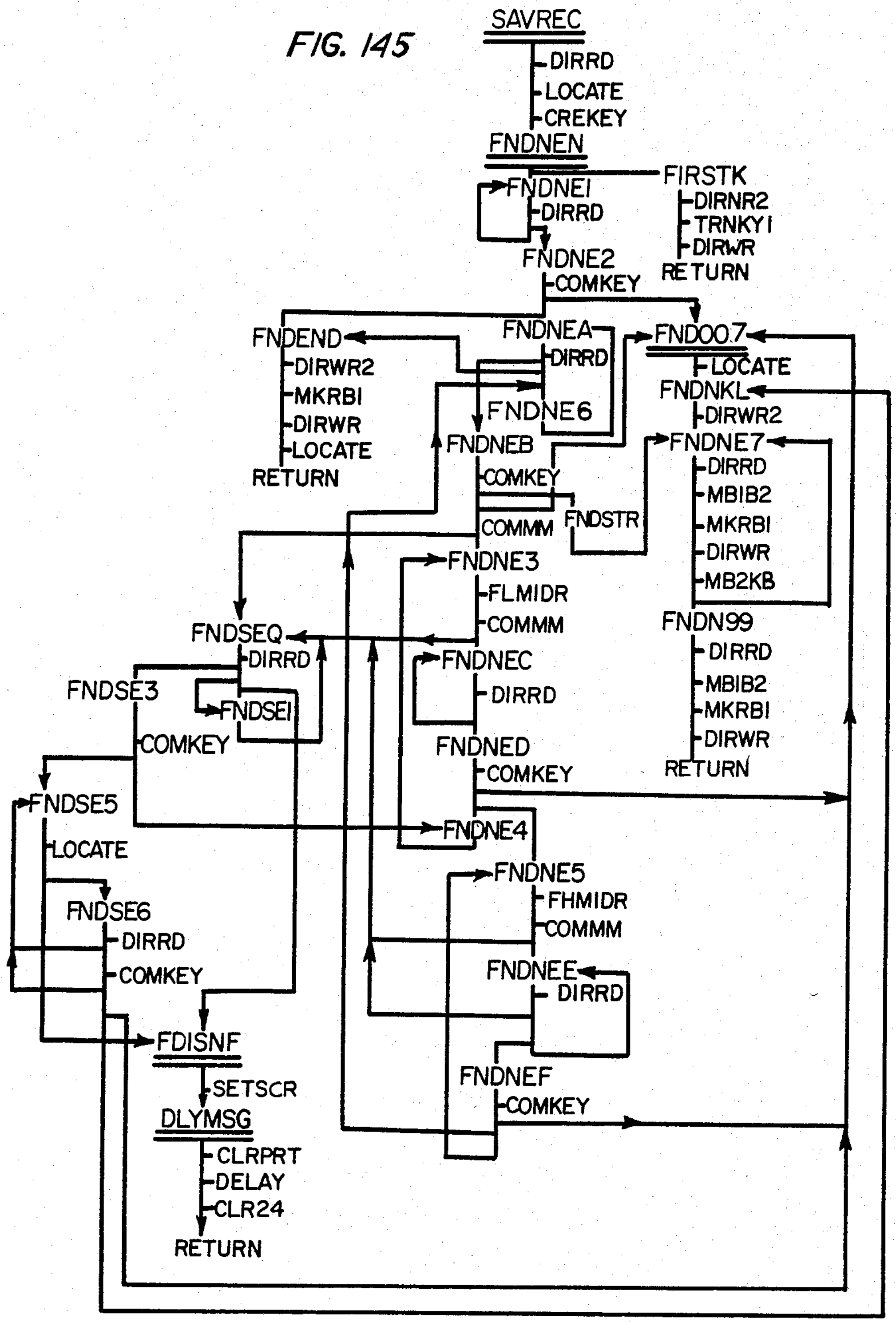
FIG. 145 is a flow chart illustrating the subroutines which combine to define the SAVREC subroutine.

Returning to FIG. 84, the next subroutine in ADDREC is SAVREC, set forth in FIG. 145. Generally, a record is saved in sequential order, appending the record to the end of the data base file without concern as to its alphabetical order. The record number, however, is appended to the key file in numerical sequence so that a binary search can find the key value and the associated record number to retrieve the record from the data base. The primary purpose of the SAVREC routine is to place the key file in the correct sequence as each record number is entered. Building the correct sequence requires SAVREC to find the closest record number in the key file. One of the advantages of AUTOGRAM is that SAVREC locates the proper place for the newest or current record number in an expanding sequence with a high degree of accuracy and without performing a large number of time-consuming searches. SAVREC also takes into account a number of special circumstances. The program avoids unnecessary searching if the first or last record of the key file is identified. The program also allows moving either forward or backward through the key file under operator control if a large number of identical record numbers are identified.

Figure 147:
FIG. 147 is a flow chart illustrating the subroutines which combine to define the TRNKYI subroutine.
Figure 146:
FIG. 146 is a flow chart illustrating the subroutines which combine to define the CREKEY subroutine.

SAVREC identifies how many records are in the current data base by directly reading the data base and locating the record last read. This is accomplished by accessing subroutines DIRRD2 and LOCATE, previously described with reference to FIGS. 80 and 81, respectively. The next subroutine, CREKEY, see FIG. 146, creates a file number to attach to the end of the key file record so that the data base record will correspond to the key file record number or key value hereinafter. Continuing down through the FNDNEN branch, the first record will be identified when the LOCATE subroutine retrieves a zero value indicating the absence of any input in the data base. For this special circumstance, the program proceeds down the FIRSTK branch. The program performs a hardward function DIRWR2 which places the first record directly into the data base. Subroutine transfer key, TRNKY1, see FIG. 147, places the newly created key value into a buffer. After the TRNKY1 subroutine, hardware function DIRWR directly writes the key value into the key file and writes the record on the floppy disk. Thus, FIRSTK branch generally performs a block move of memory, and then returns to the major subroutine ADDREC.

If the record is other than the absolute first one, the program follows the FNDNE1 branch. The first record number is read from the key file by the direct read subroutine DIRRD. If there is no error in reading the key file, the program continues down the FNDNE2 branch. Otherwise, the program loops back through the FNDNE1 branch.

Figure 148:
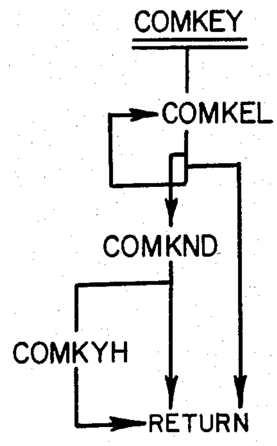
FIG. 148 is a flow chart illustrating the subroutines which combine to define the COMKEY subroutine.

The FNDNE2 branch calls upon the COMKEY subroutine, see FIG. 148. In the present embodiment, each record number is identified by three characteristics. This subroutine performs a character-by-character comparison of the key value just read and the key record value. The key value may then be higher, lower, or equal to the value of the key record. After completing the comparison, the key record value is marked accordingly for later identification by the program. If the values of the first character are equal, the COMKEY subroutine loops back to branch COMKEL. This allows retrieval of another character of the key record value so that COMKEY can eventually find a character which does not equal the character of the key value. If all the characters of the key value and current record value are equal, however, the program branches to the right and returns directly to SAVREC. If the character of the key value and the key record value are not equal, the program calls on branch COMKND. A low key value will directly return the program to SAVREC. If the key value is too high, the major subroutine ADDREC. Thus, the particular key value added is put in the appropriate position in the key file and the record is placed at the absolute end of the data base.

Figure 150:
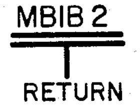
FIG. 150 is a flow chart illustrating the subroutines which combine to define the MB1B2 subroutine.

If the key value and the key record value are equal, or in other words, they are duplicate keys, then the program will follow the FND007 branch. Generally, new key records are read into the data base, shuffling previously read records down one position in the data base. The first subroutine called in this branch is LOCATE, see again FIG. 78, which retrieves the record number. The record is written into the data base as it proceeds through branch FNDNKL by supervisor function direct write DIRWR2. The program continues through branch FNDNE7 which performs a direct read to identify the record number just written by DIRWR2; sets buffer 1 equal to buffer 2 through subroutine MB1B2, as set forth in FIG. 150; sets the key record equal to buffer 1 through subroutine MKRB1, previously described with reference to FIG. 149; performs a direct write through DIRWR; and finally, sets buffer 2 equal to the key record through subroutine MB2KR, as set forth by FIG. 151. The program continues to loop through branch FNDNE7 until the last record in the data base is reached. Upon this event, branch FNDN99 is followed to perform a direct read with hardware function DIRRD; set buffer 1 equal to buffer 2 through subroutine MB1B2; sets the key record equal to buffer 1 through subroutine MKRB1; and finally, directly writes through supervisor function DIRWR, as described immediately above.

If the key value is higher than the key record value, the program branches from FNDNE2 to FNDNEA. The first function of the FNDNEA branch, DIRRD, performs a direct read. Based upon the identified value, three possible branches may be followed. The program will branch to FNDEND if the last record has been read and the program is now at the end of the data base. If the program is at the end of the file, the program branches to FNDEND to follow the subroutines previously discussed and eventually return to the major subroutine ADDREC. If the program is not at the end of the file and a valid record is read, the program branches to FNDENB and uses the subroutine COMKEY, previously discussed with reference to FIG. 148, to determine whether the key record value is equal to, less than, or greater than the data base record number. If the values are equal, the program branches to FND007 to follow the same sequence of subroutines previously described in the paragraph above. If the key record value is less than the data base record number, the program branches to FNDSTR which again takes the program to branch FNDNE7. The subroutine of the FNDEN7 branch has been previously discussed in the above paragraph. To reiterate, branch FNDNE7 places the key record in the beginning of the data base record and shuffles previously written records down one position in the data base. If the key record value is greater than the data base record number, the program calls subroutine COMMM, set forth in FIG. 152. The key record value and the data base record number are compared to determine whether or not they are greater or less than ten records apart and identifies the minimum and maximum value. If the values are ten records or less apart, the program branches to FNDSEQ which performs a sequential search.

Figure 153:
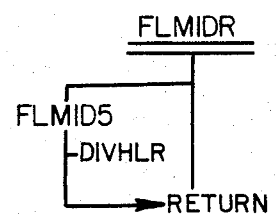
FIG. 153 is a flow chart illustrating the subroutines which combines to define the FLMIDR subroutine.
Figure 154:
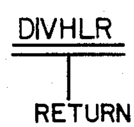
FIG. 154 is a flow chart illustrating the subroutines which combine to define the DIVHL subroutine.

The FNDSEQ branch performs a direct read DIRRD to check if this is the last record of the sequence. If it is not the last record, the program continues to branch FNDSE3 to check if the key values are equal. If the values are not equal, the program branches to FNDNE4 and then to branch FNDNE3 to identify the low mid-record. The low mid-record is a number half-way between the current minimum and maximum value. This is a self-correcting feature of the program which allows the sequential search to be modified by backing up a variable number of records before sequentially searching forward again. The low mid-record formula backs the record value past the last binary search value, which would be a maximum of sixteen records. This function is performed by the FLMIDR subroutine, see FIG. 153, which consists of branch FLMID and subroutine DIVHL, seen in FIG. 154. A comparison of the new minimum and maximum value is performed by subroutine COMMM, previously discussed with reference to FIG. 152. If these new minimum and maximum values are still less than ten records apart, the program branches to FNDSEQ, completing the search sequentially.

The FNDSEQ branch contains three options for the program to follow after performing a direct read by hardware function DIRRD. If an error results, the program goes to FNDSE3 to use the COMKEY subroutine in the manner previously described with respect to FIG. 148 and properly identify the correct record. If the key file value is lower than the data base number the program branches to FNDNE4 and FNDNE3 to retrieve another record from the data base. If the key file number was higher than the data base number, the program proceeds to branch FNDSE5 through the LOCATE subroutine, see again FIG. 81, to identify the position of the program in the record data base and increment the file key value to move one record ahead. This procedure avoids the use of the hardware function called "read next record" by this program and in its place only direct reads are used. The program then branches to FDISNF if all ten records have been sequentially searched from the maximum record and the correct position has not been identified. On the other hand, if the record is found, the program branches to FNDSE6 and performs a direct read, DIRRD. The program will then branch to FNDSE5, if a deleted record is identified. The program replaces the first character in a deleted record with an error flag. Reading the error flag will branch the program to FNDSE5. If a deleted record is not identified, the program continues through subroutine COMKEY, described with respect to FIG. 148, and performs the comparison between the key file value and the data base record number. If the data base record number is too high by comparison to the key file number, the program branches to FNDNKL and the record is inserted and the other records in the data base are shuffled down one position as previously described in the discussion regarding branch FND007. If the values are equal, the program branches to FND007 which indicates that it's a duplicate key and the record is inserted next to the record read from the data base and the other records are shuffled down. If the value is too low the program branches back to FNDNE5 and the program proceeds in the manner just described. This will complete the recording of the current record.

Figure 155:
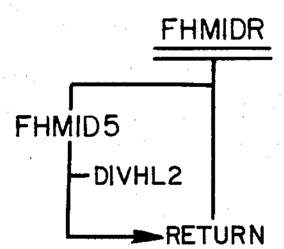
FIG. 155 is a flow chart illustrating the subroutines which combine to define the FHMIDR subroutine.

Returning back to our decision point at branch FNDNE3 of SAVREC, if the minimum and maximum values were not less than ten records apart, the program will continue to branch FNDNEC. After a direct read by DIRRD, the program loops back to FNDNEC if the record is identified as a deleted record. Otherwise, the program branches to FNDNED and calls subroutine COMKEY, see again FIG. 148, to compare the new value just read. If the values are the same, the program branches to FND007 and performs the functions previously described. If the record value is too high, the program continues down through FNDNE4 and branches back to FNDNE3. If the record value is too low, the program branches to FNDNE5 to compute a new high mid-record through subroutine FHMIDR, see FIG. 155, and then performs a comparison of the minimum and maximum value through subroutine COMMM as previously discussed. If the minimum and maximum values are less than ten records apart, the program branches to FNDSEQ and a sequential search is performed as previously described. Otherwise, the program branches to FNDNEE and the new maximum mid-record number is read by DIRRD. If it's a deleted record, the program loops back through this branch to read the next record. If the mid-record number is at the maximum value, the program branches back to FNDSEQ to perform a sequential search as previously described. If the number is neither a deleted record nor the maximum mid-record number, the program branches to FNDNEF and performs a subroutine COMKEY to compare the number against the value of the key record. If the values are equal, the program branches to FND007 and performs the function previously described. If the value is too high, the program branches to FNDNE6 to perform the functions previously described as the standard loop is reiterated. If the value is too low, the program continues back to branch FNDNE5 to find the next high mid-record as just described.

There are several important advantages incorporated in the SAVREC subroutine. First, the subroutine is capable of handling Non-unique key values, such as when duplicate records are read. Second, the program uses a combination of a binary search and a sequential search. This allows the program to quickly search for records in the data base with nearly complete accuracy. Only if multiple duplicate records existed of a quantity higher than the arbitrary cut-off number before a sequential search is chosen, and the statistically slim chance of finding the absolute first data record as the first record read could the program locate a duplicate record instead. The program also provides for a control repeat function which allows the programmer to push the program back or forward to find the very first duplicate data base record. In nearly all instances this self-correcting subroutine performs flawlessly.

When the program leaves the SAVREC subroutine after saving the record, it returns to branch ADDREC5 of the major subroutine ADDREC, clearing all the information from the screen. In turn, the ADDREC subroutine is exited through branch ADDREC6 which returns to display the menu.

Figure 157:
FIG. 157 is a flow chart illustrating the subroutines which combine to define the INKEYI subroutine.
Figure 162:
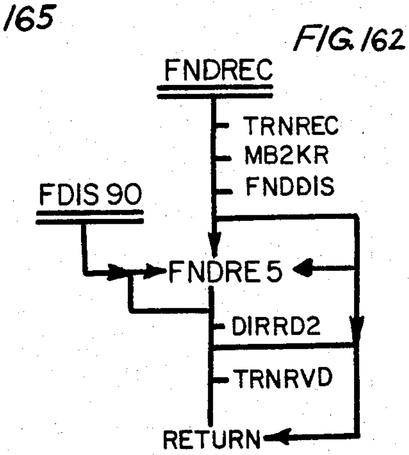
FIG. 162 is a flow chart illustrating the subroutines which combine to define the FNDREC subroutine.
Figure 156:
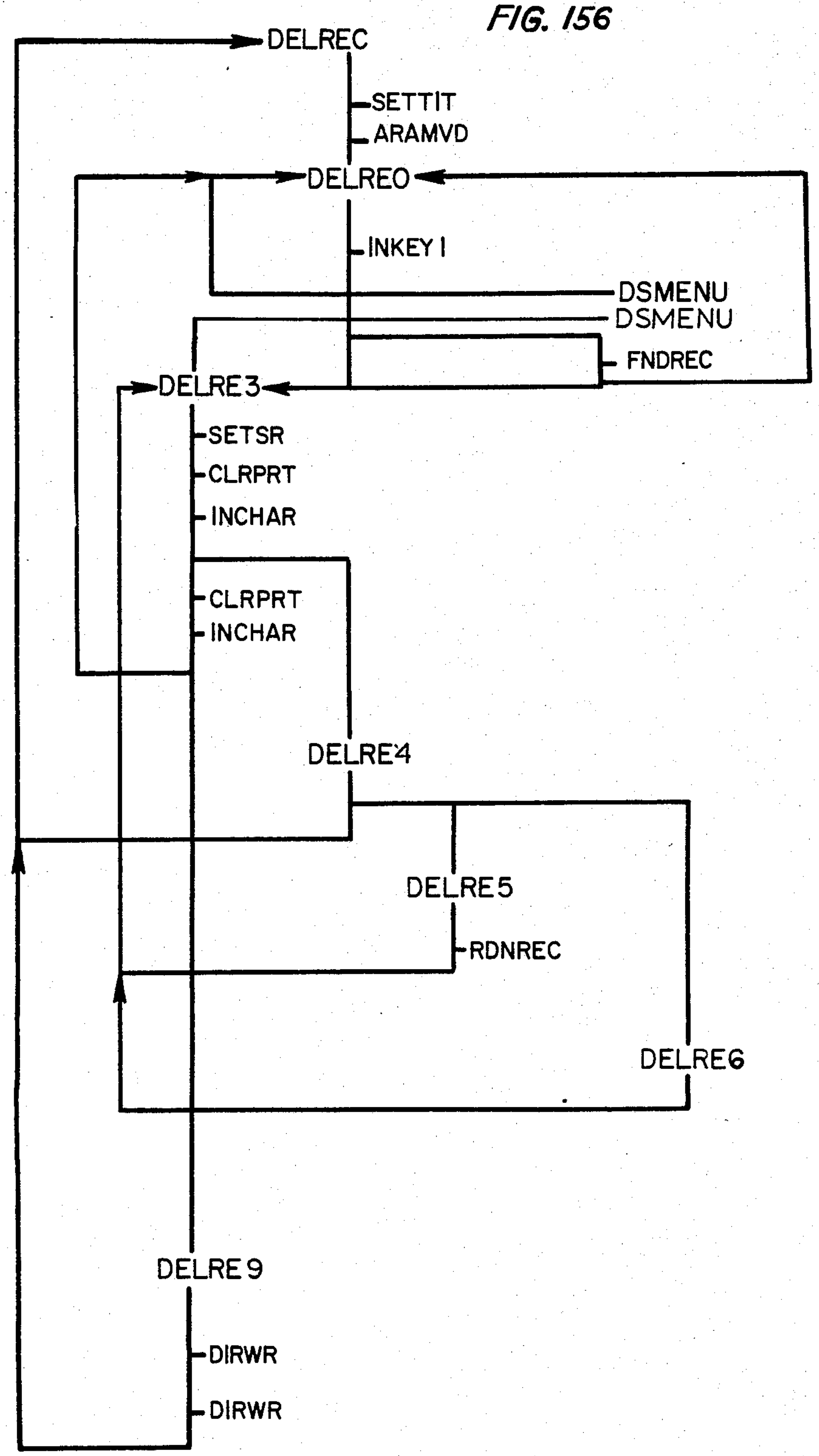
FIG. 156 is a flow chart illustrating the subroutines which combine to define the DELREC subroutine.

Returning to the INITAP routine in FIG. 74, the second major subroutine available on the menu is DELREC, described in FIG. 156, which deletes a record. The first subroutines called are SETTIT and ARAMVD, previously described with respect to FIGS. 85 and 86, which sets the title and places the RAM memory input on the display screen. The program proceeds through the branch DELRE0 to use subroutine INKEY1, see FIG. 157, which prompts input from the operator to identify the key field. The DELRE0 branch loops to accommodate the entry of more than one field. If an escape key is inputted at this point, the program returns to the DSMENU branch to display the menu upon the screen. If the return key is inputted, the program continues with the DELRE3 branch. After finding the record through FNDREC, see FIG. 162, the program continues through branch DELRE3. The subroutines SETSCR, CLRPRT, and INCHAR, previously discussed with reference to FIGS. 72, 30, and 52, respectively, sets the scroll to protect the bottom line, clears the bottom line on the screen, and prints out a message that requests whether the programmer desires to delete the record. Answering this decision point in the affirmative will continue the program through a second pair of subroutines CLRPRT and INCHAR to reiterate the question and check the response. A second affirmative answer continues to program to branch DELRE9 to delete the record with two DIRWR commands. The program then returns to the beginning of DELREC. If the initial decision point is answered in the negative, the program continues through branch DELRE4 and loops back directly to the beginning of DELREC. At the initial decision point, the programmer may also input a delete the previous record command and the program flows through branch DELRE5 and uses subroutine RDNREC, described below, if the answer previous record is given at the decision branch, the program flows to branch DELRE6 which directs the program to perform all the functions of branch DELRE3, previously discussed immediately above.

Figure 158:
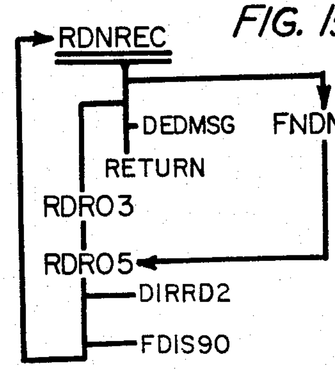
FIG. 158 is a flow chart illustrating the subroutines which combine to define the RDNREC subroutine.
Figure 159:
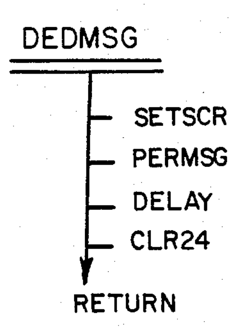
FIG. 159 is a flow chart illustrating the subroutines which combine to define the DEDMSG subroutine.

The RDNREC subroutine, set forth in FIG. 158, reads the next record in the data base, and checks the first field flag. The first entry in the data base is a special flag which alleviates the problem which would occur in most micro-computers where the first record is actually registered as zero in the data base, the first record starting at the zero position of the data base. If this is the first record in the data base, RDNREC branches to FNDNRC to print the first record and display a message stating that this is the first record in the data base. If this is the last record in the data base, the program continues through the DEDMSG subroutine, see FIG. 159, and returns to DELREC. If a valid record has been read, the program branches through RDR03 and RDR05 to read that record and return to the major subroutine DELREC.

Figure 163:
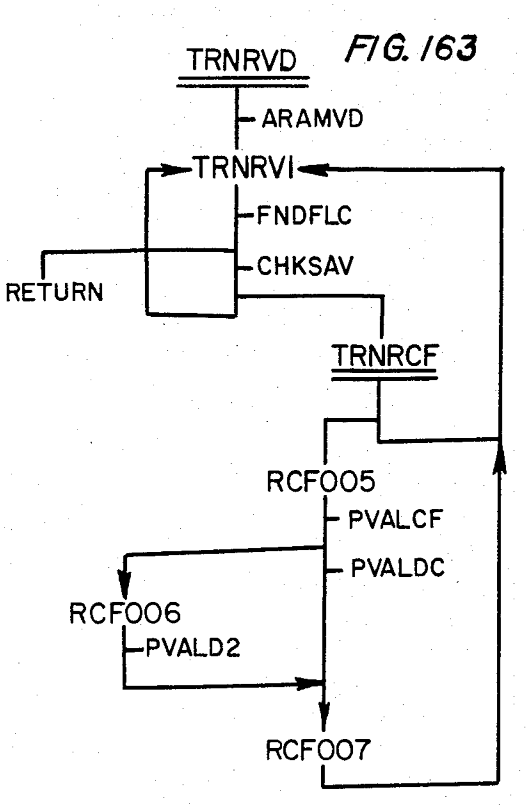
FIG. 163 is a flow chart illustrating the subroutines which combine to define the TRNRVD subroutine.
Figure 160:
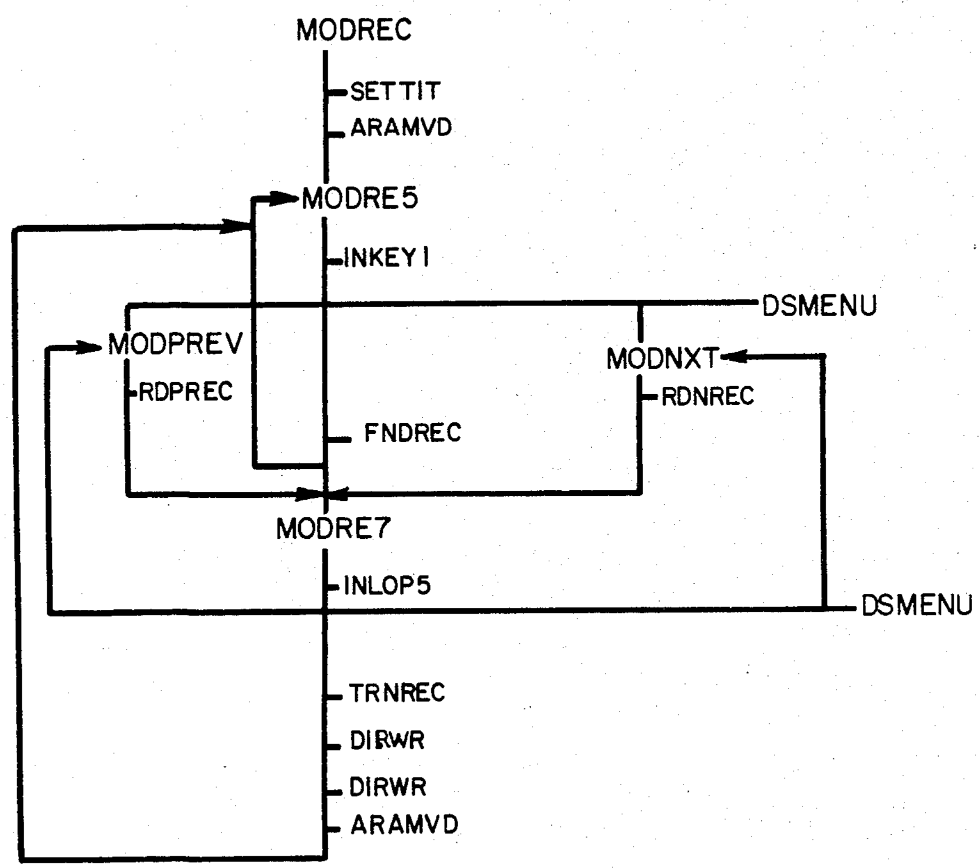
FIG. 160 is a flow chart illustrating the subroutines which combine to define the NIDREC subroutine.

Returning now to INITAP in FIG. 74, the third major subroutine on the menu is MODREC, which allows the operator to modify a record. As described in FIG. 160, MODREC sets the title and transfers the RAM memory onto the display screen by calling subroutines SETTIT and ARAMVD, previously described with FIGS. 85 and 86, respectively. The program continues through branch MODRE5 and calls subroutine INKEY1 to retrieve the value of the first field in the manner previously described with reference to FIG. 157. If the retrieved value is the escape key, the program branches to DSMENU which displays the menu once again upon the display screen. If the value is to modify the previous record, the program branches to MODPREV and calls upon subroutine RDPREC, see FIG. 161. The RDPREC subroutine takes into account the special circumstance where the record being read is actually the first record on the data base by directly reading the record through DIRRD2 and subroutine FDIS90 which branches into subroutine FNDREC, described below. Subroutine DEDMSG, described earlier with regard to FIG. 159, displays a message and then returns to branch MODRE7. In a similar fashion, if the value indicates modify next record, the program branches to MODNXT and calls subroutine RNDREC, which has been previously explained in FIG. 158. Again, the subroutine returns to branch MODRE7. If the value is the special circumstance of a return command, the program continues straight for subroutine FNDREC, see FIG. 162, which transfers the record out of the data base and puts it onto the display screen using subroutine TRNREC as previously discussed with reference to FIG. 142. FNDREC further consists of subroutine MB2KR which retrieves the data from buffer 2, converts it to a key record, and displays it on the display screen through subroutine FNDDIS. The program then proceeds through the FNDRE5 branch to determine if a partial search is to be performed. The partial search compares the values of the records to determine if they are equal or a duplicate key. If the records are not a duplicate key, the program continues to the next level of direct read, DIRRD2 and again performs a partial search to determine whether the records are equal. If they are, the program continues through subroutine TRNRVD, as described in more detail in FIG. 163. The TRNRVD subroutine reads the records into RAM memory and then performs a comparison by calling subroutines FNDFLC and CHKSAV previously described with reference to FIGS. 56 and 143, respectively. When the program returns to MODREC, referring to FIG. 160, the program will continue from branch MODRE7 through subroutine INLOP5 if there is additional data which is to be inputted and used in performing the search. For instance, in a data base directory, the name of the person alone, both the name and address, or any other combination could be used to perform the search.

Figure 165:
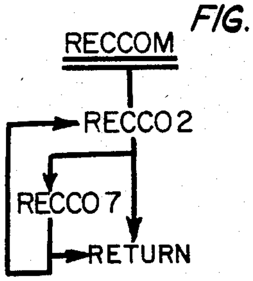
FIG. 165 is a flow chart illustrating the subroutines which combine to define the RECCOM subroutine.
Figure 164:
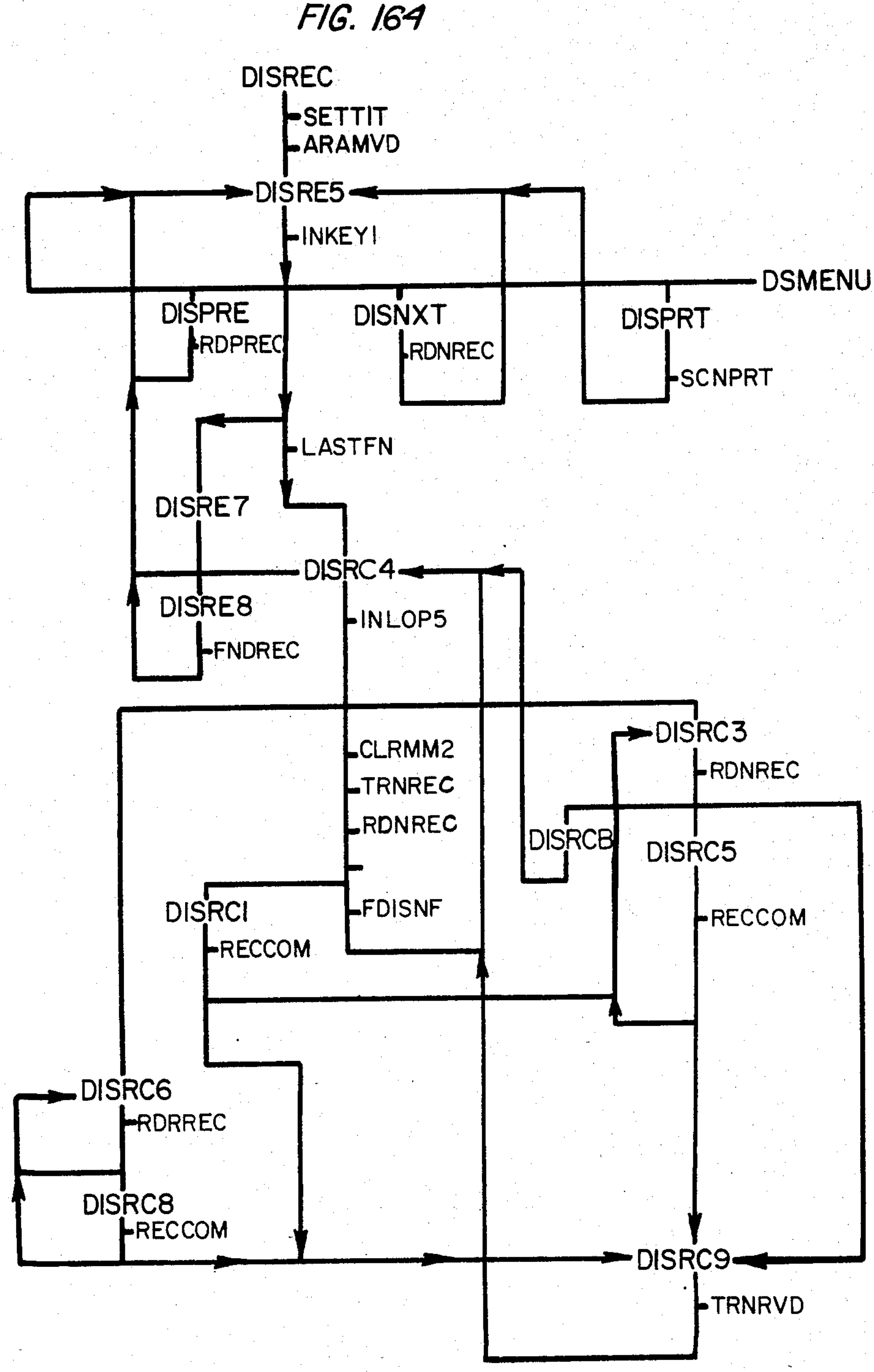
FIG. 164 is a flow chart illustrating the subroutines which combine to define the DISREC subroutine.

Returning now to FIG. 74, the fourth major subroutine on the menu of INITAP is DISREC. FIG. 164 provides a more detailed description of DISREC. The title is set on the screen by subroutine SETTIT and the RAM memory is transferred to the screen as well through subroutine ARAMVD. As the program proceeds through branch DISRE5, subroutine INKEY1 retrieves the value from the first field of the record. If the value is a read previous, the program branches through DISPRE and calls subroutine RDPREC which reads the previous record in the manner previously described with reference to FIG. 161. If the value is a read next, the program branches through DISNXT which calls subroutine RNDREC and returns back to branch DISRE5 after reading the next record. If the value was the F2 key, the program branches through DISPRT and calls subroutine SCNPRT, previously described with reference to FIG. 46, before branching back to DISRE5. If the value is the escape key, the program returns to INITAP and prints the menu upon the screen. If the value is a left arrow key, the program branches through DISRE7 and performs a key search rather than a general data search. The subroutine on branch DISRE8 is FNDREC, as earlier described with reference to FIG. 162, which enters all the data found in the various fields and locates the record based upon all of that inputted information. Then the program returns to branch DISRE5 for another search. On the other hand, if a specific key search is to be performed, the program will go through subroutine LASTFN, in the manner referenced in FIG. 91. The program proceeds through DISRC4 and calls branch INLOP5, of subroutine INLOOP previously described with reference to FIG. 87, which inputs the data from the reminder of the fields so that a general purpose search based upon something other than the key value can be performed. After branch INLOP5, the programmer is prompted to request either a read next, or a read previous command. If the record has been deleted, the program loops to find the next previous record. Otherwise, the program flows through branch DISRC8 and compares the records to see if they are equal. If they are not equal, the program goes back to branch DISRC6. If the records are equal, the program branches to DISRC9 and calls subroutine TRNRVD which transfers the RAM memory to video and takes the program back to branch DISRC4. The TRNRVD subroutine has been previously described with reference to FIG. 163. If the display next command has been inputted by the programmer, the program branches to DISRC3 which reads the next record and loops back through DISRC3 if the record has been deleted. Otherwise, the program branches through DISRC5 and performs a comparison of the records by calling upon subroutine RECCOM, see FIG. 165. If the values of the records are equal, the program flows to branch DISRC9 as previously described. If the values are not equal, the program branches back to DISRC3 to read the next record. If there are no more records in the data base of this type, the program will branch directly from DISRC3 to DISRC9 and eventually return to DISRC4. When more than one field is specified for the search, one can run out of records of all types. Thus, no records remain in the data base at all. If the latter occurs, the program will branch to DISRCB and eventually to DISRC4. The last record is then left on the screen. The programmer can also request a record transfer which is performed by subroutines CLRMM2, TRNREC and RDNREC, previously described with reference to FIGS. 6, 142, and 158 respectively, which performs the record transfer, reads the next record, screen dispays, and branches to DISRC1 to do a record comparison. Based upon that comparison the program determines whether to move forward or backwards in the data base records and return to branch DISRC3 or DISRC9.

Referring back to FIG. 74, the main routine INITAP has access to a final major routine which simply ends the AUTOGRAM program by exiting through step END99. This subroutine, previously described, closes the data bases, clears the screen, restores the break key, and terminates the program.

From the above, it is seen that there has been provided a computer program, in particular an automatic program generator, which fulfills all of the objects and advantges set forth above. The automatic program generators of the present invention create special application programs using a visual creation process which requires no textual preparation on the operator's part. The application programs are generated in a fraction of the time needed to create application programs by means of conventional programming techniques. The application program is developed in machine language without requiring a user's input program and runs independently of other programs.

It has been further demonstrated that the present invention provides automatic program generators which develop their own internal language or syntax to develop application programs. Furthermore, the need to restart a program due to errors caused by either the operator or machine are alleviated by automatically returning to the last routine in the program if an error results. In fact, sections of program code are preempted if the code was inadvertently accessed by another section of the program. Also, the application's programs are capable of performing algebraic operations using floating point notation with twenty-six significant digits and ten decimal places and can more efficiently search for and sequence data records in a data base file.

It should be understood that the present invention is not limited to the precise structure of the illustrated embodiments, it being intended that the foregoing description of the presently preferred embodiments be regarded as an ilustration rather than as a limitation of the present invention. It is the following claims, including all equivalents, which are intended to define the scope of the invention.

TABLE I

Alphabetized List of AUTOGRAMMER Subroutines

| Subroutine | FIG. No. | Sheet No. |
|---|---|---|
| ADDREC | 84 | 17 |
| ADAMVD | 86 | 16 |
| ASCDC | 118 | 29 |
| AUTOGRAM | 1 | 1 |
| BINHEX | 68 | 9 |
| BRKSET | 7 | 5 |
| BUFSET | 12 | 5 |
| CENTER | 42 | 8 |
| CFINTP | 167 | 14 |
| CHKIAV | 173 | 40 |
| CHKOVF | 112 | 24 |
| CHKPN | 120 | 25 |
| CHKSAV | 143 | 22 |
| CHKVAL | 63 | 14 |
| CLEAN | 135 | 25 |
| CLEAR | 117 | 27 |
| CLOSE | 49 | 9 |
| CLRBUR | 122 | 27 |
| CLRDC1 | 14 | 5 |
| CLRDL1 | 27 | 7 |
| CLRFPN | 115 | 27 |
| CLRMEM | 13 | 5 |
| CLRMM2 | 6 | 5 |

TABLE I-continued

Alphabetized List of AUTOGRAMMER Subroutines

| Subroutine | FIG. No. | Sheet No. |
|---|---|---|
| CLRPRT | 30 | 7 |
| CLR24 | 25 | 7 |
| COMFLS | 20 | 6 |
| COMKEY | 148 | 36 |
| COMM | 152 | 22 |
| COMPL1, COMPL2 | 21 | 6 |
| CONV | 137 | 28 |
| CORFLD | 105 | 9 |
| CRTDBS | 66 | 16 |
| CRTKYF | 67 | 13 |
| CURSON | 60 | 9 |
| DEDMSG | 159 | 36 |
| DELAY | 11 | 5 |
| DELCHR | 37 | 8 |
| DELNPT | 78 | 16 |
| DELREC | 156 | 37 |
| DIRRD2 | 80 | 16 |
| DISERR | 10 | 6 |
| DISPVL | 65 | 13 |
| DISREC | 164 | 39 |
| DIVHL | 154 | 36 |
| DIVIDE MLTPLY | 41 | 9 |
| DVINTP | 168 | 14 |
| EDCTLE | 4 | 4 |
| EDITOR | 2 | 2 |
| ENDRR5, ENDRR0 | 50 | 6 |
| EXPCK | 129 | 29 |
| FCDCB1, FCDCB2 | 76 | 16 |
| FHMIDR | 155 | 36 |
| FIXE | 119 | 27 |
| FLDVAL | 55 | 11 |
| FLMIDR | 153 | 36 |
| FNDEDP | 71 | 9 |
| FNDFLD | 54 | 10 |
| FNDFLC | 56 | 13 |
| FNDREC | 162 | 16 |
| FPDIV | 123 | 25 |
| FPIN | 116 | 28 |
| FPMUL | 131 | 31 |
| FPOUT | 133 | 32 |
| FPSUB, FPADD | 128 | 30 |
| GCURSR | 32 | 7 |
| GETFFLD | 95 | 24 |
| GETIFN | 17 | 5 |
| GETINP | 88 | 19 |
| GETOFN | 23 | 7 |
| GRAPHIC | 3 | 3 |
| GVAL | 62 | 14 |
| IBSCN | 175 | 27 |
| INAUTO | 5 | |
| INCHAR | 52 | 9 |
| INFILN | 18 | 6 |
| INKEY1 | 157 | 16 |
| INLINE, DELINE | 40 | 9 |
| INLOOP | 87 | 18 |
| INPVAL | 58 | 12 |
| INSCHR | 39 | 8 |
| INSEOV | 174 | 40 |
| INSTKN | 169 | 40 |
| INTPFA | 171 | 40 |
| INTPOA | 171 | 40 |
| INTPOP | 172 | 40 |
| KBCHAR | 33 | 7 |
| KBINIT | 24 | 7 |
| KBLINE | 141 | 6 |
| LASTFN | 91 | 22 |
| LEFT | 126 | 29 |
| LJFLD | 99 | 23 |
| LOAD | 124 | 20 |
| LOCATE | 81 | 16 |
| LOCFLD | 107 | 26 |
| LOCINT | 93 | 21 |
| LOCTKN | 108 | 26 |
| LOOKUP | 34 | 7 |
| MAPDI | 138 | 9 |

TABLE I-continued

Alphabetized List of AUTOGRAMMER Subroutines

| Subroutine | FIG. No. | Sheet No. |
|---|---|---|
| MB1B2 | 150 | 16 |
| MB2KR | 151 | 22 |
| MKRB1 | 149 | 22 |
| MODREC | 160 | 38 |
| MOVDP3 | 69 | 9 |
| MOVLFT | 100 | 24 |
| MOVRGT | 96 | 25 |
| OPEN | 47 | 9 |
| PERMSG | 70 | 9 |
| PREP | 114 | 27 |
| PREVAL | 89 | 20 |
| PRISDM, PRIDDM | 22 | 6 |
| PRMENU | 82 | 16 |
| PRTEHS | 35 | 8 |
| PRTMSG | 64 | 13 |
| PRTSGN | 75 | 16 |
| PRTTIT | 83 | 16 |
| PRVLST | 61 | 9 |
| PVAL | 184 | 34 |
| PVALCF | 176 | 34 |
| PVALDC | 177 | 34 |
| PVALRJ | 101 | 24 |
| PVALD2 | 97 | 26 |
| PVALKF | 106 | 21 |
| PVALNV | 178 | 34 |
| PVALRJ | 102 | 21 |
| PVALVF | 179 | 24 |
| PVALVN | 94 | 23 |
| PVALPW | 181 | 21 |
| PVALR6 | 182 | 21 |
| RAMVID, VIDRAM | 36 | 9 |
| RDPREC | 161 | 22 |
| READNX | 140 | 6 |
| RECCOM | 165 | 16 |
| RESCUR | 31 | 7 |
| RESL24 | 53 | 6 |
| RETCMD | 104 | 9 |
| RETCMD | 57 | 13 |
| RJFLD | 103 | 23 |
| RIGHT | 132 | 29 |
| RNDREC | 158 | 76 |
| ROUND | 134 | 33 |
| SAVCUR | 28 | 7 |
| SAVEOP | 111 | 26 |
| SAVL24 | 51 | 6 |
| SAVREC | 145 | 35 |
| SCNPRT | 46 | 7 |
| SDATAD | 45 | 8 |
| SEARCH | 43 | 6 |
| SDGRAF | 38 | 6 |
| SETBRK | 8 | 9 |
| SETKYL | 79 | 16 |
| SETSCR | 72 | 8 |
| SETTIT | 85 | 16 |
| SNGRAF | 73 | 6 |
| STORE | 127 | 29 |
| TRNABF | 110 | 26 |
| TRNGBF | 109 | 26 |
| TRNFLD | 144 | 22 |
| TRNREC | 142 | 18 |
| TRNRVD | 163 | 36 |
| TRNTTL | 77 | 16 |
| UNSEAR | 44 | 6 |
| VALFLD | 90 | 21 |
| VALF1 | 166 | 40 |
| VCOPY | 121 | 27 |
| VDCHAR | 16 | 5 |
| VDGRAF | 26 | 7 |
| VDLINE | 9 | 5 |
| VDREAD | 29 | 9 |
| VIDKEY | 139 | 6 |
| XFERB3 | 136 | 25 |
| XXADD | 125 | 29 |
| XXSUB | 130 | 29 |

```
        ;       APPLICATION PROGRAM MODEL FOR AUTOGRAMMER LEVEL 1
        ;
        ;       WRITTEN BY  RON BORTA    2/04/1981
        ;
        ;       LAST REVISION        5/07/1982          11:30 AM
        ;
                PAGE
```

PATENT APPLICATION

TITLE: AUTOGRAMMER

PATENTEE: RONALD BORTA

APPENDIX A

SERIAL NO.: 432135

CASE NO.: 82-3189

```
                TITLE   PROGRAM MODEL FOR AUTOGRAMMER LEVEL 1  CONFIDENTIAL PROPERTY OF ROKLAN CORP.
        ;
                SUBTTL  APPLIC/MAC   9/14/1981   1:30  WRITTEN BY RON BORTA   (ALL RIGHTS RESERVED)
        ;
0000'           ASEG
        ;
                ORG     3000H
        ;
                ENTRY   APPLIC
        ;
3000    APPLIC::
        ;
                PAGE
```

PATENT APPLICATION

TITLE: AUTOGRAMMER

PATENTEE: RONALD BORTA

APPENDIX A

SERIAL NO.:

CASE NO.: 82-3189

```
        ;       .XLIST
        ;THESE ARE THE CHARACTER EQUATES
        ;
008E    FNF     EQU     8EH             ;FILE NOT FOUND
00FF    EOF     EQU     0FFH            ;END OF FILE MARKER
0001    F1      EQU     01              ;FUNCTION 1 KEY
0002    F2      EQU     02              ;FUNCTION 2 KEY
0009    TAB     EQU     9               ;TAB KEY
0008    BCKSP   EQU     8               ;BACKSPACE KEY
000D    ENTER   EQU     0DH             ;ENTER (RETURN)
001B    ESC     EQU     1BH             ;ESCAPE KEY
001C    LEFTA   EQU     1CH
```

PATENT APPLICATION

TITLE: AUTOGRAMMER

PATENTEE: RONALD BORTA

APPENDIX A

SERIAL NO.:

CASE NO.: 82-3189

```
001C    LA      EQU   1CH      ;KEYBOARD LEFT ARROW KEY
001D    RIGHTA  EQU   1DH      ;KEYBOARD RIGHT ARROW KEY
001D    RA      EQU   1DH
00FC    DLA     EQU   0FCH     ;DISPLAY CHAR, CURSOR LEFT
00FD    DRA     EQU   0FDH     ;DISPLAY CHAR, CURSOR RIGHT
001E    UPA     EQU   1EH
001F    DNA     EQU   1FH
001F    DOWNA   EQU   1FH
0020    SPACE   EQU   20H      ;SPACE BAR
0014    CNTLT   EQU   14H      ;HOME CURSOR
000E    CNTLN   EQU   14       ;CONTROL N
0010    CNTLP   EQU   16       ;CONTROL P
005B    BFIELD  EQU   5BH      ;BEGINNING OF PROMPTED FIELD
005D    EFIELD  EQU   5DH      ;END OF PROMPTED FIELD
007B    SFIELD  EQU   7BH      ;START OF NON-PROMPTED FIELD
007D    FFIELD  EQU   7DH      ;FINISH OF NON-PROMPTED FIELD
007E    WFIELD  EQU   7EH      ;WHOLE FIELD, NON-PROMPTED
0019    CNTLY   EQU   25       ;CONTROL Y
001A    CNTLZ   EQU   26       ;CONTROL Z
007F    EOV     EQU   7FH      ;END OF VALIDATION MARKER
0007    RL      EQU   7        ;LOCATION OF RECORD LENGTH IN PL
008E    SELO    EQU   8EH
00EF    DSLPRT  EQU   0EFH
00E4    DRSTAT  EQU   0E4H
008F    SELNUL  EQU   8FH
        ;THESE ARE THE SUPERVISOR COMMAND EQUATES
0000    SINTIO  EQU   0        ;INITIALIZE ALL I/O DRIVERS
0001    SKBINT  EQU   1        ;CLEAR STORED KEYSTROKES
0002    SSTUSR  EQU   2        ;SETUP A USER DEFINED SVC
0003    SSTBRK  EQU   3        ;SETS UP A BREAK KEY PROCESSING PROGRAM
0004    SKBCHR  EQU   4        ;GETS A CHAR FROM THE KEYBOARD
0005    SKBLIN  EQU   5        ;GET A LINE FROM KEYBOARD
0006    SDELAY  EQU   6        ;PROVIDES A DELAY LOOP
0007    SVDINT  EQU   7        ;INITIALIZES DISPLAY
0008    SVDCHR  EQU   8        ;SEND A CHAR, SCROLL MODE
0009    SVDLIN  EQU   9        ;SEND A LINE, SCROLL MODE
000A    SVDGRF  EQU   10       ;SEND A CHAR, GRAPHICS MODE
000B    SVDRED  EQU   11       ;READS CHAR, GRAPHICS MODE
000C    SVDKEY  EQU   12       ;DISPLAY MSG AND GET LINE FROM KEYBOARD
000F    SDSKID  EQU   15       ;READS A DISKETTE ID
0011    SPRINT  EQU   17       ;INITIALIZES THE PRINTER DRIVER
0012    SPRCHR  EQU   18       ;SANDS A CHARACTER TO THE PRINTER
0013    SPRLIN  EQU   19       ;SENDS A LINE TO THE PRINTER
0014    SRANDM  EQU   20       ;PROVIDES A RANDOM NUMBER, RANGE- 0,254
0015    SBNDEC  EQU   21       ;CONVERTS BIN TO ASCII, AND VICE-VERSA
0016    SSTCMP  EQU   22       ;COMPARES TWO TEXT STRINGS
0017    SMPYDV  EQU   23       ;PERFORMS 8*16 MULT AND 16/8 DIVISION
0018    SBNHEX  EQU   24       ;CONVERTS BIN TO ASCII HEX AND VICE-VERSA
0019    STIMER  EQU   25       ;SET TIMER TO INTERRUPT PROGRAM
001A    SCURSR  EQU   26       ;TURNS CURSOR ON OR OFF
001B    SCROLL  EQU   27       ;SETS LINES AT TOP WHICH ARE NOT SCROLLED
```

```
001C    SLOKUP  EQU    28        ;SEARCHES THROUGH A TABLE
001D    SHLDKY  EQU    29        ;PROCESS HOLD KEY
0021    SLOCAT  EQU    33        ;RETURNS THE CURRENT RECORD NUMBER
0022    SRDNXT  EQU    34        ;GETS NEXT RECORD (SEQUANTIAL ACCESS)
0023    SDIRRD  EQU    35        ;READS SPECIFIED RECORD (DIRRECT ACCESS)
0024    SJPDOS  EQU    36        ;RETURNS TO TRSDOS (TRSDOS READY)
0025    SDSCMD  EQU    37        ;SENDS TRSDOS A CMD AND RETURNS TO TRSDOR READY
0026    SRTCMD  EQU    38        ;SENDS TRSDOS A CMD AND RETURNS TO CALLER
0027    SERROR  EQU    39        ;DISPLAYS ERROR NUMBER
0028    SOPEN   EQU    40        ;SETS UP ACCESS TO NEW OR EXISTING FILE
0029    SKILL   EQU    41        ;DELETES THE FILE FROM THE DIRECTORY
002A    SCLOSE  EQU    42        ;TERMINATES ACCESS TO AN OPEN FILE
002B    SWRNXT  EQU    43        ;WRITES NEXT RECORD (SEQUENTIAL ACCESS)
002C    SDIRWR  EQU    44        ;WRITES SPECIFIED RECORD (DIRECT ACCESS)
002D    SDATE   EQU    45        ;SETS OR RETURNS TIME AND DATE
002F    SRNAME  EQU    47        ;RENAMES A FILE
0030    SPARSR  EQU    48        ;FINDS AN ALPHANUMERIC PARAMETER FIELD
0031    SSTSCN  EQU    49        ;LOOK FOR A SPECIFIED STRING IN A TEXT BUFFER
0033    SWILD   EQU    51        ;COMPARES A FILE SPECIFICATION WITH A WILD CARD
0034    SERMSG  EQU    52        ;RETURNS ERROR MESSAGE TO BUFFER
0035    SRAMDR  EQU    53        ;GETS DIRECTORY INFORMATION INTO RAM
0037    SRS232  EQU    55        ;SET OR TURN OFF CHANNEL A OR B FOR SERIAL COM
0038    SSORT   EQU    56        ;SORTS A LIST IN RAM
0039    SCLRXT  EQU    57        ;CLEAR RAM AND RETURN TO TRSDOS
003A    SFLPTR  EQU    58        ;GETS POINTERS OF AN OPEN FILE
005E    SVDRAM  EQU    94        ;VIDEO/RAM TRANSFER
005F    SPRCTL  EQU    95        ;CONTROLS PRINTER OPERATIONS
0060    SARCV   EQU    96        ;CHANNEL A RECEIVE
0061    SATX    EQU    97        ;CHANNEL A TRANSMIT
0062    SBRCV   EQU    98        ;CHANNEL B RECEIVE
0063    SBTX    EQU    99        ;CHANNEL B TRANSMIT
0064    SACTRL  EQU    100       ;CHANNEL A CONTROL
0065    SBCTRL  EQU    101       ;CHANNEL B CONTROL
00B1    ACTOKN  EQU    0B1H      ;ABSOLUTE CHARACTER
00B2    IVTOKN  EQU    0B2H      ;INVISIBLE FIELD
00B3    CFTOKN  EQU    0B3H      ;COMPUTED FIELD
00B4    HSTOKN  EQU    0B4H      ;HELP SCREEN
00B5    DVTOKN  EQU    0B5H      ;DEFAULT VALUE
00B6    INTOKN  EQU    0B6H      ;INPUT FIELD
00B7    KFTOKN  EQU    0B7H      ;KEF FIELD
00B8    DSTOKN  EQU    0B8H      ;DISPATCH FIELD
00B9    DPTOKN  EQU    0B9H      ;DISPATCH PROGRAM
00BC    DFTOKN  EQU    0BCH      ;DISPATCH FIELD
00BA    PWTOKN  EQU    0BAH      ;PASSWORD FIELD
00BB    RGTOKN  EQU    0BBH      ;RANGE
                PAGE
                .LIST
                EXTRN  MADD,MSUB,MDIV,MMUL,ENDAPP,PREADD
                EXTRN  BUFF1,BUFF2,BUFF3,GRAMT,PRTTIT,DBRECL
        ;
                EXTRN  VDCHAR,SETSCR,PRTSGN,CLRDC1,CLRDC2,FLDCB1
                EXTRN  FLDCB2,FNDRET,COMFLS,COMPL1,COMPL2,TRNTTL
```

```
                              EXTRN   DELNPT,SETKYL,BRKSET,OPEN,LOCATE,CLRMM2
                              EXTRN   DELAY,PRMENU,KBCHAR,END999,SETTIT,ARAMVD
                              EXTRN   TRNREC,INKEY1,DIRWR,VDGRAF,WRITNX,DIRRD
                              EXTRN   CORFLD,FNDRE5,COMKEY,FNDFLC,INCHAR,GETFLD,PUTFLD
                              EXTRN   LJFLD,RJFLD,FNDREC,RDPREC,RDNREC,REVFLD
                              EXTRN   TRNRV1,TRNRVD,TRNKY1,CREKEY,LASTFN
                              EXTRN   SCNPRT,CLRPRT,CLR24,FLMIDR,FHMIDR,PARSCH,EOFMRK
                              EXTRN   MB1B2,MKR31,MB2KR,MB2B1
                      ;
                              EXTRN   DCB1,DCB2,RBUF1,RBUF2,FBUF1,FBUF2,PL1,PL2
                              EXTRN   DBSRCN,FIRSTF,CURRCN,MINRCN,MAXRCN,DATRCN,PRERCN
                              EXTRN   INPLEN,MINCOL,CURFDN,FLDBUF,SAVFDN,OPERAT
                              EXTRN   VALPTR,CURFLN,FLOCPR,INTVAL,TRNRE5,RBPNTR,READNX
                              EXTRN   MODFLG,KEYLEN,MSGBUF,STSCAN,MOVLO1,MOVRGT,PERMSG
                              EXTRN   SERNO7,PRTSNU,SERNO9
                              EXTRN   MNTITL,FLDTBL,VALIDS,APRSCN,APPNME
                      ;
                      ;
3000   18 10                  JR      INITAP
3002   0000*                  DW      MNTITL
3004   0000*                  DW      FLDTBL
3006   0000*                  DW      VALIDS
3008   0000*                  DW      INTVAL
300A   0000*                  DW      APRSCN
300C   0000*                  DW      PL1
300E   0000*                  DW      PL2
3010   0000*                  DW      APPNME
                      ;
                      ;
                      ;INITIALIZE
                      ;
3012                  INITAP:
3012   06 1B                  LD      B,ESC
3014   CD 0000*               CALL    VDCHAR          ;CLEAR SCREEN
3017   CD 0000*               CALL    SETSCR          ;SET SCROLL TO PROTECT 23 LINES
301A   01 0000                LD      BC,0
301D   ED 43 0000*            LD      (CURRCN),BC
3021   CD 0000*               CALL    PRTSGN          ;PRINT SIGN-ON MESSAGE
3024   3E 00                  LD      A,0
3026   32 0000*               LD      (FIRSTF),A
3029   CD 0000*               CALL    CLRDC1          ;CLEAR DCB1 AND PL1
302C   CD 0000*               CALL    CLRDC2          ;CLEAR DCB2 AND PL2
302F   CD 0000*               CALL    FLDCB1          ;FILL DCB1 WITH APPNME
3032   CD 0000*               CALL    FLDCB2          ;FILL DCB2 WITH APPNME
3035   11 0000*               LD      DE,DCB1         ;KEY FILE
3038   CD 0000*               CALL    FNDRET          ;FIND END OF NAME
303B   21 3E77                LD      HL,KYCOMP       ;COMPLETION OF FILESPEC
303E   CD 0000*               CALL    COMFLS          ;COPMLETE FILESPEC
3041   11 0000*               LD      DE,DCB2         ;DATABASE FILE
3044   CD 0000*               CALL    FNDRET          ;FIND END OF NAME
3047   21 3E71                LD      HL,DBCOMP       ;COMPLETION OF DATABASE FILESPEC
304A   CD 0000*               CALL    COMFLS          ;COMPLETE FILESPEC
```

```
304D   21 40CE                        LD      HL,KY1PL1      ;PARAMETER LIST FOR KEY FILE
3050   CD 0000*                       CALL    COMPL1         ;COMPLETE PARAMETER LIST #1
3053   21 4009                        LD      HL,DBSPL2      ;PARAMETER LIST FOR DATABASE FILE
3056   CD 0000*                       CALL    COMPL2         ;COMPLETE PARAMETER LIST #2
3059   CD 0000*                       CALL    TRNTTL         ;SAVE TITLE
305C   CD 0000*                       CALL    DELNPT         ;DELETE NON-PROMPTS
305F   CD 0000*                       CALL    SETKYL         ;SET KEY LENGTH
3062   CD 0000*                       CALL    BRKSET         ;SET NEW ROUTINE FOR BREAK KEY
3065   3A 0000*                       LD      A,(DBRECL)
3068   FE 00                          CP      0
306A   28 28                          JR      Z,INITA5
306C   11 0000*                       LD      DE,DCB2
306F   21 0000*                       LD      HL,PL2
3072   CD 0000*                       CALL    OPEN           ;OPEN DATABASE FILE
3075   11 0000*                       LD      DE,DCB1
3078   21 0000*                       LD      HL,PL1
307B   CD 0000*                       CALL    OPEN           ;OPEN DATABASE KEY FILE
307E   3E 00                          LD      A,0
3080   32 0000*                       LD      (GRAMT),A
3083   11 0000*                       LD      DE,DCB2
3086   01 FFFF                        LD      BC,0FFFFH
3089   CD 382D                        CALL    DIRRD2
308C   11 0000*                       LD      DE,DCB2
308F   CD 0000*                       CALL    LOCATE
3092   0B                             DEC     BC
3093   ED 43 0000*                    LD      (DATRCN),BC
3097                          INITA5:
3097   21 0000*                       LD      HL,MSGBUF
309A   01 004F                        LD      BC,79
309D   CD 0000*                       CALL    CLRMM2
30A0   01 0BB8                        LD      BC,3000
30A3   CD 0000*                       CALL    DELAY
30A6   06 1E                          LD      B,1EH
30A8   CD 0000*                       CALL    VDCHAR
                              ;DISPLAY THE MENU AND GET SELECTION. GOTO SELECTION
                              ;
30AB                          DSMENU:
30AB   3E 00                          LD      A,0
30AD   32 0000*                       LD      (MODFLG),A
30B0   32 0000*                       LD      (PARSCH),A
30B3   32 3D7F                        LD      (SPFLAG),A
30B6   32 0000*                       LD      (EOFMRK),A
30B9   3A 0000*                       LD      A,(DBRECL)
30BC   FE 00                          CP      0
30BE   28 20                          JR      Z,ADDREC
30C0   CD 0000*                       CALL    PRMENU         ;DISPLAY MENU
30C3                          DSMEN2::
30C3   CD 0000*                       CALL    INCHAR         ;GET A CHAR FROM KEYBOARD
30C6   FE 31                          CP      "1"
30C8   28 16                          JR      Z,ADDREC       ;ADD A RECORD
30CA   FE 32                          CP      "2"
```

```
30CC    28 5F              JR      Z,DELREC       ;DELETE A REDORD
30CE    FE 33              CP      "3"
30D0    CA 3182            JP      Z,MODREC       ;MODIFY A RECORD
30D3    FE 34              CP      "4"
30D5    CA 321D            JP      Z,DISREC       ;DISPLAY A RECORD
30D8    FE 35              CP      "5"
30DA    CA 0000*           JP      Z,END999       ;END THE PROGRAM
30DD    18 E4              JR      DSMEN2
30DF                SNMBR3::
30DF    30                 DB      "0"
                    ;
                    ;ADD A RECORD TO DATABASE AND A KEY TO KEY FILE
30E0                ADDREC:
30E0    3A 0000*           LD      A,(DBRECL)
30E3    FE 00              CP      0
30E5    20 10              JR      NZ,ADREC4
30E7                ADREC3:
30E7    06 1E              LD      B,1EH
30E9    CD 0000*           CALL    VDCHAR
30EC    CD 0000*           CALL    ARAMVD
30EF    CD 0000*           CALL    PRTTIT
30F2    CD 3444            CALL    INLOOP
30F5    18 F0              JR      ADREC3
30F7                ADREC4:
30F7    ED 4B 0000*        LD      BC,(CURRCN)
30FB    ED 43 0000*        LD      (PREADD),BC
30FF    21 3FED            LD      HL,ADDMSG      ;ADD A RECORD MESSAGE
3102    CD 0000*           CALL    SETTIT         ;USE FOR A TITLE
3105                ADREC5:
3105    CD 000C*           CALL    ARAMVD         ;TRANSFER RAM TO VIDEO
3108    CD 3444            CALL    INLOOP         ;GET AN INPUT FOR EACH FIELD
310B    FE 1B              CP      ESC            ;WAS RETURN CAUSED BY ESC ?
310D    CA 3122            JP      Z,ADREC6
3110    FE 10              CP      CNTLP
3112    CA 3105            JP      Z,ADREC5
3115    FE 0E              CP      CNTLN
3117    CA 3105            JP      Z,ADREC5
311A    CD 0000*           CALL    TRNREC
311D    CD 35B2            CALL    SAVREC         ;DATA ENTR COMPLETE, SAVE RECORD
3120    18 E3              JR      ADREC5         ;LOOP TIL ESC
3122                ADREC6:
3122    ED 43 0000*        LD      BC,(PREADD)
3126    ED 43 0000*        LD      (CURRCN),BC
312A    C3 30A6            JP      DSMENU
                    ;
                    ;
                    ;
                    ;DELETE A RECORD FROM THE DATABASE AND MAKE AN ENTRY IN AVAILBLE
                    ;RECORD FILE
                    ;
312D                DELREC:
312D    21 401D            LD      HL,DELMSG      ;DELETE A RECORD MESSAGE
```

```
3130  CD 0000*      05660          CALL  SETTIT        ;SET SCREEN TITLE
3133  CD 0000*      05880          CALL  ARAMVD        ;TRANSFER RAM TO VIDEO
3136                05900  DELRE0:
3136  CD 0000*      05920          CALL  INKEY1        ;GET AN INPUT FOR KY1 FILE
3139  FE 1B         05940          CP    ESC
313B  CA 30A6       05960          JP    Z,DSMENU
313E  FE 10         05980          CP    CNTLP         ;FIND PREVIOUS
3140  CA 318C       06000          JP    Z,DELRE6
3143  FE 0E         06020          CP    CNTLN         ;FIND NEXT
3145  CA 3186       06040          JP    Z,DELRE5
3148  3A 0000*      06060          LD    A,(INPLEN)    ;LENGTH OF INPUT
314B  CA 3136       06080          JP    Z,DELRE0
314E  CD 0000*      06100          CALL  FNDREC        ;FIND RECORD BY KEY
3151  FE 8E         06120          CP    FNF           ;CHECK FOR FILE NOT FOUND
3153  CA 3136       06140          JP    Z,DELRE0
3156                06160  DELRE3:
3156  CD 0000*      06180          CALL  SETSCR
3159  21 41E8       06200          LD    HL,DNPMSG     ;DELETE,NEXT,PREVIOUS MESSAGE
315C  CD 0000*      06220          CALL  CLRPRT        ;PRINT MESSAGE
315F  CD 0000*      06240          CALL  INCHAR        ;GET INPUT CHAR
3162  FE 44         06260          CP    "D"           ;DELETE ?
3164  20 11         06280          JR    NZ,DELRE4     ;NO, JUMP
3166  21 4218       06300          LD    HL,DFSMSG     ;DELETE FOR SURE ?
3169  CD 0000*      06320          CALL  CLRPRT        ;LAST CHANCE TO ABORT
316C  CD 0000*      06340          CALL  INCHAR        ;GET INPUT CHAR
316F  FE 59         06360          CP    "Y"
3171  CA 3191       06380          JP    Z,DELRE9      ;DELETE THIS RECORD
3174  C3 3136       06400          JP    DELRE0        ;ABORT , TRY AGAIN
3177                06420  DELRE4:
3177  FE 50         06440          CP    "P"
3179  28 11         06460          JR    Z,DELRE6
317B  FE 4E         06480          CP    "N"
317D  28 07         06500          JR    Z,DELRE5
317F  FE 1B         06520          CP    ESC
3181  CA 312D       06540          JP    Z,DELREC
3184  18 D0         06560          JR    DELRE3
3186                06580  DELRE5:
3186  CD 0000*      06600          CALL  RDNREC        ;READ NEXT RECORD
3189  C3 3156       06620          JP    DELRE3
318C                06640  DELRE6:
318C  CD 0000*      06660          CALL  RDPREC        ;READ PREVIOUS RECORD
318F  18 C5         06680          JR    DELRE3
3191                06700  DELRE9:
3191  3E FF         06720          LD    A,EOF
3193  21 0000*      06740          LD    HL,RBUF1      ;KEY RECORD
3196  77            06760          LD    (HL),A        ;DELETE CHAR INTO RECORD
3197  21 0000*      06780          LD    HL,RBUF2      ;DATA RECORD
319A  77            06800          LD    (HL),A        ;DELETE CHAR INTO RECORD
319B  11 0000*      06820          LD    DE,DCB1       ;KEY RECORD
319E  ED 4B 0000*   06840          LD    BC,(CURRCN)   ;CURRENT RECORD NUMBER
31A2  CD 0000*      06860          CALL  DIRWR         ;WRITE WITH DELETE CHAR
31A5  11 0000*      06880          LD    DE,DCB2
```

```
31A3  ED 4B 0000*           LD    BC,(DBSRCN)   ;DATABASE RECORD NUMBER
31AC  CD 0000*              CALL  DIRWR         ;WRITE WITH DELETE CHAR
31AF  C3 312D               JP    DELREC
                    ;
                    ;
                    ;
                    ;MODIFY A RECORD. FIND A RECORD BY KEY FIELD DISPLAY IT, AND INPUT
                    ;ANY CHANGES. SAVE NEW DATA IN OLD DATA RECORD
                    ;
31B2                MODREC:
31B2  3E FF                 LD    A,EOF
31B4  32 0000*              LD    (MODFLG),A
31B7  32 3D7F               LD    (SPFLAG),A
31BA  21 404D               LD    HL,MODMSG     ;MODIFY A RECORD TITLE
31BD  CD 0000*              CALL  SETTIT
31C0  CD 0000*              CALL  ARAMVD
31C3                MODRE5:
31C3  CD 0000*              CALL  INKEY1        ;GET KEY VALUE
31C6  FE 10                 CP    CNTLP
31C8  28 49                 JR    Z,MODPRV
31CA  FE 0E                 CP    CNTLN
31CC  28 4A                 JR    Z,MODNXT
31CE  FE 1B                 CP    ESC
31D0  CA 30AB               JP    Z,DSMENU
31D3  3A 0000*              LD    A,(INPLEN)
31D6  FE 00                 CP    0
31D8  28 E9                 JR    Z,MODRE5
31DA  CD 0000*              CALL  FNDREC        ;FIND RECORD BY KEY
31DD  FE 8E                 CP    FNF
31DF  28 E2                 JR    Z,MODRE5
31E1                MODRE7:
31E1  3E 01                 LD    A,1           ;SKIP FIRST FIELD
31E3  32 0000*              LD    (CURFDN),A
31E6  CD 3449               CALL  INLOP5
31E9  FE 10                 CP    CNTLP
31EB  28 26                 JR    Z,MODPRV
31ED  FE 0E                 CP    CNTLN
31EF  CA 3218               JP    Z,MODNXT
31F2  FE 1B                 CP    ESC
31F4  CA 30AB               JP    Z,DSMENU
31F7  CD 0000*              CALL  TRNREC
31FA  11 0000*              LD    DE,DCB1
31FD  ED 4B 0000*           LD    BC,(CURRCN)
3201  CD 0000*              CALL  DIRWR
3204  11 0000*              LD    DE,DCB2
3207  ED 4B 0000*           LD    BC,(DBSRCN)
320B  CD 0000*              CALL  DIRWR
320E  CD 0000*              CALL  ARAMVD
3211  18 B0                 JR    MODRE5
                    ;
3213                MODPRV:
```

```
3213   CD 0000*              CALL    RDPREC
3216   18 C9                 JR      MODRE7
                   ;
3218               MODNXT:
3218   CD 0000*              CALL    RDNREC
321B   18 C4                 JR      MODRE7
                   ;
                   ;DISPLAY A RECURD. FIND A RECORD BY KEY FIELD AND DISPLAY IT
                   ;
321D               DISREC:
321D   3E FF                 LD      A,EOF
321F   32 3D7F               LD      (SPFLAG),A
3222   21 407D               LD      HL,DISMSG       ;DISPLAY RECORD MESSAGE
3225   CD 0000*              CALL    SETTIT          ;MAKE IT A TITLE
3228   CD 0000*              CALL    ARAMVD          ;DISPLAY SCREEN
322B               DISRE5:
322B   CD 0000*              CALL    INKEY1          ;GET DATA FOR KEY FIELD (FIELD #1)
322E   FE 1B                 CP      ESC
3230   CA 30AB               JP      Z,DSMENU
3233   FE 10                 CP      CNTLP           ;DISPLAY PREVIOUS RECORD ?
3235   CA 3315               JP      Z,DISPRE
3238   FE 0E                 CP      CNTLN           ;DISPLAY NEXT RECORD ?
323A   CA 331B               JP      Z,DISNXT
323D   FE 02                 CP      F2              ;PRINT SCREEN ?
323F   CA 3321               JP      Z,DISPRT
3242   FE 1C                 CP      LA
3244   28 E5                 JR      Z,DISRE5
3246   FE 1F                 CP      DOWNA
3248   20 0A                 JR      NZ,DISRE7
324A   CD 0000*              CALL    LASTFN
324D   3D                    DEC     A
324E   32 0000*              LD      (CURFDN),A
3251   C3 3269               JP      DISRC4
3254               DISRE7:
3254   FE 1E                 CP      UPA
3256   28 D3                 JR      Z,DISRE5
3258   FE 1D                 CP      RA
325A   20 08                 JR      NZ,DISRE8
325C   3E 01                 LD      A,1
325E   32 0000*              LD      (CURFDN),A
3261   C3 3269               JP      DISRC4
3264               DISRE8:
3264   CD 0000*              CALL    FNDREC
3267   18 C2                 JR      DISRE5
                   ;
                   ;
                   ;
3269               DISRC4:
3269   3E FF                 LD      A,EOF
326B   32 0000*              LD      (PARSCH),A
326E   3E 00                 LD      A,0
3270   32 0000*              LD      (EOFMRK),A
```

```
3273  CD 3449                 CALL  INLOP5        ;GET A SCREEN OF DATA
3276  FE 1B                   CP    ESC
3278  CA 30AB                 JP    Z,DSMENU      ;DISPLAY MENU
327B  FE 0E                   CP    CNTLN         ;READ NEXT
327D  CA 32C0                 JP    Z,DISRC3
3280  FE 10                   CP    CNTLP         ;READ PREVIOUS
3282  CA 32DC                 JP    Z,DISRC6
3285  21 3344                 LD    HL,COMBUF
3288  01 00FF                 LD    BC,255        ;BUFFER LENGTH
328B  CD 0000*                CALL  CLRMM2        ;SET BUFFER TO BLANKS
328E  21 3344                 LD    HL,COMBUF
3291  22 0000*                LD    (RBPNTR),HL   ;SET POINTER
3294  3E 00                   LD    A,0
3296  32 0000*                LD    (CURFDN),A    ;SET FIELD NUMBER TO 0
3299  CD 0000*                CALL  TRNRES        ;TRANSFER RECORD FROM SCREEN TO BUFFER
329C  3E 00                   LD    A,0
329E  32 0000*                LD    (FIRSTF),A
32A1  01 0000                 LD    BC,0
32A4  ED 43 0000*             LD    (CURRCN),BC
32A8  CD 0000*                CALL  RDNREC
32AB  3A 0000*                LD    A,(EOFMRK)
32AE  FE FF                   CP    EOF
32B0  C2 32B9                 JP    NZ,DISRC1
32B3  CD 3994                 CALL  FDISNF
32B6  C3 3269                 JP    DISRC4
32B9                   DISRC1:
32B9  CD 3327                 CALL  RECCOM        ;COMPARE RECORD
32BC  FE FF                   CP    EOF           ;MATCH ?
32BE  20 3F                   JR    NZ,DISRC9     ;YES
32C0                   DISRC3:
32C0  CD 0000*                CALL  RDNREC
32C3  3A 0000*                LD    A,(EOFMRK)
32C6  FE FF                   CP    EOF
32C8  28 43                   JR    Z,DISRCB
32CA  21 0000*                LD    HL,RBUF2
32CD  7E                      LD    A,(HL)
32CE  FE FF                   CP    EOF
32D0  28 EE                   JR    Z,DISRC3
32D2                   DISRC5:
32D2  CD 3327                 CALL  RECCOM        ;COMPARE RECORD
32D5  FE FF                   CP    EOF
32D7  28 E7                   JR    Z,DISRC3      ;NO MATCH, LOOP
32D9  C3 32FF                 JP    DISRC9
32DC                   DISRC6:
32DC  CD 0000*                CALL  RDPREC
32DF  3A 0000*                LD    A,(EOFMRK)
32E2  FE FF                   CP    EOF
32E4  CA 330D                 JP    Z,DISRCB
32E7  21 0000*                LD    HL,RBUF2
32EA  7E                      LD    A,(HL)
```

```
32EB   FE FF              CP     EOF
32ED   20 03              JR     NZ,DISRCB
32EF   C3 32DC            JP     DISRC6
32F2                  DISRC8:
32F2   CD 3327            CALL   RECCOM
32F5   FE FF              CP     EOF
32F7   20 06              JR     NZ,DISRC9
32F9   ED 4B 0000*        LD     BC,(CURRCN)
32FD   18 DD              JR     DISRC6
                      ;
32FF                  DISRC9:
32FF   CD 0000*           CALL   TRNRVD
3302   3E 00              LD     A,0
3304   32 0000*           LD     (CURFDN),A
3307   C3 3269            JP     DISRC4
                      ;
330A                  DISRCA:
330A   CD 3994            CALL   FDISNF
330D                  DISRCB:
330D   3E 00              LD     A,0
330F   32 0000*           LD     (CURFDN),A
3312   C3 3269            JP     DISRC4
                      ;
                      ;
3315                  DISPRE:
3315   CD 0000*           CALL   RDPREC          ;READ PREVIOUS DATA RECORD
3318   C3 322B            JP     DISRE5
                      ;
331B                  DISNXT:
331B   CD 0000*           CALL   RDNREC          ;READ THE NEXT DATA RECORD
331E   C3 322B            JP     DISRE5
                      ;
3321                  DISPRT:
3321   CD 0000*           CALL   SCNPRT          ;PRINT THE VIDEO SCREEN
3324   C3 322B            JP     DISRE5
                      ;
                      ;
                      ;
                      ;COMPARE COMBUF TO RBUF2, ON EXIT A=EOF IF NO MATCH
                      ;
3327                  RECCOM:
3327   01 00FF            LD     BC,255
332A   21 3344            LD     HL,COMBUF       ;DESIRED RECORD VALUE
332D   11 0000*           LD     DE,RBUF2        ;CURRENT RECORD
3330                  RECCO2:
3330   1A                 LD     A,(DE)          ;GET FIRST CHAR
3331   BE                 CP     (HL)
3332   28 08              JR     Z,RECCO7        ;MATCHED CHAR
3334   7E                 LD     A,(HL)
3335   FE 20              CP     " "
3337   28 03              JR     Z,RECCO7
3339   3E FF              LD     A,EOF           ;MISMATCH
```

```
3338    C9                    RET
                      ;
333C                  RECCO7:
333C    0B                    DEC     BC
333D    23                    INC     HL
333E    13                    INC     DE
333F    78                    LD      A,B
3340    B1                    OR      C
3341    C8                    RET     Z
3342    18 EC                 JR      RECCO2
                      ;
                      ;
3344                  COMBUF:         DS              256
                      ;
                      ;
                      ;INPUT A FULL SCREEN OF DATA
                      ;
3444                  INLOOP:
3444    3E 00                 LD      A,0             ;START AT FIRST FIELD
3446    32 0000*              LD      (CURFDN),A      ;SET CURRENT FIELD NUMBER TO 0
                      ;
3449                  INLOP5:
3449    3A 0000*              LD      A,(CURFDN)      ;GET CURRENT FIELD NUMBER
344C    3C                    INC     A               ;INCREMENT FOR NEXT NEW FIELD
344D    32 0000*              LD      (CURFDN),A      ;SAVE NUMBER
3450    4F                    LD      C,A
3451    CD 0000*              CALL    FNDFLC          ;FIND FIELD PARAMETERS IN FIELD TABLE
3454    FE FF                 CP      EOF             ;NO MORE FIELDS ?
3456    C8                    RET     Z               ;OUT OF FIELDS
3457    CD 34D2               CALL    GETINP
345A    FE 1B                 CP      ESC             ;OPERATOR ABORTED ?
345C    C8                    RET     Z               ;YES
345D    FE 10                 CP      CNTLP
345F    C8                    RET     Z
3460    FE 0E                 CP      CNTLN
3462    C8                    RET     Z
3463    FE 1E                 CP      UPA
3465    CA 3474               JP      Z,INUPA
3468    FE 1F                 CP      DOWNA
346A    CA 34C8               JP      Z,INDNA
346D    FE 1C                 CP      LA
346F    CA 349D               JP      Z,INLA
3472    18 D5                 JR      INLOP5          ;LOOP TILL EOF OR ESC
3474                  INUPA:
3474    3E 00                 LD      A,0
3476    32 0000*              LD      (CURFDN),A
3479    3A 0000*              LD      A,(MODFLG)
347C    FE FF                 CP      EOF
347E    20 C9                 JR      NZ,INLOP5
3480    3E 01                 LD      A,1
3482    32 0000*              LD      (CURFDN),A
3485    C3 3449               JP      INLOP5
```

```
3488                      INLA5:
3488   3A 0000*                  LD     A,(CURFDN)
348B   FE 01                     CP     1
348D   CA 3449                   JP     Z,INLOP5
3490   3D                        DEC    A
3491   FE 01                     CP     1
3493   CA 3497                   JP     Z,INLB5
3496   3D                        DEC    A
3497                      INLB5:
3497   32 0000*                  LD     (CURFDN),A
349A   C3 3449                   JP     INLOP5
349D                      INLA:
349D   3A 0000*                  LD     A,(MODFLG)
34A0   FE FF                     CP     EOF
34A2   28 E4                     JR     Z,INLA5
34A4   3A 0000*                  LD     A,(CURFDN)
34A7   FE 00                     CP     0
34A9   CA 3449                   JP     Z,INLOP5
34AC   3D                        DEC    A
34AD   32 0000*                  LD     (CURFDN),A
34B0   FE 00                     CP     0
34B2   CA 3449                   JP     Z,INLOP5
34B5                      INLAB:
34B5   3D                        DEC    A
34B6   32 0000*                  LD     (CURFDN),A
34B9   4F                        LD     C,A
34BA   0C                        INC    C
34BB   CD 0000*                  CALL   FNDFLC
34BE   CB 5E                     BIT    3,(HL)
34C0   CA 3449                   JP     Z,INLOP5
34C3   3A 0000*                  LD     A,(CURFDN)
34C6   18 ED                     JR     INLAB
                          ;
34C8                      INDNA:
34C8   CD 0000*                  CALL   LASTFN          ;GET LAST FIELD NUMBER
34CB   3D                        DEC    A
34CC   32 0000*                  LD     (CURFDN),A
34CF   C3 3449                   JP     INLOP5
                          ;
                          ;GET INPUT FOR CURRENT FIELD. ON ENTRY FIELD ROW/COLUMN=BC
                          ;LENGTH=E, VALIDATIONS=HL.
                          ;
34D2                      GETINP::
34D2   3E 00                     LD     A,0
34D4   32 0000*                  LD     (INPLEN),A      ;SET INPUT LENGTH TO 0
34D7   79                        LD     A,C
34D8   32 0000*                  LD     (MINCOL),A
34DB   22 0000*                  LD     (VALPTR),HL     ;SAVE VALIDATION POINTER
34DE   7B                        LD     A,E
34DF   32 0000*                  LD     (CURFLN),A      ;SAVE CURREST FIELD LENGTH
34E2   ED 43 0000*               LD     (FLOCPR),BC     ;SAVE FIELD LOCATION POINTER
34E6   CD 38AF                   CALL   PREVAL          ;CHECK PRE-INPUT VALIDATIONS
```

```
34E9   FE FF                CP     EOF          ;ALL DONE WITH INPUT ?
34EB   CA 3596              JP     Z,GETIN9
34EE   FE 00                CP     0
34F0   28 02                JR     Z,GETIN5
34F2   18 0C                JR     GETNA5
34F4                 GETIN5:
34F4   16 00                LD     D,0
34F6   ED 4B 0000*          LD     BC,(FLOCPR)
34FA   CD 0000*             CALL   VDGRAF       ;SET CURSOR POSITION
34FD   CD 0000*             CALL   INCHAR       ;GET INPUT CHARACTER
3500                 GETNA5:
3500   78                   LD     A,B
3501   FE 0E                CP     CNTLN        ;READ NEXT ?
3503   C8                   RET    Z
3504   FE 10                CP     CNTLP        ;READ PREVIOUS
3506   C8                   RET    Z
3507   FE 1B                CP     ESC          ;ABORT ?
3509   C8                   RET    Z
350A   FE 1C                CP     LA
350C   C8                   RET    Z
350D   FE 1D                CP     RA
350F   C8                   RET    Z
3510   FE 1E                CP     UPA
3512   C8                   RET    Z
3513   FE 1F                CP     DOWNA
3515   C8                   RET    Z
3516   FE 0D                CP     ENTER        ;ALL DONE ?
3518   CA 354D              JP     Z,GETIN6
351B   FE 02                CP     F2
351D   C8                   RET    Z
351E   FE 08                CP     BCKSP
3520   28 44                JR     Z,GETIN7
3522   CD 3D80              CALL   CHRVAL       ;DO CHARACTER VALIDATION
3525   FE FF                CP     EOF          ;INVALID CHAR ?
3527   CA 358F              JP     Z,GETIN8
352A   CD 0000*             CALL   VDCHAR
352D   ED 4B 0000*          LD     BC,(FLOCPR)  ;GET FIELD LOACTION POINTER
3531   03                   INC    BC           ;NEXT CURSOR POSITION
3532   ED 43 0000*          LD     (FLOCPR),BC  ;SAVE POINTER
3536   3A 0000*             LD     A,(INPLEN)
3539   3C                   INC    A
353A   32 0000*             LD     (INPLEN),A
353D   3A 0000*             LD     A,(CURFLN)   ;GET FIELD LENGTH
3540   3D                   DEC    A            ;ONE LESS CHAR
3541   32 0000*             LD     (CURFLN),A   ;SAVE REMAINDER
3544   CA 3596              JP     Z,GETIN9     ;RETURN IF ALL DONE
3547   18 46                JR     GETIN8       ;LOOP TIL DONE
3549                 SERN06::
3549   D1                   POP    DE
354A   C3 0000*             JP     SERN07
354D                 GETIN6:
354D   C5                   PUSH   BC
```

```
354E    CD 39A9                 CALL    VALFLD
3551    C1                      POP     BC
3552    FE 00                   CP      0
3554    C8                      RET     Z
3555    FE FF                   CP      EOF
3557    CA 35A8                 JP      Z,GETFDA
355A    FE 1B                   CP      ESC
355C    C8                      RET     Z
355D    FE 1C                   CP      LA
355F    C8                      RET     Z
3560    FE 1E                   CP      UPA
3562    C8                      RET     Z
3563    C3 35A8                 JP      GETFDA
3566                    GETIN7:
3566    58                      LD      E,B
3567    ED 4B 0000*             LD      BC,(FLOCPR)
356B    43                      LD      B,E
356C    3A 0000*                LD      A,(MINCOL)
356F    B9                      CP      C
3570    28 1D                   JR      Z,GETIN8
3572    CD 0000*                CALL    VDCHAR
3575    ED 4B 0000*             LD      BC,(FLOCPR)
3579    0B                      DEC     BC
357A    ED 43 0000*             LD      (FLOCPR),BC
357E    3A 0000*                LD      A,(CURFLN)
3581    3C                      INC     A
3582    32 0000*                LD      (CURFLN),A
3585    3A 0000*                LD      A,(INPLEN)
3588    3D                      DEC     A
3589    32 0000*                LD      (INPLEN),A
358C    C3 34F4                 JP      GETIN5
358F                    GETIN8:
358F    ED 4B 0000*             LD      BC,(FLOCPR)
3593    C3 34F4                 JP      GETIN5
3596                    GETIN9:
3596    CD 39A9                 CALL    FLDVAL          ;VALIDATE FIELD
3599    FE FF                   CP      EOF
359B    C0                      RET     NZ              ;YES
359C    01 03E8                 LD      BC,1000         ;NOT VALID
359F    CD 0000*                CALL    DELAY
35A2    CD 0000*                CALL    CLR24           ;CLEAR ERROR MESSAGE
35A5    C3 35A8                 JP      GETFDA
                        ;GET FIELD INPUT AGAIN
                        ;
35A8                    GETFDA:
35A8    3A 0000*                LD      A,(CURFDN)
35AB    4F                      LD      C,A
35AC    CD 0000*                CALL    FNDFLC
35AF    C3 34D2                 JP      GETINP
                        ;
                        ;SAVE A RECORD AND KEY FILE ENTRY
```

```
                      ;
35B2                  SAVREC:
35B2   01 FFFF                LD      BC,0FFFFH      ;READ  AT END OF FILE
35B5   11 0000*               LD      DE,DCB2
35B8   CD 0000*               CALL    DIRRD          ;READ  RECORD
35BB   11 0000*               LD      DE,DCB2        ;CONTROL BLOCK #2 FOR DATABASE FILE
35BE   CD 0000*               CALL    LOCATE         ;GET RECORD NUMBER JUST WRITTEN
35C1   ED 43 0000*            LD      (DATRCN),BC
35C5   CD 0000*               CALL    CREKEY         ;CREATE KEY FILE ENTRY
35C8   18 00                  JR      FNDNEN         ;FIND A PLACE FOR NEW KEY ENTRY
                      ;
                      ;FIND A PLACE IN THE KEY FILE FOR NEW ENTRY
35CA                  FNDNEN:
35CA   ED 4B 0000*            LD      BC,(DATRCN)    ;GET DATA RECORD NUMBER
35CE   78                     LD      A,B
35CF   B1                     OR      C              ;SEE IF THIS IS FIRST ENTRY
35D0   CA 3817                JP      Z,FIRSTK       ;THIS IS FIRST ENTRY INTO /KY1
                      ;NO, THIS IS NOT THE FIRST ENTRY INTO /KY1
35D3                  FNDNE1:
35D3   11 0000*               LD      DE,DCB1
35D6   79                     LD      A,C
35D7   B0                     OR      B
35D8   CA 37F3                JP      Z,FNDSTR
35DB   0B                     DEC     BC
35DC   ED 43 0000*            LD      (MAXRCN),BC
35E0   CD 0000*               CALL    DIRRD          ;READ LAST RECORD
35E3   21 0000*               LD      HL,RBUF1
35E6   7E                     LD      A,(HL)
35E7   FE FF                  CP      EOF
35E9   20 06                  JR      NZ,FNDNE2
35EB   ED 4B 0000*            LD      BC,(MAXRCN)
35EF   18 E2                  JR      FNDNE1
35F1                  FNDNE2:
35F1   CD 0000*               CALL    COMKEY         ;COMPARE LAST RECORD AND KEYREC
35F4   FE 00                  CP      0              ;DUPLICATE KEY ?
35F6   CA 36E6                JP      Z,FND007
35F9   FE 7F                  CP      7FH            ;TOO LOW IN FILE ?
35FB   CA 3748                JP      Z,FNDEND       ;THEN PUT KEYREC AT END
                      ;KEYREC IS A LOWER VALUE THAN LAST RECORD IN /KY1
35FE   01 0000                LD      BC,0
3601                  FNDNEA:
3601   11 0000*               LD      DE,DCB1
3604   ED 43 0000*            LD      (MINRCN),BC    ;SET MINIMUM RECORD TO 0
3608   ED 43 0000*            LD      (CURRCN),BC
360C   CD 0000*               CALL    DIRRD          ;READ FIRST RECORD
360F   21 0000*               LD      HL,RBUF1
3612   7E                     LD      A,(HL)
3613   FE FF                  CP      EOF
3615   20 13                  JR      NZ,FNDNEB
3617   ED 4B 0000*            LD      BC,(MINRCN)
361B   2A 0000*               LD      HL,(DATRCN)
361E   7C                     LD      A,H
```

```
361F  88          16180          CP     B
3620  20 05       16200          JR     NZ,FNDNEG
3622  7D          16220          LD     A,L
3623  B9          16240          CP     C
3624  DA 3748     16260          JP     C,FNDEND
3627              16280  FNDNEG:
3627  03          16300          INC    BC
3628  18 D7       16320          JR     FNDNEA
362A              16340  FNDNEB:
362A  CD 0000*    16360          CALL   COMKEY       ;COMPARE KEYREC TO FIRST RECORD
362D  FE FF       16380          CP     EOF          ;IS FIRST RECORD HIGHER THAN KEYREC ?
362F  CA 37F3     16400          JP     Z,FNDSTR     ;PLACE KEYREC AT BEGINNING OF /KY1
3632  FE 00       16420          CP     0
3634  CA 36E6     16440          JP     Z,FND007
3637  CD 3801     16460          CALL   COMMM        ;COMPARE MAXRCN AND MINRCN
363A  CA 3782     16480          JP     Z,FNDSEQ     ;LESS THAN 10 RECORDS TO CHECK
363D  ED 4B 0000* 16500          LD     BC,(MAXRCN)
3641  ED 43 0000* 16520          LD     (CURRCN),BC
3645  ED 43 0000* 16540          LD     (PRERCN),BC
                  16560  ;LAST RECORD IS OF A HIGHER VALUE THAN KEYREC
3649              16580  FNDNE3:
3649  CD 0000*    16600          CALL   FLMIDR       ;FIND LOWER MID RECORD VALUE
364C  CD 3801     16620          CALL   COMMM
364F  CA 3782     16640          JP     Z,FNDSEQ
3652  ED 4B 0000* 16660          LD     BC,(CURRCN)  ;GET NEW RECORD NUMBER
3656              16680  FNDNEC:
3656  11 0000*    16700          LD     DE,DCB1
3659  CD 0000*    16720          CALL   DIRRD        ;READ RECORD
365C  21 0000*    16740          LD     HL,RBUF1
365F  7E          16760          LD     A,(HL)
3660  FE FF       16780          CP     EOF
3662  20 10       16800          JR     NZ,FNDNED
3664  ED 4B 0000* 16820          LD     BC,(CURRCN)
3668  79          16840          LD     A,C
3669  B0          16860          OR     B
366A  CA 37F3     16880          JP     Z,FNDSTR
366D  0B          16900          DEC    BC
366E  ED 43 0000* 16920          LD     (CURRCN),BC
3672  18 E2       16940          JR     FNDNEC
3674              16960  FNDNED:
3674  CD 0000*    16980          CALL   COMKEY       ;COMPARE KEYREC TO RBUF1
3677  FE 00       17000          CP     0
3679  CA 36E6     17020          JP     Z,FND007
367C  FE 7F       17040          CP     7FH          ;TOO LOW ?
367E  28 0E       17060          JR     Z,FNDNE5     ;TOO LOW , GO HIGHER IN /KY1
                  17080  ;STILL TOO HIGH, GO LOWER
3680              17100  FNDNE4:
3680  ED 4B 0000* 17120          LD     BC,(CURRCN)
3684  ED 43 0000* 17140          LD     (MAXRCN),BC
3688  ED 43 0000* 17160          LD     (PRERCN),BC
368C  18 BB       17180          JR     FNDNE3
```

```
                                ;
368E                            FNDNE5:
368E   ED 4B 0000*                      LD      BC,(CURRCN)     ;GET CURRENT RECORD NUMBER
3692   ED 43 0000*                      LD      (MINRCN),BC     ;DON'T GO LOWER THAN THIS
3696   ED 43 0000*                      LD      (PRERCN),BC
369A   CD 0000*                         CALL    FHMIDR          ;FIND HIGHER MID RECORD
369D   CD 3801                          CALL    COMMM
36A0   CA 3782                          JP      Z,FNDSEQ
36A3   ED 4B 0000*                      LD      BC,(CURRCN)
36A7                            FNDNEE:
36A7   11 0000*                         LD      DE,DCB1
36AA   CD 0000*                         CALL    DIRRD
36AD   21 0000*                         LD      HL,RBUF1
36B0   7E                               LD      A,(HL)
36B1   FE FF                            CP      EOF
36B3   20 10                            JR      NZ,FNDNEF
36B5   ED 4B 0000*                      LD      BC,(CURRCN)
36B9   78                               LD      A,B
36BA   B1                               OR      C
36BB   CA 37F3                          JP      Z,FNDSTR
36BE   0B                               DEC     BC
36BF   ED 43 0000*                      LD      (CURRCN),BC
36C3   18 E2                            JR      FNDNEE
36C5                            FNDNEF:
36C5   CD 0000*                         CALL    COMKEY
36C8   FE 00                            CP      0
36CA   CA 36E6                          JP      Z,FND007
36CD   FE FF                            CP      EOF             ;TOO HIGH ?
36CF   28 03                            JR      Z,FNDNE6        ;STILL TOO HIGH
36D1   C3 368E                          JP      FNDNE5          ;STILL TOO LOW, GO HIGHER
                                ;
36D4                            FNDNE6:
36D4   ED 4B 0000*                      LD      BC,(CURRCN)     ;GET CURRENT NUMBER
36D8   ED 5B 0000*                      LD      DE,(PRERCN)     ;GET PREVIOUS RECORD NUMBER
36DC   78                               LD      A,B
36DD   BA                               CP      D
36DE   20 A0                            JR      NZ,FNDNE4       ;STILL MORE THAN 256 APART
36E0   79                               LD      A,C
36E1   93                               SUB     E
36E2   FE 01                            CP      1
36E4   20 9A                            JR      NZ,FNDNE4       ;STILL MORE THAN 1 APART
                                ;FOUND THE RIGHT PLACE FOR NEW KEY
36E6                            FND007:
36E6   11 0000*                         LD      DE,DCB1
36E9   CD 0000*                         CALL    LOCATE
36EC   ED 43 0000*                      LD      (CURRCN),BC
36F0                            FNDNKL:
36F0   CD 3831                          CALL    DIRWR2
36F3   ED 4B 0000*                      LD      BC,(DATRCN)
36F7   ED 43 0000*                      LD      (MAXRCN),BC
36FB                            FNDNE7:
36FB   ED 4B 0000*                      LD      BC,(CURRCN)     ;GET CURRENT RECORD NUMBER
```

```
36FF    11 0000*              LD      DE,DCB1
3702    CD 0000*              CALL    DIRRD         ;READ RECORD
3705    CD 0000*              CALL    MB1B2         ;MOVE RECORD TO RBUF2
3708    CD 0000*              CALL    MKRB1         ;MOVE KEY RECORD TO RBUF1
370B    ED 4B 0000*           LD      BC,(CURRCN)
370F    11 0000*              LD      DE,DCB1
3712    CD 0000*              CALL    DIRWR         ;WRITE KEY RECORD
3715    ED 4B 0000*           LD      BC,(CURRCN)   ;GET RECORD NUMBER JUST WRITTEN
3719    03                    INC     BC            ;NEXT RECORD TO READ
371A    ED 43 0000*           LD      (CURRCN),BC
371E    CD 0000*              CALL    MB2KR         ;MOVE LAST READ RECORD TO KEYREC
3721    ED 5B 0000*           LD      DE,(CURRCN)
3725    2A 0000*              LD      HL,(MAXRCN)
3728    ED 52                 SBC     HL,DE
372A    7C                    LD      A,H
372B    B5                    OR      L
372C    20 CD                 JR      NZ,FNDNE7     ;LOOP TIL REST OF FILE IS REWRITTEN
                      ;
372E                  FNDN99:
372E    ED 4B 0000*           LD      BC,(CURRCN)
3732    11 0000*              LD      DE,DCB1
3735    CD 0000*              CALL    DIRRD
3738    CD 0000*              CALL    MB1B2
373B    CD 0000*              CALL    MKRB1
373E    11 0000*              LD      DE,DCB1
3741    ED 4B 0000*           LD      BC,(CURRCN)
3745    C3 0000*              JP      DIRWR
                      ;
3748                  FNDEND:
3748    CD 3831               CALL    DIRWR2
374B    CD 0000*              CALL    MKRB1
374E    11 0000*              LD      DE,DCB1
3751    01 FFFF               LD      BC,0FFFFH
3754    CD 0000*              CALL    DIRWR
3757    11 0000*              LD      DE,DCB1
375A    CD 0000*              CALL    LOCATE
375D    ED 43 0000*           LD      (CURRCN),BC
3761    3E FF                 LD      A,EOF
3763    C9                    RET
                      ;
3764                  FNDBEG:
3764    CD 3831               CALL    DIRWR2
3767    CD 0000*              CALL    MB1B2
376A    CD 0000*              CALL    MKRB1
376D    11 0000*              LD      DE,DCB1
3770    01 0000               LD      BC,0
3773    CD 0000*              CALL    DIRWR
3776    CD 0000*              CALL    MB2B1
3779    11 0000*              LD      DE,DCB1
377C    CD 0000*              CALL    WRITNX
377F    3E FF                 LD      A,EOF
3781    C9                    RET
```

```
                          ;
                          ;
                          ;SEQUENTIALLY SEARCH STARTING AT MINRCN
                          ;
3782                      FNDSEQ:
3782   11 0000*                   LD      DE,DCB1
3785   ED 4B 0000*                LD      BC,(MINRCN)
3789   CD 0000*                   CALL    DIRRD
378C   21 0000*                   LD      HL,RBUF1
378F   7E                         LD      A,(HL)
3790   FE FF                      CP      EOF
3792   20 18                      JR      NZ,FNDSE3
3794   ED 4B 0000*                LD      BC,(MINRCN)
3798   2A 0000*                   LD      HL,(DATRCN)
379B   7C                         LD      A,H
379C   B8                         CP      B
379D   C2 37A5                    JP      NZ,FNDSE1
37A0   7D                         LD      A,L
37A1   B9                         CP      C
37A2   DA 3994                    JP      C,FDISNF
37A5                      FNDSE1:
37A5   03                         INC     BC
37A6   ED 43 0000*                LD      (MINRCN),BC
37AA   18 D6                      JR      FNDSEQ
37AC                      FNDSE3:
37AC   CD 0000*                   CALL    COMKEY          ;COMPARE KEYREC AND RBUF1
37AF   FE 7F                      CP      7FH             ;TOO LOW ?
37B1   28 03                      JR      Z,FNDSE5        ;GOOD MOVE UP
37B3   C3 3680                    JP      FNDNE4          ;SCREWED UP, STARTED TOO HIGH
                          ;
37B6                      FNDSE5:
37B6   11 0000*                   LD      DE,DCB1
37B9   CD 0000*                   CALL    LOCATE
37BC   2A 0000*                   LD      HL,(DATRCN)
37BF   7C                         LD      A,H
37C0   B8                         CP      B
37C1   C2 37C9                    JP      NZ,FNDSE6
37C4   7D                         LD      A,L
37C5   B9                         CP      C
37C6   DA 3994                    JP      C,FDISNF
37C9                      FNDSE6:
37C9   03                         INC     BC
37CA   ED 43 0000*                LD      (CURRCN),BC
37CE   11 0000*                   LD      DE,DCB1
37D1   CD 0000*                   CALL    DIRRD
37D4   21 0000*                   LD      HL,RBUF1
37D7   7E                         LD      A,(HL)
37D8   FE FF                      CP      EOF
37DA   28 DA                      JR      Z,FNDSE5
37DC   CD 0000*                   CALL    COMKEY          ;COMPARE KEYREC AND RBUF1
37DF   FE 7F                      CP      7FH             ;TOO LOW ?
```

```
37E1    28 D3                       JR      Z,FNDSE5        ;LOOP TIL TOO HIGH
37E3    FE 00                       CP      0               ;EQUAL ?
37E5    CA 36E6                     JP      Z,FND007
37E8    ED 4B 0000*                 LD      BC,(CURRCN)
37EC    ED 43 0000*                 LD      (PRERCN),BC
37F0    C3 36F0                     JP      FNDNKL
                            ;
                            ;
                            ;PLACE KEYREC AT BEGINNING OF /KY1
                            ;
37F3                        FNDSTR:
37F3    01 0000                     LD      BC,0
37F6    ED 43 0000*                 LD      (CURRCN),BC
37FA    ED 43 0000*                 LD      (PRERCN),BC
37FE    C3 36F0                     JP      FNDNKL
                            ;
                            ;
                            ;COMPARE MIN AND MAX RCN, ON EXIT IF Z THEN THEY ARE LESS THAN 10 APART
                            ;
3801                        COMMM:
3801    ED 5B 0000*                 LD      DE,(MINRCN)
3805    2A 0000*                    LD      HL,(MAXRCN)
3808    ED 52                       SBC     HL,DE
380A    7C                          LD      A,H
380B    FE 00                       CP      0
380D    C0                          RET     NZ
380E    7D                          LD      A,L
380F    D6 0A                       SUB     10
3811    C8                          RET     Z
3812    D0                          RET     NC
3813    3E 00                       LD      A,0
3815    B7                          OR      A
3816    C9                          RET
                            ;
                            ;
3817                        FIRSTK:
3817    CD 3831                     CALL    DIRWR2
381A    CD 0000*                    CALL    TRNKY1          ;MOVE KEY RECORD TO RBUF1
381D    01 0000                     LD      BC,0            ;LAST RECORD
3820    ED 43 0000*                 LD      (CURRCN),BC
3824    11 0000*                    LD      DE,DCB1
3827    CD 0000*                    CALL    DIRWR
382A    3E FF                       LD      A,EOF
382C    C9                          RET
                            ;
                            ;
                            ;THIS IS A SPECIAL DIRRD ROUTINR
                            ;
382D                        DIRRD2::
382D    3E 23                       LD      A,SDIRRD
382F    CF                          RST     8
```

```
3830    C9                      RET
                        ;
                        ;
3831                    DIRWR2:
3831    11 0000*                LD      DE,DCB2
3834    01 FFFF                 LD      BC,0FFFFH
3837    C3 0000*                JP      DIRWR
                        ;FIND THE RECORD WHOSE KEY IS IN KEYREC
                        ;
383A                    FNDDIS::
383A    ED 4B 0000*             LD      BC,(DATRCN)     ;GET CURRENT DATA RECORD NUMBER
383E    ED 43 0000*             LD      (MAXRCN),BC     ;SET MAX
3842    ED 43 0000*             LD      (CURRCN),BC     ;START AT END
3846    11 0000*                LD      DE,DCB1
3849    CD 0000*                CALL    DIRRD           ;READ THE LAST KEY RECORD
384C    21 0000*                LD      HL,RBUF1
384F    7E                      LD      A,(HL)
3850    FE FF                   CP      EOF
3852    20 10                   JR      NZ,FNDDI5
3854    ED 4B 0000*             LD      BC,(DATRCN)
3858    79                      LD      A,C
3859    B0                      OR      B
385A    CA 3994                 JP      Z,FDISNF
385D    0B                      DEC     BC
385E    ED 43 0000*             LD      (DATRCN),BC
3862    18 D6                   JR      FNDDIS
3864                    FNDDI5:
3864    CD 0000*                CALL    COMKEY
3867    FE 00                   CP      0
3869    CA 398B                 JP      Z,FDIS90        ;FOUND A MATCH
386C    FE 7F                   CP      7FH             ;LAST RECORD IS TOO LOW ?
386E    CA 3994                 JP      Z,FDISNF        ;RECORD NOT FOUND
3871    01 0000                 LD      BC,0
3874                    FNDDI6:
3874    ED 43 0000*             LD      (MINRCN),BC     ;SET MIN
3878    ED 43 0000*             LD      (CURRCN),BC
387C    11 0000*                LD      DE,DCB1
387F    CD 0000*                CALL    DIRRD           ;READ FIRST RECORD
3882    21 0000*                LD      HL,RBUF1
3885    7E                      LD      A,(HL)
3886    FE FF                   CP      EOF
3888    20 13                   JR      NZ,FNDDI7
388A    ED 4B 0000*             LD      BC,(MINRCN)
388E    2A 0000*                LD      HL,(DATRCN)
3891    7C                      LD      A,H
3892    B8                      CP      B
3893    20 05                   JR      NZ,FNDDI9
3895    7D                      LD      A,L
3896    B9                      CP      C
3897    DA 3994                 JP      C,FDISNF
389A                    FNDDI9:
```

```
389A  03                   INC    BC
389B  18 D7                JR     FNDDI6
                   ;
389D               FNDDI7:
389D  CD 0000*             CALL   COMKEY       ;COMPARE RBUF1 AND KEYREC
38A0  FE 00                CP     0            ;EQUAL?
38A2  CA 398B              JP     Z,FDIS90     ;FOUND IT
38A5  FE FF                CP     EOF          ;TOO HIGH IN FILE ?
38A7  CA 3994              JP     Z,FDISNF     ;RECORD NOT IN THIS FILE
                   ;AT THIS POINT RECORD 0 IS TOO LOW AND THE LAST RECORD IS TOO HIGH
                   ;SO WHAT WE WANT MIGHT BE IN BETWEEN
                   ;
38AA  CD 3801              CALL   COMMM        ;COMPARE MAX AN MIN
38AD  CA 394D              JP     Z,FDPSEQ     ;LESS THAN 10 RECORDS, SEARCH SEQ
38B0  ED 4B 0000*          LD     BC,(MAXRCN)
38B4  ED 43 0000*          LD     (CURRCN),BC
38B8               FDIS02:
38B8  CD 0000*             CALL   FLMIDR       ;FIND LOW MID RECORD
38BB  CD 3801              CALL   COMMM        ;COMPARE NEW MIN AND MAX
38BE               FDIS01:
38BE  CA 394D              JP     Z,FDPSEQ     ;LESS THAN 10 ?
38C1  11 0000*             LD     DE,DCB1
38C4  ED 4B 0000*          LD     BC,(CURRCN)  ;GET CURRENT RECORD
38C8  CD 0000*             CALL   DIRRD
38CB  21 0000*             LD     HL,RBUF1
38CE  7E                   LD     A,(HL)
38CF  FE FF                CP     EOF
38D1  20 17                JR     NZ,FDIS04
38D3  ED 4B 0000*          LD     BC,(CURRCN)
38D7  2A 0000*             LD     HL,(DATRCN)
38DA  7C                   LD     A,H
38DB  B8                   CP     B
38DC  20 05                JR     NZ,FDISA4
38DE  7D                   LD     A,L
38DF  B9                   CP     C
38E0  DA 3994              JP     C,FDISNF
38E3               FDISA4:
38E3  03                   INC    BC
38E4  ED 43 0000*          LD     (CURRCN),BC
38E8  18 D4                JR     FDIS01
38EA               FDIS04:
38EA  CD 0000*             CALL   COMKEY       ;COMPARE THIS RECORD WITH KEYREC
38ED  FE 00                CP     0            ;EQUAL ?
38EF  CA 398B              JP     Z,FDIS90     ;FOUND THE ONE
38F2  FE 7F                CP     7FH          ;TOO LOW ?
38F4  CA 3905              JP     Z,FDIS05     ;TOO LOW, GO HIGHER
                   ;STILL TO HIGH, GO LOWER
38F7               FDIS03:
38F7  ED 4B 0000*          LD     BC,(CURRCN)
38FB  ED 43 0000*          LD     (MAXRCN),BC
38FF  ED 43 0000*          LD     (PRERCN),BC
3903  18 B3                JR     FDIS02
```

```
                      ;
                      ;TOO  LOW IN /KY1, GO HIGHER
                      ;
3905                  FDIS05:
3905  ED 48 0000*             LD      BC,(CURRCN)     ;GET CURRENT RECORD NUMBER
3909  ED 43 0000*             LD      (MINRCN),BC
390D  ED 43 0000*             LD      (PRERCN),BC
3911  CD 0000*                CALL    FHMIDR          ;FIND HIGH MID RECORD
3914                  FDIS06:
3914  CD 3801                 CALL    COMMM           ;COMPARE MAX AND MIN
3917  CA 394D                 JP      Z,FDPSEQ        ;LESS THAN 10
391A  ED 4B 0000*             LD      BC,(CURRCN)
391E  11 0000*                LD      DE,DCB1
3921  CD 0000*                CALL    DIRRD
3924  21 0000*                LD      HL,RBUF1
3927  7E                      LD      A,(HL)
3928  FE FF                   CP      EOF
392A  20 10                   JR      NZ,FDIS07
392C  ED 48 0000*             LD      BC,(CURRCN)
3930  78                      LD      A,B
3931  B1                      OR      C
3932  CA 3994                 JP      Z,FDISNF
3935  0B                      DEC     BC
3936  ED 43 0000*             LD      (CURRCN),BC
393A  18 D8                   JR      FDIS06
393C                  FDIS07:
393C  CD 0000*                CALL    COMKEY
393F  FE 00                   CP      0               ;EQUAL ?
3941  CA 398B                 JP      Z,FDIS90        ;FOUND IT
3944  FE FF                   CP      EOF             ;TOO HIGH ?
3946  CA 38B8                 JP      Z,FDIS02
                      ;TOO LOW, GO HIGHER
3949  C3 3905                 JP      FDIS05
394C                  SNMBR4::
394C  31                      DB      "1"
                      ;WE ARE NOW WITHIN 10 RECORDS OF THE RIGHT ONE, SEARCH SEQUENTIALLY
                      ;
394D                  FDPSEQ:
394D  ED 4B 0000*             LD      BC,(MINRCN)     ;STARTING POINT IN FILE
3951  ED 43 0000*             LD      (CURRCN),BC
3955                  FDPSE5:
3955  11 0000*                LD      DE,DCB1
3958  CD 0000*                CALL    DIRRD           ;READ RECORD
395B  21 0000*                LD      HL,RBUF1
395E  7E                      LD      A,(HL)
395F  FE FF                   CP      EOF
3961  20 02                   JR      NZ,FDPSE6
3963  18 10                   JR      FDPSE8
3965                  FDPSE6:
3965  CD 0000*                CALL    COMKEY          ;COMPARE KEYREC AND RBUF1
3968  FE 00                   CP      0
396A  CA 398B                 JP      Z,FDIS90        ;FOUND IT
```

```
396D  FE 7F          24420          CP      7FH
396F  20 17          24440          JR      NZ,FDPSE7
3971  ED 4B 0000*    24460          LD      BC,(CURRCN)
3975                 24480  FDPSE8:
3975  2A 0000*       24500          LD      HL,(DATRCN)
3978  7C             24520          LD      A,H
3979  B8             24540          CP      B
397A  20 05          24560          JR      NZ,FDPSE9
397C  7D             24580          LD      A,L
397D  B9             24600          CP      C
397E  CA 3994        24620          JP      Z,FDISNF
3981                 24640  FDPSE9:
3981  03             24660          INC     BC
3982  ED 43 0000*    24680          LD      (CURRCN),BC
3986  18 CD          24700          JR      FDPSE5
                     24720  ;
3988                 24740  FDPSE7:
3988  C3 3994        24760          JP      FDISNF
                     24780  ;
398B                 24800  FDIS90::                        ;FOUND IT
398B  21 0000*       24820          LD      HL,RBUF1
398E  3A 0000*       24840          LD      A,(KEYLEN)
3991  C3 0000*       24860          JP      FNDRES
                     24880  ;
                     24900  ;NO KEY FILF LIKE THIS EXISTS
                     24920  ;
3994                 24940  FDISNF:
3994  CD 0000*       24960          CALL    SETSCR
3997  21 40F3        24980          LD      HL,FNFMSG
399A                 25000  DLYMSG::
399A  CD 0000*       25020          CALL    CLRPRT          ;PRINT ON LINE 24
399D  01 0578        25040          LD      BC,1400
39A0  CD 0000*       25060          CALL    DELAY
39A3  CD 0000*       25080          CALL    CLR24
39A6  3E 8E          25100          LD      A,FNF
39A8  C9             25120          RET
                     25140  ;
                     25160  ;
                     25180  ;DO FIELD VALIDATIONS - ON EXIT A=0 IF FIELD VALID  A=EOF IF FIELD INVALID
                     25200  ;A=OTHER IF SPECIAL TERMINATION
                     25220  ;
39A9                 25240  FLDVAL:
39A9                 25260  VALFLD:
39A9  2A 0000*       25280          LD      HL,(VALPTR)
39AC  23             25300          INC     HL
39AD  23             25320          INC     HL              ;THIRD BYTE OF VALIDATIONS
39AE  CB 5E          25340          BIT     3,(HL)          ;CHECK FOR DEFAULT VALUE
39B0  28 06          25360          JR      Z,FLVL05        ;NO DEFAULT VALUE
39B2  3A 0000*       25380          LD      A,(INPLEN)      ;CHECK IF DEFAULT VALUE IS NEEDED
39B5  FE 00          25400          CP      0
39B7  CC 3ABE        25420          CALL    Z,PVALDV        ;NEED DEFAULT VALUE, GET IT
```

```
39BA                 FLVL05:
39BA  2A 0000*               LD    HL,(VALPTR)
39BD  CB 6E                  BIT   5,(HL)       ;CHECK PASSWORD VALIDATION
39BF  CA 39C8                JP    Z,FLVL07     ;BYPASS PASSWORD VAL
39C2  CD 3A80                CALL  PXALPW       ;PROCESS PASSWORD VALIDATION
39C5  FE FF                  CP    EOF          ;OK ?
39C7  C8                     RET   Z            ;NO
39C8                 FLVL07:
39C8  2A 0000*               LD    HL,(VALPTR)
39CB  23                     INC   HL
39CC  23                     INC   HL
39CD  CB 7E                  BIT   7,(HL)       ;CHECK VALID NUMERIC VALIDATION
39CF  28 0B                  JR    Z,FLVL09     ;BYPASS VALID NUMERIC
39D1  CD 3A81                CALL  PVALVN       ;PROCESS VALID NUMERIC VALIDATION
39D4  FE FF                  CP    EOF
39D6  C8                     RET   Z
39D7  2A 0000*               LD    HL,(VALPTR)
39DA  23                     INC   HL
39DB  23                     INC   HL
39DC                 FLVL09:
39DC  CB 76                  BIT   6,(HL)       ;CHECK RANGE VALIDATION
39DE  28 08                  JR    Z,FLVL12
39E0  CD 3B1E                CALL  PVALRG       ;PROCESS VALIDATION
39E3  FE FF                  CP    EOF
39E5  C8                     RET   Z
39E6  2A 0000*               LD    HL,(VALPTR)
39E9  23                     INC   HL
39EA  23                     INC   HL
39EB                 FLVL12:
39EB  CB 4E                  BIT   1,(HL)       ;CHECK DOLLARS AND CENTS VALIDATION
39ED  28 08                  JR    Z,FLVL14
39EF  CD 3B1F                CALL  PVALDC       ;PROCESS VALIDATION
39F2  FE FF                  CP    EOF
39F4  C8                     RET   Z
39F5  2A 0000*               LD    HL,(VALPTR)
39F8  23                     INC   HL
39F9  23                     INC   HL
39FA                 FLVL14:
39FA  CB 46                  BIT   0,(HL)       ;CHECK DOLLARS & CENTS W/FRACTIONS
39FC  28 06                  JR    Z,FLVL15
39FE  CD 3BA7                CALL  PVALD2       ;PROCESS VALIDATION
3A01  FE FF                  CP    EOF
3A03  C8                     RET   Z
3A04                 FLVL15:
3A04  2A 0000*               LD    HL,(VALPTR)
3A07  23                     INC   HL
3A08  23                     INC   HL
3A09  CB 6E                  BIT   5,(HL)       ;THIRD BYTE OF VALIDATIONS
3A0B  C4 3A81                CALL  NZ,PVALLJ    ;DO LEFT JUSTIFICATION
3A0E  2A 0000*               LD    HL,(VALPTR)
3A11  23                     INC   HL
```

```
3A12   23                   INC     HL
3A13   CB 66                BIT     4,(HL)          ;CHECK RIGHT JUSTIFICATION
3A15   C4 3AA3              CALL    NZ,PVALRJ       ;DO RIGHT JUSTIFICATION
3A18   2A 0000*             LD      HL,(VALPTR)
3A1B   CB 46                BIT     0,(HL)
3A1D   28 09                JR      Z,FLVL16
3A1F   CD 0000*             CALL    SETSCR
3A22   CD 3A38              CALL    PVALVF
3A25   FE 00                CP      0
3A27   C0                   RET     NZ
3A28                 FLVL16:
3A28   2A 0000*             LD      HL,(VALPTR)
3A2B   23                   INC     HL
3A2C   23                   INC     HL
3A2D   23                   INC     HL
3A2E   CB 7E                BIT     7,(HL)
3A30   28 03                JR      Z,PVALKF
3A32   3E 00                LD      A,0
3A34   C9                   RET
                     ;
                     ;PROCESS KEY FIELD VALIDATION
                     ;
3A35                 PVALKF:
3A35   3E 00                LD      A,0             ;TEMP
3A37   C9                   RET
                     ;
                     ;
                     ;PROCESS VERIFY FIELD VALIDATION
                     ;
3A38                 PVALVF:
3A38   3A 3D7F              LD      A,(SPFLAG)
3A3B   FE FF                CP      EOF
3A3D   20 04                JR      NZ,PVALV3
3A3F   3E 00                LD      A,0
3A41   B7                   OR      A
3A42   C9                   RET
3A43                 PVALV3:
3A43   CD 0000*             CALL    REVFLD
3A46   21 4158              LD      HL,PVFMSG       ;VERIFY MESSAGE
3A49   CD 0000*             CALL    CLRPRT
3A4C                 PVALV5:
3A4C   CD 0000*             CALL    INCHAR
3A4F   78                   LD      A,B
3A50   FE 59                CP      "Y"
3A52   28 12                JR      Z,PVALV7
3A54   FE 4E                CP      "N"
3A56   28 17                JR      Z,PVALV9
3A58   FE 1B                CP      ESC
3A5A   28 1C                JR      Z,PVALV6
3A5C   FE 1C                CP      LA
3A5E   28 18                JR      Z,PVALV6
3A60   FE 1E                CP      UPA
```

```
3A62    28 14                  JR      Z,PVALV6
3A64    18 E6                  JR      PVALV5
3A66                   PVALV7:
3A66    CD 0000*               CALL    CLR24
3A69    CD 0000*               CALL    CORFLD
3A6C                   PVALV8:
3A6C    3E 00                  LD      A,0
3A6E    C9                     RET
3A6F                   PVALV9:
3A6F    CD 0000*               CALL    CLR24
3A72    CD 0000*               CALL    CORFLD
3A75    3E FF                  LD      A,EOF
3A77    C9                     RET
3A78                   PVALV6:
3A78    F5                     PUSH    AF
3A79    CD 0000*               CALL    CLR24
3A7C    CD 0000*               CALL    CORFLD
3A7F    F1                     POP     AF
3A80    C9                     RET
                       ;
                       ;
                       ;
                       ;PROCESS LEFT JUSTIFY VALIDATION
                       ;
3A81                   PVALLJ:
3A81    3A 3D7F                LD      A,(SPFLAG)
3A84    FE FF                  CP      EOF
3A86    28 03                  JR      Z,VALLJ5
3A88    CD 0000*               CALL    LJFLD
3A8B                   VALLJ5:
3A8B    3E 00                  LD      A,0
3A8D    C9                     RET
                       ;
                       ;
                       ;PROCESS DEFAULT VALUE VALIDATION
                       ;
3A8E                   PVALDV:
3A8E    3A 3D7F                LD      A,(SPFLAG)
3A91    FE FF                  CP      EOF
3A93    C8                     RET     Z
3A94    3A 0000*               LD      A,(CURFDN)
3A97    4F                     LD      C,A
3A98    CD 0000*               CALL    FNDFLC
3A9B    CD 3C9F                CALL    LOCINT          ;LOCATE INTERPRETIVE VALIDATION DATA
3A9E    53                     LD      D,E             ;FIELD LENGTH
3A9F    CD 0000*               CALL    VDGRAF          ;PRINT DATA INTO FIELD
3AA2    C9                     RET
                       ;
                       ;
                       ;PROCESS RIGHT JUSTIFY VALIDATION
                       ;
```

```
3AA3                  PVALRJ:
3AA3   3A 3D7F                LD      A,(SPFLAG)
3AA6   FE FF                  CP      EOF
3AA8   28 03                  JR      Z,VALRJ5
3AAA   CD 0000*               CALL    RJFLD
3AAD                  VALRJ5:
3AAD   3E 00                  LD      A,0
3AAF   C9                     RET
                      ;
                      ;
                      ;PROCESS PASSWORD VALIDATION
                      ;
3AB0                  PXALPW:
                      ;TO BE COMPLETED
3AB0   C9                     RET
                      ;
                      ;
                      ;PROCESS VALID NUMERIC VALIDATION
                      ;
3AB1                  PVALVN:
3AB1   CD 0000*               CALL    GETFLD          ;READ CURRENT FIELD INTO BUFFER
3AB4   CD 0000*               CALL    MOVRGT          ;RIGHT JUSTIFY FIELD
3AB7   28 61                  JR      Z,PVLVNX        ;EXIT IF FIELD IS BLANK
3AB9   21 0014*               LD      HL,FLDBUF+20
3ABC   3E 20                  LD      A,SPACE
3ABE                  PVLVN2:
3ABE   ED A1                  CPI                     ;SCAN FOR
3AC0   28 FC                  JR      Z,PVLVN2        ;LEFTMOST NONBLANK
3AC2   0C                     INC     C
3AC3   C5                     PUSH    BC              ;SAVE BYTE COUNT
3AC4                  PVLVN4:
3AC4   21 3E63                LD      HL,VNUTAB       ;POINT TO VALID NUMERIC
3AC7   06 01                  LD      B,1             ;CHARACTER TABLE
3AC9   3E 31                  LD      A,SSTSCN
3ACB   CF                     RST     8               ;SCAN FOR INVALID CHARACTER
3ACC   20 36                  JR      NZ,PVLVNE       ;ERROR IF FOUND
3ACE   1B                     DEC     DE
3ACF   0D                     DEC     C
3AD0   20 F2                  JR      NZ,PVLVN4       ;LOOP UNTIL DONE WITH FIELD
3AD2   C1                     POP     BC              ;RESTORE AND SAVE
3AD3   C5                     PUSH    BC              ;BYTE COUNT
3AD4   EB                     EX      DE,HL           ;POINT HL AT
3AD5   09                     ADD     HL,BC           ;RIGHTMOST NONBLANK
3AD6   3E 2D                  LD      A,"-"
3AD8                  PVLVN6:
3AD8   BE                     CP      (HL)            ;SCAN FOR SIGN
3AD9   F2 3AF6                JP      P,PVLVN9        ;IF FOUND, CHECK LOCATION
3ADC   2B                     DEC     HL
3ADD   0D                     DEC     C
3ADE   20 F8                  JR      NZ,PVLVN6       ;LOOP UNTIL DONE
3AE0   C1                     POP     BC              ;RESTORE AND SAVE
```

```
3AE1  C5                  PUSH  BC           ;BYTE COUNT
3AE2  3E 2E               LD    A,"."        ;NO SIGN FOUND
3AE4              PVLVN7:
3AE4  23                  INC   HL
3AE5  BE                  CP    (HL)         ;SCAN FOR PERIOD
3AE6  28 05               JR    Z,PVLVN8     ;IF FOUND, MUST BE THE ONLY ONE
3AE8  0D                  DEC   C
3AE9  20 F9               JR    NZ,PVLVN7    ;LOOP UNTIL DONE
3AEB  18 2D               JR    PVLVNX       ;NOT FOUND - EXIT ROUTINE
3AED              PVLVN8:
3AED  23                  INC   HL
3AEE  0D                  DEC   C
3AEF  28 29               JR    Z,PVLVNX     ;ONLY ONE PERIOD - EXIT ROUTINE
3AF1  BE                  CP    (HL)
3AF2  28 10               JR    Z,PVLVNE     ;MORE THAN ONE - ERROR EXIT
3AF4  18 F7               JR    PVLVN8       ;LOOP UNTIL DONE
3AF6              PVLVN9:
3AF6  79                  LD    A,C
3AF7  FE 01               CP    1            ;IF SIGN NOT LEADING CHARACTER
3AF9  20 09               JR    NZ,PVLVNE    ;GO TO ERROR EXIT
3AFB  C1                  POP   BC
3AFC  C5                  PUSH  BC           ;BYTE COUNT
3AFD  0D                  DEC   C            ;IF SIGN IS THE ONLY CHARACTER
3AFE  28 04               JR    Z,PVLVNE     ;GO TO ERROR EXIT
3B00  3E 2E               LD    A,"."        ;SET UP FOR
3B02  18 E0               JR    PVLVN7       ;PERIOD SCAN
3B04              PVLVNE:
3B04  C1                  POP   BC           ;CLEAR STACK
3B05  CD 0000*            CALL  SETSCR       ;SCROLL PROTECT LINES 1-23
3B08  21 410E             LD    HL,VNUMSG    ;POINT AT ERROR MESSAGE
3B0B  CD 0000*            CALL  PERMSG       ;PRINT MESSAGE ON LINE 24
3B0E  01 0578             LD    BC,1400      ;LOAD DELAY COUNTER
3B11  CD 0000*            CALL  DELAY
3B14  CD 0000*            CALL  CLR24        ;CLEAR LINE 24
3B17  3E FF               LD    A,EOF
3B19  C9                  RET                ;LOAD ERROR RETURN CODE AND EXIT
3B1A              PVLVNX:
3B1A  C1                  POP   BC           ;CLEAR STACK
3B1B  3E 00               LD    A,0
3B1D  C9                  RET                ;LOAD NORMAL RETURN CODE AND EXIT
                  ;
                  ;
                  ;PROCESS RANGE VALIDATION
                  ;
3B1E              PVALRG:
                  ;TO BE COMPLETED
3B1E  C9                  RET
                  ;
                  ;
                  ;PROCESS DOLLARS AND CENTS VALIDATION
                  ;
```

```
                              ;
                              ;
3B1F                  PVALDC:
3B1F   21 3B5C                LD     HL,PVLDC9       ;RESTORE CONDITIONAL
3B22   36 CA                  LD     (HL),0CAH       ;JUMP INSTRUCTION
3B24                  PVLDC1:
3B24   CD 0000*               CALL   GETFLD          ;READ CURRENT FIELD INTO BUFFER
3B27   CD 0000*               CALL   MOVRGT          ;RIGHT JUSTIFY FIELD
3B2A   20 03                  JR     NZ,PVLDC2       ;BYPASS IF FIELD NOT BLANK
3B2C   3E 00                  LD     A,0             ;LOAD VALID RETURN CODE
3B2E   C9                     RET
3B2F                  PVLDC2:
3B2F   13                     INC    DE              ;POINT DE AT RIGHTMOST NONBLANK+1
3B30   21 0014*               LD     HL,FLDBUF+20
3B33   3E 20                  LD     A,SPACE
3B35                  PVLDC3:
3B35   ED A1                  CPI                    ;SCAN FOR
3B37   28 FC                  JR     Z,PVLDC3        ;LEFTMOST NONBLANK
3B39   03                     INC    BC
3B3A   2B                     DEC    HL
3B3B   3E 2E                  LD     A,"."
3B3D   ED B1                  CPIR                   ;SCAN FOR DECIMAL POINT
3B3F   28 0C                  JR     Z,PVLDC8        ;BYPASS IF FOUND
3B41                  PVLDC4:
3B41   36 2E                  LD     (HL),"."        ;INSERT
3B43   23                     INC    HL              ;  .00
3B44                  PVLDC5:
3B44   36 30                  LD     (HL),"0"        ;AT
3B46   23                     INC    HL              ;END
3B47                  PVLDC6:
3B47   36 30                  LD     (HL),"0"        ;OF
3B49   23                     INC    HL              ;FIELD
3B4A   C3 3B97                JP     PVLDCX          ;EXIT ROUTINE
3B4D                  PVLDC8:
3B4D   3E 20                  LD     A,SPACE
3B4F   BE                     CP     (HL)            ;TEST FOR END-OF-FIELD
3B50   28 F2                  JR     Z,PVLDC5        ;INSERT 00 IF FOUND
3B52   3E 2E                  LD     A,"."
3B54   23                     INC    HL
3B55   3E 20                  LD     A,SPACE
3B57   BE                     CP     (HL)            ;TEST FOR END-OF-FIELD
3B58   28 ED                  JR     Z,PVLDC6        ;INSERT 0 IF FOUND
3B5A   23                     INC    HL
3B5B   BE                     CP     (HL)            ;TEST FOR END-OF-FIELD
3B5C                  PVLDC9:
3B5C   CA 3B96                JP     Z,PVLDCR        ;RESET LEFT POINTER IF FOUND
3B5F   3E 34                  LD     A,"4"           ;IF FRACTION
3B61   BE                     CP     (HL)            ;LESS THAN .5
3B62   F2 3B97                JP     P,PVLDCX        ;EXIT ROUTINE
3B65   3A 0000*               LD     A,(CURFLN)      ;USE FIELD LENGTH
3B68   47                     LD     B,A             ;AS LOOP COUNTER
3B69   E5                     PUSH   HL
```

```
3B6A  D1                  POP    DE            ;RESET RIGHT POINTER
3B6B              PVLDCL:
3B6B  2B                  DEC    HL
3B6C  7E                  LD     A,(HL)
3B6D  FE 2E               CP     "."           ;TEST FOR DECIMAL POINT
3B6F  28 FA               JR     Z,PVLDCL      ;IF FOUND, GET ANOTHER BYTE
3B71  FE 20               CP     SPACE         ;TEST FOR BLANK
3B73  28 13               JR     Z,PVLDCS      ;INSERT "1" IF FOUND
3B75  FE 2D               CP     "-"           ;TEST FOR NEGATIVE SIGN
3B77  28 13               JR     Z,PVLDCM      ;LOAD IN ACCUM IF FOUND
3B79  FE 2B               CP     "+"           ;TEST FOR POSITIVE SIGN
3B7B  28 13               JR     Z,PVLDCP
3B7D  FE 39               CP     "9"           ;TEST FOR "9"
3B7F  28 03               JR     Z,PVLDCN      ;INSERT "0" IF FOUND
3B81  34                  INC    (HL)          ;ROUND UP DIGIT
3B82  18 12               JR     PVLDCR        ;AND EXIT
3B84              PVLDCN:
3B84  36 30               LD     (HL),"0"
3B86  10 E3               DJNZ   PVLDCL
3B88              PVLDCS:
3B88  3E 20               LD     A,SPACE       ;NO HIGH ORDER SIGN
3B8A  18 06               JR     PVLDCT
3B8C              PVLDCM:
3B8C  3E 2D               LD     A,"-"         ;HIGH ORDER MINUS SIGN
3B8E  18 02               JR     PVLDCT
3B90              PVLDCP:
3B90  3E 2B               LD     A,"+".        ;HIGH ORDER PLUS SIGN
3B92              PVLDCT:
3B92  36 31               LD     (HL),"1"      ;ADD HIGH ORDER DIGIT
3B94  2B                  DEC    HL
3B95  77                  LD     (HL),A        ;INSERT SIGN, IF ANY
3B96              PVLDCR:
3B96  EB                  EX     DE,HL         ;POINT HL AT RIGHTMOST NONBLANK+1
3B97              PVLDCX:
3B97  3A 0000*            LD     A,(CURFLN)    ;LOAD
3B9A  4F                  LD     C,A           ;FIELD LENGTH
3B9B  06 00               LD     B,0           ;INTO BC
3B9D  37                  SCF                  ;TURN OFF
3B9E  3F                  CCF
3B9F  ED 42               SBC    HL,BC
3BA1  CD 0000*            CALL   PUTFLD
3BA4  3E 00               LD     A,0
3BA6  C9                  RET
                  ;
                  ;
                  ;PROCESS DOLLARS AND CENTS WITH FRACTIONS VALIDATION
                  ;
3BA7              PVALD2:
3BA7  21 3B5C             LD     HL,PVLDC9     ;SET JUMP INSTRUCTION
3BAA  36 C3               LD     (HL),0C3H     ;TO AN UNCONDITIONAL BRANCH
3BAC  C3 3B24             JP     PVLDC1        ;GO TO DOLLARS AND CENTS ROUTINE
```

```
                ;
                ;
                ;THESE VALIDATIONS CAN PRE-EMPT REGULAR INPUT IN FAVOR OF A SPECIAL
                ;INPUT ROUTINE.  ON EXIT, A=EOF IF INPUT IS COMPLETE
                ;A=0 IF GET INPUT     A=OTHER IF SPECIAL TERMINATION
                ;
3BAF            PREVAL:
3BAF  2A 0000*          LD      HL,(VALPTR)
3BB2  7E                LD      A,(HL)
3BB3  E6 FC             AND     0FCH            ;STRIP OFF DS & VF
3BB5  C8                RET     Z               ;NO PRE-INPUT VALIDATIONS
3BB6  CB 7E             BIT     7,(HL)          ;INPUT FIELD ?
3BB8  C2 3BD8           JP      NZ,PVALIN
3BBB  CB 6E             BIT     5,(HL)          ;PASSWORD FIELD ?
3BBD  C2 3BDB           JP      NZ,PVALPW
3BC0  CB 66             BIT     4,(HL)          ;YES/NO FIELD ?
3BC2  C2 3BDE           JP      NZ,PVALYN
3BC5  CB 5E             BIT     3,(HL)          ;COMPUTED FIELD ?
3BC7  C2 3C0A           JP      NZ,PVALCF
3BCA  CB 56             BIT     2,(HL)          ;CALCULATOR MODE ?
3BCC  C2 3C9C           JP      NZ,PVALCA
3BCF  CB 76             BIT     6,(HL)
3BD1  C2 3C9F           JP      NZ,PVALIV
3BD4  3E 00             LD      A,0
3BD6  B7                OR      A
3BD7  C9                RET
                ;
                ;
                ;INPUT VALIDATION, INPUT FROM OTHER DATA BASES
                ;
3BD8            PVALIN:
                ;TO BE COMPLETED
3BD8  3E FF             LD      A,EOF
3BDA  C9                RET
                ;
                ;
                ;PROCESS PASSWORD VALIDATION
                ;
3BDB            PVALPW:
                ;TO BE COMPLETED
3BDB  3E FF             LD      A,EOF
3BDD  C9                RET
                ;
                ;
                ;
                ;PROCESS YES/NO VALIDATION
                ;
3BDE            PVALYN:
3BDE  ED 4B 0000*       LD      BC,(FLOCPR)
3BE2  16 00             LD      D,0
3BE4  CD 0000*          CALL    VDGRAF
3BE7  CD 0000*          CALL    INCHAR
```

```
3BEA   78                    LD     A,B
3BEB   FE 59                 CP     "Y"
3BED   28 15                 JR     Z,PVALY3
3BEF   FE 4E                 CP     "N"
3BF1   28 11                 JR     Z,PVALY3
3BF3   FE 1C                 CP     LA
3BF5   C8                    RET    Z
3BF6   FE 1D                 CP     RA
3BF8   C8                    RET    Z
3BF9   FE 1F                 CP     DOWNA
3BFB   C8                    RET    Z
3BFC   FE 1E                 CP     UPA
3BFE   C8                    RET    Z
3BFF   FE 1B                 CP     ESC
3C01   C8                    RET    Z
3C02   18 DA                 JR     PVALYN
3C04                 PVALY3:
3C04   CD 0000*              CALL   VDCHAR
3C07   3E FF                 LD     A,EOF
3C09   C9                    RET
                     ;
                     ;
                     ;PROCESS COMPUTED FIELD VALIDATION
                     ;
3C0A                 PVALCF:
3C0A   3A 0000*              LD     A,(CURFDN)
3C0D   32 0000*              LD     (SAVFDN),A
3C10   4F                    LD     C,A
3C11   21 0000*              LD     HL,INTVAL      ;INTERPRETIVE VALIDATIONS TABLE
3C14   CD 3CC8               CALL   LOCFLD         ;LOCATE CURRENT IN VAL TABLE
3C17   3E B3                 LD     A,CFTOKN       ;COMPUTED FIELD TOKEN
3C19   4F                    LD     C,A
3C1A   CD 3CBF               CALL   LOCTKN         ;FIND TOKEN IN TABLE
3C1D   7E                    LD     A,(HL)         ;GET FIRST CHAR IN INT VAL
3C1E   FE 00                 CP     0              ;ABSOLUTE VALUE ?
3C20   28 08                 JR     Z,CFI005       ;IF YES, JUMP
3C22   11 0000*              LD     DE,BUFF1       ;IT'S A FIELD NUMBER
3C25   CD 3CD8               CALL   TRNFBF         ;TRANSFER FIELD CONTENTS TO BUFFER
3C28   18 06                 JR     CFI007
3C2A                 CFI005:
3C2A   11 0000*              LD     DE,BUFF1
3C2D   CD 3D1D               CALL   TRNABF         ;TRANSFER ABSOLUTE VALUE TO BUFFER
3C30                 CFI007:
3C30   CD 3D3C               CALL   SAVEOP         ;SAVE ARITHMETIC OPERATOR FOR LATER
3C33   7E                    LD     A,(HL)         ;GET FIRST CHAR OF ARG2
3C34   FE 00                 CP     0              ;ABSOLUTE VALUE ?
3C36   28 08                 JR     Z,CFI015       ;IF YES, JUMP
3C38   11 0000*              LD     DE,BUFF2       ;
3C3B   CD 3CD8               CALL   TRNFBF         ;TRANSFER CONTENTS OF FIELD TO BUFFER
3C3E   18 06                 JR     CFI017
3C40                 CFI015:
```

```
3C40   11 0000*                  LD     DE,BUFF2
3C43   CD 3D1D                   CALL   TRNABF        ;TRANSFER ABSOLUTE VALUE TO BUFFER
3C46                    CFI017:
3C46   3A 0000*                  LD     A,(OPERAT)    ;GET ARITHMETIC OPERATO BACK
3C49   FE 2B                     CP     "+"           ;ADD ?
3C4B   20 06                     JR     NZ,CFI020     ;NO, THEN JUMP
3C4D   CD 0000*                  CALL   MADD          ;YES, ADD THEM UP
3C50   C3 3C6A                   JP     CFI100        ;PUT ANSWER ON SCREEN
3C53                    CFI020:
3C53   FE 2D                     CP     "-"           ;SUBTRACT ?
3C55   20 06                     JR     NZ,CFI025     ;NO, THEN JUMP
3C57   CD 0000*                  CALL   MSUB          ;YES, DO THE SUBTRACTION
3C5A   C3 3C6A                   JP     CFI100        ;PUT ANSWER ON SCREEN
3C5D                    CFI025:
3C5D   FE 2F                     CP     "/"           ;DIVISION ?
3C5F   20 06                     JR     NZ,CFI030     ;NO, JUMP
3C61   CD 0000*                  CALL   MDIV          ;DO THE DIVISION
3C64   C3 3C6A                   JP     CFI100        ;PUT THE ANSWER ON THE SCREE
3C67                    CFI030:
3C67   CD 0000*                  CALL   MMUL          ;MULTIPLY BY DEFAULT
3C6A                    CFI100:
3C6A   3A 0000*                  LD     A,(SAVFDN)    ;RETREIVE CURRENT FIELD
3C6D   32 0000*                  LD     (CURFDN),A
3C70   4F                        LD     C,A
3C71   CD 0000*                  CALL   FNDFLC        ;GET SPECS
3C74   ED 43 0000*               LD     (FLOCPR),BC
3C78   7B                        LD     A,E
3C79   32 0000*                  LD     (CURFLN),A
3C7C   22 0000*                  LD     (VALPTR),HL
3C7F   21 0000*                  LD     HL,BUFF3
3C82   7E                        LD     A,(HL)
3C83   FE 20                     CP     SPACE
3C85   C2 3C89                   JP     NZ,CFI101
3C88   23                        INC    HL
3C89                    CFI101:
3C89   CD 0000*                  CALL   PUTFLD
3C8C   3A 3D7F                   LD     A,(SPFLAG)
3C8F   FE FF                     CP     EOF
3C91   20 03                     JR     NZ,CFI102
3C93   CD 0000*                  CALL   RJFLD
3C96                    CFI102:
3C96   CD 3DEF                   CALL   CHKOVF        ;CHECK FIELD OVERFLOW
3C99   3E FF                     LD     A,EOF
3C9B   C9                        RET
                        ;
                        ;
                        ;PROCESS CALCULATOR INPUT MODE VALIDATION
                        ;
3C9C                    PVALCA:
                        ;TO BE COMPLETED
3C9C   3E 00                     LD     A,0
3C9E   C9                        RET
```

```
                          35720  ;
                          35740  ;
                          35760  ;PROCESS INVISIBLE FIELD VALIDATION
                          35780  ;
3C9F                      35800  PVALIV:
                          35820  ;       LD      HL,(VALPTR)
                          35840  ;       BIT     3,(HL)          ;CHECK FOR COMPUTED FIELD
                          35860  ;       JP      NZ,IVP990       ;PROCESSED BY CF VALIDATION
                          35880  ;       LD      HL,INTVAL
                          35900  ;       CALL    INVLOC          ;FIND LOCATION OF FIELD
3C9F                      35920  PIV005:
                          35940  ;       LD      A,(HL)          ;GET CHAR FROM FIELD
                          35960  ;       CP      EOV             ;END OF FIELD MARKER ?
                          35980  ;       JR      Z,IVP990        ;IF YES, THEN END OF FIELD
                          36000  ;       PUSH    HL
                          36020  ;       LD      D,0
                          36040  ;       LD      BC,(FLOCPR)
                          36060  ;       CALL    VDGRAF
                          36080  ;       POP     HL
                          36100  ;       CALL    INCHAR
                          36120  ;       LD      A,B
                          36140  ;       CP      ENTER
                          36160  ;       RET     Z
                          36180  ;       CP      ESC
                          36200  ;       RET     Z
                          36220  ;       CP      RA              ;CURSOR RIGHT ARROW ?
                          36240  ;       RET     Z
                          36260  ;       CP      LA              ;CURSOR LEFT ARROW ?
                          36280  ;       RET     Z
                          36300  ;       CP      UPA             ;CURSOR UP ARROW ?
                          36320  ;       RET     Z
                          36340  ;       CP      DOWNA           ;CURSOR DOWN ARROW ?
                          36360  ;       RET     Z
                          36380  ;       LD      (HL),A
                          36400  ;       INC     HL
                          36420  ;       LD      BC,(FLOCPR)
                          36440  ;       INC     BC
                          36460  ;       LD      (FLOCPR),BC
                          36480  ;       JP      PIV005          ;LOOP
3C9F                      36500  IVP990:
                          36520  ;       LD      A,EOF
                          36540  ;       RET
                          36560  ;
                          36580  ;
                          36600  ;LOCATE INTERPRETIVE DATA FOR DEFAULT VALIDATION
                          36620  ;
3C9F                      36640  LOCINT:
3C9F    C5                36660          PUSH    BC
3CA0    D5                36680          PUSH    DE
3CA1    21 0000*          36700          LD      HL,INTVAL       ;INTERPRETIVE VALIDATION DATA TABLE
3CA4    3A 0000*          36720          LD      A,(CURFDN)      ;CURRENT FIELD NUMBER
3CA7    4F                36740          LD      C,A             ;FIELD NUMBER TO C
```

```
3CA8                LOCIN3:
3CA8   7E                   LD      A,(HL)         ;TABLE FIELD NUMBER
3CA9   B9                   CP      C              ;CORRECT FIELD ?
3CAA   20 0A                JR      NZ,INTEND      ;NO, ADVANCE TO NEXT FIELD
3CAC                LOCIN4:
3CAC   23                   INC     HL             ;TOKEN ?
3CAD   7E                   LD      A,(HL)         ;GET TOKEN
3CAE   FE B5                CP      DVTOKN         ;DEFAULT TOKEN ?
3CB0   20 FA                JR      NZ,LOCIN4      ;NO, LOOP TIL DVTOKN FOUND
3CB2   D1                   POP     DE
3CB3   C1                   POP     BC
3CB4   23                   INC     HL
3CB5   C9                   RET
                    ;
3CB6                INTEND:
3CB6   23                   INC     HL
3CB7   7E                   LD      A,(HL)
3CB8   FE FF                CP      EOF
3CBA   20 FA                JR      NZ,INTEND
3CBC   23                   INC     HL
3CBD   18 E9                JR      LOCIN3         ;START OF NEXT FIELD
                    ;
                    ;
                    ;LOACTE TOKEN IN C IN INTERPRETIVE VALIDATION TABLE
                    ;
3CBF                LOCTKN:
3CBF   7E                   LD      A,(HL)         ;GET CHAR
3CC0   B9                   CP      C              ;COMPARE IT TO TOKEN
3CC1   28 03                JR      Z,CTKN09       ;ALL DONE ?
3CC3   23                   INC     HL             ;NO, ADVANCE
3CC4   18 F9                JR      LOCTKN
3CC6                CTKN09:
3CC6   23                   INC     HL
3CC7   C9                   RET
                    ;
                    ;
                    ;LOCATE THE FIELD IN C IN INTERPRETIVE VALIDATION TABLE
                    ;
3CC8                LOCFLD:
3CC8   7E                   LD      A,(HL)

3CC9   B9                   CP      C              ;COMPARE IT TO FIELD NUMBER
3CCA   20 02                JR      NZ,CFLD09      ;NO, SKIP PAST FIELD ENTRY
3CCC   23                   INC     HL             ;ADVANCE PAST FIELD NUMBER
3CCD   C9                   RET
3CCE                CFLD09:
3CCE   23                   INC     HL
3CCF   7E                   LD      A,(HL)
3CD0   FE FF                CP      EOF
3CD2   20 FA                JR      NZ,CFLD09
3CD4   23                   INC     HL
3CD5   18 F1                JR      LOCFLD
```

```
3CD7                  SNMBR5::
3CD7    32                    DB      "2"
                      ;
                      ;
                      ;TRANSFER FIELD (HL) TO BUFFER AT (DE)
                      ;
3CD8                  TRNFBF:
3CD8    E5                    PUSH    HL
3CD9    7E                    LD      A,(HL)
3CDA    32 0000*              LD      (CURFDN),A
3CDD    D5                    PUSH    DE
3CDE    4F                    LD      C,A
3CDF    CD 0000*              CALL    FNDFLC
3CE2    ED 43 0000*           LD      (FLOCPR),BC
3CE6    78                    LD      A,E
3CE7    32 0000*              LD      (CURFLN),A
3CEA    22 0000*              LD      (VALPTR),HL
3CED    CD 3AA3               CALL    PVALRJ
3CF0    D1                    POP     DE
3CF1    3A 0000*              LD      A,(CURFDN)
3CF4    4F                    LD      C,A
3CF5    D5                    PUSH    DE
3CF6    CD 0000*              CALL    GETFLD
3CF9    21 0014*              LD      HL,FLDBUFF+20
3CFC    1E 27                 LD      E,40-1
3CFE                  TRNFB4:
3CFE    7E                    LD      A,(HL)
3CFF    FE 20                 CP      " "
3D01    C2 3D07               JP      NZ,TRNFB5
3D04    3E 30                 LD      A,"0"
3D06    77                    LD      (HL),A
3D07                  TRNFB5:
3D07    23                    INC     HL
3D08    1D                    DEC     E
3D09    20 F3                 JR      NZ,TRNFB4
3D0B    D1                    POP     DE
3D0C    21 0014*              LD      HL,FLDBUF+20
3D0F    3A 0000*              LD      A,(CURFLN)
3D12    06 00                 LD      B,0
3D14    4F                    LD      C,A
3D15    ED B0                 LDIR
3D17    3E 00                 LD      A,0
3D19    12                    LD      (DE),A
3D1A    E1                    POP     HL
3D1B    23                    INC     HL
3D1C    C9                    RET
                      ;
                      ;
                      ;TRANSFER ABSOLUTE VALUE AT (HL) TO BUFFER (DE)
                      ;
3D1D                  TRNABF:
```

```
3D1D    23                  INC     HL
3D1E               TRNAB5:
3D1E    7E                  LD      A,(HL)
3D1F    FE 7F               CP      EOV
3D21    28 15               JR      Z,NABF80
3D23    FE 2D               CP      "-"
3D25    28 11               JR      Z,NABF80
3D27    FE 2B               CP      "+"
3D29    28 0D               JR      Z,NABF80
3D2B    FE 2A               CP      "*"
3D2D    28 09               JR      Z,NABF80
3D2F    FE 2F               CP      "/"
3D31    28 05               JR      Z,NABF80
3D33    12                  LD      (DE),A
3D34    13                  INC     DE
3D35    23                  INC     HL
3D36    18 E6               JR      TRNAB5
3D38               NABF80:
3D38    3E 00               LD      A,0
3D3A    12                  LD      (DE),A
3D3B    C9                  RET
                   ;
                   ;
                   ;SAVE THE ARITHMETIC OPERATOR AT (HL)
                   ;
3D3C               SAVEOP:
3D3C    7E                  LD      A,(HL)
3D3D    32 0000*            LD      (OPERAT),A
3D40    23                  INC     HL
3D41    C9                  RET
                   ;
                   ;
                   ;TRANSFER COMPUTED FIELD TO SCREN
                   ;
3D42               TRNRCF::
3D42    2A 0000*            LD      HL,(VALPTR)
3D45    CB 5E               BIT     3,(HL)
3D47    20 03               JR      NZ,RCF005
3D49    C3 0000*            JP      TRNRV1
3D4C               RCF005:
3D4C    C5                  PUSH    BC
3D4D    D5                  PUSH    DE
3D4E    CD 3C0A             CALL    PVALCF
3D51    2A 0000*            LD      HL,(VALPTR)
3D54    23                  INC     HL
3D55    23                  INC     HL
3D56    CB 4E               BIT     1,(HL)          ;TEST DC VALIDATION
3D58    28 05               JR      Z,RCF006
3D5A    CD 3B1F             CALL    PVALDC          ;PROCESS DC VALID
3D5D    18 05               JR      RCF007
3D5F               RCF006:
3D5F    CB 46               BIT     0,(HL)          ;TEST D2 VALID
```

```
3D61   C4 3BA7              CALL   NZ,PVALD2       ;PROCESS D2 VALID
3D64                RCF007:
3D64   D1                   POP    DE
3D65   C1                   POP    BC
3D66   C3 0000*             JP     TRNRV1
                    ;
                    ;
                    ;GET FIELD FROM INVISIBLE FIELD BUFFER
                    ;
3D69                GFL005::
3D69   21 0000*             LD     HL,INTVAL
3D6C   CD 3D7B              CALL   INVLOC          ;START OF INVISIBLE LOCATION
3D6F   11 0014*             LD     DE,FLDBUF+20
3D72                GFL007:
3D72   7E                   LD     A,(HL)
3D73   FE 7F                CP     EOV             ;END OF FIELD ?
3D75   C8                   RET    Z
3D76   12                   LD     (DE),A
3D77   23                   INC    HL
3D78   13                   INC    DE
3D79   18 F7                JR     GFL007
                    ;
                    ;
                    ;PUT DATA INTO INVISIBLE FIELD IN INTERPRETIVE VALIDATION TABLE
                    ;
3D7B                PFL005::
                    ;       POP    DE
                    ;       LD     HL,INTVAL
                    ;       CALL   INVLOC
                    ;       LD     DE,BUFF3
3D7B                PFL007:
                    ;       LD     A,(HL)
                    ;       CP     EOV
                    ;       RET    Z
                    ;       LD     A,(DE)
                    ;       LD     (HL),A
                    ;       INC    DE
                    ;       INC    HL
                    ;       JR     PFL007
                    ;
                    ;
                    ;LOCATE START OF INVISIBLE FIELD IN INTERPRETIVE VALIDATION BUFFER
                    ;
3D7B                INVLOC:
                    ;       LD     A,(CURFDN)
                    ;       LD     C,A
                    ;       CALL   LOCFLD
                    ;       LD     A,IVTOKN
                    ;       LD     C,A
                    ;       CALL   LOCTKN
                    ;       RET
                    ;
```

```
                         ;
                         ;DUMP THE DATABASE TO THE PRINTER
                         ;
3D7B                     DMPDBS:
                                 ;TO BE COMPLETED
3D7B    C3 30C3                  JP      DSMEN2
3D7E    C9                       RET
                         ;
3D7F                     SPFLAG:         DS          1
                         ;
                         ;CHARACTER VALIDATIONS.  VALIDATE CHARS, ON RETURN A=EOF IF INVALID
                         ;
3D80                     CHRVAL:
3D80    2A 0000*                 LD      HL,(VALPTR)
3D83    23                       INC     HL
3D84    7E                       LD      A,(HL)
3D85    E6 FE                    AND     0FEH
3D87    C8                       RET     Z
3D88    E6 FD                    AND     0FDH
3D8A    C8                       RET     Z
3D8B    78                       LD      A,B
3D8C    FE 20                    CP      SPACE
3D8E    CA 3DD5                  JP      Z,PVALBL
3D91    FE 2E                    CP      "."
3D93    CA 3DDF                  JP      Z,PVALDP
3D96    FE 2B                    CP      "+"
3D98    CA 3DE7                  JP      Z,PVALSV
3D9B    FE 2D                    CP      "-"
3D9D    CA 3DE7                  JP      Z,PVALSV
3DA0    FE 01                    CP      F1
3DA2    DA 3DAD                  JP      C,CHRVL5
3DA5    FE 3A                    CP      "9"+1
3DA7    D2 3DAD                  JP      NC,CHRVL5
3DAA    C3 3DBD                  JP      PVALNU
                         ;
3DAD                     CHRVL5:
3DAD    FE 41                    CP      "a"+1
3DAF    DA 3DBA                  JP      C,CHRVL6
3DB2    FE 5B                    CP      "Z"+1
3DB4    D2 3DBA                  JP      NC,CHRVL6
3DB7    C3 3DCA                  JP      PVALAL
                         ;
3DBA                     CHRVL6:
3DBA    C3 3DD2                  JP      PVALAC
                         ;
3DBD                     PVALNU:
3DBD    FE 30                    CP      "0"
3DBF    DA 3DD2                  JP      C,PVALAC
3DC2    2A 0000*                 LD      HL,(VALPTR)
3DC5    23                       INC     HL
3DC6    CB 6E                    BIT     5,(HL)
3DC8    18 11                    JR      GENVAL
                         ;
```

```
                             ;PROCESS ALPHA VALIDATION
                             ;
3DCA                         PVALAL:
3DCA    2A 0000*                     LD      HL,(VALPTR)
3DCD    23                           INC     HL
3DCE    CB 76                        BIT     6,(HL)
3DD0    18 09                        JR      GENVAL
                                     ;
                             ;PROCESS ABSOLUTE CHAR VALIDATION
                             ;
3DD2                         PVALAC:
3DD2    3E FF                        LD      A,EOF          ;TEMP
3DD4    C9                           RET
                             ;
                             ;
3DD5                         PVALBL:
3DD5    2A 0000*                     LD      HL,(VALPTR)
3DD8    23                           INC     HL
3DD9    CB 7E                        BIT     7,(HL)
3DDB                         GENVAL:
3DDB    C0                           RET     NZ
3DDC    3E FF                        LD      A,EOF
3DDE    C9                           RET
                             ;
3DDF                         PVALDP:
3DDF    2A 0000*                     LD      HL,(VALPTR)
3DE2    23                           INC     HL
3DE3    CB 66                        BIT     4,(HL)
3DE5    18 F4                        JR      GENVAL
                             ;
3DE7                         PVALSV:
3DE7    2A 0000*                     LD      HL,(VALPTR)
3DEA    23                           INC     HL
3DEB    CB 5E                        BIT     3,(HL)
3DED    18 EC                        JR      GENVAL
                             ;
                             ;
                             ;
                             ;
3DEF                         CHKOVF:
3DEF    21 0000*                     LD      HL,BUFF3
3DF2    3A 0000*                     LD      A,(CURFLN)
3DF5    4F                           LD      C,A
3DF6    06 00                        LD      B,0
3DF8    09                           ADD     HL,BC
3DF9    23                           INC     HL
3DFA    7E                           LD      A,(HL)
3DFB    FE 20                        CP      ' '
3DFD    20 01                        JR      NZ,OVFERR      ;OVERFLOW ERROR HAS OCCURRED
3DFF    C9                           RET
                             ;
                             ;
```

```
3E00                          OVFERR:
3E00     3A 0000*                        LD      A,(OPERAT)
3E03     FE 2F                           CP      "/"
3E05     20 03                           JR      NZ,OVFER5
3E07     36 20                           LD      (HL)," "

3E09     C9                              RET
3E0A                          OVFER5:
3E0A     CD 0000*                        CALL    REVFLD
3E0D     CD 0000*                        CALL    SETSCR
3E10     21 3E20                         LD      HL,OVFMSG
3E13     CD 0000*                        CALL    PERMSG
3E16     CD 0000*                        CALL    INCHAR
3E19     CD 0000*                        CALL    CLR24
3E1C     CD 0000*                        CALL    CORFLD
3E1F     C9                              RET
                              ;
3E20     42                   OVFMSG:    DB      (ENDOVF-OVFMSG)-1
3E21     14 0D                           DB      CNTLT,ENTER
3E23     43 4F 4D 50                     DB      "COMPUTED VALUE TOO LARGE FOR FIELD. PRESS ANY KEY TO CONTINUE    "
3E27     55 54 45 44
3E2B     20 56 41 4C
3E2F     55 45 20 54
3E33     4F 4F 20 4C
3E37     41 52 47 45
3E3B     20 46 4F 52
3E3F     20 46 49 45
3E43     4C 44 2E 20
3E47     50 52 45 53
3E4B     53 20 41 4E
3E4F     59 20 4B 45
3E53     59 20 54 4F
3E57     20 43 4F 4E
3E5B     54 49 4E 55
3E5F     45 20 20 20
3E63                          ENDOVF:
                              ;
                              ;VALID NUMERIC CHARACTER TABLE
                              ;
                              ;
3E63                          VNUTAB:
3E63     2B 2D 2E                        DB      "+","-","."
3E66     30 31 32 33                     DB      "0","1","2","3","4","5","6","7","8","9"
3E6A     34 35 36 37
3E6E     38 39
3E70     0D                              DB      ENTER
3E71     05                   DBCOMP:            DB      (ENDDBC-DBCOMP)-1
3E72     2F 44 42 53                     DB      "/DBS",ENTER
3E76     0D
3E77                          ENDDBC:
3E77     05                   KYCOMP:            DB      (ENDKYC-KYCOMP)-1
3E78     2F 4B 59 31                     DB      "/KY1",ENTER
```

```
3E7C  0D
3E7D                         ENDKYC:
3E7D                         SERN10::
3E7D  C3 0000*                        JP     PRTSNU
3E80                         SERN08::
3E80  C3 0000*                        JP     SERN09
3E83  AE                     SGNMSG::        DB          (ENDSGN-SGNMSG)-1
3E84  1F 0D 0D                        DB     1FH,ENTER,ENTER
3E87  20 20 20 20                     DB     "        This program created by:",ENTER,ENTER,ENTER,ENTER
3E8B  20 20 20 20
3E8F  54 68 69 73
3E93  20 70 72 6F
3E97  67 72 61 6D
3E9B  20 63 72 65
3E9F  61 74 65 64
3EA3  20 62 79 3A
3EA7  0D 0D 0D 0D
3EAB  20 20 20 20                     DB     "              AUTOGRAMMER",ENTER,ENTER
3EAF  20 20 20 20
3EB3  20 20 20 20
3EB7  20 20 41 55
3EBB  54 4F 47 52
3EBF  41 4D 4D 45
3EC3  52 0D 0D
3EC6  20 20 20 20                     DB     "              SERIAL #          ",ENTER,ENTER
3ECA  20 20 20 20
3ECE  20 20 20 20
3ED2  53 45 52 49
3ED6  41 4C 20 23
3EDA  20 20 20 20
3EDE  20 20 20 20
3EE2  20 0D 0D
3EE5  20 20 20 20                     DB     "      Radio Shack Model II version",ENTER
3EE9  20 20 52 61
3EED  64 69 6F 20
3EF1  53 68 61 63
3EF5  6B 20 4D 6F
3EF9  64 65 6C 20
3EFD  49 49 20 76
3F01  65 72 73 69
3F05  6F 6E 0D
3F08  0D 20 43 6F                     DB     ENTER," Copyright (C) (P) 1981 by Roklan Corp."
3F0C  70 79 72 69
3F10  67 68 74 20
3F14  28 43 29 20
3F18  28 50 29 20
3F1C  31 39 38 31
3F20  20 62 79 20
3F24  52 6F 6B 6C
3F28  61 6E 20 43
3F2C  6F 72 70 2E
3F30  0D 0D                           DB     ENTER,ENTER
```

```
3F32                      43900   ENDSGN:
3F32   BA                 43920   MENMSG::         DB       (ENDMEN-MENMSG)-1
3F33   0D 0D 09 09        43940            DB      ENTER,ENTER,TAB,TAB,TAB,TAB," MENU",ENTER,ENTER
3F37   09 09 20 4D
3F3B   45 4E 55 0D
3F3F   0D
3F40   09 09 09           43960            DB      TAB,TAB,TAB
3F43   20 20 20 20        43980            DB      "    1.  Add a record ",ENTER,ENTER,TAB,TAB,TAB
3F47   31 2E 20 20
3F4B   41 64 64 20
3F4F   61 20 72 65
3F53   63 6F 72 64
3F57   20 0D 0D 09
3F5B   09 09
3F5D   20 20 20 20        44000            DB      "    2.  Delete a record",ENTER,ENTER,TAB,TAB,TAB
3F61   32 2E 20 20
3F65   44 65 6C 65
3F69   74 65 20 61
3F6D   20 72 65 63
3F71   6F 72 64 0D
3F75   0D 09 09 09
3F79   20 20 20 20        44020            DB      "    3.  Modify a record",ENTER,ENTER,TAB,TAB,TAB
3F7D   33 2E 20 20
3F81   4D 6F 64 69
3F85   66 79 20 61
3F89   20 72 65 63
3F8D   6F 72 64 0D
3F91   0D 09 09 09
3F95   20 20 20 20        44040            DB      "    4.  Display a record",ENTER,ENTER,TAB,TAB,TAB
3F99   34 2E 20 20
3F9D   44 69 73 70
3FA1   6C 61 79 20
3FA5   61 20 72 65
3FA9   63 6F 72 64
3FAD   0D 0D 09 09
3FB1   09
3FB2   20 20 20 20        44060            DB      "    5.  Close files and end program",ENTER,ENTER,TAB,TAB,TAB
3FB6   35 2E 20 20
3FBA   43 6C 6F 73
3FBE   65 20 66 69
3FC2   6C 65 73 20
3FC6   61 6E 64 20
3FCA   65 6E 64 20
3FCE   70 72 6F 67
3FD2   72 61 6D 0D
3FD6   0D 09 09 09
3FDA   20 20 20 20        44080            DB      "       SELECT ONE: "
3FDE   20 20 20 53
3FE2   45 4C 45 43
3FE6   54 20 4F 4E
3FEA   45 3A 20
3FED                      44100   ENDMEN:
```

```
3FED                       ADDMSG:
3FED   20 20 20 20                  DB      "                                   ADD A RECORD  "
3FF1   20 20 20 20
3FF5   20 20 20 20
3FF9   20 20 20 20
3FFD   20 20 20 20
4001   20 20 20 20
4005   20 20 20 20
4009   20 20 20 20
400D   20 20 41 44
4011   44 20 41 20
4015   52 45 43 4F
4019   52 44 20 20
401D                       DELMSG:
401D   20 20 20 20                  DB      "                                DELETE A RECORD "
4021   20 20 20 20
4025   20 20 20 20
4029   20 20 20 20
402D   20 20 20 20
4031   20 20 20 20
4035   20 20 20 20
4039   20 20 20 20
403D   44 45 4C 45
4041   54 45 20 41
4045   20 52 45 43
4049   4F 52 44 20
404D                       MODMSG:
404D   20 20 20 20                  DB      "                                MODIFY A RECORD "
4051   20 20 20 20
4055   20 20 20 20
4059   20 20 20 20
405D   20 20 20 20
4061   20 20 20 20
4065   20 20 20 20
4069   20 20 20 20
406D   4D 4F 44 49
4071   46 59 20 41
4075   20 52 45 43
4079   4F 52 44 20
407D                       DISMSG:
407D   20 20 20 20                  DB      "                                DISPLAY A RECORD "
4081   20 20 20 20
4085   20 20 20 20
4089   20 20 20 20
408D   20 20 20 20
4091   20 20 20 20
4095   20 20 20 20
4099   20 20 20 20
409D   44 49 53 50
40A1   4C 41 59 20
40A5   41 20 52 45
40A9   43 4F 52 44
```

```
40AD   20
40AE   20 20 20 20                 DB      "                                  "
40B2   20 20 20 20
40B6   20 20 20 20
40BA   20 20 20 20
40BE   20 20 20 20
40C2   20 20 20 20
40C6   20 20 20 20
40CA   20 20 20 20
                           ;
                           ;PARAMETER LIST FOR /KY1 FILE
                           ;
40CE                       KY1PL1:
40CE   0000*                       DW      FBUF1
40D0   0000*                       DW      RBUF1
40D2   00 00 57 00                 DB      0,0,"W",0,0,0,0
40D6   00 00 00
                           ;
                           ;
                           ;PARAMETER LIST FOR DATABASE FILE
                           ;
40D9                       DBSPL2:
40D9   0000*                       DW      FBUF2
40DB   0000*                       DW      RBUF2
40DD   00 00 57 00                 DB      0,0,"W",0,0,0,0
40E1   00 00 00
                           ;
                           ;
                           ;
40E4   07                  SCNCOM::        DB      (ENDSCN-SCNCOM)-1
40E5   53 43 52 45                 DB      "SCREEN",ENTER
40E9   45 4E 0D
40EC                       ENDSCN:
40EC   06                  CLRMSG::        DB      (ENDCLR-CLRMSG)-1
40ED   43 4C 45 41                 DB      "CLEAR",ENTER
40F1   52 0D
40F3                       ENDCLR:
40F3   1A                  FNFMSG:         DB      (ENDFNF-FNFMSG)-1
40F4   14 0D 20 20                 DB      CNTLT,ENTER,"    RECORD NOT FOUND    "
40F8   20 20 52 45
40FC   43 4F 52 44
4100   20 4E 4F 54
4104   20 46 4F 55
4108   4E 44 20 20
410C   20 20
410E                       ENDFNF:
410E                       VNUMSG:
410E   21                          DB      (ENDVNU-VNUMSG)-1
410F   14 0D 20 20                 DB      CNTLT,ENTER,"   NOT A VALID NUMERIC VALUE   "
4113   20 4E 4F 54
4117   20 41 20 56
411B   41 4C 49 44
411F   20 4E 55 4D
```

```
4123    45 52 49 43
4127    20 56 41 4C
412B    55 45 20 20
412F    20
4130                    44900   ENDVNU:
4130    28              44920   DPKMSG::            DB        ENDDPK-DPKMSG
4131    14 0D 20 20     44940             DB        CNTLT,ENTER," DUPLICATE KEY, CANNOT SAVE RECORD  "
4135    44 55 50 4C
4139    49 43 41 54
413D    45 20 4B 45
4141    59 2C 20 43
4145    41 4E 4E 4F
4149    54 20 53 41
414D    56 45 20 52
4151    45 43 4F 52
4155    44 20 20
4158                    44960   ENDDPK:
                        44980   ;
4158    19              45000   PVFMSG:             DB        (ENDPVF-PVFMSG)-1
4159    14 0D 20 50     45020             DB        CNTLT,ENTER," PLEASE VERIFY  (Y/N)  "
415D    4C 45 41 53
4161    45 20 56 45
4165    52 49 46 59
4169    20 20 28 59
416D    2F 4E 29 20
4171    20
4172                    45040   ENDPVF:
                        45060   ;
4172                    45080   BRKMSG::
4172    27              45100             DB        (ENDBRK-BRKMSG)-1
4173    1A 20 20 20     45120             DB        CNTLZ,"   BREAK    ",CNTLY,"  ARE YOU SURE ? (Y/N)   "
4177    42 52 45 41
417B    4B 20 20 20
417F    20 19 20 20
4183    41 52 45 20
4187    59 4F 55 20
418B    53 55 52 45
418F    20 3F 20 28
4193    59 2F 4E 29
4197    20 20 20
419A                    45140   ENDBRK:
                        45160   ;
                        45180   ;
419A    4D              45200   CRTMS1::            DB        (ENDCR1-CRTMS1)-1
419B    1B 0D 0D 0D     45220             DB        ESC,ENTER,ENTER,ENTER,ENTER,ENTER,ENTER,ENTER,ENTER,ENTER
419F    0D 0D 0D 0D
41A3    0D 0D
41A5    0D 0D           45240             DB        ENTER,ENTER
41A7    09 41 20 43     45260             DB        TAB,"A CRITICAL ERROR CAN OCCUR !!  PUT THE DISK BACK IN THE DRIVE   "
41AB    52 49 54 49
41AF    43 41 4C 20
41B3    45 52 52 4F
```

```
41B7   52 20 43 41
41BB   4E 20 4F 43
41BF   43 55 52 20
41C3   21 21 20 20
41C7   50 55 54 20
41CB   54 48 45 20
41CF   44 49 53 4B
41D3   20 42 41 43
41D7   4B 20 49 4E
41DB   20 54 48 45
41DF   20 44 52 49
41E3   56 45 20 20
41E7   20
41E8
41E8   2F                   45280   ENDCR1:
                            45300   DNPMSG:          DB         (ENDDNP-DNPMSG)-1
41E9   14 0D 44 65          45320            DB      CNTLT,ENTER,"Delete, Next record, Previous record (D/N/P) "
41ED   6C 65 74 65
41F1   2C 20 4E 65
41F5   78 74 20 72
41F9   65 63 6F 72
41FD   64 2C 20 50
4201   72 65 76 69
4205   6F 75 73 20
4209   72 65 63 6F
420D   72 64 20 28
4211   44 2F 4E 2F
4215   50 29 20
4218                        45340   ENDDNP:
4218   24                   45360   DFSMSG:          DB         (ENDDFS-DFSMSG)-1
4219   14 0D 1A 20          45380            DB      CNTLT,ENTER,CNTLZ,"  DELETE  ",CNTLY," ARE YOU SURE ? (Y/N) "
421D   20 44 45 4C
4221   45 54 45 20
4225   20 19 20 41
4229   52 45 20 59
422D   4F 55 20 53
4231   55 52 45 20
4235   3F 20 28 59
4239   2F 4E 29 20
423D                        45400   ENDDFS:
                            45420   ;
                            45440            END     APPLIC

Macros:

Symbols:
ACTOKN  0081    ADDMSG  3FED    ADDREC  30E0    ADREC3  30E7
ADREC4  30F7    ADREC5  3105    ADREC6  3122    APPLIC  3000I
APPNME  3010*   APRSCN  300A*   ARAMVD  3229*   BCKSP   0008
BFIELD  0058    BRKMSG  4172I   BRKSET  3063*   BUFF1   3C2B*
BUFF2   3C41*   BUFF3   3DF0*   CFI005  3C2A    CFI007  3C30
CFI015  3C40    CFI017  3C46    CFI020  3C53    CFI025  3C5D
```

| | | | | | | | |
|---|---|---|---|---|---|---|---|
| CFI030 | 3C67 | CFI100 | 3C6A | CFI101 | 3C89 | CFI102 | 3C96 |
| CFLD09 | 3CCE | CFTOKN | 00B3 | CHKOVF | 3DEF | CHRVAL | 3D80 |
| CHRVL5 | 3DAD | CHRVL6 | 3DBA | CLR24 | 3E1A* | CLRDC1 | 302A* |
| CLRDC2 | 302D* | CLRMM2 | 328C* | CLRMSG | 40EC1 | CLRPRT | 3A4A* |
| CNTLN | 000E | CNTLP | 0010 | CNTLT | 0014 | CNTLY | 0019 |
| CNTLZ | 001A | COMBUF | 3344 | COMFLS | 304B* | COMKEY | 3966* |
| COMMM | 3801 | COMPL1 | 3051* | COMPL2 | 3057* | CORFLD | 3E1D* |
| CREKEY | 35C6* | CRTMS1 | 419A1 | CTKN09 | 3CC6 | CURFDN | 3CF2* |
| CURFLN | 3DF3* | CURRCN | 3984* | DATRCN | 3976* | DBCOMP | 3E71 |
| DBRECL | 30E1* | DBSPL2 | 40D9 | DBSRCN | 3209* | DCB1 | 3956* |
| DCB2 | 3832* | DELAY | 3812* | DELMSG | 401D | DELNPT | 305D* |
| DELRE0 | 3136 | DELRE3 | 3156 | DELRE4 | 3177 | DELRE5 | 3186 |
| DELRE6 | 318C | DELRE9 | 3191 | DELREC | 312D | DFSMSG | 4218 |
| DFTOKN | 00BC | DIRRD | 3959* | DIRRD2 | 382D1 | DIRWR | 3838* |
| DIRWR2 | 3831 | DISMSG | 407D | DISNXT | 331B | DISPRE | 3315 |
| DISPRT | 3321 | DISRC1 | 32B9 | DISRC3 | 32C0 | DISRC4 | 3269 |
| DISRC5 | 32D2 | DISRC6 | 32DC | DISRC8 | 32F2 | DISRC9 | 32FF |
| DISRCA | 330A | DISRCB | 330D | DISRE5 | 322B | DISRE7 | 3254 |
| DISRE8 | 3264 | DISREC | 321D | DLA | 00FC | DLYMSG | 399A1 |
| DMPDBS | 3D7B | DNA | 001F | DNPMSG | 41E8 | DOWNA | 001F |
| DPKMSG | 41301 | DPTOKN | 00B9 | DRA | 00FD | DRSTAT | 00E4 |
| DSLPRT | 00EF | DSMEN2 | 30C31 | DSMENU | 30AB | DSTOKN | 00B8 |
| DVTOKN | 00B5 | EFIELD | 005D | END999 | 30DB* | ENDAPP | 0000* |
| ENDBRK | 419A | ENDCLR | 40F3 | ENDCR1 | 41E8 | ENDDBC | 3E77 |
| ENDDFS | 423D | ENDDNP | 4218 | ENDDPK | 4158 | ENDFNF | 410E |
| ENDKYC | 3E7D | ENDMEN | 3FED | ENDOVF | 3E63 | ENDPVF | 4172 |
| ENDSCN | 40EC | ENDSGN | 3F32 | ENDVNU | 4130 | ENTER | 000D |
| EOF | 00FF | EOFMRK | 32E0* | EOV | 007F | ESC | 001B |
| F1 | 0001 | F2 | 0002 | FBUF1 | 40CE* | FBUF2 | 40D9* |
| FDIS01 | 38BE | FDIS02 | 38B8 | FDIS03 | 38F7 | FDIS04 | 38EA |
| FDIS05 | 3905 | FDIS06 | 3914 | FDIS07 | 393C | FDIS90 | 398B1 |
| FDISA4 | 38E3 | FDISNF | 3994 | FDPSE5 | 3955 | FDPSE6 | 3965 |
| FDPSE7 | 3988 | FDPSE8 | 3975 | FDPSE9 | 3981 | FDPSEQ | 394D |
| FFIELD | 007D | FHMIDR | 3912* | FIRSTF | 329F* | FIRSTK | 3817 |
| FLDBUF | 3D70* | FLDCB1 | 3030* | FLDCB2 | 3033* | FLDTBL | 3004* |
| FLDVAL | 39A9 | FLMIDR | 38B9* | FLOCPR | 3CE4* | FLVL05 | 39BA |
| FLVL07 | 39C8 | FLVL09 | 39DC | FLVL12 | 39EB | FLVL14 | 39FA |
| FLVL15 | 3A04 | FLVL16 | 3A28 | FND007 | 36E6 | FNDREG | 3764 |
| FNDDI5 | 3864 | FNDDI6 | 3874 | FNDDI7 | 389D | FNDDI9 | 389A |
| FNDDIS | 383A1 | FNDEND | 3748 | FNDFLC | 3CE0* | FNDN99 | 372E |
| FNDNE1 | 35D3 | FNDNE2 | 35F1 | FNDNE3 | 3649 | FNDNE4 | 3680 |
| FNDNE5 | 368E | FNDNE6 | 36D4 | FNDNE7 | 36FB | FNDNEA | 3601 |
| FNDNEB | 362A | FNDNEC | 3656 | FNDNED | 3674 | FNDNEE | 36A7 |
| FNDNEF | 36C5 | FNDNEG | 3627 | FNDNEN | 35CA | FNDNKL | 36F0 |
| FNDRE5 | 3992* | FNDREC | 3265* | FNDRET | 3045* | FNDSE1 | 37A5 |
| FNDSE3 | 37AC | FNDSE5 | 37B6 | FNDSE6 | 37C9 | FNDSEQ | 3782 |
| FNDSTR | 37F3 | FNF | 008E | FNFMSG | 40F3 | GENVAL | 3DD8 |
| GETFDA | 35A8 | GETFLD | 3CF7* | GETIN5 | 34F4 | GETIN6 | 354D |
| GETIN7 | 3566 | GETIN8 | 358F | GETIN9 | 3596 | GETINP | 34D21 |
| GETNA5 | 3500 | GFL005 | 3D691 | GFL007 | 3D72 | GRAMT | 3081* |
| HSTOKN | 00B4 | INCHAR | 3E17* | INDNA | 34C8 | INITA5 | 3097 |
| INITAP | 3012 | INKEY1 | 322C* | INLA | 349D | INLA5 | 3488 |

| | | | | | | | |
|---|---|---|---|---|---|---|---|
| INLAB | 3485 | INLB5 | 3497 | INLOOP | 3444 | INLOP5 | 3449 |
| INPLEN | 39B3* | INTEND | 3CB6 | INTOKN | 00B6 | INTVAL | 3D6A* |
| INUPA | 3474 | INVLOC | 3D7B | IVP990 | 3C9F | IVTOKN | 00B2 |
| KBCHAR | 0000* | KEYLEN | 398F* | KFTOKN | 00B7 | KY1PL1 | 40CE |
| KYCOMP | 3E77 | LA | 001C | LASTFN | 34C9* | LEFTA | 001C |
| LJFLD | 3A89* | LOCATE | 37BA* | LOCFLD | 3CC8 | LOCIN3 | 3CA8 |
| LOCIN4 | 3CAC | LOCINT | 3C9F | LOCTKN | 3CBF | MADD | 3C4E* |
| MAXRCN | 38FD* | MB1B2 | 3768* | MB2B1 | 3777* | MB2KR | 371F* |
| MDIV | 3C62* | MENMSG | 3F32I | MINCOL | 356D* | MINRCN | 394F* |
| MKRB1 | 376B* | MMUL | 3C68* | MNTITL | 3002* | MODFLG | 349E* |
| MODMSG | 404D | MODNXT | 3218 | MODPRV | 3213 | MODRE5 | 31C3 |
| MODRE7 | 31E1 | MODREC | 31B2 | MOVL01 | 0000* | MOVRGT | 3B28* |
| MSGBUF | 3098* | MSUB | 3C58* | NABF80 | 3D38 | OPEN | 307C* |
| OPERAT | 3E01* | OVFER5 | 3E0A | OVFERR | 3E00 | OVFMSG | 3E20 |
| PARSCH | 326C* | PERMSG | 3E14* | PFL005 | 3D7B1 | PFL007 | 3D7B |
| PIV005 | 3C9F | PL1 | 3079* | PL2 | 3070* | PREADD | 3124* |
| PRERCN | 390F* | PREVAL | 3BAF | PRMENU | 30C1* | PRTSGN | 3022* |
| PRTSNU | 3E7E* | PRTTIT | 30F0* | PUTFLD | 3C8A* | PVALAC | 3DD2 |
| PVALAL | 3DCA | PVALBL | 3DD5 | PVALCA | 3C9C | PVALCF | 3C0A |
| PVALD2 | 3BA7 | PVALDC | 3B1F | PVALDP | 3DDF | PVALDV | 3A8E |
| PVALIN | 3BD8 | PVALIV | 3C9F | PVALKF | 3A35 | PVALLJ | 3A81 |
| PVALNU | 3DBD | PVALPW | 3BDB | PVALRG | 3B1E | PVALRJ | 3AA3 |
| PVALSV | 3DE7 | PVALV3 | 3A43 | PVALV5 | 3A4C | PVALV6 | 3A78 |
| PVALV7 | 3A66 | PVALV8 | 3A6C | PVALV9 | 3A6F | PVALVF | 3A38 |
| PVALVN | 3AB1 | PVALY3 | 3C04 | PVALYN | 3BDE | PVFMSG | 4158 |
| PVLDC1 | 3B24 | PVLDC2 | 3B2F | PVLDC3 | 3B35 | PVLDC4 | 3B41 |
| PVLDC5 | 3B44 | PVLDC6 | 3B47 | PVLDC8 | 3B4D | PVLDC9 | 3B5C |
| PVLDCL | 3B68 | PVLDCM | 3B8C | PVLDCN | 3B84 | PVLDCP | 3B90 |
| PVLDCR | 3B96 | PVLDCS | 3B88 | PVLDCT | 3B92 | PVLDCX | 3B97 |
| PVLVN2 | 3ABE | PVLVN4 | 3AC4 | PVLVN6 | 3AD8 | PVLVN7 | 3AE4 |
| PVLVN8 | 3AED | PVLVN9 | 3AF6 | PVLVNE | 3B04 | PVLVNX | 3B1A |
| PWTOKN | 00BA | PXALPW | 3AB0 | RA | 001D | RBPNTR | 3292* |
| RBUF1 | 40D0* | RBUF2 | 40DB* | RCF005 | 3D4C | RCF006 | 3D5F |
| RCF007 | 3D64 | RDNREC | 331C* | RDPREC | 3316* | READNX | 0000* |
| RECC02 | 3330 | RECC07 | 333C | RECCOM | 3327 | REVFLD | 3E08* |
| RGTOKN | 00BB | RIGHTA | 001D | RJFLD | 3C94* | RL | 0007 |
| SACTRL | 0064 | SARCV | 0060 | SATX | 0061 | SAVEDP | 3D3C |
| SAVFDN | 3C6B* | SAVREC | 35B2 | SBCTRL | 0065 | SBNDEC | 0015 |
| SBNHEX | 0018 | SBRCV | 0062 | SBTX | 0063 | SCLOSE | 002A |
| SCLRXT | 0039 | SCNCOM | 40E4I | SCNPRT | 3322* | SCROLL | 001B |
| SCURSR | 001A | SDATE | 002D | SDELAY | 0006 | SDIRRD | 0023 |
| SDIRWR | 002C | SDSCMD | 0025 | SDSKID | 000F | SELO | 008E |
| SELNUL | 008F | SERMSG | 0034 | SERN06 | 3549I | SERN07 | 354B* |
| SERN08 | 3E80I | SERN09 | 3E81* | SERN10 | 3E7DI | SERROR | 0027 |
| SETKYL | 3060* | SETSCR | 3E0E* | SETTIT | 3226* | SFIELD | 007B |
| SFLPTR | 003A | SGNMSG | 3E83I | SHLDKY | 001D | SINTID | 0000 |
| SJPDOS | 0024 | SKBCHR | 0004 | SKBINT | 0001 | SKBLIN | 0005 |
| SKILL | 0029 | SLOCAT | 0021 | SLOKUP | 001C | SMPYDV | 0017 |
| SNMBR3 | 30DFI | SNMBR4 | 394CI | SNMBR5 | 3CD7I | SOPEN | 0028 |
| SPACE | 0020 | SPARSR | 0030 | SPFLAG | 3D7F | SPRCHR | 0012 |
| SPRCTL | 005F | SPRINT | 0011 | SPRLIN | 0013 | SRAMDR | 0035 |

```
SRANDM  0014   SRDNXT  0022   SRNAME  002F   SRS232  0037
SRTCMD  0026   SSORT   0038   SSTBRK  0003   SSTCMP  0016
SSTSCN  0031   SSTUSR  0002   STIMER  0019   STSCAN  0000*
SVDCHR  0008   SVDGRF  000A   SVDINT  0007   SVDKEY  000C
SVDLIN  0009   SVDRAM  005E   SVDRED  000B   SWILD   0033
SWRNXT  002B   TAB     0009   TRNAB5  3D1E   TRNABF  3D1D
TRNFB4  3CFE   TRNFB5  3D07   TRNFBF  3CD8   TRNKY1  381B*
TRNRCF  3D421  TRNRE5  329A*  TRNREC  31F8*  TRNRV1  3D67*
TRNRVD  3300*  TRNTTL  305A*  UPA     001E   VALFLD  39A9
VALIDS  3006*  VALLJ5  3A8B   VALPTR  3DE8*  VALRJ5  3AAD
VDCHAR  3C05*  VDGRAF  38E5*  VNUMSG  410E   VNUTAB  3E63
WFIELD  007E   WRITNX  377D*

No  Fatal error(s)
                ;       COMMON SUBROUTINE MODULE FOR AUTOGRAMMER LEVEL 1
                ;
                ;       WRITTEN BY   RON BORTA  3/11/1981
                ;
                ;       LAST REVISION          5/07/1982   3:57 PM
                ;
                        PAGE
OKLAN CORP.             TITLE   COMMON SUBROUTINE MODULE FOR AUTOGRAMMER LEVEL 1  CONFIDENTIAL PROPERTY OF R
                ;
                        SUBTTL  COMMOD/MAC  5/9/82   WRITTEN BY RON BORTA   (ALL RIGHTS RESERVED)
                ;
                ;
                ;
                        ENTRY   COMMOD
                ;
  0000'         COMMOD::
                ;
                        PAGE
                ;.XLIST
                ;THESE ARE THE CHARACTER EQUATES
                ;
008E            FNF     EQU     8EH             ;FILE NOT FOUND
00FF            EOF     EQU     0FFH            ;END OF FILE MARKER
0001            F1      EQU     01              ;FUNCTION 1 KEY
0002            F2      EQU     02              ;FUNCTION 2 KEY
0009            TAB     EQU     9               ;TAB KEY
0008            BCKSP   EQU     8               ;BACKSPACE KEY
000D            ENTER   EQU     0DH             ;ENTER (RETURN)
001B            ESC     EQU     1BH             ;ESCAPE KEY
001C            LEFTA   EQU     1CH
001C            LA      EQU     1CH             ;KEYBOARD LEFT ARROW KEY
001D            RIGHTA  EQU     1DH             ;KEYBOARD RIGHT ARROW KEY
001D            RA      EQU     1DH
00FC            DLA     EQU     0FCH            ;DISPLAY CHAR, CURSOR LEFT
00FD            DRA     EQU     0FDH            ;DISPLAY CHAR, CURSOR RIGHT
```

```
001E    UPA      EQU   1EH
001F    DNA      EQU   1FH
001F    DOWNA    EQU   1FH
0020    SPACE    EQU   20H          ;SPACE BAR
0014    CNTLT    EQU   14H          ;HOME CURSOR
000E    CNTLN    EQU   14           ;CONTROL N
0010    CNTLP    EQU   16           ;CONTROL P
005B    BFIELD   EQU   5BH          ;BEGINNING OF PROMPTED FIELD
005D    EFIELD   EQU   5DH          ;END OF PROMPTED FIELD
007B    SFIELD   EQU   7BH          ;START OF NON-PROMPTED FIELD
00FB    STCFLD   EQU   SFIELD+80H
007D    FFIELD   EQU   7DH          ;FINISH OF NON-PROMPTED FIELD
00FD    ECFLD    EQU   FFIELD+80H
007E    WFIELD   EQU   7EH          ;WHOLE FIELD, NON-PROMPTED
0019    CNTLY    EQU   25           ;CONTROL Y
001A    CNTLZ    EQU   26           ;CONTROL Z
007F    EOV      EQU   7FH
008E    SEL0     EQU   8EH
008D    SEL1     EQU   8DH
008B    SEL2     EQU   8BH
0087    SEL3     EQU   87H
0010    DVCN     EQU   16
00EF    DSLPRT   EQU   0EFH
00E4    DRSTAT   EQU   0E4H
008F    SELNUL   EQU   8FH
0007    RL       EQU   7
        ;
        ;THESE ARE THE SUPERVISOR COMMAND EQUATES
0000    SINTIO   EQU   0            ;INITIALIZE ALL I/O DRIVERS
0001    SKBINT   EQU   1            ;CLEAR STORED KEYSTROKES
0002    SSTUSR   EQU   2            ;SETUP A USER DEFINED SVC
0003    SSTBRK   EQU   3            ;SETS UP A BREAK KEY PROCESSING PROGRAM
0004    SKBCHR   EQU   4            ;GETS A CHAR FROM THE KEYBOARD
0005    SKBLIN   EQU   5            ;GET A LINE FROM KEYBOARD
0006    SDELAY   EQU   6            ;PROVIDES A DELAY LOOP
0007    SVDINT   EQU   7            ;INITIALIZES DISPLAY
0008    SVDCHR   EQU   8            ;SEND A CHAR, SCROLL MODE
0009    SVDLIN   EQU   9            ;SEND A LINE, SCROLL MODE
000A    SVDGRF   EQU   10           ;SEND A CHAR, GRAPHICS MODE
000B    SVDRED   EQU   11           ;READS CHAR, GRAPHICS MODE
000C    SVDKEY   EQU   12           ;DISPLAY MSG AND GET LINE FROM KEYBOARD
000F    SDSKID   EQU   15           ;READS A DISKETTE ID
0011    SPRINT   EQU   17           ;INITIALIZES THE PRINTER DRIVER
0012    SPRCHR   EQU   18           ;SANDS A CHARACTER TO THE PRINTER
0013    SPRLIN   EQU   19           ;SENDS A LINE TO THE PRINTER
0014    SRANDM   EQU   20           ;PROVIDES A RANDOM NUMBER, RANGE- 0,254
0015    SBNDEC   EQU   21           ;CONVERTS BIN TO ASCII, AND VICE-VERSA
0016    SSTCMP   EQU   22           ;COMPARES TWO TEXT STRINGS
0017    SMPYDV   EQU   23           ;PERFORMS 8*16 MULT AND 16/8 DIVISION
0018    SBNHEX   EQU   24           ;CONVERTS BIN TO ASCII HEX AND VICE-VERSA
0019    STIMER   EQU   25           ;SET TIMER TO INTERRUPT PROGRAM
```

```
001A    SCURSR  EQU   26        ;TURNS CURSOR ON OR OFF
001B    SCROLL  EQU   27        ;SETS LINES AT TOP WHICH ARE NOT SCROLLED
001C    SLOKUP  EQU   28        ;SEARCHES THROUGH A TABLE
001D    SHLDKY  EQU   29        ;PROCESS HOLD KEY
0021    SLOCAT  EQU   33        ;RETURNS THE CURRENT RECORD NUMBER
0022    SRDNXT  EQU   34        ;GETS NEXT RECORD (SEQUANTIAL ACCESS)
0023    SDIRRD  EQU   35        ;READS SPECIFIED RECORD (DIRRECT ACCESS)
0024    SJPDOS  EQU   36        ;RETURNS TO TRSDOS (TRSDOS READY)
0025    SDSCMD  EQU   37        ;SENDS TRSDOS A CMD AND RETURNS TO TRSDOR READY
0026    SRTCMD  EQU   38        ;SENDS TRSDOS A CMD AND RETURNS TO CALLER
0027    SERROR  EQU   39        ;DISPLAYS ERROR NUMBER
0028    SOPEN   EQU   40        ;SETS UP ACCESS TO NEW OR EXISTING FILE
0029    SKILL   EQU   41        ;DELETES THE FILE FROM THE DIRECTORY
002A    SCLOSE  EQU   42        ;TERMINATES ACCESS TO AN OPEN FILE
002B    SWRNXT  EQU   43        ;WRITES NEXT RECORD (SEQUENTIAL ACCESS)
002C    SDIRWR  EQU   44        ;WRITES SPECIFIED RECORD (DIRECT ACCESS)
002D    SDATE   EQU   45        ;SETS OR RETURNS TIME AND DATE
002F    SRNAME  EQU   47        ;RENAMES A FILE
002E    SPARSR  EQU   46        ;FINDS AN ALPHANUMERIC PARAMETER FIELD
0031    SSTSCN  EQU   49        ;LOOK FOR A SPECIFIED STRING IN A TEXT BUFFER
0033    SWILD   EQU   51        ;COMPARES A FILE SPECIFICATION WITH A WILD CARD
0034    SERMSG  EQU   52        ;RETURNS ERROR MESSAGE TO BUFFER
0035    SRAMDR  EQU   53        ;GETS DIRECTORY INFORMATION INTO RAM
0037    SRS232  EQU   55        ;SET OR TURN OFF CHANNEL A OR B FOR SERIAL COM
0038    SSORT   EQU   56        ;SORTS A LIST IN RAM
0039    SCLRXT  EQU   57        ;CLEAR RAM AND RETURN TO TRSDOS
003A    SFLPTR  EQU   58        ;GETS POINTERS OF AN OPEN FILE
005E    SVDRAM  EQU   94        ;VIDEO/RAM TRANSFER
005F    SPRCTL  EQU   95        ;CONTROLS PRINTER OPERATIONS
0060    SARCV   EQU   96        ;CHANNEL A RECEIVE
0061    SATX    EQU   97        ;CHANNEL A TRANSMIT
0062    SBRCV   EQU   98        ;CHANNEL B RECEIVE
0063    SBTX    EQU   99        ;CHANNEL B TRANSMIT
0064    SACTRL  EQU   100       ;CHANNEL A CONTROL
0065    SBCTRL  EQU   101       ;CHANNEL B CONTROL
06E8*   LASTRN  EQU   DCB1+12
00B1    ACTOKN  EQU   0B1H      ;ABSOLUTE CHARACTER
00B2    IVTOKN  EQU   0B2H      ;INVISIBLE FIELD
00B3    CFTOKN  EQU   0B3H      ;COMPUTED FIELD
00B4    HSTOKN  EQU   0B4H      ;HELP SCREEN
00B5    DVTOKN  EQU   0B5H      ;DEFAULT VALUE
00B6    INTOKN  EQU   0B6H      ;INPUT FIELD
00B7    KFTOKN  EQU   0B7H      ;KEF FIELD
00B8    DSTOKN  EQU   0B8H      ;DISPATCH FIELD
00B9    DPTOKN  EQU   0B9H      ;DISPATCH PROGRAM
00BC    DFTOKN  EQU   0BCH      ;DISPATCH FIELD
00BA    PWTOKN  EQU   0BAH      ;PASSWORD FIELD
00BB    RGTOKN  EQU   0BBH      ;RANGE
                .LIST
                PAGE
```

```
                        ;
                                EXTRN   MENMSG,SGNMSG,BRKMSG,CLRMSG,DPKMSG,CRTMS1
                                EXTRN   DLYMSG,DIRRD2,GETINP,FDIS90,TRNRCF,SCNCOM
                                EXTRN   FNDDIS,GFL005,PFL005,SERN06,SERN08,SERN10
                        ;
                                EXTRN   SNMBR3,SNMBR4,SNMBR5,DSMEN2
                        ;FIND FIELD LOCATION IN TABLE. FIELD TO SEARCH FOR IS IN "C"
                        ;ON EXIT BC=ROW/COLUMN, HL=VALIDATION POINTER, E=FIELD LENGTH
                        ;
0000'                   FNDFLC::
0000'   21 1D08'                LD      HL,FLDTBL       ;BEGINNING OF FIELD TABLE
0003'                   FNDFL2:
0003'   7E                      LD      A,(HL)          ;GET FIELD NUMBER
0004'   FE FF                   CP      EOF             ;NO MORE FIELDS ?
0006'   C8                      RET     Z               ;ALL DONE. RETURN
0007'   B9                      CP      C               ;IS THIS THE FIELD ?
0008'   28 08                   JR      Z,FND99         ;YES, GO COMPLETE
000A'   23                      INC     HL              ;NO, MOVE POINTER TO NEXT FIELD ENTRY
000B'   23                      INC     HL
000C'   23                      INC     HL
000D'   23                      INC     HL
000E'   23                      INC     HL
000F'   23                      INC     HL
0010'   18 F1                   JR      FNDFL2
                        ;
0012'                   FND99:
0012'   23                      INC     HL              ;POINT AT ROW
0013'   46                      LD      B,(HL)          ;ROW TO B
0014'   23                      INC     HL              ;POINT TO COLUMN
0015'   4E                      LD      C,(HL)          ;COLUMN TO C
0016'   23                      INC     HL              ;POINT TO LENGTH
0017'   5E                      LD      E,(HL)          ;LENGTH TO E
0018'   D5                      PUSH    DE
0019'   23                      INC     HL              ;POINT TO VALIDATION POINTER
001A'   5E                      LD      E,(HL)          ;LOW BYTE OF POINTER TO E
001B'   23                      INC     HL              ;POINT TO HIGH BYTE
001C'   56                      LD      D,(HL)          ;HIGH BYTE OF POINTER TO D
001D'   EB                      EX      DE,HL           ;PUT POINTER IN HL
001E'   D1                      POP     DE
001F'   C9                      RET                     ;ALL DONE
                        ;
                        ;PRINT THE MENU
                        ;
0020'                   PRMENU::
0020'   06 1B                   LD      B,ESC           ;CONTROL CHAR TO CLEAR SCREEN
0022'   CD 2EC2'                CALL    VDCHAR          ;PRINT IT
0025'   CD 03CC'                CALL    PRTTIT          ;PRINT TITLE
0028'   21 0000*                LD      HL,MENMSG       ;THE MENU
002B'   0E 00                   LD      C,0
002D'   46                      LD      B,(HL)          ;LENGTH
002E'   23                      INC     HL              ;ACTUAL DATA
002F'   CD 2EC9'                CALL    VDLINE
```

```
0032'  C9                  RET
                   ;
                   ;
                   ;SET SCREEN TITLE USING MESSAGE AT (HL)
                   ;
0033'              SETTIT::
0033'  0E 50               LD      C,80
0035'  06 00               LD      B,0             ;LINE LENGTH
0037'  11 231F'            LD      DE,APRSCN       ;BLOCK TRANSFER LINE 1
003A'  ED B0               LDIR                    ;ACTUAL MOVEMENT
003C'  C9                  RET
                   ;
                   ;
                   ;TRANSFER VIDEO IMAGE INRAM TO VIDEO
                   ;
003D'              ARAMVD::
003D'  06 00               LD      B,0             ;TRANSFER DIRECTION
003F'  21 231F'            LD      HL,APRSCN       ;VIDEO IMAGE IN RAM
0042'  3E 5E               LD      A,SVDRAM        ;SUPERVISOR COMMAND
0044'  CF                  RST     8               ;SUPERVISOR CALL
0045'  C9                  RET
                   ;
                   ;
                   ;GET A CHARACTER FROM THE KEYBOARD, DONT RETURN TILL YOU HAVE ONE
                   ;
0046'              INCHAR::
0046'  CD 2EA8'            CALL    KBCHAR
0049'  78                  LD      A,B
004A'  B7                  OR      A
004B'  28 01               JR      Z,INCH05
004D'  C9                  RET
004E'              INCH05:
004E'  CD 05ED'            CALL    TAMPER
0051'  18 F3               JR      INCHAR
                   ;
                   ;
                   ;ENTER THE JUST DELETEED RECORD NUMBER IN THE /DEL FILE FOR
                   ;LATER RECLAMATION
                   ;
0053'              ENTDEL::
0053'  C9                  RET                     ;TEMPORARY
                   ;
                   ;CREATE A KEY RECORD IN KEYREC USING FIRST FIELD IN RBUF2
                   ;AND RECORD NUMBER IN BC
0054'              CREKEY::
0054'  C5                  PUSH    BC              ;SAVE RECORD NUMBER
0055'  11 0D82'            LD      DE,KEYREC       ;PUT KEY FILE RECORD HERE
0058'  21 1D0B'            LD      HL,FLDTBL       ;BEGINNING OF FIELD TABLE
005B'  23                  INC     HL
005C'  23                  INC     HL
005D'  23                  INC     HL
005E'  7E                  LD      A,(HL)
```

```
005F'   32 0DE3'                LD      (INPLEN),A
0062'   4F                      LD      C,A
0063'   06 00                   LD      B,0             ;SET HIGH BYTE OF LENGTH TO 0
0065'   21 0C6C'                LD      HL,RBUF2        ;GET FIELD INFO FROM RECORD BUFFER
0068'   ED B0                   LDIR                    ;DO ACTUAL TRANSFER
006A'   C1                      POP     BC              ;RETREIVE RECORD NUMBER
006B'   79                      LD      A,C
006C'   12                      LD      (DE),A
006D'   13                      INC     DE
006E'   78                      LD      A,B
006F'   12                      LD      (DE),A
0070'   C9                      RET
                        ;
                        ;COMPARE KEY IN RBUF2 TO KEY RECORD POINTED TO BY CURRCN
                        ;ON EXIT A=7F IF DATA LOWER THAN NEW KEY, A=0 IF KEY AND DATA ARE EQUAL
                        ;AND A=FF IF DATA IS HIGHER THA NEW KEY
0071'                   COMKEY::
0071'   3A 0DE3'                LD      A,(INPLEN)      ;LENGTH OF KEY FIELD
0074'   4F                      LD      C,A
0075'   11 0D82'                LD      DE,KEYREC       ;RECORD TO SEARCH FOR
0078'   21 0923'                LD      HL,RBUF1        ;CURRENT RECORD
007B'   1A                      LD      A,(DE)          ;GET CHAR TO COMPARE TO
007C'                   COMKEL:
007C'   BE                      CP      (HL)            ;COMPARE IT TO KEY RECORD
007D'   20 0E                   JR      NZ,COMKNO       ;NO COMPARE
007F'   23                      INC     HL
0080'   13                      INC     DE
0081'   0D                      DEC     C               ;ONE LESS CHAR
0082'   79                      LD      A,C             ;DONE ?
0083'   C8                      RET     Z
0084'   1A                      LD      A,(DE)          ;GET NEXT CHAR
0085'   FE 0D                   CP      ENTER           ;PARTIAL SEARCH ?
0087'   C8                      RET     Z
0088'   FE 00                   CP      0
008A'   C8                      RET     Z
008B'   18 EF                   JR      COMKEL          ;LOOP AND COMPARE
008D'                   COMKNO:
008D'   96                      SUB     (HL)            ;TO HIGH OR TOO LOW ?
008E'   38 03                   JR      C,COMKYH        ;TOO HIGH
0090'   3E 7F                   LD      A,7FH           ;TOO LOW
0092'   C9                      RET
0093'                   COMKYH:
0093'   3E FF                   LD      A,EOF           ;TOO HIGH
0095'   C9                      RET
                        ;
                        ;FIND FIND MIDDLE RECORD OF RECORDS LEFT THAT ARE HIGHER THAN CURRENT
                        ;ON EXIT BC=NEW RECORD
                        ;
0096'                   FHMIDR::
0096'   2A 0DDB'                LD      HL,(MAXRCN)     ;GET HIGHEST RECORD NUMBER
0099'   ED 5B 0DD7'             LD      DE,(CURRCN)     ;GET CURRENT RECORD NUMBER
009D'   37                      SCF
```

```
009E'   3F                     CCF
009F'   ED 52                  SBC     HL,DE          ;HL=DIFFERENCE
00A1'   7D                     LD      A,L
00A2'   B4                     OR      H
00A3'   20 10                  JR      NZ,FHMID5
00A5'   ED 4B 0DD7'            LD      BC,(CURRCN)
00A9'   03                     INC     BC
00AA'   ED 43 0DD7'            LD      (CURRCN),BC
00AE'   03                     INC     BC
00AF'   ED 43 0DD8'            LD      (MAXRCN),BC
00B3'   0B                     DEC     BC
00B4'   C9                     RET
00B5'                  FHMID5:
00B5'   CD 00F5'               CALL    DIVHL2         ;DIVIDE DIFFERENCE BY 2
00B8'   EB                     EX      DE,HL          ;DE= DIFFERENCE
00B9'   2A 0DD7'               LD      HL,(CURRCN)    ;GET CURRENT RECORD NUMBER
00BC'   19                     ADD     HL,DE          ;NEW RECORD
00BD'   23                     INC     HL
00BE'   22 0DD7'               LD      (CURRCN),HL    ;SAVE IT
00C1'   E5                     PUSH    HL             ;NEW RECORD NUMBER TO STACK
00C2'   C1                     POP     BC             ;NEW RECORD NUMBER TO BC
00C3'   C9                     RET
                       ;
                       ;FIND MIDDLE RECORD OF RECORDS LEFT THAT ARE LOWER THAN CURRENT
                       ;ON EXIT BC=NEW RECORD NUMBER
                       ;
00C4'                  FLMIDR::
00C4'   2A 0DD7'               LD      HL,(CURRCN)    ;GET CURRENT RECORD NUMBER
00C7'   ED 5B 0DD9'            LD      DE,(MINRCN)    ;GET LOWEST RECORD NUMBER
00CB'   37                     SCF
00CC'   3F                     CCF
00CD'   ED 52                  SBC     HL,DE          ;HL=DIFFERENCE
00CF'   7D                     LD      A,L
00D0'   B4                     OR      H
00D1'   20 10                  JR      NZ,FLMID5
00D3'   ED 4B 0DD7'            LD      BC,(CURRCN)
00D7'   0B                     DEC     BC
00D8'   ED 43 0DD7'            LD      (CURRCN),BC
00DC'   0B                     DEC     BC
00DD'   ED 43 0DD9'            LD      (MINRCN),BC
00E1'   03                     INC     BC
00E2'   C9                     RET
00E3'                  FLMID5:
00E3'   CD 00F5'               CALL    DIVHL2         ;DIVIDE DIFFERENCE BY 2
00E6'   EB                     EX      DE,HL          ;DIFFERENCE TO DE
00E7'   2A 0DD7'               LD      HL,(CURRCN)    ;GET CURRENT RECORD
00EA'   37                     SCF
00EB'   3F                     CCF
00EC'   ED 52                  SBC     HL,DE          ;SUB DIFFERNECE FROM CURRENT
00EE'   2B                     DEC     HL
00EF'   22 0DD7'               LD      (CURRCN),HL
00F2'   E5                     PUSH    HL             ;SAVE NEW RECORD NUMBER ON STAC
```

```
00F3'  C1                      POP     BC              ;NEW RECORD NUMBER TO BC
00F4'  C9                      RET
                       ;
                       ;
                       ;
                       ;DIVIDE HL BY 2, RESULT IN HL
                       ;
00F5'                  DIVHL2:
00F5'  7C                      LD      A,H
00F6'  37                      SCF
00F7'  3F                      CCF
00F8'  1F                      RRA
00F9'  67                      LD      H,A
00FA'  7D                      LD      A,L
00FB'  1F                      RRA
00FC'  6F                      LD      L,A
00FD'  C9                      RET
                       ;
                       ;
                       ;GET INPUT FOR KEY FIELD - FIELD #1
                       ;
00FE'                  INKEY1::
00FE'  CD 0105'                CALL    SETKYL
0101'  CD 0000*                CALL    GETINP          ;GET INPUT FOR FIELD
0104'  C9                      RET
                       ;
                       ;
                       ;SET KEY LENGTH AND RETURN KEY FIELD PARAMETERS
                       ;
0105'                  SETKYL::
0105'  3E 01                   LD      A,1
0107'  32 0DE5'                LD      (CURFDN),A
010A'  4F                      LD      C,A
010B'  CD 0000'                CALL    FNDFLC
010E'  7B                      LD      A,E             ;FIELD LENGTH
010F'  32 0DD3'                LD      (KEYLEN),A
0112'  C9                      RET
                       ;
                       ;
                       ;DISPLAY AN ERROR MESSAGE IN LINE 24
                       ;
0113'                  DISERR:
0113'  FE 00                   CP      0
0115'  C8                      RET     Z
0116'  FE 1C                   CP      28
0118'  C8                      RET     Z
0119'  FE 1D                   CP      29
011B'  C8                      RET     Z
011C'  F5                      PUSH    AF              ;SAVE ERROR NUMBER
011D'  CD 2F48'                CALL    SETSCR
0120'  06 14                   LD      B,CNTLT
0122'  CD 2EC2'                CALL    VDCHAR
```

```
0125'  06 0D                LD      B,ENTER
0127'  CD 2EC2'             CALL    VDCHAR
012A'  F1                   POP     AF
012B'  47                   LD      B,A
012C'  21 0E36'             LD      HL,MSGBUF
012F'  3E 34                LD      A,SERMSG
0131'  CF                   RST     8
0132'  21 0E36'             LD      HL,MSGBUF
0135'  06 4E                LD      B,78
0137'  0E 20                LD      C,SPACE
0139'  CD 2EC9'             CALL    VDLINE
013C'  01 03E8              LD      BC,1000
013F'  CD 020B'             CALL    DELAY
0142'  01 004F              LD      BC,79
0145'  21 0E36'             LD      HL,MSGBUF
0148'  CD 018C'             CALL    CLRMM2
014B'  CD 0476'             CALL    CLR24
014E'  3E FF                LD      A,EOF
0150'  C9                   RET
                    ;
                    ;
                    ;PRINT SIGN-ON MESSAGE ON VIDEO
                    ;
0151'               SERNO1:
0151'  C3 0D79'             JP      SERNO2
                    ;
0154'               PRTSGN::
0154'  06 1B                LD      B,ESC           ;CLEAR SCREEN CHAR
0156'  CD 2EC2'             CALL    VDCHAR          ;DO IT
0159'  21 0000*             LD      HL,SGNMSG       ;SIGN-ON MESSAGE
015C'  0E 0D                LD      C,ENTER         ;LAST CHAR
015E'  46                   LD      B,(HL)          ;GET LENGTH
015F'  23                   INC     HL              ;POINT AT ACTUAL MESSAGE
0160'  CD 2EC9'             CALL    VDLINE          ;PRINT MESSAGE
0163'  18 EC                JR      SERNO1
                    ;
                    ;
                    ;FILL DCB1 WITH APPNME (NAME OF APPLICATION PROGRAM)
                    ;
0165'               FLDCB1::
0165'  11 06DC'             LD      DE,DCB1
0168'               FLDCBB:
0168'  01 0008              LD      BC,8            ;LENGTH OF NAME (MAX)
016B'  21 0D6D'             LD      HL,APPNME       ;LOCATION OF NAME
016E'  ED B0                LDIR                    ;TRANSFER DATA
0170'  C9                   RET
                    ;
0171'               FLDCB2::
0171'  11 0A24'             LD      DE,DCB2
0174'  18 F2                JR      FLDCBB
                    ;
                    ;
```

```
                        ;CLEAR DCB1 TO 0
                        ;
0176'                   CLRDC1::
0176'    21 06DC'               LD      HL,DCB1
0179'                   CLRDC9:
0179'    01 0047                LD      BC,71           ;LENGTH OF DCB AND PARAMETER LIST
017C'    18 05                  JR      CLRMEM
                        ;
                        ;;
                        ;CLEAR DCB2 TO 0
                        ;
017E'                   CLRDC2::
017E'    21 0A24'               LD      HL,DCB2
0181'    18 F6                  JR      CLRDC9
                        ;
                        ;
                        ;CLEAR MEMORY STARTING AT (HL), CLEAR (BC) BYTES TO 0
                        ;
0183'                   CLRMEM::
0183'    E5                     PUSH    HL
0184'    D1                     POP     DE
0185'    13                     INC     DE
0186'    0B                     DEC     BC
0187'    36 00                  LD      (HL),0
0189'    ED B0                  LDIR
018B'    C9                     RET
                        ;CLEAR MEM TO SPACES
018C'                   CLRMM2::
018C'    E5                     PUSH    HL
018D'    D1                     POP     DE
018E'    0B                     DEC     BC
018F'    13                     INC     DE
0190'    36 20                  LD      (HL),SPACE
0192'    ED B0                  LDIR
0194'    C9                     RET
                        ;
                        ;
                        ;MULTIPLY AND DIVIDE USING (HL) AND (C)
0195'                   MLTPLY::
0195'    06 00                  LD      B,0
0197'    18 02                  JR      DIVID5
0199'                   DIVIDE::
0199'    06 FF                  LD      B,EOF
019B'                   DIVID5:
019B'    3E 17                  LD      A,SMPYDV
019D'    CF                     RST     8
019E'    C9                     RET
                        ;
                        ;
                        ;STRING SCAN (SEARCH FIELD FOR CHARACTER STRING)
                        ;(DC) = ARGUMENT  (HL) = START OF SCAN FIELD  (B) = LENGTH OF ARGUMENT
                        ; ODH = SCAN TERMINATOR  Z = FOUND  NZ = NOT FOUND
                        ;(HL) = FIRST BYTE OF STRING IF FOUND, OR SCAN TERMINATOR IF NOT FOUND
                        ;
```

```
                      ;
019F°                 STSCAN::
019F°   3E 31                 LD      A,SSTSCN
01A1°   CF                    RST     8
01A2°   C9                    RET
                      ;
                      ;
                      ;COMPLETE FILESPEC ENDING AT (DE) USING DATA AT (HL)
                      ;
01A3°                 COMFLS::
01A3°   4E                    LD      C,(HL)          ;GET LENGTH
01A4°   06 00                 LD      B,0             ;SET HIGH BYTE OF LENGTH TO 0
01A6°   0D                    DEC     C               ;ACTUAL LENGTH
01A7°   23                    INC     HL              ;POINT AT ACTUAL DATA
01A8°   ED B0                 LDIR
01AA°   C9                    RET
                      ;
                      ;
                      ;COMPLETE PARAMETER LIST USING DATA AT (HL)
                      ;
01AB°                 COMPL1::
01AB°   11 0718°              LD      DE,PL1
01AE°   18 03                 JR      COMPLB
                      ;
                      ;
01B0°                 COMPL2::
01B0°   11 0A60°              LD      DE,PL2
01B3°                 COMPLB:
01B3°   01 000B               LD      BC,11
01B6°   ED B0                 LDIR
01B8°   C9                    RET
                      ;
                      ;
                      ;FIND THE FIRST RETURN OR 0 STARTING AT (DE)
                      ;
01B9°                 FNDRET::
01B9°   1A                    LD      A,(DE)
01BA°   FE 0D                 CP      ENTER
01BC°   C8                    RET     Z
01BD°   FE 00                 CP      0
01BF°   C8                    RET     Z
01C0°   13                    INC     DE
01C1°   18 F6                 JR      FNDRET
                      ;
                      ;
                      ;
                      ;TRANSFER THE FIELD (AT BC) OF CHARACTERS FROM THE SCREEN TO RBUF2
                      ;
01C3°                 TRNFLD:
01C3°   3A 0EDB°              LD      A,(CURFLN)      ;GET CURRENT FIELD LENGTH
01C6°   5F                    LD      E,A
01C7°   ED 4B 0EDE°           LD      BC,(FLOCPR)     ;GET FIELD LOCATION POINTER
01CB°   2A 0D80°              LD      HL,(RBPNTR)     ;RECORD BUFFER POINTER
```

```
'01CE'  E5                      PUSH    HL
 01CF'  16 00                   LD      D,0             ;CLEAR D
 01D1'  19                      ADD     HL,DE
 01D2'  22 0D80'                LD      (RBPNTR),HL     ;FOR NEXT FIELD
 01D5'  E1                      POP     HL
 01D6'  57                      LD      D,A             ;PUT LENGTH IN D
 01D7'  CD 2ED2'                CALL    VDREAD
 01DA'  C9                      RET
                        ;
                        ;
                        ;
                        ;TRANSFER DATA ON SCREEN TO RBUF2
                        ;
 01DB'                  TRNREC::
 01DB'  21 0C6C'                LD      HL,RBUF2
 01DE'  22 0D80'                LD      (RBPNTR),HL     ;SET RECORD BUFFER POINTER TO BEGINNING
 01E1'  3E 00                   LD      A,0
 01E3'  32 0DE5'                LD      (CURFDN),A      ;SET CURRENT FIELD NUMBER
 01E6'                  TRNRE5::
 01E6'  3A 0DE5'                LD      A,(CURFDN)      ;GET CURRENT FIELD NUMBER
 01E9'  3C                      INC     A               ;NEXT FIELD
 01EA'  32 0DE5'                LD      (CURFDN),A      ;SAVE IT
 01ED'  4F                      LD      C,A
 01EE'  CD 0000'                CALL    FNDFLC          ;FIND FIELD PARAMETERS
 01F1'  FE FF                   CP      EOF             ;CHECK TO SEE IF DONE
 01F3'  C8                      RET     Z
 01F4'  22 0ED9'                LD      (VALPTR),HL     ;VALIDATION POINTER
 01F7'  ED 43 0EDE'             LD      (FLDCPR),BC     ;FIELD LOCATION POINTER
 01FB'  7B                      LD      A,E             ;LENGTH
 01FC'  32 0EDB'                LD      (CURFLN),A      ;CURRENT FIELD LENGTH
 01FF'  CD 04C4'                CALL    CHKSAV          ;IS THIS FIELD TO BE SAVED ?
 0202'  FE FF                   CP      EOF
 0204'  28 E0                   JR      Z,TRNRE5        ;NO
 0206'  CD 01C3'                CALL    TRNFLD
 0209'  18 DB                   JR      TRNRE5
                        ;
                        ;
                        ;
                        ;THIS IS A DELAY LOOP
                        ;
 020B'                  DELAY::
 020B'  0B                      DEC     BC
 020C'  79                      LD      A,C
 020D'  B0                      OR      B
 020E'  C8                      RET     Z
 020F'  3E FF                   LD      A,0FFH
 0211'                  DEL05:
 0211'  3D                      DEC     A
 0212'  20 FD                   JR      NZ,DEL05
 0214'  18 F5                   JR      DELAY
                        ;
                        ;
```

```
                                  ;READ NEXT RECORD FROM DATABASE
                                  ;
0216'                             RDNREC::
0216'    3A 0DD6'                         LD      A,(FIRSTF)      ;FIRST RECORD FLAG
0219'    FE 00                            CP      0
021B'    28 32                            JR      Z,FRDNRC
021D'    ED 4B 0DD7'                      LD      BC,(CURRCN)     ;GET CURRENT RECORD NUMBER
0221'    ED 5B 0DDD'                      LD      DE,(DATRCN)
0225'    7A                               LD      A,D
0226'    B8                               CP      B
0227'    20 10                            JR      NZ,RDR03
0229'    7B                               LD      A,E
022A'    B9                               CP      C
022B'    20 0C                            JR      NZ,RDR03
022D'    21 02D3'                         LD      HL,LRNMSG
0230'    CD 0293'                         CALL    DEDMSG
0233'    3E FF                            LD      A,EOF
0235'    32 0D78'                         LD      (EOFMRK),A
0238'    C9                               RET
0239'                             RDR03:
0239'    03                               INC     BC
023A'    ED 43 0DD7'                      LD      (CURRCN),BC     ;STORE NEW NUMBER
023E'                             RDR05:
023E'    11 06DC'                         LD      DE,DCB1
0241'    CD 0000*                         CALL    DIRRD2
0244'    21 0923'                         LD      HL,RBUF1
0247'    7E                               LD      A,(HL)
0248'    FE FF                            CP      EOF
024A'    C2 0000*                         JP      NZ,FDIS90
024D'    18 C7                            JR      RDNREC
                                  ;
                                  ;
024F'                             FRDNRC:
024F'    3E FF                            LD      A,EOF
0251'    32 0DD6'                         LD      (FIRSTF),A
0254'    ED 4B 0DD7'                      LD      BC,(CURRCN)
0258'    78                               LD      A,B
0259'    B1                               OR      C
025A'    28 E2                            JR      Z,RDR05
025C'    03                               INC     BC
025D'    ED 43 0DD7'                      LD      (CURRCN),BC
0261'    18 DB                            JR      RDR05
                                  ;
                                  ;
                                  ;
                                  ;
                                  ;READ THE PREVIOUS RECORD FROM THE DATABASE
                                  ;
0263'                             RDPREC::
0263'    ED 4B 0DD7'                      LD      BC,(CURRCN)     ;GET CURRENT RECORD NUMBER
0267'    79                               LD      A,C
0268'    B0                               OR      B
```

```
0269'  28 1C          13280          JR    Z,RDPRE7
026B'  0B             13300          DEC   BC          ;BACK UP ONE RECORD
026C'                 13320 RDPRE5:
026C'  ED 43 0DD7'    13340          LD    (CURRCN),BC
0270'  11 06DC'       13360          LD    DE,DCB1
0273'  CD 0000*       13380          CALL  DIRRD2
0276'  21 0923'       13400          LD    HL,RBUF1
0279'  7E             13420          LD    A,(HL)
027A'  FE FF          13440          CP    EOF
027C'  C2 0000*       13460          JP    NZ,FDIS90
027F'  ED 4B 0DD7'    13480          LD    BC,(CURRCN)
0283'  79             13500          LD    A,C
0284'  B0             13520          OR    B
0285'  20 DC          13540          JR    NZ,RDPREC
0287'                 13560 RDPRE7:
0287'  21 02A5'       13580          LD    HL,FRNMSG
028A'  CD 0293'       13600          CALL  DEDMSG
028D'  3E FF          13620          LD    A,EOF
028F'  32 0D78'       13640          LD    (EOFMRK),A
0292'  C9             13660          RET
                      13680 ;
0293'                 13700 DEDMSG:
0293'  E5             13720          PUSH  HL
0294'  CD 2F48'       13740          CALL  SETSCR
0297'  E1             13760          POP   HL
0298'  CD 048F'       13780          CALL  PERMSG
029B'  01 0578        13800          LD    BC,1400
029E'  CD 020B'       13820          CALL  DELAY
02A1'  CD 0476'       13840          CALL  CLR24
02A4'  C9             13860          RET
                      13880 ;
02A5'  2D             13900 FRNMSG:  DB    (ENDFRN-FRNMSG)-1
02A6'  46 49 52 53    13920          DB    "FIRST RECORD IN FILE.  NO PREVIOUS RECORDS.  "
02AA'  54 20 52 45
02AE'  43 4F 52 44
02B2'  20 49 4E 20
02B6'  46 49 4C 45
02BA'  2E 20 20 4E
02BE'  4F 20 50 52
02C2'  45 56 49 4F
02C6'  55 53 20 52
02CA'  45 43 4F 52
02CE'  44 53 2E 20
02D2'  20
02D3'                 13940 ENDFRN:
02D3'  27             13960 LRNMSG:  DB    (ENDLRN-LRNMSG)-1
02D4'  4C 41 53 54    13980          DB    "LAST RECORD IN FILE.  NO NEXT RECORD.  "
02D8'  20 52 45 43
02DC'  4F 52 44 20
02E0'  49 4E 20 46
02E4'  49 4C 45 2E
02E8'  20 20 4E 4F
```

```
02EC'   20 4E 45 58
02F0'   54 20 52 45
02F4'   43 4F 52 44
02F8'   2E 20 20
02FB'                    ENDLRN:
  .                      ;
                         ;
                         ;
02FB'                    SNMBR6:
02FB'   30                        DB      "0"
                         ;
                         ;
                         ;TRANSFER DATABASE RECORD IN RBUF2 TO VIDEO
                         ;
02FC'                    TRNRVD::
02FC'   CD 003D'                  CALL    ARAMVD
02FF'   21 0C6C'                  LD      HL,RBUF2
0302'   22 0D80'                  LD      (RBPNTR),HL    ;RESET RECORD BUFFER POINTER
0305'   3E 00                     LD      A,0
0307'   32 0DE5'                  LD      (CURFDN),A     ;REST CURRENT FIELD NUMBER
030A'                    TRNRV1::
030A'   3A 0DE5'                  LD      A,(CURFDN)     ;GET CURRENT FIELD NUMBER
030D'   3C                        INC     A
030E'   32 0DE5'                  LD      (CURFDN),A     ;SAVE NEW NUMBER
0311'   4F                        LD      C,A
0312'   CD 0000'                  CALL    FNDFLC
0315'   FE FF                     CP      EOF
0317'   C8                        RET     Z
0318'   22 0ED9'                  LD      (VALPTR),HL
031B'   ED 43 0EDE'               LD      (FLOCPR),BC
031F'   7B                        LD      A,E
0320'   32 0EDB'                  LD      (CURFLN),A
0323'   CD 04C4'                  CALL    CHKSAV
0326'   FE FF                     CP      EOF
0328'   CA 0000*                  JP      Z,TRNRCF
032B'   16 00                     LD      D,0
032D'   D5                        PUSH    DE
032E'   2A 0D80'                  LD      HL,(RBPNTR)
0331'   EB                        EX      DE,HL
0332'   19                        ADD     HL,DE
0333'   22 0D80'                  LD      (RBPNTR),HL    ;BEGINNING OF NEXT FIELD
0336'   EB                        EX      DE,HL
0337'   D1                        POP     DE
0338'   53                        LD      D,E
0339'   CD 2EBB'                  CALL    VDGRAF
033C'   18 CC                     JR      TRNRV1
                         ;
                         ;
                         ;PRINT THE VIDEO SCREEN
                         ;
033E'                    SCNPRT::
033E'   C5                        PUSH    BC
```

```
033F'   21 0000#              LD      HL,SCNCOM       ;SCREEN COMMAND
0342'   CD 2F4E'              CALL    RETCMD
0345'   C1                    POP     BC
0346'   C9                    RET
                      ;
0347'                 SERNO4:
0347'   C3 05EA'              JP      SERNO5
                      ;
                      ;
                      ;DELETE NON-PROMPTS FROM VIDEO IMAGE
                      ;
034A'                 DELNPT::
034A'   21 231F'              LD      HL,APRSCN
034D'   01 0780               LD      BC,1920         ;LENGTH OF SCREEN
0350'                 DELNP3:
0350'   7E                    LD      A,(HL)
0351'   FE 7B                 CP      SFIELD          ;START OF NON-PROMPTED FIELD?
0353'   28 0F                 JR      Z,DELNP7
0355'   FE 7D                 CP      FFIELD          ;FINISH OF NON-PROMPTED FIELD
0357'   28 0B                 JR      Z,DELNP7
0359'   FE 7E                 CP      WFIELD          ;WHOLE FIELD ?
035B'   28 07                 JR      Z,DELNP7
035D'                 DELNP5:
035D'   23                    INC     HL
035E'   0B                    DEC     BC
035F'   79                    LD      A,C
0360'   B0                    OR      B
0361'   C8                    RET     Z               ;IF THEY'RE BOTH 0 WE'RE DONE
0362'   18 EC                 JR      DELNP3          ;LOOP TILL ZERO
0364'                 DELNP7:
0364'   3E 20                 LD      A,SPACE
0366'   77                    LD      (HL),A
0367'   18 F4                 JR      DELNP5
                      ;
0369'                 SERNO3:
0369'   18 DC                 JR      SERNO4
                      ;
                      ;
                      ;TRANSFER KEY RECORD TO RBUF1
                      ;
036B'                 TRNKY1::
036B'   06 00                 LD      B,0
036D'   3A 0DD3'              LD      A,(KEYLEN)
0370'   4F                    LD      C,A
0371'   03                    INC     BC
0372'   03                    INC     BC
0373'   11 0923'              LD      DE,RBUF1
0376'   21 0D82'              LD      HL,KEYREC
0379'   ED B0                 LDIR
037B'   C9                    RET
                      ;
                      ;
```

```
                          ;TRANSFER KEY RECORD TO RBUF2 FOR COMPARISIONS
                          ;
037C'                     TRNKD1:
037C'    06 00                    LD      B,0
037E'    3A 0DD3'                 LD      A,(KEYLEN)
0381'    4F                       LD      C,A
0382'    03                       INC     BC
0383'    03                       INC     BC
0384'    11 0C6C'                 LD      DE,RBUF2
0387'    21 0D82'                 LD      HL,KEYREC
038A'    ED B0                    LDIR
038C'    C9                       RET
                          ;
                          ;
                          ;MOVE THE KEY RECORD IN RBUF1 TO RBUF2
                          ;
038D'                     MB1B2::
038D'    3A 0DD3'                 LD      A,(KEYLEN)
0390'    4F                       LD      C,A
0391'    06 00                    LD      B,0
0393'    03                       INC     BC
0394'    03                       INC     BC
0395'    11 0C6C'                 LD      DE,RBUF2
0398'    21 0923'                 LD      HL,RBUF1
039B'    ED B0                    LDIR
039D'    C9                       RET
                          ;
                          ;
                          ;MOVE THE KEY RECORD IN RBUF2 TO RBUF1
                          ;
039E'                     MB2B1::
039E'    3A 0DD3'                 LD      A,(KEYLEN)
03A1'    4F                       LD      C,A
03A2'    06 00                    LD      B,0
03A4'    03                       INC     BC
03A5'    03                       INC     BC
03A6'    11 0923'                 LD      DE,RBUF1
03A9'    21 0C6C'                 LD      HL,RBUF2
03AC'    ED B0                    LDIR
03AE'    C9                       RET
                          ;
                          ;
                          ;MOVE RBUF2 TO KEYREC
                          ;
03AF'                     MB2KR::
03AF'    3A 0DD3'                 LD      A,(KEYLEN)
03B2'    06 00                    LD      B,0
03B4'    4F                       LD      C,A
03B5'    03                       INC     BC
03B6'    03                       INC     BC
03B7'    11 0D82'                 LD      DE,KEYREC
03BA'    21 0C6C'                 LD      HL,RBUF2
```

```
03BD'   ED B0                  LDIR
03BF'   C9                     RET
                        ;
                        ;
                        ;TRANSFER TITLE FROM APRSCN TO MNTTL FOR SAFEKEEPPING
                        ;
03C0'                   TRNTTL::
03C0'   01 0050                LD      BC,80
03C3'   11 0EE0'               LD      DE,MNTITL
03C6'   21 231F'               LD      HL,APRSCN
03C9'   ED B0                  LDIR
03CB'   C9                     RET
                        ;
                        ;
                        ;PTINR THE TITLE ON THE FIRST LINE
                        ;
03CC'                   PRTTIT::
03CC'   06 50                  LD      B,80
03CE'   21 0EE0'               LD      HL,MNTITL
03D1'   0E 00                  LD      C,0
03D3'   CD 2EC9'               CALL    VDLINE
03D6'   C9                     RET
                        ;
                        ;
                        ;MOVE KEYREC TO RBUF1
                        ;
03D7'                   MKRB1::
03D7'   3A 0DD3'               LD      A,(KEYLEN)
03DA'   06 00                  LD      B,0
03DC'   4F                     LD      C,A
03DD'   03                     INC     BC
03DE'   03                     INC     BC
03DF'   11 0923'               LD      DE,RBUF1
03E2'   21 0D82'               LD      HL,KEYREC
03E5'   ED B0                  LDIR
03E7'   C9                     RET
                        ;
                        ;
                        ;FIND AND DISPLAY THE REQUESTED RECORD
                        ;
03E8'                   FNDREC::
03E8'   CD 01DB'               CALL    TRNREC
03EB'   CD 03AF'               CALL    MB2KR
03EE'   CD 0000*               CALL    FNDDIS          ;FIND RECORD AND DISPLAY IT
03F1'   FE 8E                  CP      8EH
03F3'   C8                     RET     Z
03F4'   21 0923'               LD      HL,RBUF1
03F7'   3A 0DD3'               LD      A,(KEYLEN)
                        ;EXTRACT DATA RECORD NUMBER FROM KEY RECORD
03FA'                   FNDRE5::
03FA'   23                     INC     HL
```

```
03FB'   3D                      DEC     A
03FC'   20 FC                   JR      NZ,FNDRES
03FE'   4E                      LD      C,(HL)          ;LOW BYTE OF DATRCN
03FF'   23                      INC     HL
0400'   46                      LD      B,(HL)          ;HIGH BYTE OF DATRCN
0401'   ED 43 0DD4'             LD      (DBSRCN),BC
0405'   11 0A24'                LD      DE,DCB2
0408'   ED 4B 0DD4'             LD      BC,(DBSRCN)
040C'   CD 0000*                CALL    DIRRD2
040F'   3A 0D77'                LD      A,(PARSCH)
0412'   FE FF                   CP      EOF
0414'   C8                      RET     Z
0415'   CD 02FC'                CALL    TRNRVD
0418'   C9                      RET
                        ;
                        ;
                        ;SET THE BREAK KEY TO A NEW HANDLER ROUTINE
                        ;
0419'                   BRKSET::
0419'   21 0000                 LD      HL,0
041C'   CD 2F54'                CALL    SETBRK
041F'   22 0D7D'                LD      (SAVBRK),HL
0422'   21 0429'                LD      HL,ENDPRO       ;THE NEW ROUTINE
0425'   CD 2F54'                CALL    SETBRK
0428'   C9                      RET
                        ;
                        ;
                        ;
0429'                   ENDPRO:
0429'                   ENDPR5::
0429'   F5                      PUSH    AF
042A'   C5                      PUSH    BC
042B'   D5                      PUSH    DE
042C'   E5                      PUSH    HL
042D'   CD 2F48'                CALL    SETSCR
0430'   CD 05B6'                CALL    SAVL24          ;SAVE LINE 24
0433'   21 0000*                LD      HL,BRKMSG
0436'   CD 0484'                CALL    CLRPRT
0439'   CD 0046'                CALL    INCHAR
043C'   78                      LD      A,B
043D'   FE 59                   CP      "Y"
043F'   28 03                   JR      Z,ENDPR2
0441'   CD 0476'                CALL    CLR24
0444'   CD 05C6'                CALL    RESL24          ;RESTORE LINE 24
0447'   E1                      POP     HL
0448'   D1                      POP     DE
0449'   C1                      POP     BC
044A'   F1                      POP     AF
044B'   C9                      RET
                        ;
                        ;
044C'                   ENDPR2:
```

```
0440'   E1                        POP     HL
044D'   D1                        POP     DE
044E'   C1                        POP     BC
044F'   F1                        POP     AF
0450'                     END999::
0450'   11 060C'                  LD      DE,DCB1
0453'   CD 2F2D'                  CALL    CLOSE
0456'   11 0A24'                  LD      DE,DCB2
0459'   CD 2F2D'                  CALL    CLOSE
045C'                     ENDCRE::
045C'   06 1B                     LD      B,ESC
045E'   CD 2EC2'                  CALL    VDCHAR
0461'   21 0000                   LD      HL,0
0464'   CD 2F54'                  CALL    SETBRK
0467'   2A 007D'                  LD      HL,(SAVBRK)
046A'   CD 2F54'                  CALL    SETBRK
046D'   21 0000*                  LD      HL,CLRMSG
0470'   46                        LD      B,(HL)
0471'   23                        INC     HL
0472'   05                        DEC     B
0473'   3E 25                     LD      A,SDSCMD
0475'   CF                        RST     8
                          ;
                          ;CLEAR LINE 24
                          ;
0476'                     CLR24::
0476'   CD 2F48'                  CALL    SETSCR
0479'   06 14                     LD      B,CNTLT         ;HOME CURSOR , LINE 24
047B'   CD 2EC2'                  CALL    VDCHAR
047E'   06 0D                     LD      B,ENTER
0480'   CD 2EC2'                  CALL    VDCHAR
0483'   C9                        RET
                          ;
                          ;
                          ;CLEAR LINE 24 AND PRINT MESSAGE AT HL
                          ;
0484'                     CLRPRT::
0484'   C5                        PUSH    BC
0485'   E5                        PUSH    HL
0486'   CD 0476'                  CALL    CLR24
0489'   E1                        POP     HL
048A'   CD 048F'                  CALL    PERMSG
048D'   C1                        POP     BC
048E'   C9                        RET
                          ;
                          ;
                          ;PRINT A MESSAGE ON LINE 24
                          ;
048F'                     PERMSG::
048F'   C5                        PUSH    BC
0490'   06 14                     LD      B,CNTLT
0492'   CD 2EC2'                  CALL    VDCHAR
```

```
0495'  0E 00              LD      C,0
0497'  46                 LD      B,(HL)
0498'  05                 DEC     B
0499'  23                 INC     HL
049A'  CD 2EC9'           CALL    VDLINE
049D'  C1                 POP     BC
049E'  C9                 RET
                   ;
                   ;
                   ;PRINT DUPLICATE KEY MESSAGE
                   ;
049F'              PRTDUP:
049F'  21 0000*           LD      HL,DPKMSG
04A2'  C3 0000*           JP      DLYMSG
                   ;
                   ;
                   ;
                   ;FIND THE LAST FIELD ON THE SCREEN, RETURN WITH FIELD NUMBER IN A
                   ;
04A5'              LASTFN::
04A5'  3E 00              LD      A,0
04A7'  32 0DE5'           LD      (CURFDN),A
04AA'              LASTF5:
04AA'  3A 0DE5'           LD      A,(CURFDN)
04AD'  3C                 INC     A
04AE'  32 0DE5'           LD      (CURFDN),A
04B1'  4F                 LD      C,A
04B2'  CD 0000'           CALL    FNDFLC
04B5'  FE FF              CP      EOF
04B7'  28 03              JR      Z,LASTF9
04B9'  C3 04AA'           JP      LASTF5
                   ;
04BC'              LASTF9:
04BC'  3A 0DE5'           LD      A,(CURFDN)
04BF'  3D                 DEC     A
04C0'  32 0DE5'           LD      (CURFDN),A
04C3'  C9                 RET
                   ;
                   ;
                   ;CHECK IF THIS FIELD IS TO BE SAVED
                   ;
04C4'              CHKSAV:
04C4'  2A 0ED9'           LD      HL,(VALPTR)
04C7'  CB 6E              BIT     5,(HL)          ;PASSWORD ?
04C9'  20 0C              JR      NZ,CHKSV5
04CB'  CB 4E              BIT     1,(HL)          ;DISPATCH ?
04CD'  20 06              JR      NZ,CHKSV5
04CF'  23                 INC     HL
04D0'  CB 46              BIT     0,(HL)          ;NON-STORE ?
04D2'  20 03              JR      NZ,CHKSV5
04D4'  3E 00              LD      A,0
04D6'  C9                 RET
```

```
                        ;
04D7'                   CHKSV5:
04D7'   3E FF                   LD      A,EOF
04D9'   C9                      RET
                        ;
                        ;LEFT JUSTIFY CURRENT FIELD
                        ;
04DA'                   LJFLD::
04DA'   CD 0500'                CALL    GETFLD
04DD'   CD 0541'                CALL    MOVLFT
04E0'   CD 052B'                CALL    PUTFLD
04E3'   01 00EF                 LD      BC,239
04E6'   21 0DE7'                LD      HL,FLDBUF-79
04E9'   CD 018C'                CALL    CLRMM2
04EC'   C9                      RET
                        ;
                        ;
                        ;RIGHT JUSTIFY CURRENT FIELD
                        ;
04ED'                   RJFLD::
04ED'   CD 0500'                CALL    GETFLD
04F0'   CD 0551'                CALL    MOVRGT
04F3'   CD 052B'                CALL    PUTFLD
04F6'   01 00EF                 LD      BC,239
04F9'   21 0DE7'                LD      HL,FLDBUF-79
04FC'   CD 018C'                CALL    CLRMM2
04FF'   C9                      RET
                        ;
                        ;
                        ;GET CURRENT FIELD INTO FIELD BUFFER
                        ;
0500'                   GETFLD::
0500'   21 0E36'                LD      HL,FLDBUF
0503'   01 004F                 LD      BC,79
0506'   CD 018C'                CALL    CLRMM2
0509'   3A 0DE5'                LD      A,(CURFDN)
050C'   4F                      LD      C,A
050D'   CD 0000'                CALL    FNDFLC
0510'   2A 0ED9'                LD      HL,(VALPTR)
0513'   ED 43 0EDE'             LD      (FLDCPR),BC
0517'   7B                      LD      A,E
0518'   32 0EDB'                LD      (CURFLN),A
051B'   2A 0ED9'                LD      HL,(VALPTR)
051E'   CB 76                   BIT     6,(HL)
0520'   C2 0000*                JP      NZ,GFL005
0523'   21 0E4A'                LD      HL,FLDBUF+20
0526'   57                      LD      D,A
0527'   CD 2ED2'                CALL    VDREAD
052A'   C9                      RET
                        ;
                        ;
                        ;PUT CURRENT FIELD IN BUFFER BACK ONTO SCREEN
```

```
                     ;
052B'                PUTFLD::
052B'   E5                   PUSH    HL
052C'   2A 0ED9'             LD      HL,(VALPTR)
052F'   CB 76                BIT     6,(HL)
0531'   C2 0000#             JP      NZ,PFL005
0534'   E1                   POP     HL
0535'   ED 4B 0EDE'          LD      BC,(FLDCPR)
0539'   3A 0EDB'             LD      A,(CURFLN)
053C'   57                   LD      D,A
053D'   CD 2EBB'             CALL    VDGRAF
0540'   C9                   RET
                     ;
                     ;
                     ;MOVE THE DATA IN FIELD BUFFER TO THE LEFT - LEFT JUSTIFY
                     ;
0541'                MOVLFT::
0541'   21 0E4A'             LD      HL,FLDBUF+20
0544'                MOVL01::
0544'   3A 0EDB'             LD      A,(CURFLN)
0547'   5F                   LD      E,A
0548'                MOVL03:
0548'   7E                   LD      A,(HL)
0549'   FE 20                CP      SPACE
054B'   C0                   RET     NZ
054C'   23                   INC     HL
054D'   1D                   DEC     E
054E'   C8                   RET     Z
054F'   18 F7                JR      MOVL03
                     ;
                     ;
                     ;MOVE DATA IN FIELD BUFFER TO THE RIGHT - RIGHT JUSTIFY
                     ;
0551'                MOVRGT::
0551'   21 0E4A'             LD      HL,FLDBUF+20
0554'   3A 0EDB'             LD      A,(CURFLN)
0557'   06 00                LD      B,0
0559'   4F                   LD      C,A
055A'   09                   ADD     HL,BC
055B'   EB                   EX      DE,HL
055C'   21 0E4A'             LD      HL,FLDBUF+20
055F'   1B                   DEC     DE
0560'                MOVR03:
0560'   1A                   LD      A,(DE)
0561'   FE 20                CP      SPACE
0563'   C0                   RET     NZ
0564'   2B                   DEC     HL
0565'   1B                   DEC     DE
0566'   0D                   DEC     C
0567'   28 02                JR      Z,MOVR05
0569'   18 F5                JR      MOVR03
056B'                MOVR05:
056B'   21 0E4A'             LD      HL,FLDBUF+20
```

```
056E'   C9                          RET
                        ;
                        ;
                        ;REVERSE THE CURRENT FIELD ON THE SCREEN
                        ;
056F'                   REVFLD::
056F'   3A 0DE5'                LD      A,(CURFDN)
0572'   4F                      LD      C,A
0573'   CD 0000'                CALL    FNDFLC
0576'   ED 43 0EDE'             LD      (FLOCPR),BC
057A'   7B                      LD      A,E
057B'   32 0EDB'                LD      (CURFLN),A
057E'   21 0E36'                LD      HL,FLDBUF
0581'   53                      LD      D,E
0582'   CD 2ED2'                CALL    VDREAD
0585'   06 1A                   LD      B,CNTLZ
0587'   CD 2EC2'                CALL    VDCHAR
058A'   3A 0EDB'                LD      A,(CURFLN)
058D'   57                      LD      D,A
058E'   ED 4B 0EDE'             LD      BC,(FLOCPR)
0592'   21 0E36'                LD      HL,FLDBUF
0595'   CD 2EBB'                CALL    VDGRAF
0598'   06 19                   LD      B,CNTLY
059A'   CD 2EC2'                CALL    VDCHAR
059D'   C9                      RET
                        ;
                        ;
                        ;CORRECT THE CURRENT FIELD BY REDISPLAYING IN NORMAL VIDEO
                        ;
059E'                   CORFLD::
059E'   3A 0EDB'                LD      A,(CURFLN)
05A1'   57                      LD      D,A
05A2'   ED 4B 0EDE'             LD      BC,(FLOCPR)
05A6'   21 0E36'                LD      HL,FLDBUF
05A9'   CD 2EBB'                CALL    VDGRAF
05AC'   01 004F                 LD      BC,79
05AF'   21 0E36'                LD      HL,FLDBUF
05B2'   CD 018C'                CALL    CLRMM2
05B5'   C9                      RET
                        ;
                        ;
                        ;SAVE CONTENTS OF LINE 24 IN MSGBUF
                        ;
05B6'                   SAVL24:
05B6'   CD 05D6'                CALL    SAVCUR          ;SAVE CURSOR POSITION
05B9'   06 17                   LD      B,23            ;SET ROW
05BB'   0E 00                   LD      C,0             ;SET COLUMN
05BD'   16 4F                   LD      D,79            ;SET LENGTH
05BF'   21 0E36'                LD      HL,MSGBUF
05C2'   CD 2ED2'                CALL    VDREAD
05C5'   C9                      RET
                        ;
```

```
                        ;
                        ;RESTORE LINE 24 FROM MSGBUF
                        ;
05C6'                   RESL24:
05C6'   06 17                   LD      B,23            ;SET ROW
05C8'   0E 00                   LD      C,0
05CA'   16 4F                   LD      D,79            ;SET LENGTH
05CC'   21 0E36'                LD      HL,MSGBUF
05CF'   CD 2EBB'                CALL    VDGRAF
05D2'   CD 05E0'                CALL    RESCUR          ;RESTORE CURSOR POSITION
05D5'   C9                      RET
                        ;
                        ;
                        ;SAVE CURRENT CURSOR POSITION
                        ;
05D6'                   SAVCUR::
05D6'   16 00                   LD      D,0
05D8'   CD 2ED2'                CALL    VDREAD
05DB'   ED 43 0EDC'             LD      (CURSAV),BC
05DF'   C9                      RET
                        ;
                        ;
                        ;RESTORE CURSOR POSITION
                        ;
05E0'                   RESCUR::
05E0'   16 00                   LD      D,0
05E2'   ED 4B 0EDC'             LD      BC,(CURSAV)
05E6'   CD 2EBB'                CALL    VDGRAF
05E9'   C9                      RET
                        ;
05EA'                   SERN05:
05EA'   CD 0000*                CALL    SERN06
                        ;
                        ;
                        ;CHECK TO SEE IF THE DISK DRIVE HAS BEEN TAMPERED WITH
                        ;
05ED'                   TAMPER:
05ED'   CD 064E'                CALL    DRCHK
05F0'   C8                      RET     Z
05F1'   CD 064E'                CALL    DRCHK
05F4'   C8                      RET     Z
05F5'   CD 064E'                CALL    DRCHK
05F8'   C8                      RET     Z
05F9'   C5                      PUSH    BC
05FA'   D5                      PUSH    DE
05FB'   E5                      PUSH    HL
05FC'   CD 05D6'                CALL    SAVCUR
05FF'   3E FF                   LD      A,EOF
0601'   32 0D7F'                LD      (REVFLG),A
0604'   CD 06C0'                CALL    SAVVID
0607'                   TAMP05:
```

```
0607'   06 00           25340           LD      B,0
0609'   3E 1B           25360           LD      A,SCROLL
060B'   CF              25380           RST     8
060C'   01 01F4         25400           LD      BC,500
060F'   CD 020B'        25420           CALL    DELAY
0612'   06 1B           25440           LD      B,ESC
0614'   CD 2EC2'        25460           CALL    VDCHAR
0617'   21 0000*        25480           LD      HL,CRTMS1
061A'   46              25500           LD      B,(HL)          ;LENGTH OF MESSAGE
061B'   23              25520           INC     HL
061C'   CD 2EC9'        25540           CALL    VDLINE          ;PRINT MESSAGE
061F'   CD 0690'        25560           CALL    REVVID          ;REVERSE VIDEO MODE
0622'   CD 064E'        25580           CALL    DRCHK           ;CHECK DRIVR STATUS
0625'   28 17           25600           JR      Z,TAMPOK        ;DRIVE IS BACK TO NORMAL
0627'   01 01F4         25620           LD      BC,500
062A'   CD 020B'        25640           CALL    DELAY
062D'   21 0000*        25660           LD      HL,CRTMS1       ;
0630'   46              25680           LD      B,(HL)          ;LENGTH OF MESSAGE
0631'   CD 2EC9'        25700           CALL    VDLINE
0634'   CD 0690'        25720           CALL    REVVID          ;REVERSE VIDEO MODE
0637'   CD 064E'        25740           CALL    DRCHK           ;CHECK DRIVE STATUS
063A'   28 02           25760           JR      Z,TAMPOK        ;BACK TO NORMAL
063C'   18 C9           25780           JR      TAMPO5          ;LOOP TIL NORMAL
                        25800   ;
                        25820   ;
                        25840   ;DRIVE IS BACK TO NORMAL STATUS
                        25860   ;
063E'                   25880   TAMPOK:
063E'   3E 19           25900           LD      A,CNTLY         ;NORMAL VIDEO MODE
0640'   47              25920           LD      B,A
0641'   CD 2EC2'        25940           CALL    VDCHAR
0644'   CD 06BC'        25960           CALL    RESVID          ;PUT VIDEO SCREEN BACK
0647'   CD 05E0'        25980           CALL    RESCUR
064A'   E1              26000           POP     HL
064B'   D1              26020           POP     DE
064C'   C1              26040           POP     BC
064D'   C9              26060           RET
                        26080   ;
                        26100   ;CHECK DRIVE STATUS
                        26120   ;
064E'                   26140   DRCHK:
064E'   3A 06DB'        26160           LD      A,(GRAMT)
0651'   FE FF           26180           CP      EOF
0653'   28 0E           26200           JR      Z,DRCHK5
0655'   3A 0A34'        26220           LD      A,(DCB2+DVCN)
0658'   CD 0667'        26240           CALL    DRVSTT
065B'   C0              26260           RET     NZ
065C'   3A 06EC'        26280           LD      A,(DCB1+DVCN)
065F'   CD 0667'        26300           CALL    DRVSTT
0662'   C0              26320           RET     NZ
0663'                   26340   DRCHK5:
0663'   3E 00           26360           LD      A,0
```

```
0665'  B7                  OR     A
0666'  C9                  RET
                   ;
0667'              DRVSTT:
0667'  FE 00               CP     0
0669'  20 11               JR     NZ,STAT1
066B'  3E 8E               LD     A,SEL0
066D'              DSTATC:
066D'  D3 EF               OUT    (DSLPRT),A
066F'  E5                  PUSH   HL
0670'  E5                  PUSH   HL
0671'  E5                  PUSH   HL
0672'  E5                  PUSH   HL
0673'  E1                  POP    HL
0674'  E1                  POP    HL
0675'  E1                  POP    HL
0676'  E1                  POP    HL
0677'  DB E4               IN     A,(DRSTAT)
0679'  CB 7F               BIT    7,A
067B'  C9                  RET
                   ;
067C'              STAT1:
067C'  FE 01               CP     1
067E'  20 04               JR     NZ,STAT2
0680'  3E 8D               LD     A,SEL1
0682'  18 E9               JR     DSTATC
0684'              STAT2:
0684'  FE 02               CP     2
0686'  20 04               JR     NZ,STAT3
0688'  3E 8B               LD     A,SEL2
068A'  18 E1               JR     DSTATC
068C'              STAT3:
068C'  3E 87               LD     A,SEL3
068E'  18 DD               JR     DSTATC
                   ;
                   ;
                   ;REVERSE THE CURRENT VIDEO MODE
                   ;
0690'              REVVID:
0690'  3A 0D7F'            LD     A,(REVFLG)
0693'  FE FF               CP     EOF
0695'  28 0C               JR     Z,REV005
0697'  3E FF               LD     A,EOF
0699'  32 0D7F'            LD     (REVFLG),A
069C'  3E 19               LD     A,CNTLY
069E'  47                  LD     B,A
069F'  CD 2EC2'            CALL   VDCHAR
06A2'  C9                  RET
                   ;
06A3'              REV005:
06A3'  3E 00               LD     A,0
06A5'  32 0D7F'            LD     (REVFLG),A
```

```
06A8'   3E 1A              LD      A,CNTLZ
06AA'   47                 LD      B,A
06AB'   CD 2EC2'           CALL    VDCHAR
06AE'   C9                 RET
                   ;
                   ;
                   ;TRANSFER FROM RAM TO VIDEO AND BACK
                   ;
06AF'              RAMVID::
06AF'   06 00              LD      B,0
06B1'   18 02              JR      VIDR05
06B3'              VIDRAM::
06B3'   06 FF              LD      B,0FFH
06B5'              VIDR05::
06B5'   21 231F'           LD      HL,APRSCN
06B8'   3E 5E              LD      A,SVDRAM
06BA'   CF                 RST     8
06BB'   C9                 RET
                   ;
                   ;
                   ;RESTORE THE PREVIOUS VIDEO IMAGE STORED IN VIMAGE
                   ;
06BC'              RESVID:
06BC'   06 00              LD      B,0             ;DIRECTION
06BE'   18 02              JR      SAVVI5
                   ;
                   ;SAVE THE CURRENT VIDEO IMAGE IN VIMAGE
                   ;
06C0'              SAVVID:
06C0'   06 FF              LD      B,0FFH          ;DIRECTION
06C2'              SAVVI5:
06C2'   21 1589'           LD      HL,VIMAGE
06C5'   3E 5E              LD      A,SVDRAM        ;SUPERVISOR COMMAND
06C7'   CF                 RST     8
06C8'   C9                 RET
                   ;
06C9'              INAUTO::
06C9'   21 1589'           LD      HL,MSTART
06CC'   01 1917            LD      BC,MEND-MSTART-1
06CF'   CD 018C'           CALL    CLRMM2
06D2'   21 0DD3'           LD      HL,BSTART
06D5'   01 07B4            LD      BC,BEND-BSTART-1
06D8'   C3 0183'           JP      CLRMEM
                   ;
                   ;
06DB'              GRAMT:: DS      1               ;DRIVE STATUS CHECK FLAG
                   ;
                   ;
06DC'              DCB1::  DS      60              ;DEVICE CONTROL BLOCK #1
0718'              PL1::   DS      11              ;PARAMETER LIST FOR DCB1
0723'              FBUF1::
0723'                      DS      512             ;FILE BUFFER FOR DCB1
```

```
0923°                 RBUF1::
0923°                           DS      256          ;RECORD BUFFER FOR DCB1
0A23°   0D                      DB      ENTER
                      ;
                      ;DCB #2 IS USUALLY USED FOR ACCESSING A DATABASE FILE (/DBS)
                      ;
0A24°                 DCB2::    DS      60           ;DEVICE CONTROL BLOCK #2
0A60°                 PL2::     DS      11           ;PARAMETER LIST FOR DCB2
0A6B°                 SNMBR2:
0A6B°   30                      DB      "0"
0A6C°                 FBUF2::
0A6C°                          DS           512       ;FILE BUFFER FOR DCB2
0C6C°                 RBUF2::
0C6C°                           DS      255          ;RECORD BUFFER FOR DCB2
0D6C°   0D                      DB      ENTER
0D6D°                 APPNME::          DS           8          ;NAME OF CURRENT APPLICATION PROGRAM
0D75°   0D 0D                   DB      ENTER,ENTER
0D77°                 PARSCH::          DS           1
0D78°                 EOFMRK::          DS           1
0D79°                 SERNO2:
0D79°   C3 0369°                JP      SERNO3
0D7C°                 DBRECL::          DS           1
0D7D°                 SAVBRK::          DS           2          ;ADDRES FOR BREAK PROCESSIN ROUTINE OF TRSDOS
0D7F°                 REVFLG::          DS           1
0D80°                 RBPNTR::          DS           2          ;RECORD BUFFER POINTER
0D82°                 KEYREC::          DS           80         ;KEY RECORD
0DD2°   0D            ENDKEY::          DB           ENTER
0DD3°                 BSTART:
0DD3°                 KEYLEN::          DS           1          ;LENGTH OF KEY FIELD
                      ;
0DD4°                 DBSRCN::          DS           2          ;DATABASE RECORD NUMBER
0DD6°                 FIRSTF::          DS           1          ;FIRST TIME THROUGH FLAG
0DD7°                 CURRCN::          DS           2          ;CURRENT RECORD NUMBER
0DD9°                 MINRCN::          DS           2          ;MINIMUM RECORD NUMBER
0DDB°                 MAXRCN::          DS           2          ;MAXIMUM RECORD NUMBER
0DDD°                 DATRCN::          DS           2          ;DATA RECORD NUMBER
0DDF°                 PRERCN::          DS           2          ;PREVIOUS RECORD NUMBER
0DE1°                 PREADD::          DS           2
                      ;
0DE3°                 INPLEN::          DS           1          ;LENGTH OF LAST INPUT
0DE4°                 MINCOL::          DS           1          ;MIN COLUMN FOR FIELD
0DE5°                 CURFDN::          DS           1          ;CURRENT FIELD NUMVBER
0DE6°                          DS       80                      ;BUFFER FOR BUFFER
0E36°                 FLDBUF::
0E36°                 MSGBUF::          DS           80
0E86°                          DS       80                      ;ERROR MESSAGE BUFFER
                      ;
0ED6°                 SAVFDN::          DS           1          ;SAVED FIELD NUMBER
0ED7°                 OPERAT::          DS           1          ;ARITHMETIC OPERATOR
                      ;
                      ;
0ED8°                 MODFLG::          DS           1          ;MODIFY MODE FLAG
```

```
0ED9'                     VALPTR::        DS          2           ;VALIDATION POINTER
0EDB'                     CURFLN::        DS          1           ;CURRENT FIELD LENGTH
0EDC'                     CURSAV::        DS          2           ;CURSOR POSITION
0EDE'                     FLOCPR::        DS          2           ;FIELD LOCATION POINTER
0EE0'                     MNTITL::        DS          80          ;MAIN TITLE FOR APPLICATION PROGRAM
0F30'                     VALIDS::
0F30'                             DS      1624                    ;BYTE REPRSENTATIONS OF VALIDATIONS
1588'                     BEND:
1588'                     SNMBR1:
1588'     30                      DB      "0"
1589'                     MSTART:
1589'                     VIMAGE:         DS          1922        ;VIDEO IMAGE +2
1D0B'                     FLDTBL::
1D0B'                             DS      1556                    ;TABLE OF FIELDS
231F'                     RAMSCN::
231F'                     APRSCN::
231F'                             DS      1920
2A9F'                     INTVAL::
2A9F'                             DS      1024
2E9F'                     VALOFF::
2E9F'                             DS      2
                          ;
2EA1'                     MEND:
                          ;
                          ;*****************************************************************
                          ;
                          ;THESE ARE THE MANDATORY SUPERVISOR ROUTINES
                          ;
                          ;*****************************************************************
2EA1'                     SERN07::
2EA1'     21 FFFD*                LD      HL,SGNMSG-3
2EA4'     E9                      JP      (HL)
2EA5'                     SERN09::
2EA5'     C3 0000*                JP      SERN10
                          ;
                          ;GET A CHARACTER FOR THE KEYBOARD
                          ;
2EA8'                     KBCHAR::
2EA8'     3E 04                   LD      A,SKBCHR        ;SUPERVISOR COMMAND
2EAA'     06 00                   LD      B,0             ;CLEAR C FOR RETURN
2EAC'     CF                      RST     8               ;SUPERVISOR CALL
2EAD'     C9                      RET
                          ;
                          ;
                          ;GET A LINE OF INPUT FROM THE KEYBOARD, HL=INPUT, B=INPUT MAX LENGTH
                          ;
2EAE'                     KBLINE::
2EAE'     3E 05                   LD      A,SKBLIN        ;GET LINE COMMAND
2EB0'     0E 00                   LD      C,0
2EB2'     CF                      RST     8               ;SUPERVISOR CALL
2EB3'     C9                      RET
                          ;
```

```
                ;
                ;INITIALIZE THE VIDEO SRCEEN AND RESET THE CURSOR
                ;B=CHARACTER SIZE, C=NORMAL/REVERSE
                ;
2EB4'           VDINIT::
2EB4'  3E 07            LD      A,SVDINT        ;INIT SCREEN COMMAND
2EB6'  CF               RST     8               ;SUPERVISOR CALL
2EB7'  C2 0113'         JP      NZ,DISERR       ;VIDEO ERROR
2EBA'  C9               RET
                ;
                ;
                ;DISPLAY A BUFFER OF GRAPHICS, B=ROW, C=COLUMN, D=LENGTH, HL=BUFFER
                ;
2EBB'           VDGRAF::
2EBB'  3E 0A            LD      A,SVDGRF        ;SEND CHAR STRING, GRAPHICS MODE
2EBD'  CF               RST     8               ;SUPERVISOR CALL
2EBE'  C2 0113'         JP      NZ,DISERR       ;VIDEO ERROR
2EC1'  C9               RET
                ;
                ;
                ;DISPLAY A CHARACTER ON VIDEO, B=BYTE
                ;
2EC2'           VDCHAR::
2EC2'  3E 08            LD      A,SVDCHR        ;DISPLAY CHARACTER, SCROLL MODE
2EC4'  CF               RST     8               ;SUPERVISOR CALL
2EC5'  C2 0113'         JP      NZ,DISERR
2EC8'  C9               RET
                ;
                ;
                ;DISPLAY A LINE OF TEXT TO VIDEO, HL=TEXT, B=LENGTH
                ;
2EC9'           VDLINE::
2EC9'  0E 00            LD      C,0
2ECB'           VDLN2::
2ECB'  3E 09            LD      A,SVDLIN        ;DISPLAY LINE COMMAND
2ECD'  CF               RST     8
2ECE'  C2 0113'         JP      NZ,DISERR       ;VIDEO ERROR
2ED1'  C9               RET
                ;
                ;
                ;READ FROM THE VIDEO SCREEN
                ;
2ED2'           VDREAD::
2ED2'  3E 06            LD      A,SVDRED        ;read video command
2ED4'  CF               RST     8               ;SUPERVISOR CALL
2ED5'  C2 0113'         JP      NZ,DISERR       ;VIDEO ERROR
2ED8'  C9               RET
                ;
                ;
2ED9'           SNMBR7:
2ED9'  30               DB      "0"
                ;
```

```
                          ;
                          ;GET CURRENT RECORD NUMBER, DE=DCB, HL RESERVED
                          ;
2EDA'                     LOCATE::
2EDA'    3E 21                    LD      A,SLOCAT      ;LOCATE COMMAND
2EDC'    CF                       RST     8
2EDD'    C2 0113'                 JP      NZ,DISERR
2EE0'    C9                       RET
                          ;
                          ;
                          ;READ NEXT RECORD, DE=DCB, HL=RESERVED
                          ;
2EE1'                     READNX::
2EE1'    3E 22                    LD      A,SRDNXT      ;READ NEXT COMMAND
2EE3'    CF                       RST     8
2EE4'    C9                       RET
                          ;
                          ;
                          ;READ A SPECIFIED RECORD, DIRECT ACCESS, DE=DCB, BC=RECORD NUMBER
                          ;
2EE5'                     DIRRD::
2EE5'    3E 23                    LD      A,SDIRRD      ;DIRECT READ COMMAND
2EE7'    CF                       RST     8             ;SUPERVISOR CALL
2EE8'    C2 0113'                 JP      NZ,DISERR
2EEB'    C9                       RET
                          ;
2EEC'                     PRTSNU::
2EEC'    16 00                    LD      D,0
2EEE'    06 08                    LD      B,8
2EF0'    0E 15                    LD      C,21
2EF2'    CD 2EBB'                 CALL    VDGRAF
2EF5'    21 1588'                 LD      HL,SNMBR1
2EF8'    46                       LD      B,(HL)
2EF9'    CD 2EC2'                 CALL    VDCHAR
2EFC'    21 0A6B'                 LD      HL,SNMBR2
2EFF'    46                       LD      B,(HL)
2F00'    CD 2EC2'                 CALL    VDCHAR
2F03'    21 0000*                 LD      HL,SNMBR3
2F06'    46                       LD      B,(HL)
2F07'    CD 2EC2'                 CALL    VDCHAR
2F0A'    21 0000*                 LD      HL,SNMBR4
2F0D'    46                       LD      B,(HL)
2F0E'    CD 2EC2'                 CALL    VDCHAR
2F11'    21 0000*                 LD      HL,SNMBR5
2F14'    46                       LD      B,(HL)
2F15'    CD 2EC2'                 CALL    VDCHAR
2F18'    21 02FB'                 LD      HL,SNMBR6
2F1B'    46                       LD      B,(HL)
2F1C'    CD 2EC2'                 CALL    VDCHAR
2F1F'    21 2ED9'                 LD      HL,SNMBR7
2F22'    46                       LD      B,(HL)
2F23'    CD 2EC2'                 CALL    VDCHAR
```

```
2F26°   21 0000*            LD      HL,DSMEN2
2F29°   3E CD               LD      A,0CDH
2F2B°   77                  LD      (HL),A
2F2C°   C9                  RET
                    ;
                    ;
                    ;CLOSE A FILE, DE=DCB
                    ;
2F2D°               CLOSE::
2F2D°   3E 2A               LD      A,SCLOSE
2F2F°   CF                  RST     8
2F30°   C9                  RET
                    ;
                    ;
                    ;WRITE NEXT RECORD
                    ;
2F31°               WRITNX::
2F31°   3E 2B               LD      A,SWRNXT        ;WRITE NEXT RECORD COMMAND
2F33°   CF                  RST     8
2F34°   C2 0113°            JP      NZ,DISERR
2F37°   C9                  RET
                    ;
                    ;
                    ;WRIT A SPECIFIED RECORD
                    ;
2F38°               DIRWR::
2F38°   3E 2C               LD      A,SDIRWR        ;DIRECT WRITE COMMAND
2F3A°   CF                  RST     8               ;SUPERVISOR CALL
2F3B°   C2 0113°            JP      NZ,DISERR       ;FILE ERROR
2F3E°   C9                  RET
                    ;
                    ;OPEN A FILE, DE=60 BYTE DCB, HL=11 BYTE PAR LIST
2F3F°               OPEN::
2F3F°   3E 28               LD      A,SOPEN
2F41°   CF                  RST     8
2F42°   C2 0113°            JP      NZ,DISERR
2F45°   3E 00               LD      A,0
2F47°   C9                  RET
                    ;
                    ;SET SCROLL TO PROTECT 23 LINES
2F48°               SETSCR::
2F48°   06 17               LD      B,23
2F4A°   3E 1B               LD      A,SCROLL
2F4C°   CF                  RST     8
2F4D°   C9                  RET
                    ;
                    ;SEND COMMAND TO TRSDOS AND RETURN
2F4E°               RETCMD::
2F4E°   46                  LD      B,(HL)
2F4F°   23                  INC     HL
2F50°   3E 26               LD      A,SRTCMD
2F52°   CF                  RST     8
```

```
2F53'   C9                      RET
                        ;
                        ;SET THE ADDRESS FOR THE BREAK ROUTINE
2F54'                   SETBRK::
2F54'   3E 03                   LD      A,SSTBRK
2F56'   CF                      RST     8
2F57'   C9                      RET
                        ;
2F58'                   ENDA09::
                                END     COMMOD
```

```
Macros:

Symbols:
ACTOKN  00B1    APPNME  0D6DI'  APRSCN  231FI'  ARAMVD  003DI'
BCKSP   000B    BEND    1588'   BFIELD  005B    BRKMSG  0434*
BRKSET  0419I'  BSTART  0DD3'   CFTOKN  00B3    CHKSAV  04C4'
CHKSV5  04D7'   CLOSE   2F2DI'  CLR24   0476I'  CLRDC1  0176I'
CLRDC2  017EI'  CLRDC9  0179'   CLRMEM  0183I'  CLRMM2  018CI'
CLRMSG  046E*   CLRPRT  0484I'  CNTLN   000E    CNTLP   0010
CNTLT   0014    CNTLY   0019    CNTLZ   001A    COMFLS  01A3I'
COMKEL  007C'   COMKEY  0071I'  COMKND  008D'   COMKYH  0093'
COMMOD  0000I'  COMPL1  01ABI'  COMPL2  01B0I'  COMPLB  0183'
CORFLD  059EI'  CREKEY  0054I'  CRTMS1  062E*   CURFDN  0DE5I'
CURFLN  0EDBI'  CURRCN  0DD7I'  CURSAV  0EDCI'  DATRCN  0DDDI'
DBRECL  0D7CI'  DBSRCN  0DD4I'  DCB1    06DCI'  DCB2    0A24I'
DEDMSG  0293'   DEL05   0211'   DELAY   020BI'  DELNP3  0350'
DELNP5  035D'   DELNP7  0364'   DELNPT  034AI'  DFTOKN  00BC
DIRRD   2EE5I'  DIRRD2  040D*   DIRWR   2F38I'  DISFRR  0113'
DIVHL2  00F5'   DIVID5  019B'   DIVIDE  0199I'  DLA     00FC
DLYMSG  04A3*   DNA     001F    DOWNA   001F    DPKMSG  04A0*
DPTOKN  00B9    DRA     00FD    DRCHK   064E'   DRCHK5  0663'
DRSTAT  00E4    DRVSTT  0667'   DSLPRT  00EF    DSMEN2  2F27*
DSTATC  066D'   DSTOKN  00B8    DVCN    0010    DVTOKN  00B5
ECFLD   00FD    EFIELD  005D    END999  0450I'  ENDA09  2F58I'
ENDCRE  045CI'  ENDFRN  02D3'   ENDKEY  0DD2I'  ENDLRN  02FB'
ENDPR2  044C'   ENDPR5  0429I'  ENDPRD  0429'   ENTDEL  0053I'
ENTER   000D    EOF     00FF    EOFMRK  0D78I'  EOV     007F
ESC     001B    F1      0001    F2      0002    FBUF1   0723I'
FBUF2   0A6CI'  FDIS90  027D*   FFIFLD  007D    FHMID5  0085'
FHMIDR  0096I'  FIRSTF  0DD6I'  FLDBUF  0E36I'  FLDCB1  0165I'
FLDCB2  0171I'  FLDCBB  0168'   FLDTBL  1D0BI'  FLMID5  00E3'
FLMIDR  00C4I'  FLOCPR  0EDEI'  FND99   0012'   FNDDIS  03EF*
FNDFL2  0003'   FNDFLC  0000I'  FNDRE5  03FAI'  FNDREC  03EBI'
FNDRET  01B9I'  FNF     008E    FRDNRC  024F'   FRNMSG  02A5'
GETFLD  0500I'  GETINP  0102*   GFL005  0521*   GRAMT   06DBI'
HSTOKN  00B4    INAUTO  06C9I'  INCH05  004E'   INCHAR  0046I'
INKEY1  00FEI'  INPLEN  0DE3I'  INTOKN  00B6    INTVAL  2A9FI'
IVTOKN  00B2    K3CHAR  2EA8I'  KBLINE  2EAEI'  KEYLEN  0DD3I'
KEYREC  0D82I'  KFTOKN  00B7    LA      001C    LASTF5  04AA'
LASTF9  04BC'   LASTFN  04A5I'  LASTRN  06E8'   LEFTA   001C
LJFLD   04DAI'  LOCATE  2ECAI'  LRNMSG  02D3'   MAXRCN  0DCBI'
```

| | | | | | | | |
|---|---|---|---|---|---|---|---|
| MB1B2 | 038DI° | MB2B1 | 039EI° | MB2KR | 03AFI° | MEND | 2EA1° |
| MENMSG | 0029* | MINCOL | 0DE4I° | MINRCN | 0DD9I° | MKRB1 | 03D7I° |
| MLTPLY | 0195I° | MNTITL | 0EE0I° | MODFLG | 0ED8I° | MOVL01 | 0544I° |
| MOVLFT | 0541I° | MOVL03 | 0548° | MOVRGT | 0551I° | MOVR03 | 0560° |
| MOVR05 | 0568° | MSGBUF | 0E36I° | MSTART | 1589° | OPEN | 2F3FI° |
| OPERAT | 0ED7I° | PARSCH | 0D77I° | PERMSG | 046FI° | PFL005 | 0532* |
| PL1 | 0718I° | PL2 | 0A60I° | PREADD | 0DE1I° | PRERCN | 0DDFI° |
| PRMENU | 0020I° | PRTDUP | 049F° | PRTSGN | 0154I° | PRTSNU | 2EECI° |
| PRTTIT | 03CCI° | PUTFLD | 052BI° | PWTOKN | 00BA | RA | 001D |
| RAMSCN | 231FI° | RAMVID | 06AFI° | RBPNTR | 0D80I° | RBUF1 | 0923I° |
| RBUF2 | 0C6CI° | RDNREC | 0216I° | RDPRE5 | 026C° | RDPRE7 | 0287° |
| RDPREC | 0263I° | RDR03 | 0239° | RDR05 | 023E° | READNX | 2EE1I° |
| RESCUR | 05E0I° | RESL24 | 05C6° | RESVID | 06BC° | RETCMD | 2F4EI° |
| REV005 | 06A3° | REVFLD | 056FI° | REVFLG | 0D7FI° | REVVID | 0690° |
| RGTOKN | 00BB | RIGHTA | 001D | RJFLD | 04EDI° | RL | 0007 |
| SACTRL | 0064 | SARCV | 0060 | SATX | 0061 | SAVBRK | 0D7DI° |
| SAVCUR | 05D6I° | SAVFDN | 0ED6I° | SAVL24 | 05B6° | SAVVI5 | 06C2° |
| SAVVID | 06C0° | SBCTRL | 0065 | SBNDEC | 0015 | SBNHEX | 0018 |
| SBRCV | 0062 | SBTX | 0063 | SCLOSE | 002A | SCLRXT | 0039 |
| SCNCOM | 0340* | SCNPRT | 033EI° | SCROLL | 001B | SCURSR | 001A |
| SDATE | 002D | SDELAY | 0006 | SDIRRD | 0023 | SDIRWR | 002C |
| SDSCMD | 0025 | SDSKID | 000F | SELO | 008E | SEL1 | 008D |
| SEL2 | 0088 | SEL3 | 0087 | SELNUL | 008F | SERMSG | 0034 |
| SERN01 | 0151° | SERN02 | 0D79° | SERN03 | 0369° | SERN04 | 0347° |
| SERN05 | 05EA° | SERN06 | 05EB* | SERN07 | 2EA1I° | SERN08 | 0000* |
| SERN09 | 2EA5I° | SERN10 | 2EA6* | SERROR | 0027 | SETBRK | 2F54I° |
| SETKYL | 0105I° | SETSCR | 2F48I° | SETTIT | 0033I° | SFIELD | 007B |
| SFLPTR | 003A | SGNMSG | 2EA2* | SHLDKY | 001D | SINTIO | 0000 |
| SJPDOS | 0024 | SKBCHR | 0004 | SKBINT | 0001 | SKBLIN | 0005 |
| SKILL | 0029 | SLOCAT | 0021 | SLOKUP | 001C | SMPYDV | 0017 |
| SNMBR1 | 1588° | SNMBR2 | 0A6B° | SNMBR3 | 2F04* | SNMBR4 | 2F0B* |
| SNMBR5 | 2F12* | SNMBR6 | 02FB° | SNMBR7 | 2ED9° | SOPEN | 0028 |
| SPACE | 0020 | SPARSR | 002E | SPRCHR | 0012 | SPRCTL | 005F |
| SPRINT | 0011 | SPRLIN | 0013 | SRAMDR | 0035 | SRANDM | 0014 |
| SRDNXT | 0022 | SRNAME | 002F | SRS232 | 0037 | SRTCMD | 0026 |
| SSORT | 0038 | SSTBRK | 0003 | SSTCMP | 0016 | SSTSCN | 0031 |
| SSTUSR | 0002 | STAT1 | 067C° | STAT2 | 0684° | STAT3 | 068C° |
| STCFLD | 00FB | STIMER | 0019 | STSCAN | 019FI° | SVDCHR | 0008 |
| SVDGRF | 000A | SVDINT | 0007 | SVDKEY | 000C | SVDLIN | 0009 |
| SVDRAM | 005E | SVDRED | 000B | SWILD | 0033 | SWRNXT | 002B |
| TAB | 0009 | TAMP05 | 0607° | TAMPER | 05ED° | TAMPOK | 063E° |
| TRNFLD | 01C3° | TRNKDI | 037C° | TRNKYI | 036BI° | TRNRCF | 0329* |
| TRNRES | 01E6I° | TRNREC | 01DBI° | TRNRVI | 030AI° | TRNRVD | 02FCI° |
| TRNTTL | 03C0I° | UPA | 001E | VALIDS | 0F30I° | VALOFF | 2E9FI° |
| VALPTR | 0ED9I° | VDCHAR | 2EC2I° | VDGRAF | 2EBBI° | VDINIT | 2E84I° |
| VDLINE | 2EC9I° | VDLN2 | 2ECBI° | VDREAD | 2ED2I° | VIDR05 | 0635I° |
| VIDRAM | 0683I° | VIMAGE | 1589° | WFIELD | 007E | WRITNX | 2F31I° |

No Fatal error(s)

```
                 ;**********************************************************************
                 ;**********************************************************************
                 ;
                 ;
                 ;
                 ;
                 ;       WRITTEN BY  RON BORTA    2/17/1981
                 ;
                 ;       LAST REVISION  11/18/1981   1:24 PM
                 ;
                 ;**********************************************************************
                 ;
                         PAGE
                 ;
                 ;
                 ;
                         TITLE   MATH MODULE FOR AUTOGRAMMER LEVEL 1 CONFIDENTIAL PROPERTY OF ROKLAN CORP.
                 ;
                         SUBTTL  WRITTEN BY RON BORTA  11/18/1981 (ALL RIGHTS RESERVED)
                 ;
                 ;
                 ;
                 ;
                 ;
                         ENTRY   MATH
                 ;
                 ;
0000'            MATH::
                 ;
                 ;
                 ;
                 ;
                         PAGE
                         .LIST
                         EXTRN   CURFLN,CLRMEM,CLRMM2
                 ;**********************************************************************
                 ;
                 ;
                 ;       THIS IS THE MAIN BODY OF THE PROGRAM
                 ;
                 ;
                 ;**********************************************************************
                 ;
                 ;THIS IS THE FLOATING POINT ADD ROUTINE
                 ;THIS ROUTINE ADDS BUFF1 TO BUFF2 AND PLACES THE SUM IN BUFF3
                 ;ALL OF THESE BUFFERS ARE ASCII
                 ;
0000'            MADD::
0000'  CD 002E'          CALL    PREP                  ;PREPARE BUFFERS
0003'  CD 0307'          CALL    FPADD
0006'  C3 0027'          JP      COMP                  ;COMPLETE
```

```
                  ;
                  ;
                  ;THIS IS THE FLOATING POINT SUBTRACT ROUTINE
                  ;THIS ROUTINE SUBTRACTS BUFF2 FROM BUFF1 AND PLACES THE REMAINDER
                  ;IN BUFF3. ALL OF THESE BUFFERS ARE ASCII
                  ;
0009'             MSUB::
0009'  CD 002E'           CALL    PREP
000C'  CD 042E'           CALL    FPSUB
000F'  C3 0027'           JP      COMP
                  ;
                  ;
                  ;THIS IS THE FLOATING POINT MULTIPLY ROUTINE
                  ;
                  ;
0012'             MMUL::
0012'  CD 002E'           CALL    PREP
0015'  CD 04A7'           CALL    FPMUL
0018'  C3 0027'           JP      COMP
                  ;
                  ;
                  ;THIS IS THE FLOATING POINT DIVIDE ROUTINE
                  ;
0018'             MDIV::
0018'  CD 002E'           CALL    PREP
001E'  CD 05B0'           CALL    FPDIV
0021'  FE FF              CP      0FFH
0023'  C8                 RET     Z
0024'  C3 0027'           JP      COMP
                  ;
                  ;
0027'             COMP:
0027'  21 095B'           LD      HL,FPN3
002A'  CD 01C3'           CALL    FPOUT
002D'  C9                 RET
                  ;
                  ;
                  ;
                  ;PREPARE THE DATA AND DATA STORAGE AREAS FOR MATH FUNCTION
                  ;
002E'             PREP:
002E'  3E 34              LD      A,2*FPNIB
0030'  32 0752'           LD      (INFES),A
0033'  CD 03CD'           CALL    CLRFPN
0036'  21 0903'           LD      HL,FPN1                   ;DESTINATION FOR FP NUMBER
0039'  11 08A9'           LD      DE,BUFF1      ;ARG1 AS ASCII DATA STRING
003C'  CD 005B'           CALL    FPIN                      ;CONVERT
003F'  21 092F'           LD      HL,FPN2                   ;DESTINATION FOR FP NUMBER
0042'  11 082F'           LD      DE,BUFF2      ;ARG2 AS ASCII DATA STRING
0045'  CD 005B'           CALL    FPIN                      ;CONVERT
0048'  CD 03C3'           CALL    CLRBUF
004B'  21 07B3'           LD      HL,BUFF3
```

```
004E'   22 0789'          16286          LD      (B3PTR),HL
0051'   01 095B'          16300          LD      BC,FPN3                   ;BUFFER FOR FP ANSWER
0054'   11 0903'          16320          LD      DE,FPN1                   ;ARG1
0057'   21 092F'          16340          LD      HL,FPN2                   ;ARG2
005A'   C9                16360          RET                               ;READY FOR MATH FUNCTION
                          16380   ;
                          16400   ;
                          20000   ;*****************************************************************
                          20020   ;
                          20040   ;
                          20060   ;       THESE ARE THE MAJOR SUBROUTINES USED BY THE MAIN PROGRAM
                          20080   ;
                          20100   ;
                          20120   ;*****************************************************************
                          20140   ;
                          20160   ;
                          20180   ;CONVERT FP STRING AT JE, PUT FP NUMBER AT HL
                          20200   ;
005B'                     20220   FPIN:
005B'   E5                20240          PUSH    HL              ;SAVE DESTINATION
005C'   D5                20260          PUSH    DE              ;SAVE SOURCE
005D'   EB                20280          EX      DE,HL           ;EXCHANGE
005E'   2B                20300          DEC     HL              ;SOURCE -1
005F'   22 071A'          20320          LD      (ADDS),HL
0062'   21 0720'          20340          LD      HL,OPST                   ;
0065'   0E 13             20360          LD      C,DIGIT+6
0067'   CD 011F'          20380          CALL    CLEAR
006A'                     20400   SCANC:
006A'   11 0000           20420          LD      DE,0
006D'   21 0724'          20440          LD      HL,BC1
0070'                     20460   SCANO:
0070'   22 071E'          20480          LD      (BCADD),HL      ;SAVE HL AT BCADD
0073'                     20500   SCANP:
0073'   21 0073'          20520          LD      HL,SCANP
0076'   E5                20540          PUSH    HL
0077'   AF                20560          XOR     A
0078'   32 074F'          20580          LD      (XSIGN),A       ;CLEAR SIGN
007B'                     20600   SCANG:
007B'   CD 00F1'          20620          CALL    IBSCN
007E'   DA 00A8'          20640          JP      C,SCANX
0081'   FE 2E             20660          CP      "."                       ;DECIMAL POINT ?
0083'   CA 0099'          20680          JP      Z,SCAN5
0086'   FE 45             20700          CP      "E"                       ;EXPONENT ?
0088'   CA 0126'          20720          JP      Z,EXCON
                          20740   ;NOT A LEGAL CHARACTER FOR A FLOATING POINT NUMBER
008B'   47                20760          LD      B,A
008C'   3A 0720'          20780          LD      A,(OPST)
008F'   E6 10             20800          AND     10H
0091'   C2 0105'          20820          JP      NZ,ENTR2
                          20840   ;
                          20860   ;COME TO HERE IF A LEGAL FLOATING POINT NUMBER WAS NOT FOUND
0094'                     20880   FPIN1:
```

```
0094'   E1            20900            POP     HL
0095'   D1            20920            POP     DE
0096'   E1            20940            POP     HL
0097'   37            20960            SCF
0098'   C9            20980            RET
                      21000  ;
                      21020  ;
                      21040  ;FOUND A DECIMAL POINT
                      21060  ;
0099'                 21080  SCAN5:
0099'   AF            21100            XOR     A                   ;CLEAR A
009A'   B2            21120            OR      D
009B'   C2 00A3'      21140            JP      NZ,SCAN6
009E'   C6 C0         21160            ADD     A,0C0H
00A0'   B3            21180            OR      E
00A1'   5F            21200            LD      E,A
00A2'   C9            21220            RET
                      21240  ;
00A3'                 21260  SCAN6:
00A3'   3E 80         21280            LD      A,80H
00A5'   B3            21300            OR      E
00A6'   5F            21320            LD      E,A
00A7'   C9            21340            RET
                      21360  ;
                      21380  ;
00A8'                 21400  SCANX:
00A8'   E6 0F         21420            AND     0FH                 ;STRIP OFF UPPER NIBBLE
00AA'   47            21440            LD      B,A
00AB'   21 0720'      21460            LD      HL,OPST
00AE'   3E 30         21480            LD      A,30H
00B0'   B6            21500            OR      (HL)
00B1'   77            21520            LD      (HL),A
00B2'   AF            21540            XOR     A                   ;CLEAR A
00B3'   B0            21560            OR      B
00B4'   C2 00C0'      21580            JP      NZ,PACK
00B7'   B2            21600            OR      D
00B8'   C2 00C0'      21620            JP      NZ,PACK
00BB'   B3            21640            OR      E
00BC'   5F            21660            LD      E,A
00BD'   C8            21680            RET     Z
00BE'   1C            21700            INC     E
00BF'   C9            21720            RET
                      21740  ;
                      21760  ;
                      21780  ;THIS ROUTINE PACKS BCD DIGITS INTO REG          BC
                      21800  ;
00C0'                 21820  PACK:
00C0'   7B            21840            LD      A,E
00C1'   17            21860            RLA
00C2'   DA 00C6'      21880            JP      C,PACK1
00C5'   1C            21900            INC     E
00C6'                 21920  PACK1:
```

```
00C6'   7B                  LD      A,E
00C7'   32 0722'            LD      (ECNT),A
00CA'   14                  INC     D
00CB'   7A                  LD      A,D
00CC'   E6 7F               AND     7FH
00CE'   FE 1B               CP      DIGIT*2+1
00D0'   D0                  RET     NC
00D1'   AF                  XOR     A
00D2'   B2                  OR      D
00D3'   FA 00E3'            JP      M,BOTM
                    ;
00D6'               TOP:
00D6'   F6 80               OR      80H
00D8'   57                  LD      D,A
00D9'   78                  LD      A,B
00DA'   2A 071E'            LD      HL,(BCADD)
00DD'   07                  RLCA
00DE'   07                  RLCA
00DF'   07                  RLCA
00E0'   07                  RLCA
00E1'   77                  LD      (HL),A
00E2'   C9                  RET
                    ;
                    ;
00E3'               BOTM:
00E3'   E6 7F               AND     7FH
00E5'   57                  LD      D,A
00E6'   78                  LD      A,B
00E7'   2A 071E'            LD      HL,(BCADD)
00EA'   B6                  OR      (HL)
00EB'   77                  LD      (HL),A
00EC'   23                  INC     HL
00ED'   C1                  POP     BC
00EE'   C3 0070'            JP      SCANO
                    ;
00F1'               IBSCN:
00F1'   2A 071A'            LD      HL,(ADDS)
00F4'   23                  INC     HL
00F5'   7E                  LD      A,(HL)
00F6'   FE 20               CP      " "
00F8'   CA 00F4'            JP      Z,IBSCN+3
00FB'   22 071A'            LD      (ADDS),HL
                    ;
                    ;
                    ;THIS ROUTINE CHECKS FOR ASCII NUMBERS (0-9)
                    ;
00FE'               NMCHK:
00FE'   FE 3A               CP      "9"+1
0100'   D0                  RET     NC
0101'   FE 30               CP      "0"
0103'   3F                  CCF
```

```
0104'  C9                     RET
                      ;
                      ;
                      ;THIS ROUTINE IS USED TO ADJUST A NUMBER IN BC, AND RETURNS VALUE
                      ;
0105'                 ENTR2:
0105'  11 0000                LD      DE,0
0108'                 ENT1:
0108'  C5                     PUSH    BC
0109'  CD 017D'               CALL    FIXE
010C'  C1                     POP     BC
010D'  D1                     POP     DE
010E'  D1                     POP     DE
010F'  D1                     POP     DE
0110'  0E 0F                  LD      C,DIGIT+2
0112'  21 0732'               LD      HL,BC1+DIGIT+1
0115'  CD 0389'               CALL    VCOPY
0118'  2A 071A'               LD      HL,(ADDS)
011B'  EB                     EX      DE,HL
011C'  13                     INC     DE
011D'  B7                     OR      A
011E'  C9                     RET
                      ;
                      ;
                      ;THIS ROUTINE CLEARS STORAGE AREAS STARTING AT HL, FOR C BYTES
                      ;
011F'                 CLEAR:
011F'  AF                     XOR     A
0120'  77                     LD      (HL),A
0121'  23                     INC     HL
0122'  0D                     DEC     C
0123'  20 FB                  JR      NZ,CLEAR+1
0125'  C9                     RET
                      ;
                      ;
                      ;THIS ROUTINE CONVERTS THE ASCII EXPONENT IN THE INPUT STRING TO BINARY
                      ;AND NORMALIZES THE EXPONENT ACCORDING TO THE INPUT FORMAT OF THE NMBER
                      ;
0126'                 EXCON:
0126'  CD 00F1'               CALL    IBSCN
0129'  38 1C                  JR      C,EXC3
012B'  FE E3                  CP      PLSRW
012D'  28 12                  JR      Z,EXC4
012F'  FE 2B                  CP      "+"                 ;POSITIVE
0131'  28 0E                  JR      Z,EXC4
0133'  FE 2D                  CP      "-"                 ;NEGATIVE
0135'  28 05                  JR      Z,EXC2
0137'  FE E5                  CP      MINRW
0139'  C2 0179'               JP      NZ,FPERR
013C'                 EXC2:
013C'  3E 01                  LD      A,1
013E'  32 074F'               LD      (XSIGN),A     ;SAVE SIGN
```

```
0141'                 EXC4:
0141'  CD 00F1'                CALL    IBSCN
0144'  D2 0179'                JP      NC,FPERR
0147'                 EXC3:
0147'  CD 014D'                CALL    ASCDC
014A'  C3 0108'                JP      ENT1
                      ;
                      ;
                      ;THIS ROUTINE CONVERT ASCII TO BINARY, UP TO 3 DIGITS (123)
                      ;
014D'                 ASCDC:
014D'  EB                      EX      DE,HL
014E'  21 0000                 LD      HL,0
0151'                 ASC1:
0151'  1A                      LD      A,(DE)
0152'  CD 00FE'                CALL    NMCHK
0155'  D2 0168'                JP      NC,ASC2
0158'  D6 30                   SUB     "0"
015A'  44                      LD      B,H
015B'  4D                      LD      C,L
015C'  29                      ADD     HL,HL
015D'  29                      ADD     HL,HL
015E'  09                      ADD     HL,BC
015F'  29                      ADD     HL,HL
0160'  4F                      LD      C,A
0161'  06 00                   LD      B,0
0163'  09                      ADD     HL,BC
0164'  13                      INC     DE
0165'  C3 0151'                JP      ASC1
0168'                 ASC2:
0168'  EB                      EX      DE,HL
0169'  47                      LD      B,A
016A'  22 071A'                LD      (ADDS),HL
016D'  7A                      LD      A,D
016E'  B7                      OR      A
016F'  C2 0179'                JP      NZ,FPERR
0172'  7B                      LD      A,E
0173'  17                      RLA
0174'  DA 0179'                JP      C,FPERR
0177'  1F                      RRA
0178'  C9                      RET
                      ;
0179'                 FPERR:
0179'  C1                      POP     BC
017A'  C3 0094'                JP      FPIN1
                      ;
                      ;
                      ;THIS ROUTINE NORMALIZES THE INPUT NUMBER
                      ;
017D'                 FIXE:
017D'  EB                      EX      DE,HL
017E'  3A 0724'                LD      A,(BC1)
```

```
0181'   B7                       OR      A
0182'   28 05                    JR      Z,ZZ2
0184'   CD 018D'                 CALL    CHKPN
0187'   C6 80                    ADD     A,80H
0189'                   ZZ2:
0189'   32 0732'                 LD      (BC1+DIGIT+1),A
018C'   C9                       RET
                        ;
018D'                   CHKPN:
018D'   3A 0722'                 LD      A,(ECNT)
0190'   5F                       LD      E,A
0191'   E6 3F                    AND     3FH
0193'   47                       LD      B,A
0194'   3A 074F'                 LD      A,(XSIGN)
0197'   B7                       OR      A
0198'   CA 01AE'                 JP      Z,LPOS
019B'   24                       INC     H
019C'   3E 40                    LD      A,40H
019E'   A3                       AND     E
019F'   28 08                    JR      Z,EPOS
01A1'   7D                       LD      A,L
01A2'   68                       LD      L,B
01A3'   CD 01B8'                 CALL    BPOS+1
01A6'   2F                       CPL
01A7'   3C                       INC     A
01A8'   C9                       RET
                        ;
01A9'                   EPOS:
01A9'   7D                       LD      A,L
01AA'   2F                       CPL
01AB'   3C                       INC     A
01AC'   80                       ADD                     A,B
01AD'   C9                       RET
                        ;
                        ;
01AE'                   LPOS:
01AE'   3E 40                    LD      A,40H
01B0'   A3                       AND     E
01B1'   28 04                    JR      Z,BPOS
01B3'   78                       LD      A,B
01B4'   45                       LD      B,L
01B5'   18 F3                    JR      EPOS+1
                        ;
                        ;
01B7'                   BPOS:
01B7'   78                       LD      A,B
01B8'   85                       ADD     A,L
01B9'   F0                       RET     P
01BA'   E1                       POP     HL
01BB'   C3 0179'                 JP      FPERR
01BE'   10                       DB      1*16
01BF'   0000                     DW      0
```

```
01C1'  01                      DB      1
01C2'                  FPNCN:
01C2'  81                      DB      129
                       ;
                       ;
                       ;CONVERT FP NUMBER AT HL TO ASCII AND PUT IN BUFF3
                       ;
01C3'                  FPOUT:
01C3'  01 FFF2                 LD      BC,-DIGIT-1
01C6'  09                      ADD     HL,BC
01C7'  44                      LD      B,H
01C8'  4D                      LD      C,L
01C9'  21 0733'                LD      HL,ABUF
01CC'  3A 0752'                LD      A,(INFES)
01CF'  32 0751'                LD      (FES),A
01D2'  1E 0D                   LD      E,DIGIT
01D4'  36 00                   LD      (HL),0
01D6'  23                      INC     HL
01D7'                  NXT:
01D7'  0A                      LD      A,(BC)
01D8'  57                      LD      D,A
01D9'  1F                      RRA
01DA'  1F                      RRA
01DB'  1F                      RRA
01DC'  1F                      RRA
01DD'  E6 0F                   AND     0FH
01DF'  77                      LD      (HL),A
01E0'  23                      INC     HL
01E1'  7A                      LD      A,D
01E2'  E6 0F                   AND     0FH
01E4'  77                      LD      (HL),A
01E5'  23                      INC     HL
01E6'  03                      INC     BC
01E7'  1D                      DEC     E
01E8'  C2 01D7'                JP      NZ,NXT
01EB'  0A                      LD      A,(BC)
01EC'  32 0723'                LD      (FSIGN),A
01EF'  AF                      XOR     A
01F0'  77                      LD      (HL),A
01F1'  21 074F'                LD      HL,XSIGN
01F4'  77                      LD      (HL),A
01F5'                  FIX:
01F5'  03                      INC     BC
01F6'  0A                      LD      A,(BC)
01F7'  B7                      OR      A
01F8'  CA 0206'                JP      Z,ZRO
01FB'  D6 80                   SUB     128
01FD'  C2 0201'                JP      NZ,FIX2
0200'  34                      INC     (HL)
0201'                  FIX2:
0201'  F2 0207'                JP      P,CHK13
0204'  2F                      CPL
```

```
0205'  34                  INC   (HL)
0206'               ZRO:
0206'  3C                  INC   A
0207'               CHK13:
0207'  21 0750'            LD    HL,EXPO
020A'  77                  LD    (HL),A
020B'  5F                  LD    E,A
020C'  FE 1A               CP    DIGIT*2
020E'  21 0751'            LD    HL,FES
0211'  DA 0218'            JP    C,CHKX0
0214'               CHK40:
0214'  3E 01               LD    A,1
0216'  B6                  OR    (HL)
0217'  77                  LD    (HL),A
0218'               CHKX0:
0218'  7E                  LD    A,(HL)
0219'  1F                  RRA
021A'  D2 022B'            JP    NC,CHKX3
021D'  E6 0F               AND   0FH
021F'  FE 1A               CP    DIGIT*2
0221'  DA 0226'            JP    C,CHKX2
0224'  3E 19               LD    A,DIGIT*2-1
0226'               CHKX2:
0226'  57                  LD    D,A
0227'  3C                  INC   A
0228'  C3 0271'            JP    ROUND
022B'               CHKX3:
022B'  E6 0F               AND   0FH
022D'  57                  LD    D,A
022E'  83                  ADD   A,E
022F'  FE 1B               CP    DIGIT*2+1
0231'  47                  LD    B,A
0232'  DA 023B'            JP    C,CHKXN
0235'  7E                  LD    A,M
0236'  E6 40               AND   40H
0238'  C2 0214'            JP    NZ,CHK40
023B'               CHKXN:
023B'  3A 074F'            LD    A,(XSIGN)
023E'  B7                  OR    A
023F'  C2 0246'            JP    NZ,XNEG
0242'  78                  LD    A,B
0243'  C3 0271'            JP    ROUND
                    ;
                    ;
0246'               XNEG:
0246'  7A                  LD    A,D
0247'  93                  SUB   E
0248'  D2 0262'            JP    NC,XN2
024B'               XN1:
024B'  3A 0752'            LD    A,(INFES)
024E'  B7                  OR    A
024F'  F2 039F'            JP    P,ZERO
```

```
0252'   E6 0E                      AND     0EH
0254'   CA 039F'                   JP      Z,ZERO
0257'   0F                         RRCA
0258'   5F                         LD      E,A
0259'   1D                         DEC     E
025A'   0E 01                      LD      C,1
025C'   21 0732'                   LD      HL,ABUF-1
025F'   C3 0293'                   JP      NRND
                           ;
0262'                      XN2:
0262'   CA 0248'                   JP      Z,XN1
0265'   C3 0271'                   JP      ROUND
                           ;
                           ;
0268'                      CLEAN:
0268'   06 1F                      LD      B,1FH
026A'   A0                         AND     B
026B'   FE 1B                      CP      DIGIT*2+1
026D'   D8                         RET     C
026E'   3E 1B                      LD      A,DIGIT*2+1
0270'   C9                         RET
                           ;
                           ;
                           ;THIS ROUTINE IS USED TO ROUND DATA TO THE SPECIFIED DECIMAL PLACE
                           ;
0271'                      ROUND:
0271'   CD 0268'                   CALL    CLEAN
0274'   4F                         LD      C,A
0275'   06 00                      LD      B,0
0277'   21 0734'                   LD      HL,ABUF+1
027A'   09                         ADD     HL,BC
027B'   22 071C'                   LD      (ADDT),HL
027E'   7E                         LD      A,(HL)
027F'   FE 05                      CP      5
0281'   DA 0298'                   JP      C,TRL2-1
                           ;
0284'                      LESS1:
0284'   2B                         DEC     HL
0285'   34                         INC     (HL)
0286'   7E                         LD      A,(HL)
0287'   B7                         OR      A
0288'   CA 0299'                   JP      Z,TRL2
028B'   FE 0A                      CP      10
028D'   C2 0295'                   JP      NZ,TRAIL
0290'   36 00                      LD      M,0
0292'   C3 0284'                   JP      LESS1
                           ;
                           ;
                           ;THIS ROUTINE IS USED TO ELIMATE TRAILING ZEROES
                           ;
0295'                      TRAIL:
0295'   2A 071C'                   LD      HL,(ADDT)
```

```
0298'   2B                       DEC    HL
0299'                   TRL2:
0299'   3A 0751'                 LD     A,(FES)
029C'   17                       RLA
029D'   DA 02AD'                 JP     C,FPRNT
02A0'                   TRL3:
02A0'   7E                       LD     A,(HL)
02A1'   B7                       OR     A
02A2'   C2 02AD'                 JP     NZ,FPRNT
02A5'   2B                       DEC    HL
02A6'   0D                       DEC    C
02A7'   FA 039F'                 JP     M,ZERO
02AA'   C3 02A0'                 JP     TRL3
                        ;
                        ;
                        ;THESE ARE THE PRINT FORMATTING ROUTINES
                        ;
02AD'                   FPRNT:
02AD'   21 0733'                 LD     HL,ABUF
02B0'   7E                       LD     A,(HL)
02B1'   B7                       OR     A
02B2'   CA 02D3'                 JP     Z,NRND
02B5'   06 01                    LD     B,1
02B7'   3A 074F'                 LD     A,(XSIGN)
02BA'   B7                       OR     A
02BB'   CA 02C0'                 JP     Z,POSR
02BE'   06 FF                    LD     B,-1
02C0'                   POSR:
02C0'   3A 0750'                 LD     A,(EXPO)
02C3'   B7                       OR     A
02C4'   C2 02CC'                 JP     NZ,PO2
02C7'   32 074F'                 LD     (XSIGN),A
02CA'   06 01                    LD     B,1
02CC'                   PO2:
02CC'   80                       ADD    A,B
02CD'   32 0750'                 LD     (EXPO),A
02D0'   1C                       INC    E
02D1'   0C                       INC    C
02D2'   2B                       DEC    HL
02D3'                   NRND:
02D3'   23                       INC    HL
02D4'   79                       LD     A,C
02D5'   FE 1B                    CP     DIGIT*2+1
02D7'   C2 02DB'                 JP     NZ,NRND1
02DA'   0D                       DEC    C
                                 ;
02DB'                   NRND1:
02DB'   3A 0723'                 LD     A,(FSIGN)
02DE'   1F                       RRA
02DF'   D2 02E8'                 JP     NC,PRIN2
02E2'   CD 039A'                 CALL   NEG
02E5'   C3 02EB'                 JP     PRI21
```

```
02E8'                   30140   PRIN2:
02E8'   CD 03A4'        30160           CALL    BLANK
02EB'                   30180   PRI21:
02EB'   3A 0751'        30200           LD      A,(FES)
02EE'   1F              30220           RRA
02EF'   DA 0326'        30240           JP      C,XPRIN
02F2'   3A 074F'        30260           LD      A,(XSIGN)
02F5'   B7              30280           OR      A
02F6'   CA 0318'        30300           JP      Z,POSIT
02F9'   79              30320           LD      A,C
02FA'   B7              30340           OR      A
02FB'   C2 0302'        30360           JP      NZ,PRIN4
02FE'   CD 039F'        30380           CALL    ZERO
0301'   C9              30400           RET
                        30420   ;
                        30440   ;
0302'                   30460   PRIN4:
0302'   CD 03A9'        30480           CALL    RADIX
0305'   AF              30500           XOR     A
0306'   B3              30520           OR      E
0307'   CA 0311'        30540           JP      Z,PRIN5
030A'   CD 039F'        30560           CALL    ZERO
030D'   1D              30580           DEC     E
030E'   C2 0305'        30600           JP      NZ,PRIN4+3
0311'                   30620   PRIN5:
0311'   CD 0389'        30640           CALL    XFERB3
0314'   C2 0311'        30660           JP      NZ,PRIN5
0317'   C9              30680           RET
                        30700   ;
0318'                   30720   POSIT:
0318'   CD 0389'        30740           CALL    XFERB3
031B'   1D              30760           DEC     E
031C'   C2 0318'        30780           JP      NZ,POSIT
031F'   79              30800           LD      A,C
0320'   B7              30820           OR      A
0321'   C8              30840           RET     Z
0322'   F8              30860           RET     M
0323'   C3 0302'        30880           JP      PRIN4
                        30900   ;
                        30920   ;
                        30940   ;THIS FORMATS EXPONENTIAL OUTPUT
                        30960   ;
0326'                   30980   XPRIN:
0326'   CD 0389'        31000           CALL    XFERB3
0329'   CA 0335'        31020           JP      Z,NDEC
032C'   CD 03A9'        31040           CALL    RADIX
032F'                   31060   XPRI2:
032F'   CD 03AE'        31080           CALL    XFERCH
0332'   C2 032F'        31100           JP      NZ,XPRI2
0335'                   31120   NDEC:
0335'   06 45           31140           LD      B,"E"
0337'   CD 03AE'        31160           CALL    XFERCH                  ;INSERT CHAR INTO BUFF3
```

```
033A'   3A 074F'            LD      A,(XSIGN)
033D'   B7                  OR      A
033E'   CA 034B'            JP      Z,XPRI3
0341'   CD 039A'            CALL    NEG
0344'   3A 0750'            LD      A,(EXPO)
0347'   3C                  INC     A
0348'   C3 0354'            JP      XOUT2
034B'               XPRI3:
034B'   06 2B               LD      B,"+"
034D'   CD 03AE'            CALL    XFERCH
                    ;
                    ;
                    ;THIS ROUTINE IS USED TO CONVERT THE EXPONENT FROM BINARY TO ASCII
                    ;
0350'               XOUT:
0350'   3A 0750'            LD      A,(EXPO)
0353'   3D                  DEC     A
0354'               XOUT2:
0354'   0E 64               LD      C,100
0356'   16 00               LD      D,0
0358'   CD 037E'            CALL    CONV
035B'   FE 30               CP      "0"
035D'   CA 0364'            JP      Z,XO21
0360'   14                  INC     D
0361'   CD 0389'            CALL    XFERB3
0364'               XO21:
0364'   7B                  LD      A,E
0365'   0E 0A               LD      C,10
0367'   CD 037E'            CALL    CONV
036A'   FE 30               CP      "0"
036C'   C2 0373'            JP      NZ,XO3
036F'   15                  DEC     D
0370'   C2 0376'            JP      NZ,XO4
0373'               XO3:
0373'   CD 0389'            CALL    XFERB3
0376'               XO4:
0376'   7B                  LD      A,E
0377'   C6 30               ADD     A,"0"
0379'   47                  LD      B,A
037A'   CD 0389'            CALL    XFERB3
037D'   C9                  RET
                    ;
                    ;
037E'               CONV:
037E'   06 2F               LD      B,"0"-1
0380'   04                  INC     B
0381'   91                  SUB     C
0382'   D2 0380'            JP      NC,CONV+2
0385'   81                  ADD     A,C
0386'   5F                  LD      E,A
0387'   78                  LD      A,B
0388'   C9                  RET
```

```
                          ;
                          ;
                          ;THIS ROUTINE ADDS ASCII BIAS TO A BCD DIGIT AND PUT IN INTO BUFF3
                          ;
0389'                     XFERB3:
0389'   7E                          LD      A,(HL)
038A'   C6 30                       ADD     A,"0"
038C'   47                          LD      B,A
038D'   E5                          PUSH    HL
038E'   2A 0789'                    LD      HL,(B3PTR)
0391'   70                          LD      (HL),B
0392'   23                          INC     HL
0393'   22 0789'                    LD      (B3PTR),HL
0396'   E1                          POP     HL
0397'   23                          INC     HL
0398'   0D                          DEC     C
0399'   C9                          RET
                          ;
                          ;
                          ;COMMON SYMBOL LOADING ROUTINE
                          ;
039A'                     NEG:
039A'   06 2D                       LD      B,"-"
039C'   C3 03AE'                    JP      XFERCH
039E'                     ZERO:
039F'   06 30                       LD      B,"0"
03A1'   C3 03AE'                    JP      XFERCH
03A4'                     BLANK:
03A4'   06 20                       LD      B," "
03A6'   C3 03AE'                    JP      XFERCH
03A9'                     RADIX:
03A9'   06 2E                       LD      B,"."
03AB'   C3 03AE'                    JP      XFERCH
                          ;
                          ;
                          ;THIS ROUTINE PUT CHAR IN B INTO BUFF3
                          ;
03AE'                     XFERCH:
03AE'   E5                          PUSH    HL
03AF'   2A 0789'                    LD      HL,(B3PTR)
03B2'   70                          LD      (HL),B
03B3'   23                          INC     HL
03B4'   22 0789'                    LD      (B3PTR),HL
03B7'   E1                          POP     HL
03B8'   C9                          RET
                          ;
                          ;
                          ;COPY FPSIZ BYTES AT HL TO DE, ON EXIT HL=ADDR-1 OF LAST BYTE
                          ;
03B9'                     VCOPY:
03B9'   0E 0F                       LD      C,FPSIZ
03BB'                     VCOP1:
03BB'   7E                          LD      A,(HL)
```

```
03BC'  12            33240            LD      (DE),A
03BD'  2B            33260            DEC     HL
03BE'  1B            33280            DEC     DE
03BF'  0D            33300            DEC     C
03C0'  20 F9         33320            JR      NZ,VCOP1
03C2'  C9            33340            RET
                     33360   ;
                     33380   ;
03C3'                33400   CLRBUF:
03C3'  21 07B3'      33500            LD      HL,BUFF3
03C6'  01 0052       33520            LD      BC,B2PTR-BUFF3
03C9'  CD 0000*      33540            CALL    CLRMM2
03CC'  C9            33660            RET
                     33680   ;
03CD'                33682   CLRFPN:
03CD'  21 0903'      33684            LD      HL,FPN1
03D0'  01 00AA       33686            LD      BC,HOLD1-FPN1-2
03D3'  CD 0000*      33688            CALL    CLRMEM
03D6'  C9            33690            RET
                     33692   ;
                     33700   ;
                     34200   ;
                     34300   ;
03D7'                34320   FPADD:
03D7'  C5            34340            PUSH    BC
03D8'  CD 0652'      34360            CALL    EXPCK
03DB'  0E 00         34380            LD      C,0
03DD'                34400   ADSUM:
03DD'  1B            34420            DEC     DE
03DE'  EB            34440            EX      DE,HL
03DF'  3A 0A2F'      34460            LD      A,(SIGN)
03E2'  AE            34480            XOR     (HL)
03E3'  47            34500            LD      B,A
03E4'  EB            34520            EX      DE,HL
03E5'  1A            34540            LD      A,(DE)
03E6'  1B            34560            DEC     DE
03E7'  A9            34580            XOR     C
03E8'  32 0A2F'      34600            LD      (SIGN),A
03EB'  21 0A31'      34620            LD      HL,RCTRL
03EE'  7E            34640            LD      A,(HL)
03EF'  B7            34650            OR      A
03F0'  23            34680            INC     HL
03F1'  7E            34700            LD      A,(HL)
03F2'  CA 03F9'      34720            JP      Z,ADS8
03F5'  07            34740            RLCA
03F6'  07            34760            RLCA
03F7'  07            34780            RLCA
03F8'  07            34800            RLCA
03F9'                34820   ADS8:
03F9'  C6 B0         34840            ADD     A,0B0H
03FB'  78            34850            LD      A,B
03FC'  1F            34860            RRA
```

```
03FD'   DA 043D'        34880           JP      C,ADS1
0400'   17              34900           RLA
0401'   CD 041C'        34920           CALL    XXADD
0404'   D2 0413'        34940           JP      NC,ADS2
0407'   06 04           34960           LD      B,4
0409'   CD 06B8'        34980           CALL    RIGHT
040C'   21 0A30'        35000           LD      HL,EXP
040F'   34              35020           INC     M
0410'   CA 05C5'        35040           JP      Z,FPDIV5
0413'                   35060   ADS2:
0413'   C1              35080           POP     BC
0414'   CD 06AA'        35100           CALL    STORE
0417'   C9              35120           RET
                        35140   ;
0418'                   35160   ZEREX:
0418'   E1              35180           POP     HL
0419'   C3 0413'        35200           JP      ADS2
041C'                   35220   XXADD:
041C'   21 0A2E'        35240           LD      HL,BUF+DIGIT-1
041F'   06 0D           35260           LD      B,DIGIT
0421'                   35280   ADD1:
0421'   1A              35300           LD      A,(DE)
0422'   8E              35320           ADC     A,(HL)
0423'   27              35340           DAA
0424'   77              35360           LD      (HL),A
0425'   2B              35380           DEC     HL
0426'   1B              35400           DEC     DE
0427'   05              35420           DEC     B
0428'   C2 0421'        35440           JP      NZ,ADD1
042B'   D0              35460           RET     NC
042C'   34              35480           INC     (HL)
042D'   C9              35500           RET
                        35520   ;
042E'                   35540   FPSUB:
042E'   C5              35560           PUSH    BC
042F'   CD 0652'        35580           CALL    EXPCK
0432'   3A 0A2F'        35600           LD      A,(SIGN)
0435'   EE 01           35620           XOR     1
0437'   32 0A2F'        35640           LD      (SIGN),A
043A'   C3 03DD'        35660           JP      ADSUM
                        35680           ;
043D'                   35700   ADS1:
043D'   17              35720           RLA
043E'   3F              35740           CCF
043F'   CD 0491'        35760           CALL    XXSUB
0442'   21 0A2F'        35780           LD      HL,SIGN
0445'   DA 045C'        35800           JP      C,ADS4
0448'   7E              35820           LD      A,(HL)
0449'   EE 01           35840           XOR     1
044B'   77              35860           LD      (HL),A
044C'                   35880   ADS7:
044C'   2B              35900           DEC     HL
```

```
044D'   06 0D          35920          LD      B,DIGIT
                       35940          ;
044F'                  35960  ADS3:
044F'   3E 9A          35980          LD      A,9AH
0451'   9E             36000          SBC     A,(HL)
0452'   C6 00          36020          ADD     A,0
0454'   27             36040          DAA
0455'   77             36060          LD      (HL),A
0456'   2B             36080          DEC     HL
0457'   05             36100          DEC     B
0458'   3F             36120          CCF
0459'   C2 044F'       36140          JP      NZ,ADS3
045C'                  36160  ADS4:
045C'   21 0A22'       36180          LD      HL,BUF
045F'   01 000D        36200          LD      BC,DIGIT
0462'                  36220  ADS5:
0462'   7E             36240          LD      A,(HL)
0463'   B7             36260          OR      A
0464'   C2 0475'       36280          JP      NZ,ADS6
0467'   23             36300          INC     HL
0468'   04             36320          INC     B
0469'   04             36340          INC     B
046A'   0D             36360          DEC     C
046B'   C2 0462'       36380          JP      NZ,ADS5
046E'   AF             36400          XOR     A
046F'   32 0A30'       36420          LD      (EXP),A
0472'   C3 0413'       36440          JP      ADS2
0475'                  36460  ADS6:
0475'   FE 10          36480          CP      10H
0477'   D2 047B'       36500          JP      NC,ADS9
047A'   04             36520          INC     B
047B'                  36540  ADS9:
047B'   21 0A30'       36560          LD      HL,EXP
047E'   7E             36580          LD      A,(HL)
047F'   90             36600          SUB     B
0480'   CA 05C5'       36620          JP      Z,FPDIV5
0483'   DA 05C5'       36640          JP      C,FPDIV5
0486'   77             36660          LD      (HL),A
0487'   78             36680          LD      A,B
0488'   07             36700          RLCA
0489'   07             36720          RLCA
048A'   47             36740          LD      B,A
048B'   CD 06DE'       36760          CALL    LEFT
048E'   C3 0413'       36780          JP      ADS2
0491'                  36800  XXSUB:
0491'   21 0A2E'       36820          LD      HL,BUF+DIGIT-1
0494'   06 0D          36840          LD      B,DIGIT
0496'                  36860  SUB1:
0496'   3E 99          36880          LD      A,99H
0498'   CE 00          36900          ADC     A,0
049A'   96             36920          SUB     (HL)
049B'   EB             36940          EX      DE,HL
```

```
049C'  86               ADD   A,(HL)
049D'  27               DAA
049E'  EB               EX    DE,HL
049F'  77               LD    (HL),A
04A0'  2B               DEC   HL
04A1'  1B               DEC   DE
04A2'  05               DEC   B
04A3'  C2 0496'         JP    NZ,SUB1
04A6'  C9               RET
                 ;
                 ;
                 ;
                 ;FLOATING POINT MULTIPLY
                 ;
04A7'            FPMUL:
04A7'  C5               PUSH  BC
04A8'  7E               LD    A,(HL)
04A9'  B7               OR    A
04AA'  CA 04C1'         JP    Z,FMUL1+2
04AD'  1A               LD    A,(DE)
04AE'  B7               OR    A
04AF'  CA 04C1'         JP    Z,FMUL1+2
04B2'  86               ADD   A,(HL)
04B3'  DA 04BC'         JP    C,FMOVR
04B6'  F2 05C5'         JP    P,FPDIV5
04B9'  C3 04BF'         JP    FMUL1
04BC'            FMOVR:
04BC'  FA 05C5'         JP    M,FPDIV5
04BF'            FMUL1:
04BF'  D6 80            SUB   128
04C1'  32 0A30'         LD    (EXP),A
04C4'  1B               DEC   DE
04C5'  2B               DEC   HL
04C6'  1A               LD    A,(DE)
04C7'  AE               XOR   (HL)
04C8'  2B               DEC   HL
04C9'  1B               DEC   DE
04CA'  E5               PUSH  HL
04CB'  21 0A2F'         LD    HL,SIGN
04CE'  77               LD    (HL),A
04CF'  2B               DEC   HL
04D0'  AF               XOR   A
04D1'  06 0F            LD    B,DIGIT+2
04D3'            FMUL2:
04D3'  77               LD    (HL),A
04D4'  2B               DEC   HL
04D5'  05               DEC   B
04D6'  C2 04D3'         JP    NZ,FMUL2
04D9'  3A 0A30'         LD    A,(EXP)
04DC'  B7               OR    A
04DD'  CA 0418'         JP    Z,ZEREX
```

```
04E0°   0E 0D                     LD      C,DIGIT
04E2°   21 09BC°                  LD      HL,HOLD1+DIGIT
                          ;
                          ;GET MULTIPLIER INTO HOLDING REG
                          ;
04E5°                     FMUL3:
04E5°   1A                        LD      A,(DE)
04E6°   77                        LD      (HL),A
04E7°   2B                        DEC     HL
04E8°   1B                        DEC     DE
04E9°   0D                        DEC     C
04EA°   C2 04E5°                  JP      NZ,FMUL3
04ED°   71                        LD      (HL),C
04EE°   2B                        DEC     HL
04EF°   06 FA                     LD      B,250
04F1°                     FMUL4:
04F1°   11 000E                   LD      DE,DIGIT+1
04F4°   43                        LD      C,E
04F5°   19                        ADD     HL,DE
04F6°   EB                        EX      DE,HL
04F7°   19                        ADD     HL,DE
04F8°   04                        INC     B
04F9°   F2 0520°                  JP      P,FMUL8
04FC°                     FMUL5:
04FC°   1A                        LD      A,(DE)
04FD°   8F                        ADC     A,A
04FE°   27                        DAA
04FF°   77                        LD      (HL),A
0500°   1B                        DEC     DE
0501°   2B                        DEC     HL
0502°   0D                        DEC     C
0503°   C2 04FC°                  JP      NZ,FMUL5
0506°   04                        INC     B
0507°   C2 04F1°                  JP      NZ,FMUL4
                          ;
                          ;FORM 10X BY ADDING 8X AND 2X
                          ;
                          ;FIRST GET 8X
                          ;
050A°   23                        INC     HL
050B°   11 09E7°                  LD      DE,HOLD5
050E°   0E 0E                     LD      C,DIGIT+1
0510°   41                        LD      B,C
0511°                     FMUL6:
0511°   7E                        LD      A,(HL)
0512°   12                        LD      (DE),A
0513°   23                        INC     HL
0514°   13                        INC     DE
0515°   0D                        DEC     C
0516°   C2 0511°                  JP      NZ,FMUL6
0519°   21 09CA°                  LD      HL,HOLD2+DIGIT
051C°   1B                        DEC     DE
```

```
051D'                39020 FMUL7:
051D'  1A            39040          LD      A,(DE)
051E'  8E            39060          ADC     A,(HL)
051F'  27            39080          DAA
0520'  12            39100          LD      (DE),A
0521'  1B            39120          DEC     DE
0522'  2B            39140          DEC     HL
0523'  05            39160          DEC     B
0524'  C2 051D'      39180          JP      NZ,FMUL7
0527'  06 F9         39200          LD      B,249
0529'  EB            39220          EX      DE,HL
052A'  C3 04F1'      39240          JP      FMUL4
                     39260 ;
052D'                39280 FMUL8:
052D'  EB            39300          EX      DE,HL
052E'  23            39320          INC     HL
052F'  36 0E         39340          LD      (HL),DIGIT+1
                     39360 ;
                     39380 ;PERFORM ACCUMULATION OF PRODUCT
                     39400 ;
0531'                39420 FMUL9:
0531'  C1            39440          POP     BC
0532'  21 0A1F'      39460          LD      HL,HOLDB+DIGIT+1
0535'  35            39480          DEC     (HL)
0536'  CA 0563'      39500          JP      Z,FMU14
0539'  0A            39520          LD      A,(BC)
053A'  0B            39540          DEC     BC
053B'  C5            39560          PUSH    BC
053C'  2B            39580          DEC     HL
053D'  EB            39600          EX      DE,HL
053E'                39620 FMU10:
053E'  87            39640          ADD     A,A
053F'  DA 054D'      39660          JP      C,FMU11
0542'  CA 055B'      39680          JP      Z,FMU12
0545'  21 FFF2       39700          LD      HL,-DIGIT-1
0548'  19            39720          ADD     HL,DE
0549'  EB            39740          EX      DE,HL
054A'  C3 053E'      39760          JP      FMU10
                     39780 ;
054D'                39800 FMU11:
054D'  4F            39820          LD      C,A
054E'  B7            39840          OR      A
054F'  CD 041C'      39860          CALL    XXADD
0552'  1A            39880          LD      A,(DE)
0553'  86            39900          ADD     A,(HL)
0554'  27            39920          DAA
0555'  77            39940          LD      (HL),A
0556'  79            39960          LD      A,C
0557'  1B            39980          DEC     DE
0558'  C3 053E'      40000          JP      FMU10
                     40020 ;
```

```
      40040   ;ROTATE RIGHT ONE BYTE
                              40060   ;
0558'                         40080   FMU12:
0558'    06 08                40100           LD      B,B
055D'    CD 0698'             40120           CALL    RIGHT
0560'    C3 0531'             40140           JP      FMUL9
                              40160   ;
0563'                         40180   FMU14:
0563'    3A 0A22'             40200           LD      A,(BUF)
0566'    E6 F0                40220           AND     0F0H
0568'    CA 0574'             40240           JP      Z,FMU17
056B'    7A                   40260           LD      A,D
056C'    E6 F0                40280           AND     0F0H
056E'    21 0A2E'             40300           LD      HL,SIGN-1
0571'    C3 0585'             40320           JP      FMU18
0574'                         40340   FMU17:
0574'    06 04                40360           LD      B,4
0576'    21 0A30'             40380           LD      HL,EXP
0579'    35                   40400           DEC     (HL)
057A'    CA 05C5'             40420           JP      Z,FPDIV5
057D'    CD 06DE'             40440           CALL    LEFT
0580'    7A                   40460           LD      A,D
                              40480   ;
                              40500   ;PERFORM ROUNDING
                              40520   ;
0581'    0F                   40540           RRCA
0582'    0F                   40560           RRCA
0583'    0F                   40580           RRCA
0584'    0F                   40600           RRCA
0585'                         40620   FMU18:
0585'    FE 50                40640           CP      50H
0587'    DA 05A9'             40660           JP      C,FMU16
058A'    3C                   40680           INC     A
058B'    E6 0F                40700           AND     0FH
058D'    0E 0D                40720           LD      C,DIGIT
058F'                         40740   FMU15:
058F'    8E                   40760           ADC     A,(HL)
0590'    27                   40780           DAA
0591'    77                   40800           LD      (HL),A
0592'    3E 00                40820           LD      A,0
0594'    2B                   40840           DEC     HL
0595'    0D                   40860           DEC     C
0596'    C2 058F'             40880           JP      NZ,FMU15
                              40900   ;
                              40920   ;CHECK FOR ROUNDING OVERFLOW
                              40940   ;
0599'    D2 0413'             40960           JP      NC,ADS2
059C'    23                   40980           INC     HL
059D'    36 10                41000           LD      (HL),10H
059F'    21 0A30'             41020           LD      HL,EXP
05A2'    34                   41040           INC     (HL)
05A3'    C2 0413'             41060           JP      NZ,ADS2
05A6'    C3 05C5'             41080           JP      FPDIV5
                              41100   ;
```

```
                                41120   ;ROUNDING NOT NEEDED
                                41140   ;
05A9'                           41160   FMU16:
05A9'   E6 0F                   41180           AND     0FH
05AB'   86                      41200           ADD     A,(HL)
05AC'   77                      41220           LD      (HL),A
05AD'   C3 0413'                41240           JP      ADS2
                                41260   ;
                                41280   ;
                                41300   ;FLOATING POINT DIVISION
                                41320   ;
05B0'                           41340   FPDIV:
05B0'   C5                      41360           PUSH    BC
05B1'   7E                      41380           LD      A,(HL)
05B2'   B7                      41400           OR      A
05B3'   CA 05C5'                41420           JP      Z,FPDIV5
05B6'   1A                      41440           LD      A,(DE)
05B7'   B7                      41460           OR      A
05B8'   CA 05C5'                41480           JP      Z,FPDIV5
05BB'   96                      41500           SUB     (HL)
05BC'   DA 05C9'                41520           JP      C,FD11
05BF'   FA 05C5'                41540           JP      M,FPDIV5
05C2'   C3 05C9'                41560           JP      FD11
                                41580   ;
05C5'                           41585   FPDIV5:
05C5'   C1                      41590           POP     BC
05C6'   C3 0704'                41595           JP      ERROR
                                41600   ;
                                41605   ;
05C9'                           41640   FD11:
05C9'   C6 81                   41660           ADD     A,129
05CB'   32 09BD'                41680           LD      (EXPD),A
05CE'   EB                      41700           EX      DE,HL
05CF'   D5                      41720           PUSH    DE
05D0'   CD 0694'                41740           CALL    LOAD
05D3'   D1                      41760           POP     DE
05D4'   EB                      41780           EX      DE,HL
05D5'   3A 0A2F'                41800           LD      A,(SIGN)
05D8'   2B                      41820           DEC     HL
05D9'   AE                      41840           XOR     (HL)
05DA'   32 09BC'                41860           LD      (SIGND),A
05DD'   EB                      41880           EX      DE,HL
05DE'   1B                      41900           DEC     DE
05DF'   01 09AF'                41920           LD      BC,HOLD1
05E2'                           41940   DIV0:
05E2'   2E 1A                   41960           LD      L,DIGIT+DIGIT
05E4'                           41980   DIV1:
05E4'   C5                      42000           PUSH    BC
05E5'   E5                      42020           PUSH    HL
05E6'   0E 00                   42040           LD      C,0
05E8'                           42060   DIV3:
05E8'   37                      42080           SCF
05E9'   21 0A2E'                42100           LD      HL,BUF+DIGIT-1
```

```
05EC'   06 0D          42120          LD      B,DIGIT
05EE'                  42140   DIV4:
05EE'   3E 99          42160          LD      A,99H
05F0'   CE 00          42180          ADC     A,0
05F2'   EB             42200          EX      DE,HL
05F3'   96             42220          SUB     (HL)
05F4'   EB             42240          EX      DE,HL
05F5'   86             42260          ADD     A,(HL)
05F6'   27             42280          DAA
05F7'   77             42300          LD      (HL),A
05F8'   2B             42320          DEC     HL
05F9'   1B             42340          DEC     DE
05FA'   05             42360          DEC     B
05FB'   C2 05EE'       42380          JP      NZ,DIV4
05FE'   7E             42400          LD      A,(HL)
05FF'   3F             42420          CCF
0600'   DE 00          42440          SBC     A,0
0602'   77             42460          LD      (HL),A
0603'   1F             42480          RRA
0604'   21 000D        42500          LD      HL,DIGIT
0607'   19             42520          ADD     HL,DE
0608'   EB             42540          EX      DE,HL
0609'   0C             42560          INC     C
060A'   17             42580          RLA
060B'   D2 05E8'       42600          JP      NC,DIV3
060E'   B7             42620          OR      A
060F'   CD 041C'       42640          CALL    XXADD
0612'   21 000D        42660          LD      HL,DIGIT
0615'   19             42680          ADD     HL,DE
0616'   EB             42700          EX      DE,HL
0617'   C5             42720          PUSH    BC
0618'   06 04          42740          LD      B,4
061A'   CD 06DE'       42760          CALL    LEFT
061D'   C1             42780          POP     BC
061E'   0D             42800          DEC     C
061F'   E1             42820          POP     HL
0620'   61             42840          LD      H,C
0621'   C1             42860          POP     BC
0622'   7D             42880          LD      A,L
0623'   C2 0635'       42900          JP      NZ,DIV5
0626'   FE 1A          42920          CP      DIGIT+DIGIT
0628'   C2 0635'       42940          JP      NZ,DIV5
062B'   21 09BD'       42960          LD      HL,EXPD
062E'   35             42980          DEC     (HL)
062F'   CA 05C5'       43000          JP      Z,FPDIV5
0632'   C3 05E2'       43020          JP      DIV0
                       43040   ;
0635'                  43060   DIV5:
0635'   1F             43080          RRA
0636'   7C             43100          LD      A,H
0637'   D2 0645'       43120          JP      NC,DIV6
063A'   0A             43140          LD      A,(BC)
```

```
063B'  07                    RLCA
063C'  07                    RLCA
063D'  07                    RLCA
063E'  07                    RLCA
063F'  84                    ADD   A,H
0640'  02                    LD    (BC),A
0641'  03                    INC   BC
0642'  C3 0646'              JP    DIV7
0645'              DIV6:
0645'  02                    LD    (BC),A
0646'              DIV7:
0646'  2D                    DEC   L
0647'  C2 05E4'              JP    NZ,DIV1
064A'  21 09BD'              LD    HL,EXPD
064D'  C1                    POP   BC
064E'  CD 06AD'              CALL  STORO
0651'  C9                    RET
                   ;
                   ;FETCH AND ALIGN ARGUMENTS FOR ADDITION AND SUBTRACTION
                   ;
0652'              EXPCK:
0652'  1A                    LD    A,(DE)
0653'  96                    SUB   (HL)
0654'  0E 00                 LD    C,0
0656'  D2 065D'              JP    NC,EXPC1
0659'  0C                    INC   C
065A'  EB                    EX    DE,HL
065B'  2F                    CPL
065C'  3C                    INC   A
065D'              EXPC1:
065D'  47                    LD    B,A
065E'  1A                    LD    A,(DE)
065F'  32 0A30'              LD    (EXP),A
0662'  78                    LD    A,B
0663'  FE 1A                 CP    DIGIT+DIGIT
0665'  DA 066A'              JP    C,EXPC2
0668'  3E 1A                 LD    A,DIGIT+DIGIT
066A'              EXPC2:
066A'  07                    RLCA
066B'  07                    RLCA
066C'  47                    LD    B,A
066D'  E6 04                 AND   4
066F'  32 0A31'              LD    (RCTRL),A
0672'  C5                    PUSH  BC
0673'  D5                    PUSH  DE
0674'  CD 0694'              CALL  LOAD
0677'  3E 78                 LD    A,8*DIGIT+16
0679'  90                    SUB   B
067A'  FE 78                 CP    8*DIGIT+16
067C'  CA 068E'              JP    Z,EXPC3
067F'  E6 F8                 AND   0F8H
0681'  1F                    RRA
```

```
0682'   1F                        RRA
0683'   1F                        RRA
0684'   83                        ADD     A,E
0685'   5F                        LD      E,A
0686'   7A                        LD      A,D
0687'   CE 00                     ADC     A,0
0689'   57                        LD      D,A
068A'   1A                        LD      A,(DE)
068B'   32 0A32'                  LD      (RDIGI),A
068E'                     EXPC3:
068E'   CD 06B8'                  CALL    RIGHT
0691'   D1                        POP     DE
0692'   C1                        POP     BC
0693'   C9                        RET
                          ;
                          ;
                          ;LOAD ARGUMENT INTO BUFFER
                          ;
0694'                     LOAD:
0694'   11 0A2F'                  LD      DE,SIGN
0697'   0E 0E                     LD      C,DIGIT+1
0699'   2B                        DEC     HL
069A'                     LOAD1:
069A'   7E                        LD      A,(HL)
069B'   12                        LD      (DE),A
069C'   2B                        DEC     HL
069D'   1B                        DEC     DE
069E'   0D                        DEC     C
069F'   C2 069A'                  JP      NZ,LOAD1
06A2'   AF                        XOR     A
06A3'   12                        LD      (DE),A
06A4'   13                        DEC     DE
06A5'   12                        LD      (DE),A
06A6'   32 0A32'                  LD      (RDIGI),A
06A9'   C9                        RET
                          ;
                          ;
                          ;STORE RESULTS IN MEMORY
                          ;
06AA'                     STORE:
06AA'   21 0A30'                  LD      HL,EXP
06AD'                     STORO:
06AD'   1E 0F                     LD      E,DIGIT+2
06AF'                     STOR1:
06AF'   7E                        LD      A,(HL)
06B0'   02                        LD      (BC),A
06B1'   0B                        DEC     BC
06B2'   2B                        DEC     HL
06B3'   1D                        DEC     E
06B4'   C2 06AF'                  JP      NZ,STOR1
06B7'   C9                        RET
                          ;
```

```
                  ;
                  ;SHIFT RIGHT NUMBER OF DIGITS IN B/4
                  ;
06B8'             RIGHT:
06B8'  0E 0E               LD      C,DIGIT+1
06BA'             RIGH1:
06BA'  21 0A21'            LD      HL,BUF-1
06BD'  78                  LD      A,B
06BE'  D6 08               SUB     8
06C0'  D2 06D1'            JP      NC,RIGH3
06C3'  05                  DEC     B
06C4'  F8                  RET     M
06C5'  B7                  OR      A
06C6'             RIGH2:
06C6'  7E                  LD      A,(HL)
06C7'  1F                  RRA
06C8'  77                  LD      (HL),A
06C9'  23                  INC     HL
06CA'  0D                  DEC     C
06CB'  C2 06C6'            JP      NZ,RIGH2
06CE'  C3 06B8'            JP      RIGHT
                  ;
                  ;
                  ;SHIFT RIGHT ONE BYTE
                  ;
06D1'             RIGH3:
06D1'  47                  LD      B,A
06D2'  AF                  XOR     A
06D3'             RIGH4:
06D3'  56                  LD      D,(HL)
06D4'  77                  LD      (HL),A
06D5'  7A                  LD      A,D
06D6'  23                  INC     HL
06D7'  0D                  DEC     C
06D8'  C2 06D3'            JP      NZ,RIGH4
06DB'  C3 06B8'            JP      RIGHT
                  ;
                  ;
                  ;SHIFT LEFT NUMBER OF DIGITS IN B/4
                  ;
06DE'             LEFT:
06DE'  0E 0E               LD      C,DIGIT+1
06E0'  21 0A2E'            LD      HL,SIGN-1
06E3'             LEF1:
06E3'  78                  LD      A,B
06E4'  D6 08               SUB     8
06E6'  D2 06F7'            JP      NC,LEF3
06E9'  05                  DEC     B
06EA'  F8                  RET     M
06EB'  B7                  OR      A
06EC'             LEF2:
06EC'  7E                  LD      A,(HL)
```

```
06ED'   17                    RLA
06EE'   77                    LD      (HL),A
06EF'   2B                    DEC     HL
06F0'   0D                    DEC     C
06F1'   C2 06EC'              JP      NZ,LEF2
06F4'   C3 06DE'              JP      LEFT
                      ;
                      ;
                      ;SHIFT LEFT ONE BYTE
                      ;
06F7'                 LEF3:
06F7'   47                    LD      B,A
06F8'   AF                    XOR     A
06F9'                 LEF4:
06F9'   56                    LD      D,(HL)
06FA'   77                    LD      (HL),A
06FB'   7A                    LD      A,D
06FC'   2B                    DEC     HL
06FD'   0D                    DEC     C
06FE'   C2 06F9'              JP      NZ,LEF4
0701'   C3 06DE'              JP      LEFT
                      ;
                      ;
                      ;SET FLAGS FOR OVERFLOW, UNDERFLOW, AND DIVIDE BY ZERO
                      ;
                      ;
0704'                 ERROR:
0704'   21 07B3'              LD      HL,BUFF3
0707'   0E 50                 LD      C,80
0709'   3E 30                 LD      A,"0"
070B'                 ERR005:
070B'   77                    LD      (HL),A
070C'   23                    INC     HL
070D'   0D                    DEC     C
070E'   20 FB                 JR      NZ,ERR005
0710'   3E 00                 LD      A,0
0712'   77                    LD      (HL),A
0713'   3E FF                 LD      A,0FFH
0715'   C9                    RET
                      ;
                      ;
                      ;****************************************************************
                      ;
                      ;
                      ;       THESE ARE THE DATA STRINGS USED AS LITERALS
                      ;       FOR ENUNCIATORS AND FOR DISPLAYS
                      ;
                      ;
                      ;***************************************************************
                      ;
                      ;****************************************************************
```

```
        ;
        ;
        ;       THESE ARE THE DATA STRINGS USED AS ERROR MESSAGES
        ;
        ;
        ;*****************************************************************
        ;
        ;*****************************************************************
        ;
        ;
        ;       THIS IS THE SECTION CONTAUNING ALL OF THE WORKING STORAGE
        ;
        ;
        ;******************************************************************
        ;
        ;STORAGE USED BY MATH ROUTINES
        ;
0716'           DS      4
071A'   ADDS:   DS      2
071C'   ADDT:   DS      2
071E'   BCADD:  DS      2
0720'   OPST:   DS      1
0721'   OPSTR:  DS      1
0722'   ECNT:   DS      1
0723'   FSIGN:  DS      1
0724'   BC1:    DS      DIGIT+2
0733'   ABUF:   DS      DIGIT*2+2
074F'   XSIGN:  DS      1
0750'   EXPO:   DS      1
0751'   FES:    DS      1
0752'   INFES:  DS      1
0753'   MAXLN:  DS      2
0755'   INSA:   DS      2
0757'   BFF:    DS      50
0789'   B3PTR::         DS      2
078B'           DS      40
07B3'   BUFF3::         DS      82
0805'   B2PTR::         DS      2
0807'           DS      40
082F'   BUFF2::         DS      80
087F'   B1PTR::         DS      2
0881'           DS      40
08A9'   BUFF1::         DS      82
        ;
        ;
08FB'           DS      8
0903'   FPN1:   DS      8
090B'           DS      36
092F'   FPN2:   DS      8
0937'           DS      36
095B'   FPN3:   DS      36
097F'           DS      8
```

```
                  99990          END      MATH

                  60760   ;
                  60780   ;
0987°             60800          DS       40
                  6082C   ;FLOATING POINT RAM
                  60840   ;
09AF°             60860   HOLD1:  DS      DIGIT+1
C9BD°             60880   HOLD2:  DS      DIGIT+1
09CB°             60900   HOLD3:  DS      DIGIT+1
C9D9°             60920   HOLD4:  DS      DIGIT+1
09E7°             60940   HOLD5:  DS      DIGIT+1
C9F5°             60960   HOLD6:  DS      DIGIT+1
0A03°             60980   HOLD7:  DS      DIGIT+1
0A11°             61000   HOLD8:  DS      DIGIT+1
0A1F°             61020           DS      1
0A20°             61040   ERRI:   DS      1
0A21°             61060           DS      1
0A22°             61080   BUF:    DS      DIGIT
0A2F°             61100   SIGN:   DS      1
CA30°             61120   EXP:    DS      1
CA31°             61140   RCTRL:  DS      1
0A32°             61160   RDIGI:  DS      1
C9BC°             61180   SIGND   EQU     HOLD1+DIGIT
C9BD°             61200   EXPD    EQU     HOLD1+DIGIT+1
                  61220   ;
                  61240   ;
                  70000   ;*****************************************************************
                  70020   ;
                  70040   ;
                  70060   ;       THESE ARE THE DATA LIST AQND TABLES
                  70080   ;
                  7010C   ;
                  70120   ;*****************************************************************
                  70140   ;
                  80000   ;*****************************************************************
                  80020   ;
                  80040   ;
                  80060   ;       THIS SECTION CONTAINS THE SUPERVISOR ROUTINES
                  8008C   ;
                  80100   ;
                  80120   ;*****************************************************************
                  80140   ;
                  80160   ;
0A33°             99950   ENDAPP::

Macros:

Symbols:
ABUF    0733°   ADD1    0421°   ADDS    071A°   ADDT    071C°
ADS1    043D°   ADS2    0413°   ADS3    044F°   ADS4    045C°
ADS5    0462°   ADS6    0475°   ADS7    044C°   ADS8    03F9°
ADS9    0478°   ADSUM   03DD°   ASC1    0151°   ASC2    0168°
```

| | | | | | | | |
|---|---|---|---|---|---|---|---|
| ASCDC | 014D' | B1PTR | 087FI' | B2PTR | 0805I' | B3PTR | 0789I' |
| BC1 | 0724' | BCADD | 071E' | BCKSP | 0008 | BFF | 0757' |
| BFIELD | 005B | BLANK | 03A4' | BOTM | 00E3' | BPOS | 01B7' |
| BUF | 0A22' | BUFF1 | 08A9I' | BUFF2 | 082FI' | BUFF3 | 0783I' |
| CHK13 | 0207' | CHK40 | 0214' | CHKPN | 018D' | CHKX2 | 0226' |
| CHKX3 | 022B' | CHKXN | 023B' | CHKXO | 0218' | CLEAN | 0268' |
| CLEAR | 011F' | CLRBUF | 03C3' | CLRFPN | 03CD' | CLRMEM | 03D4* |
| CLRMM2 | 03CA* | CNTLN | 000E | CNTLP | 0010 | CNTLT | 0014 |
| COMP | 0027' | CONV | 037E' | CURFLN | 0000* | DIGIT | 000D |
| DIV0 | 05E2' | DIV1 | 05E4' | DIV3 | 05E8' | DIV4 | 05EE' |
| DIV5 | 0635' | DIV6 | 0645' | DIV7 | 0646' | DLA | 00FC |
| DNA | 001F | DOWNA | 001F | DRA | 00FD | ECNT | 0722' |
| EFIELD | 005D | ENDAPP | 0A33I' | ENT1 | 0108' | ENTER | 000D |
| ENTR2 | 0105' | EOF | 00FF | EPOS | 01A9' | ERR005 | 070B' |
| ERRI | 0A20' | ERROR | 0704' | ESC | 0018 | EXC2 | 013C' |
| EXC3 | 0147' | EXC4 | 0141' | EXCON | 0126' | EXP | 0A30' |
| EXPC1 | 065D' | EXPC2 | 066A' | EXPC3 | 066E' | EXPCK | 0652' |
| EXPD | 09BD' | EXPO | 0750' | F1 | 0001 | F2 | 0002 |
| FD11 | 05C9' | FES | 0751' | FFIELD | 007D | FIX | 01F5' |
| FIX2 | 0201' | FIXE | 017D' | FMOVR | 04BC' | FMU10 | 053E' |
| FMU11 | 054D' | FMU12 | 055B' | FMU14 | 0563' | FMU15 | 058F' |
| FMU16 | 05A9' | FMU17 | 0574' | FMU18 | 0585' | FMUL1 | 04BF' |
| FMUL2 | 04D3' | FMUL3 | 04E5' | FMUL4 | 04F1' | FMUL5 | 04FC' |
| FMUL6 | 0511' | FMUL7 | 051D' | FMUL8 | 052D' | FMUL9 | 0531' |
| FNF | 008E | FP123 | 000D | FPADD | 03D7' | FPDIV | 05B0' |
| FPDIV5 | 05C5' | FPERR | 0179' | FPIN | 005B' | FPIN1 | 0094' |
| FPMUL | 04A7' | FPN1 | 0903' | FPN2 | 092F' | FPN3 | 0959' |
| FPNIB | 001A | FPNON | 01C2' | FPOUT | 01C3' | FPRNT | 02AD' |
| FPSIZ | 000F | FPSUB | 042F' | FSIGN | 0723' | HOLD1 | 09AF' |
| HOLD2 | 09BD' | HOLD3 | 09CB' | HOLD4 | 09D9' | HOLD5 | 09E7' |
| HOLD6 | 09F5' | HOLD7 | 0A03' | HOLD8 | 0A11' | IBSCN | 00F1' |
| INFES | 0752' | INSA | 0755' | LA | 001C | LEF1 | 06E3' |
| LEF2 | 06EC' | LEF3 | 06F7' | LEF4 | 06F9' | LEFT | 06DE' |
| LEFTA | 001C | LESS1 | 0284' | LOAD | 0694' | LOAD1 | 069A' |
| LPOS | 01AE' | MADD | 0000I' | MATH | 0000I' | MAXLN | 0753' |
| MDIV | 001BI' | MINRW | 00E5 | MMUL | 0012I' | MSUB | 0009I' |
| NDEC | 0335' | NEG | 039A' | NMCHK | 00FE' | NRND | 02D3' |
| NRND1 | 02D8' | NXT | 01D7' | OPBSE | 0028 | OPST | 0720' |
| OPSTR | 0721' | PACK | 00C0' | PACK1 | 00C5' | PLSRW | 00E3 |
| PO2 | 02CC' | POSIT | 0318' | POSR | 02C0' | PREP | 002E' |
| PRI21 | 02EB' | PRIN2 | 02E8' | PRIN4 | 0302' | PRIN5 | 0311' |
| RA | 001D | RADIX | 03A9' | RCTRL | 0A31' | RDIGI | 0A32' |
| RIGH1 | 06BA' | RIGH2 | 06C6' | RIGH3 | 06D1' | RIGH4 | 06D3' |
| RIGHT | 06BB' | RIGHTA | 001D | ROUND | 0271' | SACTRL | 0064 |
| SARCV | 0060 | SATX | 0061 | SBCTRL | 0065 | SBNDEC | 0015 |
| SBNHEX | 0018 | SBRCV | 0062 | SBTX | 0063 | SCAN0 | 0070' |
| SCAN5 | 0099' | SCAN6 | 00A3' | SCANC | 006A' | SCANG | 0073' |
| SCANP | 0073' | SCANX | 00AB' | SCLOSE | 002A | SCLRXT | 0039 |
| SCROLL | 0018 | SCURSR | 001A | SDATE | 002D | SDELAY | 0006 |
| SDIRRD | 0023 | SDIRWR | 002C | SDSCMD | 0025 | SDSKID | 000F |
| SERMSG | 0034 | SERROR | 0027 | SFIELD | 007B | SFLPTR | 003A |
| SHLDKY | 001D | SIGN | 0A2F' | SIGND | 09BC' | SINTIO | 0000 |

```
SJPOOS  0024   SKBCHR  0004   SKBINT  0001   SKBLIN  0005
SKILL   0029   SLOCAT  0021   SLOKUP  001C   SMPYDV  0017
SOPEN   0028   SPACE   0020   SPARSR  0030   SPRCHR  0012
SPRCTL  005F   SPRINT  0011   SPRLIN  0013   SRAMDR  0035
SRANDM  0014   SRONXT  0022   SRNAME  002F   SRS232  0037
SRTCMD  0026   SSORT   0038   SSTBRK  0003   SSTCMP  0016
SSTSCN  0031   SSTUSR  0002   STIMER  0019   STOR1   06AF'
STORE   06AA'  STORO   06AD'  SUB1    0496'  SVDCHR  0008
SVDGRF  000A   SVDINT  0007   SVDKEY  000C   SVDLIN  0009
SVDRAM  005E   SVORED  000B   SWILD   0033   SWRNXT  002B
TAB     0009   TOP     00D6'  TRAIL   0295'  TRL2    0299'
TRL3    02A0'  UPA     001E   VCOP1   03B8'  VCOPY   0399'
WFIELD  007E   X021    0364'  XFERB3  0389'  XFERCH  03AE'
XN1     024B'  XN2     0262'  XNEG    0246'  X03     0373'
X04     0376'  XOUT    0350'  XOUT2   0354'  XPRI2   032F'
XPRI3   034B'  XPRIN   0326'  XSIGN   074F'  XXADD   041C'
XXSUB   0491'  ZEREX   0418'  ZERO    039F'  ZRO     0206'
ZZ2     0189'

No  Fatal error(s)

;****************************************************************
;
;THIS IS AUTOGRAMMER. WRITTEN BY RON BURTA
;
;LAST REVISION DATE:  5/08/1982    3:10 PM
;
;****************************************************************
;
;
        TITLE   AUTOGRAMMER LEVEL 1  V 1  CONFIDENTIAL PROPERTY  OF ROKLAN CORP.
;
        SUBTTL  AUTOGR/ASM 5/8/1982 WRITTEN BY RON BURTA (ALL RIGHTS RESERVED)
;
;
        EXTRN   APRSCN,APPNME,FLDTBL,KBCHAR,KBLINE,VDINIT,VDGRAF
        EXTRN   VDCHAR,VDLINE,VDLN2,LOCATE,READNX,DIRRD,CLOSE
        EXTRN   WRITNX,DIRWR,OPEN,ENDPR5,BRKSET,APPLIC,ENDAPP
        EXTRN   FNDFLC,SCNPRT,EDHPSC,GRHPSC,INCHAR,MLTPLY,CLRMM2
        EXTRN   VALOFF,VALIDS,FLDVAL,END999,ENDCRE,INAUTO
        EXTRN   DCB1,PL1,FBUF1,RBUF1,DCB2,PL2,FBUF2,RBUF2,CLRMEM
        EXTRN   GRAMT,CLRDC1,CLRDC2,ENDA09,DELAY,VIDRAM,VIDRO5
        EXTRN   RAMVID,CLR24,DSMEN2,SAVCUR,RESCUR,DBRECL
;
;       .XLIST
;******************************************************************
;
;       THESE ARE THE CHARACTER EQUATES
;
;******************************************************************
;
```

```
0000    00700  HOLD     EQU  0        ;HOLD KEY
0001    00720  F1       EQU  1        ;FUNCTION 1 KEY
0002    00740  F2       EQU  2        ;FUNCTION 2 KEY
0002    00760  CNTLB    EQU  2        ;CONTROL B
0003    00780  BREAK    EQU  3        ;BREAK KEY
0003    00800  CNTLC    EQU  3        ;CONTROL C
0004    00820  CNTLD    EQU  4        ;CONTROL D
0005    00840  CNTLE    EQU  5        ;CONTROL E
0006    00860  CNTLF    EQU  6        ;CONTROL F
0007    00880  CNTLG    EQU  7        ;CONTROL G
0008    00900  BCKSP    EQU  8        ;BACKSPACE
0008    00920  CNTLH    EQU  8        ;CONTROL H
0009    00940  TAB      EQU  9        ;TAB KEY
0009    00960  CNTLI    EQU  9        ;CONTROL I
000A    00980  CNTLJ    EQU  10       ;CONTROL J
000B    01000  CNTLK    EQU  11       ;CONTROL K
000C    01020  CNTLL    EQU  12       ;CONTROL L
000D    01040  CNTLM    EQU  13       ;CONTROL M
000D    01060  ENTER    EQU  13       ;ENTER KEY
000E    01080  CNTLN    EQU  14       ;CONTROL N
000F    01100  CNTLO    EQU  15       ;CONTROL O
0010    01120  CNTLP    EQU  16       ;CONTROL P
0011    01140  CNTLQ    EQU  17       ;CONTROL Q
0012    01160  CNTLR    EQU  18       ;CONTROL R
0013    01180  CNTLS    EQU  19       ;CONTROL S
0014    01200  CNTLT    EQU  20       ;CONTROL T
0015    01220  CNTLU    EQU  21       ;CONTROL U
0016    01240  CNTLV    EQU  22       ;CONTROL V
0017    01260  CNTLW    EQU  23       ;CONTROL W
0018    01280  CNTLX    EQU  24       ;CONTROL X
0019    01300  CNTLY    EQU  25       ;CONTROL Y
001A    01320  CNTLZ    EQU  26       ;CONTROL Z
001B    01340  ESC      EQU  27       ;ESCAPE KEY
001C    01360  LEFTA    EQU  28       ;LEFT ARROW KEY
001D    01380  RIGHTA   EQU  29       ;RIGHT ARROW KEY
001E    01400  UPA      EQU  30       ;UP ARROW KEY
001F    01420  DOWNA    EQU  31       ;UP ARROW KEY
0020    01440  SPACE    EQU  32       ;SPACE BAR
007C    01460  CNTL0    EQU  124      ;CONTROL 0
007E    01480  CNTL6    EQU  126      ;CONTROL 6
000D    01500  RETURN   EQU  ENTER
0050    01520  LINMAX   EQU  80       ;MAXIMUM LINE LENGTH
00FC    01540  DLA      EQU  252      ;DISPLAY CHARACTER FOR CURSOR LEFT
00FD    01560  DRA      EQU  253      ;DISPLAY CHAR FOR CURSOR RIGHT
00FE    01580  DUA      EQU  254      ;DISPLAY CHAR FOR CURSOR UP
00FF    01600  DDA      EQU  255      ;DISPLAY CHAR FOR CURSOR DOWN
00F9    01620  NORMAL   EQU  249      ;SET NORMAL VIDEO, GRAPHICS MODE
00FA    01640  REVERSE  EQU  250      ;SET REVERSE VIDEO, GRAPHICS MODE
0050    01660  LINLGH   EQU  LINMAX   ;LINE LENGTH
00FF    01680  EOF      EQU  255      ;END OF FILE MARKER
0000    01700  EOV      EQU  0        ;END OF VALIDATIONS MARKER
```

```
0018                ROWMAX  EQU     24              ;MAMIMUM NUMBER OF ROWS
                    ;
                    ;START / FINISH INDICATE A NON-PROMPTED FIELD
                    ;BEGINNING / END INDICATE A PROMPTED FIELD
                    ;
005B                BFIELD  EQU     91              ;BEGINNING OF FIELD MARKER
007B                SFIELD  EQU     123             ;ALSO BEGINNING OF FIELD, BUT NON-PROMPTED
007E                WFIELD  EQU     126             ;WHOLE FIELD MARKER (1 CHARACTER FIELD)
005D                EFIELD  EQU     93              ;END OF FIELD MARKER
007D                FFIELD  EQU     125             ;ALSO END OF FIELD, BUT NON-PROMPTED
00FB                STCFLD  EQU     SFIELD+128      ;START OF COMPUTED FIELD

00FD                ECFLD   EQU     FFIELD+128      ;END OF COMPUTED FIELD
                    ;
                            .LIST
                            ENTRY   DATAGRAM
                    ;
0000'               DATAGRAM:
0000'   3E 00               LD      A,0
0002'   32 0000*            LD      (DSMEN2),A      ;DISABLE APPLIC
0005'   32 1145'            LD      (NSCFFD),A      ;NON-STORE FLAG
0008'   3E FF               LD      A,EOF
000A'   32 0000*            LD      (GRAMT),A
000D'   CD 0000*            CALL    INAUTO
0010'   CD 0000*            CALL    BRKSET
0013'   21 044A'            LD      HL,STTMSG       ;SIGN ON MESSAGE
0016'   0E 00               LD      C,0
0019'   46                  LD      B,(HL)
0019'   23                  INC     HL
001A'   CD 0000*            CALL    VDLINE
001D'   01 1388             LD      BC,5000
0020'   CD 0000*            CALL    DELAY
0023'   CD 0E98'            CALL    BUFSET
0026'   CD 0000*            CALL    CLRDC1
0029'   CD 0000*            CALL    CLRDC2
002C'   CD 0085'            CALL    INITSC          ;INITIALIZE SCREEN
002F'               DATA4:
002F'   CD 00D9'            CALL    GETIFN
0032'   FE FF               CP      EOF
0034'   28 F9               JR      Z,DATA4
0036'   CD 0821'            CALL    GETOFN
0039'               DATA5:
0039'   CD 0EA6'            CALL    KBINIT
003C'   CD 0000*            CALL    CLR24
003F'   01 0000             LD      BC,0
0042'   16 0C               LD      D,0
0044'   CD 0000*            CALL    VDGRAF
0047'   CD 091D'            CALL    CLRDL1
004A'               EDITOR:
004A'   CD 0000*            CALL    SAVCUR
004D'   21 076C'            LD      HL,SECMSG
0050'   CD 0654'            CALL    CLRPRT
```

```
0053'  CD 0000*        CALL    RESCUR
0056'          EDITO2:
0056'  CD 012D'        CALL    GCURSR
0059'  CD 0000*        CALL    KBCHAR
005C'  78              LD      A,B
005D'  B7              OR      A               ;SET FLAGS
005E'  28 F6           JR      Z,EDITO2        ;LOOP TIL CHAR AVAILABLE
0060'  C5              PUSH    BC              ;SAVE CHAR
0061'  21 0FF9'        LD      HL,EDITCH       ;EDITOR CHARACTER TABLE
0064'  CD 0EE9'        CALL    LOOKUP
0067'  C1              POP     BC
0068'  20 0A           JR      NZ,EDITR5
006A'  CD 0000*        CALL    SAVCUR
006D'  CD 0000*        CALL    CLR24
0070'  CD 0000*        CALL    RESCUR
0073'  E9              JP      (HL)            ;GOTO PROCESSING ROUTINE
0074'          EDITR5:
0074'  78              LD      A,B
0075'  32 0EFE'        LD      (GRCHAR),A
0078'  CD 012D'        CALL    GCURSR
007B'  16 01           LD      D,1
007D'  21 0EFE'        LD      HL,GRCHAR       ;LOCATION OF BUFFER
0080'  CD 0000*        CALL    VDGRAF          ;DISPLAY BUFFER
0083'  18 D1           JR      EDITO2
               ;
               ;INITIALIZE THE VIDEO SCREEN TO 23 PROTECTED LINES
0085'          INITSC:
0085'  06 1E           LD      B,1EH           ;HOME CURSOR,CLEAR SCREEN
0087'  CD 0000*        CALL    VDCHAR
008A'  06 17           LD      B,23            ;PROTECT 23 LINES
008C'  CD 0EC2'        CALL    SETSCR          ;SET SCROLL MODE
008F'  06 14           LD      B,CNTLT         ;HOME CURSOR IN LINE 24
0091'  CD 0000*        CALL    VDCHAR
0094'  C9              RET
               ;
               ;SAVE SCREEN IMAGE AS DATA BASE DESCRIPTOR
0095'          SDATAD:
0095'  21 0882'        LD      HL,SSDPL1
0098'  CD 0874'        CALL    COMPL1          ;COMPLETE PARAMETER LIST
009B'  CD 0000*        CALL    CLR24
009E'  CD 0917'        CALL    PRIDDM          ;INSERT DISK MESSAGE
00A1'  11 0000*        LD      DE,DCB1         ;USE CONTROL BLOCK 1
00A4'  21 0000*        LD      HL,PL1          ;USE PARAMETER LIST 1
00A7'  CD 0000*        CALL    OPEN            ;OPEN A FILE
00AA'  CD 0000*        CALL    CLR24           ;CLEAR LINE 24 BEFORE SAVE
00AD'  CD 0000*        CALL    VIDRAM          ;TRANSFER FROM VIDEO TO RAM
00B0'  21 065F'        LD      HL,CDDMSG
00B3'  CD 0654'        CALL    CLRPRT
00B6'  01 0780         LD      BC,1920         ;LENGTH OF SCREEN
00B9'  21 0000*        LD      HL,APRSCN       ;POINT TO BEGGINING OF DATA
00BC'          SDATA5:
00BC'  7E              LD      A,(HL)          ;GET CHAR FROM MEMORY
```

```
00BD'   32 0000*            LD      (RBUF1),A       ;PUT IT IN RECORD BUFFER
00C0'   E5                  PUSH    HL              ;SAVE MEMORY POINTER
00C1'   C5                  PUSH    BC              ;SAVE BYTE COUNTER
00C2'   11 0000*            LD      DE,DCB1         ;USE CONTROL BLOCK 1
00C5'   CD 0000*            CALL    WRITNX          ;WRITE NEXT RECORD
00C8'   C1                  POP     BC
00C9'   E1                  POP     HL
00CA'   23                  INC     HL              ;ADVANCE MEMORY POINTER
00CB'   0B                  DEC     BC              ;ONE LESS BYTE
00CC'   79                  LD      A,C             ;GET LOW BYTE OF COUNTER
00CD'   B0                  OR      B               ;OR IT WITH HIGH BYTE
00CE'   28 02               JR      Z,SDATA6
00D0'   18 EA               JR      SDATA5
00D2'                SDATA6:
00D2'   11 0000*            LD      DE,DCB1
00D5'   CD 0000*            CALL    CLOSE
00D8'   C9                  RET
                     ;
                     ;
                     ;GET INPUT FILENAME
                     ;
00D9'                GETIFN:
00D9'   21 06AD'            LD      HL,EIAMSG       ;ENTER INPUT APPL. MESSG
00DC'   CD 0839'            CALL    INFILN          ;PRINT MESSG. GET FILENAME
00DF'   FE 0D               CP      ENTER           ;NO INPUT FILE ?
00E1'   C8                  RET     Z               ;THEN RETURN
00E2'   CD 0862'            CALL    FNDRET          ;FIND END OF FILENAME
00E5'   21 06F3'            LD      HL,DBDESC       ;COMPLETION OF FILESPEC
00E8'   CD 086C'            CALL    COMFLS          ;COMPLETE ACTUAL FILESPEC
00EB'   21 088D'            LD      HL,RSDPL1       ;POINT TO READ SCRN PARAMETER LIST
00EE'   CD 0874'            CALL    COMPL1          ;COMPLETE PARAMETER LIST
00F1'   CD 0908'            CALL    PRISDM          ;PRINT INSERT SOURCE DISK
00F4'   11 0000*            LD      DE,DCB1         ;USE DCB1
00F7'   21 0000*            LD      HL,PL1          ;AND PARAMETER LIST 1
00FA'   CD 0000*            CALL    OPEN            ;OPEN FILE FOR READING
00FD'   FE FF               CP      EOF
00FF'   C8                  RET     Z
0100'   01 0780             LD      BC,1920         ;LENGTH OF FILE
0103'   21 0000*            LD      HL,APRSCN       ;INPUT BUFFER
0106'                GETIN5:
0106'   E5                  PUSH    HL              ;SAVE MEMORY POINTER
0107'   C5                  PUSH    BC              ;SAVE BYTE COUNTER
0108'   11 0000*            LD      DE,DCB1         ;USE CONTROL BLOCK 1
010B'   CD 0000*            CALL    READNX          ;READ NEXT RECORD
010E'   C1                  POP     BC
010F'   E1                  POP     HL
0110'   3A 0000*            LD      A,(RBUF1)
0113'   77                  LD      (HL),A
0114'   23                  INC     HL
0115'   0B                  DEC     BC              ;ONE LESS TO READ
0116'   79                  LD      A,C             ;GET LOW BYTE
0117'   B0                  OR      B               ;OR IT WITH HIGH BYTE
```

```
0118'  20 EC              JR      NZ,GETIN5       ;LOOP TIL ALL DONE
011A'  11 0000*           LD      DE,DCB1         ;ALL DONE
011D'  CD 0000*           CALL    CLOSE           ;CLOSE FILE
0120'  CD 0000*           CALL    RAMVID          ;TRANSFER FROM RAM TO SCREEN
0123'  C9                 RET
                  ;
                  ;
                  ;INCREMENT ROW/COLUMN IN BC, MODULO 80
                  ;
0124'             SINCRC:
0124'  0C                 INC     C
0125'  79                 LD      A,C
0126'  FE 50              CP      80
0128'  C0                 RET     NZ
0129'  0E 00              LD      C,0
012B'  04                 INC     B
012C'  C9                 RET
                  ;
                  ;GET CURRENT CURSOR POSITION IN BC, PREVENT USE OF LINE 24
                  ;
012D'             GCURSR:
012D'  16 00              LD      D,0
012F'  CD 0EAA'           CALL    VDREAD          ;GET CURRENT CURSOR POSITION
0132'  78                 LD      A,B
0133'  FE 17              CP      23
0135'  C0                 RET     NZ
0136'  06 00              LD      B,0
0138'  16 00              LD      D,0
013A'  CD 0000*           CALL    VDGRAF
013D'  C9                 RET
                  ;
                  ;CENTER THE TEXT ON THE SCREEN, USE LINE THAT CURSOR IS CURENTLY ON
                  ;
013E'             CENTER:
013E'  CD 091D'           CALL    CLRDL1
0141'  CD 012D'           CALL    GCURSR
0144'  0E 00              LD      C,0             ;SET COLUMN TO 0,RETAIN LINE
0146'  21 0F51'           LD      HL,DLBUFF       ;POINT TO LINE BUFFER
0149'  16 50              LD      D,LINMAX        ;SET LINE LENGTH
014B'  CD 0EAA'           CALL    VDREAD          ;READ LINE FROM SCREEN TO BUFFER
014E'  3E 20              LD      A,SPACE         ;SEARCH CHARACTER
0150'  21 0F51'           LD      HL,DLBUFF       ;POINT TO LINE BUFFER
0153'  CD 0196'           CALL    SEARCH          ;E=NUMBER OF BLANKS AT BEGINNING
0156'  7B                 LD      A,E
0157'  FE 50              CP      80
0159'  C8                 RET     Z
015A'  D5                 PUSH    DE              ;SAVE E
015B'  21 0FA1'           LD      HL,DLBUFF+80    ;POINT TO END OF LINE
015E'  3E 20              LD      A,SPACE
0160'  CD 01AA'           CALL    UNSEAR          ;SEARCH BACKWARD
0163'  7B                 LD      A,E             ;A=NUMBER OF BLANKS AT END
0164'  D1                 POP     DE
```

```
0165'  83                   ADD    A,E          ;ADD BEGINNING TO END
0166'  37                   SCF                 ;SET CARRY FLAG
0167'  3F                   CCF                 ;RESET CARRY FLAG
0168'  1F                   RRA                 ;DIVIDE BY TWO
0169'  93                   SUB    E
016A'  C8                   RET    Z
016B'  F2 017B'             JP     P,MOVRG
016E'  21 0F51'             LD     HL,DLBUFF
0171'  2F                   CPL
0172'  3C                   INC    A
0173'              MOVL5:
0173'  23                   INC    HL
0174'  3D                   DEC    A            ;COUNTER = +1
0175'  CA 0186'             JP     Z,CNC99      ;ALL DONE
0178'  C3 0173'             JP     MOVL5        ;KEEP MOVING
017B'              MOVRG:
017B'  21 0F51'             LD     HL,DLBUFF    ;POINT TO BEGINNING OF BUFFER
017E'              MOVR5:
017E'  3D                   DEC    A
017F'  2B                   DEC    HL           ;MOVE TEXT FORWARD
0180'  CA 0186'             JP     Z,CNC99      ;ALL DONE
0183'  C3 017E'             JP     MOVR5
0186'              CNC99:
0186'  16 00                LD     D,0
0188'  CD 0EAA'             CALL   VDREAD       ;C=COLUMN, B=ROW
018B'  0E 00                LD     C,0          ;SET TO BEGINNING OF LINE
018D'  16 50                LD     D,LINMAX     ;SET LINE LENGTH
018F'  CD 0E37'             CALL   SDGRAF       ;PRINT LINE
0192'              CNC100:
0192'  CD 091D'             CALL   CLRDL1
0195'  C9                   RET
                   ;
                   ;
                   ;SEARCH FOR THE FIRST NON-BLANK CHARACTER, E RETURNS NUMBER OF BLANKS
                   ;
0196'              SEARCH:
0196'  1E 00                LD     E,0
0198'              S5:
0198'  56                   LD     D,(HL)       ;GET CHARACTER
0199'  8A                   CP     D            ;COMPARE TO A (SPACE)
019A'  C0                   RET    NZ           ;NOT A SPACE, SO RETURN
019B'  1C                   INC    E            ;INCREMENT SPACE COUNTER
019C'  F5                   PUSH   AF
019D'  7B                   LD     A,E
019E'  FE 50                CP     80
01A0'  CA 01A8'             JP     Z,S6
01A3'  F1                   POP    AF
01A4'  23                   INC    HL
01A5'  C3 0198'             JP     S5
01A8'              S6:
01A8'  F1                   POP    AF
01A9'  C9                   RET
```

```
01AA'                     ;
01AA'                     UNSEAR:
01AA'   1E 00                     LD      E,0
01AC'                     UN5:
01AC'   56                        LD      D,(HL)          ;GET CHARACTER
01AD'   BA                        CP      D               ;COMPARE TO A (SPACE)
01AE'   C0                        RET     NZ              ;NO SPACES
01AF'   1C                        INC     E
01B0'   2B                        DEC     HL
01B1'   C3 01AC'                  JP      UN5
                          ;
                          ;
                          ;MOVE CURSOR TO BEGINNING OF CURRENT
                          ;;
01B4'                     BLINE:
01B4'   16 00                     LD      D,0
01B6'   CD 0EAA'                  CALL    VDREAD          ;GET CURRENT CURSOR POSITION
01B9'   0E 00                     LD      C,0             ;SET COLUMN TO 0
01BB'   16 00                     LD      D,0
01BD'   CD 0000*                  CALL    VDGRAF          ;SET CURSOR ON SCREEN
01C0'   C9                        RET
                          ;
                          ;
                          ;THIS SECTION BEGINS THE FIELD VALIDATION INPUTS
                          ;
                          ;FIRST CHECK THE VALIDITY OF THE FIELDS
                          ;
01C1'                     FLDCHK:
01C1'   06 19                     LD      B,CNTLY
01C3'   CD 0000*                  CALL    VDCHAR
01C6'   21 0000*                  LD      HL,VALIDS
01C9'   22 0000*                  LD      (VALOFF),HL
01CC'   21 0000*                  LD      HL,FLDTBL
01CF'   22 0FF4'                  LD      (FLDTBP),HL
01D2'   3E 00                     LD      A,0
01D4'   32 0EED'                  LD      (FLDCNT),A      ;SET FIELD COUNTER TO ZERO
01D7'   32 0000*                  LD      (DBRECL),A      ;RESET RECORD LENGTH IN PAR LIST
01DA'   32 1144'                  LD      (MAXRCL),A
01DD'   21 0630'                  LD      HL,CHFMSG
01E0'   CD 0654'                  CALL    CLRPRT
01E3'   01 0000                   LD      BC,00
01E6'                     FLD05:
01E6'   CD 0274'                  CALL    FNDFLD          ;FIND A FIELD
01E9'   7A                        LD      A,D             ;CHECK ERROR FLAG
01EA'   FE FF                     CP      0FFH            ;ERROR ?
01EC'   CA 004A'                  JP      Z,EDITOR        ;GIVE OPERATOR ANOTHER CHANCE
01EF'   FE 8E                     CP      08EH
01F1'   28 17                     JR      Z,FLD04
01F3'   3A 1144'                  LD      A,(MAXRCL)
01F6'   FE FF                     CP      EOF
01F8'   CA 03E9'                  JP      Z,RLTL2
01FB'   7B                        LD      A,E             ;GET FIELD LENGTH
```

```
01FC'  FE 00                     CP    0            ;NO LENGTH ?
01FE'  CA 0259'                  JP    Z,FLD99      ;FINISHED CHECKING FIELDS
0201'  3A 0000*                  LD    A,(DBRECL)   ;GET CURRENT RECORD LENGTH
0204'  83                        ADD   A,E          ;ADD FOR TOTAL LENGTH
0205'  DA 03DD'                  JP    C,RLTL       ;LENGTH >255,POSSIBLE ERROR
0208'  18 03                     JR    FLD06
020A'                    FLD04:
020A'  3A 0000*                  LD    A,(DBRECL)
020D'                    FLD06:
020D'  32 0000*                  LD    (DBRECL),A   ;SAVE NEW LENGTH
0210'  7B                        LD    A,E
0211'  32 0FF8'                  LD    (FLDLEN),A
0214'  3A 0EED'                  LD    A,(FLDCNT)   ;GET FIELD COUNT
0217'  3C                        INC   A
0218'  DA 03F3'                  JP    C,FCTM       ;FIELD > 256 , ERROR
021B'  32 0EED'                  LD    (FLDCNT),A
021E'  2A 0FF4'                  LD    HL,(FLDTBP)  ;GET FIELD TABLE POINTER
0221'  77                        LD    (HL),A       ;SAVE FIELD NUMBER
0222'  23                        INC   HL
0223'  C5                        PUSH  BC
0224'  ED 4B 0FF6'               LD    BC,(FLDLOC)  ;ROW/COLUMN
0228'  70                        LD    (HL),B       ;SAVE ROW/COLUMN
0229'  23                        INC   HL
022A'  71                        LD    (HL),C
022B'  23                        INC   HL
022C'  C1                        POP   BC
022D'  3A 0FF8'                  LD    A,(FLDLEN)   ;FIELD LENGTH
0230'  77                        LD    (HL),A       ;SAVE LENGTH
0231'  23                        INC   HL
0232'  ED 5B 0000*               LD    DE,(VALOFF)
0236'  73                        LD    (HL),E       ;VALIDATION POINTER LSB
0237'  23                        INC   HL
0238'  72                        LD    (HL),D
0239'  23                        INC   HL
023A'  22 0FF4'                  LD    (FLDTBP),HL  ;SAVE POINTER FOR NEXT TIME
023D'  13                        INC   DE
023E'  3A 1145'                  LD    A,(NSCFFD)
0241'  FE FF                     CP    EOF
0243'  20 08                     JR    NZ,FLD07
0245'  3E 00                     LD    A,0
0247'  32 1145'                  LD    (NSCFFD),A
024A'  3E 01                     LD    A,1
024C'  12                        LD    (DE),A
024D'                    FLD07:
024D'  13                        INC   DE
024E'  13                        INC   DE
024F'  13                        INC   DE
0250'  13                        INC   DE
0251'  13                        INC   DE
0252'  ED 53 0000*               LD    (VALOFF),DE
0256'  C3 01E6'                  JP    FLD05        ;LOOP
                         ;
```

```
                        ;AT THIS POINT ALL FIELDS ARE VALID
                        ;IT IS NOW NECESSARY TO GET THE INPUT VALIDATIONS
                        ;
0259'                   FLD99:
0259'  21 0641'                 LD      HL,FVDMSG       ;FIELDS VALID MESSAGE
025C'  CD 0654'                 CALL    CLRPRT          ;CLEAR LINE 24 AND PRINT
025F'  2A 0FF4'                 LD      HL,(FLDTBP)
0262'  36 FF                    LD      (HL),EOF
0264'  23                       INC     HL
0265'  22 0FF4'                 LD      (FLDTBP),HL
0268'  01 07D0                  LD      BC,2000
026B'  CD 0000*                 CALL    DELAY
026E'  CD 0095'                 CALL    SDATAD
0271'  C3 0A5A'                 JP      INFVAL          ;INPUT VALIDATIONS
                        ;
                        ;
                        ;FIND THE NEXT FIELD ON SCREEN, CHECKING FOR ERRORS. ON EXIT E=LENGTH
                        ;OF FIELD, D=FF IF ERROR. IF E=0 THEN END OF SCREEN FOUND WITHOUT
                        ;FINDING ANOTHER FIELD.  IF AN ERROR HAS OCCURED THE OFFENDING CHAR
                        ;IS NOW IN INVERSE VIDEO AND AN ERROR MESSAGE HAS BEEN PRINTED
                        ;ON VIDEO. AFTER PRESSING ANY KEY, THE ERROR MESSAGE DISAPPEARS
                        ;AND THE OPERATOR CAN FIX THE ERROR
                        ;
0274'                   FNDFLD::
0274'                   FND05:
0274'  11 0100                  LD      DE,100H         ;ONE CHAR BUFFER
0277'  21 0F51'                 LD      HL,DLBUFF       ;BUFFER POINTER
027A'  C5                       PUSH    BC
027B'  CD 0EAA'                 CALL    VDREAD          ;GET CHAR
027E'  C1                       POP     BC
027F'  21 0F51'                 LD      HL,DLBUFF
0282'  7E                       LD      A,(HL)          ;MOVE CHAR TO A
0283'  FE 5B                    CP      BFIELD          ;BEGINNING OF FIELD ?
0285'  CA 02D8'                 JP      Z,FNDBEG        ;FOUND BEGINNING
0288'  FE 7B                    CP      SFIELD          ;START OF FIELD ?
028A'  CA 02E2'                 JP      Z,FNDSTR        ;FOUND START OF NON PROMPTED FIELD
028D'  FE FB                    CP      STCFLD          ;START OF COMPUTED FIELD ?
028F'  CA 02E2'                 JP      Z,FNDSTR
0292'  FE 7E                    CP      WFIELD          ;ONE CHAR FIELD ?
0294'  CA 02BC'                 JP      Z,FNDWHF        ;FOUND ONE CHAR FIELD
0297'  FE 5D                    CP      EFIELD          ;END OF FIELD
0299'  CA 0366'                 JP      Z,FNDERR        ;ERROR, FOUND END BEFORE BEGINNING
029C'  FE 7D                    CP      FFIELD          ;FINISH OF FIELD
029E'  CA 0366'                 JP      Z,FNDERR        ;ERROR, FOUND FINISH BEFORE START
02A1'  FE FD                    CP      ECFLD           ;END OF COMPUTED FIELD
02A3'  CA 0366'                 JP      Z,FNDERR
02A6'  0C                       INC     C               ;INCREMENT COLUMN
02A7'  79                       LD      A,C
02A8'  FE 50                    CP      80              ;END OF LINE ?
02AA'  C2 0274'                 JP      NZ,FND05        ;NOT END OF LINE LOOP
02AD'  0E 00                    LD      C,0             ;THIS LINE EMPTY, TRY NEXT
```

```
02AF°  04                  INC    B             ;INCREMENT ROW
02B0°  78                  LD     A,B
02B1°  FE 17               CP     23            ;IN CNTRL LINE ?
02B3°  CA 02B9°            JP     Z,FND07
02B6°  C3 0274°            JP     FND05         ;START IN NEXT LINE
02B9°               FND07:
02B9°  1E 00               LD     E,0           ;END OF SCREEN INDICATOR
02BB°  C9                  RET
                    ;
                    ;
                    ;FOUND ONE CHAR FIELD
                    ;
02BC°               FNDWHF:
02BC°  ED 43 0FF6°         LD     (FLDLOC),BC  ;SAVE LOCATION OF FIELD
02C0°  0C                  INC    C            ;INCREMENT COLUMN
02C1°  79                  LD     A,C
02C2°  FE 50               CP     80
02C4°  20 03               JR     NZ,FNDWH5
02C6°  0E 00               LD     C,0
02C8°  04                  INC    B
02C9°               FNDWH5:
02C9°  1E 01               LD     E,1          ;FIELD LENGTH
02CB°  7B                  LD     A,E
02CC°  32 0FF8°            LD     (FLDLEN),A   ;SAVE LENGTH
02CF°  16 00               LD     D,0          ;CLEAR ERROR FLAG
02D1°  78                  LD     A,B
02D2°  FE 17               CP     23
02D4°  CA 02B9°            JP     Z,FND07
02D7°  C9                  RET
                    ;
                    ;FIND THE END OF A FIELD
                    ;ON ENTRY BC POINTS TO NEXT CHAR ON SCREEN
                    ;
                    ;FOUND START OR BEGINNING, NOW FIND THE END
                    ;
02D8°               FNDBEG:
02D8°  1E 00               LD     E,0          ;FOUND BEGINNING OF PROMPTED FIELD
02DA°  03                  INC    BC           ;FIELD STARTS AFTER PTOMPT
02DB°  ED 43 0FF6°         LD     (FLDLOC),BC  ;SAVE STARTING LOCATION
02DF°  0B                  DEC    BC           ;TO KEEP STRAIGHT
02E0°  18 06               JR     FNB02
02E2°               FNDSTR:
02E2°  1E 01               LD     E,1          ;FOUND START OF NON-PROMPTED FIELD
02E4°  ED 43 0FF6°         LD     (FLDLOC),BC  ;SAVE STARTING LOCATION
02E8°               FNB02:
02E8°  79                  LD     A,C
02E9°  FE 50               CP     80
02EB°  CA 0339°            JP     Z,FNB07
02EE°  C3 02F2°            JP     FNB05
02F1°               FNB04:
02F1°  1C                  INC    E
02F2°               FNB05:
```

```
02F2'  0C              INC   C               ;INCREMENT COLUMN
02F3'  79              LD    A,C
02F4'  FE 50           CP    80
02F6'  CA 032E'        JP    Z,FNB06
02F9'  16 01           LD    D,1
02FB'  21 0F51'        LD    HL,DLBUFF       ;CHAR BUFFER
02FE'  C5              PUSH  BC
02FF'  CD 0EAA'        CALL  VDREAD          ;GET CHAR
0302'  C1              POP   BC
0303'  7E              LD    A,(HL)          ;MOVE IT TO A
0304'  21 0F51'        LD    HL,DLBUFF
0307'  FE 5D           CP    EFIELD          ;END OF PROMPTED FIELD?
0309'  CA 0357'        JP    Z,FNDEND        ;YES , PROCESS
030C'  FE 7D           CP    FFIELD          ;FINISH OF NON-PROMPTED FIELD ?
030E'  CA 0356'        JP    Z,FNDFIN        ;FOUND FINISH
0311'  FE FD           CP    ECFLD           ;END OF COMPUTED FIELD ?
0313'  CA 0343'        JP    Z,FNDECF
0316'  FE 5B           CP    BFIELD          ;CHECK FOR BEGINNING ERROR
0318'  CA 0366'        JP    Z,FNDERR        ;ERROR FOUND BEGINNING BEFORE END
031B'  FE 7B           CP    SFIELD          ;CHECK FOR START ERROR
031D'  CA 0366'        JP    Z,FNDERR        ;ERROR, FOUND START INSTEAD OF FINISH
0320'  FE 7E           CP    WFIELD          ;CHECK FOR 1 CHAR FIELD ERROR
0322'  CA 0366'        JP    Z,FNDERR        ;FOUND WHOLE FIELD ERROR
0325'  FE 20           CP    SPACE           ;CHECK FOR PRINTABLE CHARS
0327'  28 05           JR    Z,FNB06
0329'  3E 43           LD    A,"C"           ;CHARACTER ERROR
032B'  C3 0366'        JP    FNDERR
032E'            FNB06:
032E'  79              LD    A,C
032F'  FE 50           CP    80              ;END OF LINE ?
0331'  20 BE           JR    NZ,FNB04        ;NO, LOOP
0333'  78              LD    A,B             ;GET LINE NUMBER
0334'  FE 16           CP    22              ;BOTTOM LINE ?
0336'  CA 033E'        JP    Z,FNB75         ;END OF SCREEN ERROR
0339'            FNB07:
0339'  3E 4C           LD    A,"L"           ;LINE ERROR FLAG
033B'  C3 0366'        JP    FNDERR          ;TELL OPERATOR
033E'            FNB75:
033E'  3E 53           LD    A,"S"           ;SCREEN ERROR FLAG
0340'  C3 0366'        JP    FNDERR
                 ;
                 ;
0343'            FNDECF:
0343'  3E FF           LD    A,EOF
0345'  32 1145'        LD    (NSCFFD),A
0348'  1C              INC   E
0349'  16 8E           LD    D,8EH           ;SET COMPUTED FIELD FLAG
034B'  0C              INC   C               ;ADVANCE COLUMN COUNTER
034C'  79              LD    A,C
034D'  FE 50           CP    80              ;END OF LINE ?
034F'  28 01           JR    Z,DECF05        ;YEP
```

```
0351°  C9                    RET
0352°               DECF05:
0352°  04                    INC     B          ;ADVANCE ROW
0353°  0E 00                 LD      C,0        ;RESET COLUMN
0355°  C9                    RET
                    ;
                    ;
                    ;FOUND END OF FIELD
                    ;
0356°               FNDFIN:                     ;END OF NON-PROMPTED FIELD
0356°  1C                    INC     E
0357°               FNDEND:                     ;FOUND END OF PROMPTED FIELD
0357°  0C                    INC     C
0358°  79                    LD      A,C        ;PUT COLUMN COUNT IN A
0359°  FE 50                 CP      80         ;END OF LINE
035B°  28 03                 JR      Z,FNDEN9
035D°  16 00                 LD      D,0
035F°  C9                    RET
0360°               FNDEN9:
0360°  04                    INC     B          ;ADVANCE TO NEXT ROW
0361°  0E 00                 LD      C,0        ;FIRST COLUMN
0363°  16 00                 LD      D,0
0365°  C9                    RET
                    ;
                    ;
                    ;FOUND ERROR WHILE SEARCHING FOR VALID FIELD
                    ;
                    ;
0366°               FNDERR:
0366°  E6 7F                 AND     7FH
0368°  FE 5B                 CP      BFIELD     ;BEGINNING INSTEAD OF END
036A°  C2 0373°              JP      NZ,FERR5
036D°  21 0555°              LD      HL,BBEMSG  ;PRINT ERR MSG
0370°  C3 03FC°              JP      FND99
0373°               FERR5:
0373°  FE 7B                 CP      SFIELD     ;START INSTEAD OF FINISH ERROR
0375°  C2 037E°              JP      NZ,FERR6
0378°  21 0555°              LD      HL,BBEMSG
037B°  C3 03FC°              JP      FND99
037E°               FERR6:
037E°  FE 7E                 CP      WFIELD     ;WHOLE FIELD ERROR
0380°  C2 0389°              JP      NZ,FERR7
0383°  21 0582°              LD      HL,WFFMSG
0386°  C3 03FC°              JP      FND99
0389°               FERR7:
0389°  FE 4C                 CP      "L"        ;END OF LINE MESSAGE
038B°  C2 0394°              JP      NZ,FERR8
038E°  21 05B1°              LD      HL,EOLMSG
0391°  C3 03FC°              JP      FND99
0394°               FERR8:
0394°  FE 53                 CP      "S"        ;END OF SCREEN MESSAGE
0396°  C2 039F°              JP      NZ,FERR09
```

```
0399'  21 05D7'            LD      HL,EOSMSG
039C'  C3 03FC'            JP      FND99
                   ;
039F'              FERR09:
039F'  FE 43               CP      "C"          ;CHAR IN FIELD
03A1'  C2 03AA'            JP      NZ,FERR10
03A4'  21 0681'            LD      HL,CHRMSG
03A7'  C3 03FC'            JP      FND99
                   ;
                   ;
03AA'              FERR10:
03AA'  FE 5D               CP      EFIELD       ;END BEFORE BEGINNING ERROR
03AC'  C2 03B5'            JP      NZ,FERR11
03AF'  21 0528'            LD      HL,EBBMSG
03B2'  C3 03FC'            JP      FND99
                   ;
03B5'              FERR11:
03B5'  FE 7D               CP      FFIELD       ;FINISH BEFORE START ERROR
03B7'  C2 03C0'            JP      NZ,FERR12    ;
03BA'  21 0528'            LD      HL,EBBMSG    ;
03BD'  C3 03FC'            JP      FND99
                   ;
03C0'              FERR12:
03C0'  C3 004A'            JP      EDITOR
03C3'              DISERR:
03C3'  E1                  POP     HL
03C4'  F5                  PUSH    AF
03C5'  CD 0000*            CALL    CLR24        ;CLEAR LINE 24
03C8'  21 0F51'            LD      HL,DLBUFF    ;LINE BUFFER FOR INPUT
03CB'  F1                  POP     AF
03CC'  47                  LD      B,A
03CD'  3E 34               LD      A,SERMSG     ;DOS ERRMSG COMMAND
03CF'  CF                  RST     8            ;SUPERVISOR CALL
03D0'  21 0F51'            LD      HL,DLBUFF    ;POINT TO BEGINNING OF MESSAGE
03D3'  06 4E               LD      B,78         ;MAX MESSAGE LENGTH
03D5'  0E 00               LD      C,0
03D7'  CD 0000*            CALL    VDLINE       ;PRINT IT
03DA'  C3 004A'            JP      EDITOR
                   ;
03DD'              RLTL:
03DD'  FE 00               CP      0
03DF'  20 08               JR      NZ,RLTL2
03E1'  3E FF               LD      A,EOF
03E3'  32 1144'            LD      (MAXRCL),A
03E6'  C3 020D'            JP      FLD06
03E9'              RLTL2:
03E9'  0D                  DEC     C
03EA'  21 05FF'            LD      HL,RLTLMG    ;RECORD LENGTH ERROR
03ED'  CD 03FC'            CALL    FND99
03F0'  C3 004A'            JP      EDITOR
                   ;
03F3'              FCTM:
```

```
03F3'   21 0619'        LD      HL,FCTMSG       ;TOO MANY FIELDS
03F6'   CD 03FC'        CALL    FND99
03F9'   C3 004A'        JP      EDITOR
                ;
                ;
03FC'           FND99:
03FC'   CD 0436'        CALL    PERMSG          ;PRINT ERROR MESSAGE ON LINE 24
03FF'   C5              PUSH    BC
0400'   21 0F50'        LD      HL,DLBUFF-1     ;POINT ERROR CAUSING CHAR
0403'   F5              PUSH    AF
0404'   3E FA           LD      A,REVERSE
0406'   32 0F50'        LD      (DLBUFF-1),A    ;TO PRINT REVERSE
0409'   3E F9           LD      A,NORMAL
040B'   32 0F52'        LD      (DLBUFF+1),A    ;TO PRINT NORMAL
040E'   F1              POP     AF
040F'   16 00           LD      D,0
0411'   CD 0000*        CALL    VDGRAF
0414'   16 03           LD      D,3
0416'   CD 0000*        CALL    VDGRAF
0419'   C1              POP     BC
                ;LOOP TIL KEY IS PRESSED
041A'           FND100:
041A'   C5              PUSH    BC
041B'   C1              POP     BC
041C'   16 00           LD      D,0
041E'   CD 0000*        CALL    VDGRAF
0421'   C5              PUSH    BC
0422'           FND101:
0422'   CD 0000*        CALL    KBCHAR          ;CHECK KEYBOARD FOR CHAR
0425'   78              LD      A,B
0426'   B7              OR      A
0427'   CA 0422'        JP      Z,FND101
042A'   CD 0000*        CALL    CLR24           ;CLEAR ERROR MESSAGE
042D'   C1              POP     BC
042E'   16 00           LD      D,0
0430'   CD 0000*        CALL    VDGRAF
0433'   16 FF           LD      D,0FFH          ;SET ERROR FLAG
0435'   C9              RET
                ;
                ;
                ;ON ENTRY HL=MESSAGE
                ;
0436'           PERMSG:
0436'   C5              PUSH    BC              ;SAVE CURSOR POSITION
0437'   06 17           LD      B,23            ;SET LINE 24
0439'   16 00           LD      D,0
043B'   0E 00           LD      C,0             ;COLUMN 0
043D'   CD 0000*        CALL    VDGRAF          ;SET CURSOR POSITION
0440'   0E 00           LD      C,0             ;NO END CHAR
0442'   46              LD      B,(HL)          ;SET LINE LENGTH
0443'   05              DEC     B
0444'   23              INC     HL              ;POINT TO ACTUAL MESSAGE
```

```
0445'   CD 0000*            CALL    VDLINE          ;PRINT LINE TO VIDEO
0448'   C1                  POP     BC              ;RETREIVE CURSOR POSITION
0449'   C9                  RET
                    ;
                    ;
044A'   D4          STTMSG: DB      (ENDSTT-STTMSG)-1
044B'   1F 0D 0D 0D         DB      1FH,0DH,0DH,0DH,0DH,0DH,0DH,"           AUTOGRAMMER",0DH,"      AUTOmatic
ProGRAM GeneratER",0DH,0DH
044F'   0D 0D 0D 20
0453'   20 20 20 20
0457'   20 20 20 20
045B'   20 20 20 20
045F'   20 41 55 54
0463'   4F 47 52 41
0467'   4D 4D 45 52
046B'   0D 20 20 20
046F'   20 20 41 55
0473'   54 4F 6D 61
0477'   74 69 63 20
047B'   20 50 72 6F
047F'   47 52 41 4D
0483'   20 20 47 65
0487'   6E 65 72 61
048B'   74 45 52 0D
048F'   0D
0490'   20 20 20 20         DB      "       Written by Ron Borta",0DH,0DH,"         Copyright (C) (P) 1981",0
DH
0494'   20 20 20 20
0498'   20 20 57 72
049C'   69 74 74 65
04A0'   6E 20 62 79
04A4'   20 52 6F 6E
04A8'   20 42 6F 72
04AC'   74 61 0D 0D
04B0'   20 20 20 20
04B4'   20 20 20 20
04B8'   20 43 6F 70
04BC'   79 72 69 67
04C0'   68 74 20 28
04C4'   43 29 20 28
04C8'   50 29 20 31
04CC'   39 38 31 0D
04D0'   20 20 20 20         DB      "            by",0DH,"           Roklan Corp.",0DH,"        ALL
RIGHTS RESERVED",0DH
04D4'   20 20 20 20
04D8'   20 20 20 20
04DC'   20 20 20 20
04E0'   20 20 20 62
04E4'   79 0D 20 20
04E8'   20 20 20 20
04EC'   20 20 20 20
04F0'   20 20 20 20
```

```
04F4°  52 6F 63 6C
04F8°  61 6E 20 43
04FC°  6F 72 70 2E
0500°  0D 20 20 20
0504°  20 20 20 20
0508°  20 20 20 41
050C°  4C 4C 20 52
0510°  49 47 48 54
0514°  53 20 52 45
0518°  53 45 52 56
051C°  45 44 0D
051F°                ENDSTT:
                     ;
051F°  09            BL80:    DB     ENDBL8-BL80
0520°  20 20 20 20            DB     "         ",ENTER
0524°  20 20 20 0D
0528°                ENDBL8:
0528°  2D            EBBMSG:  DB          ENDEBB-EBBMSG
0529°  45 6E 64 20            DB     "End of field found instead of start of field"
052D°  6F 66 20 66
0531°  69 65 6C 64
0535°  20 66 6F 75
0539°  6E 64 20 69
053D°  6E 73 74 65
0541°  61 64 20 6F
0545°  66 20 73 74
0549°  61 72 74 20
054D°  6F 66 20 66
0551°  69 65 6C 64
0555°                ENDEBB:
0555°  2D            BBEMSG:  DB     ENDBBE-BBEMSG
0556°  53 74 61 72            DB     "Start of field found instead of end of field"
055A°  74 20 6F 66
055E°  20 66 69 65
0562°  6C 64 20 66
0566°  6F 75 6E 64
056A°  20 69 6E 73
056E°  74 65 61 64
0572°  20 6F 66 20
0576°  65 6E 64 20
057A°  6F 66 20 66
057E°  69 65 6C 64
0582°                ENDBBE:
0582°  2F            WFFMSG:  DB     ENDWFF-WFFMSG
0583°  4F 6E 65 20            DB     "One character field found within another field"
0587°  63 68 61 72
058B°  61 63 74 65
058F°  72 20 66 69
0593°  65 6C 64 20
0597°  66 6F 75 6E
059B°  64 20 77 69
059F°  74 68 69 6E
```

```
05A3'   20 61 6E 6F
05A7'   74 68 65 72
05AB'   20 66 69 65
05AF'   6C 64
05B1'                    ENDWFF:
05B1'   26               EOLMSG: DB      ENDEOL-EOLMSG
05B2'   45 6E 64 20              DB      "End of line found before end of field"
05B6'   6F 66 20 6C
05BA'   69 6E 65 20
05BE'   66 6F 75 6E
05C2'   64 20 62 65
05C6'   66 6F 72 65
05CA'   20 65 6E 64
05CE'   20 6F 66 20
05D2'   66 69 65 6C
05D6'   64
05D7'                    ENDEOL:
05D7'   28               EOSMSG: DB      ENDEOS-EOSMSG
05D8'   45 6E 64 20              DB      "End of srceen found before end of field"
05DC'   6F 66 20 73
05E0'   72 63 65 65
05E4'   6E 20 66 6F
05E8'   75 6E 64 20
05EC'   62 65 66 6F
05F0'   72 65 20 65
05F4'   6E 64 20 6F
05F8'   66 20 66 69
05FC'   65 6C 64
05FF'                    ENDEOS:
05FF'   1A               RLTLMG: DB      ENDRLT-RLTLMG
0600'   52 65 63 6F              DB      "Record length exceeds 256"
0604'   72 64 20 6C
0608'   65 6E 67 74
060C'   68 20 65 78
0610'   63 65 65 64
0614'   73 20 32 35
0618'   36
0619'                    ENDRLT:
0619'   10               FCTMSG: DB      ENDFCT-FCTMSG
061A'   54 6F 6F 20              DB      "Too many fields"
061E'   6D 61 6E 79
0622'   20 66 69 65
0626'   6C 64 73
0629'                    ENDFCT:
                         ;
                         ;
                         ;CLEAR VIDEO, INITIALIZE TO 80 CHARS, NORMAL VIDEO
                         ;
0629'                    VDCLER:
0629'   06 01                    LD      B,1             ;CHARACTER SIZE
062B'   0E 01                    LD      C,1             ;NORMAL/REVERSE VIDEO
062D'   C3 0000*                 JP      VDINIT
```

```
                                ;
                                ;
0630°   11 19                   CHFMSG: DB      ENDCHF-CHFMSG,CNTLY
0632°   43 68 65 63                     DB      "Checking fields"
0636°   6B 69 6E 67
063A°   20 66 69 65
063E°   6C 64 73
0641°                           ENDCHF:
                                ;
0641°   13                      FVDMSG: DB      ENDFVD-FVDMSG
0642°   41 6C 6C 20                     DB      "All fields valid. "
0646°   66 69 65 6C
C64A°   64 73 20 76
064E°   61 6C 69 64
0652°   2E 20
0654°                           ENDFVD:
                                ;
                                ;
                                ;PRINT A MESSAGE ON LINE 24, BUT CLEAR IT FIRST
                                ;
0654°                           CLRPRT:
0654°   C5                              PUSH    BC
0655°   E5                              PUSH    HL
0656°   CD 0000*                        CALL    CLR24           ;CLEAR LINE 24
0659°   E1                              POP     HL              ;RETRIEVE MESSAGE POINTER
065A°   CD 0436°                        CALL    PERMSG          ;PRINT MESSAGE
065D°   C1                              POP     BC              ;RESTORE ROW/COLUMN
065E°   C9                              RET
                                ;
                                ;
065F°   22                      CDDMSG: DB      ENDCDD-CDDMSG
0660°   43 72 65 61                     DB      "Creating Database descriptor file"
0664°   74 69 6E 67
0668°   20 44 61 74
066C°   61 62 61 73
0670°   65 20 64 65
0674°   73 63 72 69
0678°   70 74 6F 72
067C°   20 66 69 6C
0680°   65
0681°                           ENDCDD:
                                ;
0681°   2C                      CHRMSG: DB      ENDCHR-CHRMSG
0682°   44 6F 20 6E                     DB      "Do not place characters within a data field"
0686°   6F 74 20 70
068A°   6C 61 63 65
068E°   20 63 68 61
0692°   72 61 63 74
0696°   65 72 73 20
069A°   77 69 74 68
069E°   69 6E 20 61
06A2°   20 64 61 74
```

```
06A6'   61 20 66 69
06AA'   65 6C 64
06AD'                  ENDCHR:
                       ;
                       ;
06AD'   23             EIAMSG: DB    ENDEIA-EIAMSG
06AE'   45 6E 74 65            DB    "Enter INPUT application filename  "
06B2'   72 20 49 4E
06B6'   50 55 54 20
06BA'   61 70 70 6C
06BE'   69 63 61 74
06C2'   69 6F 6E 20
06C6'   66 69 6C 65
06CA'   6E 61 6D 65
06CE'   20 20
06D0'                  ENDEIA:
06D0'   23             EOAMSG: DB    ENDEOA-EOAMSG
06D1'   45 6E 74 65            DB    "Enter OUTPUT application filename "
06D5'   72 20 4F 55
06D9'   54 50 55 54
06DD'   20 61 70 70
06E1'   6C 69 63 61
06E5'   74 69 6F 6E
06E9'   20 66 69 6C
06ED'   65 6E 61 6D
06F1'   65 20
06F3'                  ENDEOA:
06F3'                  DBDSC::
06F3'   06             DBDESC: DB    ENDDBD-DBDESC
06F4'   2F 44 53 43            DB    "/DSC",ENTER
06F8'   0D
06F9'                  ENDDBD:
                       ;
                       ;
06F9'   06             DBSMSG: DB    ENDDBS-DBSMSG
06FA'   2F 44 42 53            DB    "/DBS",ENTER
06FE'   0D
06FF'                  ENDDBS:
                       ;
06FF'   06             KY1MSG: DB    ENDKY1-KY1MSG
0700'   2F 4B 59 31            DB    "/KY1",ENTER
0704'   0D
0705'                  ENDKY1:
                       ;
0705'   31             ISDMSG: DB    ENDISD-ISDMSG
0706'   49 6E 73 65            DB    "Insert  SOURCE  disk.  Press ANY key to continue"
070A'   72 74 20 20
070E'   53 4F 55 52
0712'   43 45 20 20
0716'   64 69 73 6B
071A'   2E 20 20 50
071E'   72 65 73 73
```

```
0722°   20 41 4E 59
0726°   20 6B 65 79
072A°   20 74 6F 20
072E°   63 6F 6E 74
0732°   69 6E 75 65
0736°                  17120   ENDISD:
0736°   36             17140   IDDMSG: DB    ENDIDD-IDDMSG
0737°   49 6E 73 65    17160           DB    "Insert  DESTINATION  disk.  Press ANY key to continue"
073B°   72 74 20 20
073F°   44 45 53 54
0743°   49 4E 41 54
0747°   49 4F 4E 20
074B°   20 64 69 73
074F°   6B 2E 20 20
0753°   50 72 65 73
0757°   73 20 41 4E
075B°   59 20 6B 65
075F°   79 20 74 6F
0763°   20 63 6F 6E
0767°   74 69 6E 75
076B°   65
076C°                  17180   ENDIDD:
076C°   3E             17200   SECMSG: DB    ENDSEC-SECMSG
076D°   53 43 52 45    17220           DB    "SCREEN EDITOR - CHARACTER MODE   Press <F1> for help screen  "
0771°   45 4E 20 45
0775°   44 49 54 4F
0779°   52 20 2D 20
077D°   43 48 41 52
0781°   41 43 54 45
0785°   52 20 4D 4F
0789°   44 45 20 20
078D°   20 50 72 65
0791°   73 73 20 3C
0795°   46 31 3E 20
0799°   66 6F 72 20
079D°   68 65 6C 70
07A1°   20 73 63 72
07A5°   65 65 6E 20
07A9°   20
07AA°                  17240   ENDSEC:
07AA°   3D             17260   SEGMSG: DB    ENDSEG-SEGMSG
07AB°   53 43 52 45    17280           DB    "SCREEN EDITOR - GRAPHICS MODE   Press <F1> for help screen  "
07AF°   45 4E 20 45
07B3°   44 49 54 4F
07B7°   52 20 2D 20
07BB°   47 52 41 50
07BF°   48 49 43 53
07C3°   20 4D 4F 44
07C7°   45 20 20 20
07CB°   50 72 65 73
07CF°   73 20 3C 46
07D3°   31 3E 20 66
```

```
07D7'   6F 72 20 68
07DB'   65 6C 70 20
07DF'   73 63 72 65
07E3'   65 6E 20 20
07E7'                  ENDSEG:
                       ;
                       ;
                       ;
07E7'   3A 19          ICHMSG: DB      ENDICH-ICHMSG,CNTLY
07E9'   49 4E 53 45            DB      "INSERT character mode.  "
07ED'   52 54 20 63
07F1'   68 61 72 61
07F5'   63 74 65 72
07F9'   20 6D 6F 64
07FD'   65 2E 20 20
0801'   50 72 65 73            DB      "Press CONTROL I to end insertion"
0805'   73 20 43 4F
0809'   4F 54 52 4F
080D'   4C 20 49 20
0811'   74 6F 20 65
0815'   6E 64 20 69
0819'   6E 73 65 72
081D'   74 69 6F 6E
0821'                  ENDICH:
                       ;
                       ;GET FILENAME FOR OUTPUT APPLICATION PROGRAM, DATABASE AND DESCRIPTOR
                       ;
0821'                  GETOFN:
0821'   21 06D0'               LD      HL,EOAMSG       ;ENTER OUTPUT APPL. MESSG
0824'   CD 0839'               CALL    INFILN          ;PRINT MESSAGE AND GET INPUT
0827'   FE 0D                  CP      ENTER           ;NO INPUT ?
0829'   28 F6                  JR      Z,GETOFN        ;MUST HAVE A FILENAME
082B'   FE 20                  CP      SPACE           ;FILENAME START WITH A SPACE ?
082D'   28 F2                  JR      Z,GETOFN        ;THAT'S A NO NO
082F'   CD 0862'               CALL    FNDRET          ;FIND END OF FILENAME
0832'   21 06F3'               LD      HL,DBDESC       ;COMPLETION OF FILESPEC
0835'   CD 086C'               CALL    COMFLS          ;COMPLETE FILESPEC
0838'   C9                     RET
                       ;
                       ;
                       ;INPUT A FILENAME AFTER PRINTING A PROMPT (HL)
0839'                  INFILN:
0839'   E5                     PUSH    HL
083A'   21 0000*               LD      HL,DCB1
083D'   01 0047                LD      BC,71
0840'   CD 0000*               CALL    CLRMEM
0843'   CD 0000*               CALL    CLR24           ;CLEAR LINE 24
0846'   E1                     POP     HL
0847'   46                     LD      B,(HL)          ;GET LENGTH OF MESS
0848'   23                     INC     HL              ;POINT TO ACTUAL MESSAGE
0849'   05                     DEC     B               ;ACTUAL LENGTH OF MESSAGE
084A'   0E 09                  LD      C,9             ;MAX INPUT LENGTH
```

```
094C°   11 0000*              LD      DE,DCB1
084F°   CD 0EB1°              CALL    VIDKEY
0852°   21 0000*              LD      HL,DCB1
0855°   11 0000*              LD      DE,APPNME
0858°   01 0008               LD      BC,8
085B°   ED B0                 LDIR
085D°   11 0000*              LD      DE,DCB1         ;POINT TO BEGINNING
0860°   1A                    LD      A,(DE)          ;PUT FIRST CHAR IN A
0861°   C9                    RET
                      ;
                      ;
                      ;FIND FIRST RETURN STARTING AT  (DE)
0862°                 FNDRET:
0862°   FE 0D                 CP      RETURN          ;FIRST CHAR IS ALREADY IN A
0864°   C8                    RET     Z
0865°   FE 00                 CP      0
0867°   C8                    RET     Z
0868°   13                    INC     DE              ;ADVANCE POINTER
0869°   1A                    LD      A,(DE)          ;GET NEXT CHAR
086A°   18 F6                 JR      FNDRET
                      ;
                      ;COMPLETE FILESPEC ENDING AT (DE) USING DATA AT (HL)
                      ;
086C°                 COMFLS:
086C°   4E                    LD      C,(HL)          ;GET LENGTH
086D°   0D                    DEC     C               ;ACTUAL LENGTH
086E°   06 00                 LD      B,0             ;RESET HIGH BYTE OF COUNTER
0870°   23                    INC     HL              ;POINT TO ACTUAL DATA
0871°   ED B0                 LDIR                    ;BLOCK TRANSFER
0873°   C9                    RET
                      ;
                      ;
                      ;COMPLETE PARAMETER LIST #1 USING DATA AT (HL)
                      ;
0874°                 COMPL1:
0874°   11 0000*              LD      DE,PL1
0877°                 COMPLB::
0877°   01 000B               LD      BC,11           ;LENGTH OF DATA
087A°   ED B0                 LDIR                    ;BLOCK TRANSFER
087C°   C9                    RET
                      ;
                      ;
087D°                 COMPL2:
087D°   11 0000*              LD      DE,PL2          ;POINT AT PARAMETER LIST#2
0880°   18 F5                 JR      COMPLB
                      ;
                      ;PARAMETER LIST FOR KEY FILE IS THE SAME AS FOR DATABASE DESCRIPTOR
                      ;EXCEPT FOR RECORD LENGTH
                      ;
0882°                 CKFPL1:
                      ;
                      ;
```

```
0882'            19060  ;DATA FOR PARAMETER LIST TO SAVE DATA AS DATABASE DESCRIPTOR
                 19080  ;
0882'            19100  SSDPL1:
0882'  0000*     19120          DW      FBUF1          ;USE FILE BUFFER #1
0884'  0000*     19140          DW      RBUF1          ;USE RECORD BUFFER #1
0886'  00 00     19160          DB      0,0            ;NO EODAD
0888'  57        19180          DB      "W"            ;WRITE/READ FILE
0889'  01        19200          DB      1              ;RECORD LENGTH
088A'  46        19220          DB      "F"            ;FIXED RECORD LENGTH
088B'  02        19240          DB      2              ;CREATION CODE - REWRITE FILE OR CREATE NEW ONE
088C'  00        19260          DB      0              ;USER ATTRIBUTE
                 19280  ;
                 19300  ;PARAMETER LIST FOR READING SCREEN DATA FILE
                 19320  ;
088D'            19340  RSDPL1::
088D'  0000*     19360          DW      FBUF1          ;USE FILE BUFFER #1
088F'  0000*     19380          DW      RBUF1          ;USE RECORD BUFFER #1
0891'  00 00     19400          DB      0,0            ;NO EODAD
0893'  52        19420          DB      "R"            ;READ ONLY
0894'  01        19440          DB      1              ;RECORD LENGTH
0895'  46        19460          DB      "F"            ;FIXED RECORD LENGTH
0896'  00        19480          DB      0              ;OPEN ONLY IF IT EXISTS
0897'  00        19500          DB      0              ;USER ATTRIBUTE
                 19520  ;
                 19540  ;
                 19560  ;PARAMETER LIST FOR CREATING DATABASE FILE
                 19580  ;
0898'            19600  CDFPL2:
0898'  0000*     19620          DW      FBUF2          ;USE FILE BUFFER #2
089A'  0000*     19640          DW      RBUF2          ;USE RECORD BUFFER #2
089C'  00 00     19660          DB      0,0            ;NO EODAD
089E'  57        19680          DB      "W"            ;WRITE/READ FILE
089F'  00        19700          DB      0              ;LENGTH TO BE FILLED IN LATER
08A0'  46        19720          DB      "F"            ;FIXED LENGTH RECORD
08A1'  02        19740          DB      2              ;CREATION CODE
08A2'  00        19760          DB      0              ;USER ATTRIBUTE
                 19780  ;
                 19800  ;CREATE DATABASE FILE (XXXXX/DBS) TO SPECS OF XXXXX/DSC
                 19820  ;
08A3'            19840  CRTDBS:
08A3'  3A 0000*  19860          LD      A,(DBRECL)
08A6'  FE 00     19880          CP      0
08A8'  C8        19900          RET     Z
08A9'  21 096D'  19920          LD      HL,CDFMSG
08AC'  CD 0654'  19940          CALL    CLRPRT
08AF'  21 0000*  19960          LD      HL,APPNME      ;APPLICATION NAME
08B2'  01 0008   19980          LD      BC,8           ;LENGTH OF NAME
08B5'  11 0000*  20000          LD      DE,DCB2        ;DESTINATION
08B8'  ED B0     20020          LDIR
08BA'  11 0000*  20040          LD      DE,DCB2
08BD'  1A        20060          LD      A,(DE)
08BE'  CD 0862'  20080          CALL    FNDRET         ;FIND FIRST RETURN OR 0
```

```
08C1'   21 06F9'               LD      HL,DBSMSG        ;COMPLETION OF FILESPEC
08C4'   CD 086C'               CALL    COMFLS           ;COMPLETE FILESPEC
                       ;
                       ;NOW COMPLETE PARAMETER LIST
                       ;
08C7'   21 0898'               LD      HL,CDFPL2        ;DATA TO COMPLETE PL2
08CA'   CD 087D'               CALL    COMPL2           ;COMPLETE PARAMETER LIST #2
08CD'   3A 0000*               LD      A,(DBRECL)       ;LENGTH TO A
08D0'   32 0007*               LD      (PL2+RL),A       ;INSERT RECORD LENGTH
08D3'   11 0000*               LD      DE,DCB2
08D6'   21 0000*               LD      HL,PL2
08D9'   CD 0000*               CALL    OPEN
08DC'   11 0000*               LD      DE,DCB2
08DF'   CD 0000*               CALL    CLOSE
08E2'   C9                     RET
                       ;
                       ;
                       ;FIND FIRST NON-BLANK CHARACTER IN MEMORY STARTING AT (HL). ON EXIT
                       ;(HL) POINTS TO THE FIRST NON-BLANK CHAR. DESTROYS REG A
                       ;LOCATE NON-BLANK CHAR IN MEMORY
                       ;
08E3'                  LOCNBL:
08E3'   7E                     LD      A,(HL)           ;GET CHAR
08E4'   FE 20                  CP      SPACE            ;COMPARE TO BLANK
08E6'   C0                     RET     NZ               ;RETURN IF NOT BLANK
08E7'   23                     INC     HL               ;ADVANCE MEM POINTER
08E8'   18 F9                  JR      LOCNBL           ;LOOP
                       ;
                       ;
                       ;FIND THE FIRST BLANK CHAR IN MEMORY STARTING AT (HL). ON EXIT (HL)
                       ;POINTS TO THE FIRST BLANK CHARACTER.
                       ;LOCATE BLANK CHAR IN MEMORY
                       ;
08EA'                  LOCBLK:
08EA'   7E                     LD      A,(HL)           ;GET CHAR
08EB'   FE 20                  CP      SPACE
08ED'   C8                     RET     Z                ;RETURN IF BLANK
08EE'   23                     INC     HL               ;ADVANCE MEM POINTER
08EF'   18 F9                  JR      LOCBLK
                       ;
                       ;
                       ;FIND START OF FIELD CHAR IN MEMORY STARTING AT (HL). ON EXIT (HL)
                       ;POINTS TO START FIELD CHAR AND A CONTAINS CHAR
                       ;
08F1'                  LOCSFD:
08F1'   7E                     LD      A,(HL)
08F2'   FE 7B                  CP      SFIELD           ;COMPARE TO START FIELD
08F4'   C8                     RET     Z
08F5'   FE 5B                  CP      BFIELD           ;COMPARE TO BEGINNING FIELD
08F7'   C8                     RET     Z
08F8'   FE 7E                  CP      WFIELD           ;COMPARE TO WHOLE FIELD
08FA'   C8                     RET     Z
```

```
08FB'  23                              INC     HL
08FC'  18 F3                           JR      LOCSFD
                               ;
                               ;
                               ;FIND END OF FIELD CHAR IN MEMORY STARRTING AT (HL). ON EXIT (HL)
                               ;POINTS TO START FIELD CHAR AND A CONTAINS CHAR.
                               ;
08FE'                          LOCEFD:
08FE'  7E                              LD      A,(HL)          ;GET CHAR
08FF'  FE 5D                           CP      EFIELD          ;END OF FIELD ?
0901'  C8                              RET     Z
0902'  FE 7D                           CP      FFIELD          ;FINISH OF FIELD ?
0904'  C8                              RET     Z
0905'  23                              INC     HL
0906'  18 F6                           JR      LOCEFD
                               ;
                               ;
                               ;PRINT INSERT DISK MESSAGE AND WAIT FOR ANY KEY
                               ;
0908'                          PRISDM::
0908'  21 0705'                        LD      HL,ISDMSG       ;INSERT SOURCE MESSAGE
090B'  46                              LD      B,(HL)          ;GET LENGTH OF MESSG
090C'                          PRIS05:
090C'  23                              INC     HL              ;POINT TO ACTUAL MESSAGE
090D'  05                              DEC     B               ;ACTUAL LENGTH
090E'  0E 01                           LD      C,1             ;LENGTH OF INPUT
0910'  11 0F51'                        LD      DE,DLBUFF       ;PHONEY BUFFER
0913'  CD 0EB1'                        CALL    VIDKEY          ;PRINT MESSG, GET ANY KEY
0916'  C9                              RET
                               ;
                               ;
0917'                          PRIDDM:
0917'  21 0736'                        LD      HL,IDDMSG       ;INSERT DESTINATION MESSG
091A'  46                              LD      B,(HL)
091B'  18 EF                           JR      PRIS05
                               ;
                               ;
                               ;CLEAR DL1 BUFFER AREA
                               ;
091D'                          CLRDL1:
091D'  21 0F01'                        LD      HL,DL1
0920'  01 00F0                         LD      BC,240
0923'  CD 0000*                        CALL    CLRMM2
0926'  C9                              RET
                               ;
0927'  36                      EIVMSG: DB      (ENDEIV-EIVMSG)-1
0928'  45 6E 74 65                     DB      "Enter input validations.  Press  ANY key to continue  "
092C'  72 20 69 6E
0930'  70 75 74 20
0934'  76 61 6C 69
0938'  64 61 74 69
093C'  6F 6E 73 2E
```

```
0940°   20 20 50 72
0944°   65 73 73 20
0948°   20 41 4E 59
094C°   20 6B 65 79
0950°   20 74 6F 20
0954°   63 6F 6E 74
0958°   69 6E 75 65
095C°   20 20
095E°                   ENDEIV:
                        ;
                        ;
095E°   08              SCNCOM: DB      ENDSCN-SCNCOM
095F°   53 43 52 45             DB      "SCREEN",RETURN
0963°   45 4E 0D
0966°                   ENDSCN:
                        ;
                        ;
                        ;THIS ROUTINE EXECUTES A DOS COMMAND AND RETURNS TO CALLING ROUTINE
                        ;
0966°                   RETCMD:
0966°   46                      LD      B,(HL)
0967°   05                      DEC     B
0968°                   RETCM5:
0968°   23                      INC     HL
0969°   3E 26                   LD      A,SRTCMD
096B°   CF                      RST     8
096C°   C9                      RET
                        ;
                        ;
096D°   18              CDFMSG:         DB          ENDCDF-CDFMSG
096E°   43 72 65 61             DB      "Creating DATABASE file "
0972°   74 69 6E 67
0976°   20 44 41 54
097A°   41 42 41 53
097E°   45 20 66 69
0982°   6C 65 20
0985°                   ENDCDF:
                        ;
0985°                   CDKMSG:
0985°   1C                      DB      ENDCDK-CDKMSG
0986°   43 72 65 61             DB      "Creating DATABASE KEY file "
098A°   74 69 6E 67
098E°   20 44 41 54
0992°   41 42 41 53
0996°   45 20 4B 45
099A°   59 20 66 69
099E°   6C 65 20
09A1°                   ENDCDK:
09A1°   21              CAPMSG:         DB          ENDCAP-CAPMSG
09A2°   14 0D 20 43             DB      CNTLT,ENTER," CREATING APPLICATION PROGRAM "
09A6°   52 45 41 54
09AA°   49 4E 47 20
```

```
09AE'   41 50 50 4C
09B2'   49 43 41 54
09B6'   49 4F 4E 20
09BA'   50 52 4F 47
09BE'   52 41 4D 20
09C2'                 22680   ENDCAP:
                      22700   ;THIS IS THE DUMP COMMAND STRING TO SAVE THE APPLICATION PROGRAM
                      22720   ;
09C2'   40            22740   DMPMSG:         DB        (ENDDMP-DMPMSG)-1
09C3'   44 55 4D 50   22760           DB      "DUMP "
09C7'   20
09C8'                 22780   DMP1:   DS      8
09D0'   20 53 54 41   22800   DMP2:   DB      " START="
09D4'   52 54 3D
09D7'                 22820   DMP3:   DS      4
09DB'   2C 20 45 4E   22840           DB      ", END="
09DF'   44 3D
09E1'                 22860   DMP4:   DS      4
09E5'   2C 20 54 52   22880           DB      ", TRA="
09E9'   41 3D
09EB'                 22900   DMP5:   DS      4
09EF'   2C 20 52 45   22920           DB      ", RELO="
09F3'   4C 4F 3D
09F6'                 22940   DMP6:   DS      4
09FA'   2C 20 52 4F   22960           DB      ", RORT=T",ENTER
09FE'   52 54 3D 54
0A02'   0D
0A03'                 22980   ENDDMP:
                      23000   ;
                      23020   ;
                      23040   ;
                      23060   ;THIS ROUTINE CREATES A /KY1 FILE USING APPNME AND LENGTH OF FIELD #1
                      23080   ;
0A03'                 23100   CRTKYF:
0A03'   3A 0000*      23120           LD      A,(DBRECL)
0A06'   FE 00         23140           CP      0
0A08'   C8            23160           RET     Z
0A09'   21 0000*      23180           LD      HL,DCB1
0A0C'   01 0047       23200           LD      BC,71
0A0F'   CD 0000*      23220           CALL    CLRMEM
0A12'   21 0000*      23240           LD      HL,APPNME
0A15'   01 0008       23260           LD      BC,8
0A18'   11 0000*      23280           LD      DE,DCB1                 ;DESTINATION
0A1B'   ED B0         23300           LDIR                            ;TRANSFER NAME TO DCB1
0A1D'   21 0985'      23320           LD      HL,CDKMSG       ;CREATING KEY FILE MSG
0A20'   CD 0654'      23340           CALL    CLRPRT          ;PRINT IT
0A23'   11 0000*      23360           LD      DE,DCB1         ;POINT TO BEGINNING OF DCB
0A26'   1A            23380           LD      A,(DE)
0A27'   CD 0862'      23400           CALL    FNDRET          ;FIND END OF NAME
0A2A'   21 06FF'      23420           LD      HL,KY1MSG       ;END OF FILESPEC
0A2D'   CD 086C'      23440           CALL    COMFLS          ;COMPLETE FILESPEC
0A30'   21 0882'      23460           LD      HL,CKFPL1       ;DATA FOR PARAMETER LIST
```

```
0A33'   CD 0874'          CALL    COMPL1          ;COMPLETE PARAMETER LIST
0A36'   21 0000*          LD      HL,FLDTBL       ;POINT TO FIELD TABLE
0A39'   23                INC     HL              ;GET FIRST FIELD LENGTH
0A3A'   23                INC     HL
0A3B'   23                INC     HL
0A3C'   7E                LD      A,(HL)          ;LENGTH TO A
0A3D'   3C                INC     A
0A3E'   21 0007*          LD      HL,PL1+RL       ;RECORD LENGTH IN PL1
0A41'   3C                INC     A
0A42'   77                LD      (HL),A          ;LENGTH TO PL1
0A43'   11 0000*          LD      DE,DCB1         ;USE DEVICE CONTROL BLOCK #1
0A46'   21 0000*          LD      HL,PL1          ;USE PARAMETER LIST #1
0A49'   CD 0000*          CALL    OPEN            ;OPEN A NEW FILE
0A4C'   11 0000*          LD      DE,DCB1
0A4F'   CD 0000*          CALL    CLOSE           ;CLOSE IT FOR LATER
0A52'   C9                RET
                  ;
                  ;
                  ;PRINT  ENTER INPUT VALIDATIONS
                  ;
0A53'             PRTEIV:
0A53'   21 0927'          LD      HL,EIVMSG
0A56'   46                LD      B,(HL)
0A57'   C3 090C'          JP      PRIS05
                  ;
                  ;
                  ;CREATE A DATABASE USING DCB2 THEN INPUT VALIDATIONS
                  ;
0A5A'             INFVAL:
0A5A'   CD 0000*          CALL    FLDVAL
0A5D'   CD 08A3'          CALL    CRTDBS
0A60'   CD 0A03'          CALL    CRTKYF
0A63'   CD 0000*          CALL    CLR24
0A66'   CD 0000*          CALL    VIDRAM
0A69'   21 09A1'          LD      HL,CAPMSG
0A6C'   CD 0654'          CALL    CLRPRT
0A6F'             ENDAUT:
0A6F'   06 00             LD      B,0
0A71'   11 0000*          LD      DE,APPLIC
0A74'   21 09D7'          LD      HL,DMP3
0A77'   CD 0EA2'          CALL    BINHEX
0A7A'   11 09EB'          LD      DE,DMP5
0A7D'   CD 0AB6'          CALL    MOVDP3
0A80'   11 09F6'          LD      DE,DMP6
0A83'   CD 0AB6'          CALL    MOVDP3
0A86'   3A 0EF7'          LD      A,(CFFLAG)
0A89'   FE FF             CP      EOF
0A8B'   28 06             JR      Z,ENDAU5
0A8D'   11 0000*          LD      DE,ENDA09
0A90'   C3 0A96'          JP      ENDAU9
0A93'             ENDAU5:
0A93'   11 0000*          LD      DE,ENDAPP
```

```
0A96'                ENDAU9:
0A96'   06 00                LD      B,0
0A98'   21 09E1'             LD      HL,DMP4
0A9B'   CD 0EA2'             CALL    BINHEX
0A9E'   CD 0ABF'             CALL    MAPD1
0AA1'   CD 0ACB'             CALL    FNDEDP
0AA4'   21 09D0'             LD      HL,DMP2
0AA7'   01 0036              LD      BC,54
0AAA'   ED B0                LDIR
0AAC'   21 09C2'             LD      HL,DMPMSG
0AAF'   46                   LD      B,(HL)
0AB0'   CD 0968'             CALL    RETCM5
0AB3'   C3 0000*             JP      ENDCRE
                     ;
                     ;
0AB6'                MOVDP3:
0AB6'   21 09D7'             LD      HL,DMP3
0AB9'   01 0004              LD      BC,4
0ABC'   ED B0                LDIR
0ABE'   C9                   RET
                     ;
                     ;
                     ;
0ABF'                MAPD1:
0ABF'   21 0000*             LD      HL,APPNME
0AC2'   11 09C8'             LD      DE,DMP1
0AC5'   01 0008              LD      BC,8
0AC8'   ED B0                LDIR
0ACA'   C9                   RET
                     ;
                     ;
                     ;FIND THE END OF APPNME IN DMP1
                     ;
0ACB'                FNDEDP:
0ACB'   01 0008              LD      BC,8
0ACE'   11 09C8'             LD      DE,DMP1
0AD1'                FNDED1:
0AD1'   1A                   LD      A,(DE)
0AD2'   FE 00                CP      0
0AD4'   C8                   RET     Z
0AD5'   FE 0D                CP      ENTER
0AD7'   C8                   RET     Z
0AD8'   FE 20                CP      SPACE
0ADA'   C8                   RET     Z
0ADB'   13                   INC     DE
0ADC'   0D                   DEC     C
0ADD'   20 F2                JR      NZ,FNDED1
0ADF'   C9                   RET
```

```
                     ;
                     ;
                     ;***************************************************************
                     ;
                     ;        THIS SECTION CONTAINS ALL OF THE UTILITY ROUTINES
                     ;
                     ;***************************************************************
                     ;
                     ;THESE RCUTINE HANDLE SPECIAL CHARACTERS FOR THE SCREEN EDITOR
                     ;
                     ;LEFT ARROW HANDLER
                     ;
0AE0'                EDLFTA:
0AE0'   3E FC                LD      A,DLA          ;LEFT ARROW DISPLAY CHARACTER
0AE2'   C3 0B91'             JP      EDGRC          ;OUTPUT THROUGH VDGRAF
                     ;
                     ;
                     ;RIGHT ARROW HANDLER
                     ;
0AE5'                EDRGTA:
0AE5'   3E FD                LD      A,DRA          ;RIGHT ARROW DISPLAY CHARACTER
0AE7'   C3 0B91'             JP      EDGRC          ;OUTPUT THROUGH VDGRAF
                     ;
                     ;
                     ;UP ARROW HANDLER
                     ;
0AEA'                EDUPA:
0AEA'   CD 012D'             CALL    GCURSR
0AED'   78                   LD      A,B
0AEE'   FE 00                CP      0
0AF0'   20 0A                JR      NZ,EDUPA5
0AF2'   06 16                LD      B,22
0AF4'   16 00                LD      D,0
0AF6'   CD 0000*             CALL    VDGRAF
0AF9'   C3 004A'             JP      EDITOR
0AFC'                EDUPA5:
0AFC'   3E FE                LD      A,DUA          ;UP ARROW DISPLAY CHARACTER
0AFE'   C3 0B91'             JP      EDGRC          ;OUTPUT THROUGH VDGRAF
                     ;
                     ;
                     ;DOWN ARROW HANDLER
                     ;
0B01'                EDDWNA:
0B01'   CD 012D'             CALL    GCURSR
0B04'   78                   LD      A,B
0B05'   FE 16                CP      22
0B07'   20 0A                JR      NZ,EDDWN5
0B09'   06 00                LD      B,0
0B0B'   16 00                LD      D,0
0B0D'   CD 0000*             CALL    VDGRAF
0B10'   C3 004A'             JP      EDITOR
0B13'                EDDWN5:
```

```
0B13'   3E FF                LD      A,DDA           ;DOWNA ARROW DISPLAY CHARACTER
0B15'   18 7A                JR      EDGRC
                     ;
                     ;
                     ;FUNCTION KEY 1 HANDLER
                     ;
0B17'                EDF1:
0B17'   CD 0CEC'             CALL    PRTEHS          ;PRINT EDITOR HELP SCREEN
0B1A'   C3 004A'             JP      EDITOR
                     ;
                     ;
                     ;FUNCTION KEY 2 HANDLER
                     ;
0B1D'                EDF2:
0B1D'   CD 0000*             CALL    SCNPRT          ;PRINT THE VIDEO SCREEN
0B20'   C3 004A'             JP      EDITOR
                     ;
                     ;CONTROL D  HANDLER,   DELETE CHARACTER, SHORTEN LINE
                     ;
0B23'                EDCTLD:
0B23'   CD 0DA1'             CALL    DELCHR          ;DELETE CHARACTER
0B26'   C3 004A'             JP      EDITOR
                     ;
                     ;CONTROL E HANDLER,   END EDITING, BEGIN AUTOGRAMMING
                     ;
0B29'                EDCTLE:
0B29'   C3 01C1'             JP      FLDCHK          ;START AUTOGRAMMING
                     ;
                     ;
                     ;CONTROL F  HANDLER, BLINK ON/OFF
                     ;
0B2C'                EDCTLF:
0B2C'   C3 004A'             JP      EDITOR          ;TEMPORARY
                     ;
                     ;
                     ;CONTROL G  HANDLER, ENTER GRAPHIC MODE
                     ;
0B2F'                EDCTLG:
0B2F'   3E FF                LD      A,EDF           ;SET GRAPHICS MODE FLAG
0B31'   32 0FF3'             LD      (GRAFLG),A
0B34'   C3 0BA2'             JP      GRINP
                     ;
                     ;
                     ;CONTROL H  HANDLER,  HOME CURSOR TO ROW 1,  COLUMN 1
                     ;
0B37'                EDCTLH:
0B37'   01 0000              LD      BC,0
0B3A'   16 00                LD      D,0
0B3C'   CD 0000*             CALL    VDGRAF
0B3F'   C3 004A'             JP      EDITOR
                     ;
                     ;
```

```
                        ;CONTROL I  HANDLER,  INSERT CHARACTER, LENGTHEN LINE
                        ;
0842'                   EDCTLI:
0842'   CD 000E'                CALL    INSCHR          ;INSERT CHARACTER
0845'   C3 004A'                JP      EDITOR
                        ;
                        ;
                        ;CONTROL K  HANDLER, KILL LINE, SHORTEN SCREEN
                        ;
0848'                   EDCTLK:
0848'   CD 00DA'                CALL    DELINE
084B'   C3 004A'                JP      EDITOR
                        ;
                        ;
                        ;CONTROL L  HANDLER,  INSERT LINE, LENGTHEN SCREEN
                        ;
084E'                   EDCTLL:
084E'   CD 00D6'                CALL    INLINE
0851'   C3 004A'                JP      EDITOR
                        ;
                        ;
                        ;CONTROL M  HANDLER,   MOVE TEXT TO MIDDLE OF LINE
                        ;
0854'                   EDCTLM:
0854'   CD 013E'                CALL    CENTER          ;CENTER TEXT ON LINE
0857'   C3 004A'                JP      EDITOR
                        ;
                        ;
                        ;CONTROL Q  HANDLER,     QUIT, CLEAR SCREEN, START OVER
                        ;
085A'                   EDCTLQ:
085A'   C3 0000'                JP      DATAGR
                        ;
                        ;
                        ;CONTROL R  HANDLER, REVERSE VIDEO ON/OFF
                        ;
085D'                   EDCTLR:
085D'   3A 0FF2'                LD      A,(RVFLG)
0860'   FE 00                   CP      0
0862'   28 0D                   JR      Z,EDR05
0864'   3E 00                   LD      A,0
0866'   32 0FF2'                LD      (RVFLG),A
0869'   06 19                   LD      B,CNTLY         ;SET NORMAL DISPLAY MODE
086B'   CD 0000*                CALL    VDCHAR
086E'   C3 004A'                JP      EDITOR
0871'                   EDR05:
0871'   3E FF                   LD      A,EOF
0873'   32 0FF2'                LD      (RVFLG),A
0876'   06 1A                   LD      B,CNTLZ         ;SET REVERSE VIDEO MODE
0878'   CD 0000*                CALL    VDCHAR
087B'   C3 004A'                JP      EDITOR
                        ;
```

```
                          ;
                          ;CONTROL S  HANDLER,  SAVE SCREEN
                          ;
0B7E'                     EDCTLS:
0B7E'    CD 0095'                 CALL    SDATAD          ;SAVE SCREEN
0B81'    CD 0821'                 CALL    GETOFN          ;GET ANOTHER OUTPUT FILE NAME
0B84'    C3 004A'                 JP      EDITOR
                          ;
                          ;
                          ;ESCAPE KEY HANDLER
                          ;
0B87'                     EDESC:
0B87'    C3 0000*                 JP      ENDPR5          ;CLEAR MEMORY AND RETURN TO TRSDOS
                          ;
                          ;
                          ;OUTPUT THROUGH VDCHAR
                          ;
0B8A'                     EDVDCH:
0B8A'    47                       LD      B,A             ;MOVE CHARACTER TO B
0B8B'    CD 0000*                 CALL    VDCHAR
0B8E'    C3 004A'                 JP      EDITOR
                          ;
                          ;
                          ;OUTPUT THROUGH VDGRAF
                          ;
0B91'                     EDGRC:
0B91'    32 0EFE'                 LD      (GRCHAR),A
0B94'    CD 012D'                 CALL    GCURSR
0B97'    16 01                    LD      D,1
0B99'    21 0EFE'                 LD      HL,GRCHAR
0B9C'    CD 0000*                 CALL    VDGRAF
0B9F'    C3 004A'                 JP      EDITOR
                          ;
                          ;
                          ;THESE ROUTINES HANDLE THE INPUT FOR THE EDITOR GRAPHICS MODE
                          ;
                          ;GET A CHARACTER FROM THE KEYBOARD AND DISPLAY IT
                          ;
0BA2'                     GRINP:
0BA2'    CD 0000*                 CALL    SAVCUR
0BA5'    21 07AA'                 LD      HL,SEGMSG
0BA8'    CD 0654'                 CALL    CLRPRT
0BAB'    CD 0000*                 CALL    RESCUR
0BAE'                     GRINP5:
0BAE'    CD 012D'                 CALL    GCURSR
0BB1'    CD 0000*                 CALL    KBCHAR          ;GET CHAR
0BB4'    78                       LD      A,B             ;MOVE CHAR TO A
0BB5'    B7                       OR      A               ;SET FLAGS
0BB6'    28 F6                    JR      Z,GRINP5        ;LOOP TIL CHAR AVAILABLE
0BB8'    C5                       PUSH    BC              ;GOT CHAR, SAVE IT
0BB9'    21 1033'                 LD      HL,GRCHTB
```

```
0BBC'  CD 0EE9'            CALL    LOOKUP          ;FIND THE PROCESSING ROUTINE FOR IT
0BBF'  C1                  POP     BC              ;RESTORE CHAR.
0BC0'  20 EC               JR      NZ,GRINP5       ;LOOP IF CHAR NOT IN TABLE
0BC2'  C5                  PUSH    BC
0BC3'  E5                  PUSH    HL
0BC4'  CD 0000*            CALL    SAVCUR
0BC7'  CD 0000*            CALL    CLR24
0BCA'  CD 0000*            CALL    RESCUR
0BCD'  E1                  POP     HL
0BCE'  C1                  POP     BC
0BCF'  78                  LD      A,B
0BD0'  E9                  JP      (HL)
                   ;
                   ;
                   ;THIS IS THE NORMAL GRAPHICS PROCESSING ROUTINE
                   ;
0BD1'              GRAPHC:
0BD1'  78                  LD      A,B             ;MOVE CHAR TO A
0BD2'  E6 1F               AND     1FH             ;STRIP UPPER 3 BITS, REDUCE TO CNTL
0BD4'              GRAPH5:
0BD4'  32 0EFE'            LD      (GRCHAR),A      ;PUT CHAR IN BUFFER
0BD7'  CD 012D'            CALL    GCURSR
0BDA'  16 01               LD      D,1
0BDC'  21 0EFE'            LD      HL,GRCHAR       ;BUFFER LOCATION
0BDF'  CD 0000*            CALL    VDGRAF          ;DISPLAY CHARACTER
0BE2'  3A 0EFE'            LD      A,(GRCHAR)      ;LOAD CHARACTER
0BE5'  D6 14               SUB     CNTLT           ;TEST FOR GRAPHIC T
0BE7'  28 04               JR      Z,GRAPH6        ;RESET CURSOR IF FOUND
0BE9'  D6 01               SUB     1               ;TEST FOR GRAPHIC U
0BEB'  20 B5               JR      NZ,GRINP        ;RETURN TO INPUT MODE IF NOT
0BED'              GRAPH6:
0BED'  3E 16               LD      A,ROWMAX-2      ;TEST FOR LINE 23
0BEF'  90                  SUB     B
0BF0'  28 01               JR      Z,GRAPH7        ;IF FOUND, DO NOT INCREMENT ROW
0BF2'  04                  INC     B               ;INCREMENT ROW
0BF3'              GRAPH7:
0BF3'  16 00               LD      D,0
0BF5'  CD 0000*            CALL    VDGRAF          ;RESET CURSOR
0BF8'  18 A8               JR      GRINP           ;RETURN TO INPUT MODE
                   ;
                   ;
                   ;SPECIAL HANDLER FOR "A"
                   ;
0BFA'              GRCONA:
0BFA'  3E 10               LD      A,CNTLP
0BFC'  18 D6               JR      GRAPH5
                   ;
                   ;
                   ;SPECIAL HANDLER FOR "B"
                   ;
0BFE'              GRCONB:
0BFE'  3E 11               LD      A,CNTLQ
```

```
0C00'   18 D2            JR      GRAPH5
                 ;
                 ;
                 ;SPECIAL HANDLER FOR "C"
                 ;
0C02'            GRCONC:
0C02'   3E 12            LD      A,CNTLR
0C04'   18 CE            JR      GRAPH5
                 ;
                 ;
                 ;SPECIAL HANDLER FOR "P"
                 ;
0C06'            GRCONP:
0C06'            GRCONP:
0C06'   3E 00            LD      A,HOLD
0C08'   18 CA            JR      GRAPH5
                 ;
                 ;
                 ;SPECIAL HANDLER FOR "Q"
                 ;
0C0A'            GRCONQ:
0C0A'   3E 01            LD      A,F1
0C0C'   18 C6            JR      GRAPH5
                 ;
                 ;
                 ;SPECIAL HANDLER FOR "R"
                 ;
0C0E'            GRCONR:
0C0E'   3E 02            LD      A,F2
0C10'   18 C2            JR      GRAPH5
                 ;
                 ;
                 ;SPECIAL HANDLER FOR "S"
                 ;
0C12'            GRCONS:
0C12'   3E 03            LD      A,CNTLC
0C14'   18 3E            JR      GRAPH5
                 ;
                 ;
                 ;SPECIAL HANDLER FOR "1"
                 ;
0C16'            GRCON1:
0C16'   3E 13            LD      A,CNTLS
0C18'   18 BA            JR      GRAPH5
                 ;
                 ;
                 ;SPECIAL HANDLER FOR  "2"
                 ;
0C1A'            GRCON2:
0C1A'   3E 1B            LD      A,ESC
0C1C'   18 B6            JR      GRAPH5
                 ;
```

```
                        ;
                        ;SPECIAL HANDLER FOR "3"
                        ;
0C1E'                   GRCON3:
0C1E'   3E 1C                   LD      A,LEFTA
0C20'   18 B2                   JR      GRAPH5
                        ;
                        ;
                        ;SPECIAL HANDLER FOR "4"
                        ;
0C22'                   GRCON4:
0C22'   3E 1D                   LD      A,RIGHTA
0C24'   18 AE                   JR      GRAPH5
                        ;
                        ;
                        ;SPECIAL HANDLER FOR "5"
                        ;
0C26'                   GRCON5:
0C26'   3E 1E                   LD      A,UPA
0C28'   18 AA                   JR      GRAPH5
                        ;
                        ;
                        ;SPECIAL HANDLER FOR "6"
                        ;
0C2A'                   GRCON6:
0C2A'   3E 1F                   LD      A,DOWNA
0C2C'   18 A6                   JR      GRAPH5
                        ;
                        ;
                        ;SPECIAL HANDLER FOR BACKSPACE
                        ;
0C2E'                   GRBKSP:
0C2E'   CD 0000*                CALL    VDCHAR
0C31'   C3 0BA2'                JP      GRINP
                        ;
                        ;
                        ;SPECIAL HANDLER FOR ESC KEY
                        ;
0C34'                   GRESC:
0C34'   C3 0BA2'                JP      GRINP
                        ;
                        ;
                        ;SPECIAL HANDLER FOR FUNCTION KEY 1
                        ;
0C37'                   GRF1:
0C37'   CD 0000*                CALL    VIDRAM          ;SAVE CURRENT SCREEN
0C3A'   21 0000*                LD      HL,GRHPSC       ;GRAPHICS MODE HELP SCREEN
0C3D'   06 0C                   LD      B,0             ;VIDEO TRANSFER DIRECTION
0C3F'   3E 5E                   LD      A,SVDRAM        ;SUPERVISOR COMMAND
0C41'   CF                      RST     8               ;SUPERVISOR CALL
0C42'                   GRF1A:
0C42'   CD 0000*                CALL    KBCHAR          ;INPUT FROM KEYBOARD
```

```
0C45'   78                      LD      A,c
0C46'   FE 02                   CP      F2
0C48'   20 05                   JP      NZ,GRF1B
0C4A'   CD 0000*                CALL    SCNPRT
0C4D'   18 F3                   JR      GRF1A
0C4F'                   GRF1B:
0C4F'   FE 01                   CP      F1
0C51'   20 EF                   JR      NZ,GRF1A        ;LOOP TILL F1
0C53'   CD 0000*                CALL    RAMVID          ;RESTORE ORIGINAL SCREEN
0C56'   C3 0BA2'                JP      GRINP
                        ;
                        ;
                        ;SPECIAL HANDLER FOR FUNCTION KEY 2
                        ;
0C59'                   GRF2:
0C59'   CD 0000*                CALL    SCNPRT          ;PRINT THE CONTENTS OF THE SCREEN
0C5C'   C3 0BA2'                JP      GRINP
                        ;
                        ;
                        ;SPECIAL HANDLER FOR CONTROL D, DELETE CHARACTER, SHORTEN LINE
                        ;
0C5F'                   GRCTLD:
0C5F'   CD 0DA1'                CALL    DELCHR          ;DELETE CHARACTER
0C62'   C3 0BA2'                JP      GRINP
                        ;
                        ;
                        ;SPECIAL HANDLER FOR CONTROL H
                        ;
0C65'                   GRCTLH:
0C65'   01 0000                 LD      BC,0
0C68'   16 00                   LD      D,0
0C6A'   CD 0000*                CALL    VDGRAF
0C6D'   C3 0BA2'                JP      GRINP
                        ;
                        ;
                        ;SPECIAL HANDLER FOR CONTROL I,  INSERT CHARACTER,LENGTHEN LINE
                        ;
0C70'                   GRCTLI:
0C70'   CD 0D0E'                CALL    INSCHR          ;INSERT CHARACTER
0C73'   C3 0BA2'                JP      GRINP
                        ;
                        ;
                        ;SPECIAL HANDLER FOR CONTROL G,  RETURN FROM GRAPHICS MODE
                        ;
0C76'                   GRCTLG:
0C76'   3E 00                   LD      A,0
0C78'   32 0FF3'                LD      (GRAFLG),A
0C7B'   C3 004A'                JP      EDITOR
                        ;
                        ;SPECIAL HANDLER FOR CONTROL K, , KILL LINE, SHORTEN SCREEN
                        ;
0C7E'                   GRCTLK:
```

```
0C7E'   CD 0DDA'              CALL    DELINE
0C81'   C3 0BA2'              JP      GRINP
                      ;
                      ;
                      ;SPECIAL HANDLER FOR CONTROL L, INSERT LINE, LENGTHEN SCREEN
                      ;
0C84'                 GRCTLL:
0C84'   CD 0DD6'              CALL    INLINE
0C87'   C3 0BA2'              JP      GRINP
                      ;
                      ;
                      ;SPECIAL HANDLER FOR CONTROL M, MOVE TEXT TO MIDDLE OF SCREEN
                      ;
0C8A'                 GRCTLM:
0C8A'   CD 013E'              CALL    CENTER
0C8D'   C3 0BA2'              JP      GRINP
                      ;
                      ;
                      ;SPECIAL HANDLER FOR CONTROL Q, QUIT, RETURN TO TRSDOS
                      ;
0C90'                 GRCTLQ:
0C90'   C3 0000'              JP      DATAGR
                      ;
                      ;
                      ;SPECIAL HANDLER FOR CONTROL R, REVERSE VIDEO ON/OFF
                      ;
0C93'                 GRCTLR::
0C93'   3A 0FF2'              LD      A,(RVFLG)     ;REVERSE VIDEO FLAG
0C96'   FE 00                 CP      0
0C98'   28 0D                 JR      Z,GRR05
0C9A'   3E 00                 LD      A,0
0C9C'   32 0FF2'              LD      (RVFLG),A
0C9F'   06 19                 LD      B,CNTLY
0CA1'   CD 0000*              CALL    VDCHAR
0CA4'   C3 0BA2'              JP      GRINP
0CA7'                 GRR05:
0CA7'   3E FF                 LD      A,EOF
0CA9'   32 0FF2'              LD      (RVFLG),A
0CAC'   06 1A                 LD      B,CNTLZ
0CAE'   CD 0000*              CALL    VDCHAR
0CB1'   C3 0BA2'              JP      GRINP
                      ;SPECIAL HANDLER FOR LEFT ARROW
                      ;
0CB4'                 GRLFTA:
0CB4'   3E FC                 LD      A,DLA
0CB6'   C3 0BD4'              JP      GRAPH5
                      ;
                      ;SPECIAL HANDLER FOR DOWN ARROW
                      ;
0CB9'                 GRDWNA:
0CB9'   CD 012D'              CALL    GCURSR
0CBC'   78                    LD      A,B
```

```
0CBD'   FE 16          34820           CP      22
0CBF'   20 0A          34840           JR      NZ,GRDWN5
0CC1'   06 00          34860           LD      B,0
0CC3'   16 00          34880           LD      D,0
0CC5'   CD 0000*       34900           CALL    VDGRAF
0CC8'   C3 0BA2'       34920           JP      GRINP
0CCB'                  34940   GRDWN5:
0CCB'   3E FF          34960           LD      A,DDA
0CCD'   C3 0BD4'       34980           JP      GRAPH5
                       35000   ;
                       35020   ;SPECIAL HANDLER FOR RIGHT ARROW
                       35040   ;
0CD0'                  35060   GRRGTA:
0CD0'   3E FD          35080           LD      A,DRA
0CD2'   C3 0BD4'       35100           JP      GRAPH5
                       35120   ;
                       35140   ;SPECIAL HANDLER FOR UP ARROW
0CD5'                  35160   GRUPA:
0CD5'   CD 012D'       35180           CALL    GCURSR
0CD8'   78             35200           LD      A,B
0CD9'   FE 00          35220           CP      0
0CDB'   20 0A          35240           JR      NZ,GRUPA5
0CDD'   06 16          35260           LD      B,22
0CDF'   16 00          35280           LD      D,0
0CE1'   CD 0000*       35300           CALL    VDGRAF
0CE4'   C3 0BA2'       35320           JP      GRINP
0CE7'                  35340   GRUPA5:
0CE7'   3E FE          35360           LD      A,DUA
0CE9'   C3 0BD4'       35380           JP      GRAPH5
                       35400   ;
                       35420   ;THIS ROUTINE SUPPLIES THE HELP SCREEN FOR THE EDITOR MODE
                       35440   ;
0CEC'                  35460   PRTEHS:
0CEC'   CD 0000*       35480           CALL    VIDRAM
0CEF'   21 0000*       35500           LD      HL,EDHPSC
0CF2'   06 00          35520           LD      B,0
0CF4'   3E 5E          35540           LD      A,SVDRAM
0CF6'   CF             35560           RST     8
0CF7'                  35580   EDHSA:
0CF7'   CD 0000*       35600           CALL    KBCHAR
0CFA'   78             35620           LD      A,B
0CFB'   FE 02          35640           CP      F2
0CFD'   20 05          35660           JR      NZ,EDHSB
0CFF'   CD 0000*       35680           CALL    SCNPRT
0D02'   18 F3          35700           JR      EDHSA
0D04'                  35720   EDHSB:
0D04'   FE 01          35740           CP      F1
0D06'   20 EF          35760           JR      NZ,EDHSA
0D08'   CD 0000*       35780           CALL    RAMVID
0D0B'   C3 004A'       35800           JP      EDITOR
                       35820   ;
                       35840   ;
```

```
                      ;THIS SECTION CONTAINS INSERT AND DELETE ROUTINES
                      ;
                      ;
                      ;INSERT CHARACTER
                      ;
0D0E'                 INSCHR:
0D0E'  CD 012D'               CALL    GCURSR          ;GET CURSOR POSITION
0D11'  C5                     PUSH    BC              ;SAVE ROW, COLUMN
0D12'  21 07E7'               LD      HL,ICHMSG       ;POINT TO INSERT MODE MESSAGE
0D15'  CD 0654'               CALL    CLRPRT          ;AND DISPLAY IT
0D18'  3A 0FF2'               LD      A,(RVFLG)
0D1B'  FE 00                  CP      0
0D1D'  CA 0D25'               JP      Z,INSCH3
0D20'  06 1A                  LD      B,CNTLZ
0D22'  CD 0000*               CALL    VDCHAR
0D25'                 INSCH3:
0D25'  C1                     POP     BC              ;RESTORE ROW, COLUMN
0D26'  CD 0000*               CALL    VDGRAF          ;RESTORE CURSOR POSITION
0D29'                 INSCH4:
0D29'  C5                     PUSH    BC              ;SAVE ROW, COLUMN
0D2A'  0E 00                  LD      C,0             ;SET COLUMN TO ZERO
0D2C'  21 0F51'               LD      HL,DLBUFF       ;POINT TO BUFFER ADDRESS
0D2F'  16 50                  LD      D,LINMAX        ;LOAD LINE LENGTH
0D31'  CD 0EAA'               CALL    VDREAD          ;READ LINE INTO BUFFER
0D34'                 INSCH5:
0D34'  CD 0000*               CALL    INCHAR          ;GET KEYBOARD CHARACTER
0D37'  FE 09                  CP      CNTLI           ;TEST FOR INSERT MODE
0D39'  CA 0D94'               JP      Z,INSCXT        ;EXIT IF FOUND
0D3C'  FE 1B                  CP      ESC             ;TEST FOR ESCAPE
0D3E'  CA 0D94'               JP      Z,INSCXT        ;EXIT IF FOUND
0D41'  FE 20                  CP      SPACE           ;TEST FOR VALID INSERT
0D43'  FA 0D34'               JP      M,INSCH5        ;IF NOT VALID, GET ANOTHER
0D46'  C1                     POP     BC              ;RESTORE ROW, COLUMN
0D47'  C5                     PUSH    BC              ;SAVE ROW, COLUMN
0D48'  06 00                  LD      B,0             ;SET ROW TO ZERO
0D4A'  21 0F9F'               LD      HL,DLBUFF+78    ;POINT TO NEXT-TO-LAST BUFFER BYTE
0D4D'  11 0FA0'               LD      DE,DLBUFF+79    ;POINT TO LAST BUFFER BYTE
0D50'  F5                     PUSH    AF              ;SAVE KEYBOARD CHARACTER
0D51'  3E 4F                  LD      A,LINMAX-1      ;COMPUTE FIELD LENGTH
0D53'  91                     SUB     C               ;FROM CURSOR TO END OF BUFFER
0D54'  28 03                  JR      Z,INSCBP        ;BYPASS SHIFT IF ZERO
0D56'  4F                     LD      C,A             ;LOAD FIELD LENGTH
0D57'  ED B8                  LDDR                    ;SHIFT BUFFER RIGHT FOR INSERT
0D59'                 INSCBP:
0D59'  F1                     POP     AF              ;RESTORE KEYBOARD CHARACTER
0D5A'  23                     INC     HL              ;POINT TO INSERT BYTE
0D5B'  77                     LD      (HL),A          ;INSERT CHARACTER IN BUFFER
0D5C'  3A 0FF3'               LD      A,(GRAFLG)
0D5F'  FE 00                  CP      0               ;TEST FOR GRAPHICS MODE
0D61'  28 04                  JR      Z,INSCH6        ;BYPASS IF NOT
0D63'  7E                     LD      A,(HL)          ;LOAD CHARACTER
0D64'  E6 1F                  AND     1FH             ;STRIP ZONE
```

```
0D66'  77              LD    (HL),A       ;REPLACE GRAPHIC CHARACTER
0D67'                  INSCH6:
0D67'  3A 0FF2'        LD    A,(RVFLG)
0D6A'  FE 00           CP    0
0D6C'  CA 0D73'        JP    Z,INSCH9
0D6F'  7E              LD    A,(HL)
0D70'  F6 80           OR    80H
0D72'  77              LD    (HL),A
0D73'                  INSCH9:
0D73'  C1              POP   BC           ;RESTORE ROW, COLUMN
0D74'  3E 50           LD    A,LINMAX     ;COMPUTE LENGTH OF BUFFER
0D76'  91              SUB   C            ;TO BE DISPLAYED
0D77'  57              LD    D,A
0D78'  CD 0E37'        CALL  SDGRAF       ;DISPLAY LINE
0D7B'  0C              INC   C            ;INCREMENT COLUMN POINTER
0D7C'  3E 50           LD    A,LINMAX
0D7E'  91              SUB   C            ;TEST FOR END OF LINE
0D7F'  28 08           JR    Z,INSCH7     ;EXIT IF EOL
0D81'  16 00           LD    D,0
0D83'  CD 0000*        CALL  VDGRAF       ;RESTORE CURSOR POSITION
0D86'  C3 0D29'        JP    INSCH4       ;GET NEXT CHARACTER
0D89'                  INSCH7:
0D89'  04              INC   B            ;INCREMENT ROW POINTER
0D8A'  3E 17           LD    A,ROWMAX-1
0D8C'  90              SUB   B            ;TEST FOR MESSAGE LINE
0D8D'  20 02           JR    NZ,INSCH8
0D8F'  06 01           LD    B,1          ;RESET ROW IF FOUND
0D91'                  INSCH8:
0D91'  0E 00           LD    C,0          ;RESET COLUMN POINTER
0D93'  C5              PUSH  BC           ;SAVE ROW, COLUMN
0D94'                  INSCXT:
0D94'  CD 0EC2'        CALL  SETSCR       ;SCROLL PROTECT LINES 1-23
0D97'  CD 0000*        CALL  CLR24        ;CLEAR MESSAGE LINE
0D9A'  C1              POP   BC           ;BRING RETURN ADDRESS TO TOP
0D9B'  16 00           LD    D,0
0D9D'  CD 0000*        CALL  VDGRAF       ;RESTORE CURSOR POSITION
0DA0'  C9              RET
                       ;
                       ;
                       ;DELETE CHARACTER
                       ;
                       ;
0DA1'                  DELCHR:
0DA1'  CD 012D'        CALL  GCURSR       ;GET CURSOR POSITION
0DA4'  C5              PUSH  BC           ;SAVE ROW, COLUMN
0DA5'  0E 00           LD    C,0          ;SET COLUMN TO ZERO
0DA7'  21 0F51'        LD    HL,DLBUFF    ;POINT TO BUFFER ADDRESS
0DAA'  16 50           LD    D,LINMAX     ;LOAD LINE LENGTH
0DAC'  CD 0EAA'        CALL  VDREAD       ;READ LINE INTO BUFFER
0DAF'  C1              POP   BC           ;RESTORE ROW, COLUMN
0DB0'  C5              PUSH  BC           ;SAVE ROW, COLUMN
0DB1'  06 00           LD    B,0          ;SET ROW TO ZERO
```

```
0DB3'  21 0F51'          LD      HL,DLBUFF          ;POINT TO BUFFER ADDRESS
0DB6'  09                ADD     HL,BC              ;ADD CURSOR COLUMN
0DB7'  E5                PUSH    HL
0DB8'  D1                POP     DE                 ;POINT TO DELETED CHARACTER
0DB9'  D5                PUSH    DE                 ;SAVE ADDRESS OF DELETED CHARACTER
0DBA'  23                INC     HL                 ;POINT TO NEXT CHARACTER
0DBB'  3E 4F             LD      A,LINMAX-1         ;
0DBD'  91                SUB     C                  ;COMPUTE FIELD LENGTH
0DBE'  28 03             JR      Z,DELCH5           ;BYPASS IF ZERO
0DC0'  4F                LD      C,A                ;LOAD FIELD LENGTH
0DC1'  ED B0             LDIR                       ;SHIFT BUFFER LEFT
0DC3'            DELCH5:
0DC3'  3E 20             LD      A,SPACE            ;MOVE SPACE TO LAST
0DC5'  2B                DEC     HL
0DC6'  77                LD      (HL),A             ;COLUMN IN LINE
0DC7'  E1                POP     HL                 ;RESTORE ADDRESS OF DELFTED CHARACTER
0DC8'  C1                POP     BC                 ;RESTORE ROW, COLUMN
0DC9'  3E 50             LD      A,LINMAX           ;
0DCB'  91                SUB     C                  ;COMPUTE FIELD LENGTH
0DCC'  57                LD      D,A
0DCD'  CD 0E37'          CALL    SDGRAF             ;DISPLAY LINE
0DD0'  16 00             LD      D,0
0DD2'  CD 0000*          CALL    VDGRAF             ;RESET CURSOR
0DD5'  C9                RET                        ;EXIT
                 ;
                 ;
                 ;INSERT OR DELETE LINE
                 ;
                 ;
0DD6'            INLINE:
0DD6'  16 00             LD      D,0                ;SET INSERT INDICATOR
0DD8'  18 02             JR      INDELN
0DDA'            DELINE:
0DDA'  16 FF             LD      D,EOF              ;SET DELETE INDICATOR
0DDC'            INDELN:
0DDC'  D5                PUSH    DE                 ;SAVE INSERT/DELETE INDICATOR
0DDD'  CD 0000*          CALL    VIDRAM             ;READ SCREEN INTO BUFFER
0DE0'  CD 012D'          CALL    GCURSR             ;GET CURSOR POSITION
0DE3'  78                LD      A,B                ;LOAD ROW IN ACCUMULATOR
0DE4'  FE 00             CP      0                  ;TEST FOR LINE 1
0DE6'  CA 0E35'          JP      Z,INDEXT           ;EXIT IF FOUND
0DE9'  FE 17             CP      23                 ;TEST FOR LINE 24
0DEB'  CA 0E35'          JP      Z,INDEXT           ;EXIT IF FOUND
0DEE'  0E 00             LD      C,0                ;SET COLUMN TO ZERO
0DF0'  D6 16             SUB     22                 ;TEST FOR LINE 23
0DF2'  21 06E0*          LD      HL,APRSCN+1760 ;POINT TO LINE 23
0DF5'  CA 0E32'          JP      Z,INDFL6           ;CLEAR IF FOUND
0DF8'  ED 44             NEG                        ;CHANGE LINE COUNT TO +
0DFA'  21 0050           LD      HL,LINMAX          ;LOAD LINE LENGTH
0DFD'  4F                LD      C,A                ;LOAD LINE COUNT
0DFE'  CD 0000*          CALL    MLTPLY             ;COMPUTE BYTE COUNT
0E01'  D1                POP     DE                 ;RESTORE INSERT/DELETE INDICATOR
```

```
0E02'  E5                          PUSH    HL              ;TRANSFER BYTE COUNT
0E03'  C1                          POP     BC              ;TO COUNTER
0E04'  3E 00                       LD      A,0             ;ZERO ACCUMULATOR
0E05'  BA                          CP      D               ;TEST FOR INSERT MODE
0E07'  CA 0E1F'                    JP      Z,INDEL4
0E0A'  21 06E0*                    LD      HL,APRSCN+1760 ;POINT TO LINE 23
0E0D'  37                          SCF
0E0E'  3F                          CCF                     ;TURN OFF CARRY FLAG
0E0F'  ED 42                       SBC     HL,BC           ;POINT TO DELETED LINE
0E11'  E5                          PUSH    HL
0E12'  D1                          POP     DE              ;SET RECEIVING POINTER
0E13'  21 0050                     LD      HL,LINMAX
0E16'  19                          ADD     HL,DE           ;POINT TO SENDING LINE
0E17'  ED B0                       LDIR                    ;SHIFT LINES UP 1
0E19'  21 06E0*                    LD      HL,APRSCN+1760 ;POINT TO LINE 23
0E1C'  C3 0E28'                    JP      INDEL5
0E1F'                      INDEL4:
0E1F'  21 06DF*                    LD      HL,APRSCN+1759 ;POINT TO LAST BYTE OF LINE 22
0E22'  11 072F*                    LD      DE,APRSCN+1839 ;POINT TO LAST BYTE OF LINE 23
0E25'  ED B8                       LDDR                    ;SHIFT LINES DOWN 1
0E27'  23                          INC     HL              ;POINT TO FIRST INSERT BYTE
0E28'                      INDEL5:
0E28'  01 0050                     LD      BC,LINMAX       ;SET LINE LENGTH
0E2B'  CD 0000*                    CALL    CLRMM2          ;CLEAR INSERT LINE
0E2E'  CD 0000*                    CALL    RAMVID          ;REDISPLAY BUFFER
0E31'  C9                          RET
0E32'                      INDEL6:
0E32'  D1                          POP     DE              ;UNLOAD STACK
0E33'  18 F3                       JR      INDEL5
0E35'                      INDEXT:
0E35'  D1                          POP     DE              ;UNLOAD STACK
0E36'  C9                          RET
                           ;
                           ;
0E37'                      SDGRAF::
0E37'  C5                          PUSH    BC
0E38'  C5                          PUSH    BC
0E39'  E5                          PUSH    HL
0E3A'  D5                          PUSH    DE
0E3B'  06 19                       LD      B,CNTLY
0E3D'  CD 0000*                    CALL    VDCHAR
0E40'  D1                          POP     DE
0E41'  E1                          POP     HL
0E42'  C1                          POP     BC
0E43'                      SDG02:
0E43'  7A                          LD      A,D
0E44'  FE 00                       CP      0
0E46'  CA 0E74'                    JP      Z,SDG99
0E49'  7E                          LD      A,(HL)
0E4A'  E6 80                       AND     80H
0E4C'  C2 0E58'                    JP      NZ,SDG05
0E4F'  CD 0E83'                    CALL    SNGRAF
```

```
0E52°               40020   SDG03:
0E52°   23          40040           INC     HL
0E53°   0C          40060           INC     C
0E54°   15          40080           DEC     D
0E55°   C3 0E43°    40100           JP      SDG02
0E58°               40120   SDG05:
0E58°   C5          40140           PUSH    BC
0E59°   E5          40160           PUSH    HL
0E5A°   D5          40180           PUSH    DE
0E5B°   06 1A       40200           LD      B,CNTLZ
0E5D°   CD 0000*    40220           CALL    VDCHAR
0E60°   D1          40240           POP     DE
0E61°   E1          40260           POP     HL
0E62°   C1          40280           POP     BC
0E63°   C5          40300           PUSH    BC
0E64°   E5          40320           PUSH    HL
0E65°   D5          40340           PUSH    DE
0E66°   CD 0E83°    40360           CALL    SNGRAF
0E69°   06 19       40380           LD      B,CNTLY
0E6B°   CD 0000*    40400           CALL    VDCHAR
0E6E°   D1          40420           POP     DE
0E6F°   E1          40440           POP     HL
0E70°   C1          40460           POP     BC
0E71°   C3 0E52°    40480           JP      SDG03
0E74°               40500   SDG99:
0E74°   C1          40520           POP     BC
0E75°   3A 0FF2°    40540           LD      A,(RVFLG)
0E78°   FE 00       40560           CP      0
0E7A°   C8          40580           RET     Z
0E7B°   C5          40600           PUSH    BC
0E7C°   06 1A       40620           LD      B,CNTLZ
0E7E°   CD 0000*    40640           CALL    VDCHAR
0E81°   C1          40660           POP     BC
0E82°   C9          40680           RET
                    40700   ;
                    40720   ;
0E83°               40740   SNGRAF:
0E83°   C5          40760           PUSH    BC
0E84°   E5          40780           PUSH    HL
0E85°   D5          40800           PUSH    DE
0E86°   7E          40820           LD      A,(HL)
0E87°   E6 7F       40840           AND     7FH
0E89°   32 0EFE°    40860           LD      (GRCHAR),A
0E8C°   21 0EFE°    40880           LD      HL,GRCHAR
0E8F°   16 01       40900           LD      D,1
0E91°   CD 0000*    40920           CALL    VDGRAF
0E94°   D1          40940           POP     DE
0E95°   E1          40960           POP     HL
0E96°   C1          40980           POP     BC
0E97°   C9          41000           RET
                    41020   ;
                    41040   ;
```

```
0E98'                     BUFSET:
0E98'   21 0EEE'                  LD      HL,FLAGS
0E9B'   01 0102                   LD      BC,ENDFLG-FLAGS-1
0E9E'   CD 0000*                  CALL    CLRMEM
0EA1'   C9                        RET
                          ;
                          ;
                          ;THIS SECTION CONTAINS ALL OF THE SUPERVISOR DEPENDENT ROUTINES.
                          ;
                          ;
                          ;EXECUTE A TRSDOS COMMAND AND RETURN TO HERE
                          ;
                          ;
                          ;CONVERT FROM HEX TO ASCII-HEX
                          ;
0EA2'                     BINHEX:
0EA2'   3E 18                     LD      A,SBNHEX
0EA4'   CF                        RST     8
0EA5'   C9                        RET
                          ;
                          ;
                          ;INITIALIZE THE KEYBOARD
0EA6'                     KBINIT:
0EA6'   3E 01                     LD      A,SKBINT        ;CLEAR KEYBOARD
0EA8'   CF                        RST     8               ;SUPERVISOR CALL
0EA9'   C9                        RET
                          ;
                          ;
                          ;READ FROM THE VIDEO SCREEN, B=ROW, C=COLUMN, D=LENGTH, HL=BUFFER
0EAA'                     VDREAD:
0EAA'   3E 08                     LD      A,SVDRED        ;READ VIDEO
0EAC'   CF                        RST     8               ;SUPERVISOR CALL
0EAD'   C2 03C3'                  JP      NZ,DISERR       ;VIDEO ERROR
0EB0'   C9                        RET
                          ;
                          ;
                          ;SEND A MESSAGE TO VIDEO AND WAIT FOR RESPONSE, HL=MSG POINTER, B=LENGTH
                          ;                                          DE=TEXT BUFFER, C=LENGTH
0EB1'                     VIDKEY:
0EB1'   3E 0C                     LD      A,SVDKEY        ;DISPLAY MESSAGE AND GET LINE
0EB3'   CF                        RST     8               ;SUPERVISOR CALL
0EB4'   C2 03C3'                  JP      NZ,DISERR       ;VIDEO ERROR
0EB7'   C9                        RET
                          ;
                          ;
                          ;TURN CURSOR ON
0EB8'                     CURSON::
0EB8'   06 01                     LD      B,1             ;CURSOR ON
0EBA'                     CURS:
0EBA'   3E 1A                     LD      A,SCURSP        ;SET CURSOR FUNCTION
0EBC'   CF                        RST     8               ;SUPERVISOR CALL
0EBD'   C9                        RET
```

```
                          ;
                          ;
                          ;TURN CURSOR OFF
0EBE'                     CUROFF::
0EBE'     06 00                   LD      B,0             ;CURSOR OFF
0EC0'     18 F8                   JR      CUR5
                          ;
                          ;
                          ;SET SCROLL TO PROTECT SCREEN, B=NUMBER OF LINES AT TOP
0EC2'                     SETSCR:
0EC2'     06 17                   LD      B,23
0EC4'     3E 18                   LD      A,SCROLL        ;SET SCROLL LENGTH
0EC6'     CF                      RST     8               ;SUPERVISOR CALL
0EC7'     C9                      RET
                          ;
                          ;
                          ;INITIALIZE THE SCREEN TO BLANKS, 80 CHARS, NORMAL VIDEO
0EC8'                     SNCINT:
0EC8'     06 01                   LD      B,1             ;80 CHARACTERS
0ECA'     48                      LD      C,B             ;NORMAL MODE VIDEO
0ECB'     C3 0000*                JP      VDINIT          ;INIT VIDEO SCREEN
                          ;
                          ;****************** THESE ARE THE LINE PRINTER ROUTINES **********
                          ;
                          ;INITIALIZE THE PRINTER , B=PAGE LENGTH, C=LINES PER PAGE, D=LINE LENGTH
0ECE'                     PRINIT:
0ECE'     3E 11                   LD      A,SPRINT        ;INIT PRINTER FUNCTION
0ED0'     CF                      RST     8               ;SUPERVISOR CALL
0ED1'     C9                      RET
                          ;
                          ;
                          ;OUTPUT A CHAR TO THE PRINTER, B=CHARACTER
0ED2'                     PRCHAR:
0ED2'     3E 12                   LD      A,SPRCHR        ;PRINT CHAR FUNCTION
0ED4'     CF                      RST     8               ;SUPERVISOR CALL
0ED5'     C2 03C3'                JP      NZ,DISERR
0ED8'     C9                      RET
                          ;
                          ;
                          ;PRINT A LINE OF TEXT TO THE PRINTER WITH RETURN, HL=TEXT, B=LENGTH
0ED9'                     PRLCR:
0ED9'     0E 0D                   LD      C,RETURN        ;RETURN AT END OF LINE
                          ;
                          ;
                          ;PRINT A LINE OF TEXT TO PRINTER
0EDB'                     PRLINE:
0EDB'     3E 13                   LD      A,SPRLIN        ;PRINT LINE FUNCTION
0EDD'     CF                      RST     8               ;SUPERVISOR CALL
0EDE'     C2 03C3'                JP      NZ,DISERR       ;PRINTER ERROR
0EE1'     C9                      RET
                          ;
                          ;
```

```
                        ;**************** THESE ROUTINE ARE FOR FILE CONTROL ****************
                        ;
                        ;KILL A FILE, DE=DCB
0EE2'                   KILL:
0EE2'   3E 29                   LD      A,SKILL         ;KILL A FILE FUNCTION
0EE4'   CF                      RST     8               ;SUPERVISOR CALL
0EE5'   C2 03C3'                JP      NZ,DISERR       ;FILE ERROR
0EE8'   C9                      RET
                        ;
                        ;
                        ;LOOKUP A SINGLE BYTE ENTRY IN A TABLE AT (HL) B=ENTRY TO SEARCH FOR
                        ;ON EXIT HL CONTAIN JUMP ADDRESS
                        ;
0EE9'                   LOOKUP::
0EE9'   3E 1C                   LD      A,28
0EEB'   CF                      RST     8
0EEC'   C9                      RET
                        ;
                        ;
                        ;**********************************************************
                        ;
                        ;SYSTEM CONTROL - SUPERVISOR FUNCTION CODES
                        ;
0000                    SINTIO  EQU     0               ;INITIALIZES ALL I/O DRIVERS
0002                    SSTUSR  EQU     2               ;SETS UP A USER DEFINED SVC
0003                    SSTBRK  EQU     3               ;SETS UP BREAK KEY PROCESSING PROGRAM
000F                    SDSKID  EQU     15              ;READS A DISKETTE ID
0019                    STIMER  EQU     25              ;SET TIMER TO INTERRUPT PROGRAM
0024                    SJPDOS  EQU     36              ;RETURNS TO TRSDOS
0025                    SDSCMD  EQU     37              ;SENDS TRSDOS A CMD THEN RET TO TRSDOS
0026                    SRTCMD  EQU     38              ;SEND TRSDOS A CMD AND RET TO CALLER
0027                    SERROR  EQU     39              ;DISPLAYS "ERROR NUMBER"
0034                    SERMSG  EQU     52              ;RETURNS ERR MSG TO BUFFER
                        ;
                        ;
                        ;KEYBOARD - SUPERVISOR FUNCTION CODES
                        ;
0001                    SKBINT  EQU     1               ;CLEARS STORED KEYSTROKES
0004                    SKBCHR  EQU     4               ;GETS A CHAR FROM KEYBOARD
0005                    SKBLIN  EQU     5               ;GETS A LINE FROM KEYBOARD
000C                    SVDKEY  EQU     12              ;DISPLAY A MESSAGE AND GET LINE FROM KB
                        ;
                        ;
                        ;VIDEO DISPLAY - SUPERVISOR FUNCTION CODES
                        ;
0007                    SVDINT  EQU     7               ;INITIALIZES DISPLAY
0008                    SVDCHR  EQU     8               ;SENDS A CHAR, SCROLL MODE
0009                    SVDLIN  EQU     9               ;SENDS A LINE, SCROLL MODE
000A                    SVDGRF  EQU     10              ;SENDS CHAR, GRAPHICS MODE
000B                    SVDRED  EQU     11              ;READS CHAR, GRAPHICS MODE
000C                    SVDKEY  EQU     12              ;DISPLAYS MSG AND GETS LINE FROM KB
001A                    SCURSR  EQU     26              ;TURNS CURSOR ON OR OFF
```

```
0018    SCROLL  EQU     27          ;SETS NUMBER OF LINES AT TOP OF
        ;                           ;DISPLAY WHICH ARE NOT SCROLLED
005E    SVDRAM  EQU     94          ;TRANSFER VIDEO AND RAM
        ;
        ;
        ;LINE PRINTER - SUPERVISOR FUNCTION CODES
        ;
0011    SPRINT  EQU     17          ;INITIALIZES THE LINE PRINTER DRIVER
0012    SPRCHR  EQU     18          ;SENDS A CHAR TO THE PRINTER
0013    SPRLIN  EQU     19          ;SENDS A LINE TO THE PRINTER
        ;
        ;
        ;FILE ACCESS - SUPERVISOR FUNCTION CODES
0021    SLOCAT  EQU     33          ;RETURNS THE CURRENT RECORD NUMBER
0022    SRDNXT  EQU     34          ;GETS NEXT RECORD (SEQUENTIAL ACCESS)
0023    SDIRRD  EQU     35          ;READS SPECIFIED RECORD (DIRECT ACCESS)
0028    SOPEN   EQU     40          ;SETS UP ACCESS TO NEW OR EXISTING FILE
0029    SKILL   EQU     41          ;DELETES THE FILE FROM THE DIRECTORY
002A    SCLOSE  EQU     42          ;TERMINATES ACCESS TO AN OPEN FILE
002B    SWRNXT  EQU     43          ;WRITES NEXT RECORD (SEQUENTIAL ACCESS)
002C    SDIRWR  EQU     44          ;WRITES SPECIFIED RECORD (DIRECT )
        ;
        ;
        ;COMPUTATIONAL - SUPERVISOR FUNCTION CODES
        ;
0014    SRANDM  EQU     20          ;PROVIDES A RANDOM NUMBER (0,254)
0015    SBNDEC  EQU     21          ;CONVERTS BINARY TO DECIMAL AND BACK
0016    SSTCMP  EQU     22          ;COMPARES TWO TEXT STRINGS
0017    SMPYDV  EQU     23          ;PERFORMS 8 BIT * 16 BIT MULTIPLICATION
        ;                           ;AND 16 BIT / 8 BIT DIVISION
0018    SBNHEX  EQU     24          ;CONVERTS BINARY TO ASCII AND BACK
002D    SDATE   EQU     45          ;SETS OR RETURNS TIME AND DATE
0030    SPARSR  EQU     48          ;FINDS ALPHANUMERIC PARAMETERS IN TEXT
0031    SSTRSH  EQU     49          ;LOOKS FOR A STRING INSIDE A TEXT BUFFER
        ;
        ;
        ;SERIAL COMMUNICATIONS - SUPERVISOR FUNCTION CODES
        ;
0037    SRS232  EQU     55          ;SET OR RESET CH A OR B FOR SERIAL I/O
0060    SARCV   EQU     96          ;CHANNEL A RECEIVE
0061    SATX    EQU     97          ;CHANNEL A TRANSMIT
0062    SBRCV   EQU     98          ;CHANNEL B RECEIVE
0063    SBTX    EQU     99          ;CHANNEL B TRANSMIT
        ;
0EED'   FLDCNT: DS      1           ;FIELD COUNTER
        ;
        ;
0000    BUFADR  EQU     0           ;BUFFER ADDRESS
0002    RECADR  EQU     2           ;RECORD ADDRESS
0004    EODAD   EQU     4           ;END OF DATA ADDRESS
0006    RW      EQU     6           ;READ OR READ/WRITE FLAG
0007    RL      EQU     7           ;RECORD LENGTH
```

```
0008                FV        EQU      8                    ;FIXED OR VARIABLE FLAG
0009                CC        EQU      9                    ;CREATION CODE
000A                ELM       EQU      10                   ;END OF LIST MARKER
                    ;
                    ;
                    ;
                    ;*************** THESE ARE THE VALIDATION FLAGS *******************
                    ;
0EEE'               FLAGS:
0EEE'               BLFLAG::    DS       1                  ;BLANK FLAG
0EEF'               ALFLAG::    DS       1                  ;ALPHA FLAG
0EF0'               NUFLAG::    DS       1                  ;NUMERIC FLAG
0EF1'               DPFLAG::    DS       1                  ;DECIMAL POINT FLAG
0EF2'               SVFLAG::    DS       1                  ;SIGNED VALUE FLAG
0EF3'               YNFLAG::    DS       1                  ;YES/NO FLAG
0EF4'               DCFLAG::    DS       1                  ;DOLLARS AND CENTS FLAG
0EF5'               D2FLAG::    DS       1                  ;DOLLARS/CENTS WITH FRACTION FLAG
0EF6'               IVFLAG::    DS       1                  ;INVISIBLE FIELD FLAF
0EF7'               CFFLAG::    DS       1                  ;COMPUTED FIELD FLAG
0EF8'               DVFLAG::    DS       1                  ;DEFAULT VALUE FLAG
0EF9'               KFFLAG::    DS       1                  ;KEY FIELD FLAG
0EFA'    00         DAFLAG::    DB       0                  ;DOWN ARROW FLAG
0EFB'               RJFLAG::    DS       1                  ;RIGHT JUSTIFY FLAG
0EFC'               VNFLAG::    DS       1                  ;VALID NUMERIC FLAG
0EFD'               VFFLAG::    DS       1                  ;VERIFY FIELD FLAG
0EFE'               GRCHAR::    DS       1                  ;GRAPHICS CHARACTER
0EFF'               PWFLAG::    DS       1                  ;PASSWORD FLAG
0F00'               LJFLAG::    DS       1                  ;LEFT JUSTIFY FLAG
                    ;
                    ;
0F01'               DL1:      DS       80                   ;BUFFER MOVEMENT SPACE
0F51'               DLBUFF:   DS       80                   ;LINE BUFFER
0FA1'               DL2:      DS       80                   ;BUFFER MOVEMENT SPACE
                    ;
                    ;SCREEN STATUS FLAGS
                    ;
0FF1'               ENDFLG:
0FF1'    00                   DB       HOLD                 ;RESERVED
0FF2'    00         RVFLG:    DB       HOLD                 ;REVERSE VIDEO FLAG
0FF3'    00         GRAFLG:   DB       HOLD                 ;GRAPHICS MODE FLAG
                    ;
0FF4'               FLDTBP:   DS       2                    ;POINTER INTO FIELD TABLE
                    ;
                    ;FIELD TABLE LOOKS LIKE THIS:  BYTE 1 - FIELD NUMBER
                    ;                              BYTE 2 - ROW ON SCREEN
                    ;                              BYTE 3 - COLUMN
                    ;                              BYTE 4 - FIELD LENGTH
                    ;                              BYTE 5- LBYTE, VALDT. POINTER
                    ;                              BYTE 6 - HBYTE, VALDT. POINTER
                    ;
                    ;                              LAST BYTE = EOF (0FFH)
                    ;
```

```
                    ;
                    ;
0FF6                FLDLOC:: DS      2               ;FIELD LOCATION
0FF8                FLDLEN:  DS      1               ;FIELD LENGTH
                    ;THIS IS THE INPUT DISPATCH TABLE FOR THE SCREEN EDITOR
                    ;
0FF9                EDITCH:
0FF9    1C                   DB      LEFTA           ;LEFT ARROW
0FFA    0AE0                 DW      EDLFTA
0FFC    1D                   DB      RIGHTA          ;RIGHT ARROW
0FFD    0AE5                 DW      EDRGTA
0FFF    1E                   DB      UPA             ;UP ARROW
1000    0AEA                 DW      EDUPA
1002    1F                   DB      DOWNA           ;DOWN ARROW
1003    0B01                 DW      EDDWNA
1005    01                   DB      F1              ;FUNCTION KEY 1
1006    0B17                 DW      EDF1
1008    02                   DB      F2              ;FUNCTION KEY 2
1009    0B1D                 DW      EDF2
100B    04                   DB      CNTLD           ;CONTROL D
100C    0B23                 DW      EDCTLD
100E    05                   DB      CNTLE           ;CONTROL E
100F    0B29                 DW      EDCTLE
1011    06                   DB      CNTLF           ;CONTROL F
1012    0B2C                 DW      EDCTLF
1014    07                   DB      CNTLG           ;CONTROL G
1015    0B2F                 DW      EDCTLG
1017    08                   DB      CNTLH           ;CONTROL H
1018    0B37                 DW      EDCTLH
101A    09                   DB      CNTLI           ;CONTROL I
101B    0B42                 DW      EDCTLI
101D    0B                   DB      CNTLK           ;CONTROL K
101E    0B48                 DW      EDCTLK
1020    0C                   DB      CNTLL           ;CONTROL L
1021    0B4E                 DW      EDCTLL
1023    0D                   DB      CNTLM           ;CONTROL M
1024    0B54                 DW      EDCTLM
1026    11                   DB      CNTLQ           ;CONTROL Q
1027    0B5A                 DW      EDCTLQ
1029    12                   DB      CNTLR           ;CONTROL R
102A    0B5D                 DW      EDCTLR
102C    13                   DB      CNTLS           ;CONTROL S
102D    0B7E                 DW      EDCTLS
102F    1B                   DB      ESC             ;ESCAPE KEY
1030    0B87                 DW      EDESC
1032    FF                   DB      EOF
                    ;
                    ;
                    ;
                    ;THIS IS THE CHARACTER TABLE FOR THE GRAPHICS MODE OF THE EDITOR
                    ;
1033                GRCHTB:
```

```
1033'   08      47300   DB   BCKSP
1034'   0BD4'   47320   DW   GRAPH5
1036'   20      47340   DB   SPACE
1037'   0BD4'   47360   DW   GRAPH5
1039'   41      47380   DB   "A"        ;CONVERTED CHAR
103A'   0BFA'   47400   DW   GRCONA
103C'   42      47420   DB   "B"
103D'   0BFE'   47440   DW   GRCONB
103F'   43      47460   DB   "C"
1040'   0C02'   47480   DW   GRCONC
1042'   44      47500   DB   "D"
1043'   0BD1'   47520   DW   GRAPHC
1045'   45      47540   DB   "E"
1046'   0BD1'   47560   DW   GRAPHC
1048'   46      47580   DB   "F"
1049'   0BD1'   47600   DW   GRAPHC
104B'   47      47620   DB   "G"
104C'   0BD1'   47640   DW   GRAPHC
104E'   48      47660   DB   "H"
104F'   0BD1'   47680   DW   GRAPHC
1051'   49      47700   DB   "I"
1052'   0BD1'   47720   DW   GRAPHC
1054'   4A      47740   DB   "J"
1055'   0BD1'   47760   DW   GRAPHC
1057'   4B      47780   DB   "K"
1058'   0BD1'   47800   DW   GRAPHC
105A'   4C      47820   DB   "L"
105B'   0BD1'   47840   DW   GRAPHC
105D'   4D      47860   DB   "M"
105E'   0BD1'   47880   DW   GRAPHC
1060'   4E      47900   DB   "N"
1061'   0BD1'   47920   DW   GRAPHC
1063'   4F      47940   DB   "O"
1064'   0BD1'   47960   DW   GRAPHC
1066'   50      47980   DB   "P"
1067'   0C06'   48000   DW   GRCONP
1069'   51      48020   DB   "Q"
106A'   0C0A'   48040   DW   GRCONQ
106C'   52      48060   DB   "R"
106D'   0C0E'   48080   DW   GRCONR
106F'   53      48100   DB   "S"
1070'   0C12'   48120   DW   GRCONS
1072'   54      48140   DB   "T"
1073'   0BD1'   48160   DW   GRAPHC
1075'   55      48180   DB   "U"
1076'   0BD1'   48200   DW   GRAPHC
1078'   56      48220   DB   "V"
1079'   0BD1'   48240   DW   GRAPHC
107B'   57      48260   DB   "W"
107C'   0BD1'   48280   DW   GRAPHC
107E'   58      48300   DB   "X"
107F'   0BD1'   48320   DW   GRAPHC
```

```
1081'  59        48340   DB   "Y"
1082'  0BD1'     48360   DW   GRAPHC
1084'  5A        48380   DB   "Z"
1085'  0BC1'     48400   DW   GRAPHC
1087'  31        48420   DB   "1"
1088'  0C16'     48440   DW   GRCON1
108A'  32        48460   DB   "2"
108B'  0C1A'     48480   DW   GRCON2
108D'  33        48500   DB   "3"
108E'  0C1E'     48520   DW   GRCON3
1090'  34        48540   DB   "4"
1091'  0C22'     48560   DW   GRCON4
1093'  35        48580   DB   "5"
1094'  0C26'     48600   DW   GRCON5
1096'  36        48620   DB   "6"
1097'  0C2A'     48640   DW   GRCON6
1099'  08        48660   DB   BCKSP
109A'  0C2E'     48680   DW   GRBKSP
109C'  1B        48700   DB   ESC
109D'  0C34'     48720   DW   GRESC
109F'  01        48740   DB   F1
10A0'  0C37'     48760   DW   GRF1
10A2'  02        48780   DB   F2
10A3'  0C59'     48800   DW   GRF2
10A5'  04        48820   DB   CNTLD        ;CONTROL D
10A6'  0C5F'     48840   DW   GRCTLD
10A8'  07        48860   DB   CNTLG
10A9'  0C76'     48880   DW   GRCTLG
10AB'  08        48900   DB   CNTLH        ;CONTROL H
10AC'  0C65'     48920   DW   GRCTLH
10AE'  09        48940   DB   CNTLI        ;CONTROL I
10AF'  0C70'     48960   DW   GRCTLI
10B1'  0B        48980   DB   CNTLK        ;CONTROL K
10B2'  0C7E'     49000   DW   GRCTLK
10B4'  0C        49020   DB   CNTLL        ;CONTROL L
10B5'  0C84'     49040   DW   GRCTLL
10B7'  0D        49060   DB   CNTLM        ;CONTROL M
10B8'  0C8A'     49080   DW   GRCTLM
10BA'  11        49100   DB   CNTLQ        ;CONTROL Q
10BB'  0C90'     49120   DW   GRCTLQ
10BD'  12        49140   DB   CNTLR        ;CONTROL R
10BE'  0C93'     49160   DW   GRCTLR
10C0'  1C        49180   DB   LEFTA
10C1'  0C84'     49200   DW   GRLFTA
10C3'  1F        49220   DB   DOWNA
10C4'  0CB9'     49240   DW   GRDWNA
10C6'  1D        49260   DB   RIGHTA
10C7'  0CD0'     49280   DW   GRRGTA
10C9'  1E        49300   DB   UPA
10CA'  0CD5'     49320   DW   GRUPA
10CC'  FF        49340   DB   EOF
                 49360 ;THIS IS THE TABLE OF VALID VALIDATION REQUESTS
```

```
                            49380   ;
10CD'   42 4C               49400   VALLST::  DB     "BL"       ;BLANK
10CF'   41 4C               49420             DB     "AL"       ;ALPHABETIC
10D1'   4E 55               49440             DB     "NU"       ;NUMERIC
10D3'   44 50               49460             DB     "DP"       ;DECIMAL POINT
10D5'   53 56               49480             DB     "SV"       ;SIGNED VALUE
10D7'   59 4E               49500             DB     "YN"       ;YES/NO
10D9'   44 43               49520             DB     "DC"       ;DOLLARS AND CENTS
10DB'   44 32               49540             DB     "D2"       ;DOLLARS AND CENTS WITH FRACTIONS
10DD'   49 56               49560             DB     "IV"       ;INVISIBLE FIELD
10DF'   43 46               49580             DB     "CF"       ;COMPUTED FIELD
10E1'   44 56               49600             DB     "DV"       ;DEFAULT VALUE
10E3'   52 4A               49620             DB     "RJ"       ;RIGHT JUSTIFY
10E5'   56 4E               49640             DB     "VN"       ;VALID NUMERIC
10E7'   56 46               49660             DB     "VF"       ;VERIFY
10E9'   4C 4A               49680             DB     "LJ"       ;LEFT JUSTIFY
10EB'   4E 53               49700             DB     "NS"       ;NON-STORE
                            49720   ;
10ED'   FF                  49740             DB     EOF
                            49760   ;
                            49780   ;
                            49800   ;
10EE'                       49820   FLDBUF:  DS      80         ;FIELD BUFFER
113E'                       49840   CURFLN:  DS      1          ;CURRENT FIELD LENGTH
113F'                       49860   FLOCPR:  DS      2          ;CURRENT FIELD LOCATION POINTER
1141'                       49880   CURFDN:  DS      1          ;CURRENT FIELD NUMBER
1142'                       49900   VALLOC:  DS      2          ;LOCATION OF CURRENT VALIDATIONS
1144'                       49920   MAXRCL:  DS      1
                            49940   ;
                            49960   ;
                            49980   ;
1145'                       50000   NSCFFD:  DS      1
                            50020   ;
                            50040            END     DATAGRAM
Symbols:
ALFLAG  0EEFI'  APPLIC  0A72*   APPNME  0ACD*   APRSCN  0E23*
BBEMSG  0555'   BCKSP   0008    BFIELD  005B    BINHEX  0EA2'
BL80    051F'   BLFLAG  0EEEI'  BLINE   0184'   BREAK   0003
BRKSET  0011*   BUFADR  0000    BUFSET  0E98'   CAPMSG  09A1'
CC      0009    CDDMSG  065F'   CDFMSG  096D'   CDFPL2  0899'
CDKMSG  0985'   CENTER  013E'   CFFLAG  0EF7I'  CHFMSG  0630'
CHRMSG  0681'   CKFPL1  0882'   CLOSE   0A50*   CLR24   0D98*
CLRDC1  0027*   CLRDC2  002A*   CLRDL1  091D'   CLRMEM  0E9F*
CLRMM2  0E2C*   CLRPRT  0654'   CNC100  0192'   CNC99   0186'
CNTL0   007C    CNTL6   007E    CNTLB   0002    CNTLC   0003
CNTLD   0004    CNTLE   0005    CNTLF   0006    CNTLG   0007
CNTLH   0008    CNTLI   0009    CNTLJ   000A    CNTLK   000B
CNTLL   000C    CNTLM   000D    CNTLN   000E    CNTLO   000F
CNTLP   0010    CNTLQ   0011    CNTLR   0012    CNTLS   0013
CNTLT   0014    CNTLU   0015    CNTLV   0016    CNTLW   0017
CNTLX   0018    CNTLY   0019    CNTLZ   001A    COMFLS  086C'
COMPL1  0874'   COMPL2  087D'   COMPLB  0877I'  CRTDBS  08A3'
```

| | | | | | | | |
|---|---|---|---|---|---|---|---|
| CRTKYF | 0A03' | CUR5 | 0EBA' | CURFDN | 1141' | CURFLN | 113E' |
| CUROFF | 0EBEI' | CURSON | 0EB8I' | D2FLAG | 0EF5I' | DAFLAG | 0EFAI' |
| DATA4 | 002F' | DATA5 | 0039' | DATAGR | 0000I' | DBDESC | 06F3' |
| DBDSC | 06F3I' | DBRECL | 0A04* | DBSMSG | 06F9' | DCB1 | 0A4D* |
| DCB2 | 08DD* | DCFLAG | 0EF4I' | DDA | 00FF | DECF05 | 0352' |
| DELAY | 026C* | DELCH5 | 0DC3' | DELCHR | 0DA1' | DELINE | 0DDA' |
| DIRRD | 0000* | DIRWR | 0000* | DISERR | 03C3' | DL1 | 0F01' |
| DL2 | 0FA1' | DLA | 00FC | DLBUF= | 0F51' | DMP1 | 09C8' |
| DMP2 | 09D0' | DMP3 | 09D7' | DMP4 | 09E1' | DMP5 | 09EB' |
| DMP6 | 09F6' | DMPMSG | 09C2' | DOWNA | 001F | DPFLAG | 0EF1I' |
| DRA | 00FD | DSMEN2 | 0003* | DUA | 00FE | DVFLAG | 0EF8I' |
| EBBMSG | 0528' | ECFLD | 00FD | EDCTLD | 0323' | EDCTLE | 0B29' |
| EDCTLF | 0B2C' | EDCTLG | 0B2F' | EDCTLH | 0B37' | EDCTLI | 0B42' |
| EDCTLK | 0B48' | EDCTLL | 0B4E' | EDCTLM | 0B54' | EDCTLQ | 0B5A' |
| EDCTLR | 0B5D' | EDCTLS | 0B7E' | EDDWN5 | 0B13' | EDDWNA | 0B01' |
| EDESC | 0387' | EDF1 | 0B17' | EDF2 | 0B1D' | EDGRC | 0B91' |
| EDHPSC | 0CF0* | EDHSA | 0CF7' | EDHSB | 0D04' | EDITCH | 0FF9' |
| EDITD2 | 0056' | EDITOR | 004A' | EDITR5 | 0074' | EDLFTA | 0AE0' |
| EDR05 | 0B71' | EDRGTA | 0AE5' | EDUPA | 0AEA' | EDUPA5 | 0AFC' |
| EDVDCH | 0B8A' | EFIELD | 005D | EIAMSG | 06AD' | EIVMSG | 0927' |
| ELM | 000A | END999 | 0000* | ENDAU9 | 0A3E* | ENDAPP | 0A94* |
| ENDAU5 | 0A93' | ENDAU9 | CA96' | ENDAUT | 0A6F' | ENDBBE | 0582' |
| ENDBL8 | 0528' | ENDCAP | 09C2' | ENDCDD | 0681' | ENDCDF | 0985' |
| ENDCDK | 09A1' | ENDCHF | 0641' | ENDCHR | 06AD' | ENDCRE | 0AB4* |
| ENDDBD | 06F9' | ENDDBS | 06FF' | ENDDMP | 0A03' | ENDEBB | 0555' |
| ENDEIA | 06D0' | ENDEIV | 095E' | ENDEOA | 06F3' | ENDEOL | 05D7' |
| ENDECS | 05FF' | ENDFCT | 0629' | ENDFLG | 0FF1' | ENDFVD | 0654' |
| ENDICH | 0821' | ENDIOD | 076C' | ENDISD | 0736' | ENDKY1 | 0705' |
| ENDPR5 | 0B88* | ENDRLT | 0619' | ENDSCN | 0966' | ENDSEC | 07AA' |
| ENDSEG | 07E7' | ENDSTT | 051F' | ENDWFF | 05B1' | ENTER | 000D |
| EOAMSG | 06D0' | EOCAD | 0004 | EOF | 00FF | EOLMSG | 05B1' |
| EOSMSG | 05C7' | EOV | 0000 | ESC | 001B | F1 | 0001 |
| F2 | 0002 | FBUF1 | 088D* | FBUF2 | 0898* | FCTM | 03F3' |
| FCTMSG | 0619' | FERR09 | 039F' | FERR10 | 03AA' | FERR11 | 0385' |
| FERR12 | 03C0' | FERR5 | 0373' | FERR6 | 037E' | FERR7 | 0389' |
| FERR8 | 0394' | FFIELD | 007D | FLAGS | 0EEE' | FLD04 | 020A' |
| FLD05 | 01E6' | FLD06 | 020D' | FLD07 | 024D' | FLD99 | 0259' |
| FLDBUF | 10EF' | FLDCHK | 01C1' | FLDCNT | 0EED' | FLDLEN | 0FF8' |
| FLDLOC | 0FF6I' | FLDTBL | 0A37* | FLDTBP | 0FF4' | FLDVAL | 0A58* |
| FLDCPR | 113F' | FNB02 | 02E8' | FNB04 | 02F1' | FNB05 | 02F2' |
| FNB06 | 032E' | FNB07 | 0339' | FNB75 | 033E' | FND05 | 0274' |
| FND07 | 02B9' | FND100 | 041A' | FND101 | 0422' | FND99 | 03FC' |
| FNDBEG | 02D8' | FNDECF | 0343' | FNDEDI | 0AD1' | FNDEDP | 0ACB' |
| FNDEN9 | 0360' | FNDEND | 0357' | FNDERR | 0366' | FNDFIN | 0356' |
| FNDFLC | 0000* | FNDFLD | 0274I' | FNDRET | 0862' | FNDSTR | 02E2' |
| FNDWH5 | 02C9' | FNDWHF | 026C' | FV | 0008 | FVDMSG | 0641' |
| GCURSR | 012D' | GETIFN | 00D9' | GETIN5 | 0106' | GETOFN | 0821' |
| GRAFLG | 0FF3' | GRAMT | 0008* | GRAPH5 | 0BD4' | GRAPH6 | 0BED' |
| GRAPH7 | 0BF3' | GRAPHC | 0BD1' | GRBKSP | 0C2E' | GRCHAR | 0EFEI' |
| GRCHTB | 1033' | GRCON1 | 0C16' | GRCON2 | 0C1A' | GRCON3 | 0C1E' |
| GRCON4 | 0C22' | GRCON5 | 0C26' | GRCON6 | 0C2A' | GRCONA | 0BFA' |
| GRCONB | 0BFE' | GRCONC | 0C02' | GRCONP | 0C06' | GRCONQ | 0C0A' |

| | | | | | | | |
|---|---|---|---|---|---|---|---|
| GRCONR | 0C0E' | GRCONS | 0C12' | GRCTLO | 0C5F' | GRCTLG | 0C76' |
| GRCTLH | 0C65' | GRCTLI | 0C70' | GRCTLK | 0C7E' | GRCTLL | 0C84' |
| GRCTLM | 0C8A' | GRCTLQ | 0C90' | GRCTLR | 0C93I' | GRDWN5 | 0CCB' |
| GRDWNA | 0CB9' | GRESC | 0C34' | GRF1 | 0C37' | GRF1A | 0C42' |
| GRF1B | 0C4F' | GRF2 | 0C59' | GRHPSC | 0C3B* | GRINP | 0BA2' |
| GRINP5 | 0BAE' | GRLFTA | 0CB4' | GRR05 | 0CA7' | GRRGTA | 0CD0' |
| GRUPA | 0CD5' | GRUPA5 | 0CE7' | HOLD | 0000 | ICHMSG | 07E7' |
| IDDMSG | 0736' | INAUTO | 000E* | INCHAR | 0D35* | INDEL4 | 0E1F' |
| INDEL5 | 0E28' | INDEL6 | 0E32' | INDELN | 0DDC' | INDEXT | 0E35' |
| INFILN | 0839' | INFVAL | 0A5A' | INITSC | 0085' | INLINE | 0DD6' |
| INSCBP | 0D59' | INSCH3 | 0D25' | INSCH4 | 0D29' | INSCH5 | 0D34' |
| INSCH6 | 0D67' | INSCH7 | 0D89' | INSCH8 | 0D91' | INSCH9 | 0D73' |
| INSCHR | 0D0E' | INSCXT | 0D94' | ISDMSG | 0705' | IVFLAG | 0EF6I' |
| KBCHAR | 0CF8* | KBINIT | 0EA6' | KBLINE | 0000* | KFFLAG | 0EF9I' |
| KILL | 0EE2' | KY1MSG | 06FF' | LEFTA | 001C | LINLGH | 0050 |
| LINMAX | 0050 | LJFLAG | 0F00I' | LOCATE | 0000* | LOCBLK | 08EA' |
| LOCEFD | 08FE' | LOCNBL | 08E3' | LOCSFD | 08F1' | LOOKUP | 0EE9I' |
| MAPD1 | 0ABF' | MAXRCL | 1144' | MLTPLY | 0DFF* | MOVDP3 | 0A86' |
| MOVL5 | 0173' | MOVR5 | 017F' | MOVRG | 017B' | NORMAL | 00F9 |
| NSCFFD | 1145' | NUFLAG | 0EF0I' | OPEN | 0A4A* | PERMSG | 0436' |
| PL1 | 0A47* | PL2 | 08D7* | PRCHAR | 0ED2' | PRIDDM | 0917' |
| PRINIT | 0ECE' | PRIS05 | 090C' | PRISDM | 0908I' | PRLCR | 0ED9' |
| PRLINE | 0EDB' | PRTEHS | 0CEC' | PRTEIV | 0A53' | PWFLAG | 0EFFI' |
| RAMVID | 0E2F* | RBUF1 | 088F* | RBUF2 | 089A* | READNX | 010C* |
| RECADR | 0002 | RESCUR | 0BCB* | RETCM5 | 0968' | RETCMD | 0966' |
| RETURN | 000D | REVERS | 00FA | RIGHTA | 001D | RJFLAG | 0EFBI' |
| RL | 0007 | RLTL | 03DD' | RLTL2 | 03E9' | RLTLMG | 05FF' |
| ROWMAX | 0018 | RSDPL1 | 088DI' | RVFLG | 0FF2' | RW | 0006 |
| S5 | 0198' | S6 | 01A8' | SARCV | 0060 | SATX | 0061 |
| SAVCUR | 0BC5* | SBNDEC | 0015 | SBNHEX | 0018 | SBRCV | 0062 |
| SBTX | 0063 | SCLOSE | 002A | SCNCOM | 095E' | SCNPRT | 0D00* |
| SCROLL | 001B | SCURSR | 001A | SDATA5 | 00BC' | SDATA6 | 00D2' |
| SDATAD | 0095' | SDATE | 002D | SDG02 | 0E43' | SDG03 | 0F52' |
| SDG05 | 0E58' | SDG99 | 0E74' | SDGRAF | 0E37I' | SDIRRD | 0023 |
| SDIRWR | 002C | SDSCMD | 0025 | SDSKID | 000F | SEARCH | 0196' |
| SECMSG | 076C' | SEGMSG | 07AA' | SERMSG | 0034 | SERROR | 0027 |
| SETSCR | 0EC2' | SFIELD | 007B | SINCRC | 0124' | SINTIO | 0000 |
| SJPDOS | 0024 | SKBCHR | 0004 | SKBINT | 0001 | SKBLIN | 0005 |
| SKILL | 0029 | SLOCAT | 0021 | SMPYDV | 0017 | SNCINT | 0EC8' |
| SNGRAF | 0E83' | SOPEN | 0028 | SPACE | 0020 | SPARSR | 0030 |
| SPRCHR | 0012 | SPRINT | 0011 | SPRLIN | 0013 | SRANDM | 0014 |
| SRDNXT | 0022 | SRS232 | 0037 | SRTCMD | 0026 | SSDPL1 | 0882' |
| SSTBRK | 0003 | SSTCMP | 0016 | SSTRSH | 0031 | SSTUSR | 0002 |
| STCFLD | 00FB | STIMER | 0019 | STTMSG | 044A' | SVDCHR | 0008 |
| SVDGRF | 000A | SVDINT | 0007 | SVDKEY | 000C | SVDLIN | 0009 |
| SVDRAM | 005E | SVDRED | 0003 | SVFLAG | 0EF2I' | SWRNXT | 002B |
| TAB | 0009 | UN5 | 01AC' | UNSFAR | 01AA' | UPA | 001E |
| VALIDS | 01C7* | VALLOC | 1142' | VALLST | 10CDI' | VALOFF | 0254* |
| VDCHAR | 0E7F* | VDCLER | 0629' | VDGRAF | 0E92* | VDINIT | 0ECC* |
| VDLINE | 0446* | VDLN2 | 0000* | VDREAD | 0EAA' | VFFLAG | 0EFDI' |
| VIDKEY | 0EB1' | VIDR05 | 0000* | VIDRAM | 0DDE* | VNFLAG | 0EFCI' |
| WFFMSG | 0582' | WFIELD | 007E | WRITNX | 00C6* | YNFLAG | 0EF3I' |

No Fatal error(s)

```
;*****************************************************************
;*****************************************************************
;
;
;
;
;
;
;
;
;
;******************************************************************
;

;
;
;

;

;
;
;
;
;

;
;
0000'   VALID::
;
;
;
;

;
                EXTRN   KBLINE,VDGRAF,VDLINE,DELAY,CUROFF,KBCHAR
                EXTRN   VDREAD,VALLST,FNDFLC,VDCHAR,CURSON
                EXTRN   CLRMEM,FLDTBL,VALIDS,DBRECL,KBCHAR
                EXTRN   INTVAL,VALOFF,SETSCR,LASTFN,CLRMM2
                EXTRN   DCB3,PL3,RBUF3,FLDTB3,DCB5,PL5,RBUF5,FLDTB5,XXSCRN
                EXTRN   FNDFLD,FLDLOC,VIDRAM,RAMVID,READNX,OPEN,CLOSE
                EXTRN   DBDSC,FNDRET,COMFLS,PRISDM,RSDPL1,COMPLB
                EXTRN   APRSCN,FBUF3,FBUF5,RESCUR,VLHPSC,SCNPRT
                EXTRN   BLFLAG,ALFLAG,NUFLAG,DPFLAG,SVFLAG,YNFLAG,DCFLAG
                EXTRN   D2FLAG,IVFLAG,CFFLAG,DVFLAG,KEFLAG,RJFLAG,VNFLAG
                EXTRN   VFFLAG,PWFLAG,LJFLAG
;
;
                .LIST
```

```
                  ;*******************************************************************
                  ;
                  ;
                  ;       THIS IS THE MAIN BODY OF THE PROGRAM
                  ;
                  ;
                  ;*******************************************************************
                  ;
                  ;GET FIELD AND CHARACTER VALIDATIONS
                  ;
0000'             FLDVAL::
0000'  21 0000*             LD      HL,VALIDS
0003'  01 0654              LD      BC,1620
0006'  CD 0000*             CALL    CLRMEM
0009'  21 0000*             LD      HL,VALIDS
000C'  22 0D6A'             LD      (VALPTR),HL
000F'  21 0000*             LD      HL,INTVAL
0012'  22 0000*             LD      (VALOFF),HL
0015'  21 0966'             LD      HL,TVBUF
0018'  01 0401              LD      BC,1025
001B'  CD 0000*             CALL    CLRMEM
001E'  3E 00                LD      A,0
0020'  32 095F'             LD      (CURFDN),A      ;START AT FIELD ZERO
0023'  32 08BC'             LD      (VALCTR),A
0026'  21 0966'             LD      HL,TVBUF        ;TEMPORARY BUFFER FOR VALIDATIONS
0029'  22 0D66'             LD      (TVBPTR),HL     ;POINTER INTO TEMPORARY BUFFER
002C'             FLDVA5:
002C'  21 088B'             LD      HL,VALSTR       ;BEGINNING OF VALIDATION STRING
002F'  22 08BD'             LD      (STRPTR),HL     ;SET STRING POINTER TO BEGINNING
0032'  01 0032              LD      BC,50
0035'  CD 0000*             CALL    CLRMM2
0038'  3A 095F'             LD      A,(CURFDN)      ;GET CURRENT FIELD NUMBER
003B'  3C                   INC     A               ;PLUS ONE
003C'  32 095F'             LD      (CURFDN),A      ;SAVE NEW CURRENT FIELD NUMBER
003F'  4F                   LD      C,A
0040'  CD 0000*             CALL    FNDFLC          ;GET FIELD SPECS
0043'  FE FF                CP      EOF             ;OUT OF FIELDS ?
0045'  CA 0123'             JP      Z,COMVAL        ;COMPLETE VALIDATIONS
0048'  22 0963'             LD      (VALLOC),HL     ;LOACTION OF VALIDATIONS
004B'  ED 43 0961'          LD      (FLDCPR),BC     ;FIELD LOCATION POINTER
004F'  7B                   LD      A,E
0050'  32 0960'             LD      (CURFLN),A      ;FIELD LENGTH
0053'  CD 047C'             CALL    REVFLD          ;REVERSE FIELD ON SCREEN
0056'  CD 0061'             CALL    INPVAL          ;INPUT VALIDATIONS
0059'  CD 04FD'             CALL    CORFLD          ;CORRECT FIELD DISPLAY
005C'  CD 0000*             CALL    CURSON
005F'  18 CB                JR      FLDVA5
                  ;
                  ;
```

```
                   ;*****************************************************************
                   ;
                   ;
                   ;        THESE ARE THE MAJOR SUBROUTINES USED BY THE MAIN PROGRAM
                   ;
                   ;
                   ;*****************************************************************
                   ;
0061'              INPVAL:
0061'  3A 0835'            LD      A,(NSFMKR)
0064'  FE FF               CP      EOF
0066'  20 0C               JR      NZ,GETVAL
0068'  3E 4E               LD      A,"N"
006A'  32 0886'            LD      (VALBUF),A
006D'  3E 53               LD      A,"S"
006F'  32 0887'            LD      (VALBUF+1),A
0072'  18 2D               JR      GETVA3
                   ;
0074'              GETVAL:
0074'  3A 088C'            LD      A,(VALCTR)      ;GET VALIDATION COUNTER
0077'  FE 10               CP      16              ;16 YET ?
0079'  28 60               JR      Z,MAXVAL        ;YEP
007B'  21 0684'            LD      HL,INVMSG       ;INPUT VALIDATIONS MESSAGE
007E'  CD 04C5'            CALL    DISMSG          ;DISPLAY ON VIDEO
0081'  CD 0000*            CALL    CURSON
0084'  21 0000             LD      HL,0
0087'  22 0886'            LD      (VALBUF),HL     ;CLEAR VALBUF
008A'  CD 0511'            CALL    PRVLST
008D'  16 00               LD      D,0             ;BUFFER LENGTH
008F'  06 17               LD      B,23            ;LINE POSITION
0091'  0E 15               LD      C,21            ;COLUMN POSITION
0093'  CD 0000*            CALL    VDGRAF          ;SET CURSOR POSITION
0096'  21 0886'            LD      HL,VALBUF       ;INPUT BUFFER FOR VALIDATION
0099'  CD 0653'            CALL    GVAL
009C'  FE 0D               CP      ENTER
009E'  CA 00E1'            JP      Z,TRNVAL
00A1'              GETVA3:
00A1'  21 0886'            LD      HL,VALBUF       ;POINT TO BEGINNING OF VAL
00A4'  46                  LD      B,(HL)          ;1ST CHAR OF VAL
00A5'  23                  INC     HL              ;ADVANCE POINTER
00A6'  4E                  LD      C,(HL)          ;2ND CHAR OF VAL
00A7'  78                  LD      A,B             ;PUT 1ST CHAR IN A
00A8'  FE 0D               CP      ENTER           ;IF ENTER, THEN NO VAL
00AA'  CA 00E1'            JP      Z,TRNVAL
00AD'  CD 045F'            CALL    CHKVAL          ;CHECK IF THIS VAL IS VALID
00B0'  FE 00               CP      0               ;VALID ?
00B2'  28 0F               JR      Z,SETVAL        ;PUT THIS VAL INTO VAL LIST
00B4'              GETVA5:
00B4'  21 06C9'            LD      HL,VERMSG       ;VAL ERROR MESSAGE
00B7'  CD 043D'            CALL    PRTMSG          ;PRINT ERROR ON SCREEN
00BA'  01 03E8             LD      BC,1000         ;DELAY LENGTH
00BD'  CD 0000*            CALL    DELAY           ;LDD DELAY
```

```
00C0'   C3 0074'              JP      GETVAL
                    ;
                    ;
                    ;
                    ;SET VALIDATION FLAG AND PLACE VALIDATION IN VALSTR
                    ;
00C3'               SETVAL:
00C3'   3A 08BC'              LD      A,(VALCTR)      ;VALIDATION COUNTER
00C6'   3C                    INC     A
00C7'   32 08BC'              LD      (VALCTR),A
00CA'   2A 08BD'              LD      HL,(STRPTR)     ;POINTER INTO VALIDATION STRING
00CD'   3E 2C                 LD      A,","           ;SEPARATOR BETWEEN VALIDATIONS
00CF'   77                    LD      (HL),A          ;PUT COMMA INTO VAL STRING
00D0'   23                    INC     HL
00D1'   70                    LD      (HL),B          ;FIRST CHAR OF VAL
00D2'   23                    INC     HL
00D3'   71                    LD      (HL),C          ;SECOND CHAR OF VAL
00D4'   23                    INC     HL              ;READY FOR NEXT TIME
00D5'   22 08BD'              LD      (STRPTR),HL
00D8'   C3 0074'              JP      GETVAL
                    ;
                    ;
                    ;16 VALIDATIONS REACHED, END INPUT FOR THIS FIELD
                    ;
00DB'               MAXVAL:
00DB'   21 0706'              LD      HL,MVLMSG       ;MAX VAL MESSAGE
00DE'   CD 043D'              CALL    PRTMSG          ;PRINT IT
                    ;
                    ;
                    ;TRANSFER VALIDATIONS TO BUFFER FROM VALSTR
                    ;
00E1'               TRNVAL:
00E1'   3A 095F'              LD      A,(CURFDN)      ;GET CURRENT FIELD NUMBER
00E4'   2A 0D66'              LD      HL,(TVBPTR)     ;POINTER INTO TEMPORARY BUFFER
00E7'   77                    LD      (HL),A          ;SAVE FIELD NUMBER
00E8'   23                    INC     HL              ;ADVANCE POINTER
00E9'   22 0D66'              LD      (TVBPTR),HL
00EC'   3A 08BC'              LD      A,(VALCTR)      ;GET NUMBER OF VALIDATIONS INPUT
00EF'   FE 00                 CP      0               ;NO VALIDATIONS ?
00F1'   28 15                 JR      Z,TRNV89        ;FINISHED WITH THIS FIELD
00F3'   ED 5B 0D66'           LD      DE,(TVBPTR)     ;GET POINTER INTO BUFFER
00F7'   21 0888'              LD      HL,VALSTR       ;BEGINNING OF VALIDATION STRING
00FA'               TRNVA5:
00FA'   7E                    LD      A,(HL)          ;GET CHAR FROM VALIDATION STRING
00FB'   FE 00                 CP      0               ;NO CHAR ?
00FD'   28 16                 JR      Z,TRNV99        ;FINISHED WITH THIS FIELD
00FF'   FE 20                 CP      " "
0101'   28 12                 JR      Z,TRNV99
0103'   12                    LD      (DE),A          ;TRANSFER TO BUFFER
0104'   23                    INC     HL
0105'   13                    INC     DE
0106'   18 F2                 JR      TRNVA5          ;KEEP TRANSFERING TILL DONE
```

```
0108'                 24542  TRNV89:
0108'   3E FF         24544          LD      A,EOF
010A'   77            24546          LD      (HL),A
010B'   23            24548          INC     HL
010C'   22 0D66'      24550          LD      (TVBPTR),HL
010F'   3E 00         24560          LD      A,0
0111'   32 08BC'      24565          LD      (VALCTR),A
0114'   C9            24568          RET
                      24570  ;
                      24572  ;
0115'                 24575  TRNV99:
0115'   3E FF         24600          LD      A,EOF          ;END OF FILE CHAR (FF)
0117'   12            24620          LD      (DE),A         ;PUT AT END OF VAL STRING
0118'   13            24640          INC     DE             ;FIRST OPEN POSITION
0119'   ED 53 0D66'   24660          LD      (TVBPTR),DE    ;FOR NEXT FIELD
011D'   3E 00         24665          LD      A,0
011F'   32 08BC'      24670          LD      (VALCTR),A
0122'   C9            24690          RET
                      24690  ;
                      24695  ;
                      24900  ;COMPLETE THE FIELD VALIDATIONS
                      24920  ;
0123'                 24940  COMVAL:
0123'   21 0966'      24960          LD      HL,TVBUF       ;TEMPORARY BUFFER
0126'   22 0D66'      24980          LD      (TVBPTR),HL    ;SET POINTER TO BEGINNING
0129'                 25000  COMVA3:
0129'   7E            25020          LD      A,(HL)         ;GET FIELD NUMBER
012A'   32 095F'      25040          LD      (CURFDN),A     ;SAVE FIELD NUMBER
012D'                 25060  COMVA5:
012D'   23            25080          INC     HL             ;GET NEXT CHAR
012E'   7E            25100          LD      A,(HL)
012F'   FE FF         25120          CP      EOF            ;COMMA OR EOF ?
0131'   28 44         25140          JR      Z,COMNXT       ;JUMP ON EOF
0133'   23            25160          INC     HL             ;BYPASS COMMA
0134'   22 0D66'      25180          LD      (TVBPTR),HL    ;SAVE BUFFER POINTER
0137'   3A 095F'      25200          LD      A,(CURFDN)     ;GET CURRENT FIELD NUMBER
013A'   4F            25220          LD      C,A            ;MOVE FIELD NUMBER TO C
013B'   CD 0000*      25240          CALL    FNDFLC         ;GET FIELD SPECS
013E'   FE FF         25260          CP      EOF            ;ERROR ?
0140'   CA 018E'      25280          JP      Z,INTERP       ;END OF TABLE, START OVER GETTING VAL
0143'   22 0963'      25300          LD      (VALLOC),HL    ;LOCATION OF VALIDATIONS (0000)
0146'   ED 43 0961'   25320          LD      (FLOCPR),BC    ;LOCATION OF FIELD ON SCREEN
014A'   7B            25340          LD      A,E
014B'   32 0960'      25360          LD      (CURFLN),A     ;LENGTH OF FIELD
014E'   CD 047C'      25380          CALL    REVFLD         ;REVERSE FIELD ON SCREEN FOR EFFECT
0151'   3A 095F'      25400          LD      A,(CURFDN)     ;GET CURRENT FIELD NUMBER
0154'   4F            25420          LD      C,A
0155'   CD 050E'      25440          CALL    FNDVAL         ;FIND ADDRESS TO PLACE POINTER
0158'   ED 4B 0D6A'   25460          LD      BC,(VALPTR)    ;GET CURRENT VALIDS POINTER
015C'   71            25480          LD      (HL),C         ;SETUP LOW BYTE OF POINTER
015D'   23            25500          INC     HL             ;NEXT BYTE
015E'   70            25520          LD      (HL),B         ;SETUP HIGH BYTE
```

```
015F'   2A 0D66'        25540           LD      HL,(TVBPTR)     ;VALIDATION
0162'                   25560   COMVA7:
0162'   46              25580           LD      B,(HL)          ;GET FIRST BYTE OF VALIDATION
0163'   23              25600           INC     HL
0164'   4E              25620           LD      C,(HL)          ;GET SECOND BYTE OF VALIDATION
0165'   23              25630           INC     HL
0166'   22 0D66'        25640           LD      (TVBPTR),HL     ;SAVE POINTER
0169'   CD 05FA'        25660           CALL    DISPVL          ;PROCESS VALIDATION
016C'   2A 0D66'        25680           LD      HL,(TVBPTR)     ;RESTORE POINTER
016F'   7E              25700           LD      A,(HL)          ;GET FIRST BYTE AFTER VALIDATION
0170'   FE FF           25720           CP      EOF             ;END OF VALIDS THIS FIELD ?
0172'   28 03           25740           JR      Z,COMNXT        ;YES, GO ON TO NEXT FIELD
0174'   23              25760           INC     HL              ;BYPASS COMMA BETWEEN VALIDATIONS
0175'   18 E8           25780           JR      COMVA7
                        25800   ;
0177'                   25820   COMNXT:
0177'   23              25840           INC     HL              ;POINT TO NEXT FIELD NUMBER
0178'   22 0D66'        25860           LD      (TVBPTR),HL     ;SAVE POINTER
017B'   2A 0D6A'        25880           LD      HL,(VALPTR)     ;GET VALIDATION POINTER
017E'   01 0006         25900           LD      BC,6            ;OFFSET VALUE
0181'   ED 4A           25920           ADC     HL,BC           ;NEW ADDRESS
0183'   22 0D6A'        25940           LD      (VALPTR),HL     ;VALPTR READY FOR NEXT FIELD
0186'   CD 04FD'        25950           CALL    CORFLD
0189'   2A 0D66'        25960           LD      HL,(TVBPTR)     ;POINT TO NEXT VALIDATION
018C'   18 9B           25980           JR      COMVA3
                        26000   ;
                        26020   ;
                        26040   ;THIS ROUTINE GET THE INTERPRETIVE DATA FOR CERTAIN VALIDATIONS
                        26060   ;
018E'                   26080   INTERP:
018E'   3E 00           26100           LD      A,0
0190'   32 095F'        26120           LD      (CURFDN),A
0193'                   26140   INTER3:
0193'   3A 095F'        26160           LD      A,(CURFDN)
0196'   3C              26180           INC     A
0197'   32 095F'        26200           LD      (CURFDN),A
019A'   4F              26210           LD      C,A
019B'   CD 0000*        26220           CALL    FNDFLC
019E'   FE FF           26240           CP      EOF
01A0'   CA 01DC'        26260           JP      Z,INTER9
01A3'   ED 43 0961'     26280           LD      (FLOCPR),BC
01A7'   7B              26300           LD      A,E
01A8'   32 0960'        26320           LD      (CURFLN),A
01AB'   22 0D6A'        26340           LD      (VALPTR),HL
01AE'   ED 5B 0000*     26360           LD      DE,(VALOFF)
01B2'   3A 095F'        26380           LD      A,(CURFDN)
01B5'   12              26400           LD      (DE),A
01B6'   13              26420           INC     DE
01B7'   ED 53 0000*     26440           LD      (VALOFF),DE
01BB'   7E              26460           LD      A,(HL)
01BC'   B7              26480           OR      A
01BD'   28 0A           26500           JR      Z,INTER4        ;SKIP FIRST VAL BYTE
```

```
01BF'   CB 5E                       BIT     3,(HL)
01C1'   C4 01FC'                    CALL    NZ,CFINTP       ;GET DATA FOR COMPUTED FIELDS
01C4'   CB 76                       BIT     6,(HL)
01C6'   C4 01DD'                    CALL    NZ,IVINTP       ;GET DATA FOR INVISIBLE VAL
                            ;
                                    IFDEF   LEVEL2
                            ;
                                    BIT     5,(HL)
                                    CALL    NZ,PWINTP       ;GET DATA FOR PASSWORD VALIDATION
                                    BIT     7,(HL)
                                    CALL    NZ,ININTP       ;GET DATA FOR INTERACTIVE VALIDATION
                                    BIT     1,(HL)
                                    CALL    NZ,DSINTP       ;GET DATA FOR DISPATCH VAL
                            ;
                                    ENDIF
                            ;
01C9'                       INTER4:
01C9'   23                          INC     HL
                            ;
                                    IFDEF   LEVEL2
                            ;
                                    BIT     2,(HL)
                                    CALL    NZ,HSINTP       ;GET DATA FOR HELPSC
                                    BIT     1,(HL)
                                    CALL    NZ,ACINTP       ;GETY DATA FOR ABSOLUTE CHAR VAL
                            ;
                                    ENDIF
                            ;
01CA'   23                          INC     HL              ;BYTE 3 OF VALIDATIONS
                            ;
                                    IFDEF   LEVEL2
                            ;
                                    BIT     6,(HL)
                                    CALL    NZ,RGINTP       ;GET RANGE DATA
                            ;
                                    ENDIF
                            ;
01CB'   CB 5E                       BIT     3,(HL)
01CD'   C4 023A'                    CALL    NZ,DVINTP       ;GET DATA FOR DEFAULT VALUE
01D0'   23                          INC     HL
                            ;
                                    IFDEF   LEVEL2
                            ;
                                    BIT     7,(HL)
                                    CALL    NZ,KFINTP       ;GET VALUE FOR KEY FIELD VAL
                            ;
                                    ENDIF
                            ;
01D1'   2A 0000*                    LD      HL,(VALOFF)
01D4'   36 FF                       LD      (HL),EOF        ;END OF THIS FIELD
01D6'   23                          INC     HL
01D7'   22 0000*                    LD      (VALOFF),HL     ;SAVE POINTER FOR NEXT FIELD
```

```
C1DA'   18 B7              JR      INTER3
                   ;
01DC'              INTER9:
01DC'   C9                 RET
                   ;
                   ;THESE ARE THE ROUTINE THAT GET INTERPRETIVE DATA FOR VALIDATIONS
                   ;
                           IFDEF   LEVEL2
                   ;GET DATA FOR 'INPUT FIELD' VALIDATION
                   ;
                   ININTP:
                           PUSH    HL
                           CALL    REVFLD          ;HIGHLIGHT CURRENT FIELD
                           LD      A,INTOKN        ;INTERACTIVE FIELD TOKEN
                           CALL    INSTKN          ;INSERT TOKEN INTO INTVAL TABLE
                           CALL    DBIOUT          ;IS THIS AN INPUT OR AN OUTPUT ?
                           CALL    INDBSN          ;GET NAME OF DATABASE TO INTERACT WITH
                           CALL    INKYVL          ;GET FIELD NUMBER TO CONTAIN KEY VALUE
                           LD      A,(CURFDN)      ;GET CURRENT FIELD
                           LD      C,A             ;MOVE IT TO C
                           CALL    FNDFLC          ;RESTORE PARAMETERS
                           LD      (VALPTR),HL     ;POINTER TO VALIDATIONS
                           LD      (FLOCPR),BC     ;FIELD LOCATION POINTER
                           LD      A,E
                           LD      (CURFLN),A      ;FIELD LENGTH
                           CALL    CORFLD          ;CORRECT VIDEO IMAGE
                           POP     HL
                           RET
                   ;
                           ENDIF
                   ;
                   ;GET DATA FOR 'INVISIBLE FIELD' VALIDATION
                   ;
01DD'              IVINTP:
01DD'   E5                 PUSH    HL
01DE'   3A 0960'           LD      A,(CURFLN)
01E1'   2A 0000*           LD      HL,(VALOFF)
01E4'   4F                 LD      C,A
01E5'   3E B2              LD      A,IVTOKN
01E7'   77                 LD      (HL),A
01E8'   3E 20              LD      A," "
01EA'   0D                 DEC     C
01EB'   23                 INC     HL
01EC'              IVI005:
01EC'   77                 LD      (HL),A
01ED'   23                 INC     HL
01EE'   0D                 DEC     C
01EF'   20 FB              JR      NZ,IVI005
01F1'   23                 INC     HL
01F2'   3E 7F              LD      A,EOV
01F4'   77                 LD      (HL),A
01F5'   23                 INC     HL
```

```
01F6°   22 0000*              LD      (VALOFF),HL
01F9°   E1                    POP     HL
01FA°   C9                    RET
                      ;
                      ;
                      ;GET DATA FOR °PASSWORD FIELD°
                      ;
01FB°                 PWINTP:
                      ;TO BE COMPLETED
01FB°   C9                    RET
                      ;
                      ;
                      ;GET DATA FOR °COMPUTED FIELD° VALIDATION
                      ;
01FC°                 CFINTP:
01FC°   E5                    PUSH    HL
01FD°   CD 047C°              CALL    REVFLD
0200°   3E B3                 LD      A,CFTOKN
0202°   CD 029B°              CALL    INSTKN          ;INSERT FIELD NUMBER INTO TABLE
0205°   CD 02A4°              CALL    INTPCA          ;GET A FIELD NUMBER OR ABSOLUTE VALUE ?
0208°   FE 41                 CP      "A"
020A°   20 08                 JR      NZ,CFIN05       ;JP AND GET FIELD NUMBER
020C°   CD 028F°              CALL    INVPAV          ;GET AN ABSOLUTE VALUE
020F°   CD 02DE°              CALL    CHKIAV
0212°   18 06                 JR      CFIN07
0214°                 CFIN05:
0214°   CD 02F5°              CALL    INTPFA          ;GET A FIELD NUMBER
0217°   CD 029B°              CALL    INSTKN          ;INSERT FIELD NUMBER INTO TABLE
021A°                 CFIN07:
021A°   CD 0390°              CALL    INTPOP          ;GET AN ARITHMETIC OPERATOR
021D°   CD 02A4°              CALL    INTPCA          ;GET A FIELD OR ABSOLUTE VALUE ?
0220°   FE 41                 CP      "A"
0222°   20 08                 JR      NZ,CFIN09
0224°   CD 028F°              CALL    INVPAV          ;GET AN ABSOLUE VALUE
0227°   CD 02DE°              CALL    CHKIAV
022A°   18 06                 JR      CFIN10
022C°                 CFIN09:
022C°   CD 02F5°              CALL    INTPFA          ;GET A FIELD NUMBER
022F°   CD 029B°              CALL    INSTKN          ;INSERT FIELD NUMBER INTO TABLE
0232°                 CFIN10:
0232°   CD 03A1°              CALL    INSEDV
0235°   CD 04FD°              CALL    CORFLD
0238°   E1                    POP     HL
0239°   C9                    RET
                      ;
                      ;
                              IFDEF   LEVEL2
                      ;GET DATA FOR °DISPATCH° FIELD
                      ;
                      DSINTP:
                      ;TO BE COMPLETED
                              RET
```

```
                        ;
                        ;
                        ;GET DATA FOR 'HELP SCREEN' VAL
                        ;
                        HSINTP:
                        ;TO BE COMPLETED
                                RET
                        ;
                        ;
                        ;GET DATA FOR 'ABSOLUTE CHARACTER' VAL
                        ;
                        ACINTP:
                                PUSH    HL              ;SAVE POINTER
                                CALL    REVFLD          ;REVERSE VIDEO FOR EFFECT
                                CALL    CURSON          ;TURN CURSOR ON
                                LD      HL,EACMSG       ;POINT TO ABSOLUTE CHARACTER MESSAGE
                                CALL    DISMSG          ;DISPLAY MESSAGE
                                LD      HL,(VALOFF)
                                LD      (HL),ACTOKN
                                JP      DVINT2
                        ;
                        ;
                        ;GET DATA FOR 'RANGE' VALIDATION
                        ;
                        RGINTP:
                        ;TO BE COMPLETED
                                RET
                        ;
                                ENDIF
                        ;
                        ;GET DATA FOR 'DEFAULT VALUE' VAL
                        ;
023A'                   DVINTP:
023A'   E5                      PUSH    HL
023B'   CD 047C'                CALL    REVFLD
023E'   CD 0000*                CALL    CURSON
0241'   21 07C2'                LD      HL,EDVMSG       ;GET DEFAULT MESSAGE
0244'   CD 04C5'                CALL    DISMSG
0247'   2A 0000*                LD      HL,(VALOFF)
024A'   36 B5                   LD      (HL),DVTOKN
024C'                   DVINT2:
024C'   23                      INC     HL
024D'   22 0000*                LD      (VALOFF),HL
0250'   3A 0960'                LD      A,(CURFLN)
0253'   47                      LD      B,A
0254'   CD 0000*                CALL    KBLINE
0257'   2A 0000*                LD      HL,(VALOFF)
025A'   3E 00                   LD      A,0
025C'   32 0D6C'                LD      (INPLEN),A
025F'                   DVINT3:
025F'   7E                      LD      A,(HL)
0260'   FE 00                   CP      0
```

```
0262'   28 12      31380           JR      Z,DVINT4
0264'   FE 20      31400           CP      SPACE
0266'   28 0E      31420           JR      Z,DVINT4
0268'   FE 0D      31440           CP      ENTER
026A'   28 0A      31460           JR      Z,DVINT4
026C'   23         31480           INC     HL
026D'   3A 0D6C'   31482           LD      A,(INPLEN)
0270'   3C         31484           INC     A
0271'   32 0D6C'   31486           LD      (INPLEN),A
0274'   18 E9      31487           JR      DVINT3
0276'              31488   DVINT4:
0276'   3A 0960'   31500           LD      A,(CURFLN)
0279'   4F         31505           LD      C,A
027A'   3A 0D6C'   31510           LD      A,(INPLEN)
027D'   B9         31515           CP      C
027E'   28 0C      31520           JR      Z,DVINT5
0280'   36 20      31525           LD      (HL),SPACE
0282'   23         31530           INC     HL
0283'   3A 0D6C'   31535           LD      A,(INPLEN)
0286'   3C         31540           INC     A
0287'   32 0D6C'   31545           LD      (INPLEN),A
028A'   18 EA      31550           JR      DVINT4
028C'              31555   DVINT5:
028C'   36 7F      31560           LD      (HL),EOV
028E'   23         31565           INC     HL
028F'   22 0000*   31570           LD      (VALOFF),HL
0292'   CD 0000*   31575           CALL    CUROFF
0295'   CD 04FD'   31580           CALL    CORFLD
0298'   E1         31585           POP     HL
0299'   C9         31590           RET
                   31595   ;
                   31600   ;
                   31605   ;
                   31680   ;GET DATA FOR 'KEY FIELD' VALIDATION
                   31700   ;
029A'              31720   KFINTP:
                   31740   ;TO BE COMPLETED
                   31760   ;
029A'   C9         32100           RET
                   32120   ;
                   32140   ;
                   32160   ;INSERT VALIDATION TOKN INTO TABLE
                   32180   ;
029B'              32200   INSTKN:
029B'   2A 0000*   32220           LD      HL,(VALOFF)
029E'   77         32240           LD      (HL),A
029F'   23         32260           INC     HL
02A0'   22 0000*   32280           LD      (VALOFF),HL
02A3'   C9         32300           RET
                   32320   ;
                   32340   ;
                   32360   ;GET AN "F" OR AN "A"
```

```
                        ;
02A4'                   INTPOA:
02A4'     21 0760'               LD      HL,PFAMSG      ;MESSAAGE TO INPUT FIELD OR ABS
02A7'     CD 04C5'               CALL    DISMSG
02AA'                   POA005:
02AA'     CD 03A6'               CALL    INCHAR
02AD'     78                     LD      A,B
02AE'     FE 46                  CP      "F"
02B0'     28 06                  JR      Z,INTPED
02B2'     FE 41                  CP      "A"
02B4'     28 02                  JR      Z,INTPED
02B6'     18 F2                  JR      POA005
02B8'                   INTPED:
02B8'     C5                     PUSH    BC
02B9'     CD 04D5'               CALL    CLR24
02BC'     C1                     POP     BC
02BD'     78                     LD      A,B
02BE'     C9                     RET
                        ;
                        ;
                        ;GET AN ABSOLUTE VALUE
                        ;
02BF'                   INVPAV:
02BF'     2A 0000*               LD      HL,(VALOFF)
02C2'     3E 00                  LD      A,0
02C4'     77                     LD      (HL),A
02C5'     23                     INC     HL
02C6'     22 0000*               LD      (VALOFF),HL
02C9'     21 0746'               LD      HL,ABVMSG      ;INPUT ABSOLUTE VALUE MESSAGE
02CC'     CD 04C5'               CALL    DISMSG
02CF'     2A 0000*               LD      HL,(VALOFF)
02D2'     3A 0960'               LD      A,(CURFLN)
02D5'     47                     LD      B,A
02D6'     80                     ADD     A,B
02D7'     47                     LD      B,A
02D8'     CD 0000*               CALL    KBLINE
02DB'     C3 02B8'               JP      INTPED
                        ;
                        ;
                        ;CHECK INPUT VALUE AND CORRECT VALOFF
                        ;
02DE'                   CHKIAV:
02DE'     2A 0000*               LD      HL,(VALOFF)
02E1'     7E                     LD      A,(HL)
02E2'     FE 00                  CP      0
02E4'     28 0B                  JP      Z,IAV005
02E6'     FE 20                  CP      SPACE
02E8'     28 07                  JP      Z,IAV005
02EA'     FE 0D                  CP      ENTER
02EC'     28 03                  JP      Z,IAV005
02EE'     23                     INC     HL
02EF'     18 F0                  JP      CHKIAV+3
```

```
02F1°                    SAV005:
02F1°  22 0000*                   LD      (VALDEF),HL
02F4°  C9                         RET
                         ;
                         ;
                         ;GET A FIELD NUMBER, RETURN IT IN A
                         ;
02F5°                    INTPFA:
02F5°  CD 04FD°                   CALL    CORFLD          ;CORRECT VIDEO AT CURRENT FIELD
02F8°  21 0804°                   LD      HL,GENMSG
02FB°  CD 04C5°                   CALL    DISMSG
02FE°  3A 095F°                   LD      A,(CURFDN)      ;GET CURRENT FIELD NUMBER
0301°  32 0D6E°                   LD      (SAVFDN),A      ;SAVE IT FOR LATER
0304°  CD 0000*                   CALL    LASTFN          ;GET LAST FIELD NUMBER
0307°  32 0D6D°                   LD      (LSTFDN),A
030A°  3E 01                      LD      A,1
030C°                    PFA002:
030C°  32 095F°                   LD      (CURFDN),A
030F°  4F                         LD      C,A
0310°  CD 0000*                   CALL    FNDFLC
0313°  ED 43 0961°                LD      (FLDCPR),BC
0317°  7B                         LD      A,E
0318°  32 0960°                   LD      (CURFLN),A
031B°  22 0D6A°                   LD      (VALPTR),HL
031E°  CD 047C°                   CALL    REVFLD
0321°                    PFA003:
0321°  CD 03A6°                   CALL    INCHAR          ;GET CHAR FROM KEYBOARD
0324°  78                         LD      A,B
0325°  FE 1C                      CP      LA              ;LEFT ARROW ?
0327°  20 13                      JR      NZ,PFA005
0329°  3A 095F°                   LD      A,(CURFDN)
032C°  FE 01                      CP      1
032E°  20 02                      JR      NZ,PFA004       ;BACK 1 FIELD
0330°  18 EF                      JR      PFA003          ;IGNORE LEFT ARROW
0332°                    PFA004:
0332°  CD 04FD°                   CALL    CORFLD          ;CORRECT PRESENT FIELD VIDEO
0335°  3A 095F°                   LD      A,(CURFDN)
0338°  3D                         DEC     A
0339°  C3 030C°                   JP      PFA002          ;BACK 1 FIELD
033C°                    PFA005:
033C°  FE 1D                      CP      RA              ;RIGHT ARROW ?
033E°  20 13                      JR      NZ,PFA008       ;NOPE
0340°  3A 0000*                   LD      A,(LASTFN)      ;CHECK FOR LAST FIELD
0343°  4F                         LD      C,A
0344°  3A 095F°                   LD      A,(CURFDN)
0347°  B9                         CP      C
0348°  28 D7                      JR      Z,PFA003        ;ALREADY IN LAST FIELD, IGNORE
034A°  CD 04FD°                   CALL    CORFLD          ;CORRECT VIDEO IN PRESENT FIELD
034D°  3A 095F°                   LD      A,(CURFDN)
0350°  3C                         INC     A
0351°  18 B9                      JR      PFA002
0353°                    PFA008:
```

```
0353'  FE 0D             CP      ENTER
0355'  20 CA             JR      NZ,PFA003       ;GET ANOTHER CHAR
0357'  CD 04FD'          CALL    CORFLD          ;CORRECT VIDEO
035A'  3A 095F'          LD      A,(CURFDN)      ;GET PRESENT FIELD NUMBER
035D'  4F                LD      C,A
035E'  3A 0D6E'          LD      A,(SAVFDN)
0361'  32 095F'          LD      (CURFDN),A      ;RESTORE CURRENT FIELD NUMBER
0364'  79                LD      A,C
0365'  F5                PUSH    AF
0366'  3A 095F'          LD      A,(CURFDN)
0369'  4F                LD      C,A
036A'  CD 0000*          CALL    FNDFLC
036D'  ED 43 0961'       LD      (FLDCPR),BC
0371'  7B                LD      A,E
0372'  32 0960'          LD      (CURFLN),A
0375'  22 0D6A'          LD      (VALPTR),HL
0378'  CD 047C'          CALL    REVFLD
037B'  CD 04D5'          CALL    CLR24
037E'  F1                POP     AF
037F'  C9                RET
                 ;
                 ;
                 ;GET AN ARITHMETIC OPERATOR
                 ;
0380'            INTPOP:
0380'  21 07DA'          LD      HL,IOPMSG
0383'  CD 04C5'          CALL    DISMSG
0386'            POP005:
0386'  CD 03A6'          CALL    INCHAR
0389'  78                LD      A,B
038A'  FE 2B             CP      "+"
038C'  28 0C             JR      Z,POP009
038E'  FE 2D             CP      "-"
0390'  28 08             JR      Z,POP009
0392'  FE 2F             CP      "/"
0394'  28 04             JR      Z,POP009
0396'  FE 2A             CP      "*"
0398'  20 EC             JR      NZ,POP005
039A'            POP009:
039A'  CD 029B'          CALL    INSTKN          ;INSERT OPERATOR INTO TABLE
039D'  CD 04D5'          CALL    CLR24
03A0'  C9                RET
                 ;
                 ;
                 ;INSERT END OV VALIDATION MARKER INTO TABLE
                 ;
03A1'            INSEOV:
03A1'  3E 7F             LD      A,EOV           ;END OF VALIDATION MARKER
03A3'  C3 029B'          JP      INSTKN
                 ;
                 ;
                 ;GET A CHAR FROM THE KEYBOARD, DONT RETURN TIL YOU HAVE ONE
```

```
                        ;
03A6'                   INCHAR:
03A6'   CD 0000*                CALL    KBCHAR
03A9'   78                      LD      A,B
03AA'   B7                      OR      A
03AB'   28 F9                   JR      Z,INCHAR
03AD'   C9                      RET
                        ;
                                IFDEF   LEVEL2
                        ;
                        ;GET AN I OR AN O IN RESPONSE TO QUESTION
                        ;
                        DBIOUT:
                                LD      HL,DBNMSG       ;INPUT OR OUTPUT QUESTION
                                CALL    DISMSG          ;PRINT MESSAGE
                        DBI003:
                                CALL    INCHAR
                                LD      A,B
                                CP      "I"
                                JR      Z,DBI005
                                CP      "O"
                                JR      Z,DBI007
                                JR      DBI003
                        DBI005:
                                CALL    INSTKN          ;PUT THE I OR O INTO INTVAL
                                LD      DE,PL3
                                LD      HL,RSDPL1
                                CALL    COMPL3
                                LD      HL,DCB3
                                LD      (CURDCB),HL
                                LD      HL,PL3
                                LD      (CURPLL),HL
                                LD      HL,FBUF3
                                LD      (CURFBF),HL
                                LD      HL,RBUF3
                                LD      (CURBUF),HL
                                CALL    PLDESC
                                RET
                        ;
                        ;
                        DBI007:
                                CALL    INSTKN
                                LD      HL,DCB5
                                LD      (CURDCB),HL
                                LD      HL,PL5
                                LD      (CURPLL),HL
                                LD      HL,FBUF5
                                LD      (CURFBF),HL
                                LD      HL,RBUF5
                                LD      (CURBUF),HL
                                CALL    PLDESC
                                LD      DE,PL5
```

```
        LD      HL,RSDPL1
        CALL    COMPLB
        RET
;
;
;GET THE NAME OF THE DATABASE TO INTERACT WITH
;
INDBSN:
        LD      HL,DBIMSG       ;INPUT DATABSE NAME MESSAGE
        CALL    DISMSG          ;PRINT IT
        LD      HL,(CURDCB)     ;GET CURRENT DCB
        LD      B,8             ;INPUT LENGTH
        CALL    KBLINE          ;GET INPUT
        LD      DE,(CURDCB)     ;BACK TO BEGINNING OF DCB
        CALL    FNDRET          ;FIND END OF NAME
        LD      HL,DBDSC        ;/DSC ENDING
        CALL    COMFLS          ;ADD ENDING TO NAME
        CALL    VID2            ;SAVE THE CURRENT VIDEO IMAGE
        CALL    PRISDM          ;INSERT DISK MESSAGE
        CALL    RDDESC          ;GET DESCRIPTOR INTO MEM AND SCREEN
        CALL    CRETBL          ;CREATE MINI FIELD TABLE
        RET
;
;
;CREATE A MINI FIELD TABLE FOR INTERACTIVE SCREEN
;
CRETBL:
        LD      HL,TMPFLD
        LD      (FLPTRT),HL     ;SET TEMP POINTER
        LD      A,0
        LD      (FLPCTR),A      ;SET FIELD COUNTER TO ZERO
        LD      BC,0            ;START AT BEGINNING OF SCREEN
        LD      (FLDLOC),BC     ;RESET FLDLOC
CRETB5:
        CALL    FNDFLD          ;FIND FIELD ON SCREEN
        LD      A,E
        RET     Z               ;NO MORE FIELDS
        LD      A,(FLPCTR)      ;GET COUNTER
        INC     A
        LD      (FLPCTR),A      ;SAVE COUNT
        LD      HL,(FLPTRT)     ;POINTER IN MINI FIELD TABLE
        LD      (HL),A          ;INSERT FIELD NUMBER
        INC     HL
        LD      (HL),E          ;INSERT FIELD LENGTH
        INC     HL
        LD      (FLPTRT),HL     ;SAVE POINTER
        JR      CRETB5
;
;
;READ DATABASE DESCRIPTOR INTO MEM AND PLACE ON SCREEN
;
RDDESC:
```

```
         LD      HL,APRSCN
         LD      (RAMDES),HL
         LD      HL,(CURPLL)
         LD      DE,(CURDCB)     ;CURRENT DCB
         CALL    OPEN
         LD      BC,1920         ;FILE LENGTH
RDD005:
         PUSH    BC
         LD      DE,(CURDCB)
         CALL    READNX          ;READ NEXT RECORD
         POP     BC
         LD      HL,(CURBUF)     ;RECORD BUFFER
         LD      A,(HL)          ;GET FIRST RECORD
         LD      DE,(RAMDES)
         LD      (DE),A
         INC     DE
         LD      (RAMDES),DE
         DEC     BC
         LD      A,C
         OR      B
         JR      NZ,RDD005
         LD      DE,(CURDCB)
         CALL    CLOSE
         CALL    RAMVID          ;DISPLAY DESCRIPTION ON SCREEN
         RET
;
;GET FIELD TO USE AS KEY VALUE WHEN SEARCHING INTERACTIVE DATABASE
;
INKYVL:
         LD      B,0
         CALL    SCRN03
         LD      HL,INKMSG
         CALL    DISMSG
         LD      A,(CURFDN)      ;CURRENT FIELD NUMBER
         LD      C,A
         CALL    FNDFLC          ;GET FIELD PARAMETERS
         LD      (VALPTR),HL     ;SAVE VALIDATION POINTER
         LD      (FLOCPR),BC     ;SAVE FIELD LOCATION POINTER
         LD      A,E
         LD      (CURFLN),A      ;SAVE FIELD LENGTH
         LD      BC,4000
         CALL    DELAY
         CALL    INTPFA          ;SELECT A FIELD
         CALL    INSTKN
         CALL    CLR24
         CALL    RAMVID
         CALL    SELFLD          ;SELECT A FIELD
         CALL    DETSTR          ;DETERMINE THE START BYTE AND LENGTH
         CALL    INSTKN          ;INSERT FIELD LENGTH INTO TABLE
         LD      A,(FSTART)      ;STARTING POSITION IN RECORD
         CALL    INSTKN
         CALL    INSEOV
```

```
        LD      B,0
        CALL    SCRN03
        RET
;
;
;LOCATE A FIELD ON THE SCREEN, ON ENTRY A= FIELD NUMBER TO FIND
;
LOTFLD:
        PUSH    HL
        CALL    FNDFLD
        LD      A,E
        CP      0
        RET     Z               ;NO MORE FIELDS ON SCREEN
        LD      HL,(FLDLOC)     ;LOCATION ON SCREEN
        LD      (FLOCPR),HL
        LD      A,E
        LD      (CURFLN),A      ;SAVE LENGTH
        POP     HL
        DEC     L
        JR      Z,LOTF05
        JR      LOTFLD          ;DO NEXT FIELD
LOTF05:
        LD      BC,(FLOCPR)
        LD      A,(CURFLN)
        LD      E,A
        CALL    REVFLD          ;REVERSE FIELD ON SCREEN
        LD      A,EOF
        RET
;
;
;SELECT A FIELD BY USING LA AND RA, SELECT WITH 'ENTER'
;
SELFLD:
        LD      A,2
        LD      (PTRFLD),A
        LD      L,A
        LD      BC,0
        CALL    LOTFLD          ;LOCATE TEMP FILED
        LD      HL,GFNMSG       ;SELECT FIELD MESSAGE
        CALL    DISMSG          ;PRINT MESSAGE
SELFL5:
        CALL    INCHAR          ;GET KEYBOARD CHAR
        LD      A,B
        CP      LA              ;LEFT ARROW ?
        JR      Z,SELDEC        ;YES, BACK ONE FIELD
        CP      RA
        JR      Z,SELINC        ;YES, FOEWARD ONE FIELD
        CP      ENTER           ;THIS THE ONE ?
        JR      Z,SELDON        ;YES, ALL DONE
        JR      SELFL5
SELINC:
        CALL    CORFLD
```

```
                 LD      A,(PTRFLD)
                 INC     A
        SELIN5:
                 LD      (PTRFLD),A
                 LD      L,A
                 LD      BC,0
                 CALL    LOTFLD
                 JR      SELFL5
        SELDEC:
                 CALL    CORFLD
                 LD      A,(PTRFLD)
                 DEC     A
                 JR      SELIN5
        ;
        SELDON:
                 CALL    CORFLD
                 LD      A,(PTRFLD)
                 RET
        ;
                 ENDIF
        ;
03AE    PTRFLD:          DS      1          ;FIELD POINTER
03AF    CURPLL:          DS      2
03B1    CURDCB:          DS      2          ;CURRENT DEVICE CONTROL BLOCK
03B3    RAMDES:          DS      2          ;RAM DESTINATION
03B5    FLPTRT:          DS      2          ;TEMPORARY FIELD POINTER
03B7    TMPFLD:          DS      128
        ;
0437    FLPCTR:          DS      1
0438    CURBUF:          DS      2          ;CURRENT RECORD BUFFER
043A    CURFBF:          DS      2          ;CURRENT FILE BUFFER
043C    FSTART:          DS      1
        ;
        ;
        ;
                 IFDEF   LEVEL2
        VID2:
                 LD      HL,XXSCRN
                 LD      B,EOF
                 LD      A,SVDRAM
                 RST     8
                 RET
        ;
                 ENDIF
        ;
        ;****************************************************************
        ;
        ;
        ;        THESE ARE THE UTILITY ROUTINES THAT DO ALL THE REAL WORK
        ;
        ;
        ;****************************************************************
```

```
                     ;
                     ;
                     ;PRINT MESSAGE- SAVE LINE 24, DISPLAY MESSAGE, RESTORE LINE 24
                     ;
043D'                PRTMSG:
043D'   E5                   PUSH    HL              ;SAVE MESSAGE POINTER
043E'   21 08BF'             LD      HL,LN24BF       ;LINE 24 BUFFER
0441'   06 17                LD      B,23            ;LINE 23
0443'   0E 00                LD      C,0
0445'   16 50                LD      D,80            ;NUMBER OF CHARACTERS TO READ
0447'   CD 0000*             CALL    VDREAD          ;READ LINE 24
044A'   E1                   POP     HL              ;RESTORE MESSAGE POINTER
044B'   CD 04C5'             CALL    DISMSG          ;DISPLAY MESSAGE
044E'   01 07D0              LD      BC,2000         ;DELAY LENGTH
0451'   CD 0000*             CALL    DELAY           ;ACTUAL DELAY CALL
0454'   21 08BF'             LD      HL,LN24BF       ;LINE 24 BUFFER
0457'   06 50                LD      B,80            ;BUFFER LENGTH
0459'   0E 00                LD      C,0             ;END OF LINE CHAR
045B'   CD 0000*             CALL    VDLINE          ;DISPLAY LINE ON SCREEN
045E'   C9                   RET
                     ;
                     ;
                     ;CHECK VALIDATION LIST FOR ENTRY CONTAINED IN BC, ON ENTRY B=CHAR 1,
                     ;       C=CHAR 2,  ON EXIT A=0 IF VALID, EOF IN NOT IN LIST,
                     ;       DE CONTAINS ADDRESS OF ROUTINE
                     ;
045F'                CHKVAL:
045F'   E5                   PUSH    HL
0460'   21 0000*             LD      HL,VALLST       ;LIST OF VALID VALIDATIONS
0463'                CHKV05:
0463'   7E                   LD      A,(HL)          ;GET FIRST CHAR FROM LIST
0464'   FE FF                CP      EOF             ;END OF LIST ?
0466'   28 10                JR      Z,CHKEND        ;END OF LIST, RETURN
0468'   B8                   CP      B               ;COMPARE TO 1ST CHAR OF VAL
0469'   20 09                JR      NZ,CHKV10       ;NO MATCH
046B'   23                   INC     HL              ;1ST CHAR MATCHES
046C'   7E                   LD      A,(HL)          ;GET 2ND CHAR FROM LIST
046D'   B9                   CP      C               ;COMPARE TO SECOND CHAR OF VAL
046E'   20 05                JR      NZ,CHKV15       ;NO MATCH
0470'   E1                   POP     HL
0471'   3E 00                LD      A,0
0473'   C9                   RET
                     ;
0474'                CHKV10:
0474'   23                   INC     HL
0475'                CHKV15:
0475'   23                   INC     HL
0476'   18 EB                JR      CHKV05
                     ;
0478'                CHKEND:
0478'   E1                   POP     HL
0479'   3E FF                LD      A,EOF
```

```
0478'   C9              41180           RET
                        41190   ;
                        41195   ;
                        41197           IFDEF   LEVEL2
                        41200   SCRNO2:
                        41205           LD      B,EOF
                        41207   SCRNO3:
                        41210           LD      HL,XXSCRN
                        41215           LD      A,SVDRAM
                        41220           RST     8
                        41225           RET
                        41230   ;
                        41235   ;
                        41237           ENDIF
                        41240   ;
                        41245   ;
                        41260   ;REVERSE THE CURRENT FIELD ON THE VIDEO SCREEN TO INVERSE VIDEO
                        41280   ;
047C'                   41300   REVFLD:
047C'   CD 0000*        41320           CALL    CUROFF
047F'   3E 00           41325           LD      A,0
0481'   32 0885'        41330           LD      (NSFMKR),A
0484'   3A 0960'        41340           LD      A,(CURFLN)      ;CURRENT FIELD LENGTH
0487'   57              41360           LD      D,A
0488'   ED 4B 0961'     41380           LD      BC,(FLOCPR)     ;FIELD LOCATION ON SCREEN
048C'   21 090F'        41400           LD      HL,FLDBUF       ;FIELD BUFFER
048F'   CD 0000*        41420           CALL    VDREAD          ;PUT FIELD IN FLDBUF
0492'   CD 04E0'        41440           CALL    VIDREV          ;REVERSE THE VIDEO MODE
0495'   CD 04AA'        41450           CALL    CHKREV          ;CHECK FOR INVERSE FIELD DELIMITERS
0498'   3A 0960'        41460           LD      A,(CURFLN)      ;GET FIELD LENGTH
049B'   57              41480           LD      D,A
049C'   ED 4B 0961'     41500           LD      BC,(FLOCPR)     ;FIELD LOCATION POINTER
04A0'   21 090F'        41520           LD      HL,FLDBUF       ;FIELD BUFFER
04A3'   CD 0000*        41540           CALL    VDGRAF          ;OUTPUT FIELD TO SCREEN
04A6'   CD 04E0'        41560           CALL    VIDREV
04A9'   C9              41580           RET
                        41582   ;
                        41584   ;
04AA'                   41586   CHKREV:
04AA'   21 090F'        41588           LD      HL,FLDBUF
04AD'   7E              41589           LD      A,(HL)
04AE'   E6 80           41590           AND     80H
04B0'   C8              41592           RET     Z
04B1'   7E              41594           LD      A,(HL)
04B2'   E6 7F           41596           AND     7FH
04B4'   77              41598           LD      (HL),A
04B5'   3A 0960'        41600           LD      A,(CURFLN)
04B8'   85              41602           ADD     A,L
04B9'   6F              41604           LD      L,A
04BA'   2B              41606           DEC     HL
04BB'   7E              41608           LD      A,(HL)
04BC'   E6 7F           41610           AND     7FH
```

```
04BE'   77                      LD      (HL),A
04BF'   3E FF                   LD      A,EOF
04C1'   32 0685'                LD      (NSFMKR),A
04C4'   C9                      RET
                        ;
                        ;
                        ;DISPLAY A MESSAGE ON LINE 24 OF SCREEN, AFTER CLEARING IT
                        ;
04C5'                   DISMSG:
04C5'   CD 0000*                CALL    SETSCR
04C8'   E5                      PUSH    HL              ;SAVE MESSAGE POINTER
04C9'   CD 04D5'                CALL    CLR24           ;CLEAR LINE 24
04CC'   E1                      POP     HL              ;RESTORE MESSAGE POINTER
04CD'   46                      LD      B,(HL)          ;LENGTH OF MESSAGE
04CE'   23                      INC     HL              ;ACTUAL MESSAGE
04CF'   0E 00                   LD      C,0             ;END OF LINE CHARACTER
04D1'   CD 0000*                CALL    VDLINE          ;DISPLAY LINE
04D4'   C9                      RET
                        ;
                        ;
                        ;CLEAR LINE 24
                        ;
04D5'                   CLR24:
04D5'   06 14                   LD      B,CNTLT         ;CONTROL T, HOME CURSOR, LINE 24
04D7'   CD 0000*                CALL    VDCHAR          ;OUTPUT IT TO CRT
04DA'   06 0D                   LD      B,ENTER         ;CLEAR LINE BY SCROLLING IT
04DC'   CD 0000*                CALL    VDCHAR
04DF'   C9                      RET
                        ;
                        ;
                        ;REVERSE THE CURRENT VIDEO MODE
                        ;
04E0'                   VIDREV:
04E0'   3A 0965'                LD      A,(REVFLG)      ;REVERSE VIDEO FLAG
04E3'   FE 00                   CP      0               ;MODE CHECK
04E5'   28 0B                   JR      Z,VIDRE5
04E7'   3E 00                   LD      A,0             ;NOT ZERO, TOGGLE
04E9'   32 0965'                LD      (REVFLG),A      ;RESET FLAG
04EC'   06 19                   LD      B,CNTLY         ;SET NORMAL MODE
04EE'   CD 0000*                CALL    VDCHAR          ;OUTPUT TO VIDEO
04F1'   C9                      RET
                        ;
04F2'                   VIDRE5:
04F2'   3E FF                   LD      A,EOF           ;SET FLAG
04F4'   32 0965'                LD      (REVFLG),A
04F7'   06 1A                   LD      B,CNTLZ         ;SET REVERSE MODE
04F9'   CD 0000*                CALL    VDCHAR
04FC'   C9                      RET
                        ;
                        ;
                        ;
                        ;CORRECT THE DISPLAY OF CURRENT FIELD TO NORMAL VIDEO
```

```
                         ;
04FD'                    CORFLD:
04FD'    06 19                   LD      B,CNTLY          ;SET NORMAL VIDEO MODE
04FF'    CD 0000*                CALL    VDCHAR
0502'    3A 0960'                LD      A,(CURFLN)
0505'    57                      LD      D,A              ;LENGTH OF CURRENT FIELD
0506'    ED 4B 0961'             LD      BC,(FLDCPR)      ;LOCATION OF FIELD ON SCREEN
050A'    21 090F'                LD      HL,FLDBUF        ;LOCATION OF FIELD IN MEMORY
050D'    CD 0000*                CALL    VDGRAF           ;PUT CORRECTED FIELD ON SCREEN
0510'    C9                      RET
                         ;
                         ;
                         ;DISPLAY THE CURRENT LIST OF FIELD VALIDATIONS ON THE SCREEN
                         ;
0511'                    PRVLST:
0511'    06 17                   LD      B,23             ;LINE FOR DISPLAY
0513'    0E 19                   LD      C,25             ;COLUMN LOCATION
0515'    16 00                   LD      D,0              ;BUFFER LENGTH
0517'    CD 0000*                CALL    VDGRAF           ;SETR CURSOR POSITION
051A'    21 0888'                LD      HL,VALSTR        ;VALIDATION STRING
051D'    06 32                   LD      B,50             ;STRING LENGTH
051F'    0E 00                   LD      C,0              ;END CHAR
0521'    CD 0000*                CALL    VDLINE           ;PRINT LINE
0524'    C9                      RET
                         ;
                         ;
                         ;++++++++++++++++++++++++++++++++++++++++++++++++++++++++++++++
                         ;
                         ;       THESE ROUTINE PROCESS THE VALIDATIONS INPUT
                         ;               BY THE OPERATOR
                         ;
                         ;++++++++++++++++++++++++++++++++++++++++++++++++++++++
                         ;
                         ;
                         ;PROCESS "INVISIBLE" FIELD VALIDATION
                         ;
0525'                    PVALIV:
0525'    2A 0D6A'                LD      HL,(VALPTR)
0528'    CB F6                   SET     6,(HL)
052A'    C9                      RET
                         ;
                         ;
                                 IFDEF   LEVEL2
                         ;PROCESS "PASSWORD" VALIDATION
                         ;
                         PVALPW:
                                 CALL    RECSUB           ;SUBTRACT THIS FIELD FROM DATABASE RL
                                 LD      HL,(VALPTR)
                                 SET     5,(HL)
                                 RET
                                 ENDIF
                         ;
```

```
                    43760  ;
                    43780  ;PROCESS "YES/NO" VALIDATION
                    43800  ;
0528'               43820  PVALYN:
0528'  3E FF        43825          LD      A,EOF
052D'  32 0000*     43830          LD      (YNFLAG),A
0530'  2A 0D6A'     43840          LD      HL,(VALPTR)
0533'  CB E6        43860          SET     4,(HL)
0535'  C9           43880          RET
                    43900  ;
                    43920  ;
                    43940  ;PROCESS "COMPUTED FIELD" VALIDATION
                    43960  ;
0536'               43980  PVALCF:
0536'  3E FF        44005          LD      A,EOF
0538'  32 0000*     44015          LD      (CFFLAG),A
053B'  2A 0D6A'     44020          LD      HL,(VALPTR)
053E'  CB DE        44040          SET     3,(HL)
0540'  C3 05A4'     44080          JP      PVALRJ
                    44120  ;
                    44140  ;
                    44520  ;
                    44540  ;PROCESS "VERIFY" VALIDATION
                    44560  ;
0543'               44580  PVALVF:
0543'  3E FF        44585          LD      A,EOF
0545'  32 0000*     44590          LD      (VFFLAG),A
0548'  2A 0D6A'     44600          LD      HL,(VALPTR)
054B'  CB C6        44620          SET     0,(HL)
054D'  C9           44640          RET
                    44660  ;
                    44680  ;
                    44700  ;PROCESS "BLANK" VALIDATION
                    44720  ;
054E'               44740  PVALBL:
054E'  3E FF        44745          LD      A,EOF
0550'  32 0000*     44750          LD      (BLFLAG),A
0553'  2A 0D6A'     44760          LD      HL,(VALPTR)
0556'  23           44780          INC     HL
0557'  CB FE        44800          SET     7,(HL)
0559'  C9           44820          RET
                    44840  ;
                    44860  ;
                    44880  ;PROCESS "ALPHBETIC" VALIDATION
                    44900  ;
055A'               44920  PVALAL:
055A'  3E FF        44925          LD      A,EOF
055C'  32 0000*     44935          LD      (ALFLAG),A
055F'  2A 0D6A'     44940          LD      HL,(VALPTR)
0562'  23           44960          INC     HL
0563'  CB F6        44980          SET     6,(HL)
```

```
0565°   C9                     RET
                        ;
                        ;
                        ;PROCESS "NUMERIC" VALIDATION
                        ;
0566°                   PVALNU:
0566°   3E FF                  LD      A,EOF
0568°   32 0000*               LD      (NUFLAG),A
056B°   2A 0D6A°               LD      HL,(VALPTR)
056E°   23                     INC     HL
056F°   CB FE                  SET     5,(HL)
0571°   C9                     RET
                        ;
                        ;
                        ;PROCESS "DECIMAL POINT" VALIDATION
                        ;
0572°                   PVALDP:
0572°   3E FF                  LD      A,EOF
0574°   32 0000*               LD      (DPFLAG),A
0577°   2A 0D6A°               LD      HL,(VALPTR)
057A°   23                     INC     HL
057B°   CB E6                  SET     4,(HL)
057D°   C9                     RET
                        ;
                        ;
                        ;PROCESS "SIGNED VALUE" VALIDATION
                        ;L
057E°                   PVALSV:
057E°   3E FF                  LD      A,EOF
0580°   32 0000*               LD      (SVFLAG),A
0583°   2A 0D6A°               LD      HL,(VALPTR)
0586°   23                     INC     HL
0587°   CB DE                  SET     3,(HL)
0589°   C9                     RET
                        ;
                        ;
                        ;PROCESS "VALID NUMERIC" VALIDATION
                        ;
058A°                   PVALVN:
058A°   3E FF                  LD      A,EOF
058C°   32 0000*               LD      (VNFLAG),A
058F°   2A 0D6A°               LD      HL,(VALPTR)
0592°   23                     INC     HL
0593°   23                     INC     HL
0594°   CB FE                  SET     7,(HL)
0596°   C9                     RET
                        ;
                        ;
                        ;
                        ;PROCESS "LEFT JUSTIFY" VALIDATION
                        ;
0597°                   PVALLJ:
```

```
0597'  3E FF         46505          LD      A,EOF
0599'  32 0000*      46510          LD      (LJFLAG),A
059C'  2A 0D6A'      46520          LD      HL,(VALPTR)
059F'  23            46540          INC     HL
05A0'  23            46560          INC     HL
05A1'  CB EE         46580          SET     5,(HL)
05A3'  C9            46600          RET
                     46620  ;
                     46640  ;
                     46660  ;PROCESS "RIGHT JUSTIFY" VALIDATION
                     46680  ;
05A4'                46700  PVALRJ:
05A4'  3E FF         46705          LD      A,EOF
05A6'  32 0000*      46710          LD      (RJFLAG),A
05A9'  2A 0D6A'      46720          LD      HL,(VALPTR)
05AC'  23            46740          INC     HL
05AD'  23            46760          INC     HL
05AE'  CB F6         46780          SET     4,(HL)
05B0'  C9            46800          RET
                     46820  ;
                     46840  ;
                     46860  ;PROCESS "DEFAULT VALUE" VALIDATION
                     46880  ;
05B1'                46900  PVALDV:
05B1'  3E FF         46905          LD      A,EOF
05B3'  32 0000*      46910          LD      (DVFLAG),A
05B6'  2A 0D6A'      46920          LD      HL,(VALPTR)
05B9'  23            46940          INC     HL
05BA'  23            46960          INC     HL
05BB'  CB DE         46980          SET     3,(HL)
                     47020  ;
05BD'  C9            47040          RET
                     47060  ;
                     47080  ;
                     47100  ;PROCESS "DOLLARS AND CENTS" VALIDATION
                     47120  ;
05BE'                47140  PVALDC:
05BF'  3E FF         47145          LD      A,EOF
05C0'  32 0000*      47150          LD      (DCFLAG),A
05C3'  2A 0D6A'      47160          LD      HL,(VALPTR)
05C6'  23            47180          INC     HL
05C7'  23            47200          INC     HL
05C8'  CB CE         47220          SET     1,(HL)
05CA'  C3 0566'      47240          JP      PVALNU
                     47260  ;
                     47280  ;
                     47300  ;PROCESS "DOLLARS AND CENTS WITH FRACTIONS"
                     47320  ;
05CD'                47340  PVALD2:
05CD'  2A 0D6A'      47360          LD      HL,(VALPTR)
05D0'  23            47380          INC     HL
05D1'  23            47400          INC     HL
```

```
05D2'   CB C6          47420          SET     0,(HL)
05D4'   C3 0566'       47440          JP      PVALNU
                       47460   ;
                       47480   ;
                       47500   ;PROCESS NON-STORE VALIDATION
                       47520   ;
05D7'                  47540   PVALNS:
05D7'   2A 0D6A'       47560          LD      HL,(VALPTR)
05DA'   23             47580          INC     HL
05DB'   CB C6          47600          SET     0,(HL)
05DD'   C9             47620          RET
                       47640   ;
                       47660   ;
                       47760   ;+++++++++++++++++++++++++++++++++++++++++++++++++++++++++++++++
                       47780   ;END OF ROUTINE TO PROCESS VALIDATIONS
                       47800   ;+++++++++++++++++++++++++++++++++++++++++++++++++++++++++++++++
                       47820   ;
                       47840   ;
                       47860   ;FIND THE LOCATION OF VALIDATION POINTER FOR CURRENT FIELD
                       47880   ;
05DE'                  47900   FNDVAL:
05DE'   21 0000*       47920          LD      HL,FLDTBL       ;FIELD TABLE
05E1'                  47940   FNDVA2:
05E1'   7E             47960          LD      A,(HL)          ;FIELD NUMBER
05E2'   FE FF          47980          CP      EOF             ;END OF TABLE ?
05E4'   C8             48000          RET     Z               ;RETURN AT END
05E5'   B9             48020          CP      C               ;COMPARE TO REQUESTED FIELD NUMBER
05E6'   28 08          48040          JR      Z,FNDV99
05E8'   23             48100          INC     HL
05E9'   23             48120          INC     HL
05EA'   23             48140          INC     HL
05EB'   23             48160          INC     HL
05EC'   23             48170          INC     HL
05ED'   23             48175          INC     HL
05EE'   18 F1          48180          JR      FNDVA2
                       48200   ;
05F0'                  48220   FNDV99:
05F0'   23             48240          INC     HL              ;ROW
05F1'   23             48260          INC     HL              ;COLUMN
05F2'   23             48280          INC     HL              ;LENGTH
05F3'   23             48300          INC     HL
05F4'   22 0D68'       48320          LD      (CURVAL),HL
05F7'   3E FF          48340          LD      A,EOF
05F9'   C9             48360          RET
                       48380   ;
                       48400   ;
                       48420   ;DISPATCH TO ROUTINE TO PROCESS THE CURRENT VALIDATION
                       48440   ;
05FA'                  48460   DISPVL:
05FA'   21 0D6F'       48480          LD      HL,DISLST
05FD'                  48500   DISPV2:
05FD'   7E             48520          LD      A,(HL)          ;GET CHAR FROM VALLST
```

```
05FE'  FE FF              CP     EOF            ;END OF LISTR ?
0600'  C8                 RET    Z
0601'  B8                 CP     B              ;CHECK FIRST CHAR OF VAL
0602'  20 03              JR     NZ,DISPV5      ;JMP NO MATCH
0604'  23                 INC    HL             ;FIRST CHAR MATCHES, CHECK NEXT
0605'  7E                 LD     A,(HL)         ;GET ESCOND CHAR
0606'  B9                 CP     C              ;COMPARE TO SECOND CHAR
0607'  20 07              JR     NZ,DISPV7      ;NO MATCH
0609'  23                 INC    HL             ;THIS IS THE CORRECT VAL
060A'  5E                 LD     E,(HL)         ;GET LOW BYTE OF ADDR
060B'  23                 INC    HL
060C'  56                 LD     D,(HL)         ;GET HIGH BYTE OF ADDR
060D'  EB                 EX     DE,HL
060E'  E9                 JP     (HL)
060F'              DISPV5:
060F'  23                 INC    HL
0610'              DISPV7:
0610'  23                 INC    HL
0611'  23                 INC    HL
0612'  23                 INC    HL
0613'  18 E8              JR     DISPV2
                   ;
                   ;
                   ;SUBTRACT CURRENT FIELD FROM THE DATABASE RECORD LENGTH
                   ;
0615'              RECSUB:
0615'  3A 0960'           LD     A,(CURFLN)
0618'  5F                 LD     E,A
0619'  3A 0000*           LD     A,(DBRECL)     ;DATABASE RECORD LENGTH
061C'  93                 SUB    E
061D'  32 0000*           LD     (DBRECL),A     ;SAVE NEW LENGTH
0620'  C9                 RET
                   ;
                   ;
                   ;****************************************************************
                   ;
                   ;
0621'              PLDESC:
0621'  DD 2A 03AF'        LD     IX,(CURPLL)    ;START OF PARAMETER  LIST
0625'  2A 043A'           LD     HL,(CURFBF)
0628'  DD 75 00           LD     (IX),L
062B'  DD 74 01           LD     (IX+1),H
062E'  2A 0438'           LD     HL,(CURBUF)    ;CURRENT RECORD BUFFER
0631'  DD 75 02           LD     (IX+2),L
0634'  DD 74 03           LD     (IX+3),H
0637'  C9                 RET
                   ;
                   ;
                   ;DETERMINE THE STARTING BYTE AND ACTUAL FIELD LENGTH OF FIELD IN "A"
                   ;
0638'              DETSTR:
```

```
0638'  11 0000                  LD     DE,0
063B'  21 0387'                 LD     HL,TMPFLD       ;START OF MINI TABLE
063E'  4F                       LD     C,A             ;FIELD TO SEARCH FOR
063F'               DETS05:
063F'  7E                       LD     A,(HL)          ;GET CHAR FORM TABLE
0640'  B9                       CP     C               ;IS THIS THE FIELD WE WANT
0641'  28 07                    JR     Z,DETS99        ;YES, JUMP
0643'  23                       INC    HL              ;NO, BUT HOW LONG IS IT ?
0644'  7E                       LD     A,(HL)
0645'  83                       ADD    A,E             ;ADD UP LENGTH
0646'  5F                       LD     E,A
0647'  23                       INC    HL              ;ADVANCE TO NEXT FIELD NUMBER
0648'  18 F5                    JR     DETS05          ;LOOP TIL FOUND
                    ;
064A'               DETS99:
064A'  23                       INC    HL              ;POINT AT LENGTH
064B'  7E                       LD     A,(HL)          ;GET LENGTH
064C'  F5                       PUSH   AF
064D'  7B                       LD     A,E             ;GET STARTING POSITION
064E'  32 043C'                 LD     (FSTART),A      ;SAVE STARTING POSITION
0651'  F1                       POP    AF              ;RESTORE LENGTH
0652'  C9                       RET
                    ;
                    ;
                    ;
                    ;
0653'               GVAL:
0653'  CD 0000*                 CALL   KBCHAR
0656'  78                       LD     A,B
0657'  B7                       OR     A
0658'  28 F9                    JR     Z,GVAL
065A'  FE 0D                    CP     ENTER
065C'  C8                       RET    Z
065D'  FE 01                    CP     F1
065F'  20 05                    JR     NZ,GVAL3
0661'  CD 0694'                 CALL   VALF1
0664'  18 ED                    JR     GVAL
0666'               GVAL3:
0666'  32 0886'                 LD     (VALBUF),A
0669'  CD 0000*                 CALL   VDCHAR
066C'               GVAL4:
066C'  CD 0000*                 CALL   KBCHAR
066F'  78                       LD     A,B
0670'  B7                       OR     A
0671'  28 F9                    JR     Z,GVAL4
0673'  FE 01                    CP     F1
0675'  20 05                    JR     NZ,GVAL5
0677'  CD 0694'                 CALL   VALF1
067A'  18 F0                    JR     GVAL4
067C'               GVAL5:
067C'  32 0887'                 LD     (VALBUF+1),A
067F'  CD 0000*                 CALL   VDCHAR
```

```
0682'  3A 0886'                LD      A,(VALBUF)
0685'  FE 4E                   CP      "N"
0687'  C0                      RET     NZ
0688'  3A 0887'                LD      A,(VALBUF+1)
068B'  FE 53                   CP      "S"
068D'  C0                      RET     NZ
068E'  3E 51                   LD      A,"Q"
0690'  32 0886'                LD      (VALBUF),A
0693'  C9                      RET
                       ;
                       ;
0694'                  VALF1:
0694'  CD 0000*                CALL    VIDRAM
0697'  21 0000*                LD      HL,VLHPSC
069A'  06 00                   LD      B,0
069C'  3E 5E                   LD      A,SVDRAM
069E'  CF                      RST     8
069F'                  VLF1A:
069F'  CD 0000*                CALL    KBCHAR
06A2'  78                      LD      A,B
06A3'  FE 02                   CP      F2
06A5'  20 05                   JR      NZ,VLF1B
06A7'  CD 0000*                CALL    SCNPRT
06AA'  18 F3                   JR      VLF1A
06AC'                  VLF1B:
06AC'  FE 01                   CP      F1
06AE'  20 EF                   JR      NZ,VLF1A
06B0'  CD 0000*                CALL    RAMVID
06B3'  C9                      RET
                       ;
                       ;
                       ;
                       ;
                       ;       THESE ARE THE DATA STRINGS USED AS LITERALS
                       ;       FOR ENUNCIATORS AND FOR DISPLAYS
                       ;
                       ;
                       ;*****************************************************************
                       ;
06B4'  14              INVMSG:         DB              (ENDINV-INVMSG)-1
06B5'  14 0D 49 4E             DB      CNTLT,ENTER,"INPUT VALIDATION: "
06B9'  50 55 54 20
06BD'  56 41 4C 49
06C1'  44 41 54 49
06C5'  4F 4E 3A 20
06C9'                  ENDINV:
                       ;
06C9'  3C              VERMSG:         DB              (ENDVER-VERMSG)-1
06CA'  14 0D 4E 4F             DB      CNTLT,ENTER,"NOT A USABLE VALIDATION. USE HELP SCREEN IF NECESSARY <F1>"
06CE'  54 20 41 20
06D2'  55 53 41 42
06D6'  4C 45 20 56
```

```
06DA°   41 4C 49 44
06DE°   41 54 49 4F
06E2°   4E 2E 20 55
06E6°   53 45 20 43
06EA°   45 4C 50 20
06EE°   53 43 52 45
06F2°   45 4E 20 49
06F6°   46 20 4E 45
06FA°   43 45 53 53
06FE°   41 52 59 20
0702°   3C 46 31 3E
0706°                   ENDVER:
                        ;
                        ;
0706°   3F              MVLMSG:         DB      (ENDMVL-MVLMSG)-1
0707°   14 0D 56 61                     DB      CNTLT,ENTER,"Validation buffer FULL. No more validations can"
070B°   6C 69 64 61
070F°   74 69 6F 6E
0713°   20 62 75 66
0717°   66 65 72 20
071B°   46 55 4C 4C
071F°   2E 20 4E 6F
0723°   20 6D 6F 72
0727°   65 20 76 61
072B°   6C 69 64 61
072F°   74 69 6F 6E
0733°   73 20 63 61
0737°   6E
0738°   20 62 65 20                     DB      " be accepted. "
073C°   61 63 63 65
0740°   70 74 65 64
0744°   2E 20
0746°                   ENDMVL:
                        ;
0746°   19              ABVMSG:         DB      (ENDABV-ABVMSG)-1
0747°   14 0D 45 6E                     DB      CNTLT,ENTER,"Enter ABSOLUTE value : "
074B°   74 65 72 20
074F°   41 42 53 4F
0753°   4C 55 54 45
0757°   20 76 61 6C
075B°   75 65 20 3A
075F°   20
0760°                   ENDABV:
                        ;
0760°   3A              PFAMSG:         DB      (ENDPFA-PFAMSG)-1
0761°   14 0D 43 4F                     DB      CNTLT,ENTER,"COMPUTED FIELD.  Field number or absolute value ? (F/A) "
0765°   4D 50 55 54
0769°   45 44 20 46
076D°   49 45 4C 44
0771°   2E 20 20 46
0775°   69 65 6C 64
0779°   20 6E 75 6D
```

```
077D'   62 65 72 20
0781'   6F 72 20 61
0785'   62 73 6F 6C
0789'   75 74 65 20
078D'   76 61 6C 75
0791'   65 20 3F 20
0795'   28 46 2F 41
0799'   29 20
079B'                   ENDPFA:
                        ;
079B'   16              EFNMSG:          DB         (ENDEFN-EFNMSG)-1
079C'   14 0D 45 6E                DB    CNTLT,ENTER,"Enter FIELD NUMBER: "
07A0'   74 65 72 20
07A4'   46 49 45 4C
07A8'   44 20 4E 55
07AC'   4D 42 45 52
07B0'   3A 20
07B2'                   ENDEFN:
                        ;
07B2'   0F              ENVMSG:          DB         (ENDENV-ENVMSG)-1
07B3'   14 0D 45 6E                DB    CNTLT,ENTER,"Enter VALUE: "
07B7'   74 65 72 20
07BB'   56 41 4C 55
07BF'   45 3A 20
07C2'                   ENDENV:
                        ;
                                   IFDEF LEVEL2
                        HSCMSG:          DB         (ENDHSC-HSCMSG)-1
                                   DB    CNTLT,ENTER,"Enter HELP SCREEN data. Press CONTROL F "
                                   DB    "when through."
                        ENDHSC:
                        ;
                        EACMSG:    DB    (ENDEAC-EACMSG)-1
                                   DB    CNTLT,ENTER,"ENTER ABSOLUTE CHARACTER(S) "
                        ENDEAC:
                        ;
                                   ENDIF
07C2'   17              EDVMSG:          DB         (ENDEDV-EDVMSG)-1
07C3'   14 0D 45 6E                DB    CNTLT,ENTER,"Enter DEFAULT value: "
07C7'   74 65 72 20
07CB'   44 45 46 41
07CF'   55 4C 54 20
07D3'   76 61 6C 75
07D7'   65 3A 20
07DA'                   ENDEDV:
                        ;
                                   IFDEF LEVEL2
                        EDNMSG:          DB         (ENDEDN-EDNMSG)-1
                                   DB    CNTLT,ENTER,"Enter DATABASE name for field input: "
                        ENDEDN:
                                   ENDIF
                        ;
```

```
C7DA°   29                  60510   IOPMSG:         DB              (ENDIOP-IOPMSG)-1
07DB°   14 0D 45 6E         60520           DB      CNTLT,ENTER,"Enter arithmetic operator  (+,-,*,/) : "
07DF°   74 65 72 20
07E3°   61 72 69 74
07E7°   68 6D 65 74
07EB°   69 63 20 6F
07EF°   70 65 72 61
07F3°   74 6F 72 20
07F7°   20 28 2B 2C
07FB°   2D 2C 2A 2C
07FF°   2F 29 20 3A
0803°   20
0804°                       60530   ENDIOP:
                            60540   ;
                            60545           IFDEF   LEVEL2
                            60550   EKNMSG:         DB              (ENDEKN-EKNMSG)-1
                            60560           DB      CNTLT,ENTER,"Enter KEY number: "
                            60570   ENDEKN:
                            60580   ;
                            60590   DSCMSG:         DB              (ENDDSC-DSCMSG)-1
                            60600           DB      CNTLT,ENTER,"DISPATCH screen or program ? (P/S) "
                            60610   ENDDSC:
                            60620   ;
                            60630   PNEMSG:         DB              (ENDPNE-PNEMSG)-1
                            60640           DB      CNTLT,ENTER,"Enter program name or ENTER : "
                            60650   ENDPNE:
                            60655           ENDIF
                            60660   ;
0804°   4A                  60670   GFNMSG:         DB              (ENDGFN-GFNMSG)-1
0805°   14 0D 55 73         60680           DB      CNTLT,ENTER,"Use left/right arrow to position cursor.  Press  ENTER  to sele
ct field "
0809°   65 20 6C 65
080D°   66 74 2F 72
0811°   69 67 68 74
0815°   20 61 72 72
0819°   6F 77 20 74
081D°   6F 20 70 6F
0821°   73 69 74 69
0825°   6F 6E 20 63
0829°   75 72 73 6F
082D°   72 2E 20 20
0831°   50 72 65 73
0835°   73 20 20 45
0839°   4E 54 45 52
083D°   20 20 74 6F
0841°   20 73 65 6C
0845°   65 63 74 20
0849°   66 69 65 6C
084D°   64 20
084F°                       60690   ENDGFN:
                            60700   ;
                            60705           IFDEF   LEVEL2
```

```
                EPWMSG:         DB          (ENDEPW-EPWMSG)-1
                        DB      CNTLT,ENTER,"Enter PASSWORD: "
                ENDEPW:
                        ENDIF
                ;
084F'   35      INKMSG:         DB          (ENDINK-INKMSG)-1
0850'   55 73 65 20     DB      "Use left/right arrows to select field containing KEY "
0854'   6C 65 66 74
0858'   2F 72 69 67
085C'   68 74 20 61
0860'   72 72 6F 77
0864'   73 20 74 6F
0868'   20 73 65 6C
086C'   65 63 74 20
0870'   66 69 65 6C
0874'   64 20 63 6F
0878'   6E 74 61 69
087C'   6E 69 6E 67
0880'   20 4B 45 59
0884'   20
0885'
                ENDINK:
                        IFDEF   LEVEL2
                DBNMSG:         DB          (ENDDBN-DBNMSG)-1
                        DB      "INTERACTIVE FIELD - Input or output ? (I/O)  "
                ENDDBN:
                DBIMSG:         DB          (ENDDBI-DBIMSG)-1
                        DB      "INTERACTIVE FIELD - Interact with which database ?  "
                ENDDBI:
                ;
                ;
                ;**************************************************************
                ;
                ;
                ;       THESE ARE THE DATA STRINGS USED AS ERROR MESSAGES
                ;
                ;
                ;**************************************************************
                ;
                ;
                FDNERR:         DB          (ENDFDN-FDNERR)-1
                        DB      CNTLT,ENTER,"NOT A VALID FIELD NUMBER "
                ENDFDN:
                ;
                ;
                        ENDIF
                ;**************************************************************
                ;
                ;
                ;       THIS IS THE SECTION CONTAUNING ALL OF THE WORKING STORAGE
                ;
                ;
                ;**************************************************************
```

```
                       61070   ;
                       61080   ;
0985'                  61085   NSFMKR: DS       1
0986'                  61090   VALBUF:          DS          2        ;INPUT BUFFER FOR 2 BYTE VALIDATION
0988'                  61100   VALSTR:          DS          50       ;STRING OF VALIDATION FOR CURRENT FIELD
08BA'                  61105           DS       2
08BC'                  61110   VALCTR:          DS          1        ;VALIDATION COUNTER
                       61120   ;
08BD'                  61130   STRPTR:          DS          2        ;POINTER INTO VALIDATION STRING
                       61140   ;
08BF'                  61150   LN24BF:          DS          80       ;LINE 24 BUFFER
                       61160   ;
                       61170   ;
090F'                  61180   FLDBUF:          DS          80       ;FIELD BUFFER
                       61190   ;
095F'                  61200   CURFDN:          DS          1        ;CURRENT FIELD NUMBER
0960'                  61210   CURFLN:          DS          1        ;CURRENT FIELD LENGTH
                       61220   ;
0961'                  61230   FLDCPR:          DS          2        ;FIELD LOCATION POINTER
0963'                  61240   VALLOC:          DS          2        ;LOCATION OF VALIDATIONS
                       61250   ;
0965'    00            61260   REVFLG:          DB          0        ;REVERSE VIDEO FLAG
                       61270   ;
0966'                  61280   TVBUF:  DS       1024                 ;TEMPORARY VALIDATION BUFFER
0D66'                  61290   TVBPTR:          DS          2        ;POINTER INTO TEMPORARY BUFFER
                       61300   ;
0D68'                  61310   CURVAL:          DS          2        ;LOCATION OF CURRENT VALIDATION PNTR
                       61320   ;
0D6A'                  61330   VALPTR:          DS          2        ;VALIDATION POINTER
                       61340   ;
0D6C'                  61350   INPLEN:          DS          1
0D6D'                  61360   LSTFDN:          DS          1        ;NUMBER OF LAST FIELD ON SCREEN
0D6E'                  61370   SAVFDN:          DS          1        ;NUMBER OF CURRENT FIELD SAVED
                       61380   ;
                       61390   ;
                       70000   ;*****************************************************************
                       70020   ;
                       70040   ;
                       70060   ;       THESE ARE THE DATA LIST AOND TABLES
                       70080   ;
                       70100   ;
                       70120   ;*****************************************************************
                       70140   ;
                       70160   ;THIS IS THE DISPATCH TABLE FOR INDIVIDUAL VALIDATIONS- DISPATCH LIST
                       70180   ;
0D6F'                  70200   DISLST:
0D6F'    59 4E         70340           DB       "YN"
0D71'    052B'         70360           DW       PVALYN          ;PROCESS VALIDATION: YES/NO
0D73'    43 46         70380           DB       "CF"
0D75'    0536'         70400           DW       PVALCF          ;PROCESS VALIDATION: COMPUTED FIELD
0D77'    56 46         70500           DB       "VF"
0D79'    0543'         70520           DW       PVALVF          ;PROCESS VALIDATION: VERIFY
0D7B'    42 4C         70540           DB       "BL"
```

```
0D7D'   054E'          70560          DW      PVALBL        ;PROCESS VALIDATION: BLANK
0D7F'   41 4C          70580          DB      "AL"
0D81'   055A'          70600          DW      PVALAL        ;PROCESS VALIDATION: ALPHANUMERIC
0D83'   4E 55          70620          DB      "NU"
0D85'   0566'          70640          DW      PVALNU        ;PROCESS VALIDATION: NUMERIC
0D87'   44 50          70660          DB      "DP"
0D89'   0572'          70680          DW      PVALDP        ;PROCESS VALIDATION: DECIMAL POINT
0D8B'   53 56          70700          DB      "SV"
0D8D'   057E'          70720          DW      PVALSV        ;PROCESS VALIDATION: SIGNED VALUE
0D8F'   56 4E          70820          DB      "VN"
0D91'   058A'          70840          DW      PVALVN        ;PROCESS VALIDATION: VALID NUMERIC
0D93'   4C 4A          70900          DB      "LJ"
0D95'   0597'          70920          DW      PVALLJ        ;PROCESS VALIDATION: LEFT JUSTIFY
0D97'   52 4A          70940          DB      "RJ"
0D99'   05A4'          70960          DW      PVALRJ        ;PROCESS VALIDATION: RIGHT JUSTIFY
0D9B'   44 56          70980          DB      "DV"
0D9D'   05B1'          71000          DW      PVALDV        ;PROCESS VALIDATION: DEFAULT VALUE
0D9F'   44 43          71020          DB      "DC"
0DA1'   05BE'          71040          DW      PVALDC        ;PROCESS VALIDATION: DOLLARS & CENTS
0DA3'   44 32          71060          DB      "D2"
0DA5'   05CD'          71080          DW      PVALD2        ;PROCESS VALIDATION: D & CENTS +FRACTIONS
0DA7'   4E 53          71100          DB      "NS"
0DA9'   05D7'          71120          DW      PVALNS        ;PROCESS VALIDATION: NON-STORED FIELD
                       71140    ;
                       71160    ;
0DAB'   FF             71180          DB      EOF
                       71200    ;
                       71220    ;
                       71240    ;
                       71260    ;
                       80000    ;**************************************************************
                       80020    ;
                       80040    ;
                       80060    ;         THIS SECTION CONTAINS THE SUPERVISOR ROUTINES
                       80080    ;
                       80100    ;
                       80120    ;**************************************************************
                       80140    ;
                       80160    ;
                       99990          END     VALID
Macros:

Symbols:
ARVMSG  0746'   ACTOKN  0081    ALFLAG  055D*   APRSCN  0000*
BCKSP   0008    BFIELD  005B    BLFLAG  0551*   CFFLAG  0539*
CFINC5  0214'   CFINO7  021A'   CFINO9  022C'   CFIN10  0232'
CFINTP  01FC'   CFTOKN  0083    CHKEND  0478'   CHKIAV  02DE'
CHKREV  04AA'   CHKV05  0463'   CHKV10  0474'   CHKV15  0475'
CHKVAL  045F'   CLOSE   0000*   CLR24   04D5'   CLRMEM  001C*
CLRMM2  0036*   CNTLN   000F    CNTLP   0010    CNTLT   0014
CNTLY   0019    CNTLZ   001A    COMFLS  0000*   COMMA   002C
```

| | | | | | | | |
|---|---|---|---|---|---|---|---|
| COMNXT | 0177° | COMPL8 | 0000* | COMVA3 | 0129° | COMVA5 | 012D° |
| COMVA7 | 0162° | COMVAL | 0123° | CORFLD | 04FD° | CURBUF | 0438° |
| CURDCB | 0381° | CURFBF | 043A° | CURFDN | 095F° | CURFLN | 0960° |
| CUROFF | 047D* | CURPLL | 03AF° | CURSDN | 023F* | CURVAL | 0D68° |
| D2FLAG | 0000* | DBDSC | 0000* | DBRECL | 061E* | DCB3 | 0000* |
| DCB5 | 0000* | DCFLAG | 05C1* | DELAY | 0452* | DETS05 | 063F° |
| DETS99 | 064A° | DETSTR | 0633° | DFTOKN | 00BC | DISLST | 0D6F° |
| DISMSG | 04C5° | DISPV2 | 05FD° | DISPV5 | 060F° | DISPV7 | 0610° |
| DISPVL | 05FA° | DLA | 00FC | DNA | 001F | DOWNA | 001F |
| DPFLAG | 0575* | DPTOKN | 00B9 | DRA | 00FD | DSTOKN | 0088 |
| DVFLAG | 05B4* | DVINT2 | 024C° | DVINT3 | 025F° | DVINT4 | 0276° |
| DVINT5 | 028C° | DVINTP | 023A° | DVTOKN | 0085 | EDVMSG | 07C2° |
| EFIELD | 005D | EFNMSG | 079B° | ENDABV | 0760° | ENDEDV | 07DA° |
| ENDEFN | 07B2° | ENDENV | 07C2° | ENDGFN | 084F° | ENDINK | 0885° |
| ENDINV | 06C9° | ENDICP | 0804° | ENDMVL | 0746° | ENDPFA | 079B° |
| ENDVER | 0706° | ENTER | 000D | ENVMSG | 07B2° | EOF | 00FF |
| EOV | 007F | ESC | 001B | F1 | 0001 | F2 | 0002 |
| FBUF3 | 0000* | FBUF5 | 0000* | FFIELD | 007D | FLDBUF | 090F° |
| FLDLOC | 0000* | FLDTB3 | 0000* | FLDTB5 | 0000* | FLDTBL | 05DF* |
| FLDVA5 | 002C° | FLDVAL | 0001° | FLOCPR | 0961° | FLPCTR | 0437° |
| FLPTRT | 03B5° | FNDFLC | 036B* | FNDFLD | 0000* | FNDRET | 0000* |
| FNDV99 | 05F0° | FNDVA2 | 05E1° | FNDVAL | 05DE° | FNF | 008E |
| FSTART | 043C° | GETVA3 | 00A1° | GETVA5 | 0084° | GETVAL | 0074° |
| GFNMSG | 0804° | GVAL | 0653° | GVAL3 | 0666° | GVAL4 | 066C° |
| GVAL5 | 067C° | HSTOKN | 0084 | IAV005 | 02F1° | INCHAR | 03A6° |
| INKMSG | 084F° | INPLEN | 0D6C° | INPVAL | 0061° | INSEDV | 03A1° |
| INSTKN | 029B° | INTER3 | 0193° | INTER6 | 01C9° | INTER9 | 01DC° |
| INTERP | 018E° | INTOKN | 0086 | INTPED | 02B8° | INTPFA | 02F5° |
| INTPUA | 02A4° | INTPOP | 0380° | INTVAL | 0010* | INVMSG | 06B4° |
| INVPAV | 02BF° | IOPMSG | 07DA° | IVFLAG | 0000* | IVI005 | 01EC° |
| IVINTP | 01DD° | IVTOKN | 0082 | KBCHAR | 06A0* | KBLINE | 02D9* |
| KFFLAG | 0000* | KFINTP | 029A° | KFTOKN | 0087 | LA | 001C |
| LASTFN | 0341* | LEFTA | 001C | LJFLAG | 059A* | LN24BF | 088F° |
| LSTFDN | 0D6D° | MAXVAL | 00DB° | MVLMSG | 0706° | NSFMKR | 0885° |
| NUFLAG | 0569* | OPEN | 0000* | PFA002 | 030C° | PFA003 | 0321° |
| PFA004 | 0332° | PFA005 | 033C° | PFA008 | 0353° | PFAMSG | 0760° |
| PL3 | 0000* | PL5 | 0000* | PLDESC | 0621° | PDA005 | 02AA° |
| POP005 | 0386° | POP009 | 039A° | PRISDM | 0000* | PRTMSG | 043D° |
| PRVLST | 0511° | PTRFLD | 03AE° | PVALAL | 055A° | PVALBL | 054E° |
| PVALCF | 0536° | PVALD2 | 05CD° | PVALDC | 05BE° | PVALDP | 0572° |
| PVALDV | 05B1° | PVALIV | 0525° | PVALLJ | 0597° | PVALNS | 05D7° |
| PVALNU | 0566° | PVALRJ | 05A4° | PVALSV | 057E° | PVALVF | 0543° |
| PVALVN | 058A° | PVALYN | 052B° | PWFLAG | 0000* | PWINTP | 01FB° |
| PWTOKN | 008A | RA | 001D | RAMDES | 03B3° | RAMVID | 06B1* |
| RBUF3 | 0000* | RBUF5 | 0000* | READNX | 0000* | RECSUB | 0615° |
| RESCUR | 0000* | REVFLD | 047C° | REVFLG | 0965° | RIGHTA | 001D |
| RJFLAG | 05A7* | RSDPL1 | 0000* | SACTRL | 0064 | SARCV | 0060 |
| SATX | 0061 | SAVFDN | 0D6E° | SBCTRL | 0065 | SBNDEC | 0015 |
| SBNHEX | 0013 | SBRCV | 0062 | SBTX | 0063 | SCLOSE | 002A |
| SCLRXT | 0039 | SCNPRT | 06A8* | SCROLL | 001B | SCURSR | 001A |
| SDATE | 002D | SDELAY | 0006 | SDIRRD | 0023 | SDIRWR | 002C |
| SDSCMD | 0025 | SDSKID | 000F | SERMSG | 0034 | SERROR | 0027 |
| SETSCR | 04C6* | SETVAL | 00C3° | SFIELD | 007B | SFLPTR | 003A |

| | | | | | | | |
|---|---|---|---|---|---|---|---|
| SHLDKY | 001D | SINTIO | 0000 | SJPDOS | 0024 | SKBCHR | 0004 |
| SKBINT | 0001 | SKBLIN | 0005 | SKILL | 0029 | SLOCAT | 0021 |
| SLOKUP | 001C | SMPYDV | 0017 | SOPEN | 0028 | SPACE | 0020 |
| SPARSR | 0030 | SPRCHR | 0012 | SPRCTL | 005F | SPRINT | 0011 |
| SPRLIN | 0013 | SRAMDR | 0035 | SRANDM | 0014 | SRDNXT | 0022 |
| SRNAME | 002F | SRS232 | 0037 | SRTCMD | 0026 | SSORT | 0038 |
| SSTBRK | 0003 | SSTCMP | 0016 | SSTSCN | 0031 | SSTUSR | 0002 |
| STCFLD | 00FB | STIMER | 0019 | STRPTR | 08BD' | SVDCHR | 0008 |
| SVDGRF | 000A | SVDINT | 0007 | SVDKEY | 000C | SVDLIN | 0009 |
| SVDRAM | 005E | SVDRED | 0008 | SVFLAG | 0581* | SWILD | 0033 |
| SWRNXT | 002B | TAB | 0009 | TMPFLD | 03B7' | TRNV89 | 0108' |
| TRNV99 | 0115' | TRNVA5 | 00FA' | TRNVAL | 00E1' | TVBPTR | 0D66' |
| TVBUF | 0966' | UPA | 001E | VALBUF | 0886' | VALCTR | 098C' |
| VALFI | 0694' | VALID | 0000I' | VALIDS | 000A* | VALLOC | 0963' |
| VALLST | 0461* | VALOFF | 02F2* | VALPTR | 0D6A' | VALSTR | 0988' |
| VDCHAR | 0680* | VDGRAF | 0518* | VDLINE | 0522* | VDREAD | 0490* |
| VERMSG | 06C9' | VFFLAG | 0546* | VIDRAM | 0695* | VIDRES | 04F2' |
| VIDREV | 04E0' | VLF1A | 069F' | VLF1B | 06AC' | VLHPSC | 0698* |
| VNFLAG | 058D* | WFIELD | 007E | XXSCRN | 0000* | YNFLAG | 052E* |

No Fatal error(s)

```
                    ;*************************************************************
                    ;*************************************************************
                    ;
                    ;
                    ;THIS IS AUTOGRAMMER. WRITTEN BY RON BORTA
                    ;
                    ;LAST REVISION DATE:  6/5/1981   2:10 PM
                    ;
                    ;
                    ;*************************************************************
                    ;*************************************************************
                    ;
                    ;
                    ;
                            TITLE   AUTOGRAMMER HELP SCREENS  VERSION 1.14
                    ;
                            SUBTTL  WRITTEN BY RON BORTA (ALL RIGHTS RESERVED)
                    ;
                    ;
                    ;
                            ENTRY   HELP
                    ;
                    ;
0000'               HELP::
                    ;THESE ARE THE HELP SCREENS
                    ;
0000'   20 20 20 20 EDHPSC::        DB         "                    HELP SCREEN FOR SCREEN EDITOR
                "
0004'   20 20 20 20
```

```
0008°   20 20 20 20
000C°   20 20 20 20
0010°   20 20 20 20
0014°   20 20 20 20
0018°   20 48 45 4C
001C°   50 20 53 43
0020°   52 45 45 4E
0024°   20 46 4F 52
0028°   20 53 43 52
002C°   45 45 4E 20
0030°   45 44 49 54
0034°   4F 52 20 20
0038°   20 20 20 20
003C°   20 20 20 20
0040°   20 20 20 20
0044°   20 20 20 20
0048°   20 20 20 20
004C°   20 20 20 20
0050°   20 20 20 20     56080          DB       "
  "
0054°   20 20 20 20
0058°   20 20 20 20
005C°   20 20 20 20
0060°   20 20 20 20
0064°   20 20 20 20
0068°   20 20 20 20
006C°   20 20 20 20
0070°   20 20 20 20
0074°   20 20 20 20
0078°   20 20 20 20
007C°   20 20 20 20
0080°   20 20 20 20
0084°   20 20 20 20
0088°   20 20 20 20
008C°   20 20 20 20
0090°   20 20 20 20
0094°   20 20 20 20
0098°   20 20 20 20
009C°   20 20 20 20
00A0°   53 63 72 65     56100          DB       "Screen Editor control functions                FIELD DELIMITERS
  "
00A4°   65 6E 20 45
00A8°   64 69 74 6F
00AC°   72 20 63 6F
00B0°   6E 74 72 6F
00B4°   6C 20 66 75
00B8°   6E 63 74 69
00BC°   6F 6E 73 20
00C0°   20 20 20 20
00C4°   20 20 20 20
00C8°   20 20 20 20
00CC°   20 20 20 20
00D0°   20 20 20 20
```

```
00D4'  20 20 20 20
00D8'  46 49 45 4C
00DC'  44 20 44 45
00E0'  4C 49 4D 49
00E4'  54 45 52 53
00E8'  20 20 20 20
00EC'  20 20 20 20
00F0'  20 20 20 20    56120      DB    "
  "
00F4'  20 20 20 20
00F8'  20 20 20 20
00FC'  20 20 20 20
0100'  20 20 20 20
0104'  20 20 20 20
0108'  20 20 20 20
010C'  20 20 20 20
0110'  20 20 20 20
0114'  20 20 20 20
0118'  20 20 20 20
011C'  20 20 20 20
0120'  20 20 20 20
0124'  20 20 20 20
0128'  20 20 20 20
012C'  20 20 20 20
0130'  20 20 20 20
0134'  20 20 20 20
0138'  20 20 20 20
013C'  20 20 20 20
0140'  43 6F 6E 74    56140      DB    "Control C = BREAK, Return to TRSDOS            NON-PROMPTED FIELD
  "
0144'  72 6F 6C 20
0148'  43 20 3D 20
014C'  42 52 45 41
0150'  4B 2C 20 52
0154'  65 74 75 72
0158'  6E 20 74 6F
015C'  20 54 52 53
0160'  44 4F 53 20
0164'  20 20 20 20
0168'  20 20 20 20
016C'  20 20 20 20
0170'  20 20 20 20
0174'  20 20 20 4E
0178'  4F 4E 2D 50
017C'  52 4F 4D 50
0180'  54 45 44 20
0184'  46 49 45 4C
0188'  44 20 20 20
018C'  20 20 20 20
0190'  43 6F 6F 74    56160      DB    "Control D = DELETE character, shorten line      { }
  "
0194'  72 6F 6C 20
```

```
0198*   44 20 3D 20
019C*   44 45 4C 45
01A0*   54 45 20 63
01A4*   68 61 72 61
01A8*   63 74 65 72
01AC*   2C 20 73 68
01B0*   6F 72 74 65
01B4*   6E 20 6C 69
01B8*   6E 65 20 20
01BC*   20 2C 20 20
01C0*   20 20 20 20
01C4*   20 20 20 20
01C8*   20 20 20 20
01CC*   20 20 7B 20
01D0*   7D 20 20 20
01D4*   20 20 20 20
01D8*   20 20 20 20
01DC*   20 20 20 20
01E0*   43 6F 6E 74      56180      DB     "Control E = END editing, begin AUTOGRAMMING
  "
01E4*   72 6F 6C 20
01E8*   45 20 3D 20
01EC*   45 4E 44 20
01F0*   65 64 69 74
01F4*   69 6E 67 2C
01F8*   20 62 65 67
01FC*   69 6E 20 41
0200*   55 54 4F 47
0204*   52 41 4D 4D
0208*   49 4E 47 20
020C*   20 20 20 20
0210*   20 20 20 20
0214*   20 20 20 20
0218*   20 20 20 20
021C*   20 20 20 20
0220*   20 20 20 20
0224*   20 20 20 20
0228*   20 20 20 20
022C*   20 20 20 20
0230*   43 6F 6E 74      56200      DB     "Control G = enter/return from GRAPHICS mode          PROMPTED FIELD
  "
0234*   72 6F 6C 20
0238*   47 20 3D 20
023C*   65 6E 74 65
0240*   72 2F 72 65
0244*   74 75 72 6E
0248*   20 66 72 6F
024C*   6D 20 47 52
0250*   41 50 48 49
0254*   43 53 20 6D
0258*   6F 64 65 20
025C*   20 20 20 20
0260*   20 20 20 20
```

```
0264'   20 20 20 20
0268'   20 50 52 4F
026C'   4D 50 54 45
0270'   44 20 46 49
0274'   45 4C 44 20
0278'   20 20 20 20
027C'   20 20 20 20
0280'   43 6F 6E 74        56220        DB      "Control H = HOME cursor, row 1, column 1          [ ]
    "
0284'   72 6F 6C 20
0288'   48 20 3D 20
028C'   49 4F 4D 45
0290'   20 63 75 72
0294'   73 6F 72 2C
0298'   20 72 6F 77
029C'   20 31 2C 20
02A0'   63 6F 6C 75
02A4'   6D 6E 20 31
02A8'   20 20 20 20
02AC'   20 20 20 20
02B0'   20 20 20 20
02B4'   20 20 20 20
02B8'   20 20 20 20
02BC'   20 20 5B 20
02C0'   5D 20 20 20
02C4'   20 20 20 20
02C8'   20 20 20 20
02CC'   20 20 20 20
02D0'   43 6F 6E 74        56240        DB      "Control I = INSERT character, lengthen line
    "
02D4'   72 6F 6C 20
02D8'   49 20 3D 20
02DC'   49 4E 53 45
02E0'   52 54 20 63
02E4'   68 61 72 61
02E8'   63 74 65 72
02EC'   2C 20 6C 65
02F0'   6E 67 74 68
02F4'   65 6E 20 6C
02F8'   69 6E 65 20
02FC'   20 20 20 20
0300'   20 20 20 20
0304'   20 20 20 20
0308'   20 20 20 20
030C'   20 20 20 20
0310'   20 20 20 20
0314'   20 20 20 20
0318'   20 20 20 20
031C'   20 20 20 20
0320'   43 6F 6E 74        56260        DB      "Control K = KILL line, shorten screen         SINGLE CHARACTER FIELD
    "
0324'   72 6F 6C 20
0328'   48 20 3D 20
```

```
  032C°    4B 49 4C 4C
 0330°    20 6C 69 6E
 0334°    65 2C 20 73
 0338°    68 6F 72 74
 033C°    65 6E 20 73
 0340°    63 72 65 65
 0344°    6E 20 20 20
 0348°    20 20 20 20
 034C°    20 20 20 20
 0350°    20 20 20 20
 0354°    53 49 4E 47
 0358°    4C 45 20 43
 035C°    48 41 52 41
 0360°    43 54 45 52
 0364°    20 46 49 45
 0368°    4C 44 20 20
 036C°    20 20 20 20
 0370°    43 6F 6E 74          56280          DB      "Control L = insert LINE, lengthen screen          ~  (CONTROL
6)   "
 0374°    72 6F 6C 20
 0378°    4C 20 3D 20
 037C°    69 6E 73 65
 0380°    72 74 20 4C
 0384°    49 4E 45 2C
 0388°    20 6C 65 6E
 038C°    67 74 68 65
 0390°    6E 20 73 63
 0394°    72 65 65 6E
 0398°    20 20 20 20
 039C°    20 20 20 20
 03A0°    20 20 20 20
 03A4°    20 20 20 20
 03A8°    20 20 20 20
 03AC°    20 20 20 7E
 03B0°    20 20 28 43
 03B4°    4F 4E 54 52
 03B8°    4F 4C 20 36
 03BC°    29 20 20 20
 03C0°    43 6F 6E 74          56300          DB      "Control M = MOVE text to MIDDLE of screen
   "
 03C4°    72 6F 6C 20
 03C8°    4D 20 3D 20
 03CC°    4D 4F 56 45
 03D0°    20 74 65 78
 03D4°    74 20 74 6F
 03D8°    20 4D 49 44
 03DC°    44 4C 45 20
 03E0°    6F 66 20 73
 03E4°    63 72 65 65
 03E8°    6E 20 20 20
 03EC°    20 20 20 20
 03F0°    20 20 20 20
```

```
 03F4'   20 20 20 20
 03F8'   20 20 20 20
 03FC'   20 20 20 20
 0400'   20 20 20 20
 0404'   20 20 20 20
 0408'   20 20 20 20
 040C'   20 20 20 20
 0410'   43 6F 6E 74        56320       DB      "Control Q = QUIT, clear screen, start over      NON-PROMPTED, NON-STORED FI
ELD  "
 0414'   72 6F 6C 20
 0418'   51 20 3D 20
 041C'   51 55 49 54
 0420'   2C 20 63 6C
 0424'   65 61 72 20
 0428'   73 63 72 65
 042C'   65 6E 2C 20
 0430'   73 74 61 72
 0434'   74 20 6F 76
 0438'   65 72 20 20
 043C'   20 20 20 20
 0440'   4E 4F 4E 2D
 0444'   50 52 4F 4D
 0448'   50 54 45 44
 044C'   2C 20 4E 4F
 0450'   4E 2D 53 54
 0454'   4F 52 45 44
 0458'   20 46 49 45
 045C'   4C 44 20 20
 0460'   43 6F 6E 74        56340       DB      "Control R = REVERSE video on/off                              ",0FBH," ",0F
DH,"                "
 0464'   72 6F 6C 20
 0468'   52 20 3D 20
 046C'   52 45 56 45
 0470'   52 53 45 20
 0474'   76 69 64 65
 0478'   6F 20 6F 6E
 047C'   2F 6F 66 66
 0480'   20 20 20 20
 0484'   20 20 20 20
 0488'   20 20 20 20
 048C'   20 20 20 20
 0490'   20 20 20 20
 0494'   20 20 20 20
 0498'   20 20 20 20
 049C'   20 20 FB 20
 04A0'   FD 20 20 20
 04A4'   20 20 20 20
 04A8'   20 20 20 20
 04AC'   20 20 20 20
 04B0'   43 6F 6E 74        56360       DB      "Control S = SAVE SCREEN                         this field will not be add
ed   "
 04B4'   72 6F 6C 20
 04B8'   53 20 3D 20
```

```
04BC°  53 41 56 45
04C0°  20 53 43 52
04C4°  45 45 4E 20
04C8°  20 20 20 20
04CC°  20 20 20 20
04D0°  20 20 20 20
04D4°  20 20 20 20
04D8°  20 20 20 20
04DC°  20 20 20 20
04E0°  20 74 68 69
04E4°  73 20 66 69
04E8°  65 6C 64 20
04EC°  77 69 6C 6C
04F0°  20 6E 6F 74
04F4°  20 62 65 20
04F8°  61 64 64 65
04FC°  64 20 20 20
0500°  20 20 20 20        56380        DB      "                                    to the DATA-BASE
  "
0504°  20 20 20 20
0508°  20 20 20 20
050C°  20 20 20 20
0510°  20 20 20 20
0514°  20 20 20 20
0518°  20 20 20 20
051C°  20 20 20 20
0520°  20 20 20 20
0524°  20 20 20 20
0528°  20 20 20 20
052C°  20 20 20 20
0530°  20 20 20 20
0534°  20 20 74 6F
0538°  20 74 68 65
053C°  20 44 41 54
0540°  41 2D 42 41
0544°  53 45 20 20
0548°  20 20 20 20
054C°  20 20 20 20
0550°  42 52 45 41        56400        DB      "BREAK     = Return to TRSDOS
  "
0554°  4B 20 20 20
0558°  20 20 3D 20
055C°  52 65 74 75
0560°  72 6E 20 74
0564°  6F 20 54 52
0568°  53 44 4F 53
056C°  20 20 20 20
0570°  20 20 20 20
0574°  20 20 20 20
0578°  20 20 20 20
057C°  20 20 20 20
0580°  20 20 20 20
0584°  20 20 20 20
```

```
0588'  20 20 20 20
058C'  20 20 20 20
0590'  20 20 20 20
0594'  20 20 20 20
0598'  20 20 20 20
059C'  20 20 20 20
05A0'  45 53 43 20      56420         DB      "ESC       = Go to previous function (TRSDOS)
  "
05A4'  20 20 20 20
05A8'  20 20 3D 20
05AC'  47 6F 20 74
05B0'  6F 20 70 72
05B4'  65 76 69 6F
05B8'  75 73 20 66
05BC'  75 6E 63 74
05C0'  69 6F 6E 20
05C4'  28 54 52 53
05C8'  44 4F 53 29
05CC'  20 20 20 20
05D0'  20 20 20 20
05D4'  20 20 20 20
05D8'  20 20 20 20
05DC'  20 20 20 20
05E0'  20 20 20 20
05E4'  20 20 20 20
05E8'  20 20 20 20
05EC'  20 20 20 20
05F0'  46 31 20 20      56440         DB      "F1        = Display / return from  Help Screen
  "
05F4'  20 20 20 20
05F8'  20 20 3D 20
05FC'  44 69 73 70
0600'  6C 61 79 20
0604'  2F 20 72 65
0608'  74 75 72 6E
060C'  20 66 72 6F
0610'  6D 20 20 48
0614'  65 6C 70 20
0618'  53 63 72 65
061C'  65 6E 20 20
0620'  20 20 20 20
0624'  20 20 20 20
0628'  20 20 20 20
062C'  20 20 20 20
0630'  20 20 20 20
0634'  20 20 20 20
0638'  20 20 20 20
063C'  20 20 20 20
0640'  46 32 20 20      56460         DB      "F2        = Print screen
  "
0644'  20 20 20 20
0648'  20 20 3D 20
064C'  50 72 69 6E
```

```
0650*   74 20 73 63
0654*   72 65 65 6E
0658*   20 20 20 20
065C*   20 20 20 20
0660*   20 20 20 20
0664*   20 20 20 20
0668*   20 20 20 20
066C*   20 20 20 20
0670*   20 20 20 20
0674*   20 20 20 20
0678*   20 20 20 20
067C*   20 20 20 20
0680*   20 20 20 20
0684*   20 20 20 20
0688*   20 20 20 20
068C*   20 20 20 20
0690*   20 20 20 20          56480          DB      "
  "
0694*   20 20 20 20
0698*   20 20 20 20
069C*   20 20 20 20
06A0*   20 20 20 20
06A4*   20 20 20 20
06A8*   20 20 20 20
06AC*   20 20 20 20
06B0*   20 20 20 20
06B4*   20 20 20 20
06B8*   20 20 20 20
06BC*   20 20 20 20
06C0*   20 20 20 20
06C4*   20 20 20 20
06C8*   20 20 20 20
06CC*   20 20 20 20
06D0*   20 20 20 20
06D4*   20 20 20 20
06D8*   20 20 20 20
06DC*   20 20 20 20
06E0*   20 20 20 20          56500          DB      "
  "
06E4*   20 20 20 20
06E8*   20 20 20 20
06EC*   20 20 20 20
06F0*   20 20 20 20
06F4*   20 20 20 20
06F8*   20 20 20 20
06FC*   20 20 20 20
0700*   20 20 20 20
0704*   20 20 20 20
0708*   20 20 20 20
070C*   20 20 20 20
0710*   20 20 20 20
0714*   20 20 20 20
0718*   20 20 20 20
```

HELP SCREEN FOR GRAPHICS MODE

```
071C'   20 20 20 20
0720'   20 20 20 20
0724'   20 20 20 20
0728'   20 20 20 20
072C'   20 20 20 20
0730'   20 20 20 20                      DB      "
  "
0734'   20 20 20 20
0738'   20 20 20 20
073C'   20 20 20 20
0740'   20 20 20 20
0744'   20 20 20 20
0748'   20 20 20 20
074C'   20 20 20 20
0750'   20 20 20 20
0754'   20 20 20 20
0758'   20 20 20 20
075C'   20 20 20 20
0760'   20 20 20 20
0764'   20 20 20 20
0768'   20 20 20 20
076C'   20 20 20 20
0770'   20 20 20 20
0774'   20 20 20 20
0778'   20 20 20 20
077C'   20 20 20 20
0780'                        GRHPSC::
                             ;LINE 1
0780'   20 20 20 20                      DB      "
  "
0784'   20 20 20 20
0788'   20 20 20 20
078C'   20 20 20 20
0790'   20 20 20 20
0794'   20 20 20 20
0798'   20 20 48 45
079C'   4C 50 20 53
07A0'   43 52 45 45
07A4'   4E 20 46 4F
07A8'   52 20 47 52
07AC'   41 50 48 49
07B0'   43 53 20 4D
07B4'   4F 44 45 20
07B8'   20 20 20 20
07BC'   20 20 20 20
07C0'   20 20 20 20
07C4'   20 20 20 20
07C8'   20 20 20 20
07CC'   20 20 20 20
                             ;LINE 2
07D0'   20 20 20 20                      DB      "
  "
```

```
0704'   20 20 20 20
07D8'   20 20 20 20
07DC'   20 20 20 20
07E0'   20 20 20 20
07E4'   20 20 20 20
07E8'   20 20 20 20
07EC'   20 20 20 20
07F0'   20 20 20 20
07F4'   20 20 20 20
07F8'   20 20 20 20
07FC'   20 20 20 20
0800'   20 20 20 20
0804'   20 20 20 20
0808'   20 20 20 20
080C'   20 20 20 20
0810'   20 20 20 20
0814'   20 20 20 20
0818'   20 20 20 20
081C'   20 20 20 20
                          56610   ;LINE 3
0820'   20 20 20 20       56620           DB      "
  "
0824'   20 20 20 20
0828'   20 20 20 20
082C'   20 20 20 20
0830'   20 20 20 20
0834'   20 20 20 20
0838'   20 20 20 20
083C'   20 20 20 20
0840'   20 20 20 20
0844'   20 20 20 20
0848'   20 20 20 20
084C'   20 20 20 20
0850'   20 20 20 20
0854'   20 20 20 20
0858'   20 20 20 20
085C'   20 20 20 20
0860'   20 20 20 20
0864'   20 20 20 20
0868'   20 20 20 20
086C'   20 20 20 20
                          56670   ;LINE 4
0870'   20 20 20 20       56680           DB      "              P",0,32,22,22,22,22,22,22,22,22,22,22,22,22,22,22,22,
22,22,22,32,4,32,68,32
0874'   20 20 20 20
0878'   20 20 20 20
087C'   20 50 00 20
0880'   16 16 16 16
0884'   16 16 16 16
0888'   16 16 16 16
088C'   16 16 16 16
0890'   16 16 16 16
0894'   16 20 04 20
```

```
0898'   44 20
089A'   16 16 16 16          56685          DB      22,22,22,22,22,22,22,22,22,32,8," H ",22,22,22,22,22,22,32,1," Q
"
089E'   16 16 16 16
08A2'   16 20 08 20
08A6'   48 20 16 16
08AA'   16 16 16 16
08AE'   20 01 20 51
08B2'   20 20 20 20
08B6'   20 20 20 20
08BA'   20 20 20 20
08BE'   20 20
                             56690   ;LINE 5
08C0'   20 20 20 20          56700          DB      "
  "
08C4'   20 20 20 20
08C8'   20 20 20 20
08CC'   20 20 20 20
08D0'   20 20 20 20
08D4'   20 20 20 20
08D8'   20 20 20 20
08DC'   20 20 20 20
08E0'   20 20 20 20
08E4'   20 20 20 20
08E8'   20 20 20 20
08EC'   20 20 20 20
08F0'   20 20 20 20
08F4'   20 20 20 20
08F8'   20 20 20 20
08FC'   20 20 20 20
0900'   20 20 20 20
0904'   20 20 20 20
0908'   20 20 20 20
090C'   20 20 20 20
                             56710   ;LINE 6
0910'   20 20 20 20          56720          DB      "         T",20,"          ",20," T         ",21," U
  "
0914'   20 20 20 20
0918'   20 20 20 20
091C'   20 54 14 20
0920'   20 20 20 20
0924'   20 20 20 20
0928'   20 20 20 20
092C'   20 20 20 20
0930'   20 20 20 20
0934'   20 20 14 20
0938'   54 20 20 20
093C'   20 20 20 20
0940'   20 20 20 20
0944'   15 20 55 20
0948'   20 20 20 20
094C'   20 20 20
094F'   14 20 20 20          56725          DB      20,"          "
```

```
0953'   20 20 20 20
0957'   20 20 20 20
0958'   20 20 20 20
095F'   20
                            56730   ;LINE 7
0960'   20 20 20 20         56740           DB      ''
  '
0964'   20 20 20 20
0968'   20 20 20 20
096C'   20 20 20 20
0970'   20 20 20 20
0974'   20 20 20 20
0978'   20 20 20 20
097C'   20 20 20 20
0980'   20 20 20 20
0984'   20 20 20 20
0988'   20 20 20 20
098C'   20 20 20 20
0990'   20 20 20 20
0994'   20 20 20 20
0998'   20 20 20 20
099C'   20 20 20 20
09A0'   20 20 20 20
09A4'   20 20 20 20
09A8'   20 20 20 20
09AC'   20 20 20 20
                            56790   ;LINE 8
09B0'   20 20 20 20         56800           DB      ''              G',7,32,22,22,22,22,22,22,22,22,' V ',22,22,22,22,22,22,22,22,
22,22,32,12,32
09B4'   20 20 20 20
09B8'   20 20 20 20
09BC'   20 47 07 20
09C0'   16 16 16 16
09C4'   16 16 16 16
09C8'   20 56 20 16
09CC'   16 16 16 16
09D0'   16 16 16 16
09D4'   16 20 0C 20
09D8'   4C 20 16 16         56805           DB      'L ',22,22,22,22,22,22,22,22,22,32,14,' N ',22,22,22,22,22,22,32,5,' E
  '
09DC'   16 16 16 16
09E0'   16 16 16 20
09E4'   0E 20 4E 20
09E8'   16 16 16 16
09EC'   16 16 20 05
09F0'   20 45 20 20
09F4'   20 20 20 20
09F8'   20 20 20 20
09FC'   20 20 20 20
                            56810   ;LINE 9
0A00'   20 20 20 20         56820           DB      ''
  '
```

```
0A04'    20 20 20 20
0A08'    20 20 20 20
0A0C'    20 20 20 20
0A10'    20 20 20 20
0A14'    20 20 20 20
0A18'    20 20 20 20
0A1C'    20 20 20 20
0A20'    20 20 20 20
0A24'    20 20 20 20
0A28'    20 20 20 20
0A2C'    20 20 20 20
0A30'    20 20 20 20
0A34'    20 20 20 20
0A38'    20 20 20 20
0A3C'    20 20 20 20
0A40'    20 20 20 20
0A44'    20 20 20 20
0A48'    20 20 20 20
0A4C'    20 20 20 20
                        56830    ;LINE 10
0A50'    20 20 20 20    56840             DB      "  K",11,32,23,23,23,23,23,23,23,23," W ",23,23,23,23,23,23,23,23
,23,23,32,13
0A54'    20 20 20 20
0A58'    20 20 20 20
0A5C'    20 4B 0B 20
0A60'    17 17 17 17
0A64'    17 17 17 17
0A68'    20 57 20 17
0A6C'    17 17 17 17
0A70'    17 17 17 17
0A74'    17 20 0D
0A77'    20 4D 20 17    56845             DB      " M ",23,23,23,23,23,23,23,23,23,32,15," D ",23,23,23,23,23,23,32,9," I
       "
0A7B'    17 17 17 17
0A7F'    17 17 17 17
0A83'    20 0F 20 4F
0A87'    20 17 17 17
0A8B'    17 17 17 20
0A8F'    09 20 49 20
0A93'    20 20 20 20
0A97'    20 20 20 20
0A9B'    20 20 20 20
0A9F'    20
                        56850    ;LINE 11
0AA0'    20 20 20 20    56860             DB      "
      "
0AA4'    20 20 20 20
0AA8'    20 20 20 20
0AAC'    20 20 20 20
0AB0'    20 20 20 20
0AB4'    20 20 20 20
0AB8'    20 20 20 20
```

```
0ABC°    20 20 20 20
0AC0°    20 20 20 20
0AC4°    20 20 20 20
0AC8°    20 20 20 20
0ACC°    20 20 20 20
0AD0°    20 20 20 20
0AD4°    20 20 20 20
0AD8°    20 20 20 20
0ADC°    20 20 20 20
0AE0°    20 20 20 20
0AE4°    20 20 20 20
0AE8°    20 20 20 20
0AEC°    20 20 20 20

0AF0°    20 20 20 20      56890   ;LINE 12
                          56900            DB      "      S",3,32,22,22,22,22,22,22,22,22,22,22,22,22,22,22,22,22,22,22,
22,22,22,32,6
0AF4°    20 20 20 20
0AF8°    20 20 20 20
0AFC°    20 53 03 20
0B00°    16 16 16 16
0B04°    16 16 16 16
0B08°    16 16 16 16
0B0C°    16 16 16 16
0B10°    16 16 16 16
0B14°    16 20 06
0B17°    20 46 20 16      56905            DB      " F ",22,22,22,22,22,22,22,22,22,32,10," J ",22,22,22,22,22,22,32,2," R
    "
0B1B°    16 16 16 16
0B1F°    16 16 16 16
0B23°    20 0A 20 4A
0B27°    20 16 16 16
0B2B°    16 16 16 20
0B2F°    02 20 52 20
0B33°    20 20 20 20
0B37°    20 20 20 20
0B3B°    20 20 20 20
0B3F°    20

0B40°    20 20 20 20      56910   ;LINE 13
    "                     56920            DB      "
0B44°    20 20 20 20
0B48°    20 20 20 20
0B4C°    20 20 20 20
0B50°    20 20 20 20
0B54°    20 20 20 20
0B58°    20 20 20 20
0B5C°    20 20 20 20
0B60°    20 20 20 20
0B64°    20 20 20 20
0B68°    20 20 20 20
0B6C°    20 20 20 20
0B70°    20 20 20 20
```

```
0B74'   20 20 20 20
0B78'   20 20 20 20
0B7C'   20 20 20 20
0B80'   20 20 20 20
0B84'   20 20 20 20
0B88'   20 20 20 20
0B8C'   20 20 20 20
                        56930   ;LINE 14
0B90'   20 20 20 20     56940           DB      "
"
0B94'   20 20 20 20
0B98'   20 20 20 20
0B9C'   20 20 20 20
0BA0'   20 20 20 20
0BA4'   20 20 20 20
0BA8'   20 20 20 20
0BAC'   20 20 20 20
0BB0'   20 20 20 20
0BB4'   20 20 20 20
0BB8'   20 20 20 20
0BBC'   20 20 20 20
0BC0'   20 20 20 20
0BC4'   20 20 20 20
0BC8'   20 20 20 20
0BCC'   20 20 20 20
0BD0'   20 20 20 20
0BD4'   20 20 20 20
0BD8'   20 20 20 20
0BDC'   20 20 20 20
                        56970   ;LINE 15
0BE0'   20 20 20 20     56980           DB      "                ",16,32,17,32,18,32,19,32,27,32,28,32,29,32,30
,32,31,32,24,32,25,32,26
0BE4'   20 20 20 20
0BE8'   20 20 20 20
0BEC'   20 20 20 20
0BF0'   20 20 20 20
0BF4'   20 20 20 20
0BF8'   20 20 20 20
0BFC'   20 10 20 11
0C00'   20 12 20 13
0C04'   20 1B 20 1C
0C08'   20 1D 20 1E
0C0C'   20 1F 20 18
0C10'   20 19 20 1A
0C14'   20 20 20 20     56985           DB      32,"            "
0C18'   20 20 20 20
0C1C'   20 20 20 20
0C20'   20 20 20 20
0C24'   20 20 20 20
0C28'   20 20 20 20
0C2C'   20 20 20 20
0C30'   20 20
                        56990   ;LINE 16
```

```
0C32"   20 20 20 20     57000          DB     "                    A B C 1 2 3 4 5 6 X Y Z
  "
0C36"   20 20 20 20
0C3A"   20 20 20 20
0C3E"   20 20 20 20
0C42"   20 20 20 20
0C46"   20 20 20 20
0C4A"   20 20 20 41
0C4E"   20 42 20 43
0C52"   20 31 20 32
0C56"   20 33 20 34
0C5A"   20 35 20 36
0C5E"   20 58 20 59
0C62"   20 5A 20 20
0C66"   20 20 20 20
0C6A"   20 20 20 20
0C6E"   20 20 20 20
0C72"   20 20 20 20
0C76"   20 20 20 20
0C7A"   20 20 20 20
0C7E"   20 20 20 20
                        57010   ;LINE 17
0C82"   20 20 20 20     57020          DB     "
  "
0C86"   20 20 20 20
0C8A"   20 20 20 20
0C8E"   20 20 20 20
0C92"   20 20 20 20
0C96"   20 20 20 20
0C9A"   20 20 20 20
0C9E"   20 20 20 20
0CA2"   20 20 20 20
0CA6"   20 20 20 20
0CAA"   20 20 20 20
0CAE"   20 20 20 20
0CB2"   20 20 20 20
0CB6"   20 20 20 20
0CBA"   20 20 20 20
0CBE"   20 20 20 20
0CC2"   20 20 20 20
0CC6"   20 20 20 20
0CCA"   20 20 20 20
0CCE"   20 20 20 20
                        57030   ;LINE 18
0CD2"   20 20 20 20     57040          DB     "
  "
0CD6"   20 20 20 20
0CDA"   20 20 20 20
0CDE"   20 20 20 20
0CE2"   20 20 20 20
0CE6"   20 20 20 20
0CEA"   20 20 20 20
0CEE"   20 20 20 20
```

```
0CF2'   20 20 20 20
0CF6'   20 20 20 20
0CFA'   20 20 20 20
0CFE'   20 20 20 20
0D02'   20 20 20 20
0D06'   20 20 20 20
0D0A'   20 20 20 20
0D0E'   20 20 20 20
0D12'   20 20 20 20
0D16'   20 20 20 20
0D1A'   20 20 20 20
0D1E'   20 20 20 20
                          57050   ;LINE 19
0D22'   20 20 20 20       57060          DB     "                    H ",8,"     H ",8,"
D ",4
0D26'   20 20 20 20
0D2A'   20 20 20 20
0D2E'   20 20 20 20
0D32'   20 20 20 20
0D36'   20 20 20 20
0D3A'   20 20 20 20
0D3E'   20 20 20 20
0D42'   20 20 20 20
0D46'   20 20 20 20
0D4A'   20 20 20 20
0D4E'   20 20 20 20
0D52'   20 20 20 20
0D56'   48 20 08 20
0D5A'   20 20 20 20
0D5E'   48 20 08 20
0D62'   20 20 20 20
0D66'   44 20 04
0D69'   20 20 20 20       57065          DB     "    D ",4
0D6D'   44 20 04
                          57080   ;LINE 20
0D70'   50 00 20 01       57090          DB     "P",0,32,1,"Q               H ",8,"    D ",4,"
                 "
0D74'   51 20 20 20
0D78'   20 20 20 20
0D7C'   20 20 20 20
0D80'   20 20 20 20
0D84'   20 20 20 20
0D88'   20 20 20 20
0D8C'   20 20 20 20
0D90'   20 20 20 20
0D94'   20 20 20 20
0D98'   48 20 08 20
0D9C'   20 20 20 44
0DA0'   20 04 20 20
0DA4'   20 20 20 20
0DA8'   20 20 20 20
0DAC'   20 20 20 20
0DB0'   20 20 20 20
```

```
0DB4'   20 20 20 20
0DB8'   20 20 20 20
0DBC'   20 20 20 20
                        57100  ;LINE 21
0DC0'   20 20 20 20     57110          DB    "      ",7,32,12,32,5,"  ",11,32,13,32,9,"  ",7,32,14,32,5,"  ",11,32,
5,32,9
0DC4'   20 20 20 20
0DC8'   07 20 0C 20
0DCC'   05 20 20 20
0DD0'   08 20 0D 20
0DD4'   09 20 20 20
0DD8'   07 20 0E 20
0DDC'   05 20 20 20
0DE0'   0B 20 0F 20
0DE4'   09
0DE5'   20 20 20 20     57115          DB    "          N ",14,"    O ",15,"    L ",12,"   M ",13
0DE9'   20 20 20 20
0DED'   20 20 20 20
0DF1'   20 20 20 20
0DF5'   20 4E 20 0E
0DF9'   20 20 20 20
0DFD'   20 4F 20 0F
0E01'   20 20 20 20
0E05'   20 4C 20 0C
0E09'   20 20 20 20
0E0D'   4D 20 0D
                        57130  ;LINE 22
0E10'   53 03 20 02     57140          DB    "S",3,32,2,"R  G L E  K M I  G N E  K O I  J ",10,"   F ",6,"
      "
0E14'   52 20 20 20
0E18'   47 20 4C 20
0E1C'   45 20 20 20
0E20'   43 20 4D 20
0E24'   49 20 20 20
0E28'   47 20 4E 20
0E2C'   45 20 20 20
0E30'   4B 20 4F 20
0E34'   49 20 20 20
0E38'   4A 20 0A 20
0E3C'   20 20 20 46
0E40'   20 06 20 20
0E44'   20 20 20 20
0E48'   20 20 20 20
0E4C'   20 20 20 20
0E50'   20 20 20 20
0E54'   20 20 20 20
0E58'   20 20 20 20
0E5C'   20 20 20 20
                        57150  ;LINE 23
0E60'   20 20 20 20     57160          DB    "                                  J ",10,"    J ",10,"
    F ",6,"    F ",6
0E64'   20 20 20 20
0E68'   20 20 20 20
```

```
0E6C'   20 20 20 20
0E70'   20 20 20 20
0E74'   20 20 20 20
0E78'   20 20 20 20
0E7C'   20 20 20 20
0E80'   20 20 20 20
0E84'   20 20 20 20
0E88'   20 20 20 20
0E8C'   20 20 20 20
0E90'   20 20 20 20
0E94'   20 2C 4A 20
0E98'   0A 20 20 20
0E9C'   20 2C 4A 20
0EA0'   0A 20 20 20
0EA4'   20 20 46 20
0EA8'   06 20 20 20
0EAC'   20 46 20 06
                        57190   ;LINE 24
0EB0'   20 20 20 20     57200           DB      "
   "
0EB4'   20 20 20 20
0EB8'   20 20 20 2C
0EBC'   20 20 20 20
0EC0'   20 20 20 20
0EC4'   20 20 20 20
0EC8'   20 20 20 20
0ECC'   20 20 20 20
0ED0'   20 20 20 20
0ED4'   20 20 20 20
0ED8'   20 20 20 20
0EDC'   20 20 20 20
0EE0'   20 20 20 20
0EE4'   20 20 20 20
0EE8'   20 20 20 20
0EEC'   20 20 20 20
0EF0'   20 20 20 20
0EF4'   20 20 20 20
0EF8'   20 20 20 20
0EFC'   20 20.20 20
                        57220   ;
                        57230   ;THIS IS THE HELP SCREEN FOR THE VALIDATION MODE
0F00'                   57240   VLHPSC::
0F00'   20 20 20 20     57260           DB      "                           HELP SCREEN FOR VALIDATIONS
   "
0F04'   20 20 20 20
0F08'   20 2C 20 20
0F0C'   20 20 20 20
0F10'   20 20 20 20
0F14'   20 20 20 20
0F18'   20 20 48 45
0F1C'   4C 50 20 53
0F20'   43 52 45 45
0F24'   4E 20 46 4F
```

```
0F28'   52 20 56 41
0F2C'   4C 49 44 41
0F30'   54 49 4F 4E
0F34'   53 20 20 20
0F38'   20 20 20 20
0F3C'   20 20 20 20
0F40'   20 20 20 20
0F44'   20 20 20 20
0F48'   20 20 20 20
0F4C'   20 20 20 20
                          57280   :LINE2
0F50'   43 48 41 52       57300            DB     "CHARACTER VALIDATIONS
    "
0F54'   41 43 54 45
0F58'   52 20 56 41
0F5C'   4C 49 44 41
0F60'   54 49 4F 4E
0F64'   53 20 20 20
0F68'   20 20 20 20
0F6C'   20 20 20 20
0F70'   20 20 20 20
0F74'   20 20 20 20
0F78'   20 20 20 20
0F7C'   20 20 20 20
0F80'   20 20 20 20
0F84'   20 20 20 20
0F88'   20 20 20 20
0F8C'   20 20 20 20
0F90'   20 20 20 20
0F94'   20 20 20 20
0F98'   20 20 20 20
0F9C'   20 20 20 20
                          57320   :LINE3
0FA0'   20 20 54 68       57340            DB "  These validations limit field input to specific characters and may be use
    "
0FA4'   65 73 65 20
0FA8'   76 61 6C 69
0FAC'   64 61 74 69
0FB0'   6F 6E 73 20
0FB4'   6C 69 6D 69
0FB8'   74 20 66 69
0FBC'   65 6C 64 20
0FC0'   69 6E 70 75
0FC4'   74 20 74 6F
0FC8'   20 73 70 65
0FCC'   63 69 66 69
0FD0'   63 20 63 68
0FD4'   61 72 61 63
0FD8'   74 65 72 73
0FDC'   20 61 6E 64
0FE0'   20 6D 61 79
0FE4'   20 62 65 20
0FE8'   75 73 65 64
```

```
0FEC'    20 20 20 20
                              ;LINE4
0FF0'    20 20 69 6E                    DB   "  in any combination.  If none are selected, any character will be accepted
  "
0FF4'    20 61 6E 79
0FF8'    20 63 6F 6D
0FFC'    62 69 6E 61
1000'    74 69 6F 6E
1004'    2E 20 20 49
1008'    66 20 6E 6F
100C'    6E 65 20 61
1010'    72 65 20 73
1014'    65 6C 65 63
1018'    74 65 64 2C
101C'    20 61 6E 79
1020'    20 63 68 61
1024'    72 61 63 74
1028'    65 72 20 77
102C'    69 6C 6C 20
1030'    62 65 20 61
1034'    63 63 65 70
1038'    74 65 64 2E
103C'    20 20 20 20
                              ;LINE5
1040'    20 20 20 20                    DB      "      BL = enable BLANK (SPACE)
  "
1044'    20 20 42 4C
1048'    20 3D 20 65
104C'    6E 61 62 6C
1050'    65 20 42 4C
1054'    41 4E 4B 20
1058'    28 53 50 41
105C'    43 45 29 20
1060'    20 20 20 20
1064'    20 20 20 20
1068'    20 20 20 20
106C'    20 20 20 20
1070'    20 20 20 20
1074'    20 20 20 20
1078'    20 20 20 20
107C'    20 20 20 20
1080'    20 20 20 20
1084'    20 20 20 20
1088'    20 20 20 20
108C'    20 20 20 20
                              ;LINE6
1090'    20 20 20 20                    DB      "      AL = enable ALPHABETIC   (A-Z, Upper case)
  "
1094'    20 20 41 4C
1098'    20 3D 20 65
109C'    6E 61 62 6C
10A0'    65 20 41 4C
10A4'    50 48 41 42
```

```
10A8'   45 54 49 43
10AC'   20 20 20 28
10B0'   41 2D 5A 2C
10B4'   20 55 70 70
10B8'   65 72 20 63
10BC'   61 73 65 29
10C0'   20 20 20 20
10C4'   20 20 20 20
10C8'   20 20 20 20
10CC'   20 20 20 20
10D0'   20 20 20 20
10D4'   20 20 20 20
10D8'   20 20 20 20
10DC'   20 20 20 20
                        57480   ;LINE7
10E0'   20 20 20 20     57500           DB      "       NU = enable NUMERIC   (0-9)
  "
10E4'   20 20 4E 55
10E8'   20 3D 20 65
10EC'   6E 61 62 6C
10F0'   65 20 4E 55
10F4'   4D 45 52 49
10F8'   43 20 20 20
10FC'   28 30 2D 39
1100'   29 20 20 20
1104'   20 20 20 20
1108'   20 20 20 20
110C'   20 20 20 20
1110'   20 20 20 20
1114'   20 20 20 20
1118'   20 20 20 20
111C'   20 20 20 20
1120'   20 20 20 20
1124'   20 20 20 20
1128'   20 20 20 20
112C'   20 20 20 20
                        57520   ;LINE8
1130'   20 20 20 20     57540           DB      "       DP = enable DECIMAL POINT  (.)
  "
1134'   20 20 44 50
1138'   20 3D 20 65
113C'   6E 61 62 6C
1140'   65 20 44 45
1144'   43 49 4D 41
1148'   4C 20 50 4F
114C'   49 4E 54 20
1150'   20 28 2E 29
1154'   20 20 20 20
1158'   20 20 20 20
115C'   20 20 20 20
1160'   20 20 20 20
1164'   20 20 20 20
1168'   20 20 20 20
```

```
116C'   20 20 20 20
1170'   20 20 20 20
1174'   20 20 20 20
1178'   20 20 20 20
117C'   20 20 20 20
                          57560    ;LINE9
1180'   20 20 20 20       57580              DB      "       SV = enable SIGNED VALUE  (+,-)
  "
1184'   20 20 53 56
1188'   20 3D 20 65
118C'   6E 61 62 6C
1190'   65 20 53 49
1194'   47 4E 45 44
1198'   20 56 41 4C
119C'   55 45 20 20
11A0'   28 2B 2C 2D
11A4'   29 20 20 20
11A8'   20 20 20 20
11AC'   20 20 20 20
11B0'   20 20 20 20
11B4'   20 20 20 20
11B8'   20 20 20 20
11BC'   20 20 20 20
11C0'   20 20 20 20
11C4'   20 20 20 20
11C8'   20 20 20 20
11CC'   20 20 20 20
                          57600    ;LINE10
11D0'   46 49 45 4C       57620              DB      "FIELD VALIDATIONS
  "
11D4'   44 20 56 41
11D8'   4C 49 44 41
11DC'   54 49 4F 4E
11E0'   53 20 20 20
11E4'   20 20 20 20
11E8'   20 20 20 20
11EC'   20 20 20 20
11F0'   20 20 20 20
11F4'   20 20 20 20
11F8'   20 20 20 20
11FC'   20 20 20 20
1200'   20 20 20 20
1204'   20 20 20 20
1208'   20 20 20 20
120C'   20 20 20 20
1210'   20 20 20 20
1214'   20 20 20 20
1218'   20 20 20 20
121C'   20 20 20 20
                          57640    ;LINE11
1220'   20 20 54 68       57660              DB      "  These validations check the validity of a field when input is complete.
  "
1224'   65 73 65 20
```

```
1228°   76 61 6C 69
122C°   64 61 74 69
1230°   6F 6E 73 20
1234°   63 68 65 63
1238°   6B 20 74 68
123C°   65 20 76 61
1240°   6C 69 64 69
1244°   74 79 20 6F
1248°   66 20 61 20
124C°   66 69 65 6C
1250°   64 20 77 68
1254°   65 6E 20 69
1258°   6E 70 75 74
125C°   20 69 73 20
1260°   63 6F 6D 70
1264°   6C 65 74 65
1268°   2E 20 20 20
126C°   20 20 20 20
                                57680   ;LINE12
1270°   20 20 20 20             57700           DB      "       LJ = LEFT JUSTIFY field contents
   "
1274°   20 20 4C 4A
1278°   20 3D 20 4C
127C°   45 46 54 20
1280°   4A 55 53 54
1284°   49 46 59 20
1288°   66 69 65 6C
128C°   64 20 63 6F
1290°   6E 74 65 6E
1294°   74 73 20 20
1298°   20 20 20 20
129C°   20 20 20 20
12A0°   20 20 20 20
12A4°   20 20 20 20
12A8°   20 20 20 20
12AC°   20 20 20 20
12B0°   20 20 20 20
12B4°   20 20 20 20
12B8°   20 20 20 20
12BC°   20 20 20 20
                                57720   ;LINE13
12C0°   20 20 20 20             57740           DB      "       RJ = RIGHT JUSTIFY field contents
   "
12C4°   20 20 52 4A
12C8°   20 3D 20 52
12CC°   49 47 48 54
12D0°   20 4A 55 53
12D4°   54 49 46 59
12D8°   20 66 69 65
12DC°   6C 64 20 63
12E0°   6F 6E 74 65
12E4°   6E 74 73 20
12E8°   20 20 20 20
12EC°   20 20 20 20
```

```
12F0'   20 20 20 20
12F4'   20 20 20 20
12F8'   20 20 20 20
12FC'   20 20 20 20
1300'   20 20 20 20
1304'   20 20 20 20
1308'   20 20 20 20
130C'   20 20 20 20
                          57760   ;LINE14
1310'   20 20 20 20       57780           DB      "     DC = Display field contents as a DOLLARS and CENTS value (000.00)
  "
1314'   20 20 44 43
1318'   20 3D 20 44
131C'   69 73 70 6C
1320'   61 79 20 66
1324'   69 65 6C 64
1328'   20 63 6F 6E
132C'   74 65 6E 74
1330'   73 20 61 73
1334'   20 61 20 44
1338'   4F 4C 4C 41
133C'   52 53 20 61
1340'   6E 64 20 43
1344'   45 4E 54 53
1348'   20 76 61 6C
134C'   75 65 20 28
1350'   30 30 30 2E
1354'   30 30 29 20
1358'   20 20 20 20
135C'   20 20 20 20
                          57800   ;LINE15
1360'   20 20 20 20       57820           DB      "     D2 = Same as DC, but allow fractional cents  (000.000)
  "
1364'   20 20 44 32
1368'   20 3D 20 53
136C'   61 6D 65 20
1370'   61 73 20 44
1374'   43 2C 20 62
1378'   75 74 20 61
137C'   6C 6C 6F 77
1380'   20 66 72 61
1384'   63 74 69 6F
1388'   6E 61 6C 20
138C'   63 65 6E 74
1390'   73 20 20 28
1394'   30 30 30 2E
1398'   30 30 30 29
139C'   20 20 20 20
13A0'   20 20 20 20
13A4'   20 20 20 20
13A8'   20 20 20 20
13AC'   20 20 20 20
13B0'   20 20 20 20       57860           DB      "     VN = Field must contain a VALID NUMERIC entry to proceed
  "
```

```
13B4'   20 20 56 4E
13B8'   20 3D 20 46
13BC'   69 65 6C 64
13C0'   20 6D 75 73
13C4'   74 20 63 6F
13C8'   6E 74 61 69
13CC'   6E 20 61 20
13D0'   56 41 4C 49
13D4'   44 20 4E 55
13D8'   4D 45 52 49
13DC'   43 20 65 6E
13E0'   74 72 79 20
13E4'   74 6F 20 70
13E8'   72 6F 63 65
13EC'   65 64 20 20
13F0'   20 20 20 20
13F4'   20 20 20 20
13F8'   20 20 20 20
13FC'   20 20 20 20
                        57880   ;LINE17
1400'   20 20 20 20     57900           DB      "       VF = Prompt the operator to VERIFY FIELD contents
  "
1404'   20 20 56 46
1408'   20 3D 20 50
140C'   72 6F 6D 70
1410'   74 20 74 68
1414'   65 20 6F 70
1418'   65 72 61 74
141C'   6F 72 20 74
1420'   6F 20 56 45
1424'   52 49 46 59
1428'   20 46 49 45
142C'   4C 44 20 63
1430'   6F 6E 74 65
1434'   6E 74 73 20
1438'   20 20 20 20
143C'   20 20 20 20
1440'   20 20 20 20
1444'   20 20 20 20
1448'   20 20 20 20
144C'   20 20 20 20
                        57920   ;LINE18
1450'   20 20 20 20     57940           DB      "       DV = If nothing was input, insert the DEFAULT VALUE
  "
1454'   20 20 44 56
1458'   20 3D 20 49
145C'   66 20 6E 6F
1460'   74 68 69 6E
1464'   67 20 77 61
1468'   73 20 69 6E
146C'   70 75 74 2C
1470'   20 69 6E 73
1474'   65 72 74 20
```

```
1478'   74 68 65 20
147C'   44 45 46 41
1480'   55 4C 54 20
1484'   56 41 4C 53
1488'   45 20 20 20
148C'   20 20 20 20
1490'   20 20 20 20
1494'   20 20 20 20
1498'   20 20 20 20
149C'   20 20 20 20
                          57960   ;LINE19
14A0'   50 52 45 20       57980            DB      "PRE-EMPTIVE VALIDATIONS
   "
14A4'   45 4D 50 54
14A8'   49 56 45 20
14AC'   56 41 4C 49
14B0'   44 41 54 49
14B4'   4F 4E 53 20
14B8'   20 20 20 20
14BC'   20 20 20 20
14C0'   20 20 20 20
14C4'   20 20 20 20
14C8'   20 20 20 20
14CC'   20 20 20 20
14D0'   20 20 20 20
14D4'   20 20 20 20
14D8'   20 20 20 20
14DC'   20 20 20 20
14E0'   20 20 20 20
14E4'   20 20 20 20
14E8'   20 20 20 20
14EC'   20 20 20 20
                          58000   ;LINE20
14F0'   20 20 54 68       58020            DB      "  These validations pre-empt normal in favor of special functions.
   "
14F4'   65 73 65 20
14F8'   76 61 6C 69
14FC'   64 61 74 69
1500'   6F 6E 73 20
1504'   70 72 65 20
1508'   65 6D 70 74
150C'   20 6E 6F 72
1510'   6D 61 6C 20
1514'   69 6E 20 66
1518'   61 76 6F 72
151C'   20 6F 66 20
1520'   73 70 65 63
1524'   69 61 6C 20
1528'   66 75 6E 63
152C'   74 69 6F 6E
1530'   73 2E 20 20
1534'   20 20 20 20
1538'   20 20 20 20
```

```
153C"   20 20 20 20
                           58040   ;LINE21
1540"   20 20 20 20        58060          DB      "     YN = Accept only  Y (Yes) or N (No) as input
  "
1544"   20 20 59 4E
1548"   20 3D 20 41
154C"   63 63 65 70
1550"   74 20 6F 6E
1554"   6C 79 20 20
1558"   59 20 28 59
155C"   65 73 29 20
1560"   6F 72 20 4E
1564"   20 28 4E 6F
1568"   29 20 61 73
156C"   20 69 6E 70
1570"   75 74 20 20
1574"   20 20 20 20
1578"   20 20 20 20
157C"   20 20 20 20
1580"   20 20 20 20
1584"   20 20 20 20
1588"   20 20 20 20
158C"   20 20 20 20
                           58080   ;LINE22
1590"   20 20 20 20        58100          DB      "     CF = Place a computed value into this field
  "
1594"   20 20 43 46
1598"   20 3D 20 50
159C"   6C 61 63 65
15A0"   20 61 20 63
15A4"   6F 6D 70 75
15A8"   74 65 64 20
15AC"   76 61 6C 75
15B0"   65 20 69 6E
15B4"   74 6F 20 74
15B8"   68 69 73 20
15BC"   66 69 65 6C
15C0"   64 20 20 20
15C4"   20 20 20 20
15C8"   20 20 20 20
15CC"   20 20 20 20
15D0"   20 20 20 20
15D4"   20 20 20 20
15D8"   20 20 20 20
15DC"   20 20 20 20
                           58120   ;LINE23
15E0"   20 20 20 20        58140          DB      "
  "
15E4"   20 20 20 20
15E8"   20 20 20 20
15EC"   20 20 20 20
15F0"   20 20 20 20
15F4"   20 20 20 20
```

```
15F8'   20 20 20 20
15FC'   20 20 20 20
1600'   20 20 20 20
1604'   20 20 20 20
1608'   20 20 20 20
160C'   20 20 20 20
1610'   20 20 20 20
1614'   20 20 20 20
1618'   20 20 20 20
161C'   20 20 20 20
1620'   20 20 20 20
1624'   20 2C 20 20
1628'   20 20 20 20
162C'   20 20 20 20
                            58160    $LINE24
1630'   20 20 20 20         58180          DB      "
  "
1634'   20 20 20 20
1638'   20 20 20 20
163C'   20 20 20 20
1640'   20 20 20 20
1644'   20 20 20 20
1648'   20 20 20 20
164C'   20 20 20 20
1650'   20 20 20 20
1654'   20 20 20 20
1658'   20 20 20 20
165C'   20 20 20 20
1660'   20 20 20 20
1664'   20 20 20 20
1668'   20 20 20 20
166C'   20 20 20 20
1670'   20 20 20 20
1674'   20 20 20 20
1678'   20 20 20 20
167C'   20 20 20 20
                            99990          END     HELP

Macros:

Symbols:
EDHPSC  0000I'  GRHPSC  0780I'  HELP    0000I'  VLHPSC  0F00I'


No  Fatal error(s)
```

I claim:

1. A method of generating program for manipulating data on a computer comprising:

using field delimiters inputted by a user through an input-output unit connected to a computer to delineate a field;

using a program code of said computer to create a data base descriptor file, said descriptor file adapted to receive and store said delimiter;

using said program code to create a data base file in a separate location, said data base file adapted to receive and store inputted data;

using said program code to create a data base key file in a separate location, said key file adapted to identify said stored data; and using said program code to manipulate and transfer data between said field, said data base descriptor file, said data base file and said data base key file to generate an application program.

2. A method as defined in claim 1, wherein, subsequent to creating a data base descriptor file, said method further includes the step of using the input-output unit to input a validation to define and control data input for said field.

3. A method as defined in claim 1, wherein, subsequent to creating a data base descriptor file, said method further includes the step of using the input-output unit to input a default value to provide a command which prevents the entry of particular data values.

4. A method as defined in claim 1, wherein said step of creating a data base file comprises:

inputting data which defines the number of fields and the length of each of said fields;

identifying the parameters for each of said fields, and allocating space for subsequently inputted records.

5. A method as defined in claim 1, wherein, subsequent to delineating a field, said method further comprises the step of using said program code to check said field for delimiters compatible with said computer, said check of compatible delimiters comprising the steps of:

retrieving said delimiters from said input-output unit;

creating a field with at least one field parameter describing said field; and validating said field parameters.

6. A method as defined in claim 1, wherein said step of creating a data base key file further comprises:

inputting data which defines the first field and the length of said key file;

identifying the parameters for said key field; and allocating space for subsequently inputted key records.

7. A method as defined in claim 1, wherein said step of generating an application program further comprises:

computing the size of said application program based upon field validations and subroutine length;

using binary numbers to indicate the beginning and end of each field;

converting the binary numbers to hexidecimal numbers; and storing said application program between said hexidecimal numbers.

8. A method as defined in claim 1, wherein said input-output unit of said delineating step is a screen monitor operatively connected to said computer.

9. A method of transforming a general purpose electronic computer into a special purpose electronic computer, said computer including:

a screen monitor for communicating with the computer;

said screen monitor and computer operatively connected to a control unit for presenting data and commands to the computer; and said computer having a storage unit for placing data in memory for subsequent retrieval and use, said method comprising:

communicating with said control unit through a responsive sequence of operations wherein visual information is displayed to said user on the screen monitor and the user enters corresponding instructions;

allocating space in said storage unit for storing subsequently inputted data; and using said control unit to generate program code through which such fields may be manipulated when the user inputs instructions onto the screen monitor.

10. A method of creating a data base file structure for use with a computer having a screen monitor operatively connected to a control unit and a storage unit, said method comprising:

instructing said control unit by displaying information on said screen monitor;

comparing said instructions for said control unit to a table of commands stored in said storage unit;

inputting field delimiters to delineate a plurality of fields;

creating a data base descriptor file in said storage unit adapted to receive and store a plurality of field delimiters;

creating a data base file in said storage unit adapted to receive and store inputted data;

creating a data base key file in said storage unit adapted to identify said stored data;

generating program code, whereby said fields may be manipulated by inputting information on the monitor.

11. An application program generator adapted for use with micro-computers having relatively small memory storage capacities, said application program generator comprising:

means operatively connected to the micro-computer for inputting data to and receiving output from said micro-computer;

means adapted to store data and programming code;

control means operatively connected to said input-output means and said storage means, such that said control means, input-output means and storage means are adapted to transfer information to and from each other individually and collectively in response to a command signal from the control means, said transfer of information pursuant to directives stored in said control means, said directives include, but are not limited to the following procedural steps:

using field delimiters inputted by a user through said input-output means to delineate a field;

creating a data base descriptor file in a said storage means, said descriptor file adapted to receive and store said delimiters;

creating a data base file in a separate location, said data base file adapted to receive and store inputted data;

creating a data base key file in a separate location, said data base key file adapted to identify said stored data; and generating an application program to manipulate and transfer data between said field, said data base descriptor file, said data base file and said data base key file.

12. A system whereby a computer is provided with the capability of internally generating program code from data inputted by a user; said program code employed by said computer to structure, store, and manipulate inputted data, said system comprising:

an input-output unit;

a storage unit;

a control unit operatively connected to said input-output unit and said storage unit such that each unit is capable of communicating, individually and collectively, with all other units upon receipt of a command signal from the control unit;

means for delineating a field using field delimiters inputted by a user; means for creating a data base descriptor file in said storage unit, said descriptor file adapted to receive and store said delimiters; means for creating a data base file in said storage unit, said data base file adapted to receive and store inputted data; means for creating a data base key file in said storage unit, said key file adapted to identify said storage data; and means for automatically generating program code from said control unit, whereby said fields may be manipulated through use of said screen monitor.

13. A system as defined in claim 12, wherein said system further comprises means for inputting a validation to define and control data input for said field.

14. A system as defined in claim 12, wherein said system further comprises means for inputting a default value to provide a command which prevents the entry of particular data values.

15. A system as defined in claim 12, wherein said system further comprises means for checking said field for delimiters compatible with said computer.

16. A method of searching a data base file structure for use with storing a new data base record on a computer having a data base file and a key file for containing data records, said method comprising:

(1) creating a file number to attach to the end of a key file record so that said data base record corresponds to the key file record number and key value;

(2) comparing said key record number and said data base record number and then performing step (3), if the difference between said numbers is greater than a predetermined value, and performing step (4), if the difference between said numbers is equal or less than said predetermined value; and performing step (5), if there is no difference between said numbers;

(3) performing a binary search to find said key value and said record number, then returning to step (2);

(4) performing a sequential search to find said key value and said key record number, then returning to step (2);

(5) identifying the closest record number in the key file.

17. A method as defined in claim 16, wherein said method further includes:

storing said data base record; and re-numbering the records of said data base file.

* * * * *